(12) United States Patent
Sasaki et al.

(10) Patent No.: US 8,467,664 B2
(45) Date of Patent: Jun. 18, 2013

(54) RECORDING MEDIUM, PLAYBACK DEVICE, AND INTEGRATED CIRCUIT

(75) Inventors: Taiji Sasaki, Osaka (JP); Hiroshi Yahata, Osaka (JP); Tomoki Ogawa, Osaka (JP)

(73) Assignee: Panasonic Corporation, Osaka (JP)

( * ) Notice: Subject to any disclaimer, the term of this patent is extended or adjusted under 35 U.S.C. 154(b) by 13 days.

(21) Appl. No.: 13/399,196

(22) Filed: Feb. 17, 2012

(65) Prior Publication Data

US 2012/0147141 A1    Jun. 14, 2012

Related U.S. Application Data

(60) Division of application No. 13/031,780, filed on Feb. 22, 2011, now Pat. No. 8,150,238, which is a continuation of application No. PCT/JP2010/004439, filed on Jul. 7, 2010.

(30) Foreign Application Priority Data

Oct. 7, 2009    (JP)  .................................  2009-164289

(51) Int. Cl.
| | |
|---|---|
| *H04N 5/92* | (2006.01) |
| *H04N 5/445* | (2011.01) |
| *H04N 5/917* | (2006.01) |
| *H04N 5/935* | (2006.01) |
| *H04N 7/173* | (2011.01) |
| *H04N 13/00* | (2006.01) |
| *H04H 20/28* | (2008.01) |
| *H04J 3/00* | (2006.01) |
| *H04J 3/02* | (2006.01) |
| *H04L 12/28* | (2006.01) |
| *G06T 11/20* | (2006.01) |

(52) U.S. Cl.
USPC ........... 386/337; 386/201; 386/329; 345/441; 345/442; 348/43; 370/389; 370/476; 370/486; 370/537; 725/38; 725/114; 725/133

(58) Field of Classification Search
USPC .............. 386/337, 201, 329, E9.013, E9.014, 386/E9.04; 345/441, 442; 348/E5.009, E5.011, 348/E5.108, E5.111, E13.014, E13.04, E13.044, 348/E13.059, E13.062, E13.071, E13.072, 348/E13.073, 43, E13.074; 370/389, 476, 370/486, 537, E7.022; 725/38, 114, 133
See application file for complete search history.

(56) References Cited

U.S. PATENT DOCUMENTS 5,325,477 A * 6/1994 Klassen ....................... 345/442
5,923,869 A    7/1999 Kashiwagi et al.
(Continued)

FOREIGN PATENT DOCUMENTS

| JP | 3935507 | 3/2007 |
|---|---|---|
| JP | 2007-166651 | 6/2007 |

(Continued)

OTHER PUBLICATIONS

Notice of Allowance dated Jun. 27, 2012 in U.S. Appl. No. 12/834,279.

(Continued)

*Primary Examiner* — Thai Tran
*Assistant Examiner* — Syed Hasan
(74) *Attorney, Agent, or Firm* — Wenderoth, Lind & Ponack, L.L.P.

(57) ABSTRACT

A pair of main-view and sub-view video streams and a graphics stream are recorded on a BD-ROM disc. Metadata is provided in each GOP in the sub-view video stream. The metadata includes offset information. The offset information specifies offset control for a plurality of pictures constituting a GOP. Offset control is to provide a left offset and right offset for the horizontal coordinates in a graphics plane to generate a pair of graphics planes, and to combine them separately with main-view and sub-view video planes. The sub-view video stream is packetized and multiplexed in a transport stream. A header of each TS packet includes a TS priority flagTS packets containing the metadata have a different value of TS priority flag from TS packets containing sub-view pictures.

1 Claim, 123 Drawing Sheets

U.S. PATENT DOCUMENTS

| | | | |
|---|---|---|---|
| 6,393,574 B1 | 5/2002 | Kashiwagi et al. | |
| 6,470,460 B1 | 10/2002 | Kashiwagi et al. | |
| 6,484,266 B2 | 11/2002 | Kashiwagi et al. | |
| 6,502,198 B2 | 12/2002 | Kashiwagi et al. | |
| 6,502,199 B2 | 12/2002 | Kashiwagi et al. | |
| 6,502,200 B2 | 12/2002 | Kashiwagi et al. | |
| 6,516,138 B2 | 2/2003 | Kashiwagi et al. | |
| 6,516,139 B2 | 2/2003 | Kashiwagi et al. | |
| 6,519,414 B2 | 2/2003 | Kashiwagi et al. | |
| 6,526,226 B2 | 2/2003 | Kashiwagi et al. | |
| 6,546,195 B2 | 4/2003 | Kashiwagi et al. | |
| 6,573,819 B1 | 6/2003 | Oshima et al. | |
| 6,574,423 B1 | 6/2003 | Oshima et al. | |
| 6,760,042 B2 * | 7/2004 | Zetts | 715/716 |
| 6,907,190 B2 | 6/2005 | Kashiwagi et al. | |
| 6,925,250 B1 | 8/2005 | Oshima et al. | |
| 6,954,584 B2 | 10/2005 | Kashiwagi et al. | |
| 7,194,194 B2 | 3/2007 | Kashiwagi et al. | |
| 7,317,868 B2 | 1/2008 | Oshima et al. | |
| 7,426,329 B2 | 9/2008 | Calhoon et al. | |
| 7,747,145 B2 | 6/2010 | Oshima et al. | |
| 7,796,864 B2 | 9/2010 | Jung et al. | |
| 2001/0053281 A1 | 12/2001 | Kashiwagi et al. | |
| 2001/0055474 A1 | 12/2001 | Kashiwagi et al. | |
| 2002/0001309 A1 * | 1/2002 | Saito | 370/389 |
| 2002/0001454 A1 | 1/2002 | Kashiwagi et al. | |
| 2002/0001455 A1 | 1/2002 | Kashiwagi et al. | |
| 2002/0003944 A1 | 1/2002 | Kashiwagi et al. | |
| 2002/0003945 A1 | 1/2002 | Kashiwagi et al. | |
| 2002/0003950 A1 | 1/2002 | Kashiwagi et al. | |
| 2002/0003951 A1 | 1/2002 | Kashiwagi et al. | |
| 2002/0025143 A1 | 2/2002 | Kashiwagi et al. | |
| 2003/0053797 A1 * | 3/2003 | Oshima et al. | 386/98 |
| 2003/0108341 A1 | 6/2003 | Oshima et al. | |
| 2003/0138238 A1 | 7/2003 | Kashiwagi et al. | |
| 2004/0017831 A1 * | 1/2004 | Shen et al. | 370/486 |
| 2004/0175133 A1 | 9/2004 | Kashiwagi et al. | |
| 2004/0179820 A1 | 9/2004 | Kashiwagi et al. | |
| 2005/0180735 A1 | 8/2005 | Oshima et al. | |
| 2008/0056686 A1 | 3/2008 | Oshima et al. | |
| 2008/0063385 A1 | 3/2008 | Oshima et al. | |
| 2008/0063386 A1 | 3/2008 | Oshima et al. | |
| 2008/0101767 A1 | 5/2008 | Oshima et al. | |
| 2008/0292287 A1 | 11/2008 | Oshima et al. | |
| 2009/0119706 A1 * | 5/2009 | Hope et al. | 725/38 |
| 2009/0220215 A1 | 9/2009 | Oshima et al. | |
| 2009/0252483 A1 | 10/2009 | Oshima et al. | |
| 2010/0020158 A1 | 1/2010 | Oshima et al. | |
| 2010/0021141 A1 | 1/2010 | Yamashita et al. | |
| 2010/0111503 A1 | 5/2010 | Oshima et al. | |
| 2010/0118119 A1 | 5/2010 | Newton et al. | |
| 2010/0119213 A1 | 5/2010 | Oshima et al. | |
| 2011/0069152 A1 * | 3/2011 | Wang et al. | 348/43 |

FOREIGN PATENT DOCUMENTS

| | | |
|---|---|---|
| WO | 2008/044191 | 4/2008 |
| WO | 2010/010709 | 1/2010 |

OTHER PUBLICATIONS

International Search Report issued Oct. 12, 2010 in International (PCT) Application No. PCT/JP2010/004439.

* cited by examiner

FIG.3A

| PID=0x1011 | Primary video stream |
|---|---|
| 0x1100 | Primary audio stream |
| 0x1101 | Primary audio stream |
| 0x1200 | PG stream |
| 0x1201 | PG stream |
| 0x1400 | IG stream |
| 0x1A00 | Secondary audio stream |
| 0x1B00 | Secondary video stream |

| PID=0x1012 | Primary video stream |
|---|---|
| 0x1013 | Primary video stream |
| 0x1B20 | Secondary video stream |
| 0x1B21 | Secondary video stream |

- 311R
- 311D
- 312R
- 313D

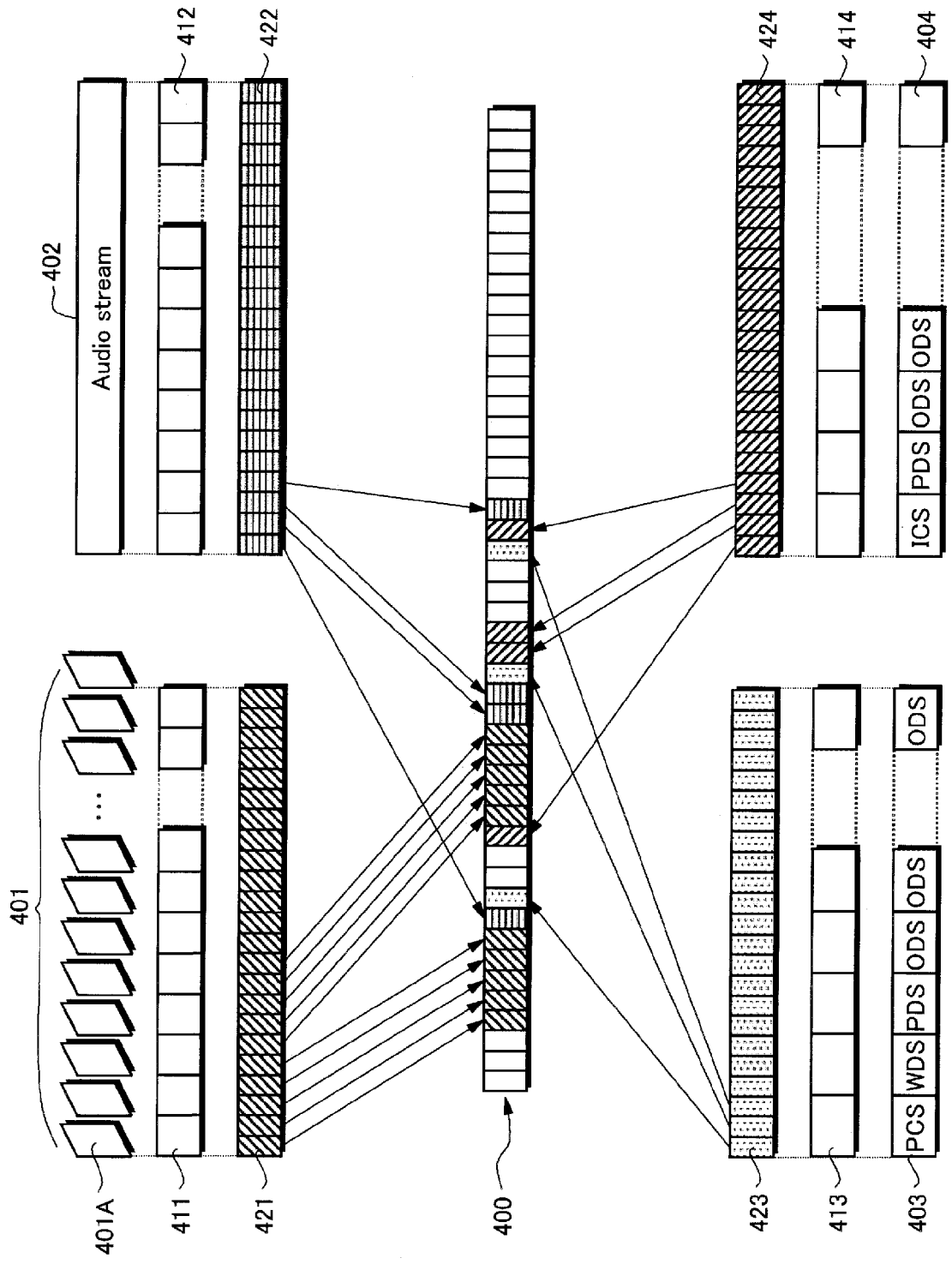

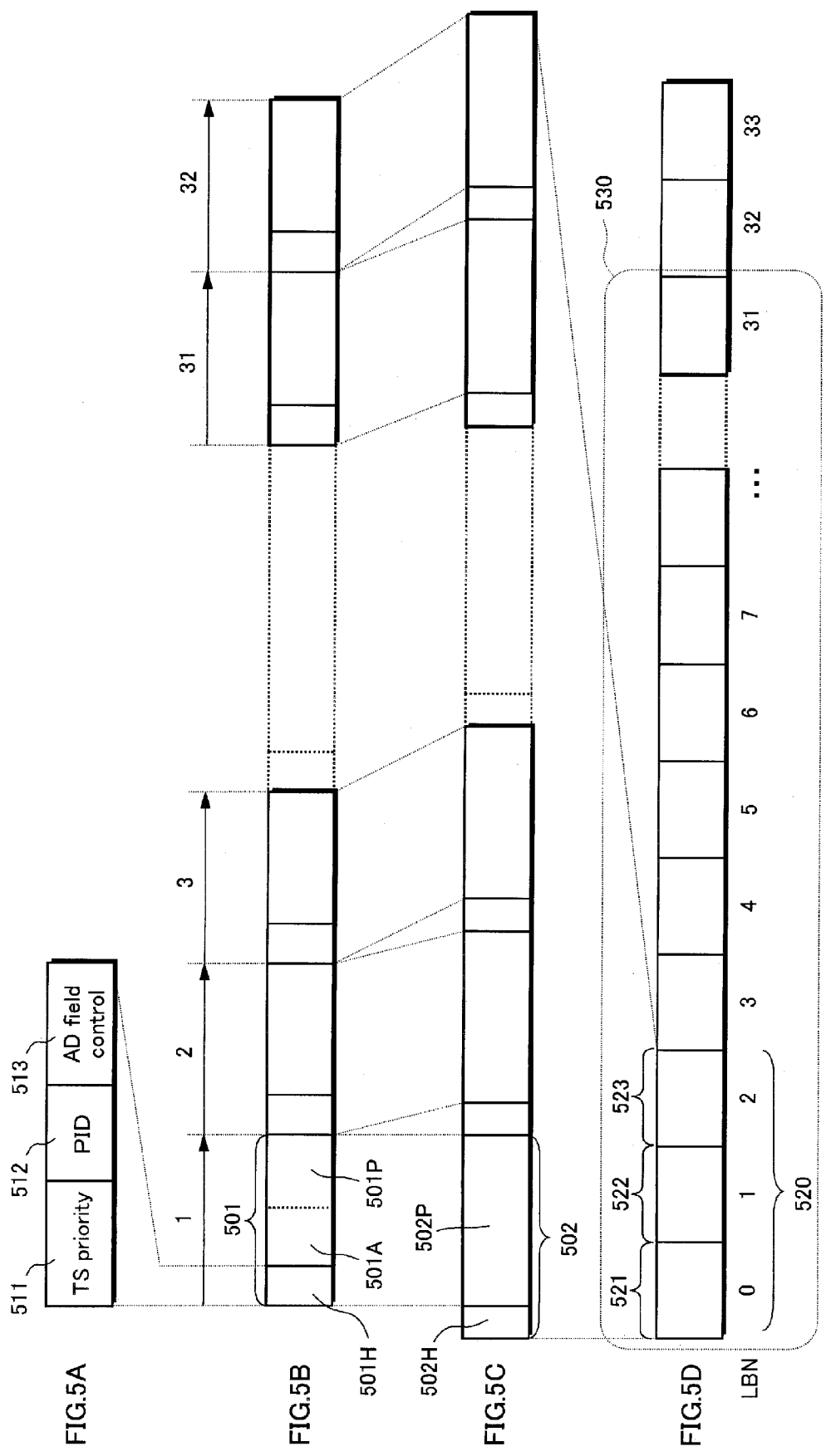

FIG.12

| Syntax | No. of bits |
|---|---|
| offset_metadata () { | |
|   PTS | 8 |
|   number_of_offset_sequence | |
|   number_of_displayed_frames_in_GOP | |
|   for(offset_sequence_id=0;<br>  offset_sequence_id＜number_of_offset_sequence;<br>  offset_sequence_id++) { | |
|     offset_sequence () { | |
|       for(i=0; i＜number_of_displayed_frames_in_GOP; i++) { | |
|         Plane_offset_direction | 1 |
|         Plane_offset_value | 7 |
|       } | |
|     } | |
|   } | |
| } | |

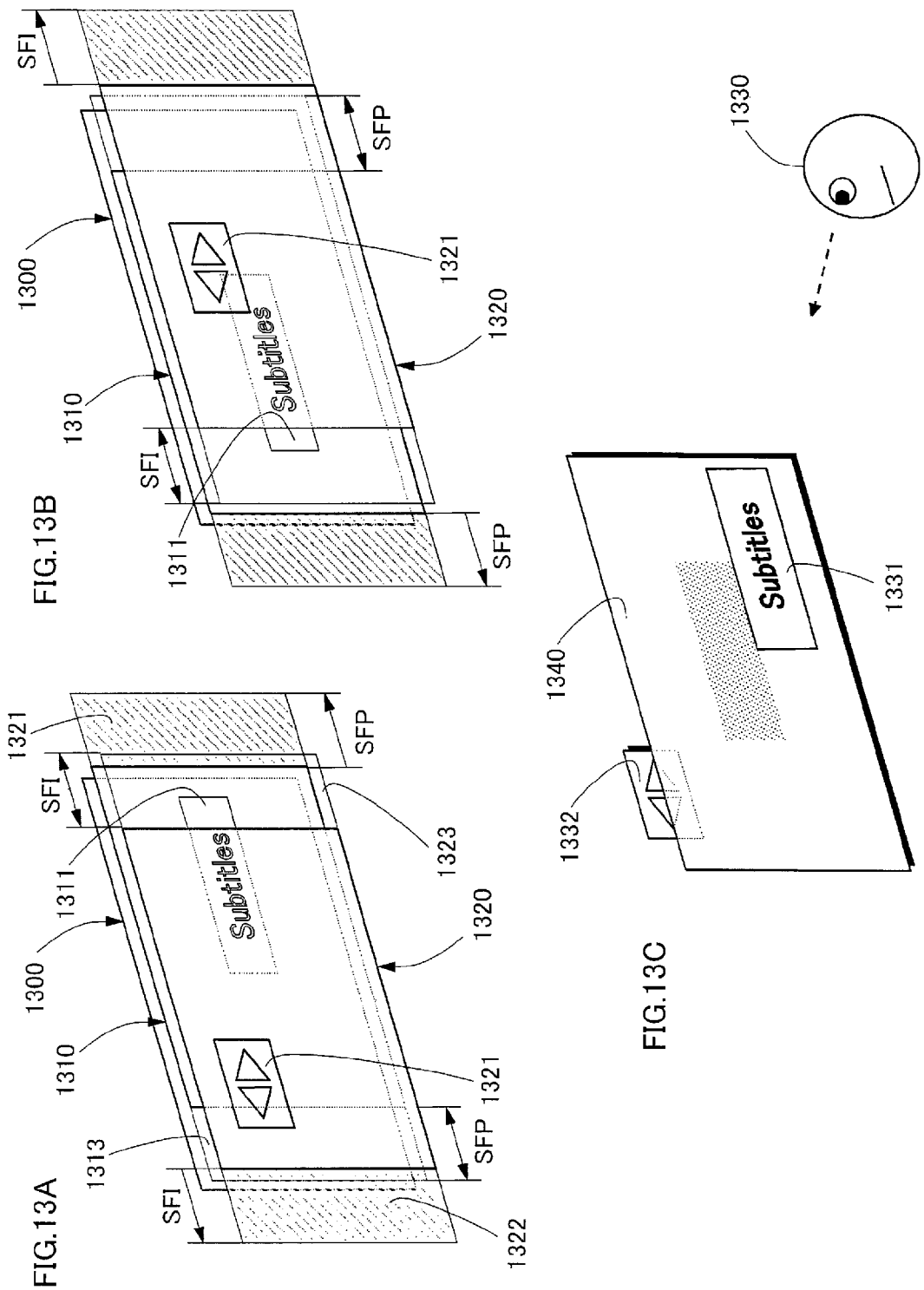

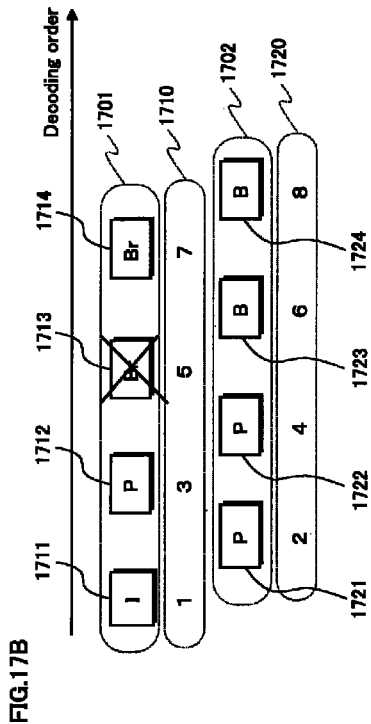
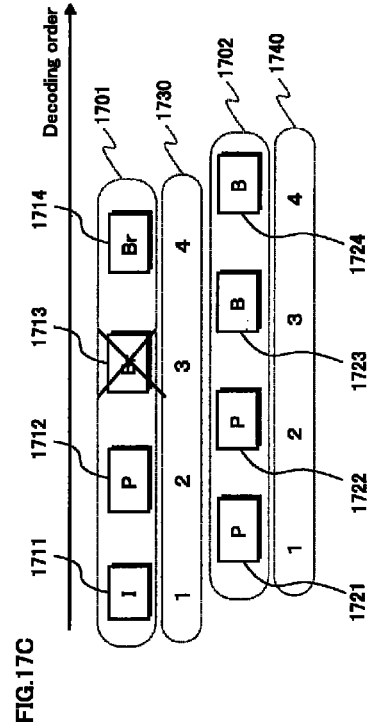
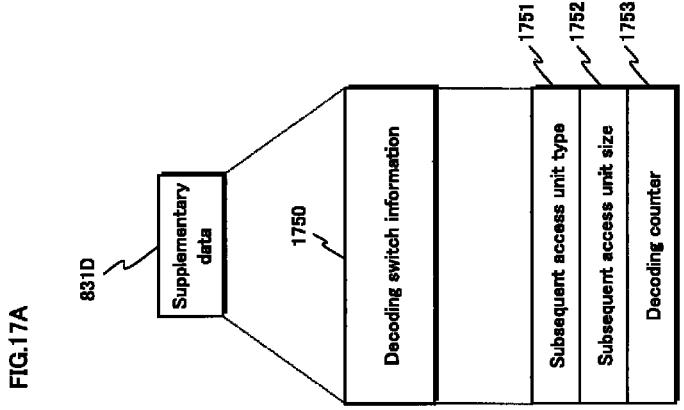

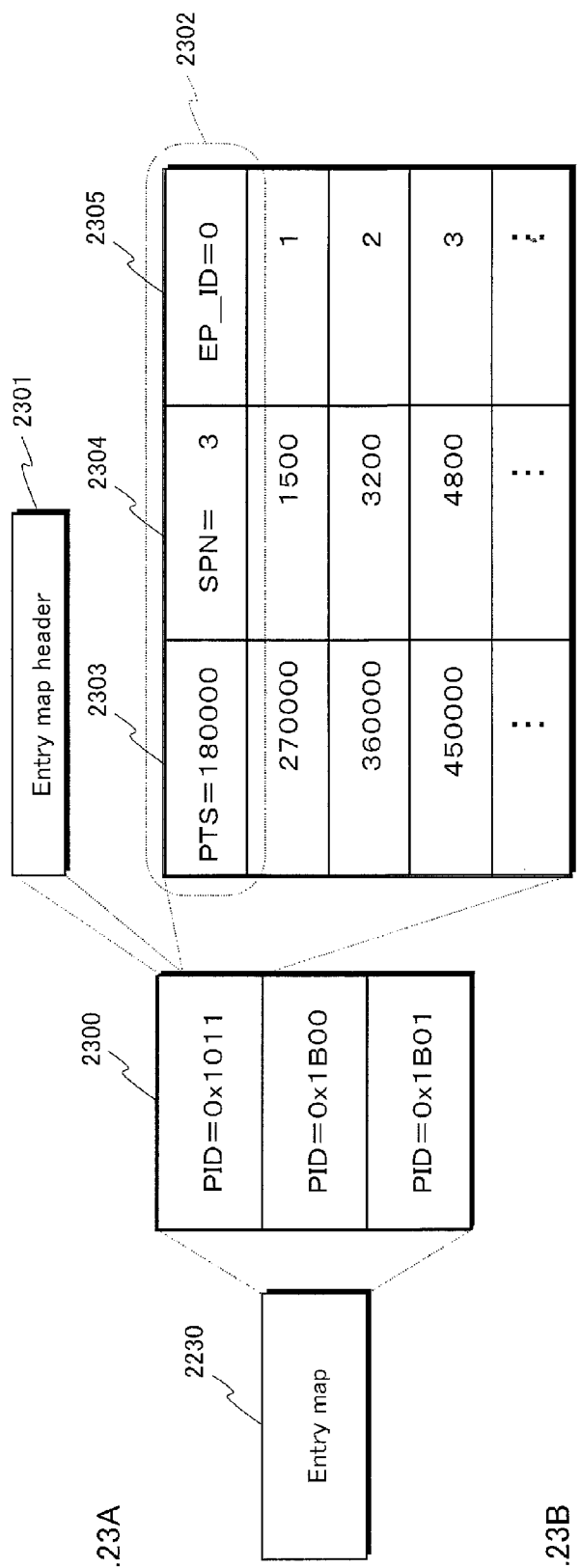
FIG.23A
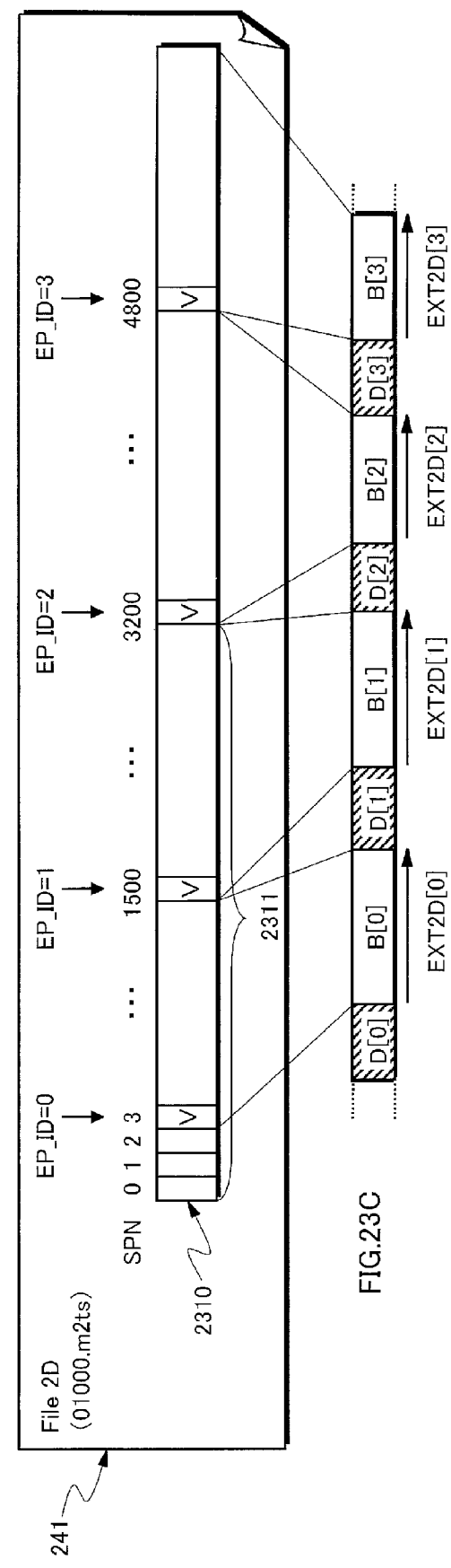
FIG.23B
FIG.23C

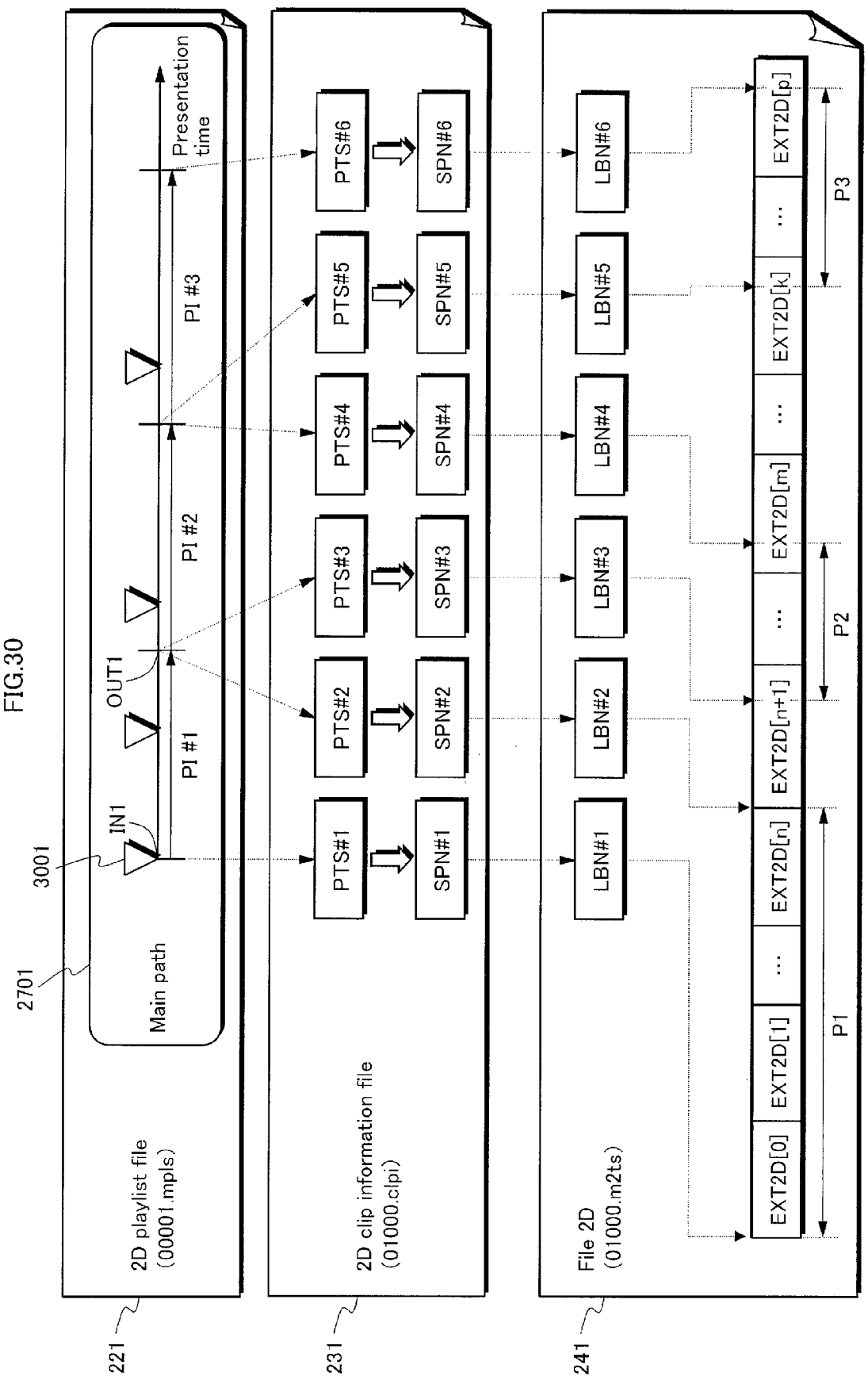

FIG.38

| 3801 | 3802 |
|---|---|
| 0 | Language Code |
| 1 | Audio stream number |
| 2 | Subtitle stream number |
| 3 | Angle number |
| 4 | Title number |
| 5 | Chapter number |
| 6 | Program number |
| 7 | Cell number |
| 8 | Key name |
| 9 | Navigation timer |
| 10 | Current playback time |

| 3801 | 3802 |
|---|---|
| 11 | Player audio mixing mode for Karaoke |
| 12 | Country code for parental management |
| 13 | Parental level |
| 14 | Player configuration for Video |
| 15 | Player configuration for Audio |
| 16 | Language code for AST |
| 17 | Language code ext. for AST |
| 18 | Language code for STST |
| 19 | Language coded ext. for STST |
| 20 | Player region code |
| 21 | Secondary Video Stream number |

| 3801 | 3802 |
|---|---|
| 22 | Secondary Audio Stream number |
| 23 | Player status |
| 24 | reserved |
| 25 | reserved |
| 26 | reserved |
| 27 | reserved |
| 28 | reserved |
| 29 | reserved |
| 30 | reserved |
| ... | |
| 63 | reserved |

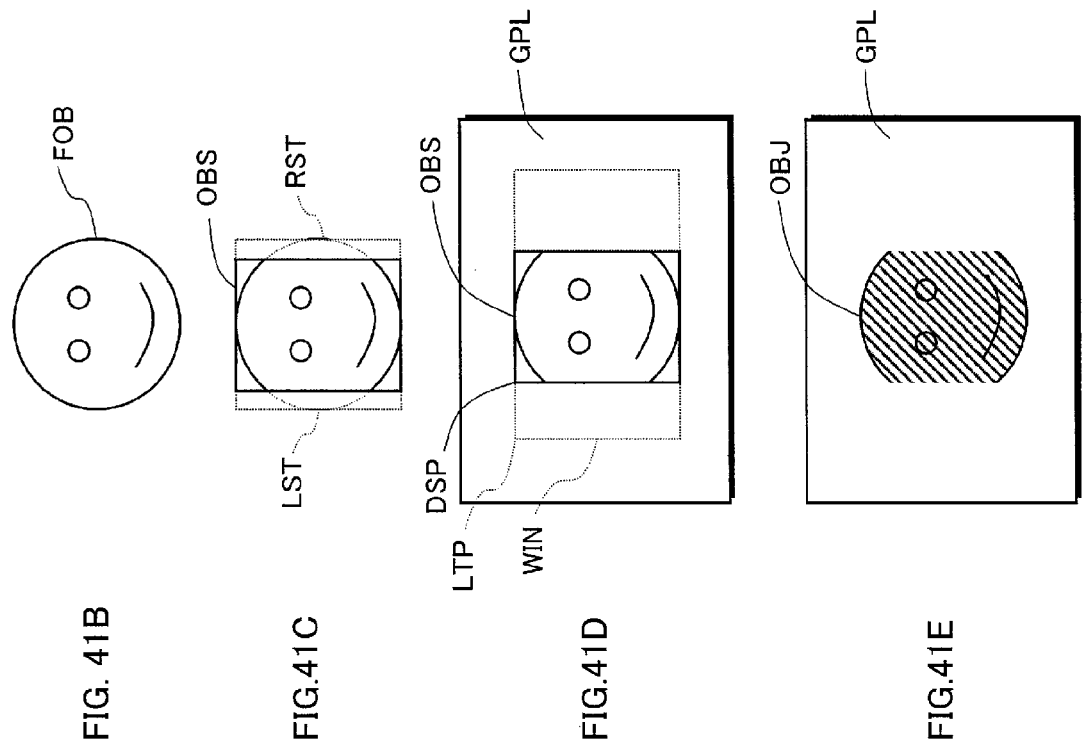
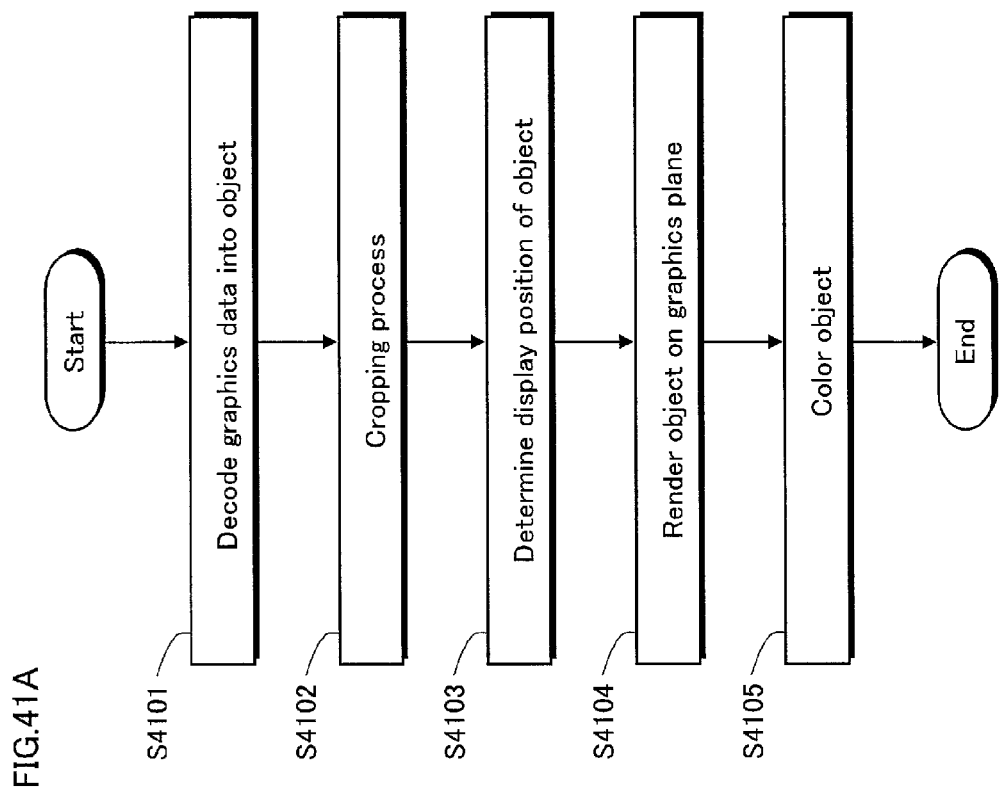

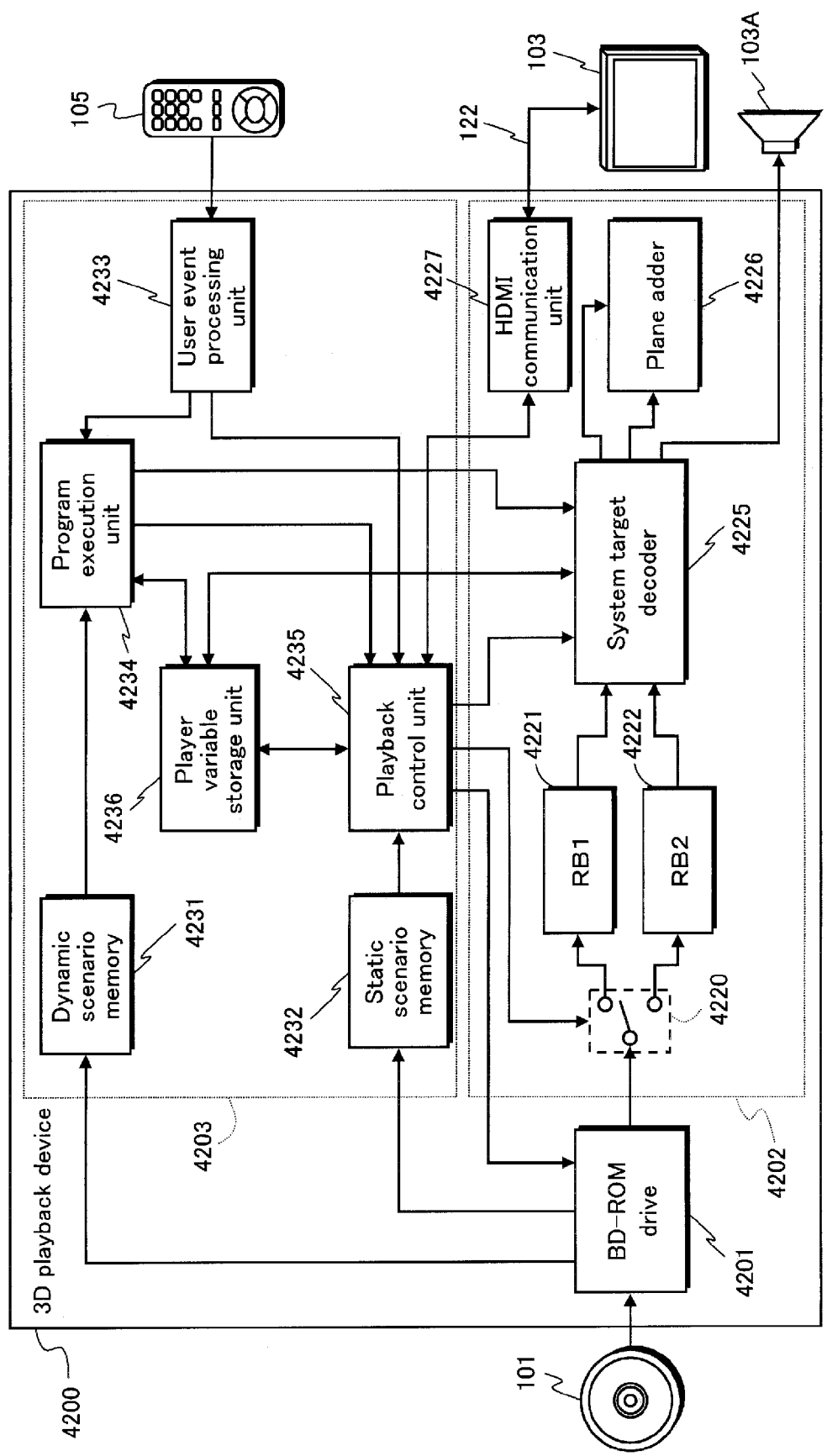

FIG.43

| 27 | PG_ref_offset_id 4310 | IG_ref_offset_id 4311 | SV_ref_offset_id 4312 | IM_ref_offset_id 4313 |
|---|---|---|---|---|
| 28 | PG_offset_adjustment 4320 | IG_offset_adjustment 4321 | SV_offset_adjustment 4322 | IM_offset_adjustment 4323 |

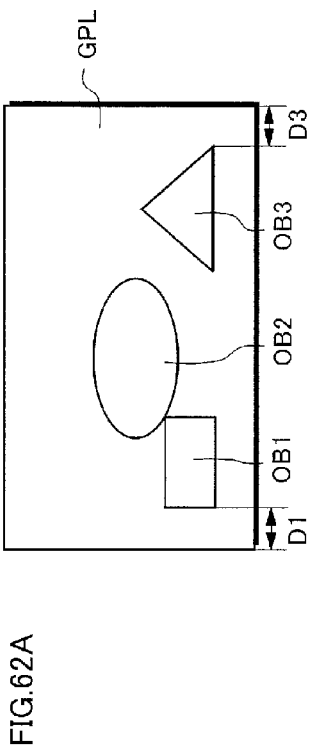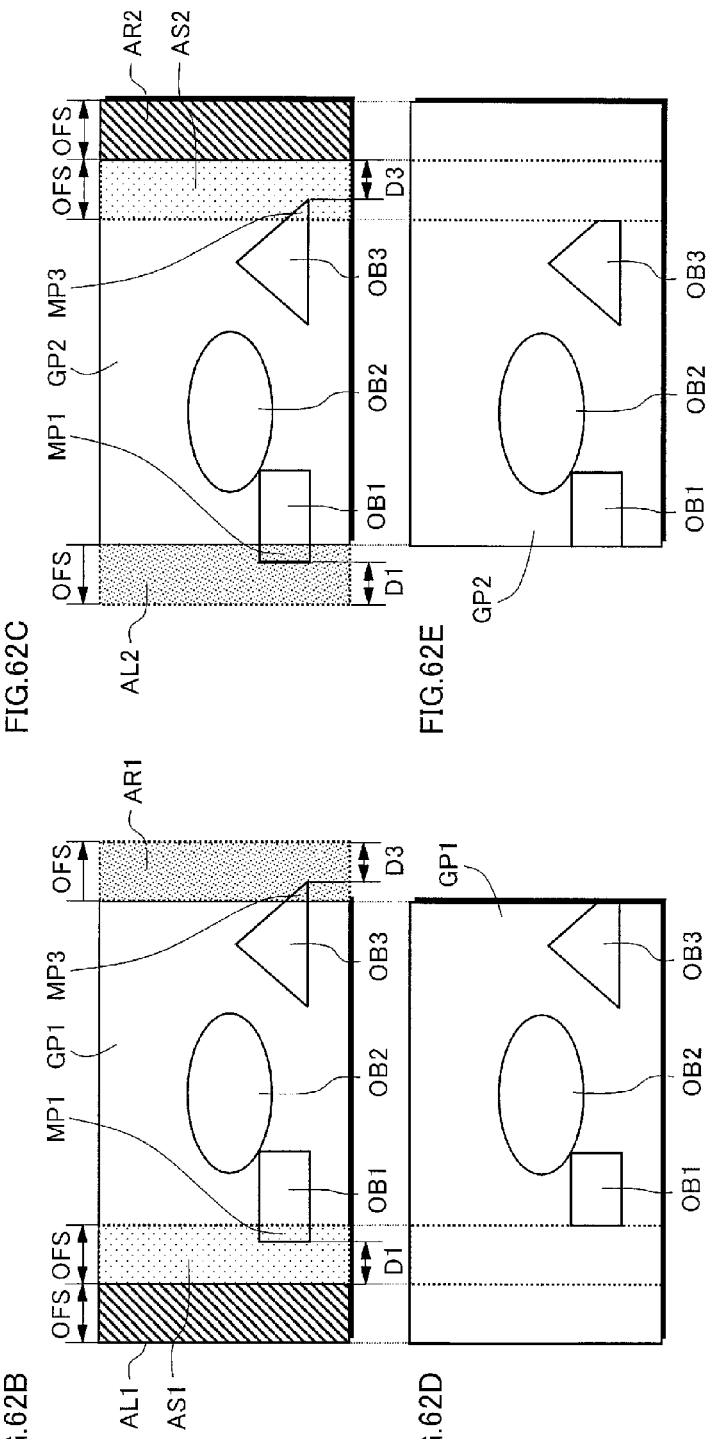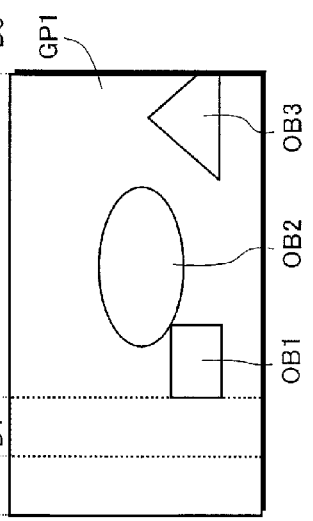

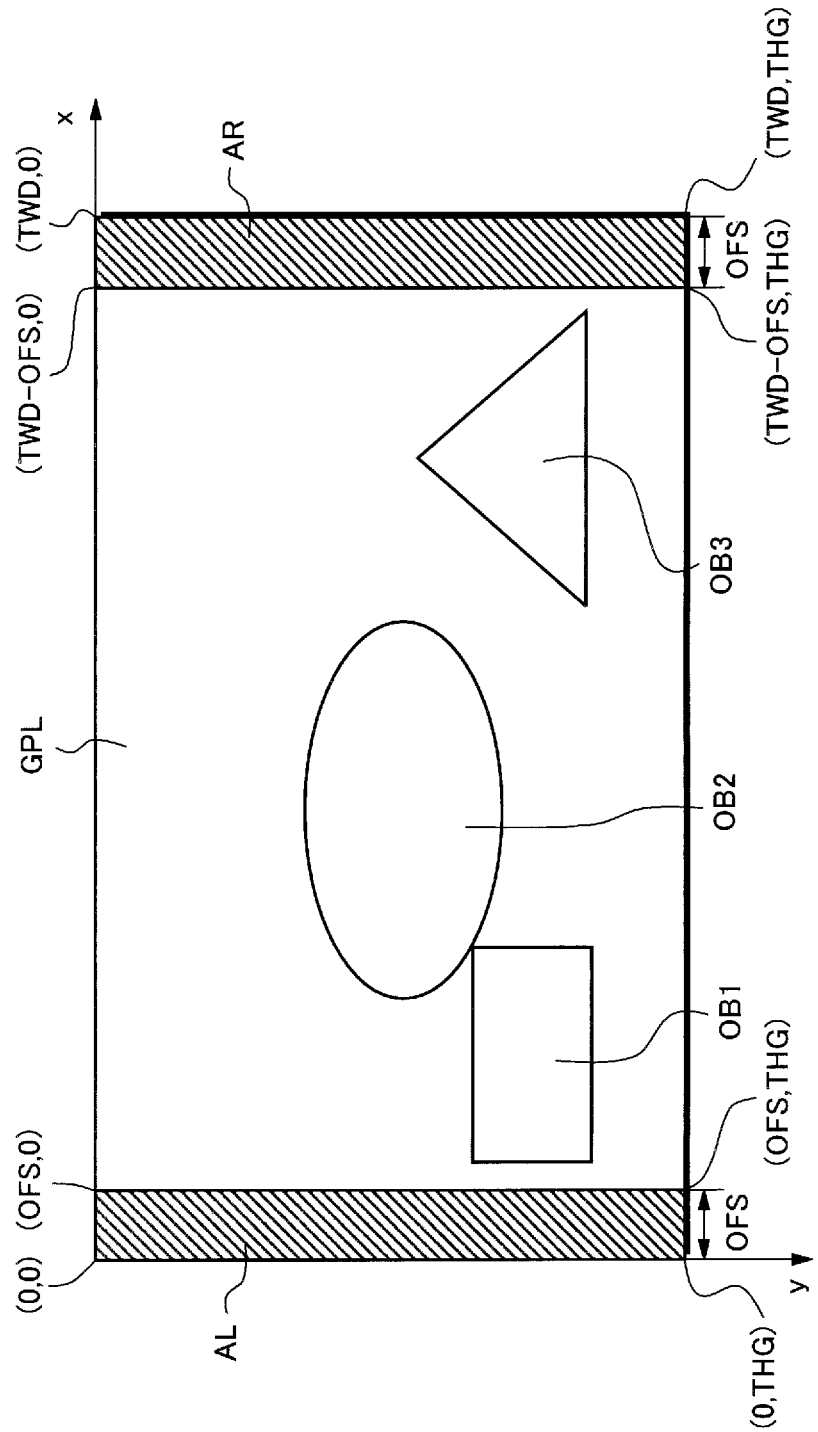

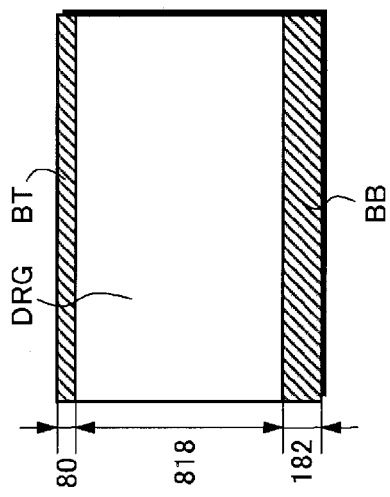
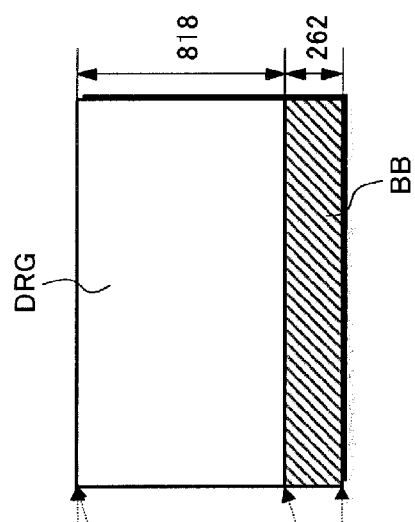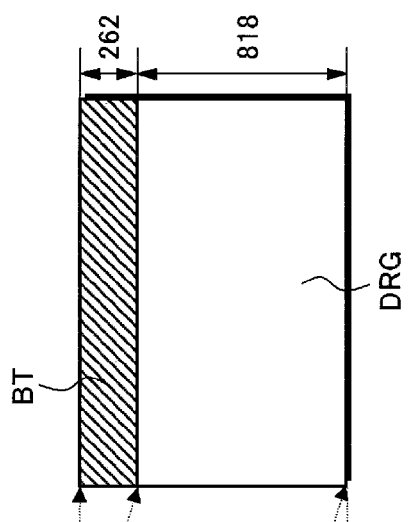
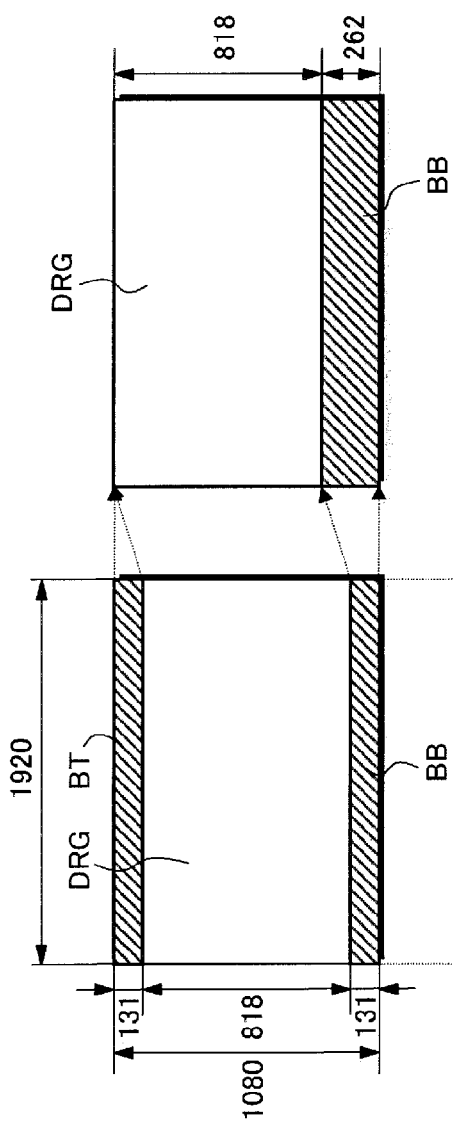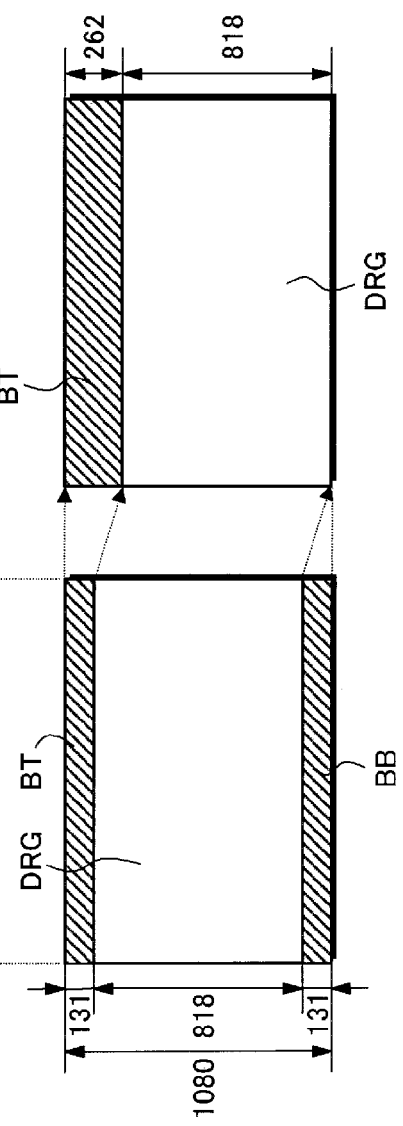

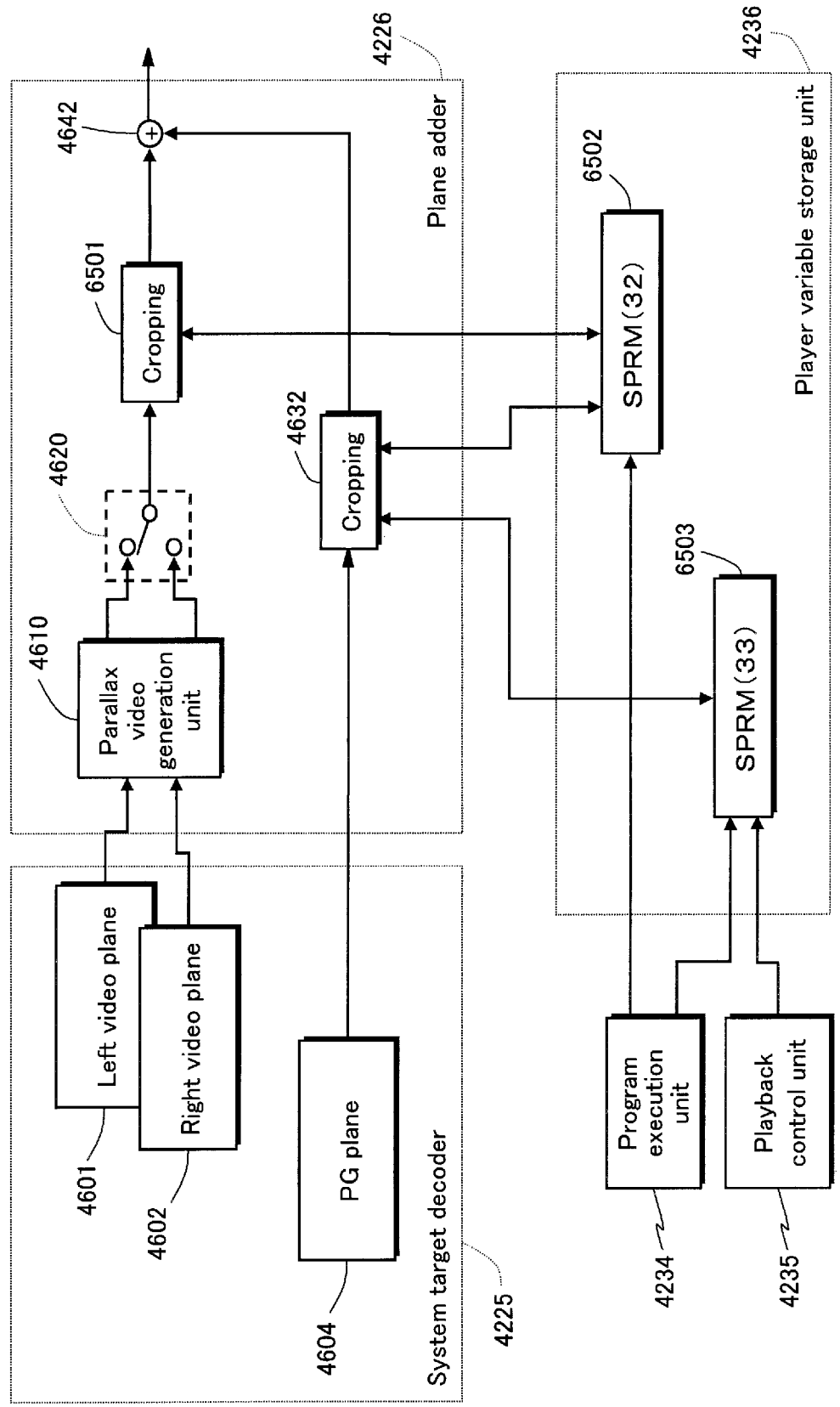

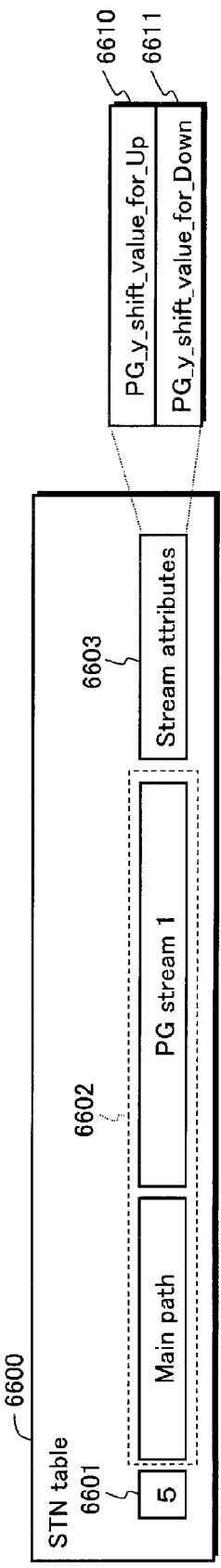

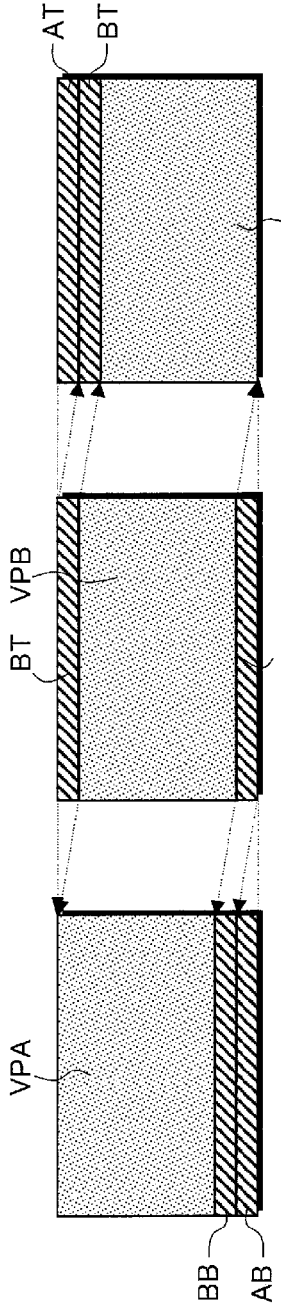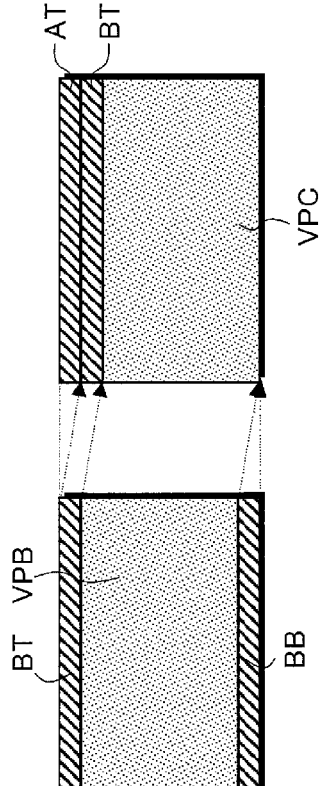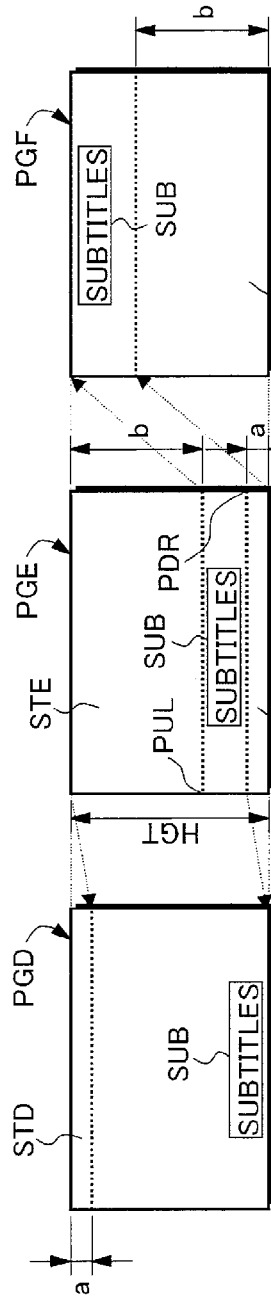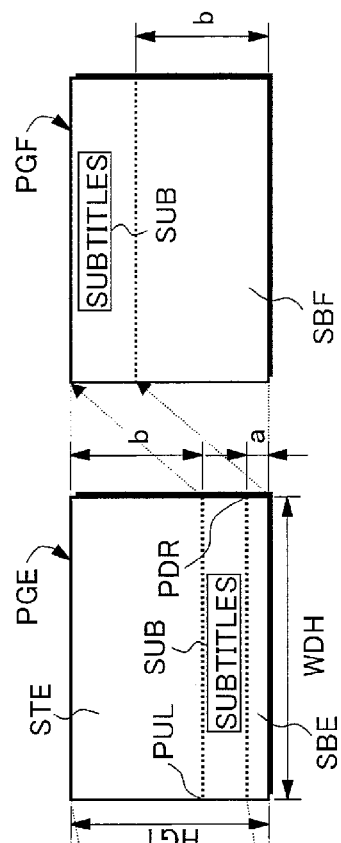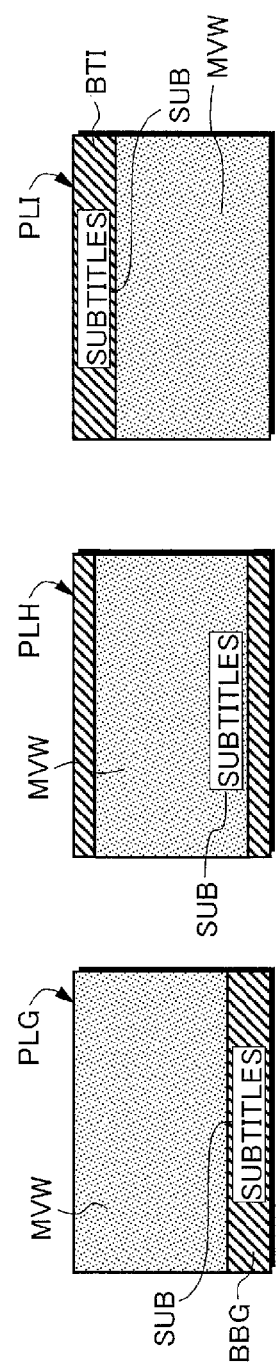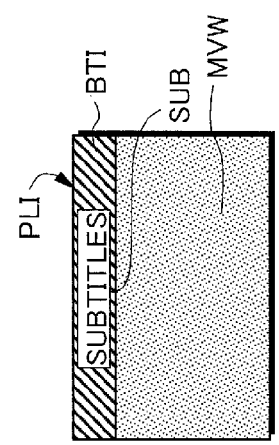

| STN | PID | Video_shift_mode |
|---|---|---|
| 5 | PG stream 1 | Keep |
| 6 | PG stream 2 | Keep |
| 7 | PG stream 3 | Keep |
| 8 | PG stream 4 | Up |
| 9 | PG stream 5 | Up |
| 10 | PG stream 6 | Down |
| 11 | PG stream 7 | Down |
| 12 | PG stream 8 | Down |
| 13 | PG stream 9 | Down |

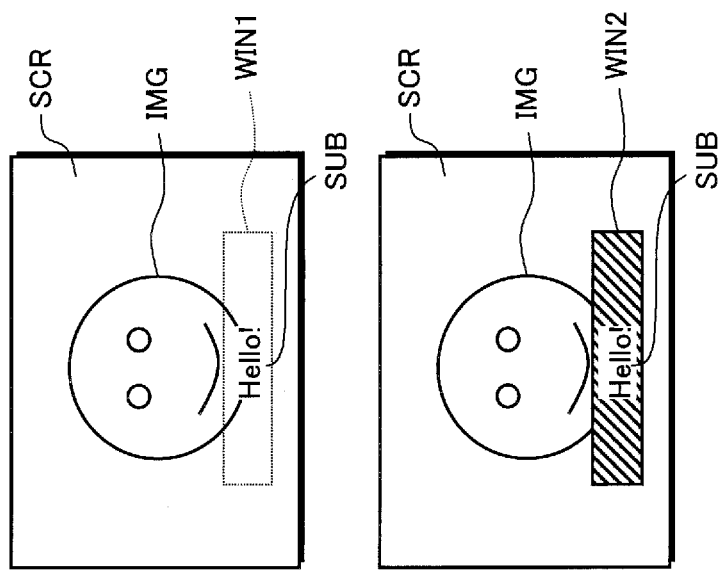

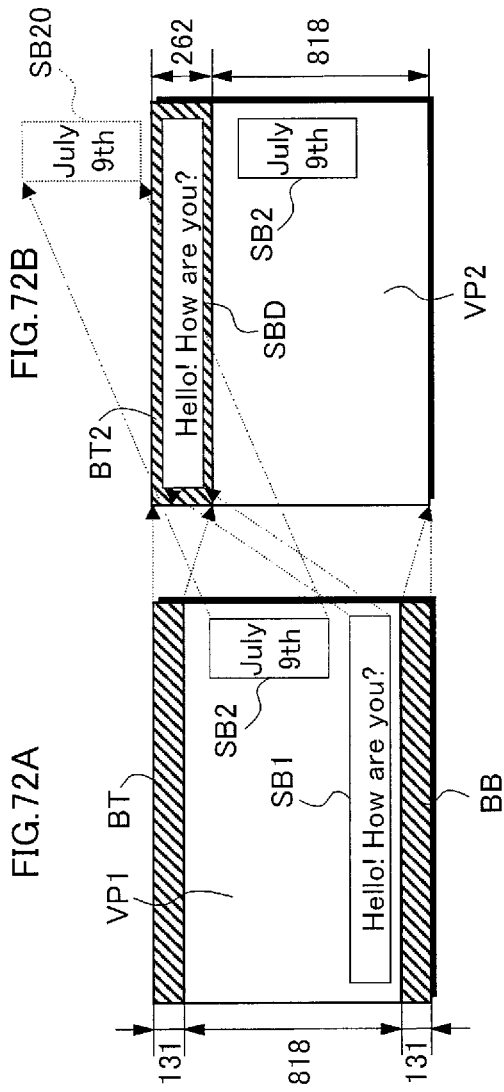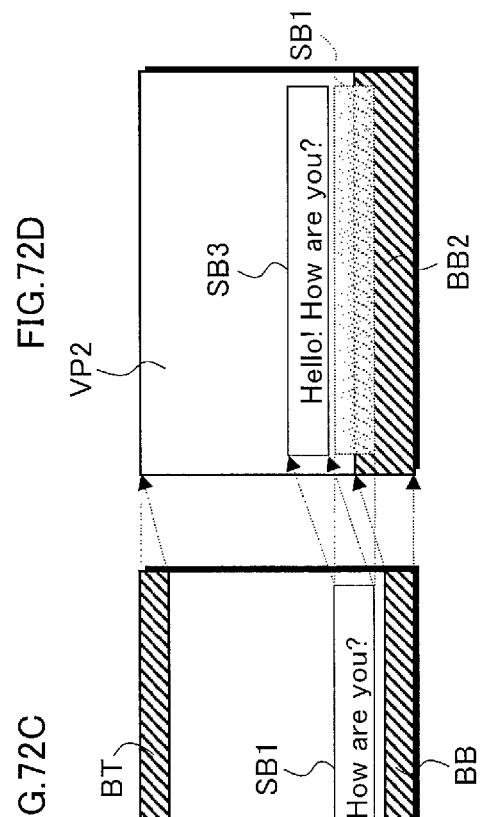

FIG.73A

| PID=0x1012 | Primary video stream |
|---|---|
| 0x1220 | Left-view PG stream |
| 0x1221 | Left-view PG stream |
| 0x1240 | Right-view PG stream |
| 0x1241 | Right-view PG stream |
| 0x1420 | Left-view IG stream |
| 0x1440 | Right-view IG stream |
| 0x1B20 | Secondary video stream |

FIG.73B

| PID=0x1013 | Primary video stream |
|---|---|
| 0x1260 | Depth map PG stream |
| 0x1261 | Depth map PG stream |
| 0x1460 | Depth map IG stream |
| 0x1B40 | Secondary video stream |

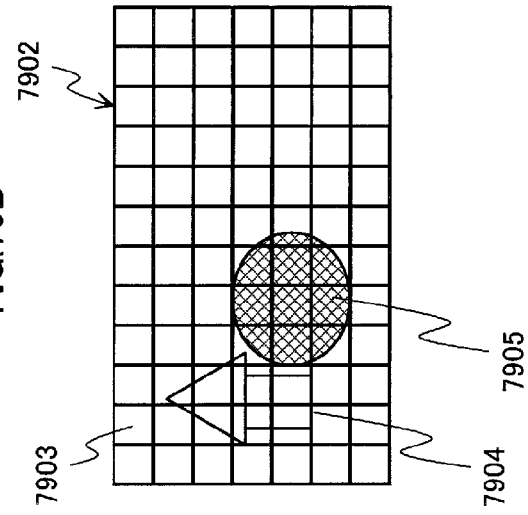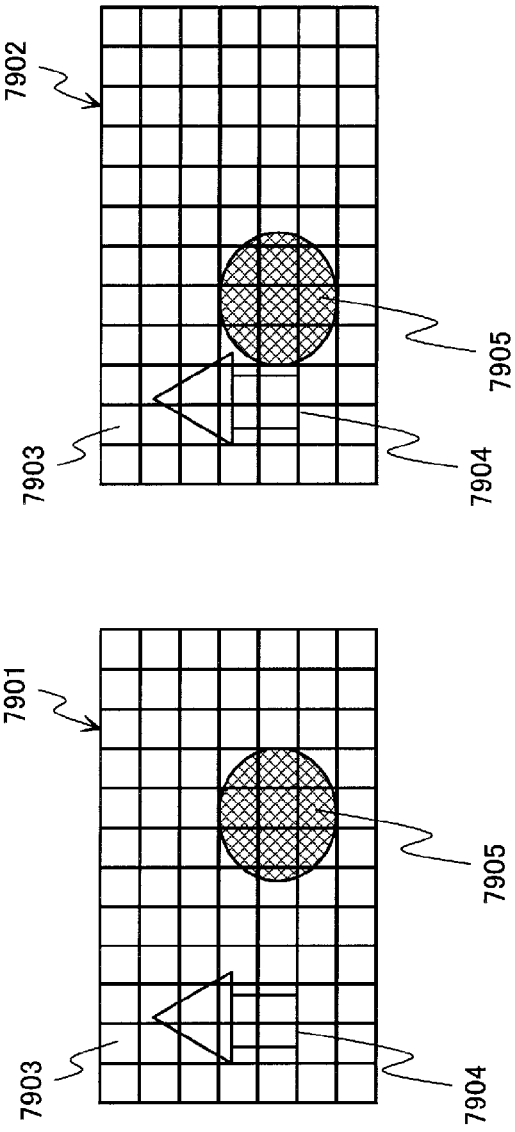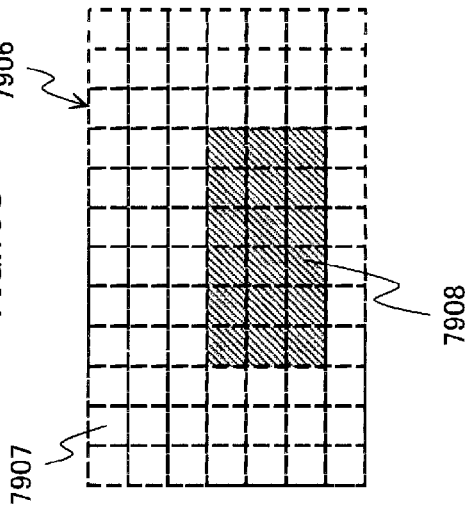

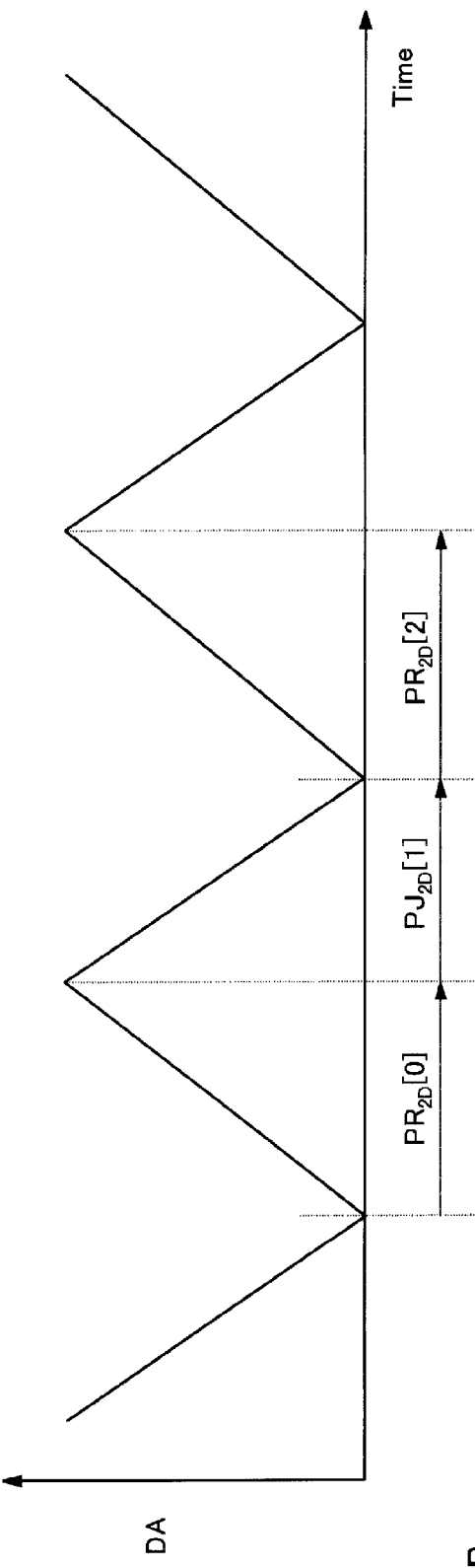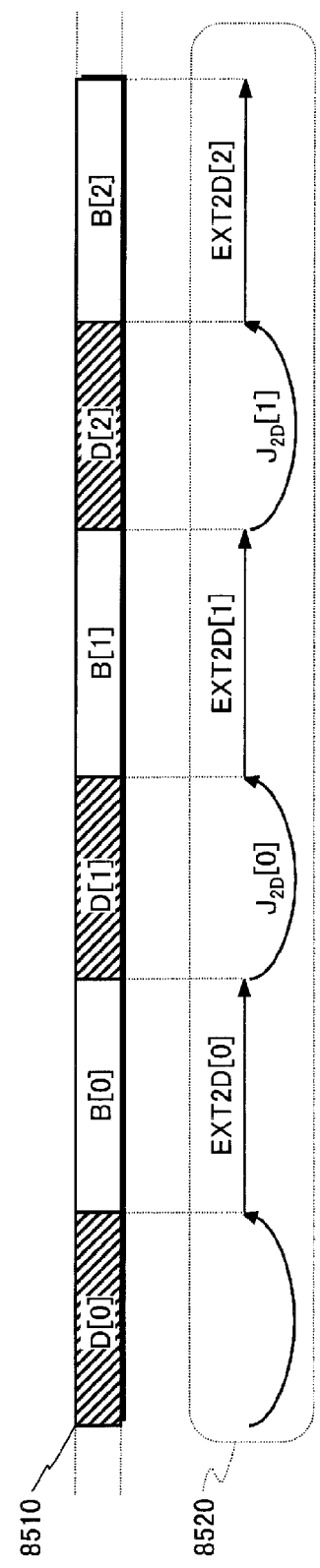
FIG.85A
FIG.85B

FIG.86

| $S_{JUMP}$ (sectors) | 0 | 1 – 10000 | 10001 – 20000 | 20001 – 40000 | 40000 – 1/10 of a stroke | 1/10 of a stroke or greater |
|---|---|---|---|---|---|---|
| $T_{JUMP\_MAX}$ (ms) | $0 = T_{JUMP0}$ | 250 | 300 | 350 | 700 | 1400 |

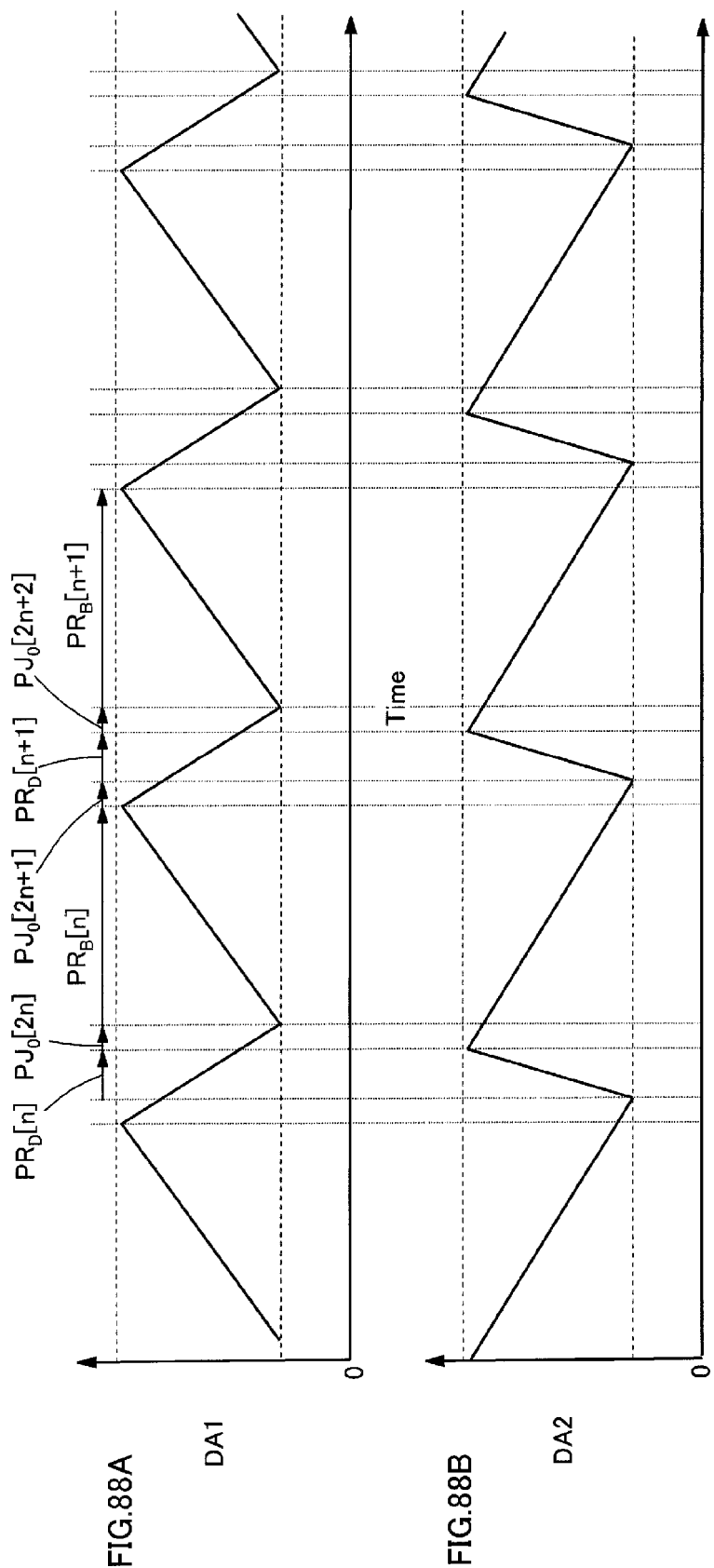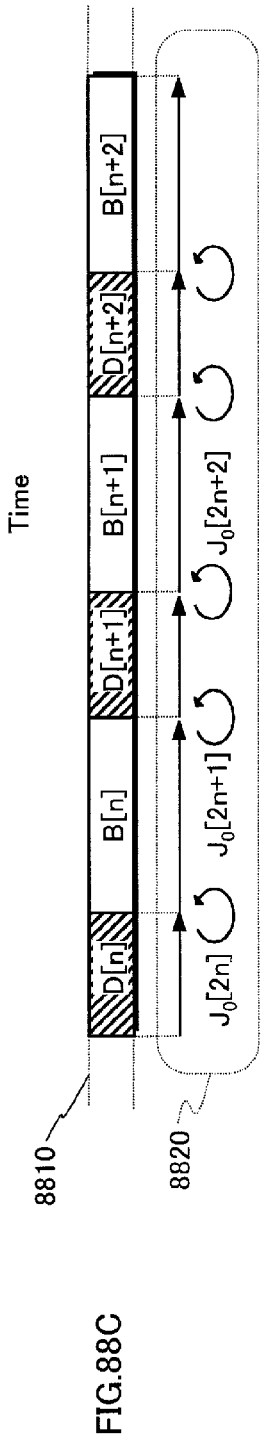
FIG.88A
FIG.88B
FIG.88C

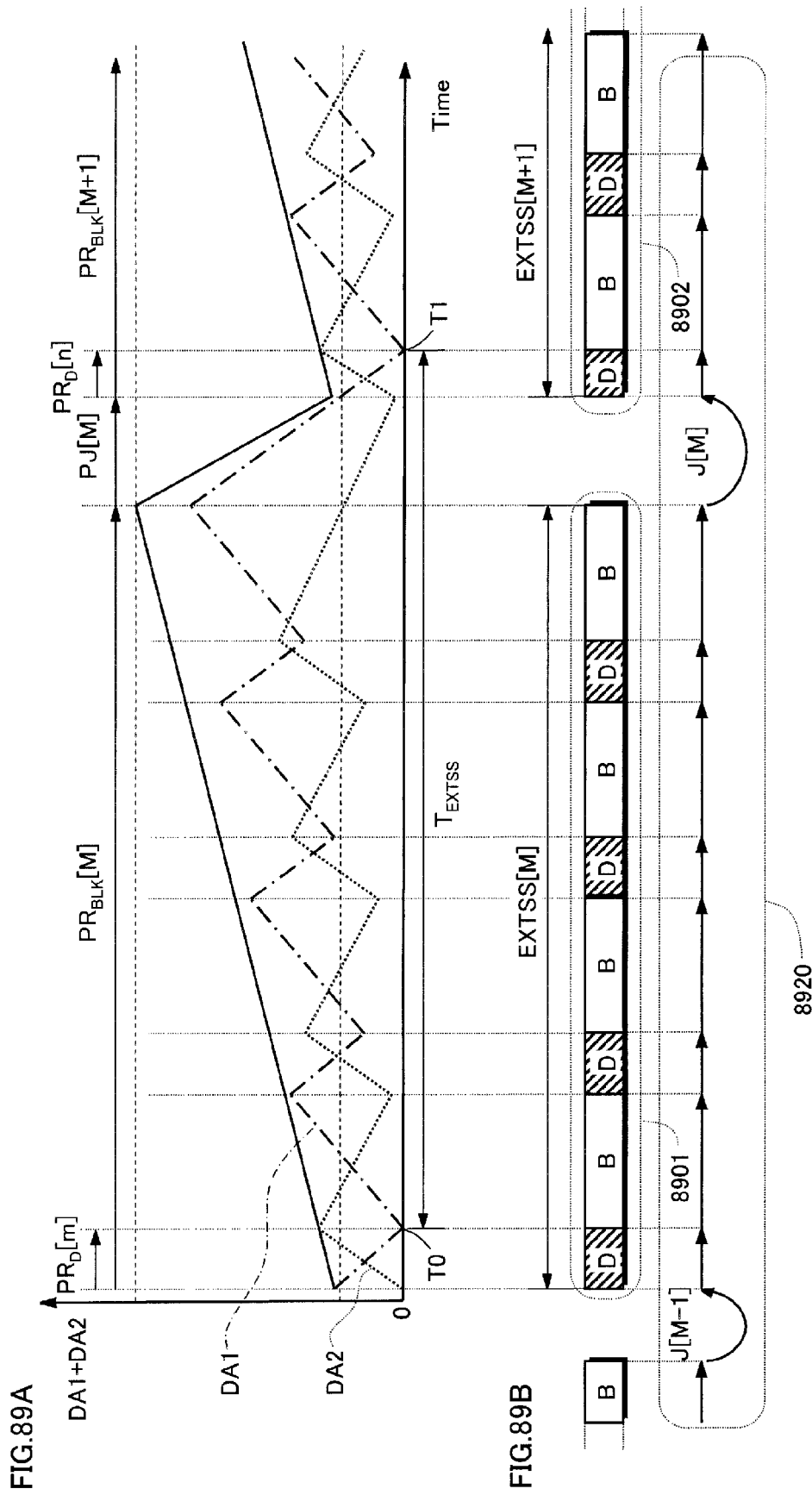

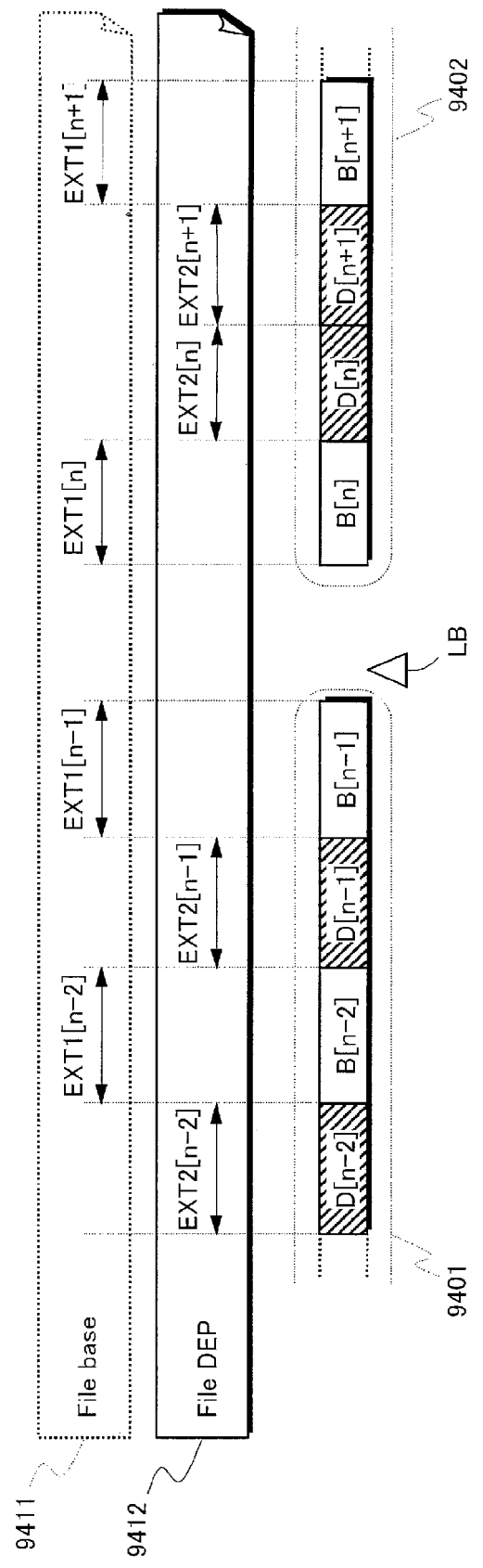

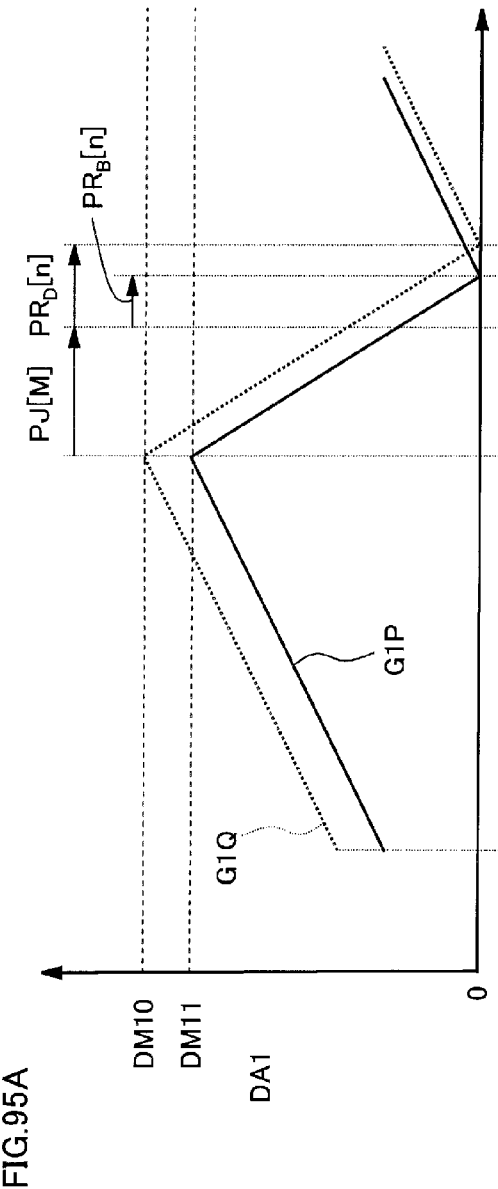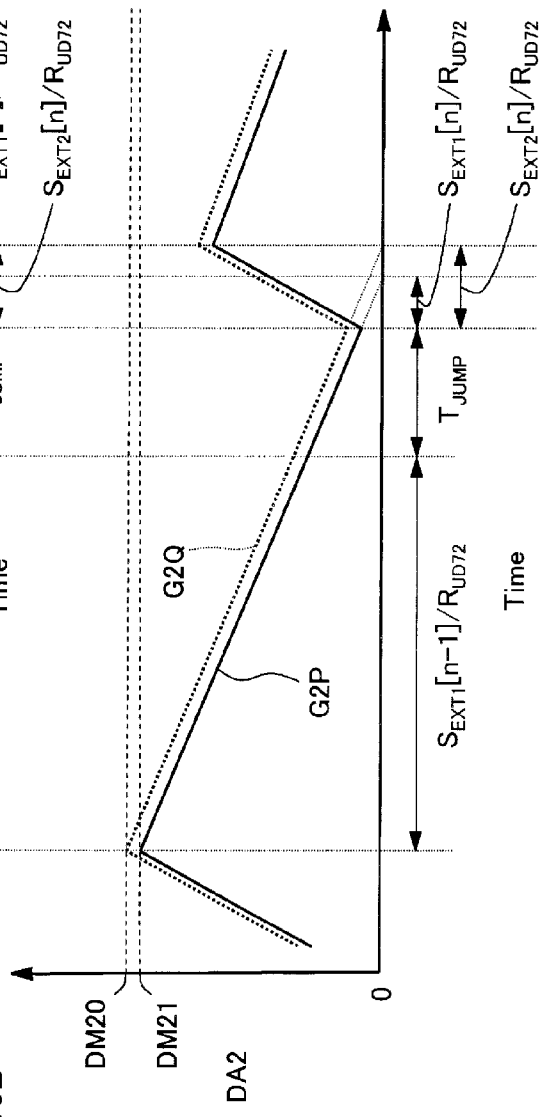
FIG.95A
FIG.95B

FIG.96A
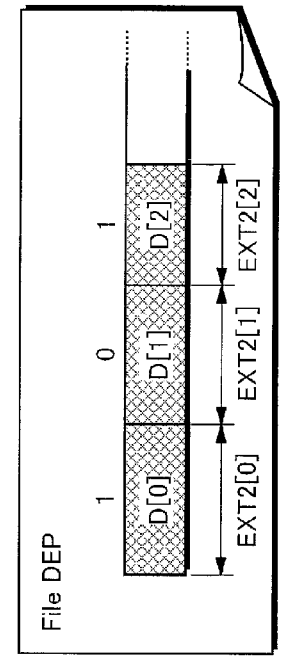
FIG.96B
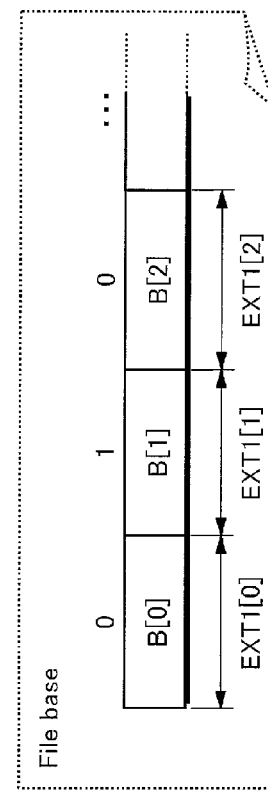
FIG.96C
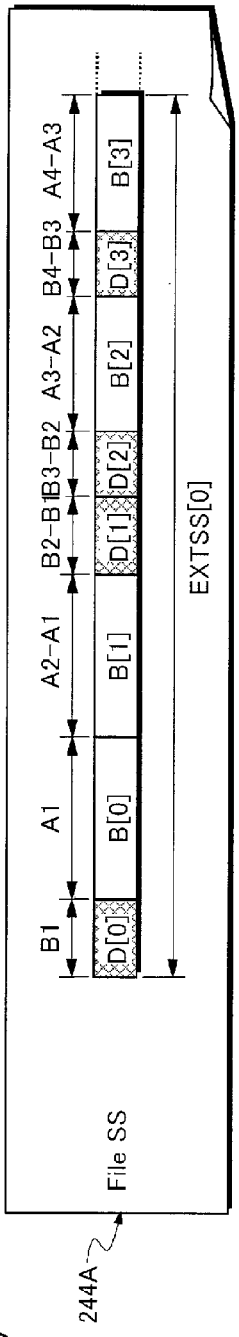
FIG.96D

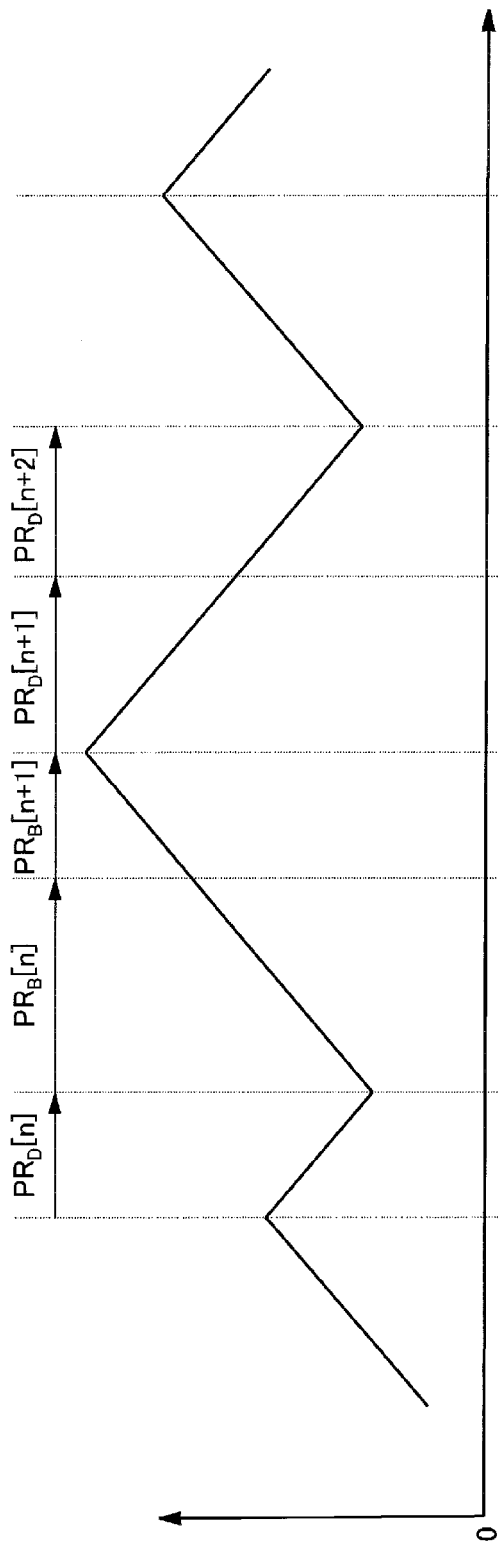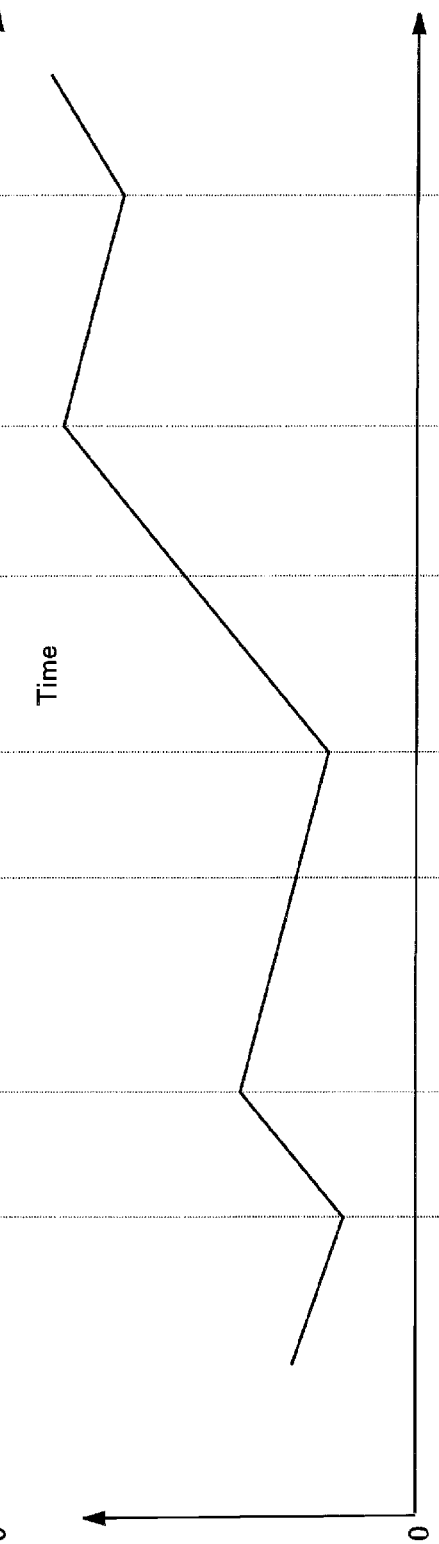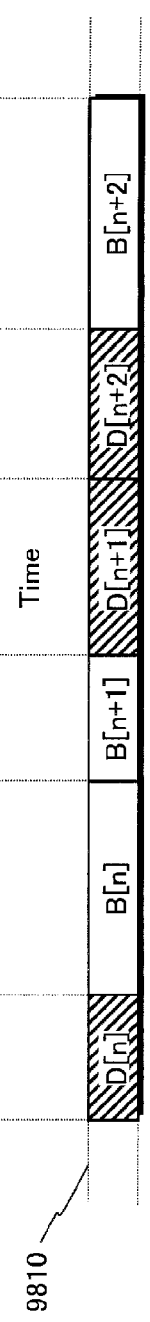

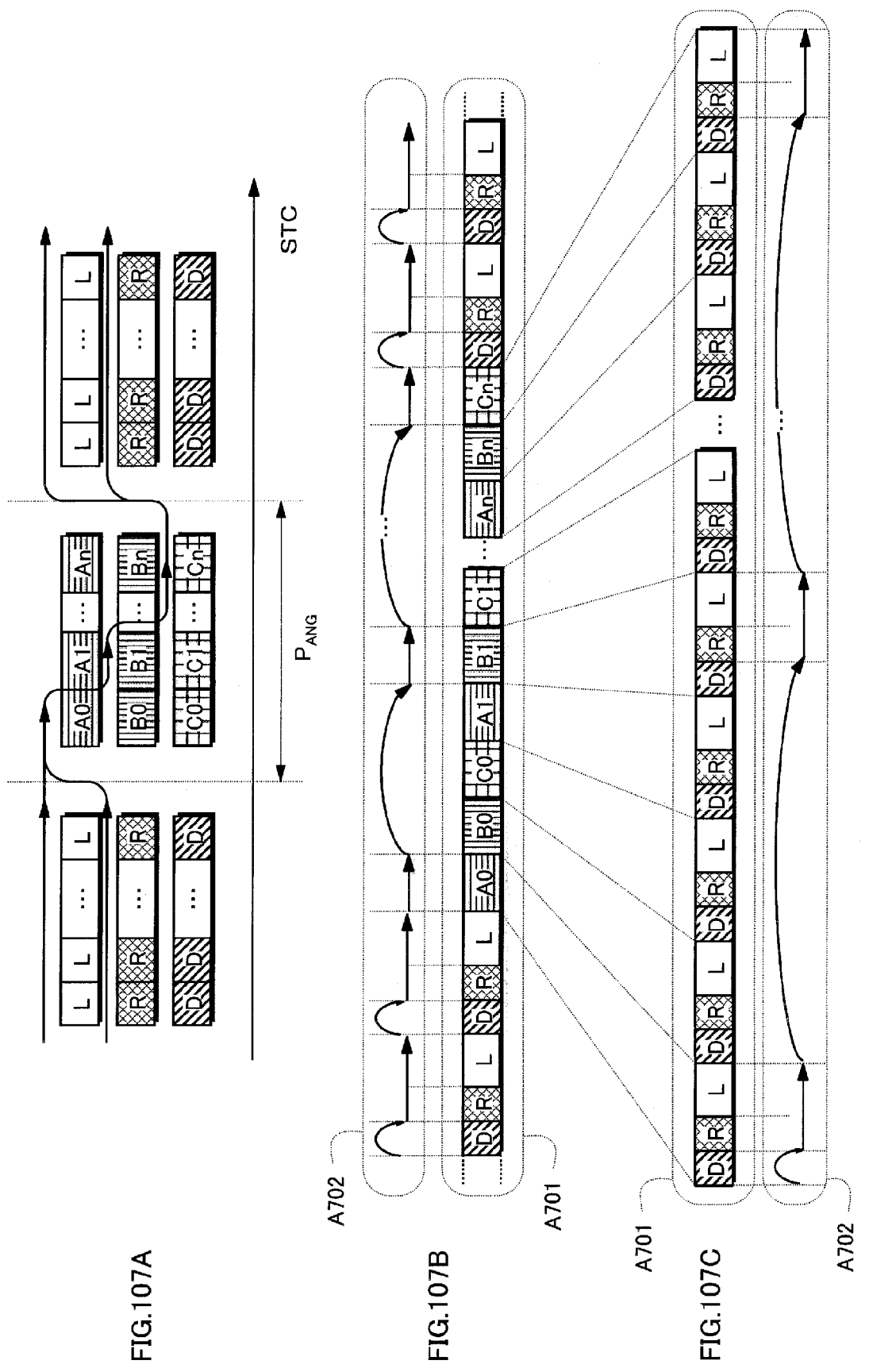

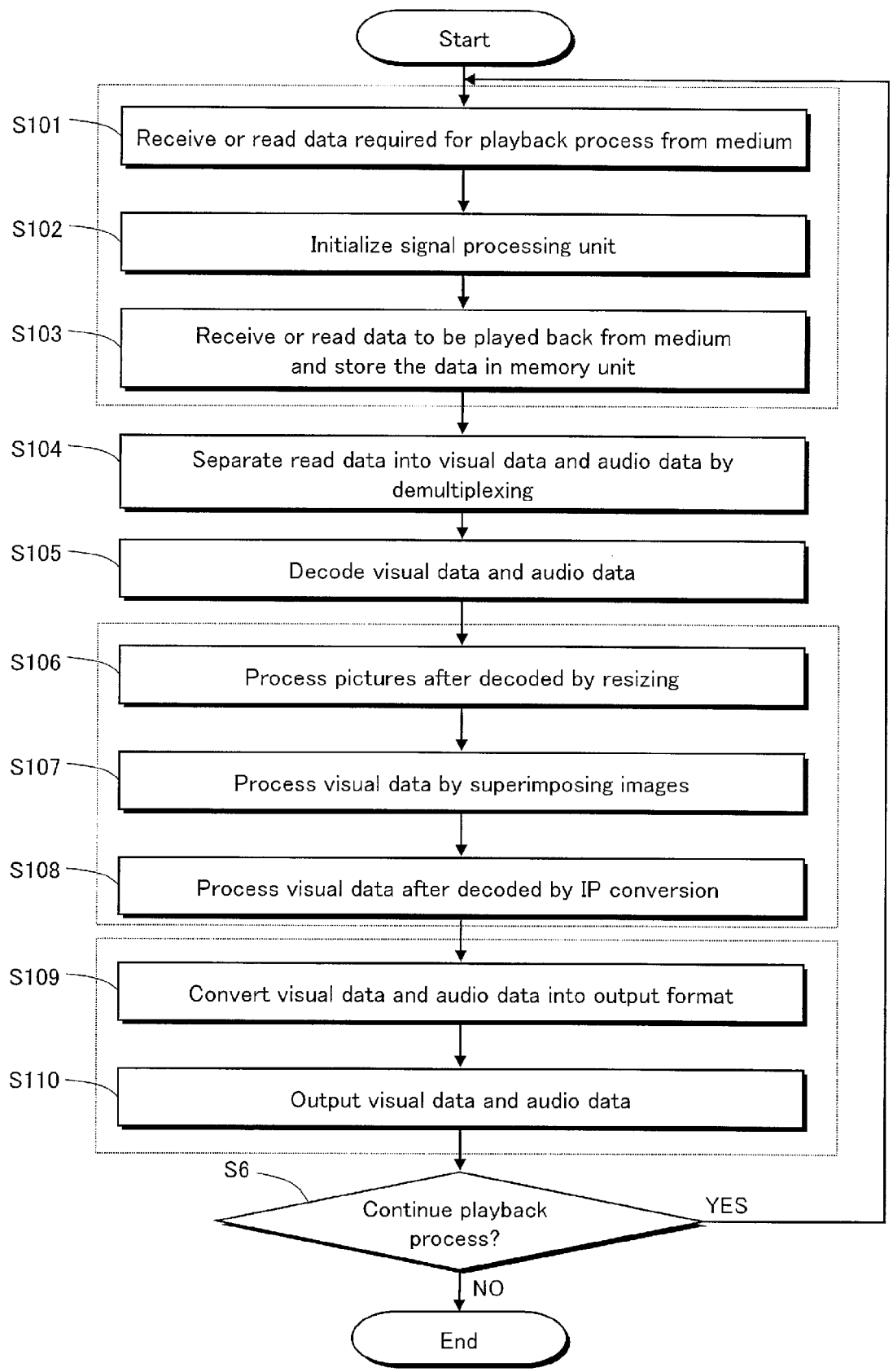

RECORDING MEDIUM, PLAYBACK DEVICE, AND INTEGRATED CIRCUIT

This application is a divisional of application Ser. No. 13/031,780, filed Feb. 22, 2011, now U.S. Pat. No. 8,150,238 which is a continuation of International Application PCT/JP2010/004439, with an international filing date of Jul. 7, 2010.

TECHNICAL FIELD

The present invention relates to a technology for stereoscopic, i.e. three-dimensional (3D), video playback and especially to the structure of stream data on a recording medium.

BACKGROUND ART

In recent years, general interest in 3D video has been increasing. For example, amusement park attractions that incorporate 3D video images are popular. Furthermore, throughout the country, the number of movie theaters showing 3D movies is increasing. Along with this increased interest in 3D video, the development of technology that enables playback of 3D video images in the home has also been progressing. There is demand for this technology to store 3D video content on a portable recording medium, such as an optical disc, while maintaining the 3D video content at high image quality. Furthermore, there is demand for the recording medium to be compatible with a two-dimensional (2D) playback device. That is, it is preferable for a 2D playback device to be able to play back 2D video images and a 3D playback device to be able to play back 3D video images from the same 3D video content recorded on the recording medium. Here, a "2D playback device" refers to a conventional playback device that can only play back monoscopic video images, i.e. 2D video images, whereas a "3D playback device" refers to a playback device that can play back 3D video images. Note that in the present description, a 3D playback device is assumed to be able to also play back conventional 2D video images.

FIG. 109 is a schematic diagram illustrating the technology for ensuring the compatibility of an optical disc storing 3D video content with 2D playback devices (see, for example, Patent Document 1). An optical disc PDS stores two types of video streams. One is a 2D/left-view video stream, and the other is a right-view video stream. A "2D/left-view video stream" represents a 2D video image to be shown to the left eye of a viewer during 3D playback, i.e. a "left view". During 2D playback, this stream constitutes the 2D video image. A "right-view video stream" represents a 2D video image to be shown to the right eye of the viewer during 3D playback, i.e. a "right view". The left and right-view video streams have the same frame rate but different presentation times shifted from each other by half a frame period. For example, when the frame rate of each video stream is 24 frames per second, the frames of the 2D/left-view video stream and the right-view video stream are alternately displayed every ⅛ seconds.

As shown in FIG. 109, the left-view and right-view video streams are divided into a plurality of extents EX1A-C and EX2A-C respectively on the optical disc PDS. Each extent contains at least one group of pictures (GOP), GOPs being read together by the optical disc drive. Hereinafter, the extents belonging to the 2D/left-view video stream are referred to as "2D/left-view extents", and the extents belonging to the right-view video stream are referred to as "right-view extents". The 2D/left-view extents EX1A-C and the right-view extents EX2A-C are alternately arranged on a track TRC of the optical disc PDS. Each two contiguous extents EX1A+EX2A, EX1B+EX2B, and EX1C+EX2C have the same length of playback time. Such an arrangement of extents is referred to as an "interleaved arrangement". A group of extents recorded in an interleaved arrangement on a recording medium is used both in 3D video playback and 2D video image playback, as described below.

From among the extents recorded on the optical disc PDS, a 2D playback device PL2 causes an optical disc drive DD2 to read only the 2D/left-view extents EX1A-C sequentially from the start, skipping the reading of right-view extents EX2A-C. Furthermore, an image decoder VDC sequentially decodes the extents read by the optical disc drive DD2 into a video frame VFL. In this way, a display device DS2 only displays left views, and viewers can watch normal 2D video images.

A 3D playback device PL3 causes an optical disc drive DD3 to alternately read 2D/left-view extents and right-view extents from the optical disc PDS. When expressed as codes, the extents are read in the order EX1A, EX2A, EX1B, EX2B, EX1C, and EX2C. Furthermore, from among the read extents, those belonging to the 2D/left-view video stream are supplied to a left-video decoder VDL, whereas those belonging to the right-view video stream are supplied to a right-video decoder VDR. The video decoders VDL and VDR alternately decode each video stream into video frames VFL and VFR, respectively. As a result, left views and right views are alternately displayed on a display device DS3. In synchronization with the switching of the views by the display device DS3, shutter glasses SHG cause the left and right lenses to become opaque alternately. Therefore, a viewer wearing the shutter glasses SHG sees the views displayed by the display device DS3 as 3D video images.

When 3D video content is stored on any recording medium, not only on an optical disc, the above-described interleaved arrangement of extents is used. The recording medium can thus be used both for playback of 2D video images and 3D video images.

CITATION LIST

Patent Literature

[Patent Literature 1]
Japanese Patent Publication No. 3935507

SUMMARY OF INVENTION

Technical Problem

General video content includes, in addition to a video stream, one or more graphics streams representing graphics images such as subtitles and interactive screens. When video images are played back from 3D video content, the graphics images are also reproduced in three dimensions. Techniques of reproducing them in three dimensions include 2 plane mode and 1 plane+offset mode. 3D video content in 2 plane mode includes a pair of graphics streams separately representing left-view graphics images and right-view ones. A playback device in 2 plane mode generates a separate left-view and right-view graphics plane from the graphics streams. 3D video content in 1 plane+offset mode includes a graphics stream representing 2D graphics images, and offset information provided for the graphics stream. A playback device in 1 plane+offset mode first generates a single graphics plane from the graphics stream, and then provides a horizontal offset in the graphics plane in accordance with the offset information. A pair of left-view and right-view graphics planes is thus generated from the graphics stream. In either mode, left-view and right-view graphics images are alternately displayed on the screen of the display device. As a result, viewers perceive the graphics images as 3D images.

If the graphics stream and the offset information are contained in separate files of 3D video content, the playback device in 1 plane+offset mode processes these files separately into corresponding data pieces, and use the data pieces to generate a pair of left-view and right-view graphics images. Note that the graphics images and offset information are generally changed in frame periods. However, reading and analyzing the file storing the offset information each time a frame is displayed has a risk that "the process is not completed in time and the images cannot be displayed correctly". Accordingly, in order for the process to be synchronized with the frame period without fail, it is necessary to expand the offset information in the memory in advance. In that case, the capacity of the built-in memory in which the file storing the offset information is to be expanded should necessarily be large because the total amount of the offset information per graphics stream is large. Also, when a plurality of graphics images are included in one scene, the built-in memory is required to have even larger capacity. In this way, incorporating the graphics stream and the offset information as separate files into 3D video content prevents a further reduction in capacity of the built-in memory.

In order to solve the above-described problem, the offset information is contained in the video stream at intervals of GOPs, for example. This allows a decoder in a playback device to extract the offset information from the video stream while decoding the video stream. As a result, the playback device can surely maintain the correspondence between the graphics stream and the offset information. In addition, the built-in memory only needs to have a capacity sufficient to expand the offset information per GOP therein, for example. This can easily achieve both the support of 3D video contents with various graphics streams and the further reduction in capacity of the built-in memory.

Here, various means are conceivable as specific means used by the decoder in a playback device to implement the function to extract offset information from video streams, such as a means for incorporating the function into the hardware dedicated to decoding of video streams, and a means for realizing the function by another hardware or software. However, it is not preferable to vary the data structures of video streams and offset information among those means.

An object of the present invention is to solve the above problems, particularly to provide a recording medium in which a video stream and offset information are integrally recorded in a data structure usable in common in various modes of implementing the function, which is to extract the offset information from the video stream, into a playback device.

Solution to Problem

On a recording medium according to the present invention, a main-view video stream, a sub-view video stream, and a graphics stream are recorded. The main-view video stream includes main-view pictures constituting main views of stereoscopic video images. The sub-view video stream includes sub-view pictures and metadata, the sub-view pictures constituting sub-views of stereoscopic video images. The graphics stream includes graphics data constituting monoscopic graphics images. The main-view pictures are each rendered on a main-view video plane, when being played back. The sub-view pictures are each rendered on a sub-view video plane, when being played back. The graphics data is rendered on a graphics plane, when being played back. The metadata is provided in each group of pictures (GOP) constituting the sub-view video stream and includes offset information. The offset information is control information specifying offset control for a plurality of pictures constituting a GOP. The offset control is a process to provide a left offset and a right offset for horizontal coordinates in the graphics plane to generate a pair of graphics planes, and then combine the pair of graphics planes separately with the main-view video plane and the sub-view video plane. The sub-view video stream is multiplexed in a transport stream (TS). TS packets constituting the TS each have a header including a TS priority flag that indicates a priority of the TS packet. TS packets containing the metadata have a different value of TS priority flag from TS packets containing the sub-view pictures.

Advantageous Effects of Invention

The recording medium according to the present invention enables the decoding unit of a playback device to separate TS packets containing the metadata and TS packets containing the sub-view pictures in accordance with the values of the TS priority flags. Accordingly, the decoding unit can be equipped with separate function units; one for extracting the offset information from TS packets containing the metadata, and the other for decoding TS packets containing the sub-view pictures into uncompressed pictures. In this case, specific configurations of these function units can be designed independently of each other. On the other hand, the decoding unit in which the function units are integrated enables the integrated function unit to process all the TS packets containing the sub-view video stream, independently of the values of the TS priority flags. In this way, the recording medium according to the present invention enables a video stream and offset information to be integrally recorded therein in a data structure usable in common in various modes of implementing the function, which is to extract the offset information from the video stream, into a playback device.

BRIEF DESCRIPTION OF DRAWINGS

FIGS. 3A and 3B are lists of elementary streams multiplexed in a main TS and a sub-TS on the BD-ROM disc, respectively.

FIG. 4 is a schematic diagram showing the arrangement of TS packets in the multiplexed stream data 400.

FIG. 5A is a schematic diagram showing a data structure of a TS header 501H; FIG. 5B is a schematic diagram showing the format of a sequence of TS packets 501 constituting multiplexed stream data; FIG. 5C is a schematic diagram showing the formation of a sequence of source packets 502 composed of the TS packet sequence for multiplexed stream data; and FIG. 5D is a schematic diagram of a sector group, in which a sequence of source packets 502 are consecutively recorded, in the volume area of the BD-ROM disc.

FIG. 12 is a table showing syntax of this offset metadata 1110 shown in FIG. 11.

FIGS. 13A and 13B are schematic diagrams showing offset controls for a PG plane 1310 and IG plane 1320 respectively; and FIG. 13C is a schematic diagram showing 3D graphics images that a viewer 1330 is made to perceive from 2D graphics images represented by graphics planes shown in FIGS. 13A and 13B.

FIG. 17A is a schematic diagram showing a data structure of decoding switch information 1750; and FIGS. 17B and 17C are schematic diagrams showing sequences of decoding counters 1710, 1720, 1730, and 1740 allocated to each picture in a base-view video stream 1701 and a dependent-view video stream 1702.

FIG. 23A is a schematic diagram showing a data structure of an entry map 2230; FIG. 23B is a schematic diagram showing source packets in a source packet group 2310 belonging to a file 2D 241 that are associated with each EP_ID 2305 by the entry map 2230; and FIG. 23C is a schematic diagram showing a data block group D[n], B[n] (n=0, 1, 2, 3, ...) on a BD-ROM disc 101 corresponding to the source packet group 2310.

FIG. 30 is a schematic diagram showing a correspondence between PTSs indicated by a 2D playlist file (00001.mpls) 221 and sections played back from a file 2D (01000.m2ts) 241.

FIG. 38 is a list of system parameters (SPRMs) stored in the player variable storage unit 3736 shown in FIG. 37.

FIG. 41A is a flowchart of processing whereby the PG decoder 4072 shown in FIG. 40 decodes a graphics object from one data entry in the PG stream; and FIGS. 41B-41E are schematic diagrams showing the graphics object changing as the processing proceeds.

FIG. 42 is a functional block diagram of a 3D playback device 4200.

FIG. 43 is a table showing a data structure of SPRM(27) and SPRM(28) stored in the player variable storage unit 4236 shown in FIG. 42.

FIG. 62A is a schematic diagram showing an example of graphics images represented by a graphics plane GPL; FIGS. 62B and 62C are schematic diagrams respectively showing processes of providing a right and left offset to the graphics plane GPL; and FIGS. 62D and 62E are schematic diagrams showing graphics images represented by the graphics planes GP1 and GP2 with the right and left offsets, respectively.

FIG. 63 is a schematic diagram showing a condition regarding the arrangement of graphic elements for graphics planes played back from a PG stream or an IG stream on a BD-ROM disc and for a graphics plane generated by a playback device 102.

FIGS. 64A1 and 64A2 are schematic diagrams showing the same screen in the letterbox display; FIGS. 64B and 64C are schematic diagrams showing the screens in which the primary video plane has been provided with upward and downward offsets of 131 pixels, respectively; and FIG. 64D is a schematic diagram showing the screen in which the primary video plane has been provided with an upward offset of 51 pixels.

FIG. 65 is a functional block diagram showing the structure of the playback device required for the video shift.

FIG. 66A is a table showing the data structures of the SPRM(32) and SPRM(33); and FIG. 66B is a schematic diagram showing the STN table in the playlist file for the video content of the letterbox display.

FIGS. 67A-67C are schematic diagrams showing primary video planes VPA, VPB, and VPC processed by the video shift unit 6501 in the Up mode, Keep mode, and Down mode, respectively; FIGS. 67D-67F are schematic diagrams showing PG planes PGD, PGE, and PGF processed by the second cropping unit 4632 in the Up mode, Keep mode, and Down mode, respectively; and FIGS. 67G-67I are schematic diagrams showing plane data PLG, PLH, and PLI combined by the second adder 4642 in the Up mode, Keep mode, and Down mode, respectively.

FIG. 70A is a schematic diagram showing the data structure of the SPRM(37) in the player variable storage unit 4236; FIG. 70B is a schematic diagram showing the video image IMG and subtitle SUB displayed on the screen SCR in the case where the background color of the subtitle represented by the PG stream is set to the colorless transparent; and FIG. 70C is a schematic diagram showing the video image IMG and subtitle SUB displayed on the screen SCR in the case where a color coordinate value of the background color of the subtitle is stored in the SPRM(37).

FIG. 72A is a schematic diagram showing the subtitles SB1 and SB2 that correspond to the Keep mode; FIG. 72B is a schematic diagram showing the subtitles SB1 and SB2 that correspond to the Down mode; FIG. 72C is a schematic diagram showing the subtitle SB1 displayed in the Keep mode; and FIG. 72D is a schematic diagram showing the subtitle SB3 displayed in the Up mode when the video upward subtitle 7110 is not registered in the STN table.

FIGS. 73A and 73B are lists of elementary streams multiplexed in a first sub-TS and a second sub-TS on a BD-ROM disc, respectively.

FIGS. 79A and 79B are schematic diagrams respectively showing a picture in a left view and a right view used to display one scene of 3D video images; and FIG. 79C is a schematic diagram showing depth information calculated from these pictures by the video encoder 7802.

FIG. 85A is a graph showing the change in the data amount DA stored in the read buffer 3721 during operation of the playback processing shown in FIG. 84 in 2D playback mode; and FIG. 85B is a schematic diagram showing the correspondence between an extent block 8510 for playback and a playback path 8520 in 2D playback mode.

FIG. 86 is an example of a correspondence table between jump distances $S_{JUMP}$ and maximum jump times $T_{JUMP\_MAX}$ for a BD-ROM disc.

FIGS. 88A and 88B are graphs showing changes in data amounts DA1 and DA2 stored in RB1 4221 and RB2 4222 shown in FIG. 87 when 3D video images are played back seamlessly from a single extent block; and FIG. 88C is a schematic diagram showing a correspondence between the extent block 8810 and a playback path 8820 in 3D playback mode.

FIG. 89B is a schematic diagram showing an $(M+1)^{th}$ (the letter M represents an integer greater than or equal to 1) extent block 8901 and $(M+2)^{th}$ extent block 8902 and the correspondence between these extent blocks 8901 and 8902 and a playback path 8920 in 3D playback mode; and FIG. 89A is a graph group showing changes in data amounts DA1 and DA2 stored in RB1 4221 and RB2 4222, as well as the changes in the sum DA1+DA2, when 3D video images are continually played back seamlessly from two extent blocks 8901 and 8902.

FIG. 94A is a table showing the maximum extent sizes $maxS_{EXT1}[n]$ and $maxS_{EXT2}[n]$ for an extent pair at various combinations of the base-view transfer rate $R_{EXT1}[n]$ and the dependent-view transfer rate $R_{EXT2}[n]$; FIG. 94B is a schematic diagram showing that an extent pair EXT1[$n$], EXT2[$n$] is located at the top of an extent block 9401 arranged after a layer boundary LB, and the base-view data block B[n] of the extent pair is arranged before the dependent-view data block D[n] thereof.

FIGS. 95A and 95B are graphs showing changes in amounts DA1, DA2 of data stored in RB1 and RB2, respectively, when 3D video images are played back seamlessly from the two extent blocks 9401 and 9402 shown in FIG. 94B.

FIG. 96A is a schematic diagram showing the syntax of the extent start point in the case where the order of data blocks is reversed in the extent pair located in the middle of the extent block; FIG. 96B is a schematic diagram showing the relationships between the base-view extent EXT1[$k$] (k=0, 1, 2, ...) belonging to the file base and the extent start flag indicated by the extent start point; FIG. 96C is a schematic diagram showing the relationships between the dependent-view extent EXT2[$k$] belonging to the file DEP and the extent start flag; and FIG. 96D is a schematic diagram showing the relationships between the extent SS EXTSS[0] belonging to the file SS and the extent blocks on the BD-ROM disc.

FIG. 98C is a schematic diagram showing an extent block 9810 which includes in the middle thereof an extent pair in which the order of data blocks is reversed; and FIGS. 98A and 98B are graphs showing changes in amounts DA1, DA2 of data stored in RB1 4221 and RB2 4222, respectively, when 3D video images are played back seamlessly from the extent block 9801 shown in FIG. 98C.

Figure 99:
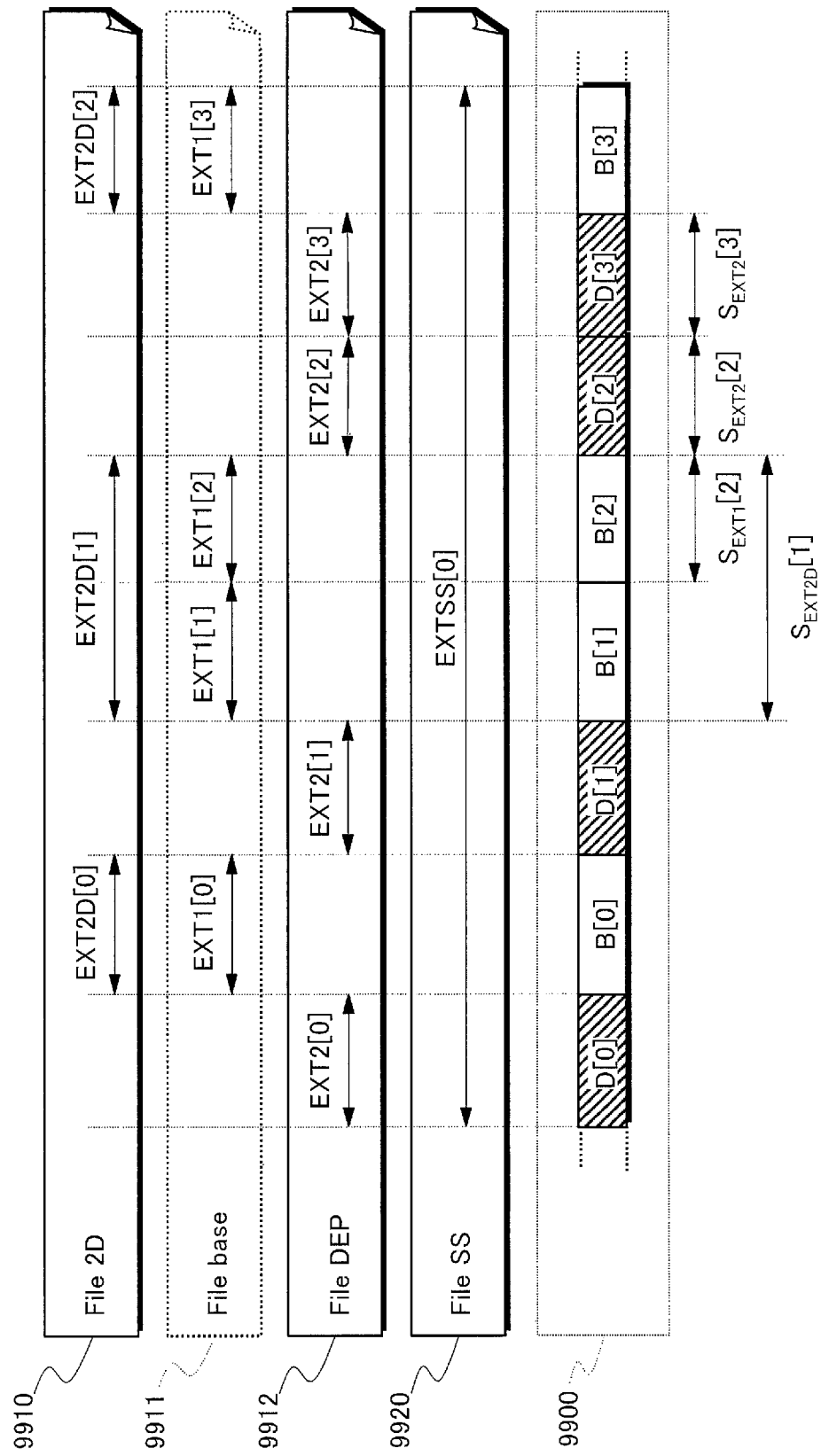

FIG. 99 is a schematic diagram showing a relationship between an extent block 9900 and AV stream files 9910-9920, the extent block 9900 including an extent pair in the middle thereof, the extent pair having data blocks in reverse order.

Figure 100:
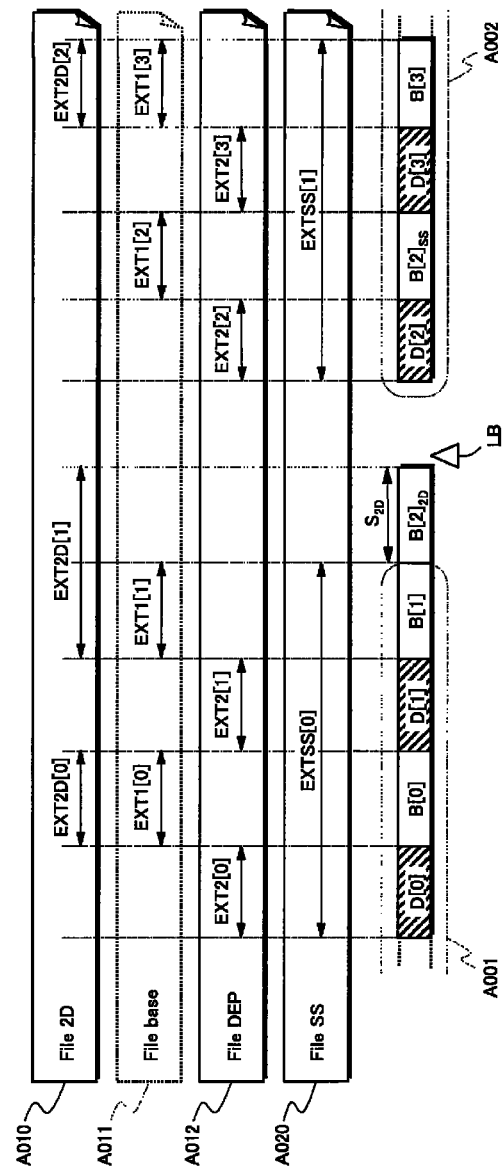

FIG. 100 is a schematic diagram showing arrangement 1 of a data block group recorded before and after a layer boundary LB on a BD-ROM disc.

Figure 101:
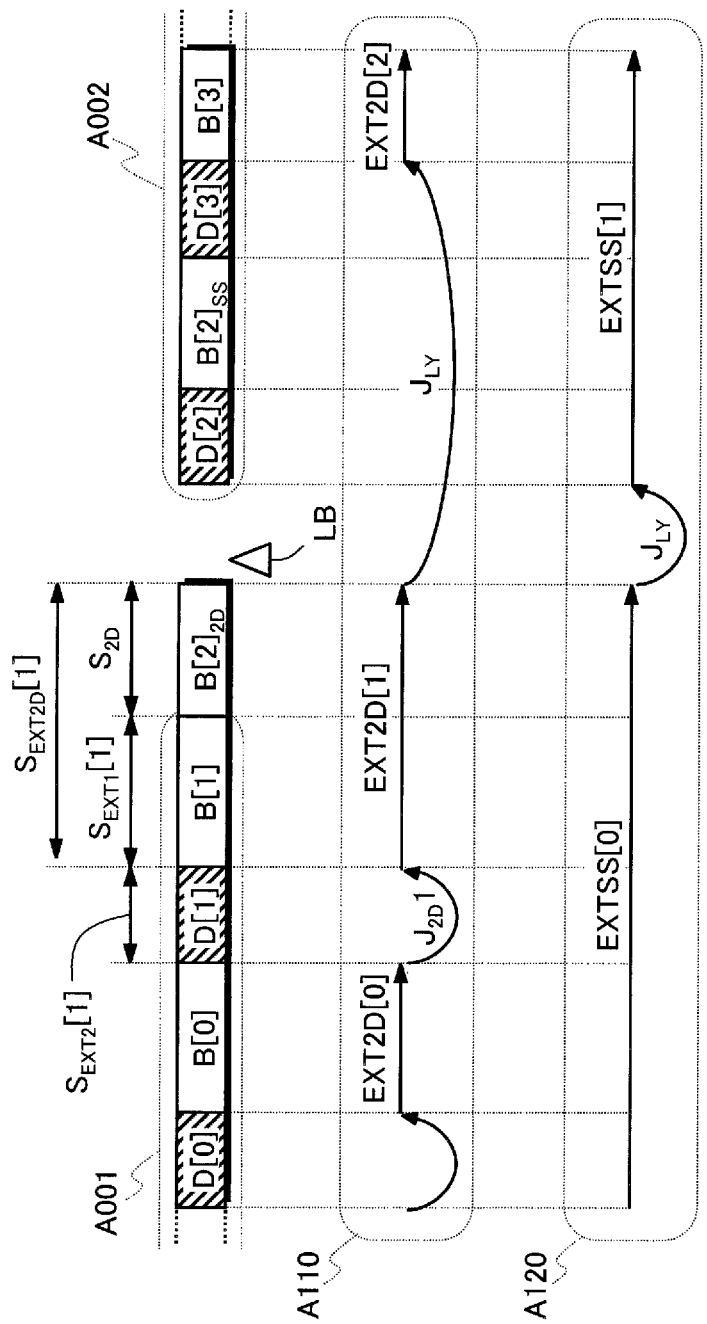

FIG. 101 is a schematic diagram showing a playback path A110 in 2D playback mode and a playback path A120 in 3D playback mode for the data block group in arrangement 1 shown in FIG. 100.

Figure 102:
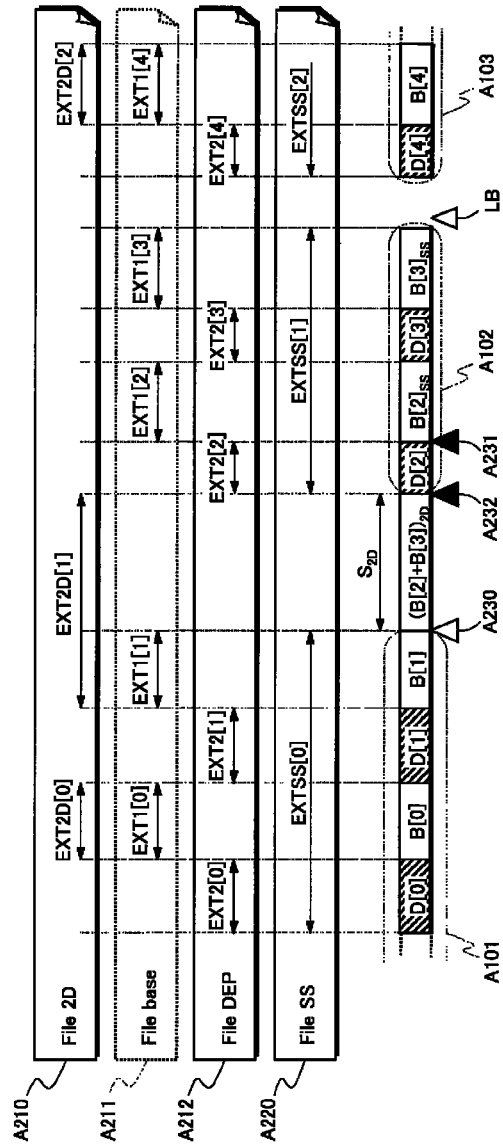

FIG. 102 is a schematic diagram showing arrangement 2 of a data block group recorded before and after a layer boundary LB on a BD-ROM disc.

Figure 103:
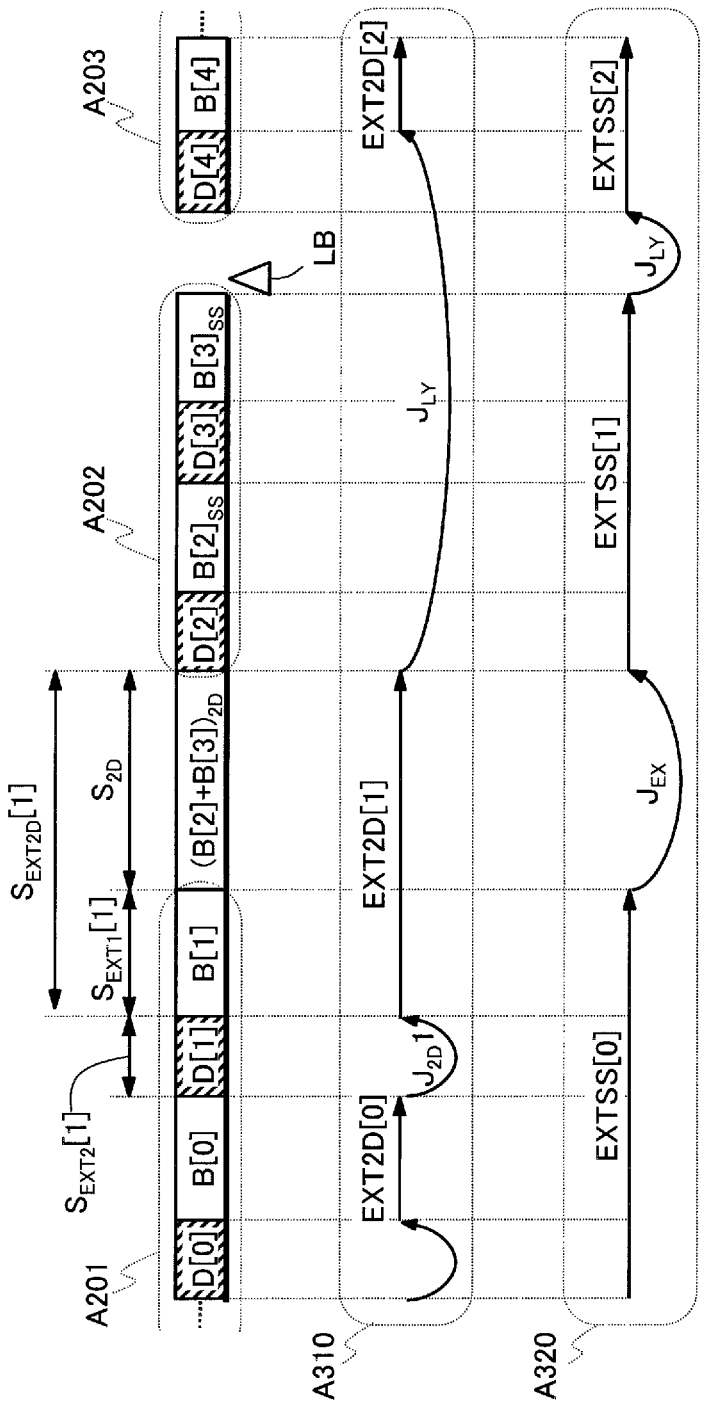

FIG. 103 is a schematic diagram showing a playback path A310 in 2D playback mode and a playback path A320 in 3D playback mode for the data block group in arrangement 2 shown in FIG. 102.

Figure 104:
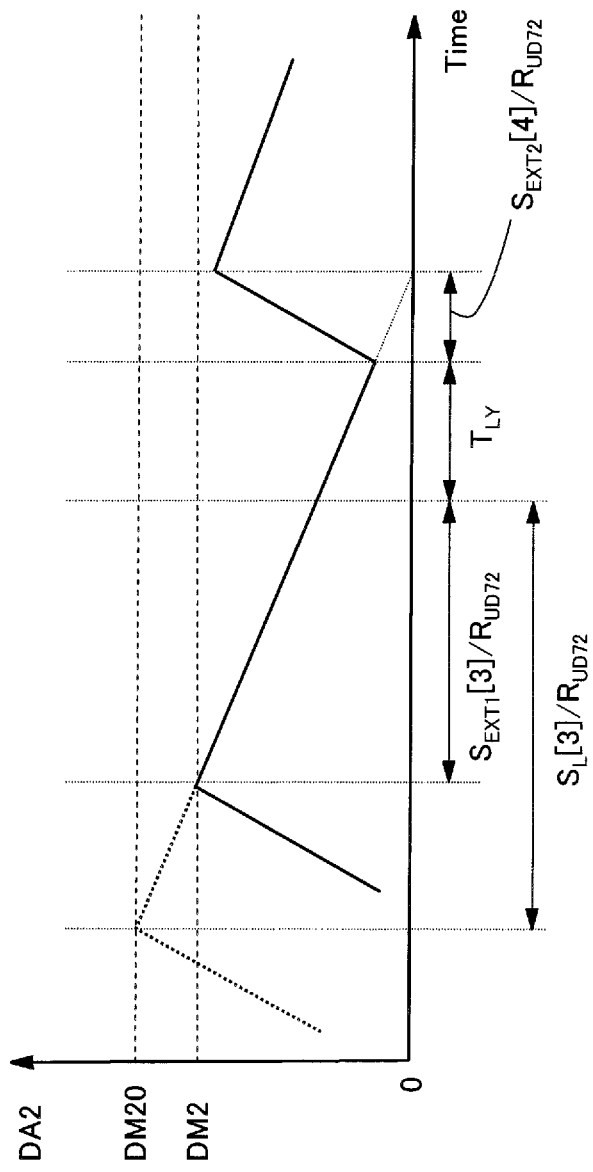

FIG. 104 is a schematic diagram showing the relationships between the read time $S_{EXT1}[3]/R_{UD72}$ of the block exclusively for 3D playback $B[3]_{SS}$ located at the end of the second extent block A202 and the lower limit of the capacity of RB2 4222.

Figure 105:
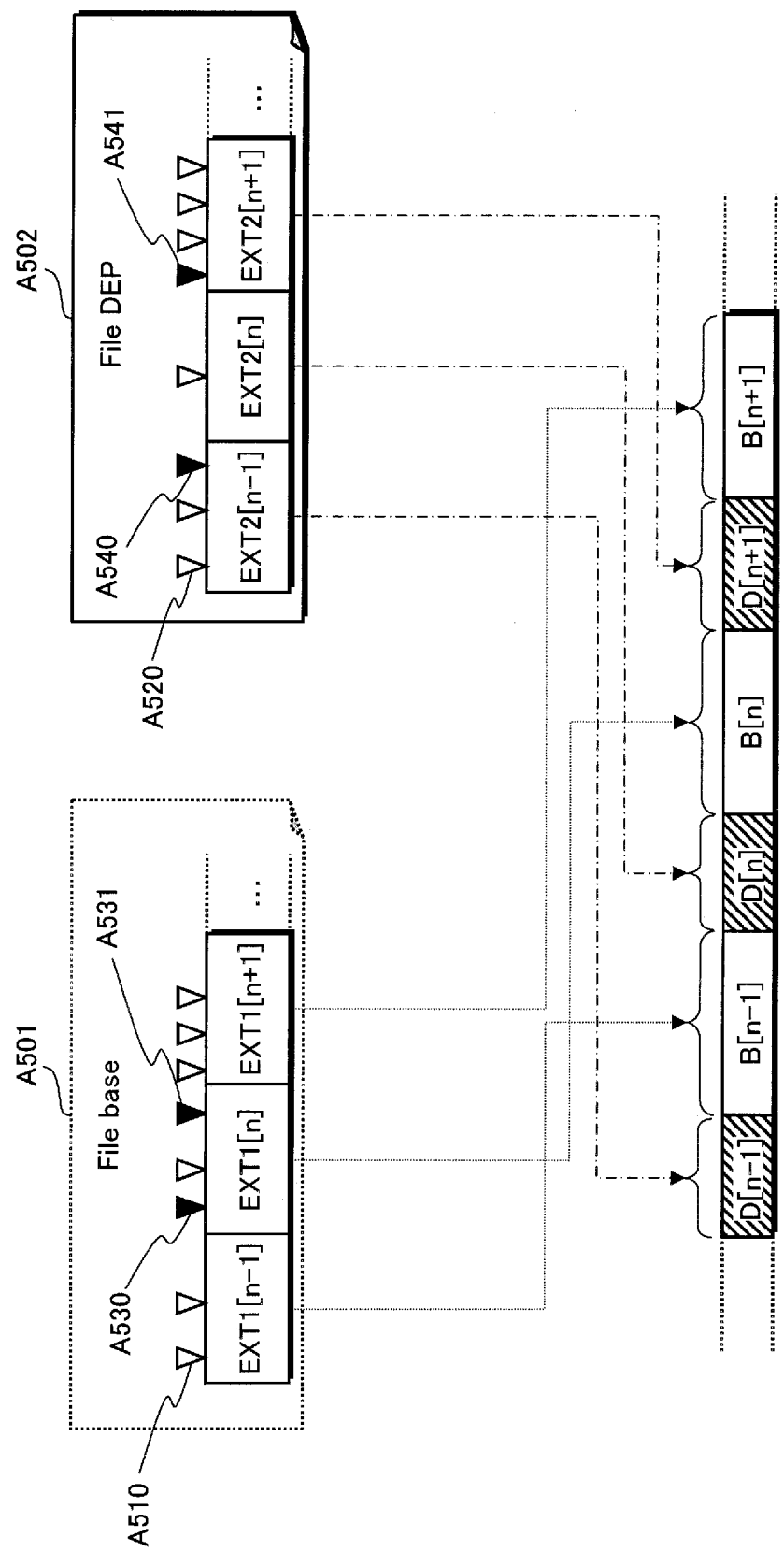

FIG. 105 is a schematic diagram showing entry points A510 and A520 set for extents EXT1[$k$] and EXT2[$k$] (the letter k represents an integer greater than or equal to 0) in a file base A501 and a file DEP A502.

Figure 106A:
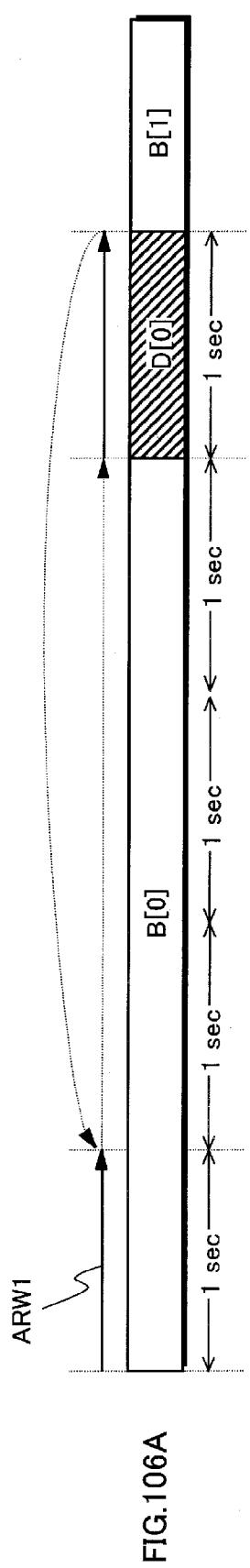
Figure 106B:
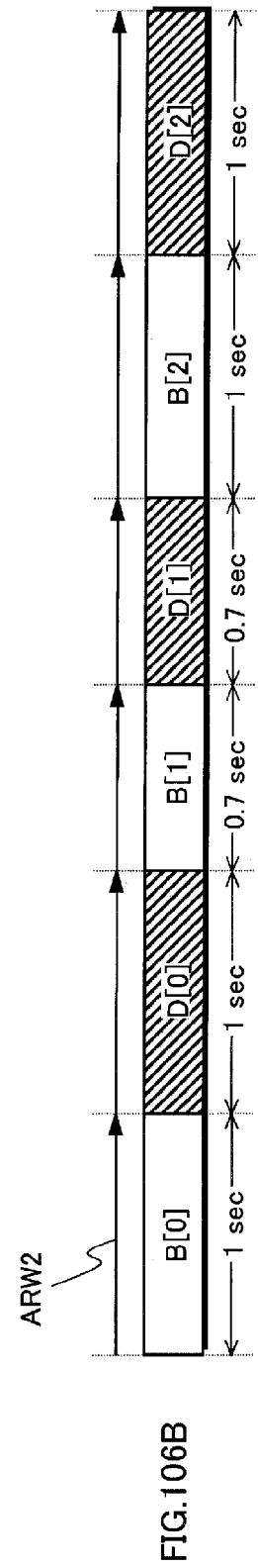

FIG. 106A is a schematic diagram showing a playback path when extent ATC times and playback times of the video stream differ between contiguous base-view data blocks and dependent-view data blocks; and FIG. 106B is a schematic diagram showing a playback path when the playback times of the video stream are equal for contiguous base-view and dependent-view data blocks.

FIG. 107A is a schematic diagram showing a playback path for multiplexed stream data supporting multi-angle; FIG. 107B is a schematic diagram showing a data block group A701 recorded on a BD-ROM disc and a corresponding playback path A702 in L/R mode; and FIG. 107C is a schematic diagram showing an extent block formed by stream data Ak, Bk, and Ck for different angles.

Figure 108:
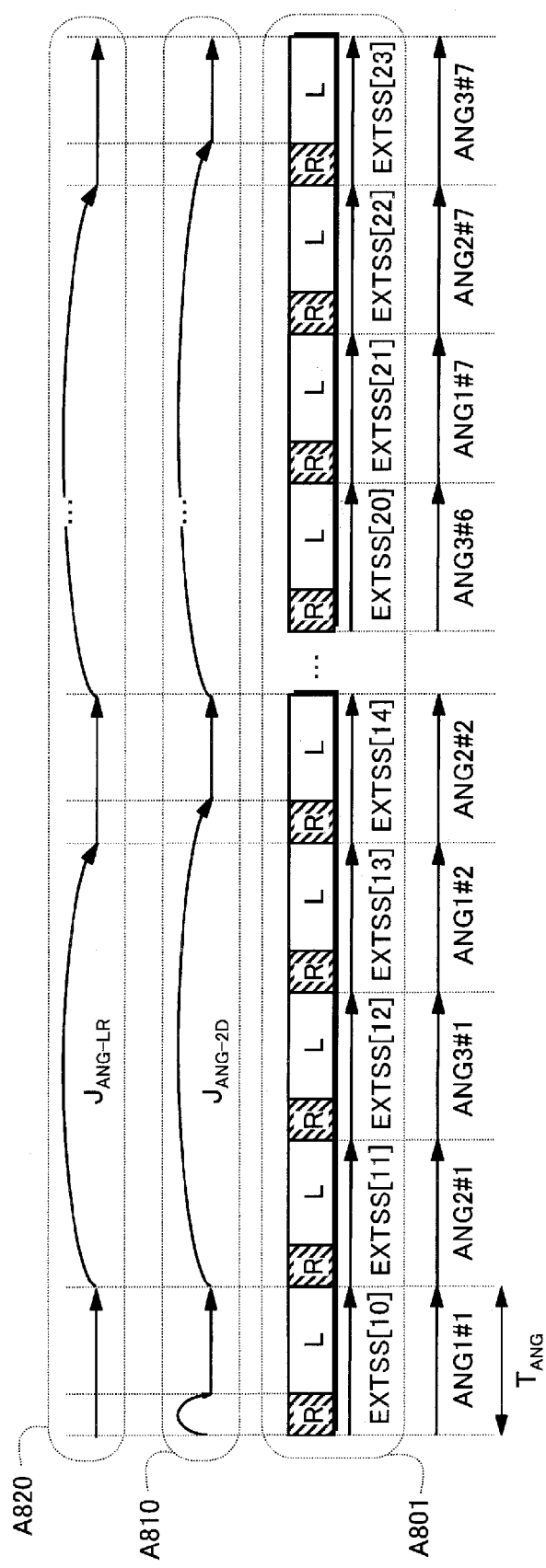

FIG. 108 is a schematic diagram showing (i) a data block group A801 constituting a multi-angle period and (ii) a playback path A810 in 2D playback mode and playback path A820 in L/R mode that correspond to the data block group A801.

Figure 109:
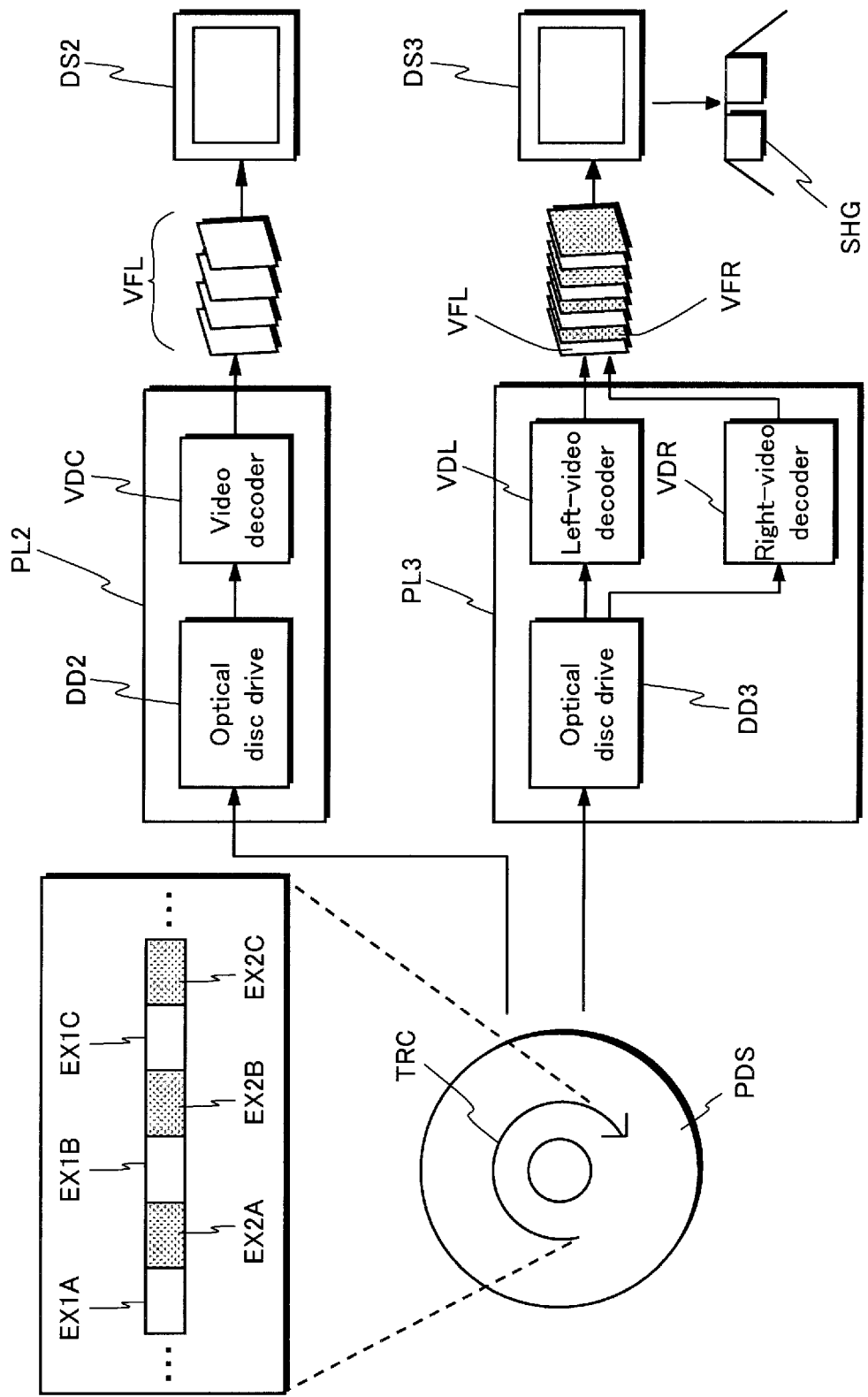

FIG. 109 is a schematic diagram illustrating the technology for ensuring the compatibility of an optical disc storing 3D video content with 2D playback devices.

Figure 110:
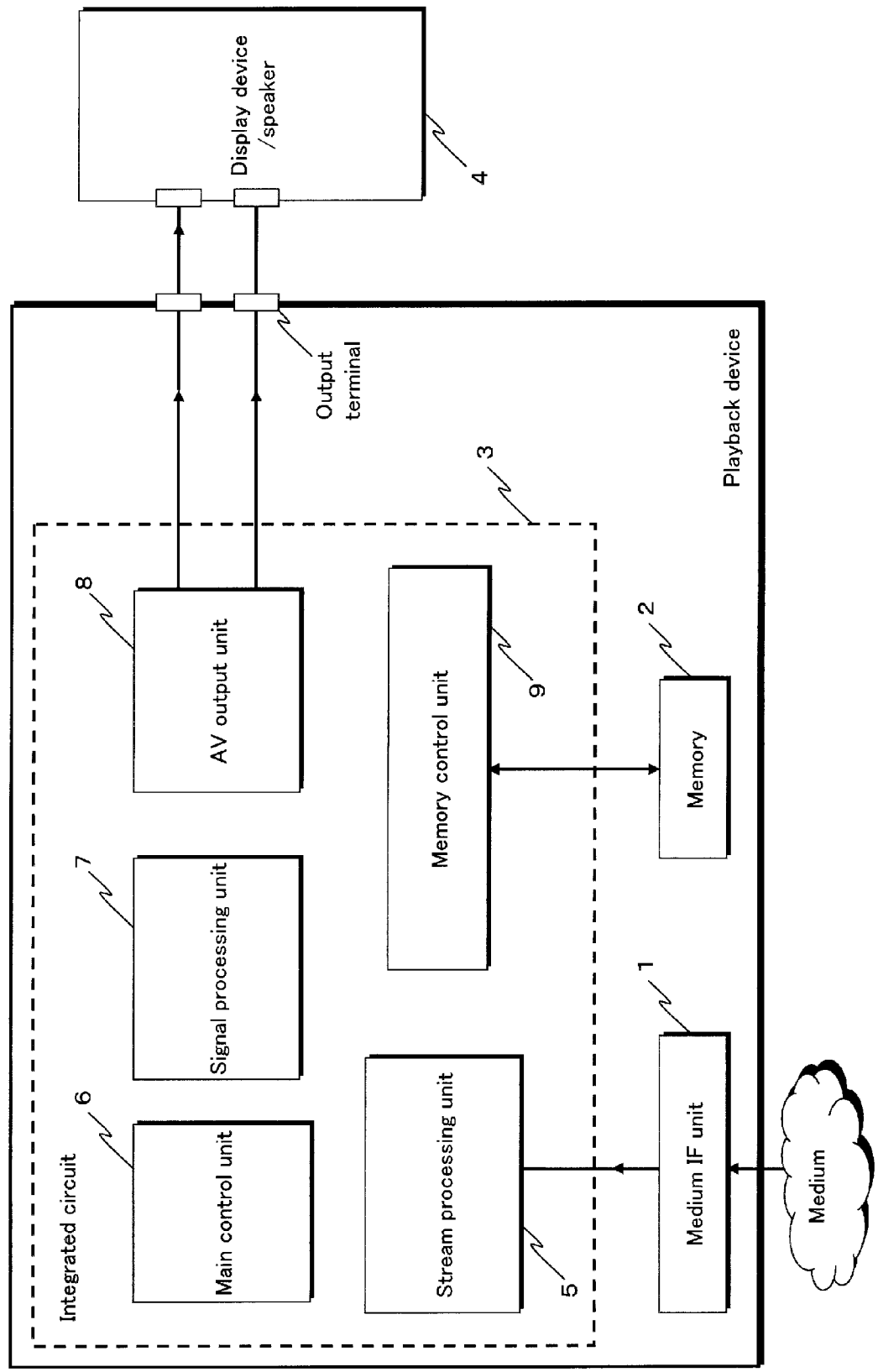

FIG. 110 is a functional block diagram of a playback device realized by using the integrated circuit 3 according to Embodiment 4 of the present invention.

Figure 111:
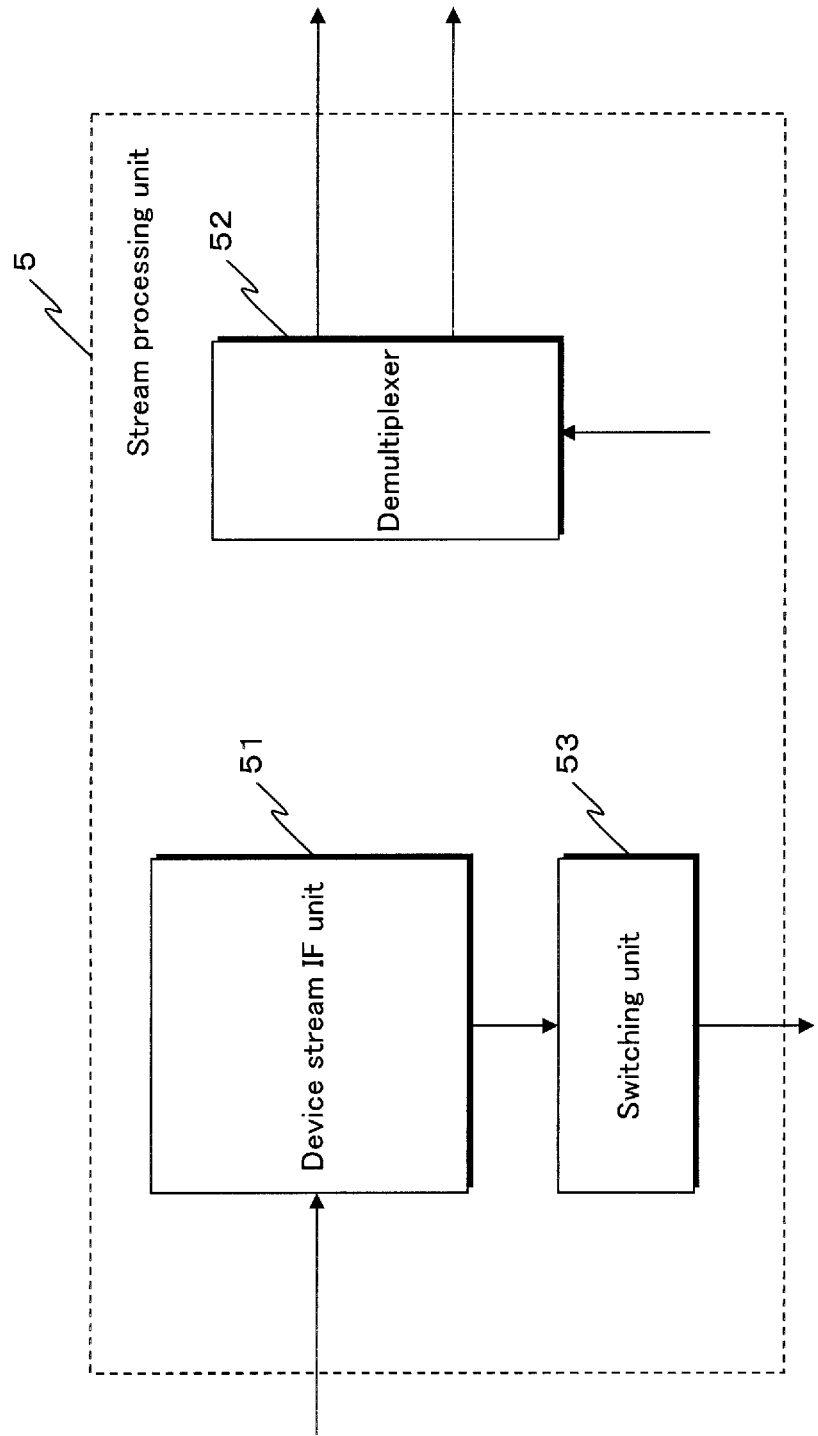

FIG. 111 is a functional block diagram showing a representative structure of the stream processing unit 5 shown in FIG. 110.

Figure 112:
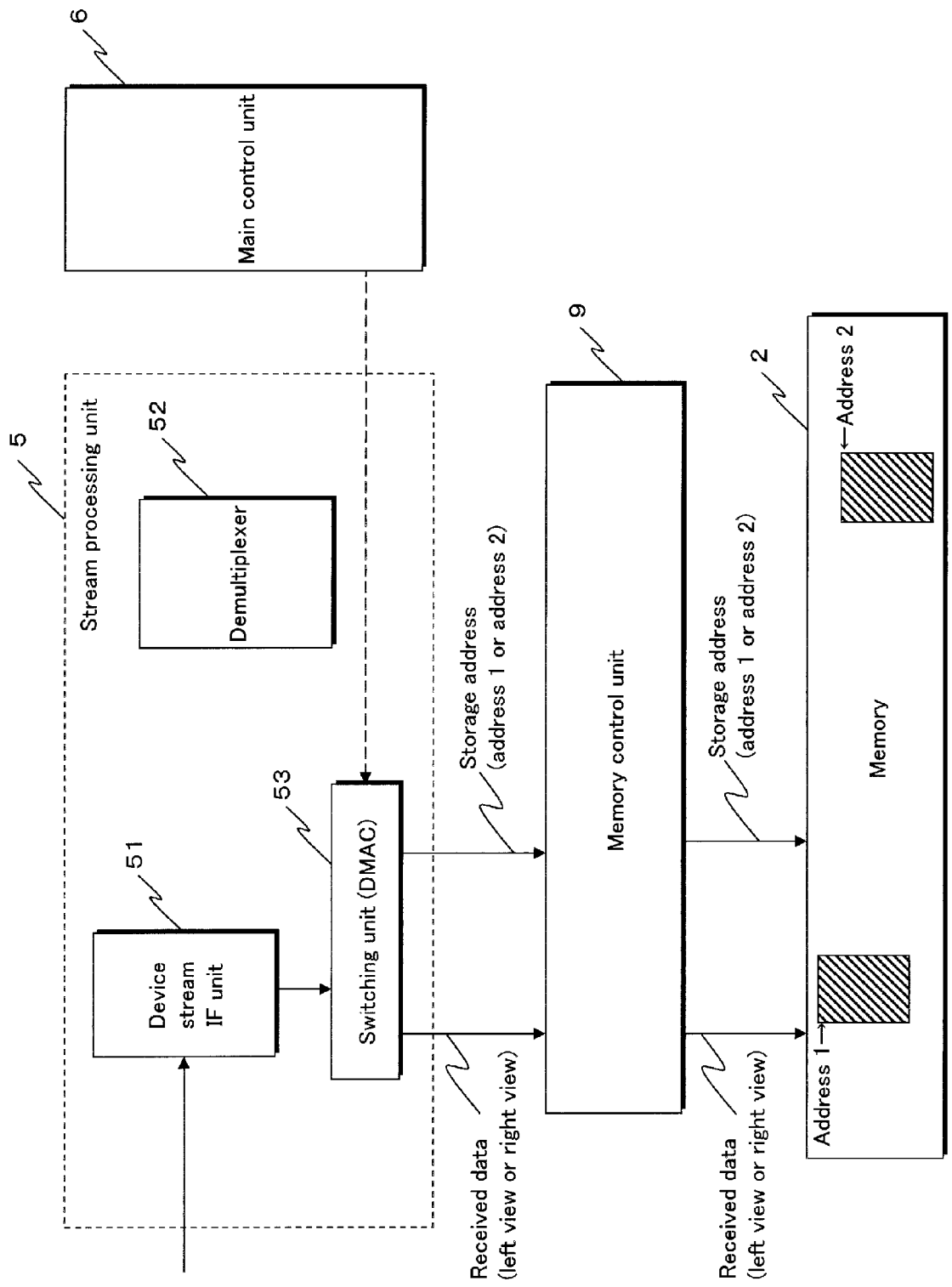

FIG. 112 is a functional block diagram of the switching unit 53 and the surrounding units shown in FIG. 110 when the switching unit 53 is DMAC.

Figure 113:
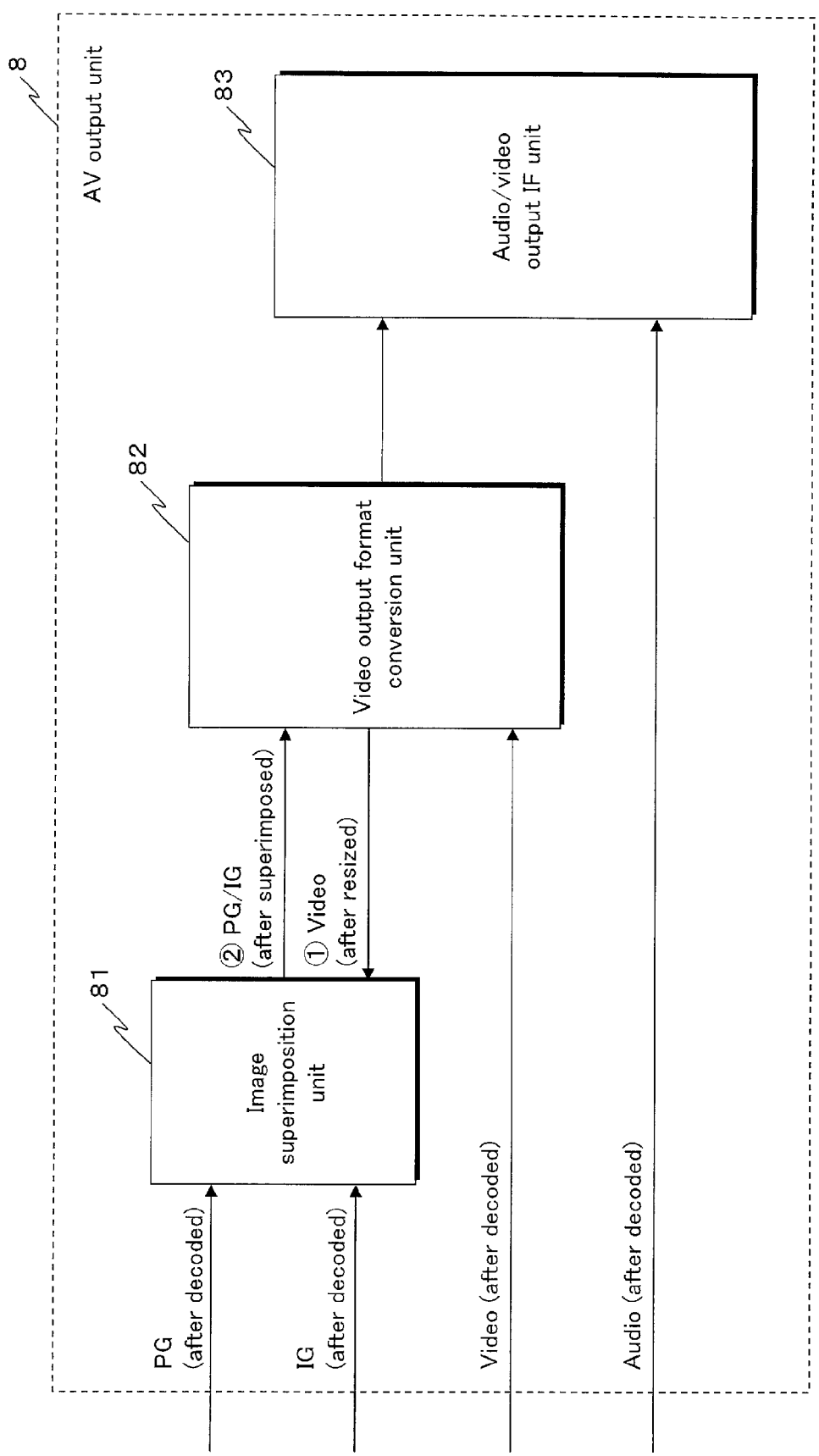

FIG. 113 is a functional block diagram showing a representative structure of the AV output unit 8 shown in FIG. 110.

Figure 114:
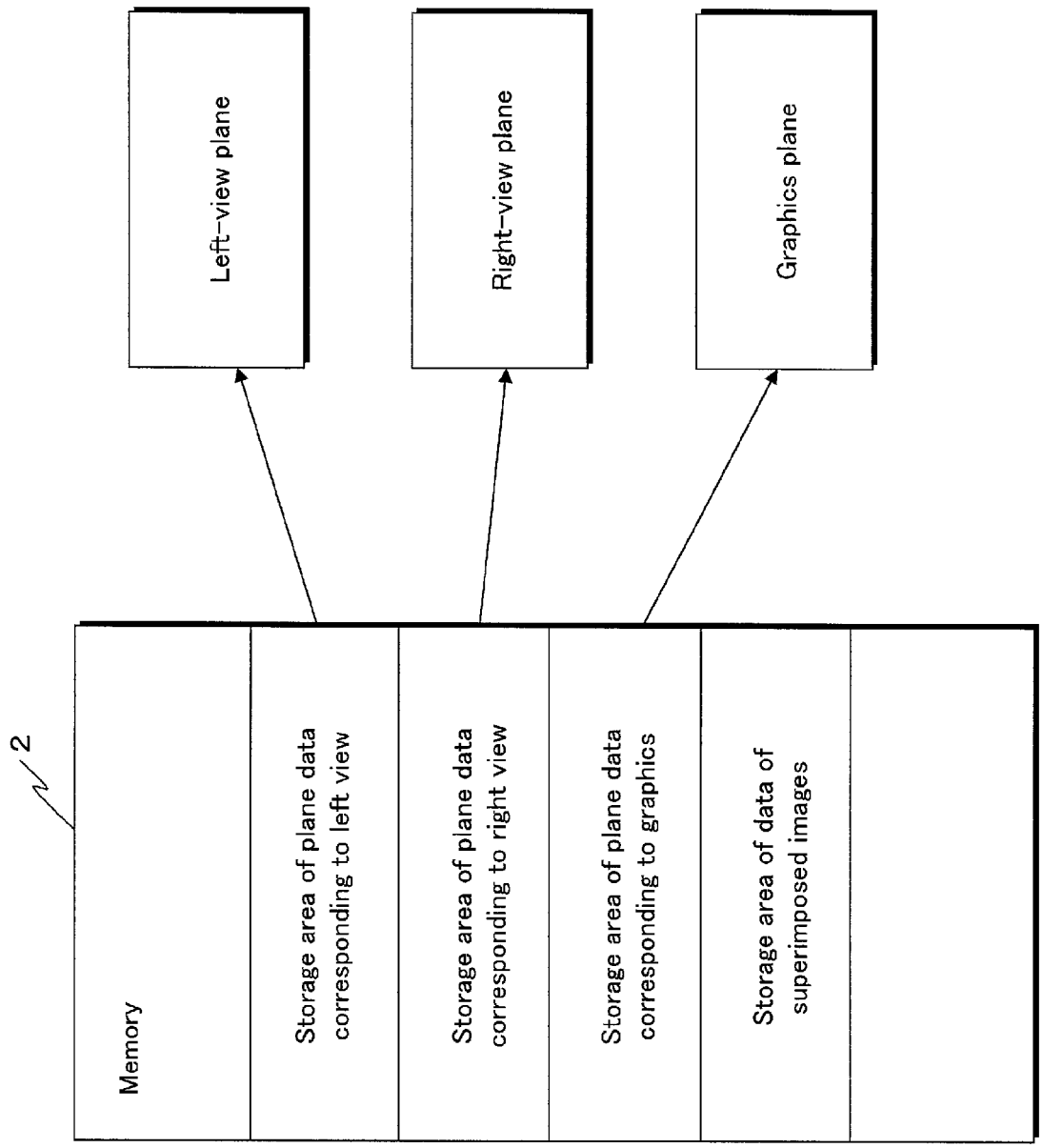

FIG. 114 is a schematic diagram showing one example of the method of using the memory 2 during the process of superimposing images.

Figure 115:
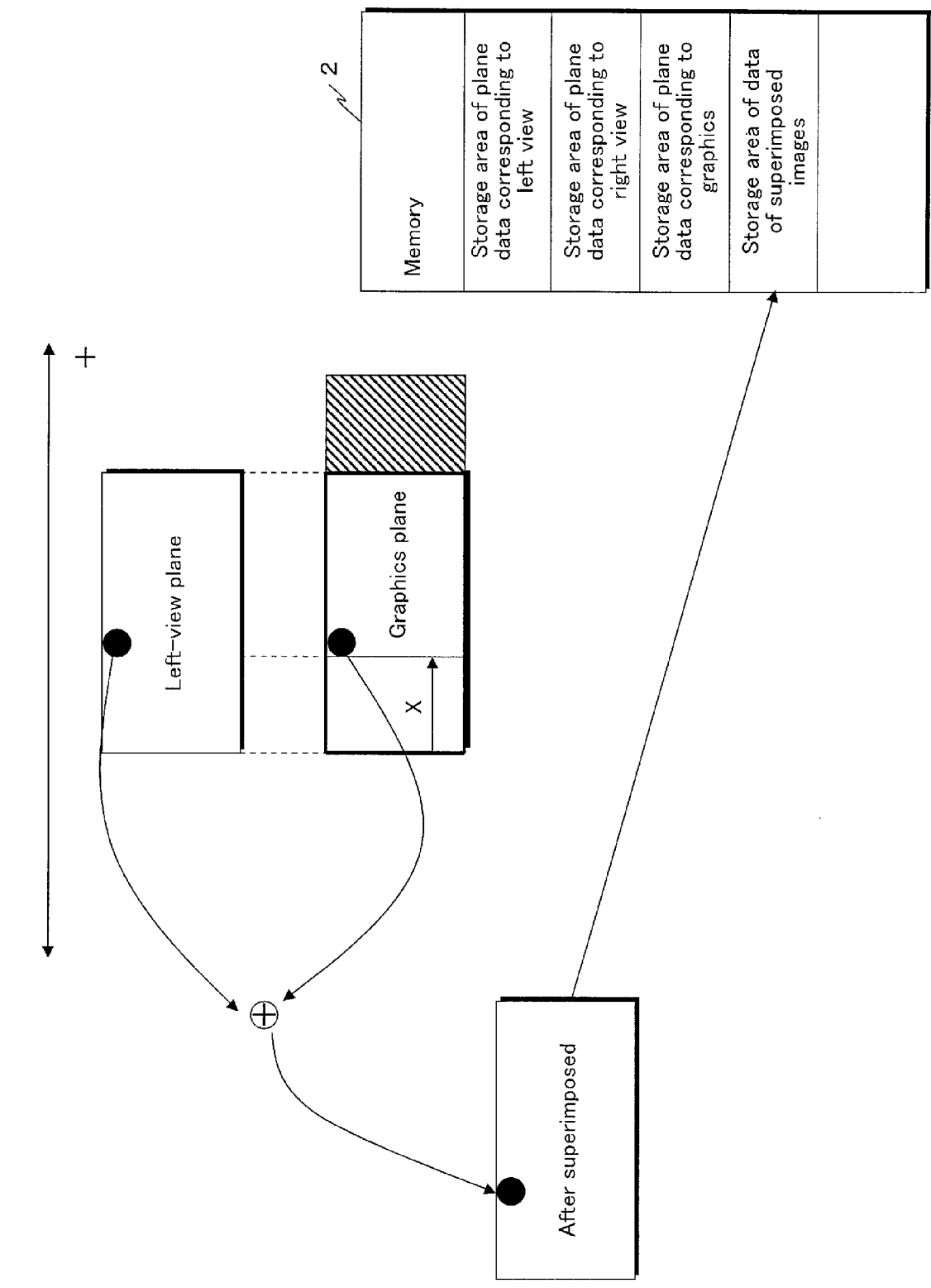

FIG. 115 is a schematic diagram showing a method of superimposing the graphics plane on the left-view plane by using the memory 2 shown in FIG. 114.

Figure 116:
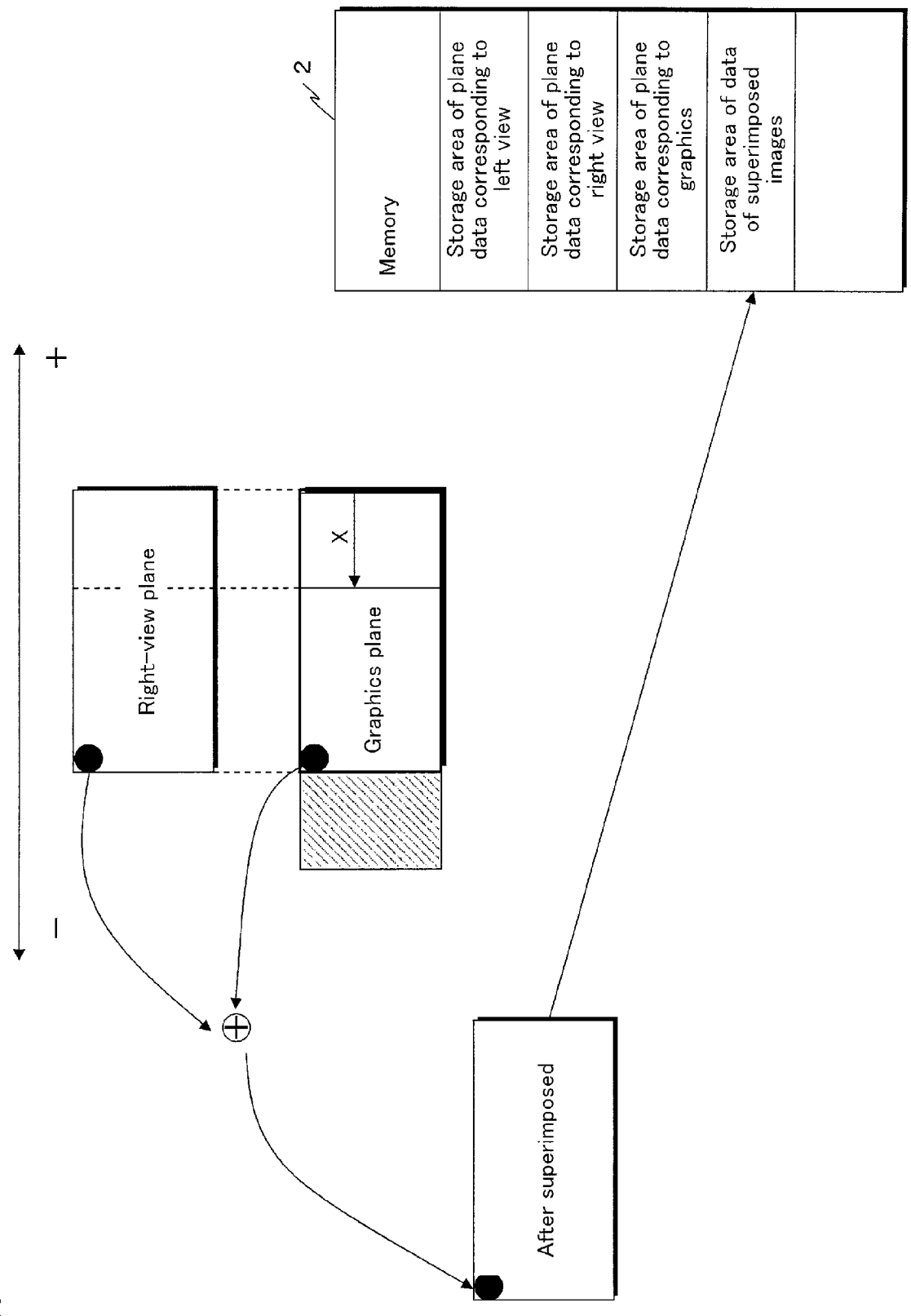

FIG. 116 is a schematic diagram showing a method of superimposing the graphics plane on the right-view plane by using the memory 2 shown in FIG. 114.

Figure 117:
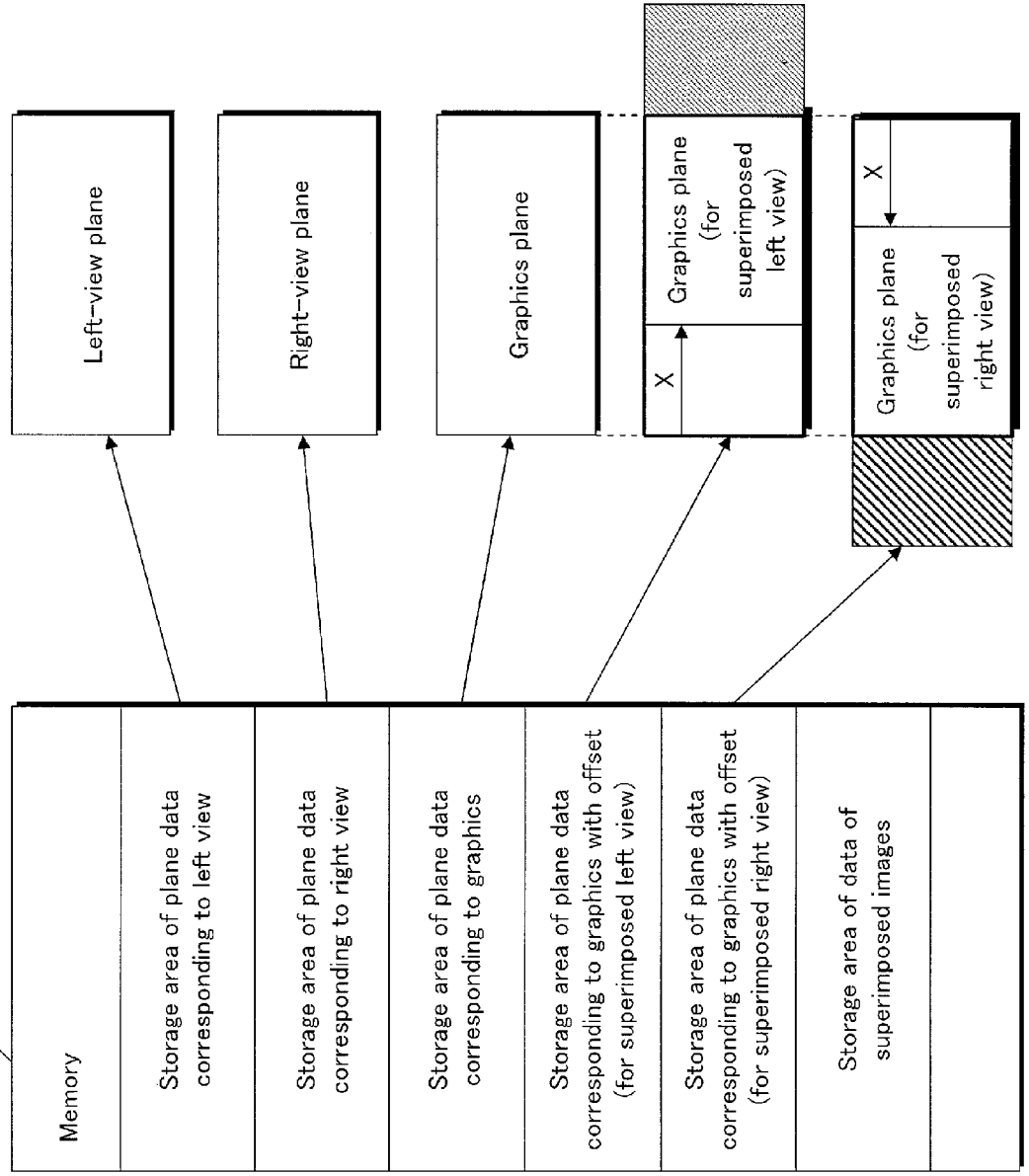

FIG. 117 is a schematic diagram showing another example of the method of using the memory 2 during the process of superimposing images.

Figure 118:
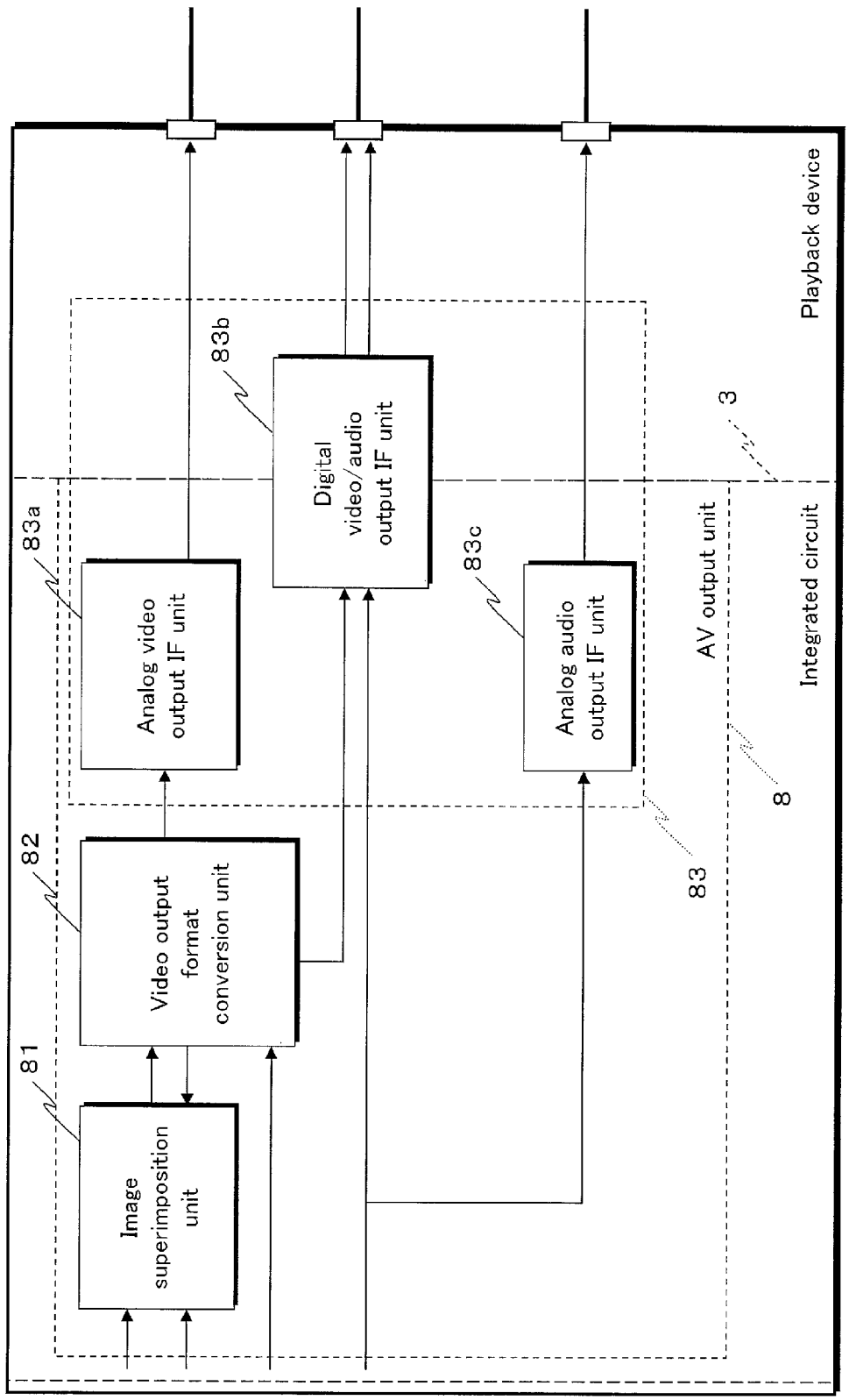

FIG. 118 is a detailed functional block diagram of the AV output unit 8 and the data output unit in the playback device shown in FIG. 113.

Figure 119A:
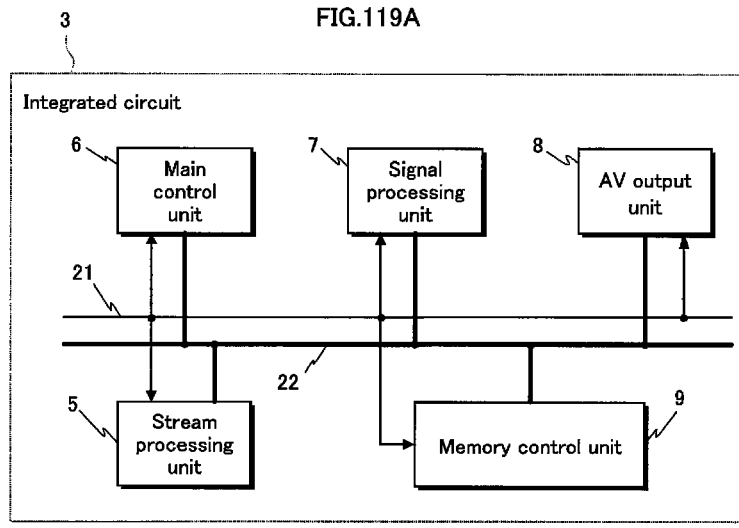
Figure 119B:
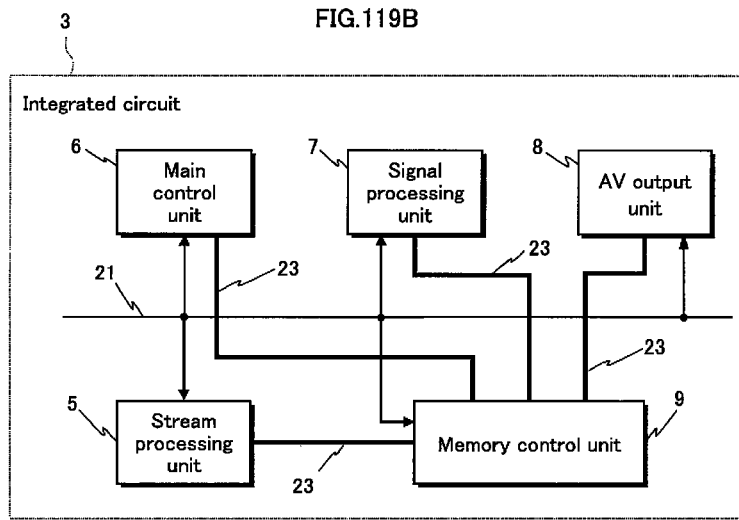

FIGS. 119A and 119B are schematic diagrams showing examples of the topology of a control bus and a data bus arranged in the integrated circuit 3 shown in FIG. 110.

Figure 120:
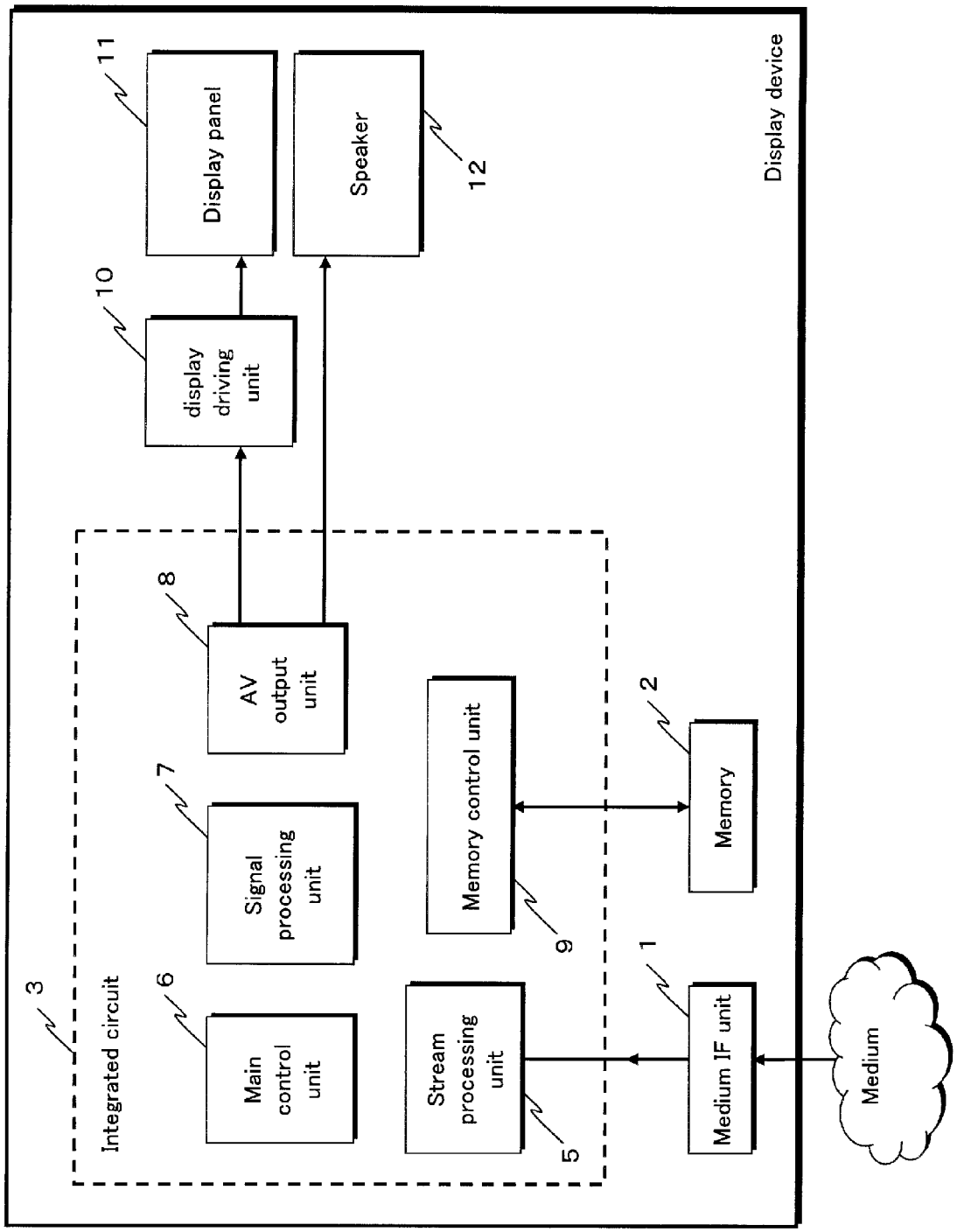

FIG. 120 is a functional block diagram showing the structure of the integrated circuit according to Embodiment 4 and the surrounding units, which are incorporated in a display device.

Figure 121:
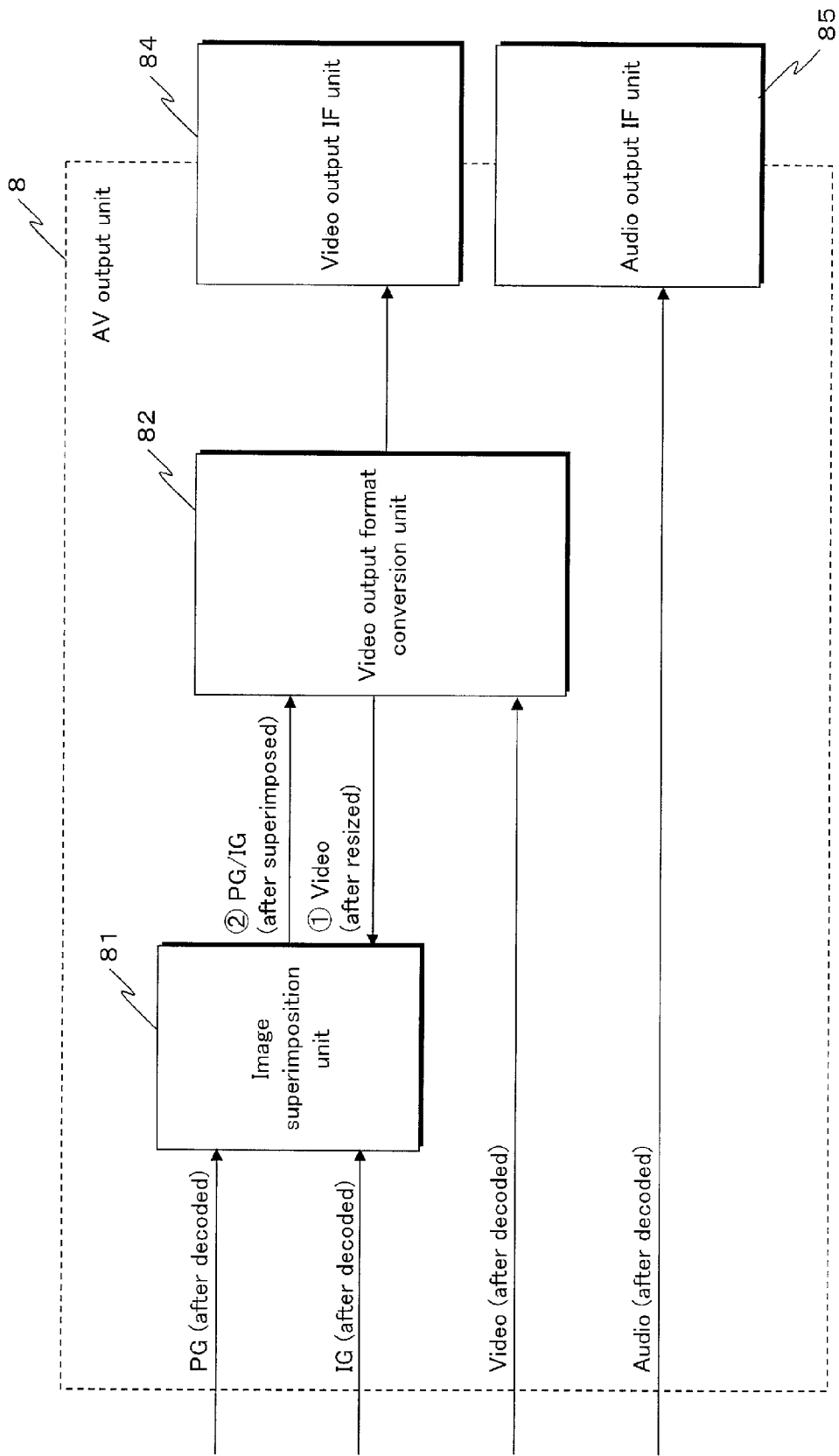

FIG. 121 is a detailed functional block diagram of the AV output unit 8 shown in FIG. 120.

Figure 122:
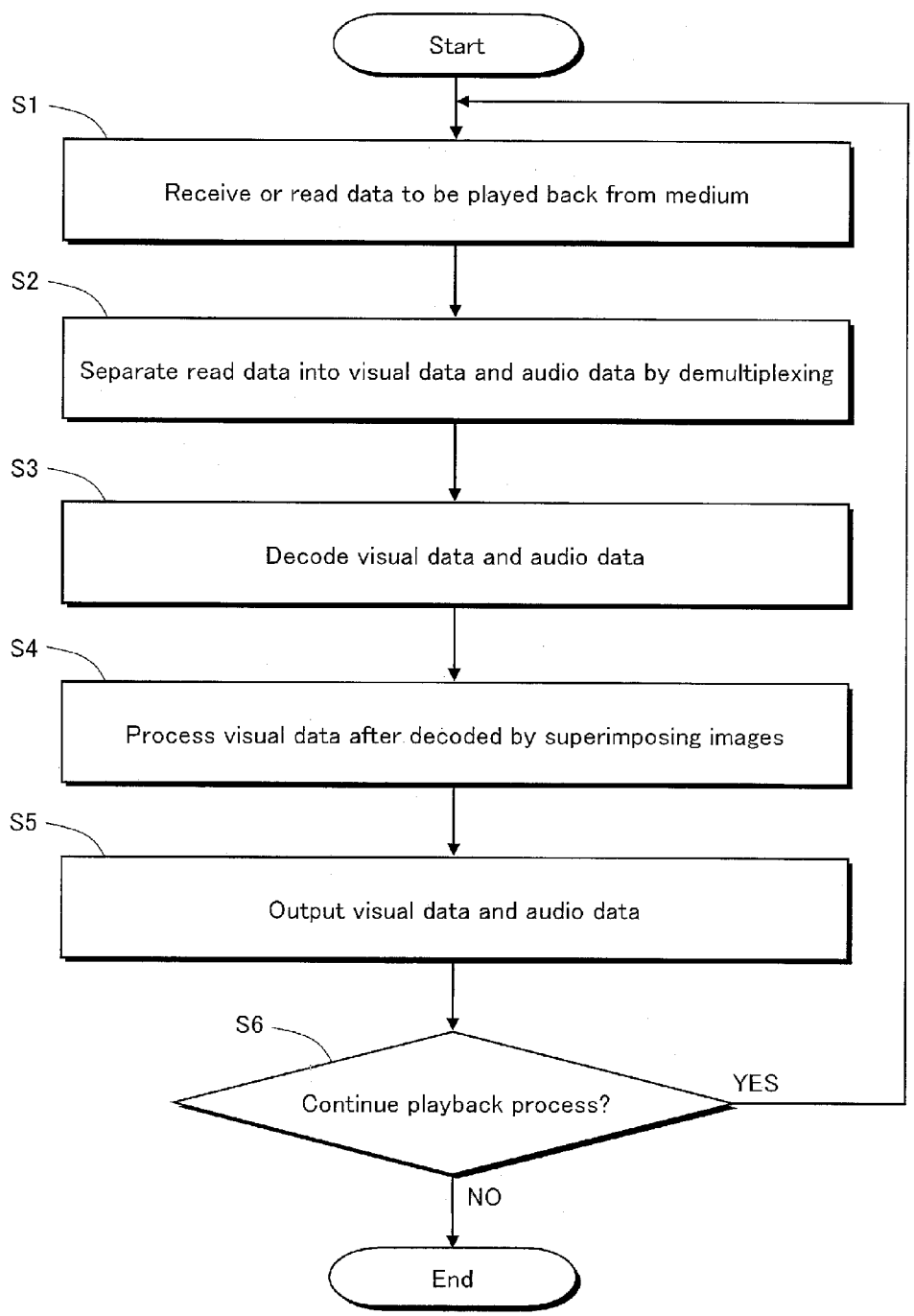

FIG. 122 is a flowchart of playback processing by a playback device using the integrated circuit 3 shown in FIG. 110.

FIG. 123 is a flowchart showing details of the steps S1-S6 shown in FIG. 122.

DESCRIPTION OF EMBODIMENTS

The following describes a recording medium and a playback device pertaining to preferred Embodiments of the present invention with reference to the drawings.

Embodiment 1

Figure 1:
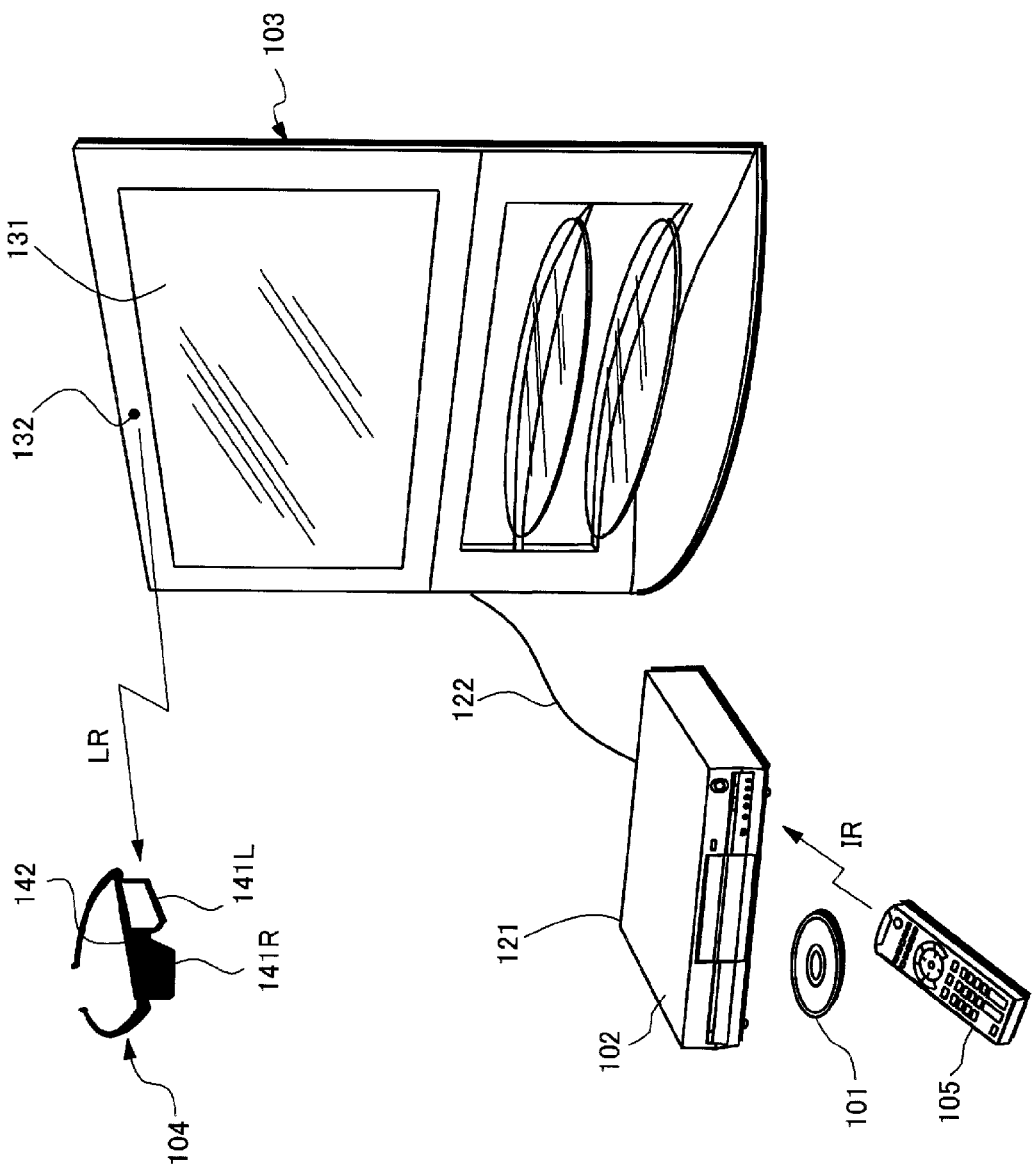
FIG. 1 is a schematic diagram showing a home theater system that uses a recording medium according to Embodiment 1 of the present invention.

FIG. 1 is a schematic diagram showing a home theater system that uses a recording medium according to Embodiment 1 of the present invention. This home theater system adopts a 3D video image (stereoscopic video image) playback method that uses parallax video images, and in particular adopts an alternate-frame sequencing method as a display method (see <<Supplementary Explanation>> for details). As shown in FIG. 1, this home theater system plays back a recording medium 101 and includes a playback device 102, a display device 103, shutter glasses 104, and a remote control 105. The playback device 102 and the display device 103 are provided independently of each other as shown in FIG. 1. Alternatively, the playback device 102 and the display device 103 may be provided as one unit.

The recording medium 101 is a read-only Blu-ray disc (BD)™, i.e. a BD-ROM disc. The recording medium 101 can be a different portable recording medium, such as an optical disc with a different format such as DVD or the like, a removable hard disk drive (HDD), or a semiconductor memory device such as an SD memory card. This recording medium, i.e. the BD-ROM disc 101, stores movie content as 3D video images. This content includes video streams representing a left view and a right view for the 3D video images. The content may further include a video stream representing a depth map for the 3D video images. These video streams are arranged on the BD-ROM disc 101 in units of data blocks and are accessed using a file structure described below. The video streams representing the left view or the right view are used by both a 2D playback device and a 3D playback device to play the content back as 2D video images. Conversely, a pair of video streams representing a left view and a right view, or a pair of video streams representing either a left view or a right view and a depth map, are used by a 3D playback device to play the content back as 3D video images.

A BD-ROM drive 121 is mounted on the playback device 102. The BD-ROM drive 121 is an optical disc drive conforming to the BD-ROM format. The playback device 102 uses the BD-ROM drive 121 to read content from the BD-ROM disc 101. The playback device 102 further decodes the content into video data/audio data. The playback device 102 is a 3D playback device and can play the content back as both 2D video images and as 3D video images. Hereinafter, the operational modes of the playback device 102 when playing back 2D video images and 3D video images are respectively referred to as "2D playback mode" and "3D playback mode". In 2D playback mode, video data only includes either a left-view or a right-view video frame. In 3D playback mode, video data includes both left-view and right-view video frames.

3D playback mode is further divided into left/right (L/R) mode and depth mode. In "L/R mode", a pair of left-view and right-view video frames is generated from a combination of video streams representing the left view and right view. In "depth mode", a pair of left-view and right-view video frames is generated from a combination of video streams representing either a left view or a right view and a depth map. The playback device 102 is provided with an L/R mode. The playback device 102 may be further provided with a depth mode.

The playback device 102 is connected to the display device 103 via a High-Definition Multimedia Interface (HDMI) cable 122. The playback device 102 converts video data/audio data into a video signal/audio signal in the HDMI format, and transmits the signals to the display device 103 via the HDMI cable 122. In 2D playback mode, only one of either the left-view or the right-view video frame is multiplexed in the video signal. In 3D playback mode, both the left-view and the right-view video frames are time-multiplexed in the video signal. Additionally, the playback device 102 exchanges CEC messages with the display device 103 via the HDMI cable 122. The playback device 102 can thus ask the display device 103 whether it supports playback of 3D video images.

The display device 103 is a liquid crystal display. Alternatively, the display device 103 can be another type of flat panel display, such as a plasma display, an organic EL display, etc., or a projector. The display device 103 displays video on the screen 131 in response to a video signal, and causes the speakers to produce audio in response to an audio signal. The display device 103 supports playback of 3D video images. During playback of 2D video images, either the left view or the right view is displayed on the screen 131. During playback of 3D video images, the left view and right view are alternately displayed on the screen 131.

The display device 103 includes a left/right signal transmitting unit 132. The left/right signal transmitting unit 132 transmits a left/right signal LR to the shutter glasses 104 via infrared rays or by radio transmission. The left/right signal LR indicates whether the image currently displayed on the screen 131 is a left-view or a right-view image. During playback of 3D video images, the display device 103 detects switching of frames by distinguishing between a left-view frame and a right-view frame based on a control signal that accompanies a video signal. Furthermore, the display device 103 causes the left/right signal transmitting unit 132 to switch the left/right signal LR synchronously with the detected switching of frames.

The shutter glasses 104 include two liquid crystal display panels 141L and 141R and a left/right signal receiving unit 142. The liquid crystal display panels 141L and 141R respectively constitute the left and right lens parts. The left/right signal receiving unit 142 receives a left/right signal LR, and in accordance with changes therein, transmits the signal to the left and right liquid crystal display panels 141L and 141R. In response to the signal, each of the liquid crystal display panels 141L and 141R either lets light pass through the entire panel or shuts light out. For example, when the left/right signal LR indicates a left-view display, the liquid crystal display panel 141L for the left eye lets light pass through, while the liquid crystal display panel 141R for the right eye shuts light out. When the left/right signal LR indicates a right-view display, the display panels act oppositely. The two liquid crystal display panels 141L and 141R thus alternately let light pass through in sync with the switching of frames. As a result, when the viewer looks at the screen 131 while wearing the shutter glasses 104, the left view is shown only to the viewer's left eye, and the right view is shown only to the right eye. The viewer is made to perceive the difference between the images seen by each eye as the binocular parallax for the same stereoscopic image, and thus the video image appears to be stereoscopic.

The remote control 105 includes an operation unit and a transmitting unit. The operation unit includes a plurality of buttons. The buttons correspond to each of the functions of the playback device 102 and the display device 103, such as turning the power on or off, starting or stopping playback of the BD-ROM disc 101, etc. The operation unit detects when the user presses a button and conveys identification information for the button to the transmitting unit as a signal. The transmitting unit converts this signal into a signal IR and outputs it via infrared rays or radio transmission to the playback device 102 or the display device 103. On the other hand, the playback device 102 and display device 103 each receive this signal IR, determine the button indicated by this signal IR, and execute the function associated with the button. In this way, the user can remotely control the playback device 102 or the display device 103.

<Data Structure of the BD-ROM Disc>

Figure 2:
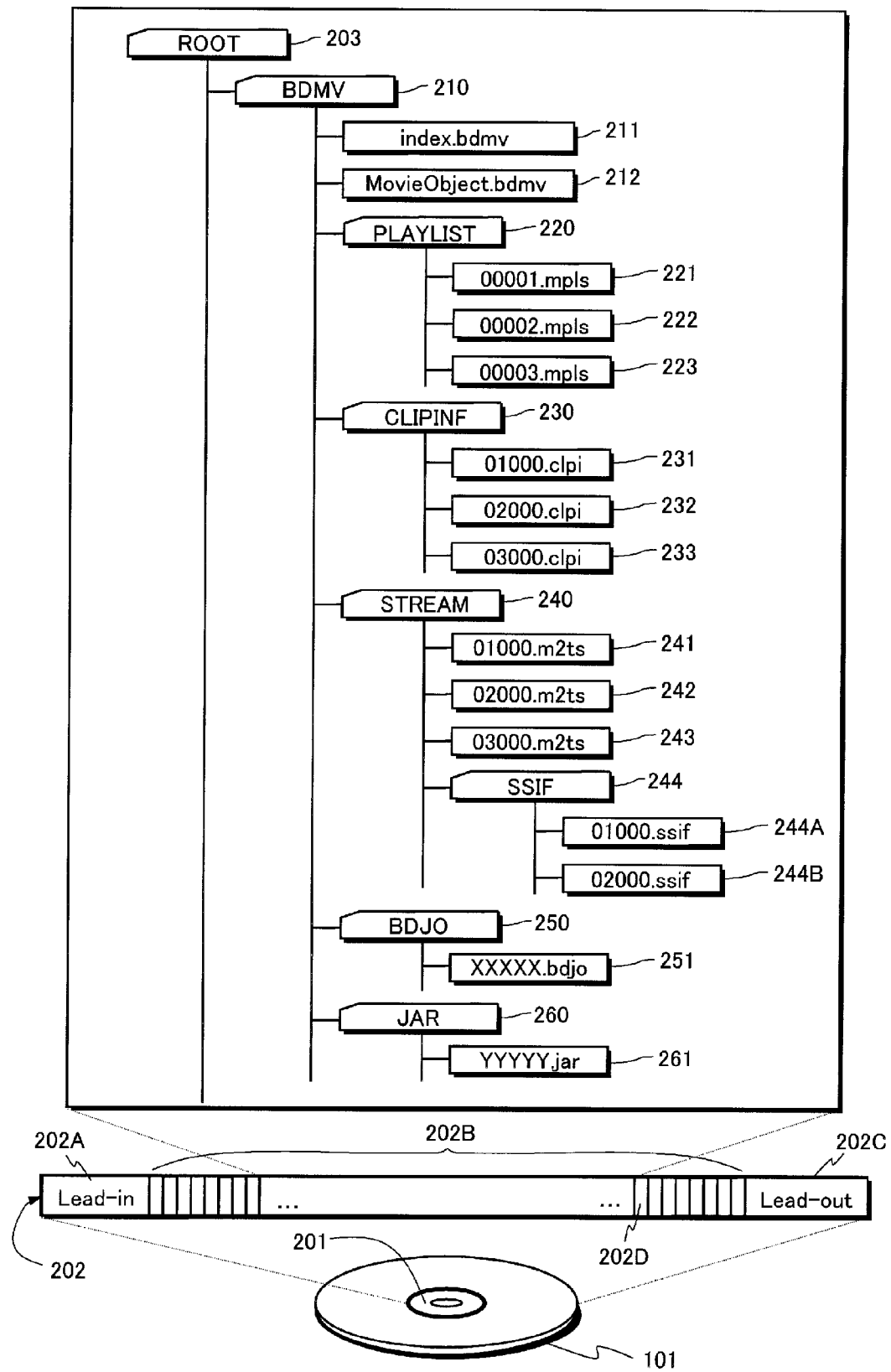
FIG. 2 is a schematic diagram showing a data structure of a BD-ROM disc 101 shown in FIG. 1.

FIG. 2 is a schematic diagram showing a data structure of a BD-ROM disc 101. As shown in FIG. 2, a Burst Cutting Area (BCA) 201 is provided at the innermost part of the data recording area on the BD-ROM disc 101. Only the BD-ROM drive 121 is permitted to access the BCA, and access by application programs is prohibited. The BCA 201 can thus be used as technology for copyright protection. In the data recording area outside of the BCA 201, tracks spiral from the inner to the outer circumference. In FIG. 2, a track 202 is schematically extended in a transverse direction. The left side represents the inner circumferential part of the disc 101, and the right side represents the outer circumferential part. As shown in FIG. 2, track 202 contains a lead-in area 202A, a volume area 202B, and a lead-out area 202C in order from the inner circumference. The lead-in area 202A is provided immediately on the outside edge of the BCA 201. The lead-in area 202A includes information necessary for the BD-ROM drive 121 to access the volume area 202B, such as the size, the physical address, etc. of the data recorded in the volume area 202B. The lead-out area 202C is provided on the outermost circumferential part of the data recording area and indicates the end of the volume area 202B. The volume area 202B includes application data such as video images, audio, etc.

The volume area 202B is divided into small areas 202D called "sectors". The sectors have a common size, for example 2048 bytes. Each sector 202D is consecutively assigned a serial number in order from the top of the volume area 202B. These serial numbers are called logical block numbers (LBN) and are used in logical addresses on the BD-ROM disc 101. During reading of data from the BD-ROM disc 101, data to be read is specified through designation of the LBN for the destination sector. The volume area 202B can thus be accessed in units of sectors. Furthermore, on the BD-ROM disc 101, logical addresses are substantially the same as physical addresses. In particular, in an area where the LBNs are consecutive, the physical addresses are also substantially consecutive. Accordingly, the BD-ROM drive 121 can consecutively read data from sectors having consecutive LBNs without making the optical pickup perform a seek.

The data recorded in the volume area 202B is managed under a predetermined file system. Universal Disc Format (UDF) is adopted as this file system. Alternatively, the file system may be ISO9660. The data recorded on the volume area 202B is represented in a directory/file format in accordance with the file system (see the <<Supplementary Explanation>> for details). In other words, the data is accessible in units of directories or files.

<<Directory/File Structure on the BD-ROM Disc>>

FIG. 2 further shows the directory/file structure of the data stored in the volume area 202B on a BD-ROM disc 101. As shown in FIG. 2, in this directory/file structure, a BD movie (BDMV) directory 210 is located directly below a ROOT directory 203. Below the BDMV directory 210 are an index file (index.bdmv) 211 and a movie object file (MovieObject.bdmv) 212.

The index file 211 contains information for managing as a whole the content recorded on the BD-ROM disc 101. In particular, this information includes both information to make the playback device 102 recognize the content, as well as an index table. The index table is a correspondence table between a title constituting the content and a program to control the operation of the playback device 102. This program is called an "object". Object types are a movie object and a BD-J (BD Java™) object.

The movie object file 212 generally stores a plurality of movie objects. Each movie object includes a sequence of navigation commands. A navigation command is a control command causing the playback device 102 to execute playback processes similar to general DVD players. Types of navigation commands are, for example, a read-out command to read out a playlist file corresponding to a title, a playback command to play back stream data from an AV stream file indicated by a playlist file, and a transition command to make a transition to another title. Navigation commands are written in an interpreted language and are deciphered by an interpreter, i.e. a job control program, included in the playback device 102, thus making the control unit execute the desired job. A navigation command is composed of an opcode and an operand. The opcode describes the type of operation that the playback device 102 is to execute, such as dividing, playing back, or calculating a title, etc. The operand indicates identification information targeted by the operation such as the title's number, etc. The control unit of the playback device 102 calls a movie object in response, for example, to a user operation and executes navigation commands included in the called movie object in the order of the sequence. In a manner similar to general DVD players, the playback device 102 first displays a menu on the display device 103 to allow the user to select a command. The playback device 102 then executes playback start/stop of a title, switches to another title, etc. in response to the selected command, thereby dynamically changing the progress of video playback.

As shown in FIG. 2, the BDMV directory 210 further contains a playlist (PLAYLIST) directory 220, a clip information (CLIPINF) directory 230, a stream (STREAM) directory 240, a BD-J object (BDJO: BD Java Object) directory 250, and a Java archive (JAR: Java Archive) directory 260.

Three types of AV stream files, (01000.m2ts) 241, (02000.m2ts) 242, and (03000.m2ts) 243, as well as a stereoscopic interleaved file (SSIF) directory 244 are located directly under the STREAM directory 240. Two types of AV stream files, (01000.ssif) 244A and (02000.ssif) 244B are located directly under the SSIF directory 244.

An "AV stream file" refers to a file, from among an actual video content recorded on a BD-ROM disc 101, that complies with the file format determined by the file system. Such an actual video content generally refers to stream data in which different types of stream data representing video, audio, subtitles, etc., i.e. elementary streams, have been multiplexed. The multiplexed stream data can be broadly divided into two types: a main transport stream (TS), and a sub-TS. A "main TS" is multiplexed stream data that includes a base-view video stream as a primary video stream. A "base-view video stream" is a video stream that can be played back independently and that represents 2D video images. These 2D video images are referred to as the "base view" or the "main view". A "sub-TS" is multiplexed stream data that includes a dependent-view video stream as a primary video stream. A "dependent-view video stream" is a video stream that requires a base-view video stream for playback and represents 3D video images by being combined with the base-view video stream. The types of dependent-view video streams are a right-view video stream, left-view video stream, and depth map stream. When the base view is the left view of 3D video images, a "right-view video stream" is a video stream representing the right view of the 3D video images. The reverse is true for a "left-view video stream". When the base view is a projection of 3D video images on a virtual 2D screen, a "depth map stream" is stream data representing a depth map for the 3D video images. The 2D video images or depth map represented by the dependent-view video stream are referred to as a "dependent view" or "sub-view".

Depending on the type of multiplexed stream data stored therein, AV stream files are divided into three types: file 2D, file dependent (hereinafter, abbreviated as "file DEP"), and interleaved file (hereinafter, abbreviated as "file SS"). A "file 2D" is an AV stream file for playback of 2D video images in 2D playback mode and includes a main TS. A "file DEP" is an AV stream file that includes a sub-TS. A "file SS" is an AV stream file that includes a main TS and a sub-TS representing the same 3D video images. In particular, a file SS shares its main TS with a certain file 2D and shares its sub-TS with a certain file DEP. In other words, in the file system on the BD-ROM disc 101, a main TS can be accessed by both a file SS and a file 2D, and a sub TS can be accessed by both a file SS and a file DEP. This setup, whereby a sequence of data recorded on the BD-ROM disc 101 is common to different files and can be accessed by all of the files, is referred to as "file cross-link".

In the example shown in FIG. 2, the first AV stream file (01000.m2ts) 241 is a file 2D, and the second AV stream file (02000.m2ts) 242 and the third AV stream file (03000.m2ts) 243 are both a file DEP. In this way, files 2D and files DEP are located directly below the STREAM directory 240. The first AV stream file, i.e. the base-view video stream that includes the file 2D 241, represents a left view of 3D video images. The second AV stream file, i.e. the dependent-view video stream that includes the first file DEP 242, includes a right-view video stream. The third AV stream file, i.e. the dependent-view video stream that includes the second file DEP 243, includes a depth map stream.

In the example shown in FIG. 2, the fourth AV stream file (01000.ssif) 244A and the fifth AV stream file (02000.ssif) 244B are both a file SS. In this way, files SS are located directly below the SSIF directory 244. The fourth AV stream file, i.e. the file SS 244A, shares a main TS, and in particular a base-view video stream, with the file 2D 241 and shares a sub-TS, in particular a right-view video stream, with the first file DEP 242. The fifth AV stream file, i.e. the second file SS 244B, shares a main TS, and in particular a base-view video stream, with the first file 2D 241 and shares a sub-TS, in particular a depth map stream, with the third file DEP 243.

Three types of clip information files, (01000.clpi) 231, (02000.clpi) 232, and (03000.clpi) 233 are located in the CLIPINF directory 230. A "clip information file" is a file associated on a one-to-one basis with a file 2D and a file DEP and in particular contains an entry map for each file. An "entry map" is a correspondence table between the presentation time for each scene represented by the file and the address within each file at which the scene is recorded. Among the clip information files, a clip information file associated with a file 2D is referred to as a "2D clip information file", and a clip information file associated with a file DEP is referred to as a "dependent-view clip information file". In the example shown in FIG. 2, the first clip information file (01000.clpi) 231 is a 2D clip information file and is associated with the file 2D 241. The second clip information file (02000.clpi) 232 and the third clip information file (03000.clpi) 233 are both a dependent-view clip information file, and are associated with the first file DEP 242 and the second file DEP 243, respectively.

Three types of playlist files, (00001.mpls) 221, (00002.mpls) 222, and (00003.mpls) 223 are located in the PLAYLIST directory 220. A "playlist file" is a file that specifies the playback path of an AV stream file, i.e. the part of an AV stream file for playback, and the order of playback. The types of playlist files are a 2D playlist file and a 3D playlist file. A "2D playlist file" specifies the playback path of a file 2D. A "3D playlist file" specifies, for a playback device in 2D playback mode, the playback path of a file 2D, and for a playback device in 3D playback mode, the playback path of a file SS. As shown in the example in FIG. 2, the first playlist file (00001.mpls) 221 is a 2D playlist file and specifies the playback path of the file 2D 241. The second playlist file (00002.mpls) 222 is a 3D playlist file that specifies, for a playback device in 2D playback mode, the playback path of the file 2D 241, and for a 3D playback device in L/R mode, the playback path of the file SS 244A. The third playlist file (00003.mpls) 223 is a 3D playlist file that specifies, for a playback device in 2D playback mode, the playback path of the file 2D 241, and for a 3D playback device in depth mode, the playback path of the second file SS 244B.

A BD-J object file (XXXXX.bdjo) 251 is located in the BDJO directory 250. The BD-J object file 251 includes a single BD-J object. The BD-J object is a bytecode program to cause a Java virtual machine mounted on the playback device 102 to play back a title and render graphics images. The BD-J object is written in a compiler language such as Java or the like. The BD-J object includes an application management table and identification information for the playlist file to which is referred. The "application management table" is a list of the Java application programs to be executed by the Java virtual machine and their period of execution, i.e. life-cycle. The "identification information of the playlist file to which is referred" identifies a playlist file that corresponds to a title to be played back. The Java virtual machine calls a BD-J object in response to a user operation or an application program and executes the Java application program according to the application management table included in the BD-J object. Consequently, the playback device 102 dynamically changes the progress of the video for each title played back, or causes the display device 103 to display graphics images independently of the title video.

A JAR file (YYYYY.jar) 261 is located in the JAR directory 260. The JAR directory 261 generally includes a plurality of actual Java application programs to be executed in accordance with the application management table shown in the BD-J object. A "Java application program" is a bytecode program written in a compiler language such as Java or the like, as is the BD-J object. Types of Java application programs include programs causing the Java virtual machine to perform playback of a title and programs causing the Java virtual machine to render graphics images. The JAR file 261 is a Java archive file, and when it is read by the playback device 102, it is loaded in internal memory. In this way, a Java application program is stored in memory.

<<Structure of Multiplexed Stream Data>>

FIG. 3A is a list of elementary streams multiplexed in a main TS on a BD-ROM disc 101. The main TS is a digital stream in MPEG-2 Transport Stream (TS) format and is included in the file 2D 241 shown in FIG. 2. As shown in FIG. 3A, the main TS includes a primary video stream 301, primary audio streams 302A and 302B, and presentation graphics (PG) streams 303A and 303B. The main TS may additionally include an interactive graphics (IG) stream 304, a secondary audio stream 305, and a secondary video stream 306.

The primary video stream 301 represents the primary video of a movie, and the secondary video stream 306 represents secondary video of the movie. The primary video is the main video pertaining to the content, such as the main feature of a movie, and is displayed on the entire screen, for example. On the other hand, the secondary video is displayed on the screen simultaneously with the primary video with the use, for example, of a picture-in-picture method, so that the secondary video images are displayed in a smaller window within the primary video images. The primary video stream 301 and the secondary video stream 306 are both a base-view video stream. Each of the video streams 301 and 306 is encoded by a video compression encoding method, such as MPEG-2, MPEG-4 AVC, or SMPTE VC-1.

The primary audio streams 302A and 302B represent the primary audio of the movie. In this case, the two primary audio streams 302A and 302B are in different languages. The secondary audio stream 305 represents secondary audio to be mixed with the primary audio, such as sound effects accompanying operation of an interactive screen. Each of the audio streams 302A, 302B, and 305 is encoded by a method such as AC-3, Dolby Digital Plus ("Dolby Digital" is a registered trademark), Meridian Lossless Packing™ (MLP), Digital Theater System™ (DTS), DTS-HD, or linear Pulse Code Modulation (PCM).

Each of the PG streams 303A and 303B represents graphics images, such as subtitles formed by graphics, to be displayed superimposed on the video images represented by the primary video stream 301. The two PG streams 303A and 303B represent, for example, subtitles in a different language. The IG stream 304 represents Graphical User Interface (GUI) graphic elements, and the arrangement thereof, for constructing an interactive screen on the screen 131 in the display device 103.

The elementary streams 301-306 are identified by packet identifiers (PIDs). PIDs are assigned, for example, as follows. Since one main TS includes only one primary video stream, the primary video stream 301 is assigned a hexadecimal value of 0x1011. When up to 32 other elementary streams can be multiplexed by type in one main TS, the primary audio streams 302A and 302B are each assigned any value from 0x1100 to 0x111F. The PG streams 303A and 303B are each assigned any value from 0x1200 to 0x121F. The IG stream 304 is assigned any value from 0x1400 to 0x141F. The secondary audio stream 305 is assigned any value from 0x1A00 to 0x1A1F. The secondary video stream 306 is assigned any value from 0x1B00 to 0x1B1F.

FIG. 3B is a list of elementary streams multiplexed in a sub-TS on a BD-ROM disc 101. The sub-TS is multiplexed stream data in MPEG-2 TS format and is included in the file DEP 242 shown in FIG. 2. As shown in FIG. 3B, the sub-TS includes two primary video streams 311R and 311D. 311R is a right-view video stream, whereas 311D is a depth map stream. Note that the primary video streams 311R and 311D may be multiplexed into files DEP 242 and 243, which are different files, separately. When the primary video stream 301 in the main TS represents the left view of 3D video images, the right-view video stream 311R represents the right view of the 3D video images. The depth map stream 311D represents 3D video images in combination with the primary video stream 301 in the main TS. Additionally, the sub TS may include secondary video streams 312R and 312D. 312R is a right-view video stream, whereas 312D is a depth map stream. When the secondary video stream 306 in the main TS represents the left view of 3D video images, the right-view video stream 312R represents the right view of the 3D video images. The depth map stream 312D represents 3D video images in combination with the secondary video stream 306 in the main TS.

PIDs are assigned to the elementary streams 311R, . . . , 312D as follows, for example. The primary video streams 311R and 311D are respectively assigned values of 0x1012 and 0x1013. When up to 32 other elementary streams can be multiplexed by type in one sub-TS, the secondary video streams 312R and 312D are assigned any value from 0x1B20 to 0x1B3F.

FIG. 4 is a schematic diagram showing the arrangement of TS packets in the multiplexed stream data 400. The main TS and sub TS share this packet structure. In the multiplexed stream data 400, the elementary streams 401, 402, 403, and 404 are respectively converted into sequences of TS packets 421, 422, 423, and 424. For example, in the video stream 401, each frame 401A or each field is first converted into one Packetized Elementary Stream (PES) packet 411. Next, each PES packet 411 is generally converted into a plurality of TS packets 421. Similarly, the audio stream 402, PG stream 403, and IG stream 404 are respectively first converted into a sequence of PES packets 412, 413, and 414, after which they are converted into a sequence of TS packets 422, 423, and 424. Finally, the TS packets 421, 422, 423, and 424 obtained from the elementary streams 401, 402, 403, and 404 are time-multiplexed into one piece of stream data, i.e. the main TS 400.

FIG. 5B is a schematic diagram showing a TS packet sequence constituting multiplexed stream data. Each TS packet 501 is 188 bytes long. As shown in FIG. 5B, each TS packet 501 includes a TS header 501H and either, or both, a TS payload 501P and an adaptation field (hereinafter abbreviated as "AD field") 501A. The TS payload 501P and AD field 501A together constitute a 184 byte long data area. The TS payload 501P is used as a storage area for a PES packet.

The PES packets 411-414 shown in FIG. 4 are typically divided into a plurality of parts, and each part is stored in a different TS payload 501P. The AD field 501A is an area for storing stuffing bytes (i.e. dummy data) when the amount of data in the TS payload 501P does not reach 184 bytes. Additionally, when the TS packet 501 is, for example, a PCR as described below, the AD field 501A is used to store such information. The TS header 501H is a four-byte long data area.

FIG. 5A is a schematic diagram showing the data structure of a TS header 501H. As shown in FIG. 5A, the TS header 501H includes TS priority (transport_priority) 511, PID 512, and AD field control (adaptation field control) 513. The PID 512 indicates the PID for the elementary stream whose data is stored in the TS payload 501P of the TS packet 501 containing the PID 512. The TS priority 511 indicates the degree of priority of the TS packet 501 among the TS packets that share the value indicated by the PID 512. The AD field control 513 indicates whether the TS packet 501 contains an AD field 501A and/or a TS payload 501P. For example, if the AD field control 513 indicates "1", then the TS packet 501 does not include an AD field 501A but includes a TS payload 501P. If the AD field control 513 indicates "2", then the reverse is true. If the AD field control 513 indicates "3", then the TS packet 501 includes both an AD field 501A and a TS payload 501P.

FIG. 5C is a schematic diagram showing the formation of a source packet sequence composed of the TS packet sequence for multiplexed stream data. As shown in FIG. 5C, each source packet 502 is 192 bytes long and includes one TS packet 501, shown in FIG. 5B, and a four-byte long header (TP_Extra_Header) 502H. When the TS packet 501 is recorded on the BD-ROM disc 101, a source packet 502 is constituted by attaching a header 502H to the TS packet 501. The header 502H includes an ATS (Arrival_Time_Stamp). The "ATS" is time information used by the playback device 102 as follows. When a source packet 502 is sent from the BD-ROM disc 101 to a system target decoder in the playback device 102, the TS packet 502P is extracted from the source packet 502 and transferred to a PID filter in the system target decoder. The ATS in the header 502H indicates the time at which this transfer is to begin. The "system target decoder" is a device that decodes multiplexed stream data one elementary stream at a time. Details regarding the system target decoder and its use of the ATS are provided below.

Figure 32:
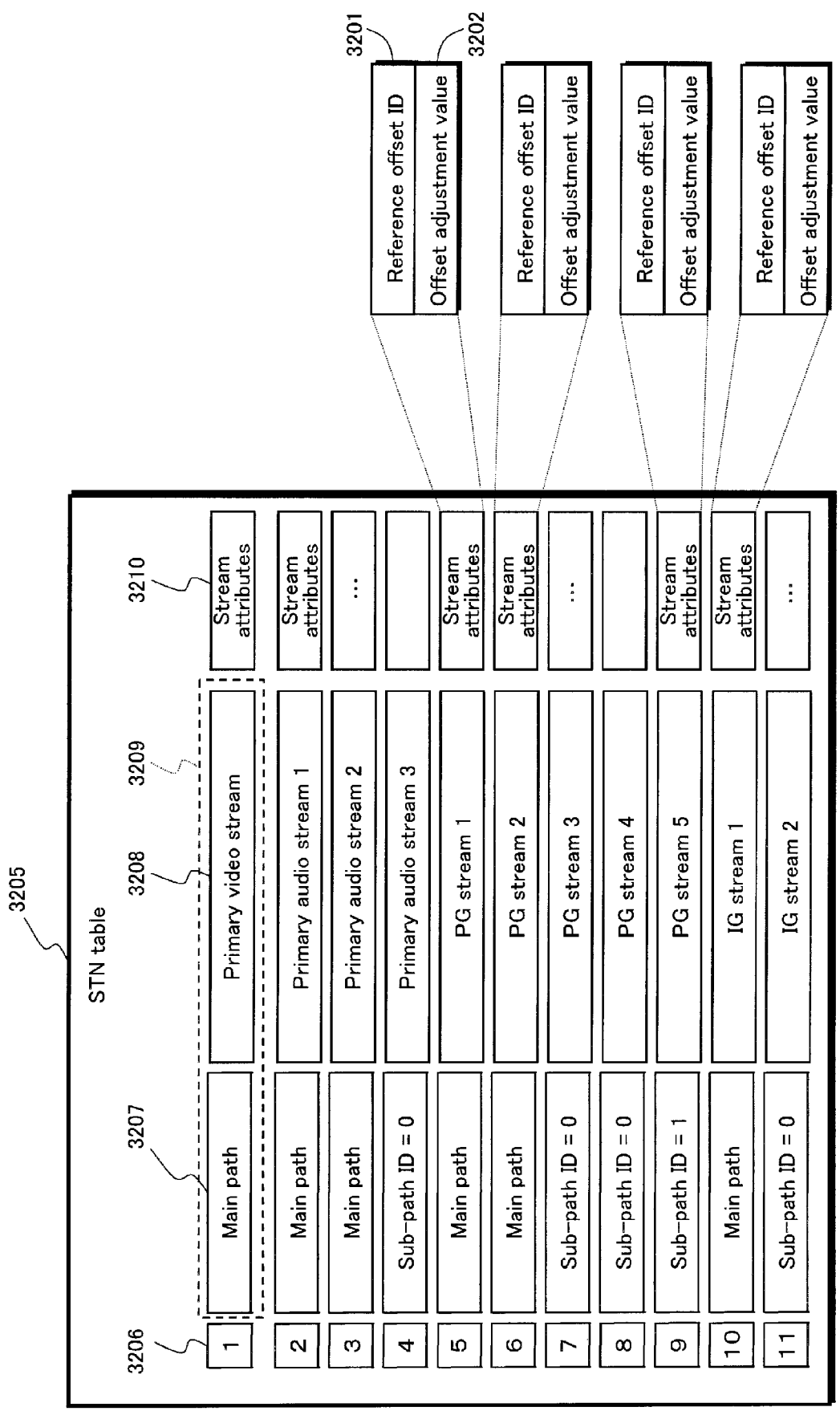
FIG. 32 is a schematic diagram showing an STN table 3205 included in a main path 3101 of the 3D playlist file shown in FIG. 31.

FIG. 5D is a schematic diagram of a sector group, in which a sequence of source packets 502 is consecutively recorded, in the volume area 202B of the BD-ROM disc 101. As shown in FIG. 5D, 32 source packets 502 are recorded at a time as a sequence in three consecutive sectors 521, 522, and 523. This is because the data amount for 32 source packets, i.e. 192 bytes×32=6144 bytes, is the same as the total size of three sectors, i.e. 2048 bytes×3=6144 bytes. 32 source packets 502 that are recorded in this way in three consecutive sectors 521, 522, and 523 are referred to as an "aligned unit" 520. The playback device 102 reads source packets 502 from the BD-ROM disc 101 by each aligned unit 520, i.e. 32 source packets at a time. Also, the sector group 521, 522, 523, . . . is divided into 32 pieces in order from the top, and each forms one error correction code block 530. The BD-ROM drive 121 performs error correction processing for each ECC block 530.

<<Data Structure of PG Stream>>

Figure 6:
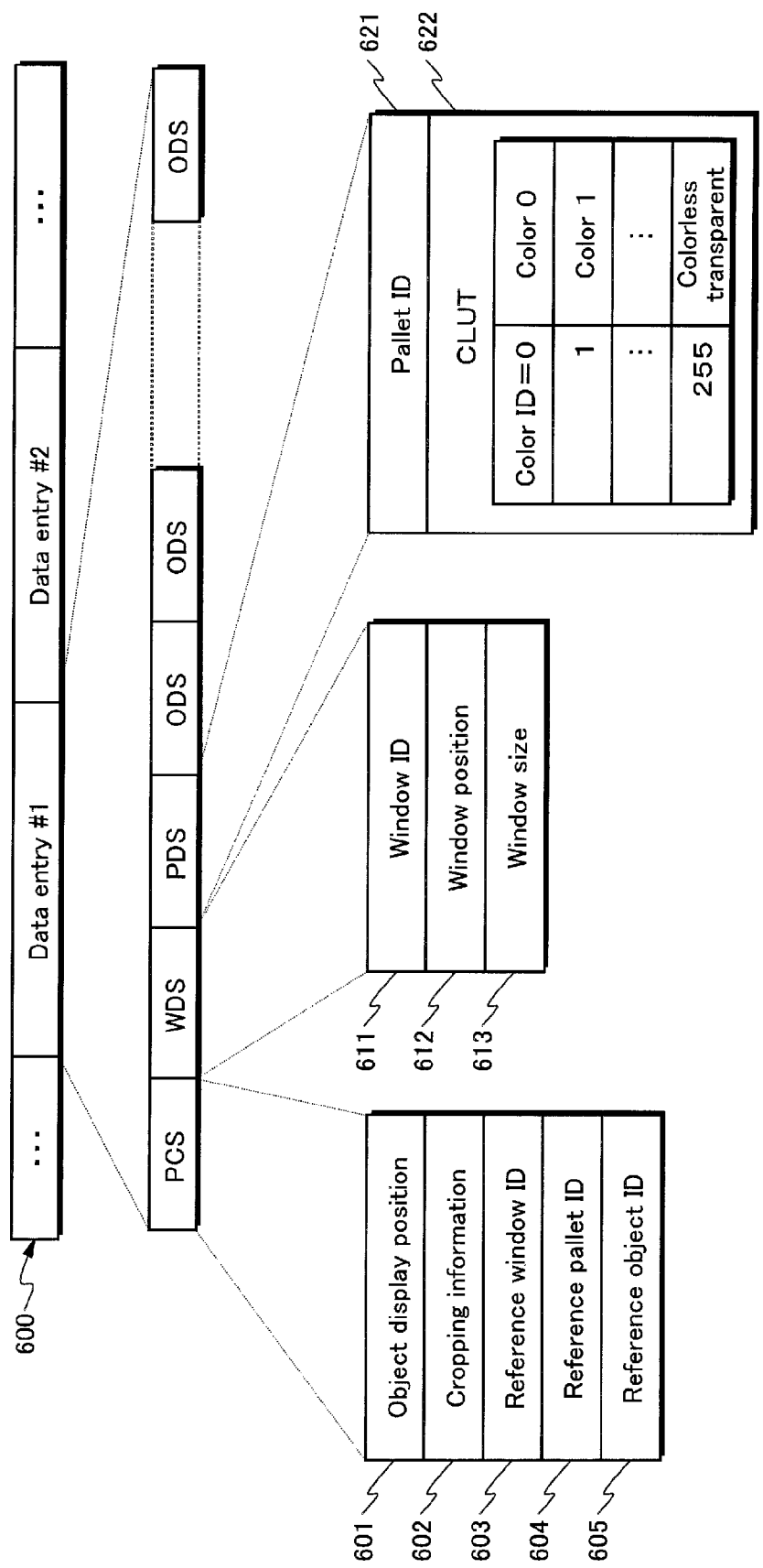
FIG. 6 is a schematic diagram showing the data structure of the PG stream 600.

FIG. 6 is a schematic diagram showing the data structure of the PG stream 600. As shown in FIG. 6, the PG stream 600 includes a plurality of data entries #1, #2, . . . . Each data entry represents a display unit (display set) of the PG stream 600, and is composed of data that is necessary for the playback device 102 to form one graphics plane. Here "graphics plane"

is plane data generated from graphics data representing 2D graphics images. "Plane data" is a two-dimensional array of pixel data. The size of the array is the same as the resolution of the video frame. A set of pixel data is formed by a combination of a chromatic coordinate value and an α value (opaqueness). The chromatic coordinate value is expressed as an RGB value or a YCrCb value. Types of graphics planes include a PG plane, IG plane, image plane, and On-Screen Display (OSD) plane. A PG plane is generated from a PG stream in the main TS. An IG plane is generated from an IG stream in the main TS. An image plane is generated in accordance with a BD-J object. An OSD plane is generated in accordance with firmware in the playback device 102.

Referring again to FIG. 6, each data entry includes a plurality of functional segments. These functional segments include, in order from start, a Presentation Control Segment (PCS), Window Define Segment (WDS), Pallet Define Segment (PDS), and Object Define Segment (ODS).

WDS defines a rectangular region inside the graphics plane, i.e. a window. More specifically, WDS includes a window ID 611, a window position 612, and a window size 613. The window ID 611 is identification information (ID) of the WDS. The window position 612 indicates the position of a window in the graphics plane by, for example, coordinates of the upper-left corner of the window. The window size 613 indicates the height and width of the window.

PDS defines the correspondence between a predetermined type of color ID and a chromatic coordinate value (for example, luminance Y, red-difference Cr, blue-difference Cb, opaqueness α). Specifically, the PDS includes a pallet ID 621 and a color look-up table (CLUT) 622. The pallet ID 621 is the ID of the PDS. The CLUT 622 is a table showing a list of colors that can be used in rendering the graphics object. In the CLUT 622, 256 colors can be registered, wherein color IDs from "0" to "255" are assigned to the respective 256 colors. Note that color ID=255 is constantly assigned to "colorless transparent".

In general, a plurality of ODSs represent one graphics object. "Graphics object" is data that represents a graphics image by the correspondence between a pixel code and a color ID. The graphics object is divided into parts after it is compressed by the run-length coding method, and the parts are distributed to each ODS. Each ODS further includes an object ID, namely an ID of the graphics object.

The PCS shows details of a display set that belongs to the same data entry, and in particular defines a screen structure that uses graphics objects. Types of screen structure include Cut-In/Out, Fade-In/Out, Color Change, Scroll, and Wipe-In/Out. Specifically, the PCS includes an object display position 601, cropping information 602, reference window ID 603, reference pallet ID 604, and reference object ID 605. The object display position 601 indicates a position in the graphics plane at which the graphics object is to be displayed, by, for example, coordinates of the upper-left corner of an area in which the graphics object is to be displayed. The cropping information 602 indicates the range of a rectangular part that is to be cut out of the graphics object by the cropping process. The range is defined by, for example, coordinates of the upper-left corner, height and width. Actually, the part can be rendered at a position indicated by the object display position 601. The reference window ID 603, reference pallet ID 604, and reference object ID 605 indicate IDs of the WDS, PDS, and graphics object that are to be referred to in the graphics object rendering process, respectively. The content provider indicates the structure of the screen to the playback device 102 by using these parameters in the PCS. This allows the playback device 102 to realize a display effect whereby "a certain subtitle gradually disappears, and the next subtitle is displayed".

<<Data Structure of IG Stream>>

Referring yet again to FIG. 4, the IG stream 404 includes an Interactive Composition Segment (ICS), PDS, and ODS. PDS and ODS are the same functional segments as included in the PG stream 403. In particular, a graphics object that includes an ODS represents a GUI graphic element, such as a button, pop-up menu, etc., that forms an interactive screen. An ICS defines interactive operations that use these graphics objects. Specifically, an ICS defines the states that each graphics object, such as a button, pop-up menu, etc. can take when changed in response to user operation, states such as normal, selected, and active. An ICS also includes button information. Button information includes a command that the playback device is to perform when the user performs a certain operation on the button or the like.

<<Data Structure of Video Stream>>

Each of the pictures included in the video stream represents one frame or one field and is compressed by a video compression encoding method, such as MPEG-2, MPEG-4 AVC, etc. This compression uses the picture's spatial or temporal redundancy. Here, picture encoding that only uses the picture's spatial redundancy is referred to as "intra-picture encoding". On the other hand, picture encoding that uses temporal redundancy, i.e. the similarity between data for a plurality of pictures displayed sequentially, is referred to as "inter-picture predictive encoding". In inter-picture predictive encoding, first, a picture earlier or later in presentation time is assigned to the picture to be encoded as a reference picture. Next, a motion vector is detected between the picture to be encoded and the reference picture, and then motion compensation is performed on the reference picture using the motion vector. Furthermore, the difference value between the picture obtained by motion compensation and the picture to be encoded is sought, and spatial redundancy is removed using the difference value. In this way, the amount of data for each picture is compressed.

Figure 7:
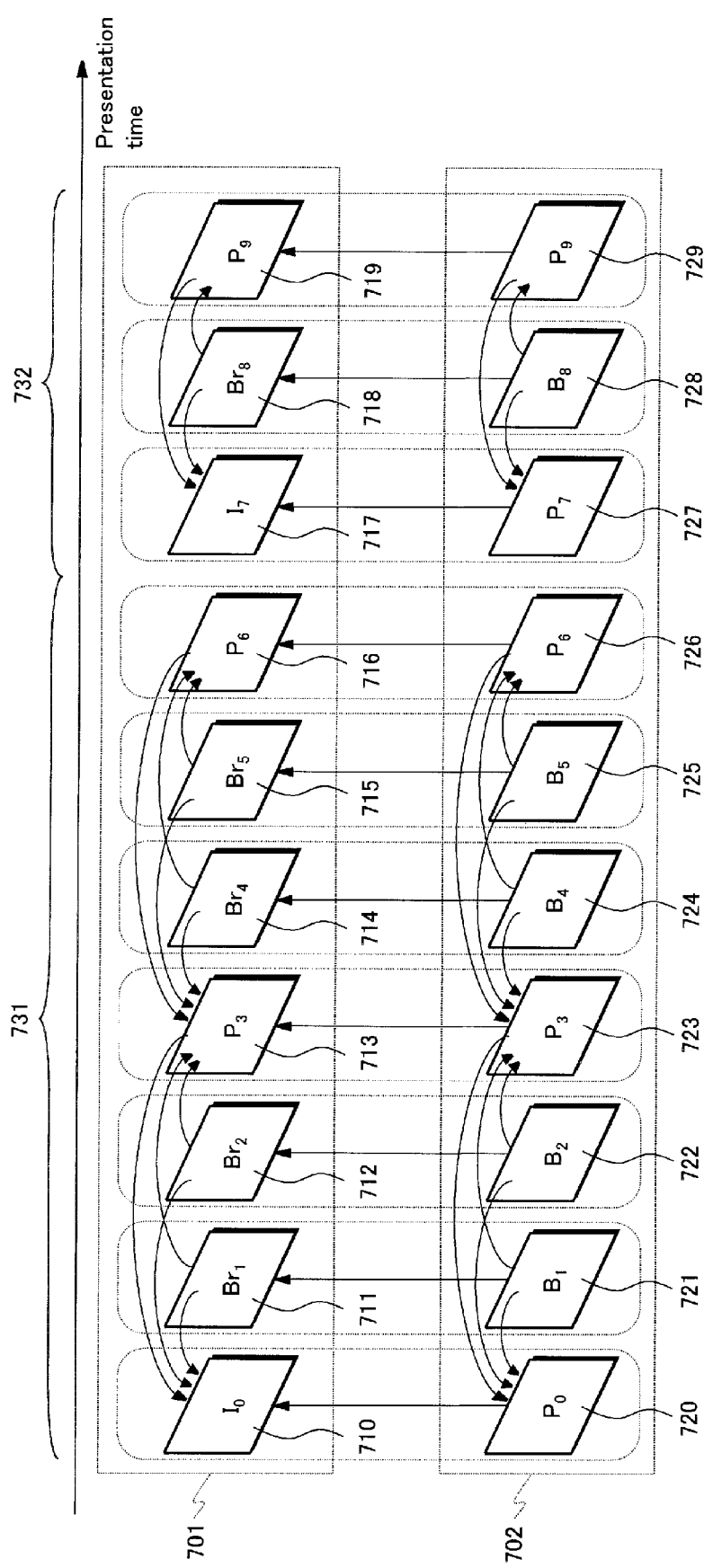
FIG. 7 is a schematic diagram showing the pictures for a base-view video stream 701 and a right-view video stream 702 in order of presentation time.

FIG. 7 is a schematic diagram showing the pictures for a base-view video stream 701 and a right-view video stream 702 in order of presentation time. As shown in FIG. 7, the base-view video stream 701 includes pictures 710, 711, 712, . . . , 719 (hereinafter "base-view pictures"), and the right-view video stream 702 includes pictures 720, 721, 722, . . . , 729 (hereinafter "right-view pictures"). The base-view pictures 710-719 are typically divided into a plurality of GOPs 731 and 732. A "GOP" refers to a sequence of pictures having an I picture at the top of the sequence. In addition to an I picture, a GOP typically includes P pictures and B pictures. Here "I (Intra) picture" refers to a picture compressed by the intra-picture encoding. "P (Predictive) picture" refers to a picture compressed by the inter-picture predictive encoding by using another picture whose presentation time is before the presentation time of the picture as a reference picture. "B (Bidirectionally Predictive) picture" refers to a picture compressed by the inter-picture predictive encoding by using two pictures whose presentation times are before or after the presentation time of the picture as reference pictures. In particular, a B picture which is used as a reference picture for another picture in the inter-picture predictive encoding is referred to as "Br (reference B) picture".

In the example shown in FIG. 7, the base-view pictures in the GOPs 731 and 732 are compressed in the following order. In the first GOP 731, the top base-view picture is compressed as $I_0$ picture 710. The subscripted number indicates the serial number allotted to each picture in the order of presentation time. Next, the fourth base-view picture is compressed as $P_3$ picture 713 using $I_0$ picture 710 as a reference picture. The arrows shown in FIG. 7 indicate that the picture at the head of the arrow is a reference picture for the picture at the tail of the arrow. Next, the second and third base-view pictures are respectively compressed as $Br_1$ picture 711 and $Br_2$ picture 712, using both $I_0$ picture 710 and $P_3$ picture 713 as reference pictures. Furthermore, the seventh base-view picture is compressed as $P_6$ picture 716 using $P_3$ picture 713 as a reference picture. Next, the fourth and fifth base-view pictures are respectively compressed as $Br_4$ picture 714 and $Br_5$ picture 715, using both $P_3$ picture 713 and $P_6$ picture 716 as reference pictures. Similarly, in the second GOP 732, the top base-view picture is first compressed as $I_7$ picture 717. Next, the third base-view picture is compressed as $P_9$ picture 719 using $I_7$ picture 717 as a reference picture. Subsequently, the second base-view picture is compressed as $Br_8$ picture 718 using both $I_7$ picture 717 and $P_9$ picture 719 as reference pictures.

In the base-view video stream 701, each GOP 731 and 732 always contains an I picture at the top, and thus base-view pictures can be decoded GOP by GOP. For example, in the first GOP 731, the $I_0$ picture 710 is first decoded independently. Next, the $P_3$ picture 713 is decoded using the decoded $I_0$ picture 710. Then the $Br_1$ picture 711 and $Br_2$ picture 712 are decoded using both the decoded $I_0$ picture 710 and $P_3$ picture 713. The subsequent picture group 714, 715, . . . is similarly decoded. In this way, the base-view video stream 701 can be decoded independently and furthermore can be randomly accessed in units of GOPs.

As further shown in FIG. 7, the right-view pictures 720-729 are compressed by inter-picture predictive encoding. However, the encoding method differs from the encoding method for the base-view pictures 710-719, since in addition to redundancy in the temporal redundancy of video images, redundancy between the left and right-video images is also used. Specifically, as shown by the arrows in FIG. 7, the reference picture for each of the right-view pictures 720-729 is not selected from the right-view video stream 702, but rather from the base-view video stream 701. In particular, the presentation time is substantially the same for each of the right-view pictures 720-729 and the corresponding base-view picture selected as a reference picture. These pictures represent a right view and a left view for the same scene of a 3D video image, i.e. a parallax video image. The right-view pictures 720-729 and the base-view pictures 710-719 are thus in one-to-one correspondence. In particular, the GOP structure is the same between these pictures.

In the example shown in FIG. 7, the top right-view picture in the first GOP 731 is compressed as $P_0$ picture 720 using $I_0$ picture 710 in the base-view video stream 701 as a reference picture. These pictures 710 and 720 represent the left view and right view of the top frame in the 3D video images. Next, the fourth right-view picture is compressed as $P_3$ picture 723 using $P_3$ picture 713 in the base-view video stream 701 and $P_0$ picture 720 as reference pictures. Next, the second right-view picture is compressed as $B_1$ picture 721, using $Br_1$ picture 711 in the base-view video stream 701 in addition to $P_0$ picture 720 and $P_3$ picture 723 as reference pictures. Similarly, the third right-view picture is compressed as $B_2$ picture 722, using $Br_2$ picture 712 in the base-view video stream 701 in addition to $P_0$ picture 720 and $P_3$ picture 730 as reference pictures. For each of the remaining right-view pictures 724-729, a base-view picture with a presentation time substantially the same as the right-view picture is similarly used as a reference picture.

The revised standards for MPEG-4 AVC/H.264, called Multiview Video Coding (MVC), are known as a video compression encoding method that makes use of correlation between left and right-video images as described above. MVC was created in July of 2008 by the Joint Video Team (JVT), a joint project between ISO/IEC MPEG and ITU-T VCEG, and is a standard for collectively encoding video that can be seen from a plurality of perspectives. With MVC, not only is temporal similarity in video images used for inter-video predictive encoding, but so is similarity between video images from differing perspectives. This type of predictive encoding has a higher video compression ratio than predictive encoding that individually compresses data of video images seen from each perspective.

As described above, a base-view picture is used as a reference picture for compression of each of the right-view pictures 720-729. Therefore, unlike the base-view video stream 701, the right-view video stream 702 cannot be decoded independently. On the other hand, however, the difference between parallax video images is generally very small; that is, the correlation between the left view and the right view is high. Accordingly, the right-view pictures generally have a significantly higher compression rate than the base-view pictures, meaning that the amount of data is significantly smaller.

The depth maps included in a depth map stream are in one-to-one correspondence with the base-view pictures 710-719 and each represent a depth map for the 2D video image in the corresponding base-view picture. The depth maps are compressed by a video compression encoding method, such as MPEG-2, MPEG-4 AVC, etc., in the same way as the base-view pictures 710-719. In particular, inter-picture predictive encoding is used in this encoding method. In other words, each depth map is compressed using another depth map as a reference picture. Furthermore, the depth map stream is divided into units of GOPs in the same way as the base-view video stream 701, and each GOP always contains an I picture at the top. Accordingly, depth maps can be decoded GOP by GOP. However, since a depth map itself is only information representing the depth of each part of a 2D video image pixel by pixel, the depth map stream cannot be used independently for playback of video images.

For example, as in the two primary video streams 311R and 311D shown in FIG. 3B, the right-view video stream and depth map stream that correspond to the same base-view video stream are compressed with the same encoding method. For example, if the right-view video stream is encoded in MVC format, the depth map stream is also encoded in MVC format. In this case, during playback of 3D video images, the playback device 102 can smoothly switch between L/R mode and depth mode, while maintaining a constant encoding method.

Figure 8:
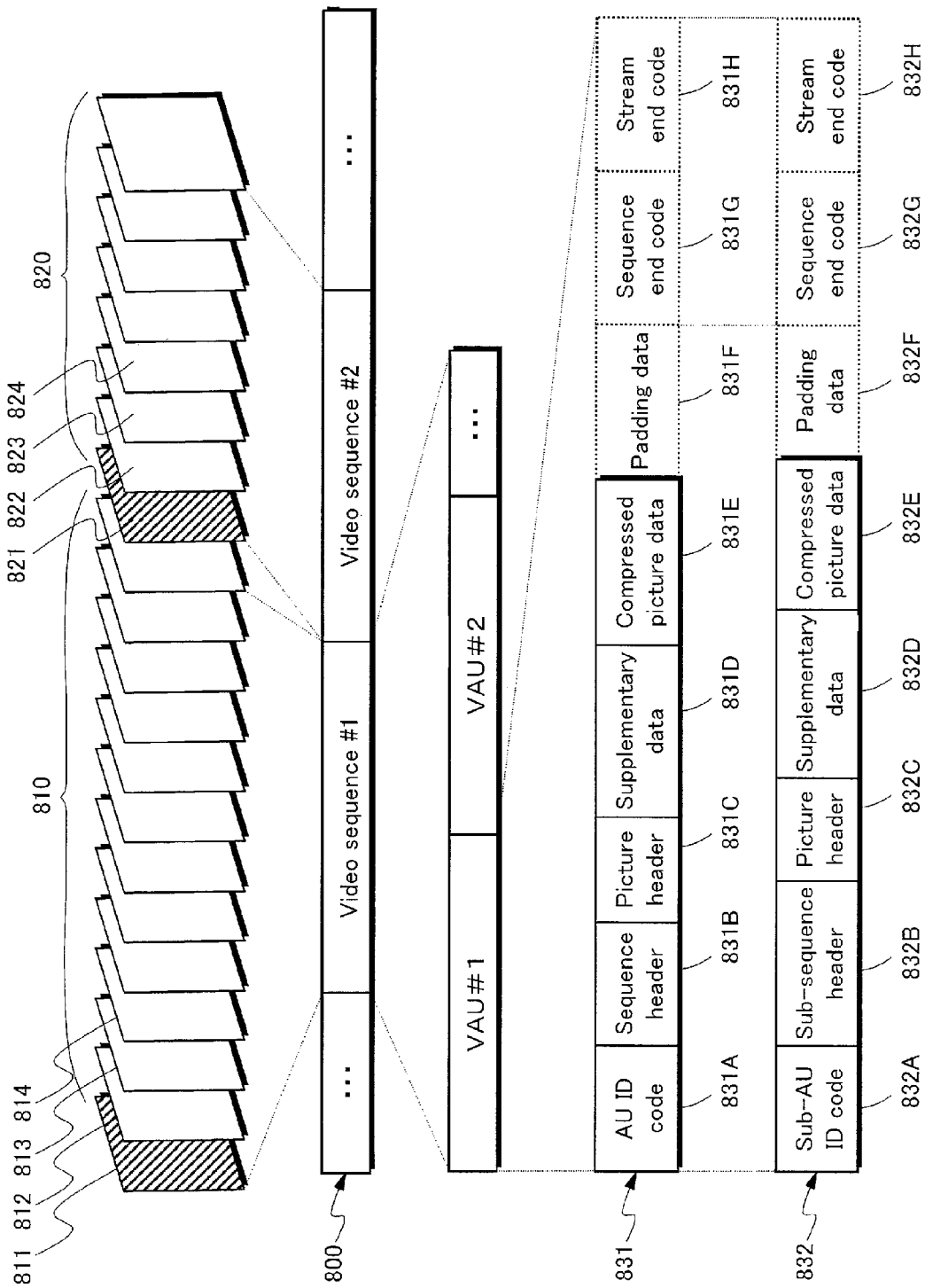
FIG. 8 is a schematic diagram showing details on a data structure of a video stream 800.

FIG. 8 is a schematic diagram showing details on a data structure of a video stream 800. This data structure is substantially the same for the base-view video stream and the dependent-view video stream. As shown in FIG. 8, the video stream 800 is generally composed of a plurality of video sequences #1, #2, . . . . A "video sequence" is a combination of pictures 811, 812, 813, 814, . . . that constitute a single GOP 810 and to which additional information, such as a header, has been individually attached. The combination of this additional information and a picture is referred to as a "video access unit (VAU)". That is, in the GOPs 810 and 820, a single VAU #1, #2, . . . is formed for each picture. Each picture can be read from the video stream 800 in units of VAUs.

FIG. 8 further shows the structure of VAU #1 831 located at the top of each video sequence in the base-view video stream. The VAU #1 831 includes an access unit (AU) identification code 831A, sequence header 831B, picture header 831C, supplementary data 831D, and compressed picture data 831E. Except for not including a sequence header 831B, VAUs from the second VAU #2 on have the same structure as VAU #1 831. The AU identification code 831A is a predetermined code indicating the top of the VAU #1 831. The sequence header 831B, also referred to as a GOP header, includes an identification number for the video sequence #1 which includes the VAU #1 831. The sequence header 831B further includes information shared by the whole GOP 810, e.g. resolution, frame rate, aspect ratio, and bit rate. The picture header 831C indicates its own identification number, the identification number for the video sequence #1, and information necessary for decoding the picture, such as the type of encoding method. The supplementary data 831D includes additional information regarding matters other than the decoding of the picture, for example closed caption text information, information on the GOP structure, and time code information. In particular, the supplementary data 831D includes decoding switch information (details provided below). A plurality of pieces of supplementary data 831D may be set in one VAU depending on the type of data contained therein. The compressed picture data 831E includes a base-view picture. Additionally, the VAU #1 831 may include any or all of padding data 831F, a sequence end code 831G, and a stream end code 831H as necessary. The padding data 831F is dummy data. By adjusting the size of the padding data 831F in conjunction with the size of the compressed picture data 831E, the bit rate of the VAU #1 831 can be maintained at a predetermined value. The sequence end code 831G indicates that the VAU #1 831 is located at the end of the video sequence #1. The stream end code 831H indicates the end of the base-view video stream 800.

FIG. 8 also shows the structure of a VAU #1 832 located at the top of each video sequence in the dependent-view video stream. The VAU #1 832 includes a sub-AU identification code 832A, sub-sequence header 832B, picture header 832C, supplementary data 832D, and compressed picture data 832E. Except for not including a sub-sequence header 832B, VAUs from the second VAU #2 on have the same structure as VAU #1 832. The sub-AU identification code 832A is a predetermined code indicating the top of the VAU #1 832. The sub-sequence header 832B includes an identification number for the video sequence #1 which includes the VAU #1 832. The sub-sequence header 832B further includes information shared by the whole GOP 810, e.g. resolution, frame rate, aspect ratio, and bit rate. These values are the same as the values set for the corresponding GOP in the base-view video stream, i.e. the values shown by the sequence header 831B in the VAU #1 831. The picture header 832C indicates its own identification number, the identification number for the video sequence #1, and information necessary for decoding the picture, such as the type of encoding method. The supplementary data 832D includes only offset metadata (details provided below). Here the supplementary data 832D is one type of supplementary data, and there is another type of supplementary data that includes additional information regarding matters other than the decoding of the picture, for example, closed caption text information, information on the GOP structure, time code information, and decoding switch information. The compressed picture data 832E includes a dependent-view picture. Additionally, the VAU #1 832 may include any or all of padding data 832F, a sequence end code 832G, and a stream end code 832H as necessary. The padding data 832F is dummy data. By adjusting the size of the padding data 832F in conjunction with the size of the compressed picture data 832E, the bit rate of the VAU #1 832 can be maintained at a predetermined value. The sequence end code 832G indicates that the VAU #1 832 is located at the end of the video sequence #1. The stream end code 832H indicates the end of the dependent-view video stream 800.

The specific content of each component in a VAU differs according to the encoding method of the video stream 800. For example, when the encoding method is MPEG-4 AVC or MVC, the components in the VAUs shown in FIG. 8 are composed of a single Network Abstraction Layer (NAL) unit. Specifically, the AU identification code 831A, sequence header 831B, picture header 831C, supplementary data 831D, compressed picture data 831E, padding data 831F, sequence end code 831G, and stream end code 831H respectively correspond to an Access Unit (AU) delimiter, Sequence Parameter Set (SPS), Picture Parameter Set (PPS), Supplemental Enhancement Information (SEI), View Component, Filler Data, End of Sequence, and End of Stream. In particular, in the VAU #1 832, the supplementary data 832D including the offset metadata is composed of one NAL unit, wherein the NAL unit does not include data other than the offset metadata.

Figure 9:
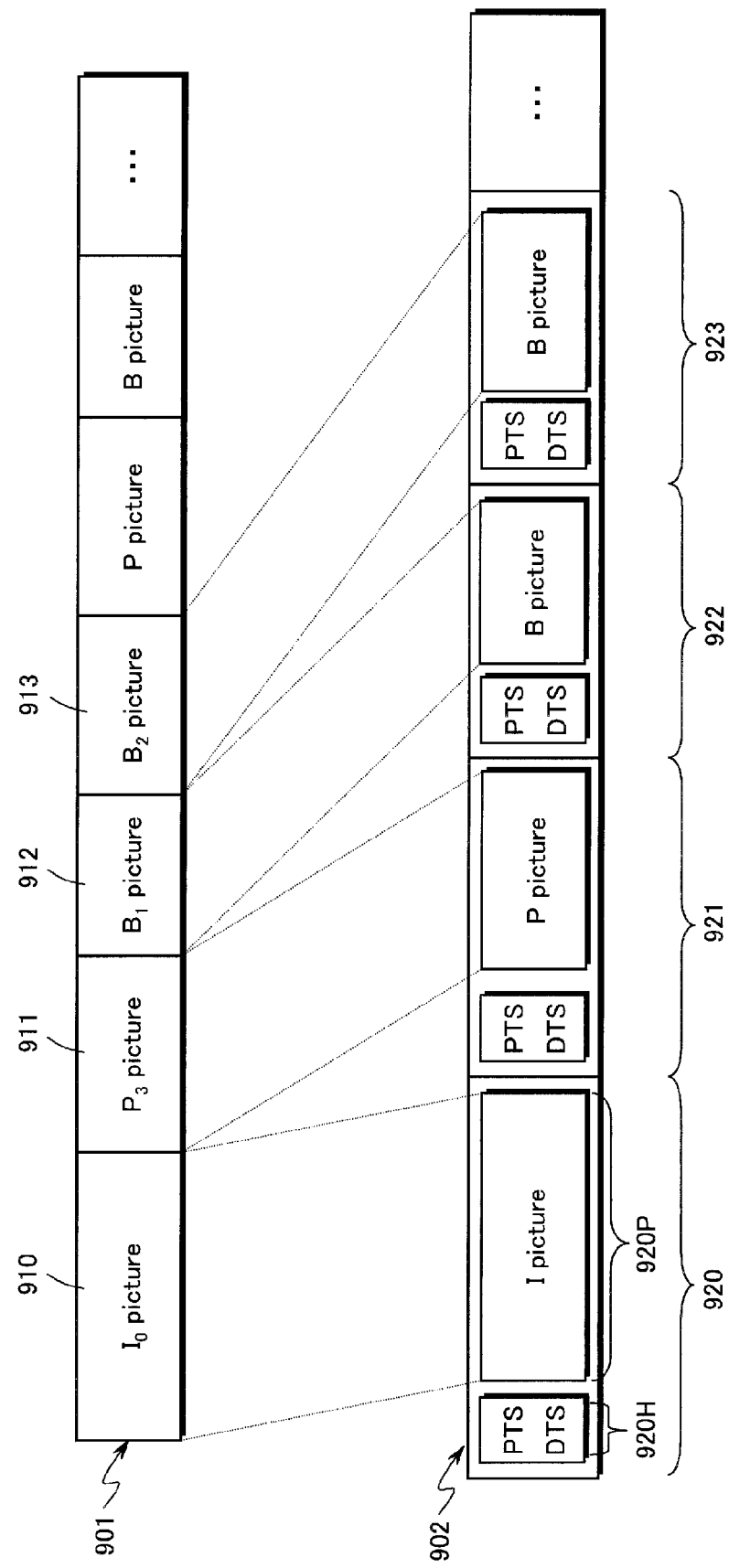
FIG. 9 is a schematic diagram showing details on a method for storing a video stream 901 into a PES packet sequence 902.

FIG. 9 is a schematic diagram showing details on a method for storing a video stream 901 into a PES packet sequence 902. This storage method is the same for the base-view video stream and the dependent-view video stream. As shown in FIG. 9, in the actual video stream 901, pictures are multiplexed in the order of encoding, not in the order of presentation time. For example, in the VAUs in the base-view video stream, as shown in FIG. 9, $I_0$ picture 910, $P_3$ picture 911, $B_1$ picture 912, $B_2$ picture 913, . . . are stored in order from the top. The subscripted number indicates the serial number allotted to each picture in order of presentation time. $I_0$ picture 910 is used as a reference picture for encoding $P_3$ picture 911, and both $I_0$ picture 910 and $P_3$ picture 911 are used as reference pictures for encoding $B_1$ picture 912 and $B_2$ picture 913. Each of these VAUs is stored as a different PES packet 920, 921, 922, 923, . . . . Each PES packet 920, . . . includes a PES payload 920P and a PES header 920H. Each VAU is stored in a PES payload 920P. Each PES header 920H includes a presentation time, (Presentation Time-Stamp, or PTS), and a decoding time (Decoding Time-Stamp, or DTS), for the picture stored in the PES payload 920P in the same PES packet 920.

As with the video stream 901 shown in FIG. 9, the other elementary streams shown in FIGS. 3 and 4 are stored in PES payloads in a sequence of PES packets. Furthermore, the PES header in each PES packet includes the PTS for the data stored in the PES payload for the PES packet.

Figure 10:
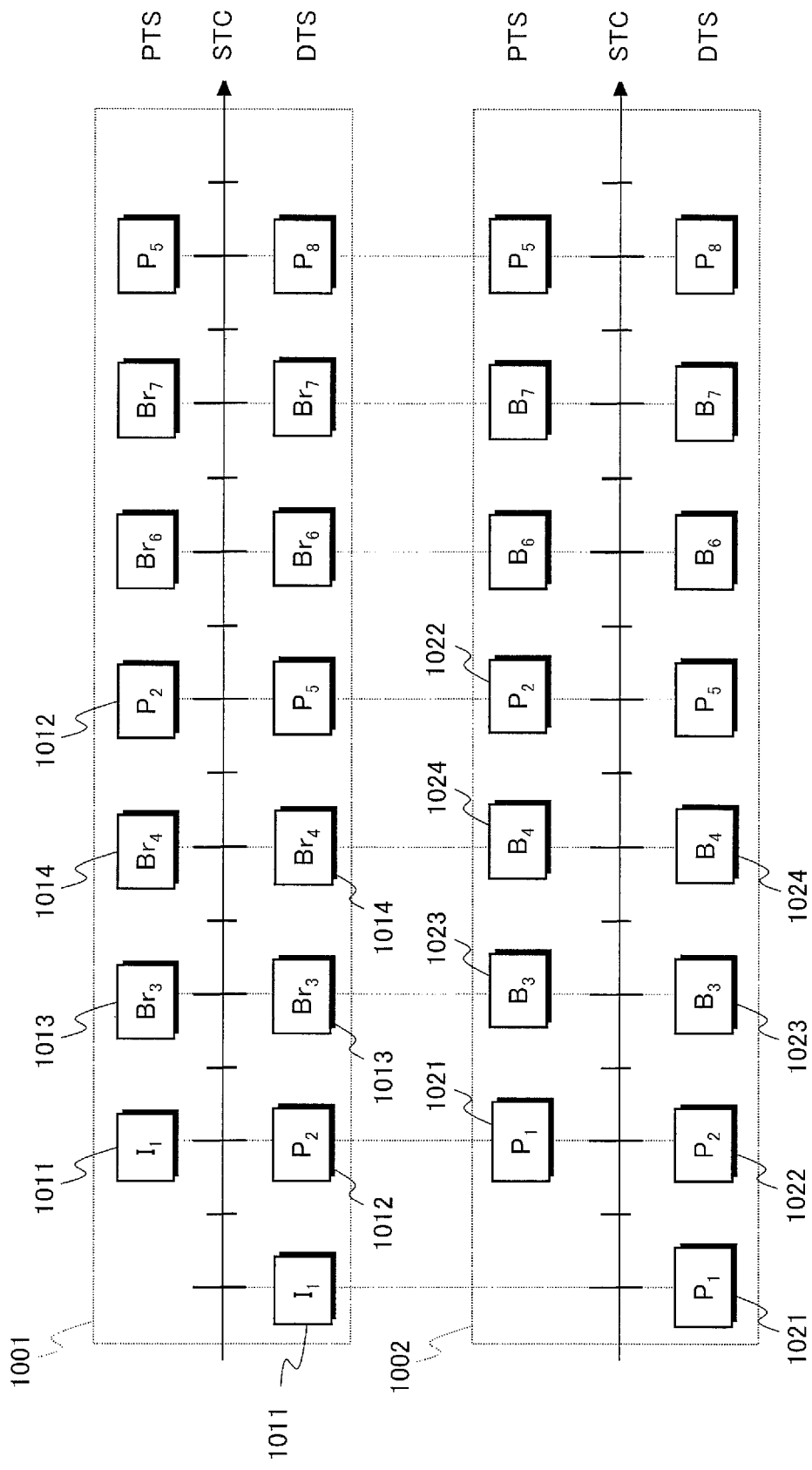
FIG. 10 is a schematic diagram showing correspondence between PTSs and DTSs assigned to each picture in a base-view video stream 1001 and a dependent-view video stream 1002.

FIG. 10 is a schematic diagram showing correspondence between PTSs and DTSs assigned to each picture in a base-view video stream 1001 and a dependent-view video stream 1002. As shown in FIG. 10, between the video streams 1001 and 1002, the same PTSs and DTSs are assigned to a pair of pictures representing the same frame or field in a 3D video image. For example, the top frame or field in the 3D video image is rendered from a combination of $I_1$ picture 1011 in the base-view video stream 1001 and $P_1$ picture 1021 in the dependent-view video stream 1002. Accordingly, the PTS and DTS for these two pictures 1011 and 1021 are the same. The subscripted numbers indicate the serial number allotted to each picture in the order of DTSs. Also, when the dependent-view video stream 1002 is a depth map stream, $P_1$ picture 1021 is replaced by an I picture representing a depth map for the $I_1$ picture 1011. Similarly, the PTS and DTS for the pair of second pictures in the video streams 1001 and 1002, i.e. $P_2$ pictures 1012 and 1022, are the same. The PTS and DTS are both the same for the pair of third pictures in the video streams 1001 and 1002, i.e. $Br_a$ picture 1013 and $B_3$ picture 1023. The same is also true for the pair $Br_4$ picture 1014 and $B_4$ picture 1024.

A pair of VAUs that include pictures for which the PTS and DTS are the same between the base-view video stream 1001 and the dependent-view video stream 1002 is called a "3D VAU". Using the allocation of PTSs and DTSs shown in FIG. 10, it is easy to cause the decoder in the playback device 102 in 3D playback mode to process the base-view video stream 1001 and the dependent-view video stream 1002 in parallel in units of 3D VAUs. In this way, the decoder definitely processes a pair of pictures representing the same frame or field in a 3D video image in parallel. Furthermore, the sequence header in the 3D VAU at the top of each GOP includes the same resolution, the same frame rate, and the same aspect ratio. In particular, this frame rate is equal to the value when the base-view video stream 1001 is decoded independently in 2D playback mode.

[Offset Metadata]

Figure 11:
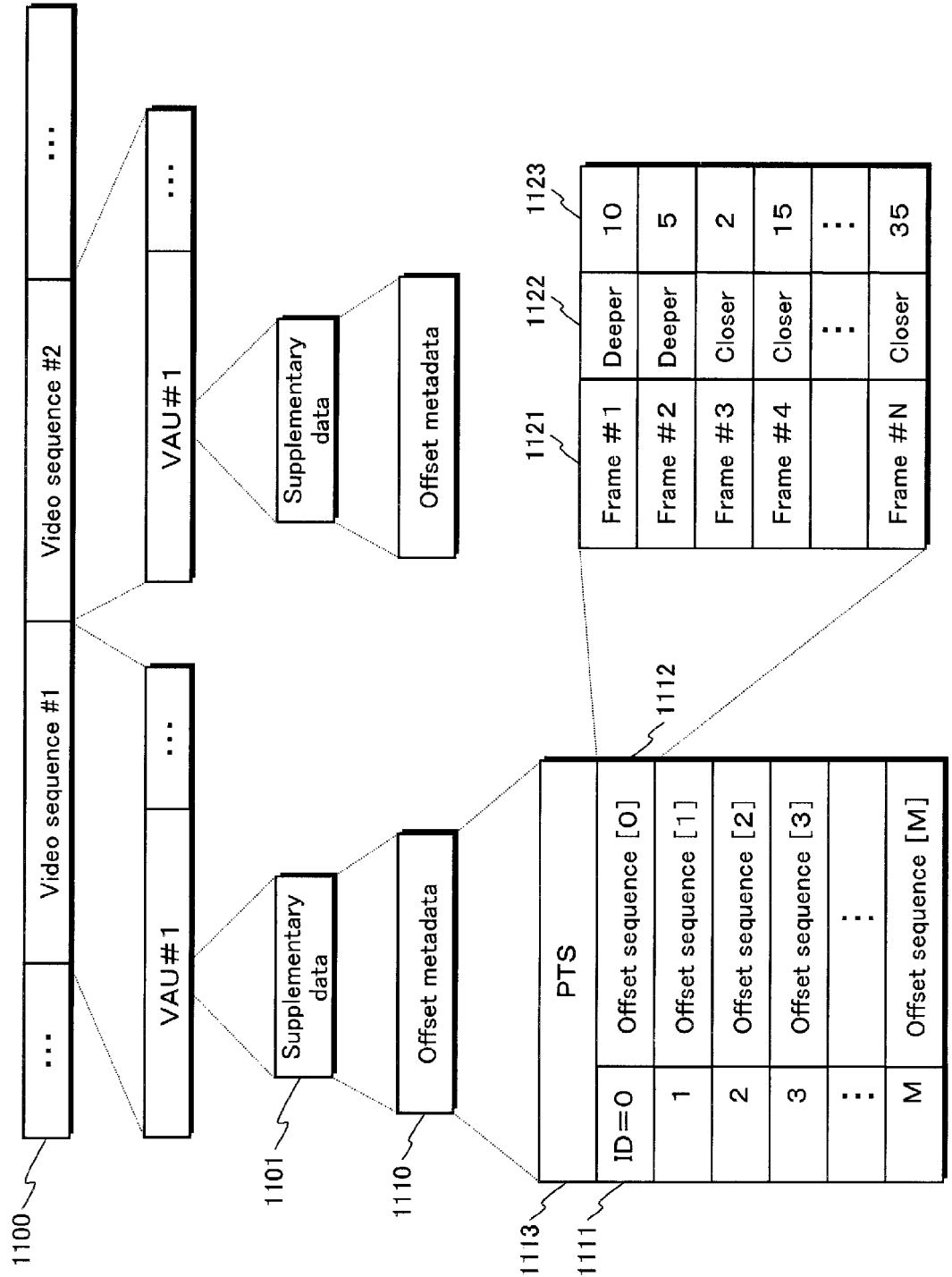
FIG. 11 is a schematic diagram showing a data structure of offset metadata 1110 included in a dependent-view video stream 1100.

FIG. 11 is a schematic diagram showing a data structure of offset metadata 1110 included in a dependent-view video stream 1100. FIG. 12 is a table showing syntax of this offset metadata 1110. As shown in FIG. 11, the offset metadata 1110 is stored in the supplementary data 1101 of VAU #1 located at the top of each video sequence (i.e., each GOP). As shown in FIGS. 11 and 12, the offset metadata 1110 includes a PTS 1111, offset sequence IDs 1112, and offset sequences 1113. The PTS 1111 is the same as a PTS of a frame represented by compressed picture data in VAU #1, namely a PTS of the first frame of each GOP.

The offset sequence IDs 1112 are serial numbers 0, 1, 2, ..., M allotted in order to the offset sequences 1313. The letter M represents an integer greater than or equal to 1 and indicates the total number of offset sequences 1113 (number_of_offset_sequence). An offset sequence ID 1112 is allocated to each graphics plane to be combined in a video plane. In this way, an offset sequence 1113 is associated with each graphics plane. Here a "video plane" refers to plane data generated from a picture included in a video sequence, namely to a two-dimensional array of pixel data. The size of the array is the same as the resolution of the video frame. A set of pixel data is formed by a combination of a chromatic coordinate value (an RGB value or a YCrCb value) and an α value.

Each offset sequence 1113 is a correspondence table between frame numbers 1121 and offset information 1122 and 1123. Frame numbers 1121 are serial numbers 1, 2, ..., N allocated in order of presentation to frames #1, #2, ..., N represented by a single video sequence (for example, video sequence #1). In FIG. 11, the frame number 1121 is represented as an integer variable "i". The letter N represents an integer greater than or equal to one and indicates the total number of frames included in the video sequence (number_of_displayed_frames_in_GOP). The pieces of offset information 1122 and 1123 are control information defining offset control for a single graphics plane.

"Offset control" refers to a process to provide left and right offsets for the horizontal coordinates in a graphics plane and combine the resulting planes respectively with the base-view video plane and dependent-view video plane. "Providing horizontal offsets to a graphics plane" refers to horizontally shifting each piece of pixel data in the graphics plane. From a single graphics plane, this generates a pair of graphics planes representing a left view and a right view. The presentation position of each element in the 2D graphics images played back from this pair of planes is shifted to the left or right from the original presentation position. The viewer is made to perceive a pair of a left view and a right view as a single 3D graphics image due to the binocular parallax produced by these shifts.

An offset is determined by a direction and a size. Accordingly, as shown in FIGS. 11 and 12, each piece of offset information includes an offset direction (Plane_offset_direction) 1122 and an offset value (Plane_offset_value) 1123. The offset direction 1122 indicates whether a 3D graphics image is closer to the viewer than the screen or further back. Whether the presentation position in the left view and the right view is shifted to the left or to the right from the original presentation position of the 2D graphics image depends on the value of the offset direction 1122. The offset value 1123 indicates the number of horizontal pixels of the distance between the original presentation position of the 2D graphics image and the presentation position of each of the left view and the right view.

FIGS. 13A and 13B are schematic diagrams showing offset controls for a PG plane 1310 and IG plane 1320 respectively. Via these offset controls, two types of graphics planes, 1310 and 1320, are respectively combined with the left-view video plane 1301 and the right-view video plane 1302. A "left-view/right-view video plane" refers to a video plane that represents a left view/right view and is generated from a combination of the base-view video stream and the dependent-view video stream. In the following description, it is assumed that a subtitle 1311 indicated by the PG plane 1310 is displayed closer than the screen, and a button 1321 indicated by the IG plane 1320 is displayed further back than the screen.

As shown in FIG. 13A, a right offset is provided to the PG plane 1310. Specifically, the position of each piece of pixel data in the PG plane 1310 is first shifted to the right (virtually) from the corresponding position of the pixel data in the left-view video plane 1301 by a number of pixels SFP equal to the offset value. Next, a strip 1512 (virtually) protruding from the right edge of the range of the left-view video plane 1301 is "cut off" from the right edge of the PG plane 1310. In other words, the pixel data for this region 1312 is discarded. Conversely, a transparent strip 1513 is added to the left edge of the PG plane 1310. The width of this strip 1513 is the width of the strip 1512 at the right edge; i.e. the width is the same as the offset value SFP. A PG plane representing the left view is thus generated from the PG plane 1310 and combined with the left-view video plane 1301. In particular, in this left-view PG plane, the presentation position of the subtitle 1311 is shifted to the right from the original presentation position by the offset value SFP.

Conversely, a left offset is provided to the IG plane 1320. Specifically, the position of each piece of pixel data in the IG plane 1320 is first shifted to the left (virtually) from the corresponding position of the pixel data in the left-view video plane 1301 by a number of pixels SFI equal to the offset value. Next, a strip 1322 (virtually) protruding from the left edge of the range of the left-view video plane 1310 is cut off from the left edge of the IG plane 1320. Conversely, a transparent strip 1323 is added to the right edge of the IG plane 1320. The width of this strip 1323 is the width of the strip 1322 at the left edge; i.e. the width is the same as the offset value SFI. An IG plane representing the left view is thus generated from the IG plane 1320 and combined with the left-view video plane 1301. In particular, in this left-view IG plane, the presentation position of the button 1321 is shifted to the left from the original presentation position by the offset value SFI.

As shown in FIG. 13B, a left offset is provided to the PG plane 1310, and a right offset is added to the IG plane 1320. In other words, the above operations are performed in reverse for the PG plane 1310 and the IG plane 1320. As a result, plane data representing the right view is generated from the plane data 1310 and 1320 and combined with the right-view video plane 1320. In particular, in the right-view PG plane, the presentation position of the subtitle 1311 is shifted to the left from the original presentation position by the offset value SFP. On the other hand, in the right-view IG plane, the presentation position of the button 1321 is shifted to the right from the original presentation position by the offset value SFI.

FIG. 13C is a schematic diagram showing 3D graphics images that a viewer 1330 is made to perceive from 2D graphics images represented by graphics planes shown in FIGS. 13A and 13B. When the 2D graphics images represented by these graphics planes are alternately displayed on the screen 1340, the viewer 1330 perceives the subtitle 1331 to be closer than the screen 1340 and the button 1332 to be further back than the screen 1340, as shown in FIG. 13C. The distance between the 3D graphics images 1331 and 1332 and the screen 1340 can be adjusted via the offset values SFP and SFI.

Figure 14A:
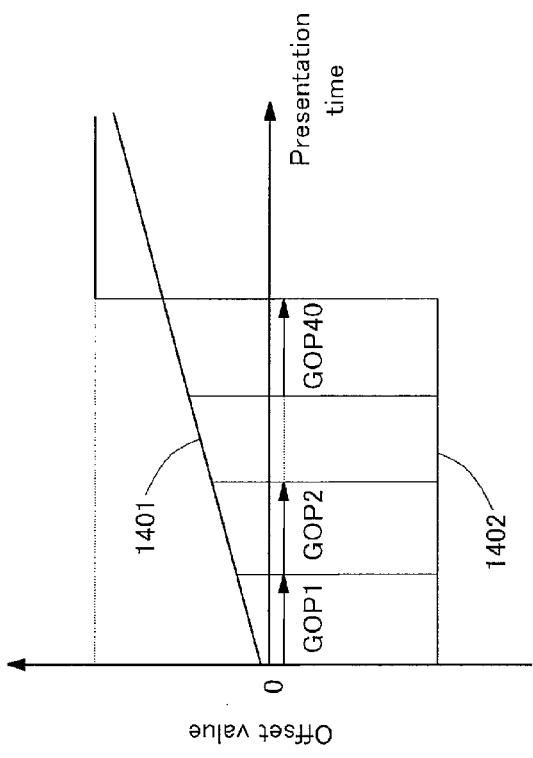
FIGS. 14A and 14B are graphs showing examples of offset sequences.
Figure 14B:
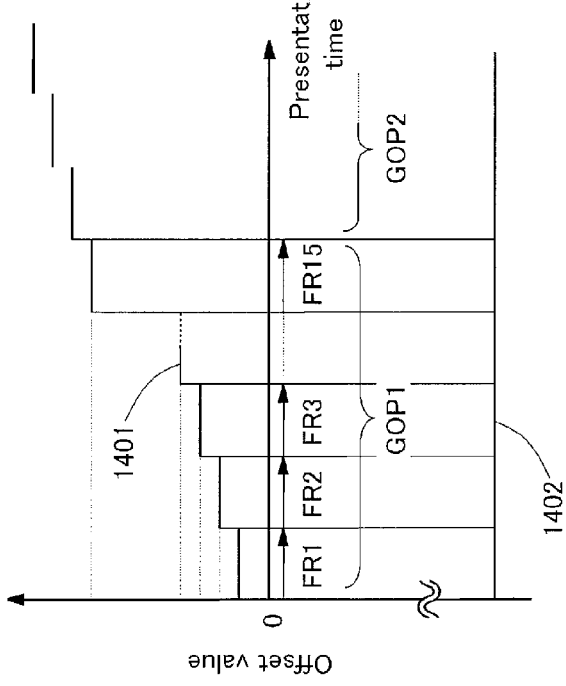

FIGS. 14A and 14B are graphs showing examples of offset sequences. In these graphs, the offset value is positive when the offset direction is toward the viewer from the screen. FIG. 14A is an enlargement of the graph for the presentation period of the first GOP in FIG. 14B, i.e. GOP1. As shown in FIG. 14A, the stepwise line 1401 shows offset values for the offset sequence with an offset sequence ID equaling 0, i.e. offset sequence [0]. On the other hand, the horizontal line 1402 shows offset values for the offset sequence with an offset sequence ID equaling 1, i.e. offset sequence [1]. The offset value 1401 of the offset sequence [0] increases stepwise during the presentation period GOP1 of the first GOP in the order of frames FR1, FR2, FR3, . . . , FR15, . . . . As shown in FIG. 14B, the stepwise increase in the offset value 1401 similarly continues in the presentation periods GOP2, GOP3, . . . , GOP40, . . . for the second and subsequent GOPs. The amount of increase per frame is sufficiently small for the offset value 1401 in FIG. 14B to appear to increase continually as a line. On the other hand, the offset value 1402 in offset sequence [1] is maintained constant during the presentation period GOP1 of the first GOP. As shown in FIG. 14B, the offset value 1402 increases to a positive value at the end of the presentation period GOP40 for the 40$^{th}$ GOP. Offset values may thus exhibit discontinuous change.

Figure 14C:
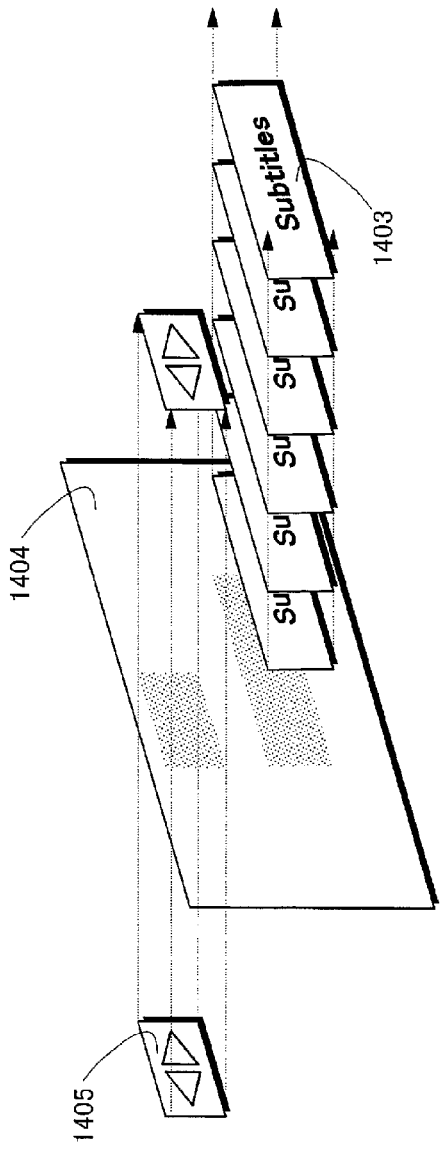
FIG. 14C is a schematic diagram showing 3D graphics images reproduced in accordance with the offset sequences shown in FIGS. 14A and 14B.

FIG. 14C is a schematic diagram showing 3D graphics images reproduced in accordance with the offset sequences shown in FIGS. 14A and 14B. When the subtitle 3D video image 1403 is displayed in accordance with the offset sequence [0], the 3D video image 1403 appears to start from right in front of the screen 1404 and gradually approach the viewer. On the other hand, when the button 3D video image 1405 is displayed in accordance with the offset sequence [1], the 3D video image 1405 appears to suddenly jump from a fixed position behind the screen 1404 to in front of the screen 1404. As described, the patterns by which offset values increase and decrease frame by frame are changed in a variety of ways from one offset sequence to another. Individual changes in the depth of a plurality of 3D graphics images can thereby be represented in a variety of ways.

[Relationship Between Offset Metadata and TS Priority]

Figure 15:
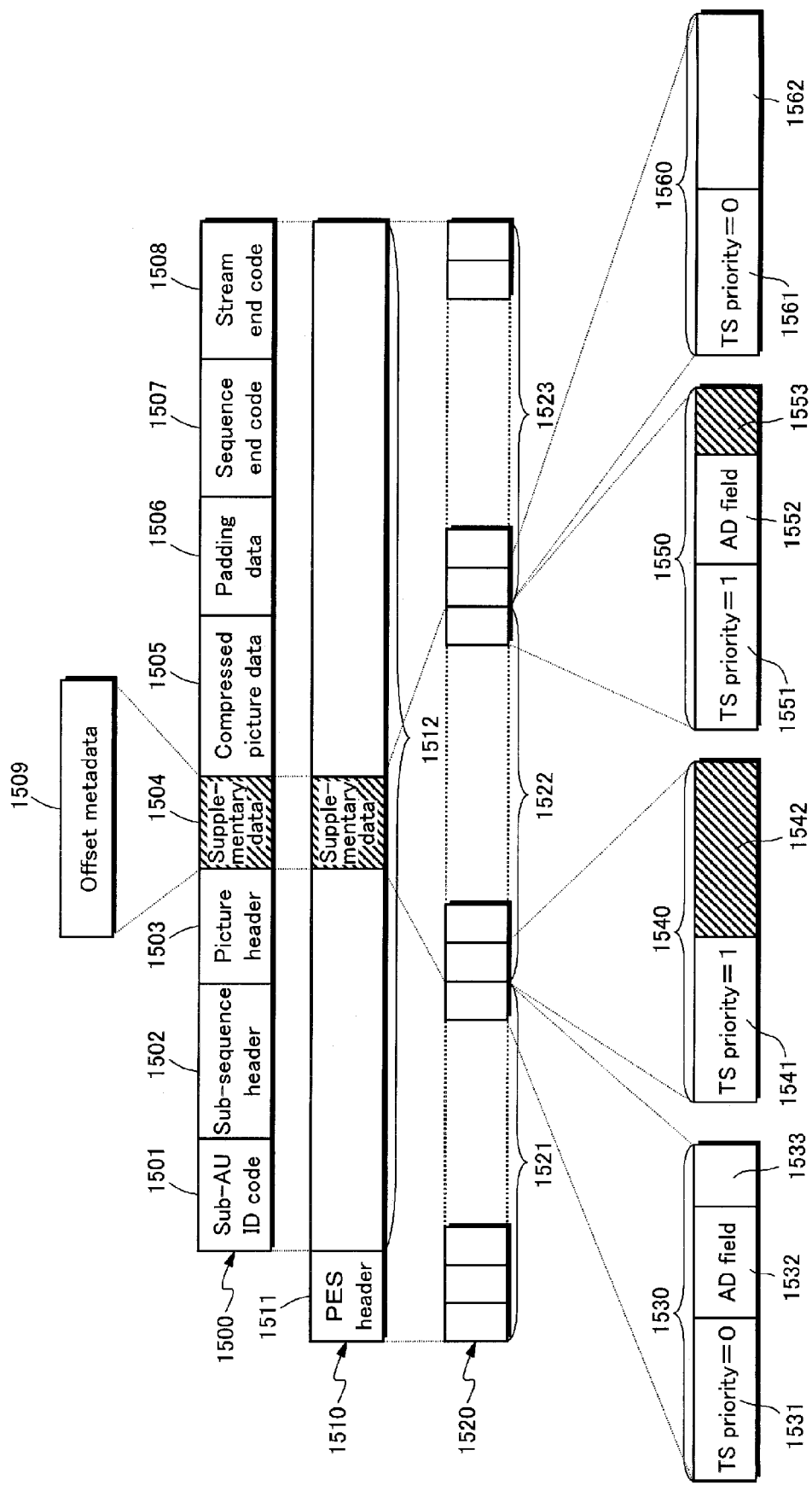
FIG. 15 is a schematic diagram showing a PES packet 1510 storing VAU #1 1500 in the dependent-view video stream, and a sequence of TS packets 1520 generated from the PES packet 1510.

FIG. 15 is a schematic diagram showing a PES packet 1510 storing VAU #1 1500 in the dependent-view video stream and a sequence of TS packets 1520 generated from the PES packet 1510. The VAU #1 1500 is located at the top of the video sequence, like the VAU #1 832 shown in FIG. 8. Accordingly, at least one piece of supplementary data 1504 included in the VAU #1 1500 consists only of offset metadata 1509. Hatched areas in FIG. 15 show the supplementary data 1504 consisting only of the offset metadata 1509. The VAU #1 1500 is stored in the PES payload 1512 of the PES packet 1510. The PES header 1511 of the PES packet 1510 includes a DTS and a PTS assigned to compressed picture data 1505 in the VAU #1 1500. The PES packet 5010 is stored in the TS packet sequence 5020 in order from the top. With this arrangement, the TS packet sequence 1520 is divided into three groups 1521, 1522, and 1523 in order from the top. The first group 1521 includes the PES header 1511, sub-AU identification code 1501, sub-sequence header 1502, and picture header 1503. The second group 1522 only includes the supplementary data 1504 consisting only of the offset metadata 1509. The third group 1513 includes the compressed picture data 1505, padding data 1506, sequence end code 1507, and stream end code 1508. Note that supplementary data other than the offset metadata, if included in the VAU #1 1500, is stored in the first group 1521 or the third group 1513. The TS packet 1530 located at the end of the first group 1521 generally includes an AD field 1532. This prevents the supplementary data 1504 consisting only of the offset metadata 1509 from mixing into the TS payload 1533. Similarly, the TS packet 1550 located at the end of the second group 1522 generally includes an AD field 1552. This prevents the compressed picture data 1505 and any other data except the supplementary data 1504 consisting only of the offset metadata 1509 from mixing into the TS payload 1553. In this way, the supplementary data 1504 consisting only of the offset metadata 1509 is stored only into the TS payloads 1542, 1553 of the TS packets 1540, 1550 belonging to the second group 1522. On the other hand, the compressed picture data 1505 is stored only into the TS payloads 1562 of the TS packets 1560 belonging to the third group 1523.

Further referring to FIG. 15, the TS headers 1531 of the TS packets 1530 belonging to the first group 1521 indicate the value of TS priority set to "0". Similarly, the TS headers 1561 of TS packets 1560 belonging to the third group 1523 indicate the value of TS priority set to "0". On the other hand, the TS headers 1541, 1551 of the TS packets 1540, 1550 belonging to the second group 1522 indicate the value of TS priority set to "1". Note that these values may be set in reverse. In this way, the TS packets belonging to the second group 1522 have a different value of TS priority from the TS packets belonging to the other groups 1521 and 1523. Accordingly, the system target decoder in the playback device 102 can easily select TS packets belonging to the second group 1522 by using TS priority.

Figure 16:
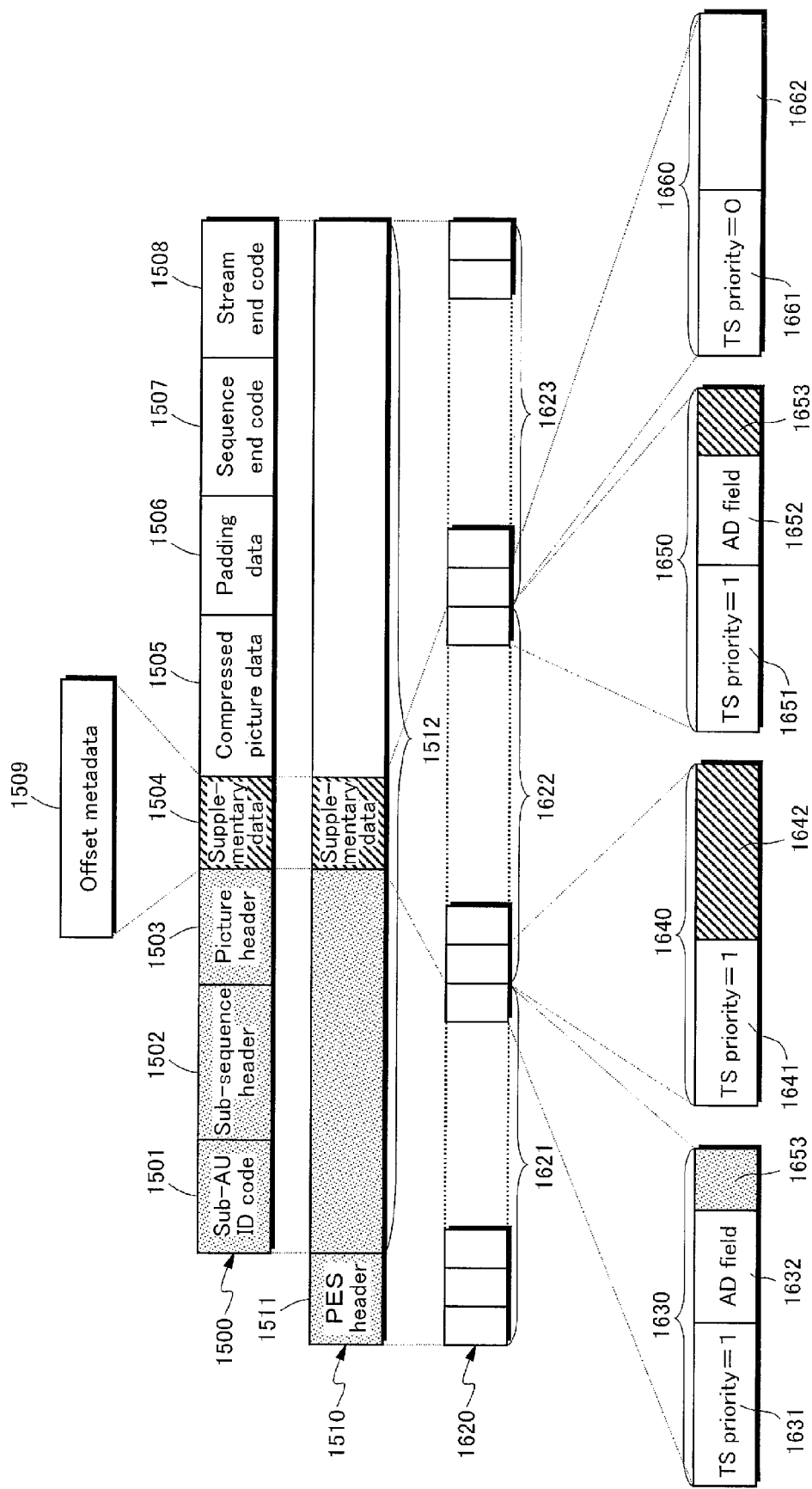
FIG. 16 is a schematic diagram showing a sequence of TS packets 1620 where TS packets belonging to the first group 1521 and the second group 1522 shown in FIG. 15 indicate the same value of TS priority.

In contrast to FIG. 15, TS packets belonging to the first group 1521 and the second group 1522 may indicate the same value of TS priority. FIG. 16 is a schematic diagram showing a sequence of TS packets 1620 in that case. Like the sequence of TS packets 1520 shown in FIG. 15, the sequence of TS packets 1620 is divided into three groups 1621, 1622, and 1623 in order from the top. The first group 1621 includes the PES header 1511, sub-AU identification code 1501, sub-sequence header 1502, and picture header 1503. The second group 1622 includes the supplementary data 1504 consisting only of the offset metadata 1509. The third group 1613 includes the compressed picture data 1505, padding data 1506, sequence end code 1507, and stream end code 1508. Note that supplementary data other than the offset metadata, if included in the VAU #1 1500, is stored in the first group 1621 or the third group 1613. Hatched areas in FIG. 16 show the supplementary data 1504 consisting only of the offset metadata 1509, and dotted areas show data 1511, 1501-1503 arranged before the supplementary data in the PES packet 1510. The TS headers 1631, 1641, 1651 of the TS packets

1630, 1640, 1650 belonging to the first group 1621 and the second group 1622 indicate the value of TS priority set to "1". On the other hand, the TS headers 1661 of the TS packets 1660 belonging to the third group 1623 indicate the value of TS priority set to "0". Note that these values may be set in reverse. Even in this case, the TS packets containing the supplementary data 1504 consisting only of the offset metadata 1509 have a different value of TS priority from the TS packets containing the compressed picture data 1505. Accordingly, the system target decoder in the playback device 102 can easily separate the group of TS packets containing the supplementary data 1504 consisting only of the offset metadata 1509 from the group of TS packets containing the compressed picture data 1505 by using TS priority.

[Decoding Switch Information]

FIG. 17A is a schematic diagram showing a data structure of decoding switch information 1750. The decoding switch information 1750 is included in the supplementary data in each VAU in both the base-view video stream and the dependent-view video stream shown in FIG. 8. However, in VAU #1 832 located at the top of each VOP in the dependent-view video stream, the decoding switch information 1750 is stored in supplementary data that is different from the supplementary data 832D containing the offset metadata. The supplementary data 831D and 832D, in particular in MPEG-4 AVC and MVC, correspond to "SEI" that is a kind of NAL unit. The decoding switch information 1750 is information to cause the decoder in the playback device 102 to easily specify the next VAU to decode. As described below, the decoder alternately decodes the base-view video stream and the dependent-view video stream in units of VAUs. When doing so, the decoder generally specifies the next VAU to be decoded in alignment with the time shown by the DTS assigned to each VAU. Many types of decoders, however, continue to decode VAUs in order, ignoring the DTS. For such decoders, it is preferable for each VAU to include decoding switch information 1750 in addition to a DTS.

As shown in FIG. 17A, decoding switch information 1750 includes a subsequent access unit type 1751, subsequent access unit size 1752, and decoding counter 1753. The subsequent access unit type 1751 indicates whether the next VAU to be decoded belongs to a base-view video stream or a dependent-view video stream. For example, when the value of the subsequent access unit type 1751 is "1", the next VAU to be decoded belongs to a base-view video stream, and when the value of the subsequent access unit type 1751 is "2", the next VAU to be decoded belongs to a dependent-view video stream. When the value of the subsequent access unit type 1751 is "0", the current VAU is located at the end of the stream targeted for decoding, and the next VAU to be decoded does not exist. The subsequent access unit size 1752 indicates the size of the next VAU that is to be decoded. By referring to the subsequent access unit size 1752, the decoder in the playback device 102 can specify the size of a VAU without analyzing its actual structure. Accordingly, the decoder can easily extract VAUs from the buffer. The decoding counter 1753 shows the decoding order of the VAU to which it belongs. The order is counted from a VAU that includes an I picture in the base-view video stream.

FIG. 17B is a schematic diagram showing sequences of decoding counters 1710 and 1720 allocated to each picture in a base-view video stream 1701 and a dependent-view video stream 1702. As shown in FIG. 17B, the decoding counters 1710 and 1720 are incremented alternately between the two video streams 1701 and 1702. For example, for VAU 1711 that includes an I picture in the base-view video stream 1701, a value of "1" is assigned to the decoding counter 1710. Next, a value of "2" is assigned to the decoding counter 1720 for the VAU 1721 that includes the next P picture to be decoded in the dependent-view video stream 1702. Furthermore, a value of "3" is assigned to the decoding counter 1710 for the VAU 1712 that includes the next P picture to be decoded in the base-view video stream 1701. By assigning values in this way, even when the decoder in the playback device 102 fails to read one of the VAUs due to some error, the decoder can immediately specify the missing picture using the decoding counters 1710 and 1720. Accordingly, the decoder can perform error processing appropriately and promptly.

In the example shown in FIG. 17B, an error occurs during the reading of the third VAU 1713 in the base-view video stream 1701, and the Br picture is missing. During decoding of the P picture contained in the second VAU 1722 in the dependent-view video stream 1702, however, the decoder has read the decoding counter 1720 for this VAU 1722 and retained the value. Accordingly, the decoder can predict the decoding counter 1710 for the next VAU to be processed. Specifically, the decoding counter 1720 in the VAU 1722 that includes the P picture is "4". Therefore, the decoding counter 1710 for the next VAU to be read can be predicted to be "5". The next VAU that is actually read, however, is the fourth VAU 1714 in the base-view video stream 1701, whose decoding counter 1710 is "7". The decoder can thus detect that it failed to read a VAU. Accordingly, the decoder can execute the following processing: "skip decoding of the B picture extracted from the third VAU 1723 in the dependent-view video stream 1702, since the Br picture to be used as a reference is missing". In this way, the decoder checks the decoding counters 1710 and 1720 during each decoding process. Consequently, the decoder can promptly detect errors during reading of VAUs and can promptly execute appropriate error processing. As a result, the decoder can prevent noise from contaminating the playback video.

FIG. 17C is a schematic diagram showing other examples of the decoding counters 1730 and 1740 allocated to each picture in a base-view video stream 1701 and a dependent-view video stream 1702. As shown in FIG. 12C, decoding counters 1730 and 1740 are incremented separately in the video streams 1701 and 1702. Therefore, the decoding counters 1730 and 1740 are the same for a pair of pictures in the same 3D VAU. In this case, when the decoder has decoded a VAU in the base-view video stream 1701, it can predict that "the decoding counter 1230 is the same as the decoding counter 1740 for the next VAU to be decoded in the dependent-view video stream 1702". Conversely, when the decoder has decoded a VAU in the dependent-view video stream 1702, it can predict that "the decoding counter 1730 for the next VAU to be decoded in the base-view video stream 1701 is the same as the decoding counter 1740 plus one". Accordingly, at any point in time, the decoder can promptly detect an error in reading a VAU using the decoding counters 1730 and 1740 and can promptly execute appropriate error processing. As a result, the decoder can prevent noise from contaminating the playback video.

<<Other TS Packets Included in AV Stream File>>

In addition to the TS packets converted from the elementary stream as shown in FIG. 3, the types of TS packets included in an AV stream file include a Program Association Table (PAT), Program Map Table (PMT), and Program Clock Reference (PCR). The PCR, PMT, and PAT are specified by the European Digital Broadcasting Standard and are intended to regulate the partial transport stream constituting a single program. By using PCR, PMT, and PAT, the AV stream file can also be regulated in the same way as the partial transport stream. Specifically, the PAT shows the PID of a PMT included in the same AV stream file. The PID of the PAT itself is 0. The PMT includes the PIDs for the elementary streams representing video, audio, subtitles, etc. included in the same AV stream file, as well as the attribute information for the elementary streams. The PMT also includes various descriptors relating to the AV stream file. The descriptors particularly include copy control information showing whether copying of the AV stream file is permitted or not. The PCR includes information indicating the value of a system time clock (STC) to be associated with the ATS assigned to the PCR itself. The STC referred to here is a clock used as a reference for the PTS and the DTS by a decoder in the playback device 102. This decoder uses the PCR to synchronize the STC with the ATC.

Figure 18:
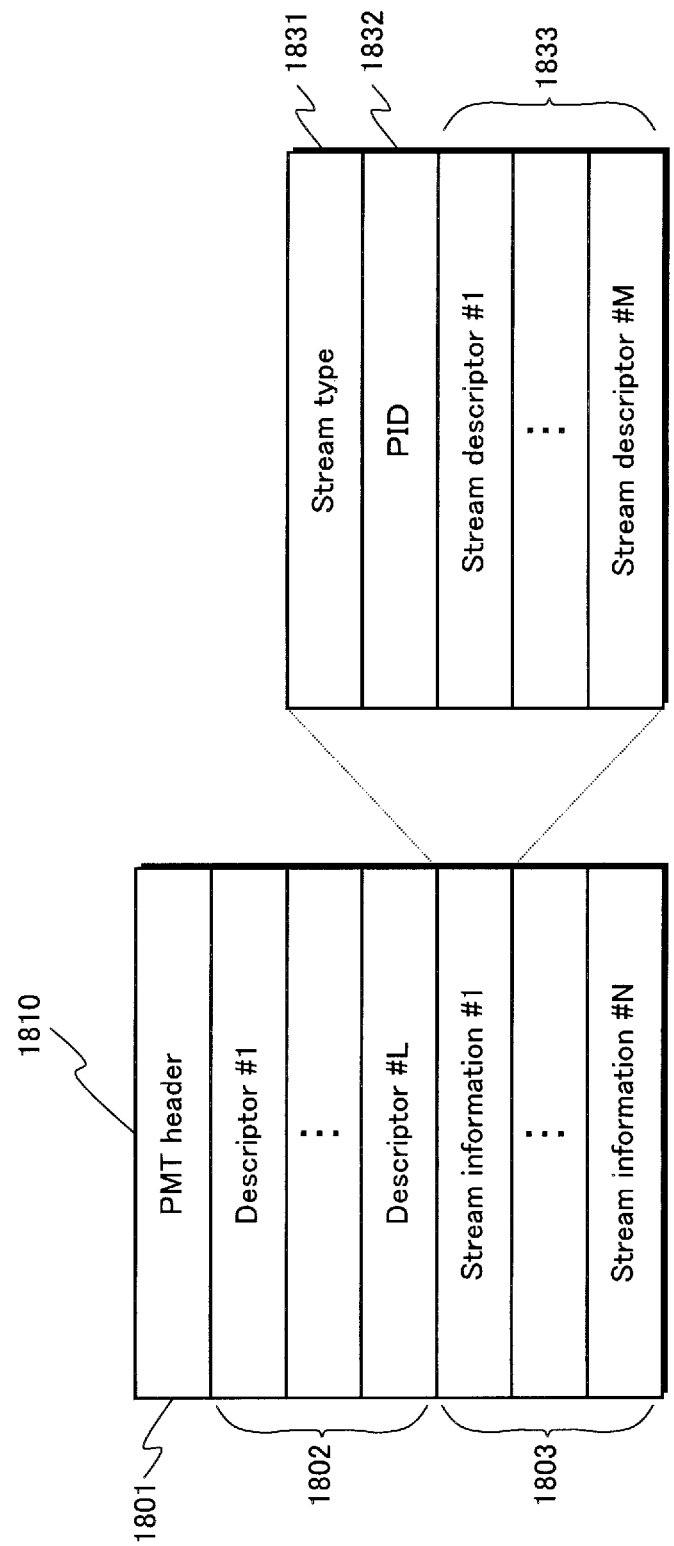
FIG. 18 is a schematic diagram showing a data structure of a PMT 1810.

FIG. 18 is a schematic diagram showing a data structure of a PMT 1810. The PMT 1810 includes a PMT header 1801, descriptors 1802, and pieces of stream information 1803. The PMT header 1801 indicates the length of data, etc. stored in the PMT 1810. Each descriptor 1802 relates to the entire AV stream file that includes the PMT 1810. The copy control information is included in one of the descriptors 1802. Each piece of stream information 1803 relates to one of the elementary streams included in the AV stream file and is assigned to a different elementary stream. Each piece of stream information 1803 includes a stream type 1831, a PID 1832, and stream descriptors 1833. The stream type 1831 includes identification information for the codec used for compressing the elementary stream. The PID 1832 indicates the PID of the elementary stream. The stream descriptors 1833 include attribute information of the elementary stream, such as a frame rate and an aspect ratio.

By using PCR, PMT, and PAT, the decoder in the playback device 102 can be made to process the AV stream file in the same way as the partial transport stream in the European Digital Broadcasting Standard. In this way, it is possible to ensure compatibility between a playback device for the BD-ROM disc 101 and a terminal device conforming to the European Digital Broadcasting Standard.

<<Interleaved Arrangement of Multiplexed Stream Data>>

For seamless playback of 3D video images, the physical arrangement of the base-view video stream and dependent-view video stream on the BD-ROM disc 101 is important. This "seamless playback" refers to playing back video and audio from multiplexed stream data without interruption.

Figure 19:
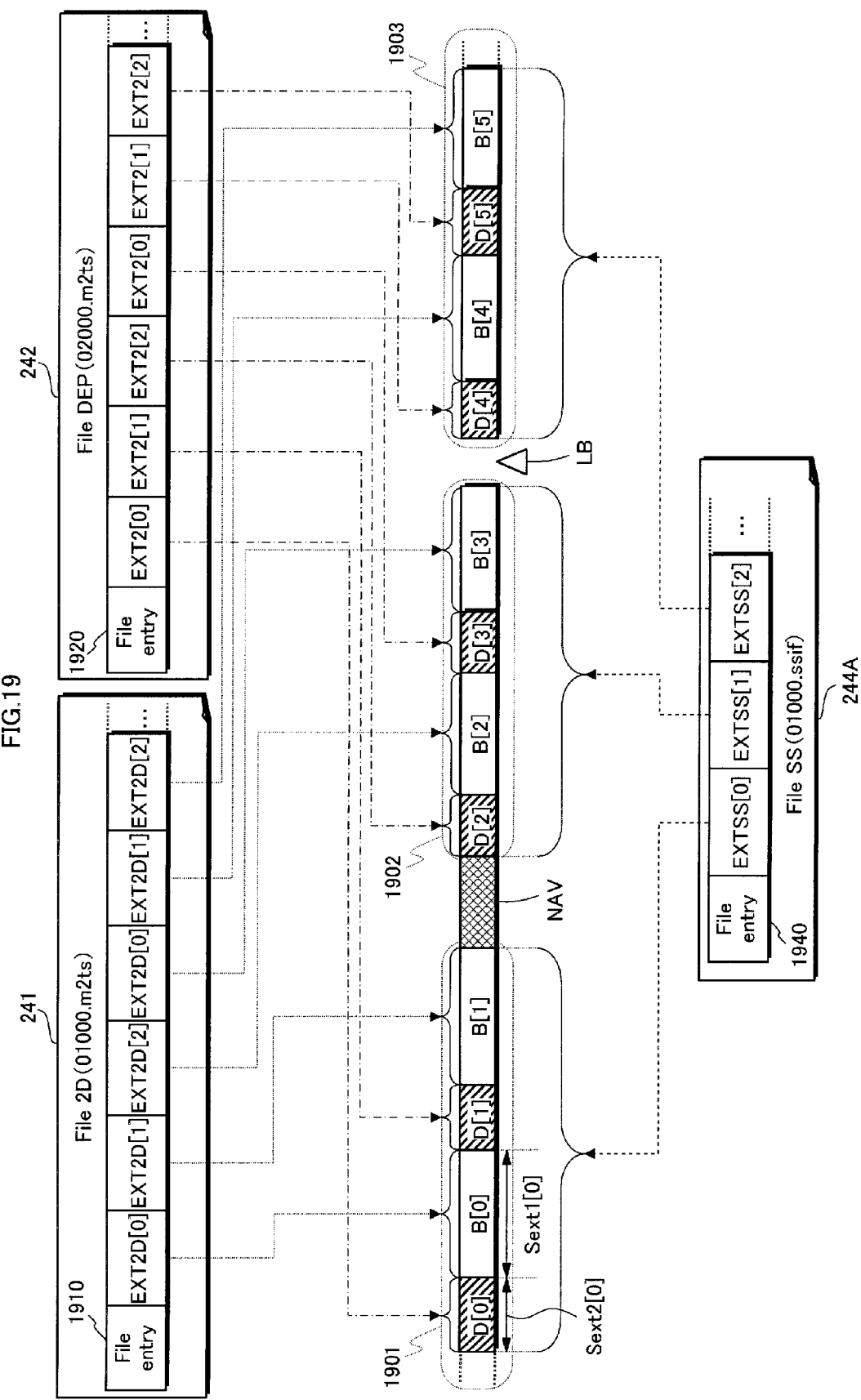
FIG. 19 is a schematic diagram showing a physical arrangement of multiplexed stream data on the BD-ROM disc.

FIG. 19 is a schematic diagram showing a physical arrangement of multiplexed stream data on the BD-ROM disc 101. As shown in FIG. 19, the multiplexed stream data is divided into a plurality of data blocks D[n], B[n] (n=0, 1, 2, 3, . . . ) and arranged on the BD-ROM disc 101. A "data block" refers to a sequence of data recorded on a contiguous area on the BD-ROM disc 101, i.e. a plurality of physically contiguous sectors. Since physical addresses and logical addresses on the BD-ROM disc 101 are substantially the same, the LBNs within each data block are also continuous. Accordingly, the BD-ROM drive 121 can continuously read a data block without causing the optical pickup to perform a seek. Hereinafter, data blocks B[n] belonging to a main TS are referred to as "base-view data blocks", and data blocks D[n] belonging to a sub-TS are referred to as "dependent-view data blocks". In particular, data blocks that include the right-view video stream are referred to as "right-view data blocks", and the data blocks that include the depth map stream are referred to as "depth map data blocks".

In the file system on the BD-ROM disc 101, each data block B[n] and D[n] can be accessed as one extent in the files 2D or the files DEP. In other words, the logical address for each data block can be known from the file entry of a file 2D or a file DEP (see <<Supplementary Explanation>> for details).

In the example shown in FIG. 19, the file entry 1910 in the file 2D (01000.m2ts) 241 indicates the sizes of the base-view data blocks B[n] and the LBNs of their tops. Accordingly, the base-view data blocks B[n] can be accessed as extents EXT2D[n] in the file 2D 241. Hereinafter, the extents EXT2D[n] belonging to the file 2D 241 are referred to as "2D extents". On the other hand, the file entry 1920 of the file DEP (02000.m2ts) 242 indicates the sizes of the dependent-view data blocks D[n] and the LBNs of their tops. Accordingly, each dependent-view data block D[n] can be accessed as an extent EXT2[n] in the file DEP 242. Hereinafter, the extents EXT2[n] belonging to the file DEP 242 are referred to as "dependent-view extents".

As shown in FIG. 19, a data block group is recorded continuously along a track on the BD-ROM disc 101. Furthermore, the base-view data blocks B[n] and the dependent-view data blocks D[n] are arranged alternately one by one. This type of arrangement of a data block group is referred to as an "interleaved arrangement". In particular, one series of data blocks recorded in an interleaved arrangement is referred to as an "extent block". Three extent blocks 1901, 1902, and 1903 are shown in FIG. 19. As shown in the first two extent blocks 1901 and 1902, a storage area NAV for data other than multiplexed stream data exists between the extent blocks, thus separating the extent blocks. Also, when the BD-ROM disc 101 is a multi-layer disc, i.e. when the BD-ROM disc 101 includes a plurality of recording layers, the extent blocks may also separated by a layer boundary LB between the recording layers, as in the second and third extent blocks 1902 and 1903 shown in FIG. 19. In this way, one series of multiplexed stream data is generally arranged so as to be divided into a plurality of extent blocks. In this case, for the playback device 102 to seamlessly play back video images from the multiplexed stream data, it is necessary for video images to be played back from the extent blocks to be seamlessly connected. Hereinafter, processing required by the playback device 102 for that purpose is referred to as "seamless connection between extent blocks".

The extent blocks 1901-1903 have the same number of the two types of data blocks, D[n] and B[n]. Furthermore, the extent ATC time is the same between contiguous data block pair D[n] and B[n]. In this context, an "Arrival Time Clock (ATC)" refers to a clock that acts as a standard for an ATS. Also, the "extent ATC time" is defined by the value of the ATC and represents the range of the ATS assigned to source packets in an extent, i.e. the time interval from the ATS of the source packet at the top of the extent to the ATS of the source packet at the top of the next extent. In other words, the extent ATC time is the same as the time required to transfer all of the source packets in the extent from the read buffer in the playback device 102 to the system target decoder. The "read buffer" is a buffer memory in the playback device 102 where data blocks read from the BD-ROM disc 101 are temporarily stored before being transmitted to the system target decoder. Details on the read buffer are provided later. In the example shown in FIG. 19, since three extent blocks 1901-1903 are connected together seamlessly, the extent ATC times are the same between the data block pairs D[n], B[n] (n=0, 1, 2, . . . ).

The VAUs located at the top of contiguous data blocks D[n] and B[n] belong to the same 3D VAU, and in particular include the top picture of the GOP representing the same 3D video image. For example, when the dependent-view data block D[n] is a right-view data block D[n], the top of each right-view data block D[n] includes a P picture for the right-view video stream, and the top of the base-view data block B[n] includes an I picture for the base-view video stream. The P picture for the right-view video stream represents the right view when the 2D video image represented by the I picture in the base-view video stream is used as the left view. In particular, the P picture, as shown in FIG. 7, is compressed using the I picture as a reference picture. Accordingly, the playback device 102 in 3D playback mode can start playback of 3D video images from any pair of data blocks D[n] and B[n]. That is to say, processing that requires random access of video streams, such as interrupt playback, is possible. This holds true also in the case where the dependent-view data block D[n] is a depth map data block.

Furthermore, in the interleaved arrangement, among contiguous pairs of data blocks D[n] and B[n], dependent-view data blocks D[n] are located before the base-view data blocks B[n]. This is because generally the amount of data is smaller in the dependent-view data block D[n] than the base-view data block B[n], i.e. the bit rate is lower. For example, the picture included in the right-view data block D[n] is compressed using the picture included in the base-view data block B[n] as a reference picture. Accordingly, the size $S_{exo}[n]$ of the right-view data block D[n] is generally equal to or less than the size $S_{EXT1}[n]$ of the base-view data block B[n]: $S_{EXT2}[n] \leq S_{EXT1}[n]$. On the other hand, the amount of data per pixel in the depth map, i.e. the number of bits of the depth value, is in general smaller than the amount of data per pixel of the base-view picture, i.e. the sum of the number of bits of the chromatic coordinate value and the a value. Furthermore, as shown in FIGS. 3A and 3B, unlike the sub-TS, the main TS includes other elementary streams, such as a primary audio stream, in addition to the primary video stream. Therefore, the size of the depth map data block, $S_{EXT3}[n]$, is generally less than or equal to the size of the base-view data block B[n], $S_{EXT1}[n]$: $S_{EXT3}[n] \leq S_{EXT1}[n]$.

[Significance of Dividing Multiplexed Stream Data into Data Blocks]

In order to play 3D video images back seamlessly from the BD-ROM disc 101, the playback device 102 has to process the main TS and sub-TS in parallel. The read buffer capacity usable in such processing, however, is generally limited. In particular, there is a limit to the amount of data that can be continuously read into the read buffer from the BD-ROM disc 101. Accordingly, the playback device 102 has to read sections of the main TS and sub-TS with the same extent ATC time by dividing the sections.

Figure 20A:
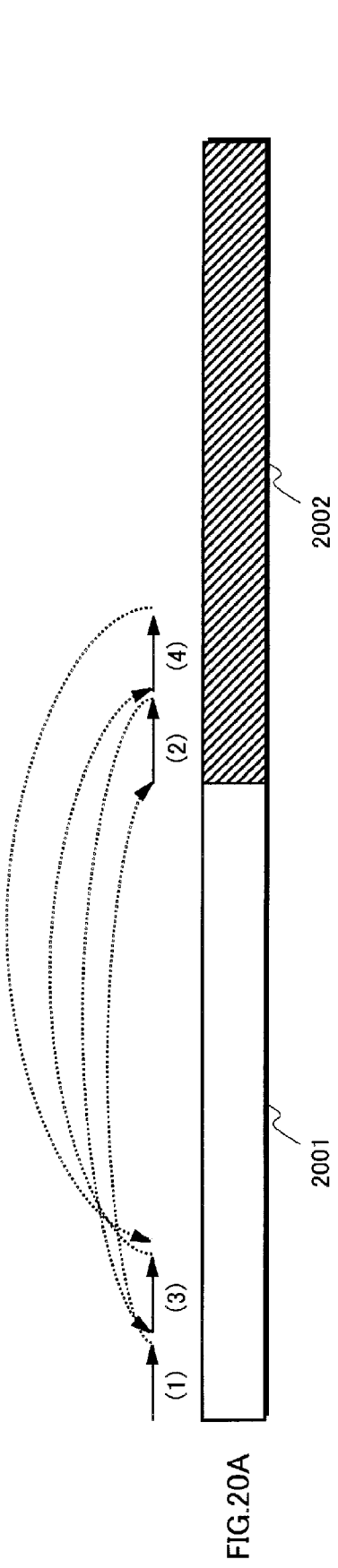
FIG. 20A is a schematic diagram showing the arrangement of the main TS 2001 and sub-TS 2002 recorded separately and consecutively on a BD-ROM disc.

FIG. 20A is a schematic diagram showing the arrangement of the main TS 2001 and sub-TS 2002 recorded separately and consecutively on a BD-ROM disc. When the playback device 102 processes the main TS 2001 and sub-TS 2002 in parallel, as shown by the arrows (1)-(4) on the solid lines in FIG. 20A, the BD-ROM drive 121 alternately reads sections of the main TS 2001 and the sub-TS 2002 that have the same extent ATC time. At this time, as shown by the arrows in the dashed lines in FIG. 20A, during read processing the BD-ROM drive 121 has to make a large change in the area to be read on the BD-ROM disc. For example, after the top section of the main TS 2001 shown by arrow (1) is read, the BD-ROM drive 121 temporarily stops the read operation by the optical pickup and increases the rotation speed of the BD-ROM disc. In this way, the BD-ROM drive 121 rapidly moves the sector on the BD-ROM disc on which the top section of the sub-TS 2002 shown by arrow (2) is recorded to the position of the optical pickup. This operation to temporarily stop reading by the optical pickup and, while reading is stopped, position the optical pickup above the next area to be read is referred to as a "jump". The dashed lines with an arrow shown in FIG. 20A indicate the range of the jumps necessary during read processing. During each jump period, read processing by the optical pickup stops, and only decoding by the decoder progresses. Since the jump is excessive in the example shown in FIG. 20A, it is difficult to cause read processing to keep up with decoding. As a result, it is difficult to stably maintain seamless playback.

Figure 20B:
FIG. 20B is a schematic diagram showing an arrangement of dependent-view data blocks D[0], D[1], D[2], ... and base-view data blocks B[0], B[1], B[2], ... recorded alternately on the BD-ROM disc 101 according to Embodiment 1 of the present invention.

FIG. 20B is a schematic diagram showing an arrangement of dependent-view data blocks D[0], D[1], D[2], . . . and base-view data blocks B[0], B[1], B[2], . . . recorded alternately on the BD-ROM disc 101 according to Embodiment 1 of the present invention. As shown in FIG. 20B, the main TS and sub-TS are divided into a plurality of data blocks and are arranged alternately. In this case, during playback of 3D video images, the playback device 102 reads data blocks D[0], B[0], D[1], B[1] . . . in order from the top, as shown by arrows (1)-(4) in FIG. 20B. By simply reading these data blocks in order, the playback device 102 can smoothly read the main TS and sub-TS alternately. In particular, since no jump occurs during read processing, seamless playback of 3D video images can be stably maintained.

[Significance of Providing Contiguous Data Blocks with the Same Extent ATC Time]

Figure 20C:
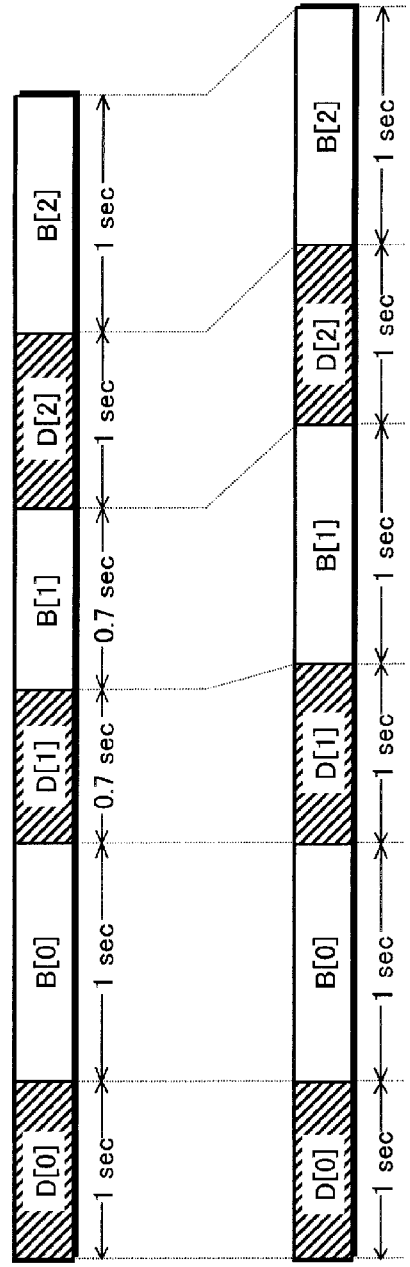
FIGS. 20C and 20D are schematic diagrams showing examples of the extent ATC times for a dependent-view data block group D[n] and a base-view data block group B[n] recorded in an interleaved arrangement (n=0, 1, 2).

FIG. 20C is a schematic diagram showing an example of the extent ATC times for a dependent-view data block group D[n] and a base-view data block group B[n] recorded in an interleaved arrangement (n=0, 1, 2). As shown in FIG. 20C, the extent ATC time is the same in each pair between the dependent-view data block D[n] and the immediately subsequent base-view data block B[n]. For example, the extent ATC time is equal to one second for each of D[0] and B[0] in the top data block pair. Accordingly, when the data blocks D[0] and B[0] are read by the read buffer in the playback device 102, all of the TS packets therein are sent from the read buffer to the system target decoder in the same one-second interval. Similarly, since the extent ATC time is equal to 0.7 seconds for each of D[1] and B[1] in the second data block pair, all of the TS packets in each data block are transmitted from the read buffer to the system target decoder in the same 0.7-second interval.

Figure 20D:
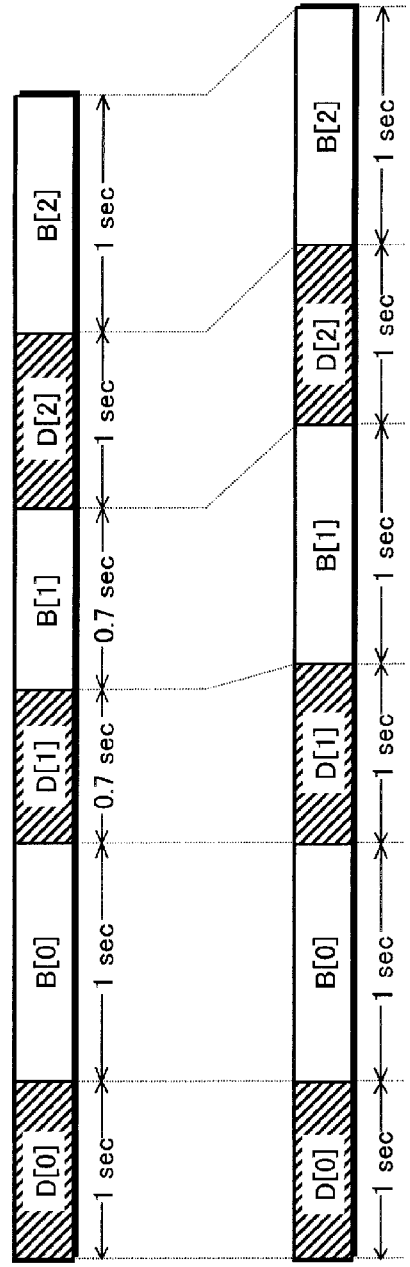

FIG. 20D is a schematic diagram showing another example of the extent ATC times for a dependent-view data block group D[n] and a base-view data block group B[n] recorded in an interleaved arrangement. As shown in FIG. 20D, the extent ATC times in all of the data blocks D[n] and B[n] are equal to one second. Accordingly, in the same one-second interval in which any of the data blocks D[n] and B[n] are read by the read buffer in the playback device 102, all of the TS packets in each of those data blocks are transmitted from the read buffer to the system target decoder.

As described above, the compression rate of the dependent-view data blocks is generally higher than the compression rate of the base-view data blocks. Accordingly, decoding of the dependent-view data blocks is generally slower than decoding of the base-view data blocks. On the other hand, when the extent ATC times are equal, the dependent-view data blocks have a smaller amount of data than the base-view data blocks. Therefore, when the extent ATC times are the same between contiguous data blocks as in FIGS. 20C and 20D, the speed at which the data to be decoded is provided to the system target decoder can easily be maintained uniformly with the speed of processing by the decoder. In other words, the system target decoder facilitates synchronization between the decoding of the base-view data blocks and the decoding of the dependent-view data blocks, particularly in interrupt playback.

[Significance of Placing Smaller-Data-Amount Data Blocks First]

When reading a data block located at the top or at the playback start position of each extent block, the playback device 102 in 3D playback mode first reads the entirety of the data block into the read buffer. The data block is not transferred to the system target decoder during that period. After finishing reading the data block, the playback device 102 transfers the data block to the system target decoder in parallel with the next data block. This processing is called "preloading".

The technical significance of preloading is as follows. First, in L/R mode, base-view data blocks are necessary for decoding the dependent-view data blocks. Therefore, to maintain the buffer at the minimum necessary capacity for storing the decoded data until output processing, it is preferable to simultaneously provide the data blocks to the system target decoder to be decoded. On the other hand, in depth mode, processing is necessary to generate a pair of video planes representing parallax images from a pair of a decoded base-view picture and a decoded depth map. Accordingly, to maintain the buffer at the minimum necessary capacity for storing the decoded data until this processing, it is preferable to provide the base-view data blocks simultaneously with the depth map data blocks to the system target decoder to be decoded. Therefore, preloading causes the entirety of the data block at the top of an extent block or at the playback start position to be read into the read buffer in advance. This enables the data block and the following data block to be transferred simultaneously from the read buffer to the system target decoder and decoded. Furthermore, the subsequent pairs of data blocks can also be simultaneously decoded by the system target decoder.

When preloading, the entirety of the data block that is read first is stored in the read buffer. Accordingly, the read buffer requires at least a capacity equal to the size of the data block. To maintain the capacity of the read buffer at a minimum, the size of the data block to be preloaded should be as small as possible. Meanwhile, for interrupt playback, etc., any pair of data blocks may be selected as the playback start position. For this reason, the data block having the smallest data amount is placed first in each pair of the data blocks. This enables the minimum capacity to be maintained in the read buffer.

<<Cross-Linking of AV Stream Files to Data Blocks>>

For the data block group shown in FIG. 19, the AV stream files are cross-linked as follows. The file entry 1940 of the file SS (01000.ssif) 244A considers each extent block 1901-1903 to each be one extent, indicating the size of each and the LBN of the top thereof. Accordingly, the extent blocks 1901-1903 can be accessed as the extents EXTSS[0], EXTSS[1], and EXTSS[2] of the file SS 244A. Hereinafter, the extents EXTSS[0], EXTSS[1], and EXTSS[2] belonging to the file SS 244A are referred to as the "extents SS". Each of the extents SS EXTSS[0], EXTSS[1], and EXTSS[2] share the base-view data blocks B[n] with the file 2D 241 and share the dependent-view data blocks D[n] with the file DEP 242.

<<Playback Path for Extent Block Group>>

Figure 21:
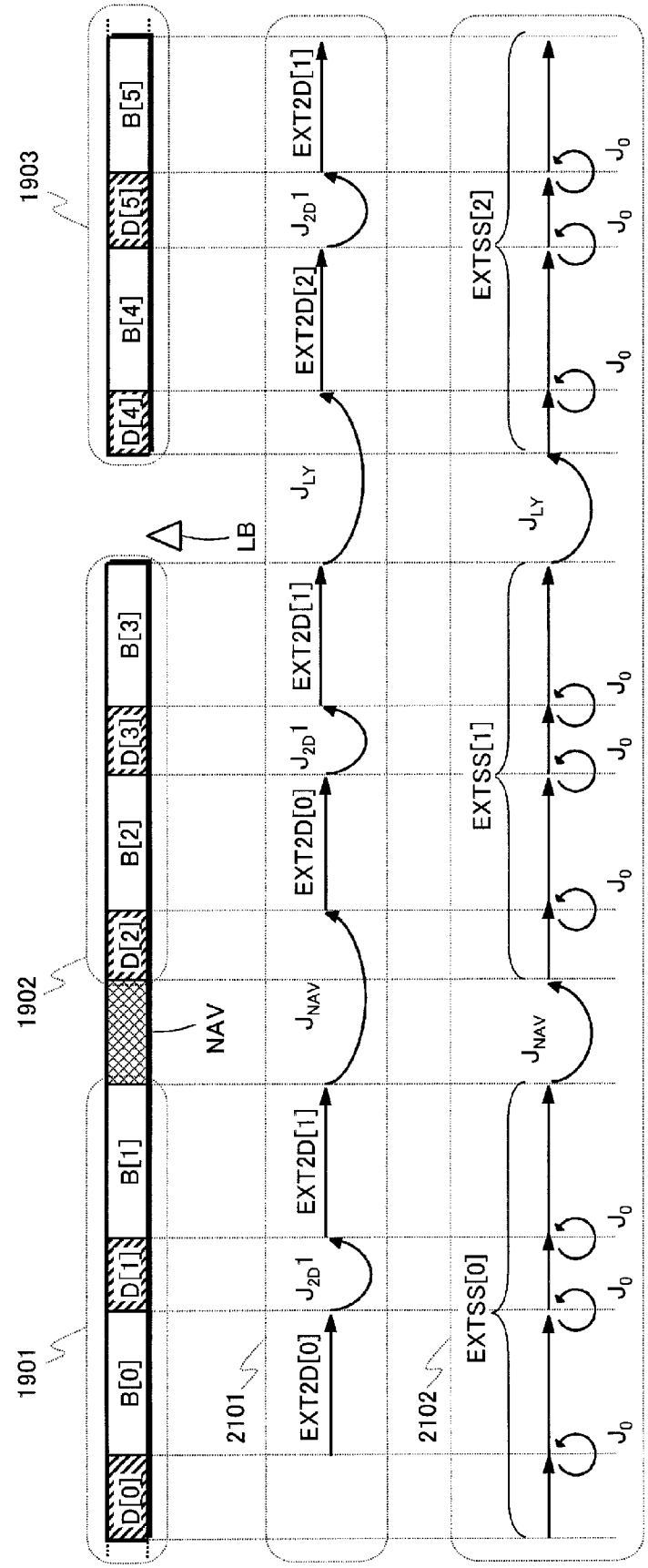
FIG. 21 is a schematic diagram showing a playback path 2101, 2102 in 2D playback mode and L/R mode for an extent block group 1901-1903.

FIG. 21 is a schematic diagram showing a playback path 2101 in 2D playback mode for an extent block group 1901-1903. The playback device 102 in 2D playback mode plays back the file 2D 241. Accordingly, as indicated by the playback path 2101 in 2D playback mode, the base-view data blocks B[n] (n=0, 1, 2, . . . ) are read in order from the extent blocks 1901-1903 as 2D extents EXT2D[0], EXT2D[1], and EXT2D[2]. Specifically, first, the top base-view data block B[0] is read from the top extent block 1901, then reading of the immediately subsequent dependent-view data block D[0] is skipped by a first jump $J_{2D}1$. Next, the second base-view data block B[1] is read, and then reading of the immediately subsequent data NAV and dependent-view data block D[1] is skipped by a second jump $J_{NAV}$. Subsequently, reading of the base-view data blocks and jumps are repeated similarly in the second and subsequent extent blocks 1902 and 1903.

A jump $J_{LY}$ occurring between the second extent block 1902 and the third extent block 1903 is a long jump across the layer boundary LB. A "long jump" is a collective term for jumps with a long seek time and specifically refers to a jump distance that exceeds a predetermined threshold value. "Jump distance" refers to the length of the area on the BD-ROM disc 101 whose reading is skipped during a jump period. Jump distance is normally expressed as the number of sectors of the corresponding section. The threshold value used to define a long jump is specified, for example, as 40000 sectors in the BD-ROM standard. This threshold value, however, depends on the type of BD-ROM disc and on the BD-ROM drive's read processing capability. Long jumps particularly include focus jumps and track jumps. A "focus jump" is a jump caused by switching recording layers, and includes processing to change the focus distance of the optical pickup. A "track jump" includes processing to move the optical pickup in a radial direction along the BD-ROM disc 101.

FIG. 21 further shows a playback path 2102 in L/R mode for the extent block group 1901-1903. The playback device 102 in L/R mode plays back the file SS 244A. Accordingly, as indicated by the playback path 2102 in L/R mode, the extent blocks 1901-1903 are read in order as the extents SS EXTSS[0], EXTSS[1], and EXTSS[2]. Specifically, the data blocks D[0], B[0], D[1] and B[1] are first sequentially read from the top extent block 1901, then reading of the immediately subsequent data NAV is skipped by a first jump $J_{NAV}$. Next, the data blocks D[2], . . . , B[3] are sequentially read from the second extent block 1902. Immediately thereafter, a long jump $J_{LY}$ occurs at the same time as switching the recording layer, and next, the data blocks D[4], B[4], . . . are sequentially read from the third extent block 1903.

When reading the extent blocks 1901-1903 as extents of the file SS 244A, the playback device 102 reads the top LBN of the extents SS EXTSS[0], EXTSS[1], . . . and the size thereof, from the file entry 1940 in the file SS 244A and then outputs the LBNs and sizes to the BD-ROM drive 121. The BD-ROM drive 121 continuously reads data having the input size from the input LBN. In such processing, control of the BD-ROM drive 121 is easier than processing to read the data block groups as the extents in the first file DEP 242 and the file 2D 241 for the following reasons (A) and (B): (A) the playback device 102 may refer in order to extents using a file entry in one location, and (B) since the total number of extents to be read substantially halves, the total number of pairs of an LBN and a size that need to be output to the BD-ROM drive 121 halves. However, after the playback device 102 has read the extents SS EXTSS[0], EXTSS[1], . . . , it needs to separate each into a dependent-view data block and a base-view data block and output them to the decoder. The clip information file is used for this separation processing. Details are provided below.

As shown in FIG. 19, when actually reading the extent blocks 1901-1903, the BD-ROM drive 121 performs a zero sector transition $J_0$ in the time from the top of a data block to the top of the next data block. A "zero sector transition" is a movement of the optical pickup between two consecutive data blocks. During a period in which a zero sector transition is performed (hereinafter referred to as a "zero sector transition period"), the optical pickup temporarily suspends its read operation and waits. In this sense, the zero sector transition is considered "a jump in which the jump distance is equal to 0 sectors". The length of the zero sector transition period, that is, the zero sector transition time period, may include, in addition to the time for shifting the position of the optical pickup via revolution of the BD-ROM disc 101, overhead caused by error correction processing. "Overhead caused by error correction processing" refers to excess time caused by performing error correction processing twice using an ECC block when the boundary between ECC blocks does not match the boundary between two data blocks. A whole ECC block is necessary for error correction processing. Accordingly, when two consecutive data blocks share a single ECC block, the whole ECC block is read and used for error correction processing during reading of either data block. As a result, each time one of these data blocks is read, a maximum of 32 sectors of excess data is additionally read. The overhead caused by error correction processing is assessed as the total time for reading the excess data, i.e. 32 sectors×2048 bytes×8 bits/byte×2 instances/read rate. Note that by configuring each data block in ECC block units, the overhead caused by error correction processing may be removed from the zero sector transition time.

<<Clip Information File>>

Figure 22:
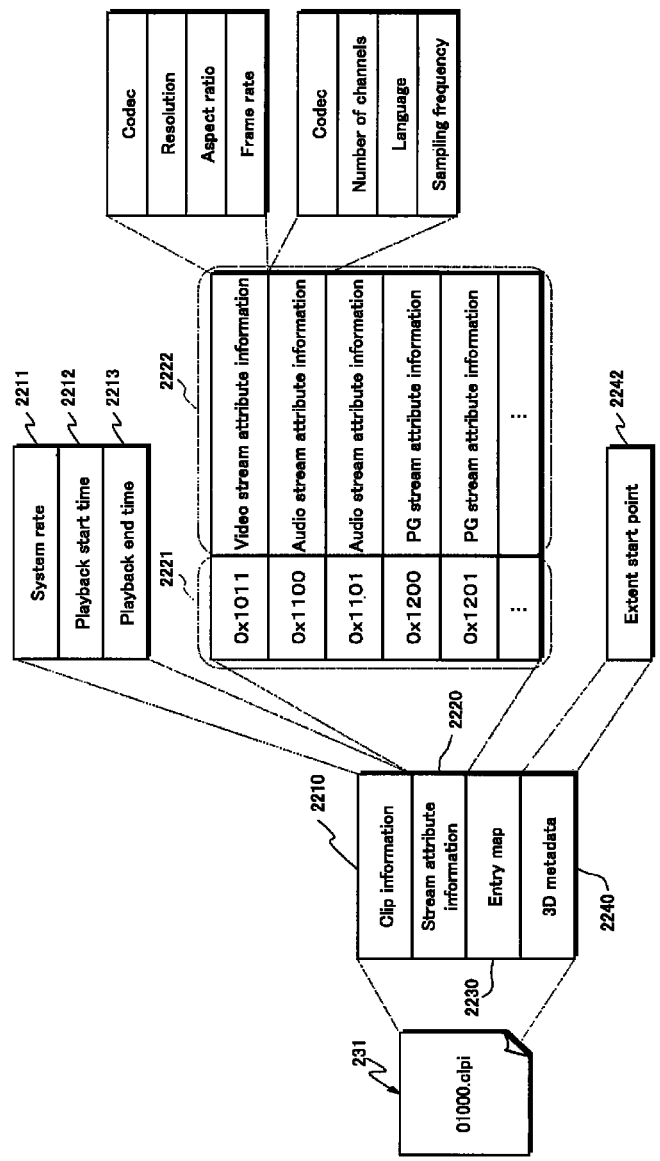
FIG. 22 is a schematic diagram showing a data structure of 2D clip information file (01000.clpi) 231.

FIG. 22 is a schematic diagram showing a data structure of a first clip information file (01000.clpi), i.e. the 2D clip information file 231. The dependent-view clip information file (02000.clip) 232 and the clip information file (03000.clpi) 233 have the same data structure. Below, the data structure common to all clip information files is described, first using the data structure of the 2D clip information file 231 as an example. Afterwards, the differences in data structure between a 2D clip information file and a dependent-view clip information file are described.

As shown in FIG. 22, the 2D clip information file 231 includes clip information 2210, stream attribute information 2220, an entry map 2230, and 3D metadata 2240. The 3D metadata 2240 includes extent start points 2242.

The clip information 2210 includes a system rate 2211, a playback start time 2212, and a playback end time 2213. The system rate 2211 specifies a system rate for the file 2D (01000.m2ts) 241. The playback device 102 in 2D playback mode transfers TS packets belonging to the file 2D 241 from the read buffer to the system target decoder. The "system rate" refers to the upper limit of the transfer rate. The interval between the ATSs of the source packets in the file 2D 241 is set so that the transfer speed is limited to the system rate or lower. The playback start time 2212 indicates the PTS of the VAU located at the top of the file 2D 241, e.g. the PTS of the top video frame. The playback end time 2212 indicates the value of the STC delayed a predetermined time from the PTS of the VAU located at the end of the file 2D 241, e.g. the sum of the PTS of the last video frame and the playback time of one frame.

The stream attribute information 2220 is a correspondence table between the PID 2221 for each elementary stream included in the file 2D 241 and pieces of attribute information 2222. Each piece of attribute information 2222 is different for a video stream, audio stream, PG stream, and IG stream. For example, the attribute information corresponding to the PID 0x1011 for the primary video stream includes a codec type used for the compression of the video stream, as well as a resolution, aspect ratio, and frame rate for each picture constituting the video stream. On the other hand, the attribute information corresponding to the PID 0x1100 for the primary audio stream includes a codec type used for compressing the audio stream, a number of channels included in the audio stream, language, and sampling frequency. The playback device 102 uses this attribute information 2222 to initialize the decoder.

[Entry Map]

FIG. 23A is a schematic diagram showing a data structure of an entry map 2230. As shown in FIG. 23A, the entry map 2230 includes tables 2300. There is the same number of tables 2300 as there are video streams multiplexed in the main TS, and tables are assigned one-by-one to each video stream. In FIG. 23A, each table 2300 is distinguished by the PID of the video stream to which it is assigned. Each table 2300 includes an entry map header 2301 and an entry point 2302. The entry map header 2301 includes the PID corresponding to the table 2300 and the total number of entry points 2302 included in the table 2300. An entry point 2302 associates each pair of a PTS 2303 and source packet number (SPN) 2304 with one of individually differing entry points ID (EP_ID) 2305. The PTS 2303 is equivalent to the PTS for one of the I pictures included in the video stream for the PID indicated by the entry map header 2301. The SPN 2304 is equivalent to the SPN for the top of the source packet group stored in the corresponding I picture. An "SPN" refers to the serial number assigned consecutively from the top to a source packet group belonging to one AV stream file. The SPN is used as the address for each source packet in the AV stream file. In the entry map 2230 in the 2D clip information file 231, the SPN refers to the number assigned to the source packet group belonging to the file 2D 241, i.e. the source packet group constituting the main TS. Accordingly, the entry point 2302 expresses the correspondence between the PTS and the address, i.e. the SPN, of each I picture included in the file 2D 241.

An entry point 2302 does not need to be set for all of the I pictures in the file 2D 241. However, when an I picture is located at the top of a GOP, and the TS packet that includes the top of that I picture is located at the top of a 2D extent, an entry point 2302 has to be set for that I picture.

FIG. 23B is a schematic diagram showing source packets in a source packet group 2310 belonging to a file 2D 241 that are associated with each EP_ID 2305 by the entry map 2230. FIG. 23C is a schematic diagram showing a data block group D[n], B[n] (n=0, 1, 2, 3, . . . ) on a BD-ROM disc 101 corresponding to the source packet group 2310. When the playback device 102 plays back 2D video images from the file 2D 241, it refers to the entry map 2230 to specify the SPN for the source packet that includes a frame representing an arbitrary scene from the PTS for that frame. Specifically, when for example a PTS=360000 is indicated as the PTS for a specific entry point for the playback start position, the playback device 102 first retrieves the SPN=3200 allocated to this PTS in the entry map 2230. Next, the playback device 102 seeks the quotient SPN×192/2048, i.e. the value of the SPN multiplied by 192 bytes, the data amount per source packet, and divided by 2048 bytes, the data amount per sector. As can be understood from FIGS. 5B and 5C, this value is the same as the total number of sectors recorded in the main TS prior to the source packet to which the SPN is assigned. In the example shown in FIG. 23B, this value is 3200×192/2048=300, and is equal to the total number of sectors on which source packet groups 2311 are recorded from SPN 0 through 3199. Next, the playback device 102 refers to the file entry in the file 2D 241 and specifies the LBN of the (total number+1)$^{th}$ sector, counting from the top of the sector groups in which 2D extent groups are recorded. In the example shown in FIG. 23C, within the sector groups in which the base-view data blocks B[0], B[1], B[2], . . . which can be accessed as 2D extents EXT2D[0], EXT2D[1], EXT2D[2], . . . are recorded, the LBN of the 301$^{st}$ sector counting from the top is specified. The playback device 102 indicates this LBN to the BD-ROM drive 121. In this way, base-view data block groups are read as aligned units in order from the sector for this LBN. Furthermore, from the first aligned unit that is read in, the playback device 102 selects the source packet indicated by the entry point for the playback start position and then extracts and decodes an I picture. From then on, subsequent pictures are decoded in order referring to already decoded pictures. In this way, the playback device 102 can play back 2D video images from the file 2D 241 from a specified PTS onwards.

Furthermore, the entry map 2230 is useful for efficient processing during trickplay such as fast forward, reverse, etc. For example, the playback device 102 in 2D playback mode first refers to the entry map 2230 to read SPNs starting at the playback start position, e.g. to read SPN=3200, 4800, . . . in order from the entry points EP_ID=2, 3, . . . that include PTSs starting at PTS=360000. Next, the playback device 102 refers to the file entry in the file 2D 241 to specify the LBN of the sectors corresponding to each SPN. The playback device 102 then indicates each LBN to the BD-ROM drive 121. Aligned units are thus read from the sector for each LBN. Furthermore, from each aligned unit, the playback device 102 selects the source packet indicated by each entry point and then extracts and decodes an I picture. The playback device 102 can thus selectively play back an I picture from the file 2D 241 without analyzing the 2D extent group EXT2D[n] itself.

[Extent Start Point]

Figure 24A:
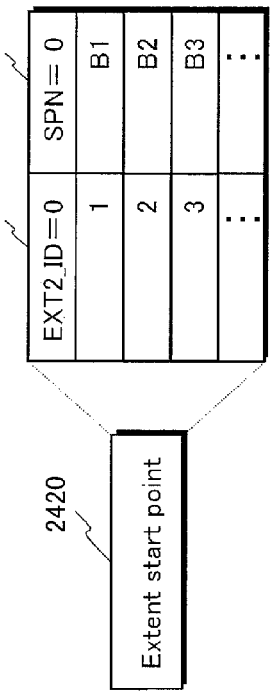
FIG. 24A is a schematic diagram showing a data structure of extent start points 2242.

FIG. 24A is a schematic diagram showing a data structure of extent start points 2242. As shown in FIG. 24A, an "extent start point" 2242 includes base-view extent IDs (EXT1_ID) 2411 and SPNs 2412. The EXT1_IDs 2411 are serial numbers assigned consecutively from the top to the base-view data blocks belonging to the file SS (01000.ssif) 244A. One SPN 2412 is assigned to each EXT1_ID 2411 and is the same as the SPN for the source packet located at the top of the base-view data block identified by the EXT1_ID 2411. This SPN is a serial number assigned from the top to the source packets included in the base-view data block group belonging to the file SS 244A.

In the extent blocks 1901-1903 shown in FIG. 19, the file 2D 241 and the file SS 244A share the base-view data blocks B[0], B[1], B[2], . . . in common. However, data block groups placed at locations requiring a long jump, such as at boundaries between recording layers, generally include base-view data blocks belonging to only one of the file 2D 241 or the file SS 244A (see <<Supplementary Explanation>> for details). Accordingly, the SPN 2412 that indicates the extent start point 2242 generally differs from the SPN for the source packet located at the top of the 2D extent belonging to the file 2D 241.

Figure 24B:
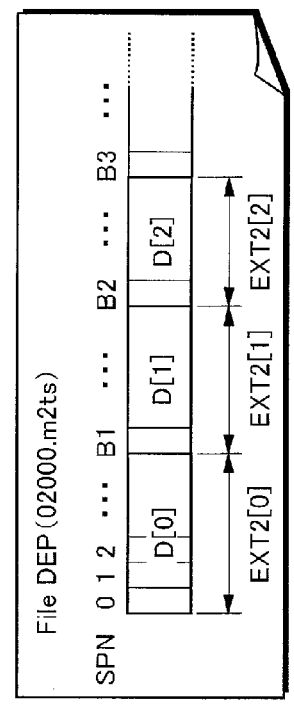
FIG. 24B is a schematic diagram showing a data structure of extent start points 2420 included in dependent-view clip information file (02000.clpi) 232.

FIG. 24B is a schematic diagram showing a data structure of extent start points 2420 included in a second clip information file (02000.clpi), i.e. the dependent-view clip information file 232. As shown in FIG. 24B, the extent start point 2420 includes dependent-view extent IDs (EXT2_ID) 2421 and SPNs 2422. The EXT2_IDs 2421 are serial numbers assigned from the top to the dependent-view data blocks belonging to the file SS 244A. One SPN 2422 is assigned to each EXT2_ID 2421 and is the same as the SPN for the source packet located at the top of the dependent-view data block identified by the EXT2_ID 2421. This SPN is a serial number assigned in order from the top to the source packets included in the dependent-view data block group belonging to the file SS 244A.

Figure 24C:
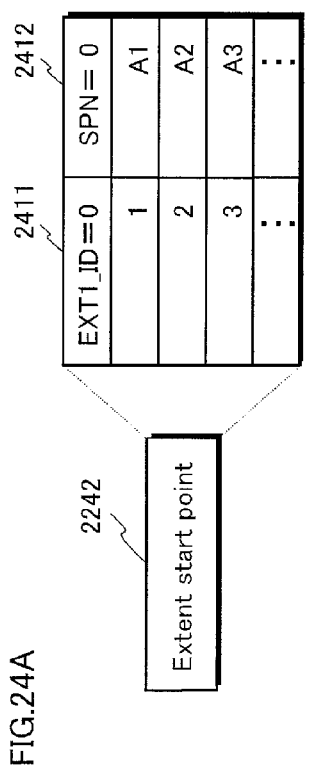
FIG. 24C is a schematic diagram representing the base-view data blocks B[0], B[1], B[2], ... extracted from the file SS 244A by the playback device 102 in 3D playback mode.
Figure 24D:
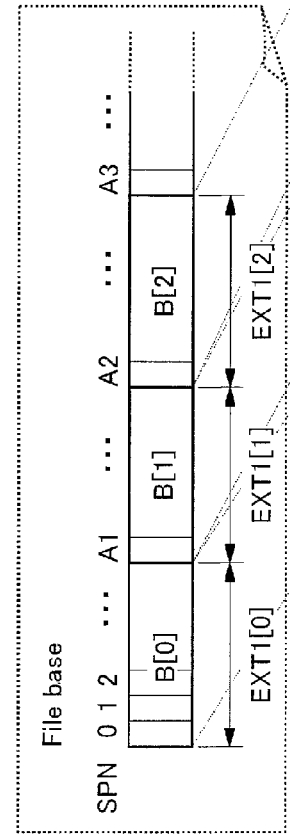
FIG. 24D is a schematic diagram representing correspondence between dependent-view extents EXT2[0], EXT2[1], ... belonging to the file DEP (02000.m2ts) 242 and the SPNs 2422 shown by the extent start points 2420.

FIG. 24D is a schematic diagram representing correspondence between dependent-view extents EXT2[0], EXT2[1], . . . belonging to the file DEP (02000.m2ts) 242 and the SPNs 2422 shown by the extent start points 2420. As shown in FIG. 19, the file DEP 242 and the file SS 244A share dependent-view data blocks in common. Accordingly, as shown in FIG. 24D, each SPN 2422 shown by the extent start points 2420 is the same as the SPN for the source packet located at the top of each dependent-view extent EXT2[0], EXT2[1], . . . .

As described below, the extent start point 2242 in the 2D clip information file 231 and the extent start point 2420 in the dependent-view clip information file 232 are used to detect the boundary of data blocks included in each extent SS during playback of 3D video images from the file SS 244A.

Figure 24E:
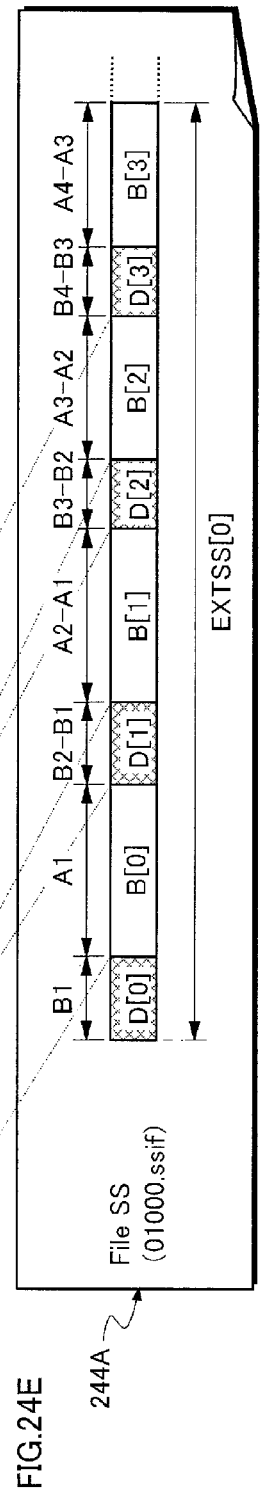
FIG. 24E is a schematic diagram showing correspondence between an extent SS EXTSS[0] belonging to the file SS 244A and an extent block on the BD-ROM disc.

FIG. 24E is a schematic diagram showing an example of correspondence between an extent SS EXTSS[0] belonging to the file SS 244A and an extent block on the BD-ROM disc 101. As shown in FIG. 24E, the extent block includes data block groups D[n] and B[n] (n=0, 1, 2, . . . ) in an interleaved arrangement. Note that the following description is also true for other arrangements. The extent block can be accessed as a single extent SS EXTSS[0]. Furthermore, in the extent SS EXTSS[0], the number of source packets included in the base-view data block B[n] is, at the extent start point 2242, the same as the difference A(n+1)—An between SPNs corresponding to EXT1_ID=n+1 and n. In this case, A0=0. On the other hand, the number of source packets included in the dependent-view data block D[n+1] is, in the extent start point 2420, the same as the difference B(n+1)−Bn between SPNs corresponding to EXT2_ID=n+1 and n. In this case, B0=0.

When the playback device 102 in 3D playback mode plays back 3D video images from the file SS 244A, the playback device 102 refers to the entry maps and the extent start points 2242 and 2420 respectively found in the clip information files 231 and 232. By doing this, the playback device 102 specifies, from the PTS for a frame representing the right view of an arbitrary scene, the LBN for the sector on which a dependent-view data block that is required as a constituent of the frame is recorded. Specifically, the playback device 102 for example first retrieves the SPN associated with the PTS from the entry map in the dependent-view clip information file 232. It is assumed that the source packet indicated by the SPN is included in the third dependent-view extent EXT2[2] in the first file DEP 242, i.e. the dependent-view data block D[2]. Next, the playback device 102 retrieves "B2", the largest SPN before the target SPN, from among the SPNs 2422 shown by the extent start points 2420 in the dependent-view clip information file 232. The playback device 102 also retrieves the corresponding EXT2_ID "2". Then the playback device 102 retrieves the value "A2" for the SPN 2412 corresponding to the EXT1_ID, which is the same as the EXT2_ID "2", from the extent start points 2242 in the 2D clip information file 231. The playback device 102 further seeks the sum B2+A2 of the retrieved SPNs. As can be seen from FIG. 24E, this sum B2+A2 is the same as the total number of source packets included in the data blocks located before the third dependent-view data block D[2] among the data blocks included in the extent SS EXTSS[0]. Accordingly, this sum B2+A2 multiplied by 192 bytes, the data amount per source packet, and divided by 2048 bytes, the data amount per sector, i.e. (B2+A2)×192/2048, is the same as the number of sectors from the top of the extent SS EXTSS[0] until immediately before the third dependent-view data block D[2]. Using this quotient, the LBN for the sector on which the top of the dependent-view data block D[2] is recorded can be specified by referencing the file entry for the file SS 244A.

After specifying the LBN via the above-described procedure, the playback device 102 indicates the LBN to the BD-ROM drive 121. In this way, the portion of the extent SS EXTSS[0] recorded starting with the sector for this LBN, i.e. the data block group D[2], B[2], D[3], B[3], . . . starting from the third dependent-view data block D[2], is read as aligned units.

The playback device 102 further refers to the extent start points 2242 and 2420 to extract dependent-view data blocks and base-view data blocks alternately from the read extents SS. For example, assume that the data block group D[n], B[n] (n=0, 1, 2, . . . ) is read in order from the extent SS EXTSS[0] shown in FIG. 24E. The playback device 102 first extracts B1 source packets from the top of the extent SS EXTSS[0] as the dependent-view data block D[0]. Next, the playback device 102 extracts the B1$^{th}$ source packet and the subsequent (A1−1) source packets, a total of A1 source packets, as the first base-view data block B[0]. The playback device 102 then extracts the (B1+A1)$^{th}$ source packet and the subsequent (B2−B1−1) source packets, a total of (B2−B1) source packets, as the second dependent-view data block D[1]. The playback device 102 further extracts the (A1+B2)$^{th}$ source packet and the subsequent (A2−A1−1) source packets, a total of (A2−A1) source packets, as the second base-view data block B[1]. Thereafter, the playback device 102 thus continues to detect the boundary between data blocks in the extent SS based on the number of read source packets, thereby alternately extracting dependent-view and base-view data blocks. The extracted base-view and dependent-view data blocks are transmitted to the system target decoder to be decoded in parallel.

In this way, the playback device 102 in 3D playback mode can play back 3D video images from the file SS 244A starting at a specific PTS. As a result, the playback device 102 can in fact benefit from the above-described advantages (A) and (B) regarding control of the BD-ROM drive 121.

<<File Base>>

FIG. 24C is a schematic diagram representing the base-view data blocks B[0], B[1], B[2], . . . extracted from the file SS 244A by the playback device 102 in 3D playback mode. As shown in FIG. 24C, when allocating SPNs in order from the top to a source packet group included in the base-view data block B[n] (n=0, 1, 2, . . . ), the SPN of the source packet located at the top of the data block B[n] is equal to the SPN 2412 indicating the extent start point 2242. The base-view data block group extracted from a single file SS by referring to extent start points, like the base-view data block group B[n], is referred to as a "file base". Furthermore, the base-view data blocks included in a file base are referred to as "base-view extents". As shown in FIG. 24E, each base-view extent EXT1[0], EXT1[1] . . . is referred to by an extent start point 2242 or 2420 in a clip information file.

A base-view extent EXT1[n] shares the same base-view data block B[n] with a 2D extent EXT2D[n]. Accordingly, the file base includes the same main TS as the file 2D. Unlike the 2D extent EXT2D[n], however, the base-view extent EXT1[n] is not referred to by any file entry. As described above, the base-view extent EXT1[n] is extracted from the extent SS EXTSS[•] in the file SS with use of the extent start point in the clip information file. The file base thus differs from a conventional file by not including a file entry and by needing an extent start point as a reference for a base-view extent. In this sense, the file base is a "virtual file". In particular, the file base is not recognized by the file system and does not appear in the directory/file structure shown in FIG. 2.

Figure 25:
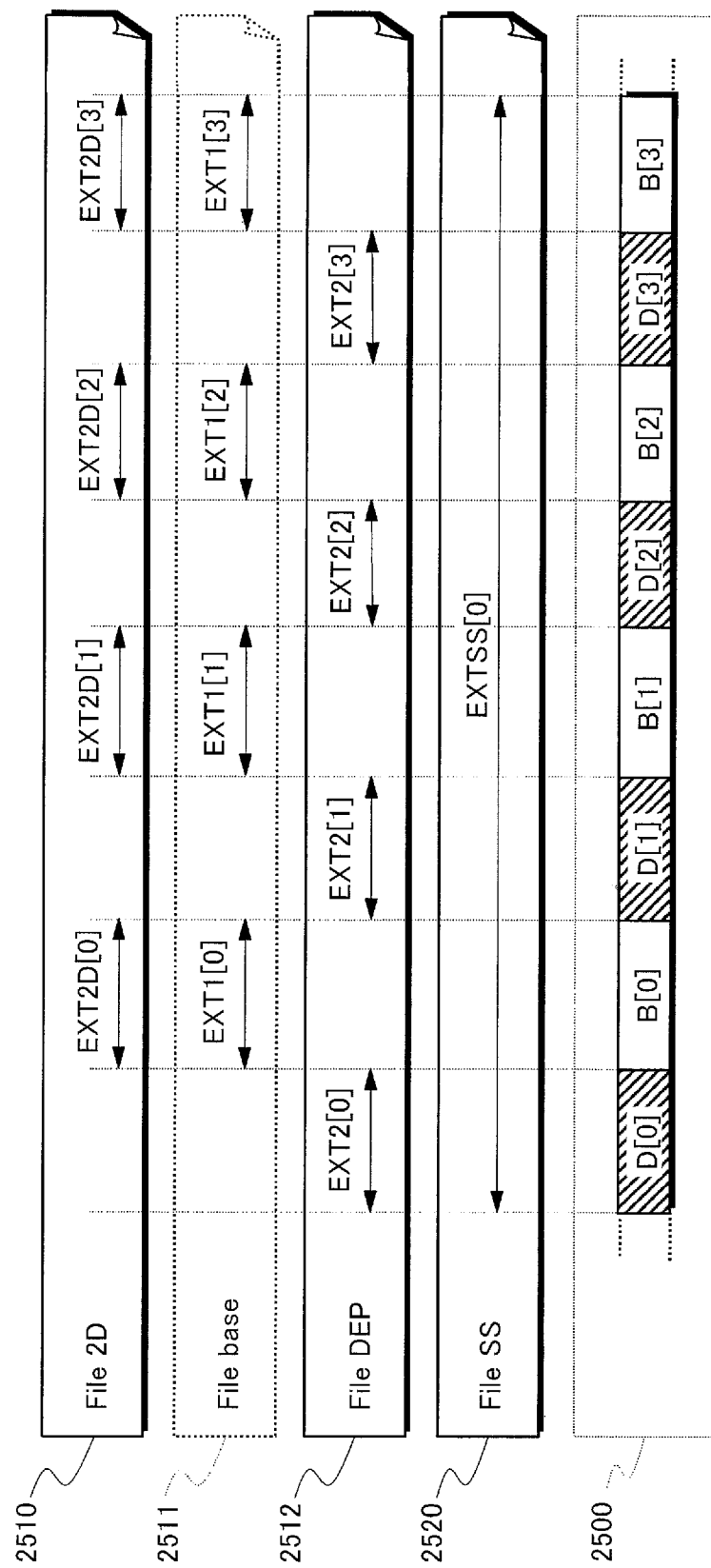
FIG. 25 is a schematic diagram showing correspondence between a single extent block 2500 recorded on the BD-ROM disc and each of the extent block groups in a file 2D 2510, file base 2511, file DEP 2512, and file SS 2520.

FIG. 25 is a schematic diagram showing correspondence between a single extent block 2500 recorded on the BD-ROM disc 101 and each of the extent block groups in a file 2D 2510, file base 2511, file DEP 2512, and file SS 2520. As shown in FIG. 25, the extent block 2500 includes the dependent-view data blocks D[n] and the base-view data blocks B[n] (n= . . . , 0, 1, 2, 3, . . . ). The base-view data block B[n] belongs to the file 2D 2510 as the 2D extent EXT2D[n]. The dependent-view data block D[n] belongs to the file DEP 2512 as the dependent-view extent EXT2[n]. The entirety of the extent block 2500 belongs to the file SS 2520 as one extent SS EXTSS[0]. Accordingly, the extent SS EXTSS[0] shares the base-view data block B[n] in common with the 2D extent EXT2D[n] and shares the dependent-view data block D[n] with the dependent-view extent EXT2[n]. After being read into the playback device 102, the extent SS EXTSS[0] is separated into the dependent-view data block D[n] and the base-view data block B[n]. These base-view data blocks B[n] belong to the file base 2511 as the base-view extents EXT1[n]. The boundary in the extent SS EXTSS[0] between the base-view extent EXT1[n] and the dependent-view extent EXT2[n] is specified with use of the extent start point in the clip information file corresponding to each of the file 2D 2510 and the file DEP 2512.

<<Dependent-View Clip Information File>>

The dependent-view clip information file has the same data structure as the 2D clip information file shown in FIGS. 22-24. Accordingly, the following description covers the differences between the dependent-view clip information file and the 2D clip information file. Details on the similarities can be found in the above description.

A dependent-view clip information file differs from a 2D clip information file mainly in the following two points: (i) conditions are placed on the stream attribute information, and (ii) conditions are placed on the entry points.

(i) When the base-view video stream and the dependent-view video stream are to be used for playback of 3D video images by the playback device 102 in L/R mode, as shown in FIG. 7, the dependent-view video stream is compressed using the base-view video stream. At this point, the video stream attributes of the dependent-view video stream become equivalent to the base-view video stream. The video stream attribute information for the base-view video stream is associated with PID=0x1011 in the stream attribute information 2220 in the 2D clip information file. On the other hand, the video stream attribute information for the dependent-view video stream is associated with PID=0x1012 or 0x1013 in the stream attribute information in the dependent-view clip information file. Accordingly, the items shown in FIG. 22, i.e. the codec, resolution, aspect ratio, and frame rate, have to match between these two pieces of video stream attribute information. If the codec type matches, then a reference relationship between pictures in the base-view video stream and the dependent-view video stream is established during coding, and thus each picture can be decoded. If the resolution, aspect ratio, and frame rate all match, then on-screen display of the left and right videos can be synchronized. Therefore, these videos can be shown as 3D video images without making the viewer feel uncomfortable.

(ii) The entry map in the dependent-view clip information file includes a table allocated to the dependent-view video stream. Like the table 2300 shown in FIG. 23A, this table includes an entry map header and entry points. The entry map header indicates the PID for the dependent-view video stream allocated to the table, i.e. either 0x1012 or 0x1013. In each entry point, a pair of a PTS and an SPN is associated with a single EP_ID. The PTS for each entry point is the same as the PTS for the top picture in one of the GOPs included in the dependent-view video stream. The SPN for each entry point is the same as the top SPN of the source packet group stored in the picture indicated by the PTS belonging to the same entry point. This SPN refers to a serial number assigned consecutively from the top to the source packet group belonging to the file DEP, i.e. the source packet group constituting the sub-TS. The PTS for each entry point has to match the PTS, within the entry map in the 2D clip information file, for the entry point in the table allotted to the base-view video stream. In other words, whenever an entry point is set at the top of a source packet group that includes one of a set of pictures included in the same 3D VAU, an entry point always has to be set at the top of the source packet group that includes the other picture.

Figure 26:
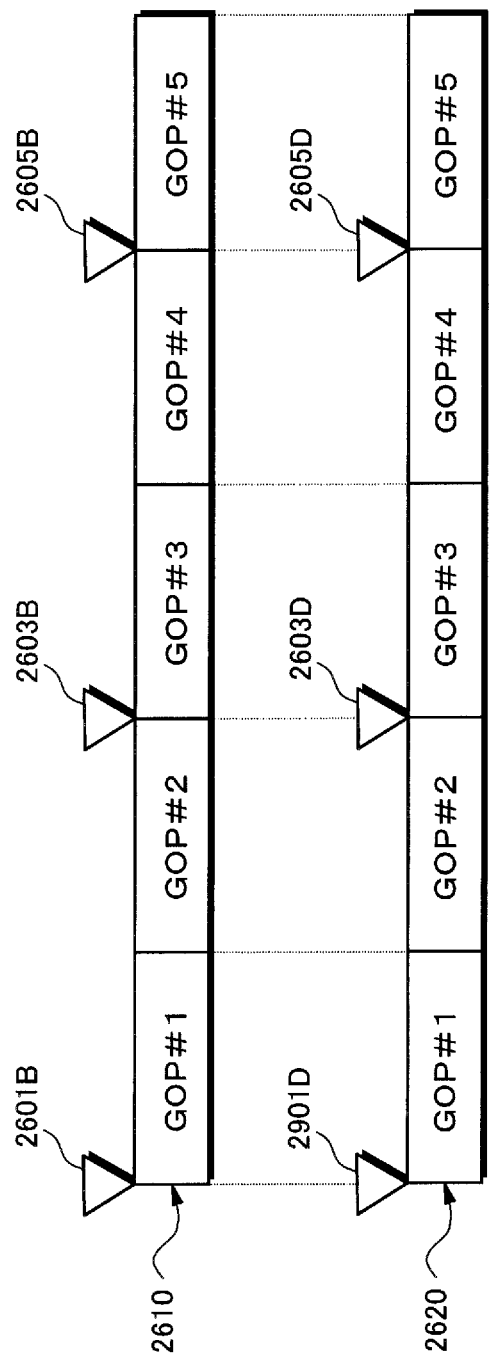
FIG. 26 is a schematic diagram showing an example of entry points set in a base-view video stream 2610 and a dependent-view video stream 2620.

FIG. 26 is a schematic diagram showing an example of entry points set in a base-view video stream 2610 and a dependent-view video stream 2620. In the two video streams 2610 and 2620, GOPs that are the same number from the top represent video for the same playback period. As shown in FIG. 26, in the base-view video stream 2610, entry points 2601B, 2603B, and 2605B are set at the top of the odd-numbered GOPs as counted from the top, i.e. GOP #1, GOP #3, and GOP #5. Accordingly, in the dependent-view video stream 2620 as well, entry points 2601D, 2603D, and 2605D are set at the top of the odd-numbered GOPs as counted from the top, i.e. GOP #1, GOP #3, and GOP #5. In this case, when the playback device 102 begins playback of 3D video images from GOP #3, for example, it can immediately calculate the address of the playback start position in the file SS from the SPN of the corresponding entry points 2603B and 2603D. In particular, when both entry points 2603B and 2603D are set at the top of a data block, then as can be understood from FIG. 24E, the sum of the SPNs of the entry points 2603B and 2603D equals the SPN of the playback start position within the file SS. As described with reference to FIG. 24E, from this number of source packets, it is possible to calculate the LBN of the sector on which the part of the file SS for the playback start position is recorded. In this way, even during playback of 3D video images, it is possible to improve response speed for processing that requires random access to the video stream, such as interrupt playback or the like.

<<2D Playlist File>>

Figure 27:
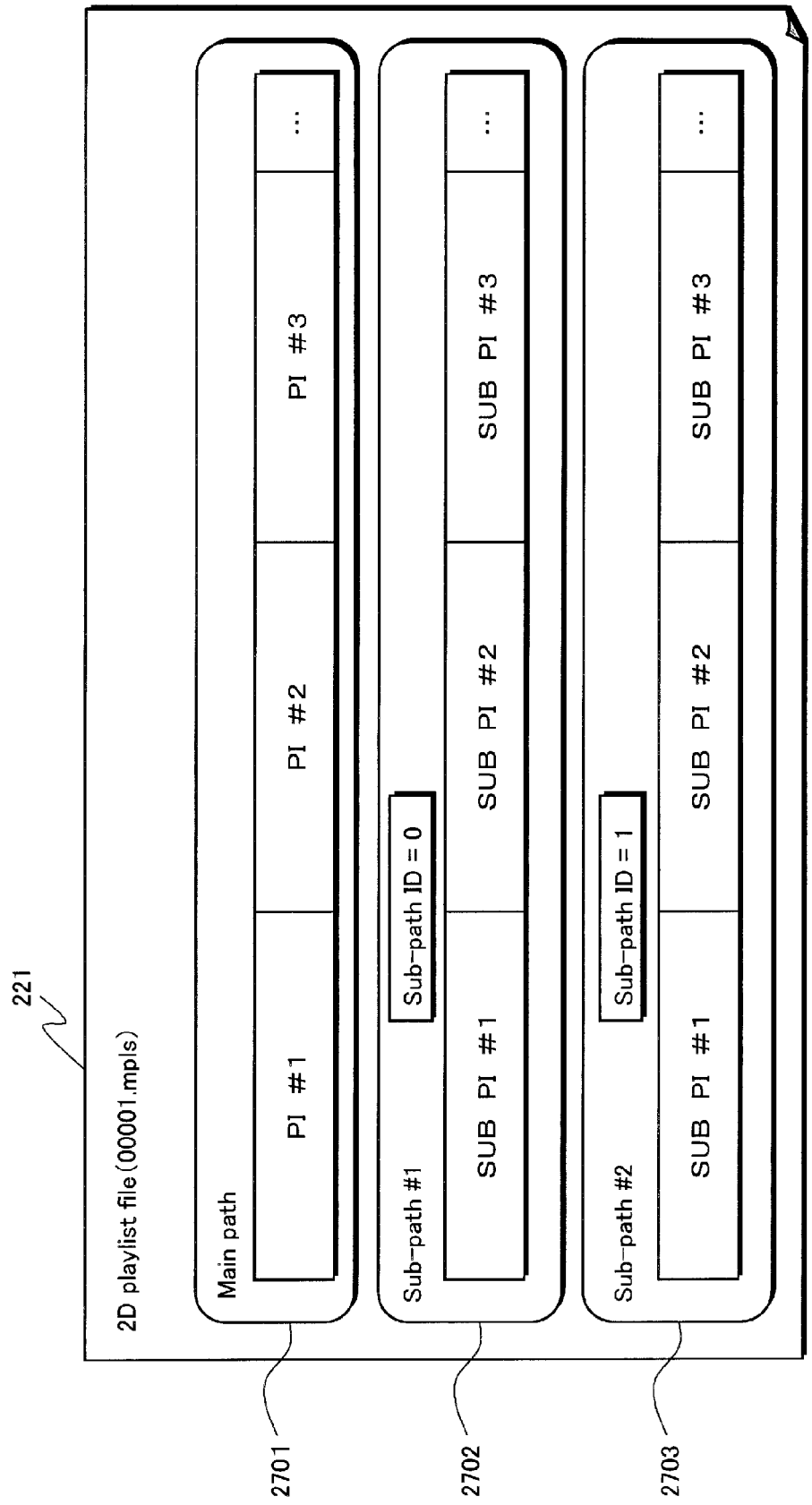
FIG. 27 is a schematic diagram showing a data structure of a 2D playlist file.

FIG. 27 is a schematic diagram showing a data structure of a 2D playlist file. The first playlist file (00001.mpls) 221 shown in FIG. 2 has this data structure. As shown in FIG. 27, the 2D playlist file 221 includes a main path 2701 and two sub-paths 2702 and 2703.

The main path 2701 is a sequence of playitem information pieces (PI) that defines the main playback path for the file 2D 241, i.e. the section for playback and the section's playback order. Each PI is identified with a unique playitem ID=#N (N=1, 2, 3, . . . ). Each PI #N defines a different playback section along the main playback path with a pair of PTSs. One of the PTSs in the pair represents the start time (In-Time) of the playback section, and the other represents the end time (Out-Time). Furthermore, the order of the PIs in the main path 2701 represents the order of corresponding playback sections in the playback path.

Each of the sub-paths 2702 and 2703 is a sequence of sub-playitem information pieces (SUB_PI) that defines a playback path that can be associated in parallel with the main playback path for the file 2D 241. Such a playback path is a different section of the file 2D 241 than is represented by the main path 2701, or is a section of stream data multiplexed in another file 2D, along with the corresponding playback order. The playback path may also indicate stream data multiplexed in a different file 2D than the file 2D 241 as a section for playback, along with the corresponding playback order. The stream data indicated by the playback path represents other 2D video images to be played back simultaneously with 2D video images played back from the file 2D 241 in accordance with the main path 2701. These other 2D video images include, for example, sub-video in a picture-in-picture format, a browser window, a pop-up menu, or subtitles. Serial numbers "0" and "1" are assigned to the sub-paths 2702 and 2703 in the order of registration in the 2D playlist file 221. These serial numbers are used as sub-path IDs to identify the sub-paths 2702 and 2703. In the sub-paths 2702 and 2703, each SUB_PI is identified by a unique sub-playitem ID=#M (M=1, 2, 3, . . . ). Each SUB_PI #M defines a different playback section along the playback path with a pair of PTSs. One of the PTSs in the pair represents the playback start time of the playback section, and the other represents the playback end time. Furthermore, the order of the SUB_PIs in the sub-paths 2702 and 2703 represents the order of corresponding playback sections in the playback path.

Figure 28:
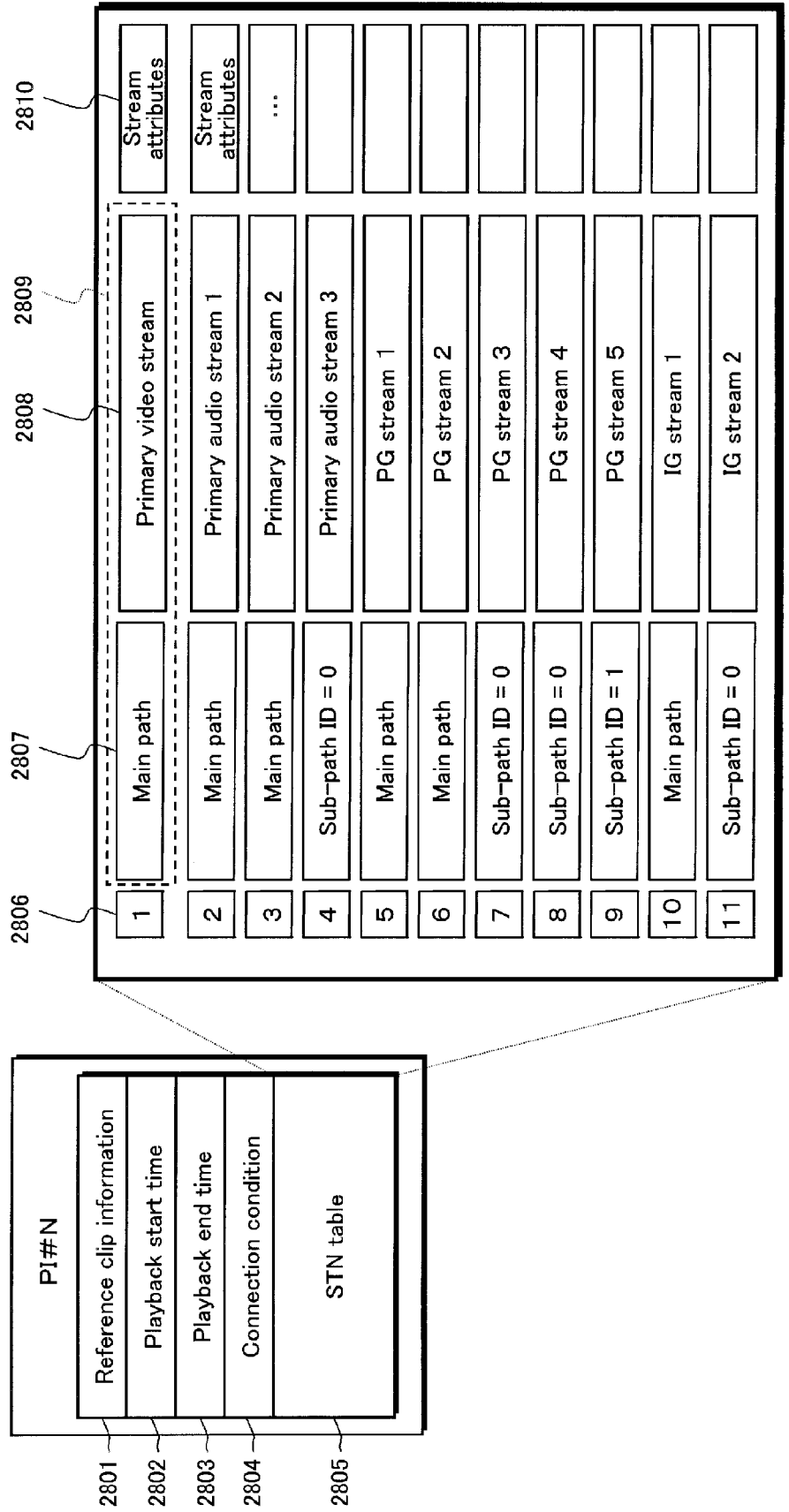
FIG. 28 is a schematic diagram showing a data structure of PI #N shown in FIG. 27.

FIG. 28 is a schematic diagram showing a data structure of PI #N. As shown in FIG. 28, a PI #N includes a piece of reference clip information 2801, playback start time (In_Time) 2802, playback end time (Out_Time) 2803, connection condition 2804, and stream selection table (hereinafter referred to as "STN table" (stream number table)) 2805. The reference clip information 2801 is information for identifying the 2D clip information file 231. The playback start time 2802 and playback end time 2803 respectively indicate PTSs for the beginning and the end of the section for playback of the file 2D 241. The connection condition 2804 specifies a condition for connecting video in the playback section specified by a playback start time 2802 and a playback end time 2803 to video in the playback section specified by the previous PI #(N−1). The STN table 2805 is a list of elementary streams that can be selected from the file 2D 241 by the decoder in the playback device 102 from the playback start time 2802 until the playback end time 2803.

The data structure of a SUB_PI is the same as the data structure of the PI shown in FIG. 28 insofar as it includes reference clip information, a playback start time, and a playback end time. In particular, the playback start time and playback end time of a SUB_PI are expressed as values along the same time axis as a PI. The SUB_PI further includes an "SP connection condition" field. The SP connection condition has the same meaning as a PI connection condition.

[Connection Condition]

The connection condition (hereinafter abbreviated as "CC") 2804 can for example be assigned three types of values, "1", "5", and "6". When the CC 2804 is "1", the video to be played back from the section of the file 2D 241 specified by the PI #N does not need to be seamlessly connected to the video played back from the section of the file 2D 241 specified by the immediately preceding PI #(N−1). On the other hand, when the CC 2804 indicates "5" or "6", both video images need to be seamlessly connected.

Figure 29A:
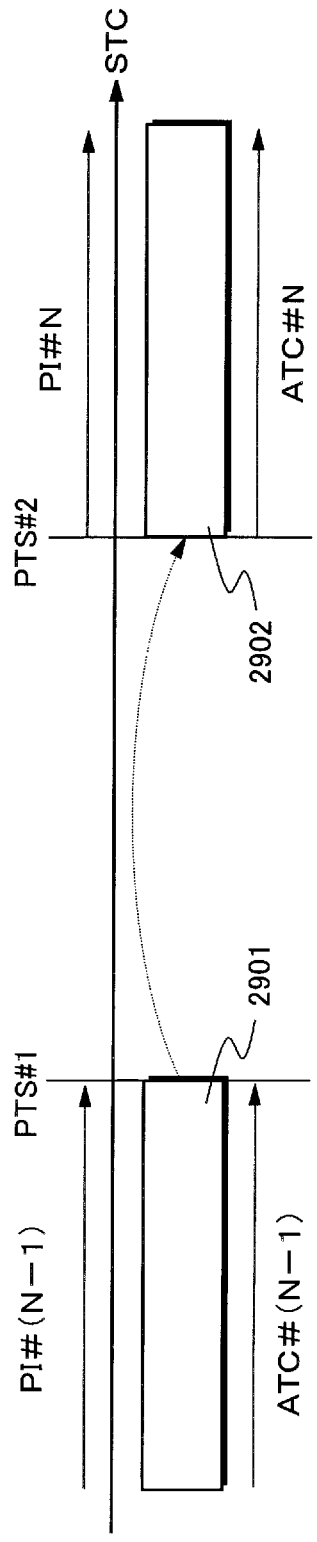
FIGS. 29A and 29B are schematic diagrams showing a correspondence between two playback sections 2901 and 2902 to be connected when CC is "5" or "6".
Figure 29B:
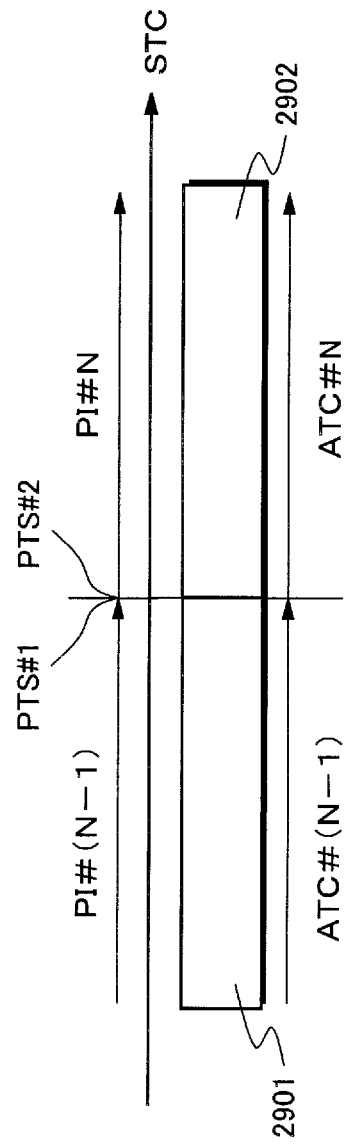

FIGS. 29A and 29B are schematic diagrams showing correspondence between two playback sections 2901 and 2902 that are to be connected when CC is "5" or "6". In this case, the PI #(N−1) specifies a first section 2901 in the file 2D 241, and the PI #N specifies a second section 2902 in the file 2D 241. As shown in FIG. 29A, when the CC indicates "5", the STCs of the two PIs, PI #(N−1) and PI #N, may be nonconsecutive. That is, the PTS #1 at the end of the first section 2901 and the PTS #2 at the top of the second section 2902 may be nonconsecutive. Several constraint conditions, however, need to be satisfied. For example, the first section 2901 and second section 2902 need to be created so that the decoder can smoothly continue to decode data even when the second section 2902 is supplied to the decoder consecutively after the first section 2901. Furthermore, the last frame of the audio stream contained in the first section 2901 needs to overlap the top frame of the audio stream contained in the second section 2902. On the other hand, as shown in FIG. 29B, when the CC indicates "6", the first section 2901 and the second section 2902 need to be able to be handled as successive sections for the decoder to duly decode. That is, STCs and ATCs need to be contiguous between the first section 2901 and the second section 2902. Similarly, when the SP connection condition is "5" or "6", STCs and ATCs both need to be contiguous between sections of the file 2D specified by two contiguous SUB_PIs.

[STN Table]

Referring again to FIG. 28, the STN table 2805 is an array of stream registration information. "Stream registration information" is information individually listing the elementary streams that can be selected for playback from the main TS between the playback start time 2802 and playback end time 2803. The stream number (STN) 2806 is a serial number allocated individually to stream registration information and is used by the playback device 102 to identify each elementary stream. The STN 2806 further indicates priority for selection among elementary streams of the same type. The stream registration information includes a stream entry 2809 and stream attribute information 2810. The stream entry 2809 includes stream path information 2807 and stream identification information 2808. The stream path information 2807 is information indicating the file 2D to which the selected elementary stream belongs. For example, if the stream path information 2807 indicates "main path", the file 2D corresponds to the 2D clip information file indicated by reference clip information 2801. On the other hand, if the stream path information 2807 indicates "sub-path ID=1", the file 2D to which the selected elementary stream belongs corresponds to the 2D clip information file indicated by the reference clip information of the SUB_PI included in the sub-path with a sub-path ID=1. The playback start time and playback end time specified by this SUB_PI are both included in the interval from the playback start time 2802 until the playback end time 2803 specified by the PI included in the STN table 2805. The stream identification information 2808 indicates the PID for the elementary stream multiplexed in the file 2D specified by the stream path information 2807. The elementary stream indicated by this PID can be selected from the playback start time 2802 until the playback end time 2803. The stream attribute information 2810 indicates attribute information for each elementary stream. For example, the attribute information for each of an audio stream, PG stream, and IG stream indicates a language type of the stream.

[Playback of 2D Video Images in Accordance with a 2D Playlist File]

FIG. 30 is a schematic diagram showing correspondence between the PTSs indicated by the 2D playlist file (00001.mpls) 221 and the sections played back from the file 2D (01000.m2ts) 241. As shown in FIG. 30, in the main path 2701 in the 2D playlist file 221, the PI #1 specifies a PTS #1, which indicates a playback start time IN1, and a PTS #2, which indicates a playback end time OUT1. The reference clip information for the PI #1 indicates the 2D clip information file (01000.clpi) 231. When playing back 2D video images in accordance with the 2D playlist file 221, the playback device 102 first reads the PTS #1 and PTS #2 from the PI #1. Next, the playback device 102 refers to the entry map in the 2D clip information file 231 to retrieve from the file 2D 241 the SPN #1 and SPN #2 that correspond to the PTS #1 and PTS #2. The playback device 102 then calculates the corresponding numbers of sectors from the SPN #1 and SPN #2. Furthermore, the playback device 102 refers to these numbers of sectors and the file entry for the file 2D 241 to specify the LBN #1 and LBN #2 at the beginning and end, respectively, of the sector group P1 on which the 2D extent group EXT2D[0], ..., EXT2D[n] to be played back is recorded. Calculation of the numbers of sectors and specification of the LBNs are as per the description on FIGS. 23B and 23C. Finally, the playback device 102 indicates the range from LBN #1 to LBN #2 to the BD-ROM drive 121. The source packet group belonging to the 2D extent group EXT2D[0], ..., EXT2D[n] is thus read from the sector group P1 in this range. Similarly, the pair PTS #3 and PTS #4 indicated by the PI #2 are first converted into a pair of SPN #3 and SPN #4 by referring to the entry map in the 2D clip information file 231. Then, referring to the file entry for the file 2D 241, the pair of SPN #3 and SPN #4 are converted into a pair of LBN #3 and LBN #4. Furthermore, a source packet group belonging to the 2D extent group is read from the sector group P2 in a range from the LBN #3 to the LBN #4. Conversion of a pair of PTS #5 and PTS #6 indicated by the PI #3 to a pair of SPN #5 and SPN #6, conversion of the pair of SPN #5 and SPN #6 to a pair of LBN #5 and LBN #6, and reading of a source packet group from the sector group P3 in a range from the LBN #5 to the LBN #6 are similarly performed. The playback device 102 thus plays back 2D video images from the file 2D 241 in accordance with the main path 2701 in the 2D playlist file 221.

The 2D playlist file 221 may include an entry mark 3001. The entry mark 3001 indicates a time point in the main path 2701 at which playback is actually to start. For example, as shown in FIG. 30, a plurality of entry marks 3001 can be set for the PI #1. The entry mark 3001 is particularly used for searching for a playback start position during random access. For example, when the 2D playlist file 221 specifies a playback path for a movie title, the entry marks 3001 are assigned to the top of each chapter. Consequently, the playback device 102 can play back the movie title by chapters.

<<3D Playlist File>>

Figure 31:
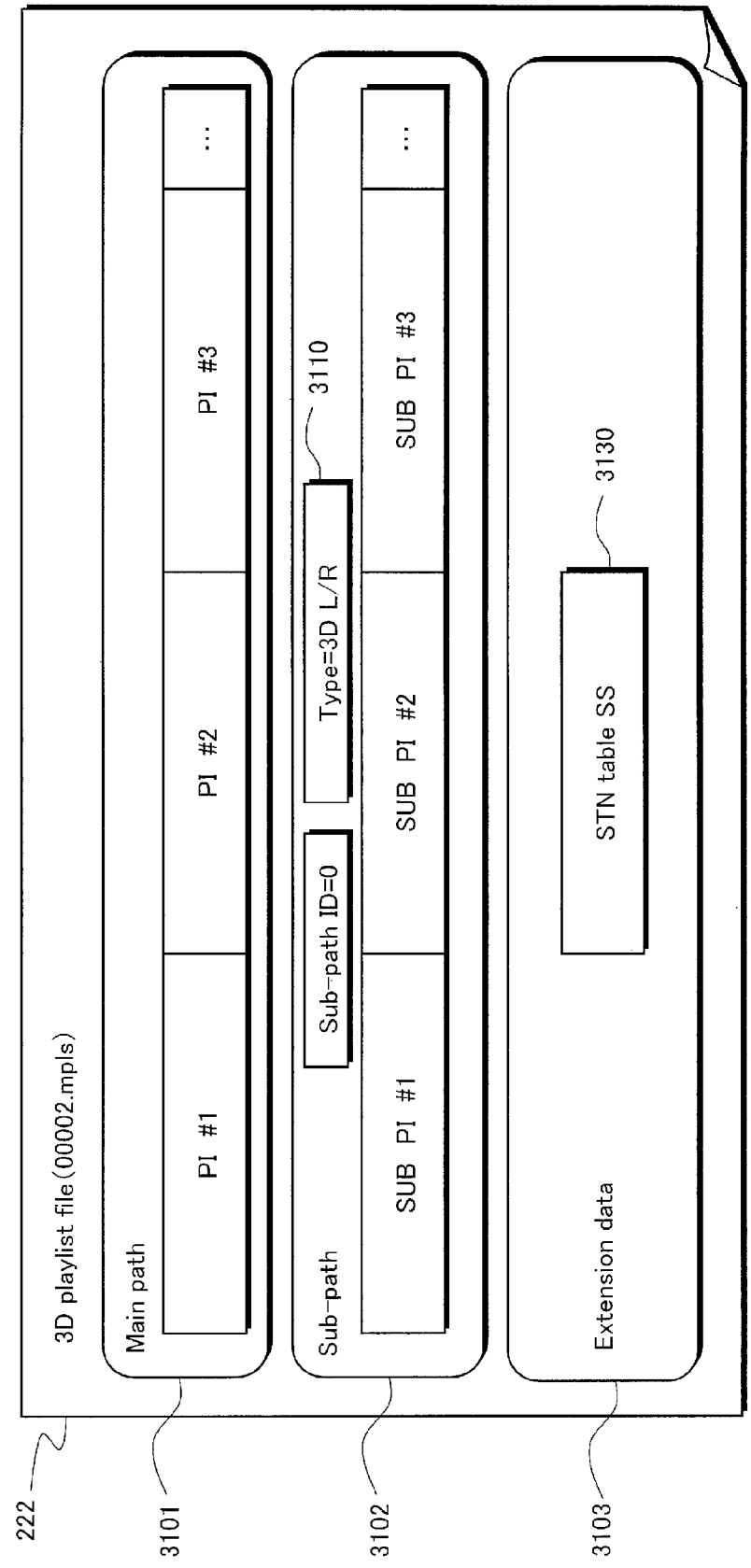
FIG. 31 is a schematic diagram showing a data structure of a 3D playlist file.

FIG. 31 is a schematic diagram showing a data structure of a 3D playlist file. The second playlist file (00002.mpls) 222 shown in FIG. 2 has this data structure, as does the third playlist file (00003.mpls) 223. As shown in FIG. 31, the 3D playlist file 222 includes a main path 3101, sub-path 3102, and extension data 3103.

The main path 3101 specifies the playback path of the main TS shown in FIG. 3A. Accordingly, the main path 3101 is substantially the same as the main path 2701 for the 2D playlist file 221 shown in FIG. 27. In other words, the playback device 102 in 2D playback mode can play back 2D video images from the file 2D 241 in accordance with the main path 3101 in the 3D playlist file 222. The main path 3101 differs from the main path 2701 shown in FIG. 27 in that, when an STN is associated with a PID in a graphics stream, the STN table for each PI allocates an offset sequence ID to the STN.

The sub-path 3102 specifies the playback path for the sub-TS shown in FIG. 3B, i.e. the playback path for the file DEP 242 or 243. The data structure of the sub-path 3102 is the same as the data structure of the sub-paths 2702 and 2703 in the 2D playlist file 241 shown in FIG. 27. Accordingly, details of this similar data structure can be found in the description on FIG. 27, in particular details of the data structure of the SUB_PI.

The SUB_PI #N (N=1, 2, 3, . . . ) in the sub-path 3102 are in one-to-one correspondence with the PI #N in the main path 3101. Furthermore, the playback start time and playback end time specified by each SUB_PI #N is the same as the playback start time and playback end time specified by the corresponding PI #N. The sub-path 3102 additionally includes a sub-path type 3110. The "sub-path type" generally indicates whether playback processing should be synchronized between the main path and the sub-path. In the 3D playlist file 222, the sub-path type 3110 in particular indicates the type of the 3D playback mode, i.e. the type of the dependent-view video stream to be played back in accordance with the sub-path 3102. In FIG. 31, the value of the sub-path type 3110 is "3D L/R", thus indicating that the 3D playback mode is L/R mode, i.e. that the right-view video stream is to be played back. On the other hand, a value of "3D depth" for the sub-path type 3110 indicates that the 3D playback mode is depth mode, i.e. that the depth map stream is to be played back. When the playback device 102 in 3D playback mode detects that the value of the sub-path type 3110 is "3D L/R" or "3D depth", the playback device 102 synchronizes playback processing that conforms to the main path 3101 with playback processing that conforms to the sub-path 3102.

Extension data 3103 is interpreted only by the playback device 102 in 3D playback mode; the playback device 102 in 2D playback mode ignores the extension data 3103. In particular, the extension data 3103 includes an extension stream selection table 3130. The "extension stream selection table (STN_table_SS)" (hereinafter abbreviated as "STN table SS") is an array of stream registration information to be added to the STN tables indicated by each PI in the main path 3101 during 3D playback mode. This stream registration information indicates elementary streams that can be selected for playback from the sub TS.

[STN Table]

FIG. 32 is a schematic diagram showing an STN table 3205 included in a main path 3101 of the 3D playlist file 222. As shown in FIG. 32, the stream identification information 3208 allocated to STN 3206=5, 6, . . . , 11 indicates PIDs for a PG stream, or IG stream. In this case, the stream attribute information 3210 allocated to the STN 3206=5, 6, . . . , 11 further includes a reference offset ID 3201 and offset adjustment value 3202.

In the file DEP 242, as shown in FIG. 11, offset metadata 1110 is placed in VAU #1 of each video sequence. The reference offset ID (stream_ref_offset_id) 3201 is the same as one of the offset sequence IDs 1111 included in the offset metadata 1110. In other words, the reference offset ID 3201 defines the offset sequence that should be associated with each of the STNs 3206=5, 6, . . . , 11 from among the plurality of offset sequences included in the offset metadata 1110.

The offset adjustment value (stream_offset_adjustment) 3202 indicates the value that should be added to each offset value included in the offset sequence defined by the reference offset ID 3201. The offset adjustment value 3202 is, for example, added by the playback device 102 to each offset value when the size of the screen of the display device 103 differs from the size that was assumed during creation of the 3D video content. In this way, the binocular parallax between 2D graphics images for a left view and a right view can be maintained in an appropriate range.

[STN Table SS]

Figure 33:
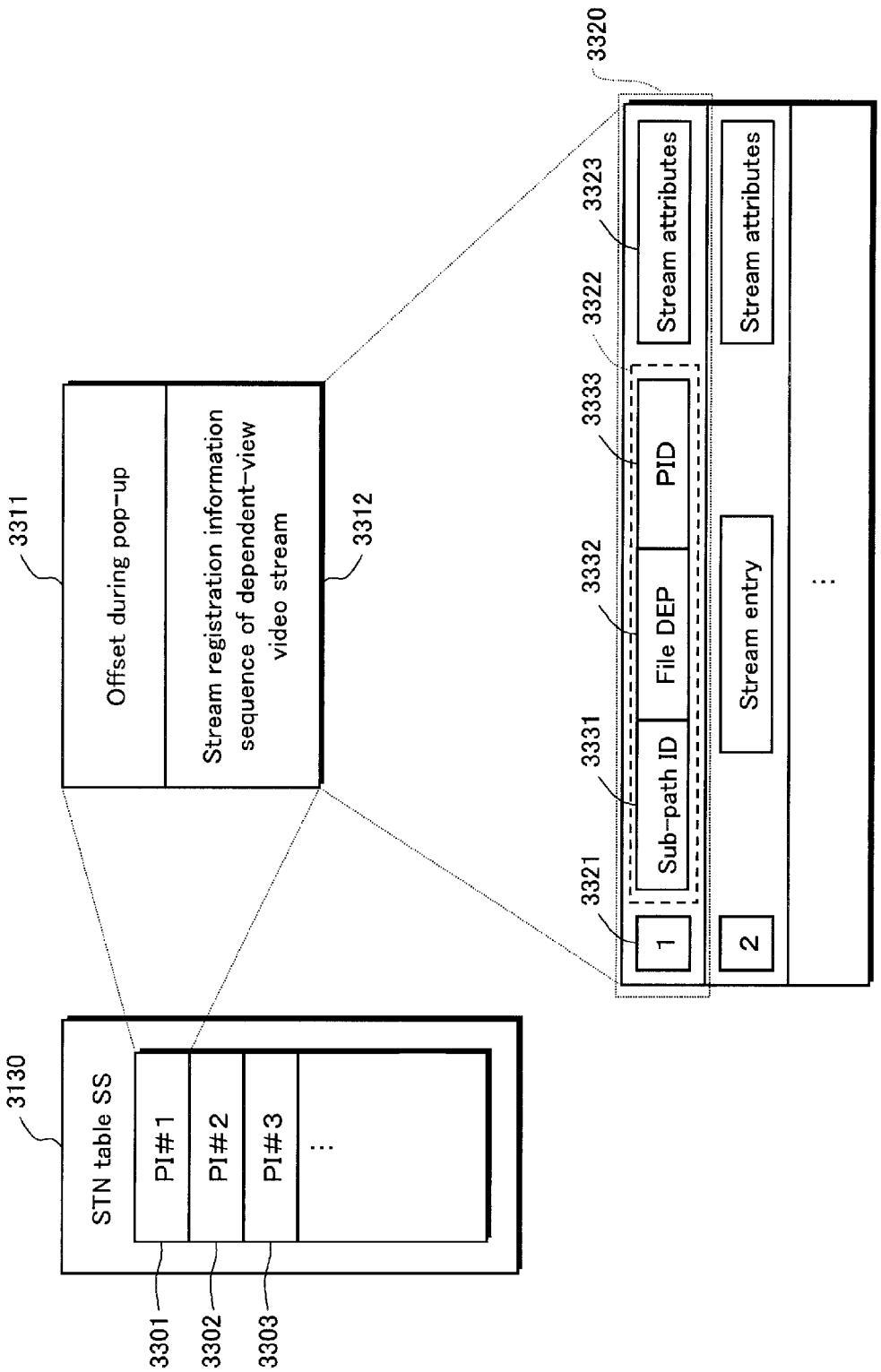
FIG. 33 is a schematic diagram showing a data structure of the STN table SS 3130 shown in FIG. 31.

FIG. 33 is a schematic diagram showing a data structure of the STN table SS 3130. As shown in FIG. 33, an STN table SS 3130 includes stream registration information sequences 3301, 3302, 3303, . . . . The stream registration information sequences 3301, 3302, 3303, . . . individually correspond to the PI #1, PI #2, PI #3, . . . in the main path 3101 and are used by the playback device 102 in 3D playback mode in combination with the stream registration information sequences included in the STN tables in the corresponding PIs. The stream registration information sequence 3301 corresponding to each PI includes an offset during pop-up (Fixed_offset_during_Popup) 3311 and stream registration information sequence 3312 for the dependent-view video streams.

The offset during pop-up 3311 indicates whether a pop-up menu is played back from the IG stream. The playback device 102 in 3D playback mode changes the presentation mode of the video plane and the graphics plane in accordance with the value of the offset 3311. There are two types of presentation modes for the video plane: base-view (B)-dependent-view (D) presentation mode and B-B presentation mode. There are two types of presentation modes for the graphics plane: 1 plane+offset mode and 1 plane+zero offset mode. For example, when the value of the offset during pop-up 3311 is "0", a pop-up menu is not played back from the IG stream. At this point, B-D presentation mode is selected as the video plane presentation mode, and 1 plane+offset mode is selected as the presentation mode for the graphics plane. On the other hand, when the value of the offset during pop-up 3311 is "1", a pop-up menu is played back from the IG stream. At this point, B-B presentation mode is selected as the video plane presentation mode, and 1 plane+zero offset mode is selected as the presentation mode for the graphics plane.

In "B-D presentation mode", the playback device 102 alternately outputs the left-view and right-view video planes. Accordingly, since left-view and right-view frames are alternately displayed on the screen of the display device 103, the viewer perceives these frames as 3D video images. In "B-B presentation mode", the playback device 102 outputs plane data decoded only from the base-view video stream twice for a frame while maintaining the operation mode in 3D playback mode (in particular, maintaining the frame rate at the value for 3D playback, e.g. 48 frames/second). Accordingly, only either the left-view or right-view video plane is displayed on the screen of the display device 103, and thus the viewer perceives these video planes simply as 2D video images.

In "1 plane+offset mode", the playback device 102 generates, via offset control, a pair of left-view and right-view graphics planes from the graphics stream in the main TS and alternately outputs these graphics planes. Accordingly, left-view and right-view graphics planes are alternately displayed on the screen of the display device 103, and thus the viewer perceives these frames as 3D graphics images. In "1 plane+zero offset mode", the playback device 102 temporarily stops offset control and outputs a graphics plane decoded from the graphics stream in the main TS twice for a frame while maintaining the operation mode in 3D playback mode. Accordingly, only either the left-view or right-view graphics planes are displayed on the screen of the display device 103, and thus the viewer perceives these planes simply as 2D graphics images.

The playback device 102 in 3D playback mode refers to the offset during pop-up 3311 for each PI and selects B-B presentation mode and 1 plane+zero offset mode when a pop-up menu is played back from an IG stream. While a pop-up menu is displayed, other 3D video images are thus temporarily changed to 2D video images. This improves the visibility and usability of the pop-up menu.

The stream registration information sequence 3312 for the dependent-view video stream includes stream registration information indicating the dependent-view video streams that can be selected for playback from the sub-TS. This stream registration information sequence 3312 is used in combination with one of the stream registration information sequences included in the STN table in the corresponding PI, which indicates the base-view video stream. When reading a piece of stream registration information from an STN table, the playback device 102 in 3D playback mode automatically also reads the stream registration information sequence, located in the STN table SS, that has been combined with the piece of stream registration information. When simply switching from 2D playback mode to 3D playback mode, the playback device 102 can thus maintain already recognized STNs and stream attributes such as language.

As shown in FIG. 33, the stream registration information sequence 3312 in the dependent-view video stream generally includes a plurality of pieces of stream registration information (SS_dependent_view_block) 3320. These are the same in number as the pieces of stream registration information in the corresponding PI that indicate the base-view video stream. Each piece of stream registration information 3320 includes an STN 3321, stream entry 3322, and stream attribute information 3323. The STN 3321 is a serial number assigned individually to pieces of stream registration information 3320 and is the same as the STN of the piece of stream registration information, located in the corresponding PI, with which the piece of stream registration information 3320 is combined. The stream entry 3322 includes sub-path ID reference information (ref_to_Subpath_id) 3331, stream file reference information (ref_to_subClip_entry_id) 3332, and a PID (ref_to_stream_PID_subclip) 3333. The sub-path ID reference information 3331 indicates the sub-path ID of the sub-path that specifies the playback path of the dependent-view video stream. The stream file reference information 3332 is information to identify the file DEP storing this dependent-view video stream. The PID 3333 is the PID for this dependent-view video stream. The stream attribute information 3323 includes attributes for this dependent-view video stream, such as frame rate, resolution, and video format. In particular, these attributes are the same as attributes for the base-view video stream shown by the piece of stream registration information, included in the corresponding PI, with which each piece of stream registration information is combined.

[Playback of 3D Video Images in Accordance with a 3D Playlist File]

Figure 34:
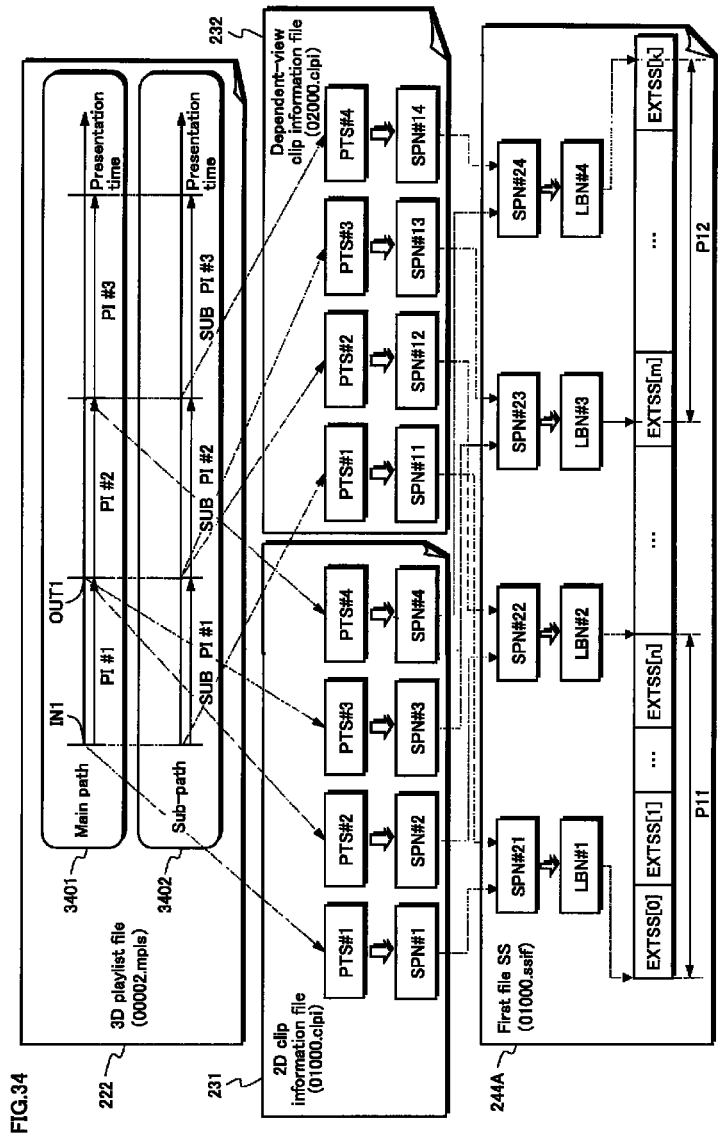
FIG. 34 is a schematic diagram showing correspondence between PTSs indicated by a 3D playlist file (00002.mpls) 222 and sections played back from a file SS (01000.ssif) 244A.

FIG. 34 is a schematic diagram showing correspondence between PTSs indicated by the 3D playlist file (00002.mpls) 222 and sections played back from the file SS (01000.ssif) 244A. As shown in FIG. 34, in the main path 3401 in the 3D playlist file 222, the PI #1 specifies a PTS #1, which indicates a playback start time IN1, and a PTS #2, which indicates a playback end time OUT1. The reference clip information for the PI #1 indicates the 2D clip information file (01000.clpi) 231. In the sub-path 3402, which indicates that the sub-path type is "3D L/R", the SUB_PI #1 specifies the same PTS #1 and PTS #2 as the PI #1. The reference clip information for the SUB_PI #1 indicates the dependent-view clip information file (02000.clpi) 232.

When playing back 3D video images in accordance with the 3D playlist file 222, the playback device 102 first reads PTS #1 and PTS #2 from the PI #1 and SUB_PI #1. Next, the playback device 102 refers to the entry map in the 2D clip information file 231 to retrieve from the file 2D 241 the SPN #1 and SPN #2 that correspond to the PTS #1 and PTS #2. In parallel, the playback device 102 refers to the entry map in the dependent-view clip information file 232 to retrieve from the first file DEP 242 the SPN #11 and SPN #12 that correspond to the PTS #1 and PTS #2. As described with reference to FIG. 24E, the playback device 102 then uses the extent start points 2242 and 2420 in the clip information files 231 and 232 to calculate, from SPN #1 and SPN #11, the number of source packets SPN #21 from the top of the file SS 244A to the playback start position. Similarly, the playback device 102 calculates, from SPN #2 and SPN #12, the number of source packets SPN #22 from the top of the file SS 244A to the playback start position. The playback device 102 further calculates the numbers of sectors corresponding to the SPN #21 and SPN #22. Next, the playback device 102 refers to these numbers of sectors and the file entry of the file SS 244A to specify the LBN #1 and LBN #2 at the beginning and end, respectively, of the sector group P11 on which the extent SS group EXTSS[0], . . . , EXTSS[n] to be played back is recorded. Calculation of the numbers of sectors and specification of the LBNs are as per the description on FIG. 24E. Finally, the playback device 102 indicates the range from LBN #1 to LBN #2 to the BD-ROM drive 121. The source packet group belonging to the extent SS group EXTSS [0], . . . , EXTSS[n] is thus read from the sector group P11 in this range. Similarly, the pair PTS #3 and PTS #4 indicated by the PI #2 and SUB_PI #2 are first converted into a pair of SPN #3 and SPN #4 and a pair of SPN #13 and SPN #14 by referring to the entry maps in the clip information files 231 and 232. Then, the number of source packets SPN #23 from the top of the file SS 244A to the playback start position is calculated from SPN #3 and SPN #13, and the number of source packets SPN #24 from the top of the file SS 244A to the playback end position is calculated from SPN #4 and SPN #14. Next, referring to the file entry for the file SS 244A, the pair of SPN #23 and SPN #24 are converted into a pair of LBN #3 and LBN #4. Furthermore, a source packet group belonging to the extent SS group is read from the sector group P12 in a range from the LBN #3 to the LBN #4.

In parallel with the above-described read processing, as described with reference to FIG. 24E, the playback device 102 refers to the extent start points 2242 and 2420 in the clip information files 231 and 232 to extract base-view extents from each extent SS and decode the base-view extents in parallel with the remaining dependent-view extents. The playback device 102 can thus play back 3D video images from the file SS 244A in accordance with the 3D playlist file 222.

<<Index File>>

Figure 35:
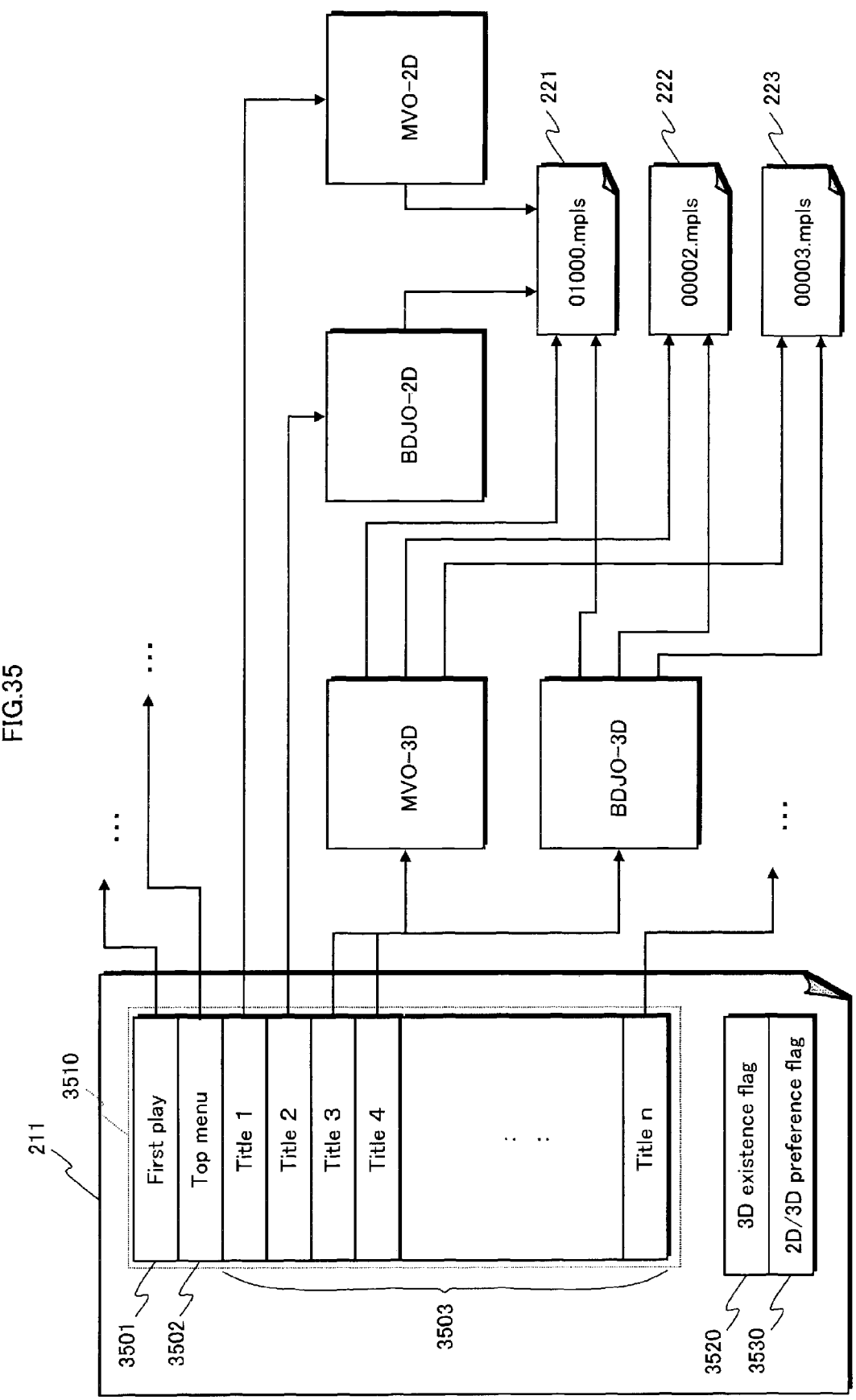
FIG. 35 is a schematic diagram showing a data structure of an index file (index.bdmv) 211 shown in FIG. 2.

FIG. 35 is a schematic diagram showing a data structure of an index file (index.bdmv) 211 shown in FIG. 2. As shown in FIG. 35, the index file 211 includes an index table 3510, 3D existence flag 3520, and 2D/3D preference flag 3530.

The index table 3510 stores the items "first play" 3501, "top menu" 3502, and "title k" 3503 (k=1, 2, . . . , n; the letter n represents an integer greater than or equal to 1). Each item is associated with either a movie object MVO-2D, MVO-3D, . . . , or a BD-J object BDJO-2D, BDJO-3D, . . . . Each time a title or a menu is called in response to a user operation or an application program, a control unit in the playback device 102 refers to a corresponding item in the index table 3510. Furthermore, the control unit calls an object associated with the item from the BD-ROM disc 101 and accordingly executes a variety of processes. Specifically, the item "first play" 3501 specifies an object to be called when the disc 101 is loaded into the BD-ROM drive 121. The item "top menu" 3502 specifies an object for displaying a menu on the display device 103 when a command "go back to menu" is input, for example, by user operation. In the items "title k" 3503, the titles that constitute the content on the disc 101 are individually allocated. For example, when a title for playback is specified by user operation, in the item "title k" in which the title is allocated, the object for playing back video images from the AV stream file corresponding to the title is specified.

In the example shown in FIG. 35, the items "title 1" and "title 2" are allocated to titles of 2D video images. The movie object associated with the item "title 1", MVO-2D, includes a group of commands related to playback processes for 2D video images using the 2D playlist file (00001.mpls) 221. When the playback device 102 refers to the item "title 1", then in accordance with the movie object MVO-2D, the 2D playlist file 221 is read from the disc 101, and playback processes for 2D video images are executed in accordance with the playback path specified therein. The BD-J object associated with the item "title 2", BDJO-2D, includes an application management table related to playback processes for 2D video images using the 2D playlist file 221. When the playback device 102 refers to the item "title 2", then in accordance with the application management table in the BD-J object BDJO-2D, a Java application program is called from the JAR file 261 and executed. In this way, the 2D playlist file 221 is read from the disc 101, and playback processes for 2D video images are executed in accordance with the playback path specified therein.

Furthermore, in the example shown in FIG. 35, the items "title 3" and "title 4" are allocated to titles of 3D video images. The movie object associated with the item "title 3", MVO-3D, includes, in addition to a group of commands related to playback processes for 2D video images using the 2D playlist file 221, a group of commands related to playback processes for 3D video images using either 3D playlist file (00002.mpls) 222 or (00003.mpls) 223. In the BD-J object associated with the item "title 4", BDJO-3D, the application management table specifies, in addition to a Java application program related to playback processes for 2D video images using the 2D playlist file 221, a Java application program related to playback processes for 3D video images using either 3D playlist file 222 or 223.

The 3D existence flag 3520 shows whether or not 3D video content is recorded on the BD-ROM disc 101. When the BD-ROM disc 101 is inserted into the BD-ROM drive 121, the playback device 102 first checks the 3D existence flag 3520. When the 3D existence flag 3520 is off, the playback device 102 does not need to select 3D playback mode. Accordingly, the playback device 102 can rapidly proceed in 2D playback mode without performing HDMI authentication on the display device 103. "HDMI authentication" refers to processing by which the playback device 102 exchanges CEC messages with the display device 103 via the HDMI cable 122 to check with the display device 103 as to whether it supports playback of 3D video images. By skipping HDMI authentication, the time between insertion of the BD-ROM disc 101 and the start of playback of 2D video images is shortened.

The 2D/3D preference flag 3530 indicates whether playback of 3D video images should be prioritized when both the playback device and the display device support playback of both 2D video images and 3D video images. The 2D/3D preference flag 3530 is set by the content provider. When the 3D existence flag 3520 in the BD-ROM disc 101 is on, the playback device 102 then additionally checks the 2D/3D preference flag 3530. When the 2D/3D preference flag 3530 is on, the playback device 102 does not make the user select the playback mode, but rather performs HDMI authentication. Based on the results thereof, the playback device 102 operates in either 2D playback mode or 3D playback mode. That is, the playback device 102 does not display a playback mode selection screen. Accordingly, if the results of HDMI authentication indicate that the display device 103 supports playback of 3D video images, the playback device 102 operates in 3D playback mode. This makes it possible to avoid delays in starting up caused by processing to switch from 2D playback mode to 3D playback mode, such as switching frame rates, etc.

[Selection of Playlist File when Selecting a 3D Video Title]

In the example shown in FIG. 35, when the playback device 102 refers to item "title 3" in the index table 3510, the following determination processes are performed in accordance with the movie object MVO-3D: (1) Is the 3D existence flag 3520 on or off? (2) Does the playback device 102 itself support playback of 3D video images? (3) Is the 2D/3D preference flag 3530 on or off? (4) Has the user selected 3D playback mode? (5) Does the display device 103 support playback of 3D video images? and (6) Is the 3D playback mode of the playback device 102 in L/R mode or depth mode? Next, in accordance with the results of these determinations, the playback device 102 selects one of the playlist files 221-223 for playback. On the other hand, when the playback device 102 refers to item "title 4", a Java application program is called from the JAR file 261, in accordance with the application management table in the BD-J object BDJO-3D, and executed. The above-described determination processes (1)-(6) are thus performed, and a playlist file is then selected in accordance with the results of determination.

Figure 36:
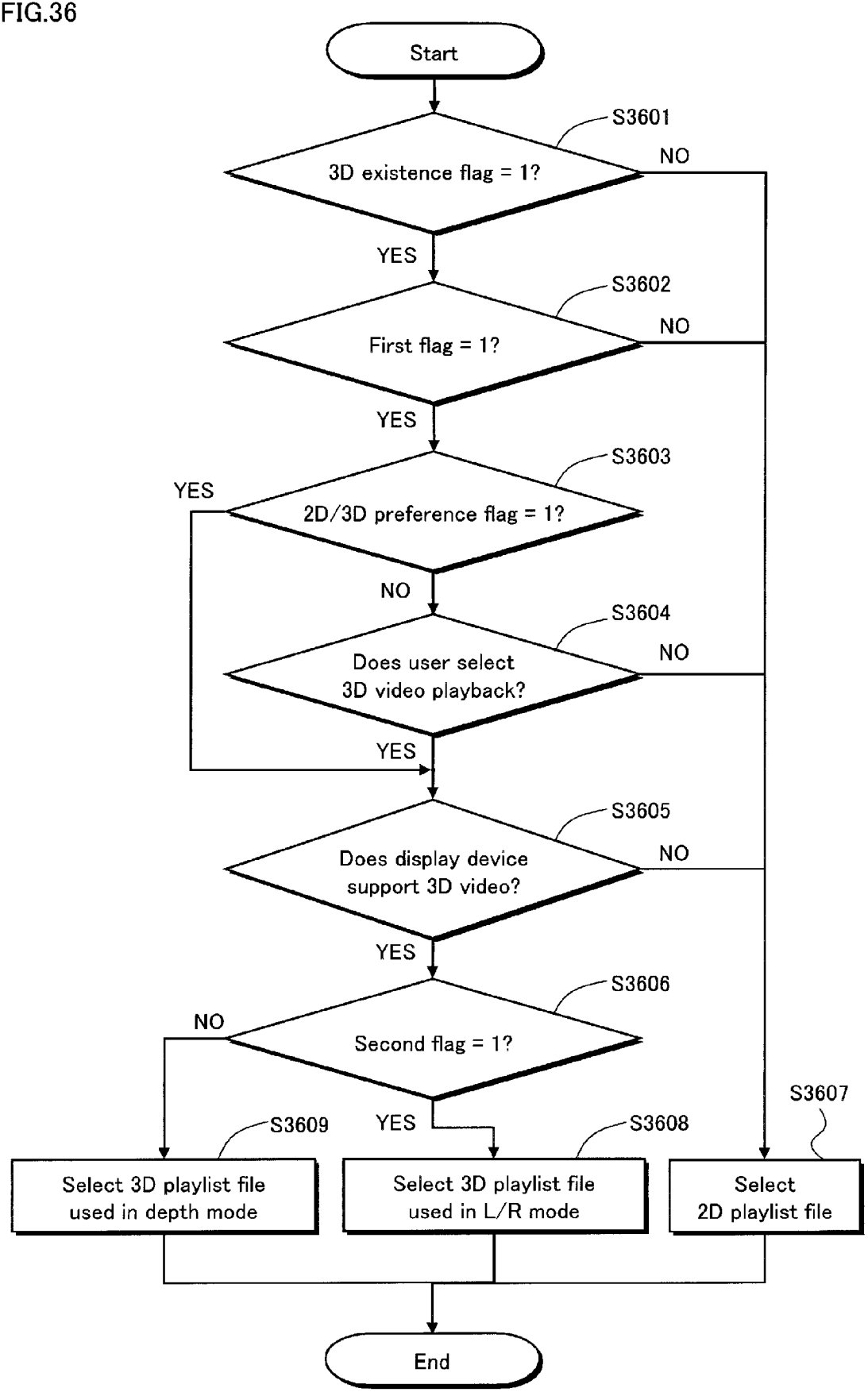
FIG. 36 is a flowchart of processing whereby the playback device 102 shown in FIG. 1 selects a playlist file for playback by using six types of determination processes.

FIG. 36 is a flowchart of selection processing for a playlist file to be played back using the above determination processes (1)-(6). For this selection processing, it is assumed that the playback device 102 includes a first flag and a second flag. The first flag indicates whether the playback device 102 supports playback of 3D video images. For example, a value of "0" for the first flag indicates that the playback device 102 only supports playback of 2D video images, whereas "1" indicates support of 3D video images as well. The second flag indicates whether the 3D playback mode is L/R mode or depth mode. For example, a value of "0" for the second flag indicates that the 3D playback mode is L/R mode, whereas "1" indicates depth mode. Furthermore, the respective values of the 3D existence flag 3520 and 2D/3D preference flag 3530 are set to "1" when these flags are on, and to "0" when these flags are off.

In step S3601, the playback device 102 checks the value of the 3D existence flag 3520. If the value is "1", processing proceeds to step S3602. If the value is "0", processing proceeds to step S3607.

In step S3602, the playback device 102 checks the value of the first flag. If the value is "1", processing proceeds to step S3603. If the value is "0", processing proceeds to step S3607.

In step S3603, the playback device 102 checks the value of the 2D/3D preference flag 3530. If the value is "0", processing proceeds to step S3604. If the value is "1", processing proceeds to step S3605.

In step S3604, the playback device 102 displays a menu on the display device 103 for the user to select either 2D playback mode or 3D playback mode. If the user selects 3D playback mode via operation of a remote control 105 or the like, processing proceeds to step S3605, whereas if the user selects 2D playback mode, processing proceeds to step S3607.

In step S3605, the playback device 102 perform HDMI authentication to check whether the display device 103 supports playback of 3D video images. Specifically, the playback device 102 exchanges CEC messages with the display device 103 via the HDMI cable 122 to check with the display device 103 as to whether it supports playback of 3D video images. If the display device 103 does support playback of 3D video images, processing proceeds to step S3606. If the display device 103 does not support playback of 3D video images, processing proceeds to step S3607.

In step S3606, the playback device 102 checks the value of the second flag. If the value is "0", processing proceeds to step S3608. If the value is "1", processing proceeds to step S3609.

In step S3607, the playback device 102 selects for playback the 2D playlist file 221. Note that, at this time, the playback device 102 may cause the display device 103 to display the reason why playback of 3D video images was not selected. Processing then terminates.

In step S3608, the playback device 102 selects for playback the 3D playlist file 222 used in L/R mode. Processing then terminates.

In step S3609, the playback device 102 selects for playback the 3D playlist file 222 used in depth mode. Processing then terminates.

<Structure of 2D Playback Device>

Figure 37:
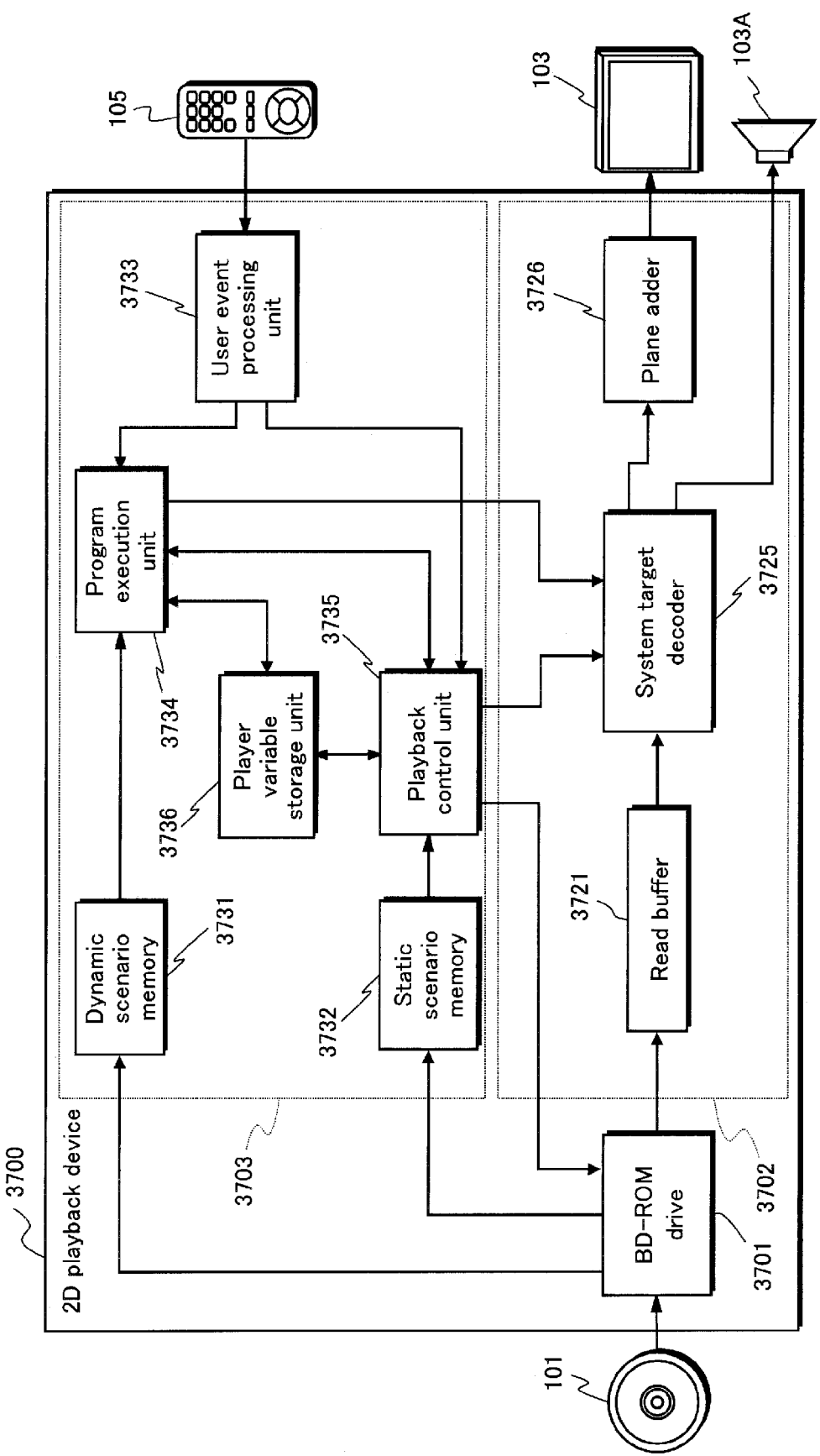
FIG. 37 is a functional block diagram of a 2D playback device 3700.

When playing back 2D video content from the BD-ROM disc 101 in 2D playback mode, the playback device 102 operates as a 2D playback device. FIG. 37 is a functional block diagram of a 2D playback device 3700. As shown in FIG. 37, the 2D playback device 3700 includes a BD-ROM drive 3701, playback unit 3702, and control unit 3703. The playback unit 3702 includes a read buffer 3721, system target decoder 3725, and plane adder 3726. The control unit 3703 includes a dynamic scenario memory 3731, static scenario memory 3732, user event processing unit 3733, program execution unit 3734, playback control unit 3735, and player variable storage unit 3736. The playback unit 3702 and the control unit 3703 are each implemented on a different integrated circuit, but may alternatively be implemented on a single integrated circuit.

When the BD-ROM disc 101 is loaded into the BD-ROM drive 3701, the BD-ROM drive 3701 radiates laser light to the disc 101 and detects change in the reflected light. Furthermore, using the change in the amount of reflected light, the BD-ROM drive 3701 reads data recorded on the disc 101. Specifically, the BD-ROM drive 3701 has an optical pickup, i.e. an optical head. The optical head has a semiconductor laser, collimate lens, beam splitter, objective lens, collecting lens, and optical detector. A beam of light radiated from the semiconductor laser sequentially passes through the collimate lens, beam splitter, and objective lens to be collected on a recording layer of the disc 101. The collected beam is reflected and diffracted by the recording layer. The reflected and diffracted light passes through the objective lens, the beam splitter, and the collecting lens, and is collected onto the optical detector. The optical detector generates a playback signal at a level in accordance with the amount of collected light. Furthermore, data is decoded from the playback signal.

The BD-ROM drive 3701 reads data from the BD-ROM disc 101 based on a request from the playback control unit 3735. Out of the read data, the extents in the file 2D, i.e. the 2D extents, are transferred to the read buffer 3721; dynamic scenario information is transferred to the dynamic scenario memory 3731; and static scenario information is transferred to the static scenario memory 3732. "Dynamic scenario information" includes an index file, movie object file, and BD-J object file. "Static scenario information" includes a 2D playlist file and a 2D clip information file.

The read buffer 3721, dynamic scenario memory 3731, and static scenario memory 3732 are each a buffer memory. Memory elements in the playback unit 3702 are used as the read buffer 3721. Memory elements in the control unit 3703 are used as the dynamic scenario memory 3731 and the static scenario memory 3732. Alternatively, different areas in a single memory element may be used as part or all of these buffer memories 3721, 3731, and 3732.

The system target decoder 3725 reads 2D extents from the read buffer 3721 in units of source packets and demultiplexes the 2D extents. The system target decoder 3725 then decodes each of the elementary streams obtained by the demultiplexing. At this point, information necessary for decoding each elementary stream, such as the type of codec and attributes of the stream, is transferred from the playback control unit 3735 to the system target decoder 3725. The system target decoder 3725 outputs a primary video stream, secondary video stream, IG stream, and PG stream after decoding respectively as primary video plane data, secondary video plane data, IG plane data, and PG plane data, in units of VAUs. On the other hand, the system target decoder 3725 mixes the decoded primary audio stream and secondary audio stream and transmits the resultant data to an audio output device, such as an internal speaker 103A of the display device 103. In addition, the system target decoder 3725 receives graphics data from the program execution unit 3734. The graphics data is used for rendering graphic elements for a GUI, such as a menu, on the screen and is in a raster data format such as JPEG and PNG. The system target decoder 3725 processes the graphics data and outputs the processed data as image plane data. Details on the system target decoder 3725 are provided below.

The plane adder 3726 receives primary video plane data, secondary video plane data, IG plane data, PG plane data, and image plane data from the system target decoder 3725 and superimposes these pieces of plane data to generate one combined video frame or field. The combined video data is transferred to the display device 103 for display on the screen.

The user event processing unit 3733 detects a user operation via the remote control 105 or the front panel of the playback device 102. Based on the user operation, the user event processing unit 3733 requests the program execution unit 3734 or the playback control unit 3735 to perform processing. For example, when a user instructs to display a pop-up menu by pushing a button on the remote control 105, the user event processing unit 3733 detects the push and identifies the button. The user event processing unit 3733 further requests the program execution unit 3734 to execute a command corresponding to the button, i.e. a command to display the pop-up menu. On the other hand, when a user pushes a fast-forward or a rewind button on the remote control 105, for example, the user event processing unit 3733 detects the push and identifies the button. The user event processing unit 3733 then requests the playback control unit 3735 to fast-forward or rewind the playlist currently being played back.

The program execution unit 3734 is a processor that reads programs from movie object files and BD-J object files stored in the dynamic scenario memory 3731 and executes these programs. Furthermore, the program execution unit 3734 performs the following operations in accordance with the programs: (1) The program execution unit 3734 orders the playback control unit 3735 to perform playlist playback processing; (2) The program execution unit 3734 generates graphics data for a menu or game as PNG or JPEG raster data and transfers the generated data to the system target decoder 3725 to be combined with other video data. Via program design, specific details on these processes can be designed relatively flexibly. In other words, during the authoring process of the BD-ROM disc 101, the nature of these processes is determined while programming the movie object files and BD-J object files.

The playback control unit 3735 controls transfer of different types of data, such as 2D extents, an index file, etc. from the BD-ROM disc 101 to the read buffer 3721, dynamic scenario memory 3731, and static scenario memory 3732. A file system managing the directory file structure shown in FIG. 2 is used for this control. That is, the playback control unit 3735 causes the BD-ROM drive 3701 to transfer the files to each of the buffer memories 3721, 3731, and 3732 using a system call for opening files. The "file opening" is composed of a sequence of the following processes. First, a file name to be detected is provided to the file system by a system call, and an attempt is made to detect the file name from the directory/file structure. When the detection is successful, the file entry for the target file to be transferred is first transferred to memory in the playback control unit 3735, and a File Control Block (FCB) is generated in the memory. Subsequently, a file handle for the target file is returned from the file system to the playback control unit 3735. Afterwards, the playback control unit 3735 can cause the BD-ROM drive 3701 to transfer the target file from the BD-ROM disc 101 to each of the buffer memories 3721, 3731, and 3732 by showing the file handle to the BD-ROM drive 3701.

The playback control unit 3735 decodes the file 2D to output video data and audio data by controlling the BD-ROM drive 3701 and the system target decoder 3725. Specifically, the playback control unit 3735 first reads a 2D playlist file from the static scenario memory 3732, in response to an instruction from the program execution unit 3734 or a request from the user event processing unit 3733, and interprets the content of the file. In accordance with the interpreted content, particularly with the playback path, the playback control unit 3735 then specifies a file 2D to be played back and instructs the BD-ROM drive 3701 and the system target decoder 3725 to read and decode this file. Such playback processing based on a playlist file is referred to as "playlist playback processing".

In addition, the playback control unit 3735 sets various types of player variables in the player variable storage unit 3736 using the static scenario information. With reference to the player variables, the playback control unit 3735 further specifies to the system target decoder 3725 elementary streams to be decoded and provides the information necessary for decoding the elementary streams.

The player variable storage unit 3736 is composed of a group of registers for storing player variables. Types of player variables include system parameters (SPRM) and general parameters (GPRM). An SPRM indicates the status of the playback device 102. FIG. 38 is a list of SPRMs. As shown in FIG. 38, each SPRM is assigned a serial number 3801, and each serial number 3801 is associated with a unique variable value 3802. There are provided, for example, 64 SPRMs. The contents of SPRMs are shown below. Here, the numbers in parentheses indicate the serial numbers 3801.

SPRM(0): Language code
SPRM(1): Primary audio stream number
SPRM(2): Subtitle stream number
SPRM(3): Angle number
SPRM(4): Title number
SPRM(5): Chapter number
SPRM(6): Program number
SPRM(7): Cell number
SPRM(8): Key name
SPRM(9): Navigation timer
SPRM(10): Current playback time
SPRM(11): Player audio mixing mode for karaoke
SPRM(12): Country code for parental management
SPRM(13): Parental level
SPRM(14): Player configuration for video
SPRM(15): Player configuration for audio
SPRM(16): Language code for audio stream
SPRM(17): Language code extension for audio stream
SPRM(18): Language code for subtitle stream
SPRM(19): Language code extension for subtitle stream
SPRM(20): Player region code
SPRM(21): Secondary video stream number
SPRM(22): Secondary audio stream number
SPRM(23): Player status
SPRM(24)—SPRM(63): Reserved The SPRM(10) indicates the PTS of the picture currently being decoded and is updated every time a picture is decoded and written into the primary video plane memory. Accordingly, the current playback point can be known by referring to the SPRM(10).

The parental level in SPRM(13) indicates a predetermined restricted age and is used for parental control of viewing of titles recorded on the BD-ROM disc 101. A user of the playback device 102 sets the value of the SPRM(13) via, for example, an OSD of the playback device 102. "Parental control" refers to restricting viewing of a title in accordance with the viewer's age. The following is an example of how the playback device 102 performs parental control. The playback device 102 first reads the age for which viewing of a title is permitted from the BD-ROM disc 101, and then compares this age with the value of the SPRM(13). If this age is equal to or less than the value of the SPRM(13), the playback device 102 continues with playback of the title. If this age is greater than the value of the SPRM(13), the playback device 102 stops playback of the title.

The language code for audio stream in SPRM(16) and the language code for subtitle stream in SPRM(18) show default language codes of the playback device 102. These codes may be changed by a user with use of the OSD or the like of the playback device 102, or the codes may be changed by an application program via the program execution unit 3734. For example, if the SPRM(16) shows "English", then during playback processing of a playlist, the playback control unit 3735 first searches the STN table in the PI showing the current playback section, i.e. the current PI, for a stream entry having the language code for "English". The playback control unit 3735 then extracts the PID from the stream identification information of the stream entry and transmits the extracted PID to the system target decoder 3725. As a result, an audio stream having the PID is selected and decoded by the system target decoder 3725. These processes can be executed by the playback control unit 3735 with use of the movie object file or the BD-J object file.

During playback processing, the playback control unit 3735 updates the player variables in accordance with the status of playback. The playback control unit 3735 updates the SPRM(1), SPRM(2), SPRM(21), and SPRM(22) in particular. These SPRM respectively show, in the stated order, the STN of the audio stream, subtitle stream, secondary video stream, and secondary audio stream that are currently being processed. For example, suppose that the SPRM(1) has been changed by the program execution unit 3734. In this case, the playback control unit 3735 first refers to the STN shown by the new SPRM(1) and retrieves the stream entry that includes this STN from the STN table in the current PI. The playback control unit 3735 then extracts the PID from the stream identification information of the stream entry and transmits the extracted PID to the system target decoder 3725. As a result, an audio stream having the PID is selected and decoded by the system target decoder 3725. This is how the audio stream to be played back is switched. The subtitle stream and the secondary video stream to be played back can be similarly switched.

<<2D Playlist Playback Processing>>

Figure 39:
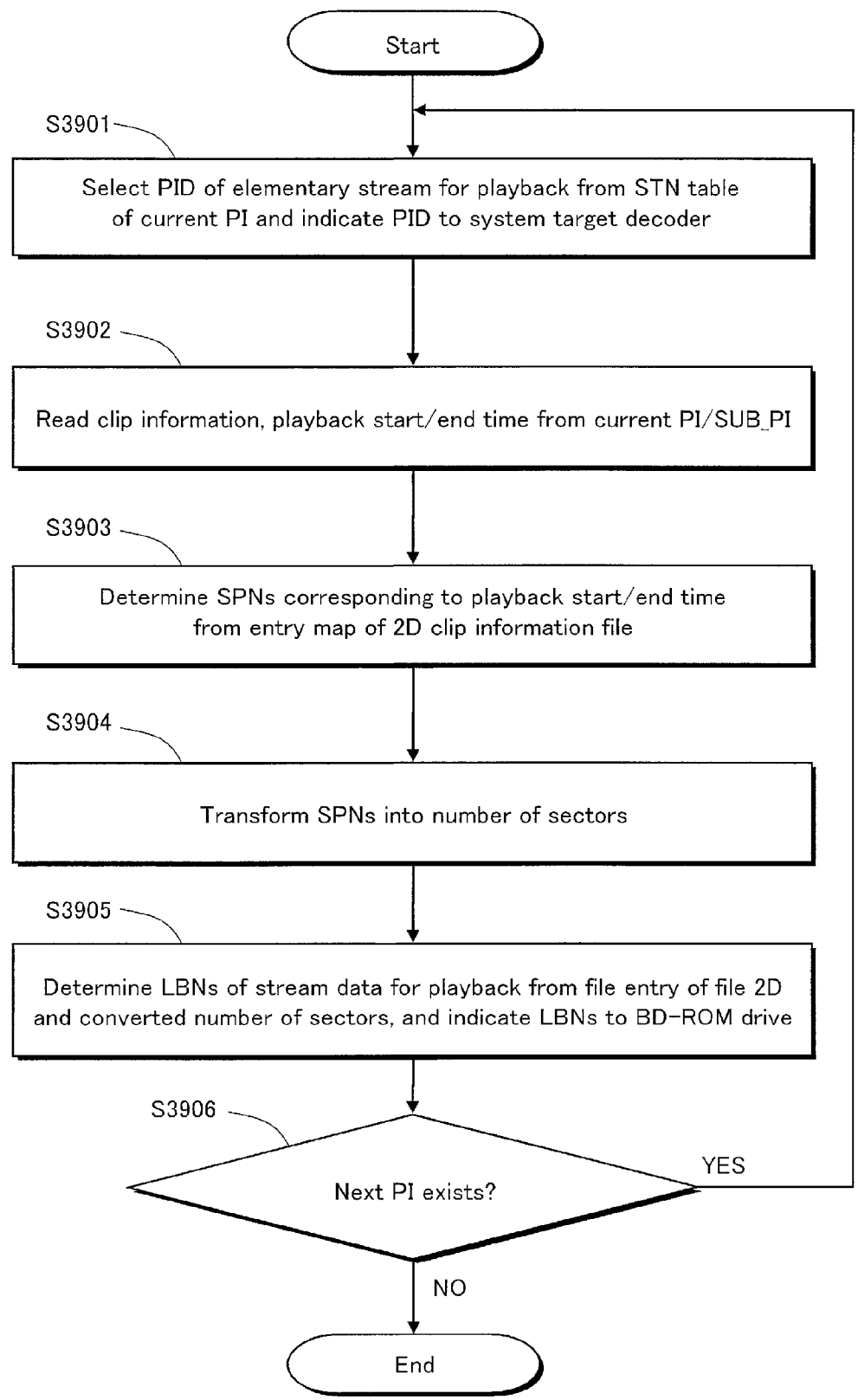
FIG. 39 is a flowchart of 2D playlist playback processing by a playback control unit 3735 shown in FIG. 37.

FIG. 39 is a flowchart of 2D playlist playback processing by a playback control unit 3735. 2D playlist playback processing is performed according to a 2D playlist file and is started by the playback control unit 3735 reading a 2D playlist file from the static scenario memory 3732.

In step S3901, the playback control unit 3735 first reads a single PI from a main path in the 2D playlist file and then sets the PI as the current PI. Next, from the STN table of the current PI, the playback control unit 3735 selects PIDs of elementary streams to be played back and specifies attribute information necessary for decoding the elementary streams. The selected PIDs and attribute information are indicated to the system target decoder 3725. The playback control unit 3735 further specifies a SUB_PI associated with the current PI from the sub-paths in the 2D playlist file. Thereafter, processing proceeds to step S3902.

In step S3902, the playback control unit 3735 reads reference clip information, a PTS #1 indicating a playback start time IN1, and a PTS #2 indicating a playback end time OUT1 from the current PI. From this reference clip information, a 2D clip information file corresponding to the file 2D to be played back is specified. Furthermore, when a SUB_PI exists that is associated with the current PI, similar information is also read from the SUB_PI. Thereafter, processing proceeds to step S3903.

In step S3903, with reference to the entry map of the 2D clip information file, the playback control unit 3735 retrieves the SPN #1 and the SPN #2 in the file 2D corresponding to the PTS #1 and the PTS #2. The pair of PTSs indicated by the SUB_PI are also converted to a pair of SPNs. Thereafter, processing proceeds to step S3904.

In step S3904, from the SPN #1 and the SPN #2, the playback control unit 3735 calculates a number of sectors corresponding to each of the SPN #1 and the SPN #2. Specifically, the playback control unit 3735 first obtains the product of each of the SPN #1 and the SPN #2 multiplied by the data amount per source packet, i.e. 192 bytes. Next, the playback control unit 3735 obtains a quotient by dividing each product by the data amount per sector, i.e. 2048 bytes: N1=SPN #1×192/2048, N2=SPN #2×192/2048. The quotients N1 and N2 are the same as the total number of sectors, in the main TS, recorded in portions previous to the source packets to which SPN #1 and SPN #2 are allocated, respectively. The pair of SPNs converted from the pair of PTSs indicated by the SUB_PI is similarly converted to a pair of numbers of sectors. Thereafter, processing proceeds to step S3905.

In step S3905, the playback control unit 3735 specifies, from the numbers of sectors N1 and N2 obtained in step S3904, LBNs of the top and end of the 2D extent group to be played back. Specifically, with reference to the file entry of the file 2D to be played back, the playback control unit 3735 counts from the top of the sector group in which the 2D extent group is recorded so that the LBN of the (N1+1)$^{th}$ sector=LBN #1, and the LBN of the (N2+1)$^{th}$ sector=LBN #2. The playback control unit 3735 further specifies a range from the LBN#1 to the LBN#2 to the BD-ROM drive 121. The pair of numbers of sectors converted from the pair of PTSs indicated by the SUB_PI is similarly converted to a pair of LBNs and specified to the BD-ROM drive 121. As a result, from the sector group in the specified range, a source packet group belonging to a 2D extent group is read in aligned units. Thereafter, processing proceeds to step S3906.

In step S3906, the playback control unit 3735 checks whether an unprocessed PI remains in the main path. When an unprocessed PI remains, processing is repeated from step S3901. When no unprocessed PI remains, processing ends.

<<System Target Decoder>>

Figure 40:
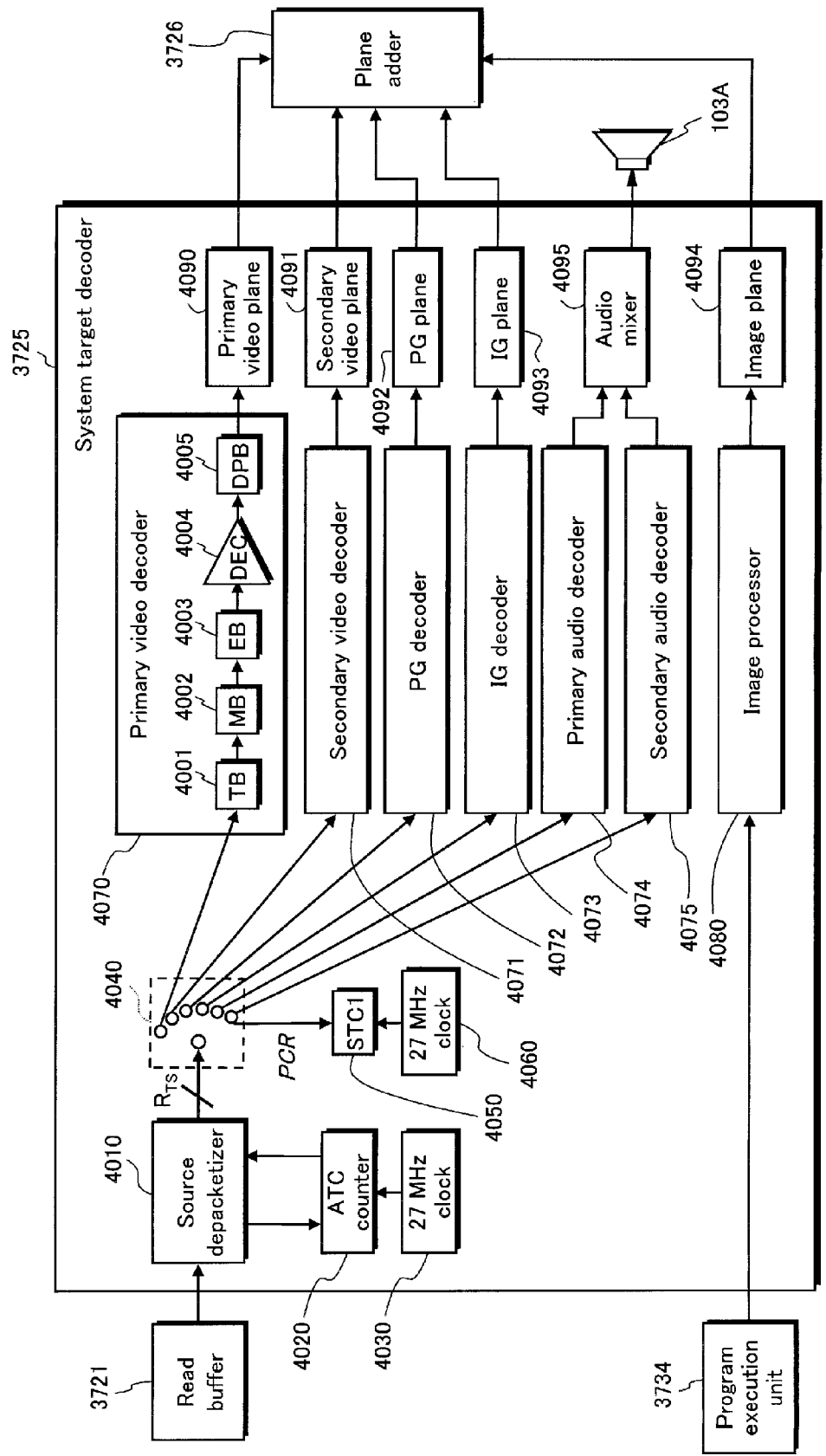
FIG. 40 is a functional block diagram of the system target decoder 3725 shown in FIG. 37.

FIG. 40 is a functional block diagram of the system target decoder 3725. As shown in FIG. 40, the system target decoder 3725 includes a source depacketizer 4010, ATC counter 4020, first 27 MHz clock 4030, PID filter 4040, STC counter (STC1) 4050, second 27 MHz clock 4060, primary video decoder 4070, secondary video decoder 4071, PG decoder 4072, IG decoder 4073, primary audio decoder 4074, secondary audio decoder 4075, text subtitle decoder 4076, image processor 4080, primary video plane memory 4090, secondary video plane memory 4091, PG plane memory 4092, IG plane memory 4093, image plane memory 4094, and audio mixer 4095.

The source depacketizer 4010 reads source packets from the read buffer 3721, extracts the TS packets from the read source packets, and transfers the TS packets to the PID filter 4040. Furthermore, the source depacketizer 4010 synchronizes the time of the transfer with the time shown by the ATS of each source packet. Specifically, the source depacketizer 4010 first monitors the value of the ATC generated by the ATC counter 4020. In this case, the value of the ATC depends on the ATC counter 4020 and is incremented in accordance with a pulse of a clock signal from the first 27 MHz clock 4030. Subsequently, at the instant the value of the ATC matches the ATS of a source packet, the source depacketizer 4010 transfers the TS packets extracted from the source packet to the PID filter 4040. By adjusting the time of transfer in this way, the mean transfer rate of TS packets from the source depacketizer 4010 to the PID filter 4040 does not surpass the value $R_{TS}$ specified by the system rate 2211 in the 2D clip information file 231 shown in FIG. 22.

The PID filter 4040 first monitors a PID that includes each TS packet outputted by the source depacketizer 4010. When the PID matches a PID pre-specified by the playback control unit 3735, the PID filter 4040 selects the TS packet and transfers it to the decoder 4070-4075 appropriate for decoding of the elementary stream indicated by the PID (the text subtitle decoder 4076, however, is excluded). For example, if a PID is 0x1011, the TS packets are transferred to the primary video decoder 4070. TS packets with PIDs ranging from 0x1B00-0x1B1F, 0x1100-0x111F, 0x1A00-0x1A1F, 0x1200-0x121F, and 0x1400-0x141F are transferred to the secondary video decoder 4071, primary audio decoder 4074, secondary audio decoder 4075, PG decoder 4072, and IG decoder 4073, respectively.

The PID filter 4040 further detects a PCR from TS packets using the PIDs of the TS packets. At each detection, the PID filter 4040 sets the value of the STC counter 4050 to a predetermined value. Then, the value of the STC counter 4050 is incremented in accordance with a pulse of the clock signal of the second 27 MHz clock 4060. In addition, the value to which the STC counter 4050 is set is indicated to the PID filter 4040 from the playback control unit 3735 in advance. The decoders 4070-4076 each use the value of the STC counter 4050 as the STC. Specifically, the decoders 4070-4076 first reconstruct the TS packets received from the PID filter 4040 into PES packets. Next, the decoders 4070-4076 adjust the timing of the decoding of data included in the PES payloads in accordance with the times indicated by the PTSs or the DTSs included in the PES headers.

The primary video decoder 4070, as shown in FIG. 40, includes a transport stream buffer (TB) 4001, multiplexing buffer (MB) 4002, elementary stream buffer (EB) 4003, compressed video decoder (DEC) 4004, and decoded picture buffer (DPB) 4005.

The TB 4001, MB 4002, and EB 4003 are each a buffer memory and use an area of a memory element internally provided in the primary video decoder 4070. Alternatively, some or all of the buffer memories may be separated in discrete memory elements. The TB 4001 stores the TS packets received from the PID filter 4040 as they are. The MB 4002 stores PES packets reconstructed from the TS packets stored in the TB 4001. Note that when the TS packets are transferred from the TB 4001 to the MB 4002, the TS header is removed from each TS packet. The EB 4003 extracts encoded VAUs from the PES packets and stores the VAUs therein. A VAU includes a compressed picture, i.e., an I picture, B picture, or P picture. Note that when data is transferred from the MB 4002 to the EB 4003, the PES header is removed from each PES packet.

The DEC 4004 is a hardware decoder specifically for decoding of compressed pictures and is composed of an LSI that includes, in particular, a function to accelerate the decoding. The DEC 4004 decodes a picture from each VAU in the EB 4003 at the time shown by the DTS included in the original PES packet. The DEC 4004 may also refer to the decoding switch information 1250 shown in FIG. 12 to decode pictures from VAUs sequentially, regardless of the DTSs. During decoding, the DEC 4004 first analyzes the VAU header to specify the compressed picture, compression encoding method, and stream attribute stored in the VAU, selecting a decoding method in accordance with this information. Compression encoding methods include, for example, MPEG-2, MPEG-4 AVC, and VC1. Furthermore, the DEC 4004 transmits the decoded, uncompressed picture to the DPB 4005.

Like the TB 4001, MB 4002, and EB 4003, the DPB 4005 is a buffer memory that uses an area of a built-in memory element in the primary video decoder 4070. Alternatively, the DPB 4005 may be located in a memory element separate from the other buffer memories 4001, 4002, and 4003. The DPB 4005 temporarily stores the decoded pictures. When a P picture or B picture is to be decoded by the DEC 4004, the DPB 4005 retrieves reference pictures, in response to an instruction from the DEC 4004, from among stored, decoded pictures. The DPB 4005 then provides the reference pictures to the DEC 4004. Furthermore, the DPB 4005 writes the stored pictures into the primary video plane memory 4090 at the time shown by the PTSs included in the original PES packets.

The secondary video decoder 4071 includes the same structure as the primary video decoder 4070. The secondary video decoder 4071 first decodes the TS packets of the secondary video stream received from the PID filter 4040 into uncompressed pictures. Subsequently, the secondary video decoder 4071 writes the uncompressed pictures into the secondary video plane memory 4091 at the time shown by the PTSs included in the PES packets.

The PG decoder 4072 decodes the TS packets received from the PID filter 4040 into uncompressed graphics data and writes the uncompressed graphics data to the PG plane memory 4092 at the time shown by the PTSs included in the PES packets FIG. 41A is a flowchart of processing whereby the PG decoder 4072 decodes a graphics object from one data entry in the PG stream. The processing is started when the PG decoder 4072 receives a group of TS packets constituting one data entry shown in FIG. 6, from the PID filter 4040. FIGS. 41B-41E are schematic diagrams showing the graphics object changing as the processing proceeds.

In step S4101, the PG decoder 4072 first identifies an ODS having the same object ID as the reference object ID 605 in the PCS. Next, the PG decoder 4072 decodes a graphics object from the identified ODS, and writes the decoded graphics object into the object buffer. Here, the "object buffer" is a buffer memory embedded in the PG decoder 4072. The "smile mark" FOB shown in FIG. 41B is an example of the graphics object written into the object buffer.

In step S4102, the PG decoder 4072 performs the cropping process in accordance with the cropping information 602 in the PCS, extracts a part of the graphics object from the graphics object, and writes the extracted part into the object buffer. FIG. 41C shows that strips LST and RST are removed from the left-hand and right-hand ends of the smile mark FOB, and the remaining part OBJ is written into the object buffer.

In step S4103, the PG decoder 4072 first identifies a WDS having the same window ID as the reference window ID 603 in the PCS. Next, the PG decoder 4072 determines a display position of the graphics object in the graphics plane from a window position 612 indicated by the identified WDS and an object display position 601 in the PCS. In FIG. 41D, the upper-left position of the window WIN in the graphics plane GPL and an upper-left position DSP of the graphics object OBJ are determined.

In step S4104, the PG decoder 4072 writes the graphics object in the object buffer into the display position determined in step S4103. When doing so, the PG decoder 4072 determines a range in which the graphics object is rendered by using a window size 613 indicated by the WDS. In FIG. 41D, the graphics object OBJ is written into the graphics plane GPL in the range of window WIN starting from the upper-left position DSP.

In step S4105, the PG decoder 4072 first identifies a PDS having the same pallet ID as the reference pallet ID 604 in the PCS. Next, the PG decoder 4072, by using CLUT 622 in the PDS, determines color coordinate values to be indicated by each pixel data in the graphics object OBJ. In FIG. 41E, the color of each pixel in the graphics object OBJ have been determined. In this way, processing of rendering a graphics object included in one data entry is completed. Steps S4101-S4105 are executed by the time indicated by the PTS included in the same PES packet as the graphics object.

The IG decoder 4073 decodes the TS packets received from the PID filter 4040 into uncompressed graphics object. The IG decoder 4073 further writes the uncompressed graphics object to the IG plane memory 4093 at the time shown by the PTSs included in the PES packets restored from the TS packets. Details on these processes are the same as in the PG decoder 4072.

The primary audio decoder 4074 first stores the TS packets received from the PID filter 4040 in a buffer provided therein. Subsequently, the primary audio decoder 4074 removes the TS header and the PES header from each TS packet in the buffer, and decodes the remaining data into uncompressed LPCM audio data. Furthermore, the primary audio decoder 4074 transmits the resultant audio data to the audio mixer 4095 at the time shown by the PTS included in the original PES packet. The primary audio decoder 4074 selects the decoding method for compressed audio data in accordance with the compression encoding method and stream attributes for the primary audio stream included in the TS packets. Compression encoding methods include, for example, AC-3 and DTS.

The secondary audio decoder 4075 has the same structure as the primary audio decoder 4074. The secondary audio decoder 4075 first reconstructs PES packets from the TS packets of the secondary audio stream received from the PID filter 4040 and then decodes the data included in the PES payloads into uncompressed LPCM audio data. Subsequently, the secondary audio decoder 4075 transmits the uncompressed LPCM audio data to the audio mixer 4095 at the times shown by the PTSs included in the PES headers. The secondary audio decoder 4075 selects the decoding method for compressed audio data in accordance with the compression encoding method and stream attributes for the secondary audio stream included in the TS packets. Compression encoding methods include, for example, Dolby Digital Plus and DTS-HD LBR.

The audio mixer 4095 receives uncompressed audio data from both the primary audio decoder 4074 and the secondary audio decoder 4075 and then mixes the received data. The audio mixer 4095 also transmits the synthesized sound yielded by mixing audio data to, for example, an internal speaker 103A of the display device 103.

The image processor 4080 receives graphics data, i.e., PNG or JPEG raster data, from the program execution unit 3734. Upon receiving the graphics data, the image processor 4080 renders the graphics data and writes the graphics data to the image plane memory 4094.

<Structure of 3D Playback Device>

When playing back 3D video content from the BD-ROM disc 101 in 3D playback mode, the playback device 102 operates as a 3D playback device. The fundamental part of the device's structure is identical to the 2D playback device shown in FIGS. 37 and 40. Therefore, the following is a description on sections of the structure of the 2D playback device that are enlarged or modified. Details on the fundamental parts of the 3D playback device can be found in the above description on the 2D playback device. The 3D playback device also uses the same structure as the 2D playback device for 2D playlist playback processing. Accordingly, the details on this structure can be found in the description on the 2D playback device. The following description assumes playback processing of 3D video images in accordance with 3D playlist files, i.e. 3D playlist playback processing.

FIG. 42 is a functional block diagram of a 3D playback device 4200. The 3D playback device 4200 includes a BD-ROM drive 4201, playback unit 4202, and control unit 4203. The playback unit 4202 includes a switch 4220, first read buffer (hereinafter, abbreviated as RB1) 4221, second read buffer (hereinafter, abbreviated as RB2) 4222, system target decoder 4225, plane adder 4226, and HDMI communication unit 4227. The control unit 4203 includes a dynamic scenario memory 4231, static scenario memory 4232, user event processing unit 4233, program execution unit 4234, playback control unit 4235, and player variable storage unit 4236. The playback unit 4202 and the control unit 4203 are each implemented on a different integrated circuit, but may alternatively be implemented on a single integrated circuit. In particular, the dynamic scenario memory 4231, static scenario memory 4232, user event processing unit 4233, and program execution unit 4234 have an identical structure with the 2D playback device shown in FIG. 37. Accordingly, details thereof can be found in the above description on the 2D playback device.

When instructed by the program execution unit 4234 or other unit to perform 3D playlist playback processing, the playback control unit 4235 reads a PI from the 3D playlist file stored in the static scenario memory 4232 in order, setting the read PI as the current PI. Each time the playback control unit 4235 sets a current PI, it sets operation conditions on the system target decoder 4225 and the plane adder 4226 in accordance with the STN table of the PI and the STN table SS in the 3D playlist file. Specifically, the playback control unit 4235 selects the PID of the elementary stream for decoding and transmits the PID, together with the attribute information necessary for decoding the elementary stream, to the system target decoder 4225. If a PG stream or IG stream is included in the elementary stream indicated by the selected PID, the playback control unit 4235 specifies the reference offset ID 3201 and offset adjustment value 3202 allocated to the stream data, setting the reference offset ID 3201 and offset adjustment value 3202 to the SPRM(27) and SPRM(28) in the player variable storage unit 4236. The playback control unit 4235 also selects the presentation mode of each piece of plane data in accordance with the offset during pop-up 3311 indicated by the STN table SS, indicating the selected presentation mode to the system target decoder 4225 and plane adder 4226.

Next, in accordance with the current PI, the playback control unit 4235 indicates the range of the LBNs in the sector group recorded in the extent SS to be read to the BD-ROM drive 4201 via the procedures in the description on FIG. 24E. Meanwhile, the playback control unit 4235 refers to the extent start points in the clip information file stored in the static scenario memory 4232 to generate information indicating the boundary of the data blocks in each extent SS. This information indicates, for example, the number of source packets from the top of the extent SS to each boundary. The playback control unit 4235 then transmits this information to the switch 4220.

The player variable storage unit 4236 includes the SPRMs shown in FIG. 38, like the player variable storage unit 3736 in the 2D playback device. However, unlike FIG. 38, SPRM(24) includes the first flag, and SPRM(25) includes the second flag, as shown in FIG. 36. In this case, when the SPRM(24) is "0", the playback device 102 only supports playback of 2D video images, and when the SPRM(24) is "1", the playback device 102 also supports playback of 3D video images. The playback device 102 is in L/R mode when the SPRM(25) is "0" and is in depth mode when the SPRM(25) is "1". Furthermore, the playback device 102 is in 2D playback mode when the SPRM(25) is "2".

Furthermore, in the player variable storage unit 4236, unlike FIG. 38, the SPRM(27) includes a storage area for a reference offset ID for each graphics plane, and the SPRM(28) includes a storage area for an offset adjustment value for each graphics plane. FIG. 43 is a table showing a data structure of SPRM(27) and SPRM(28). As shown in FIG. 43, SPRM(27) includes an area for storing four types of reference offset IDs 4310-4313. These reference offset IDs 4310, 4311, 4312, and 4313 are respectively for a PG plane (PG_ref_offset_id), IG plane (IG_ref_offset_id), secondary video plane (SV_ref_offset_id), and image plane (IM_ref_offset_id). The SPRM(28) includes an area for storing four types of offset adjustment values 4320-4323. These offset adjustment values 4320, 4321, 4322, and 4323 are respectively for a PG plane (PG_offset_adjustment), IG plane (IG_offset_adjustment), secondary video plane (SV_offset_adjustment), and image plane (IM_offset_adjustment).

The BD-ROM drive 4201 includes the same components as the BD-ROM drive 3701 in the 2D playback device shown in FIG. 37. Upon receiving an indication from the playback control unit 4235 of a range of LBNs, the BD-ROM drive 4201 reads data from the sectors on the BD-ROM disc 101 as indicated by the range. In particular, a source packet group belonging to an extent in the file SS, i.e. belonging to an extent SS, are transmitted from the BD-ROM drive 4201 to the switch 4220. Each extent SS includes one or more pairs of a base-view and dependent-view data block, as shown in FIG. 19. These data blocks have to be transferred in parallel to different RB1 4221 and RB2 4222. Accordingly, the BD-ROM drive 4201 is required to have at least the same access speed as the BD-ROM drive 3701 in the 2D playback device.

The switch 4220 receives an extent SS from the BD-ROM drive 4201. On the other hand, the switch 4220 receives, from the playback control unit 4235, information indicating the boundary in each data block included in the extent SS, i.e. the number of source packets from the top of the extent SS to each boundary. The switch 4220 then refers to this information (i) to extract base-view extents from each extent SS and transmit the extents to the RB1 4221, and (ii) to extract dependent-view extents and transmit the extents to the RB2 4222.

The RB1 4221 and RB2 4222 are buffer memories that use a memory element in the playback unit 4202. In particular, different areas in a single memory element are used as the RB1 4221 and RB2 4222. Alternatively, different memory elements may be used as the RB1 4221 and RB2 4222. The RB1 4221 receives base-view extents from the switch 4220 and stores these extents. The RB2 4222 receives dependent-view extents from the switch 4220 and stores these extents.

In 3D playlist playback processing, the system target decoder 4225 first receives PIDs for stream data to be decoded, as well as attribute information necessary for decoding the stream data, from the playback control unit 4235. The system target decoder 4225 then reads source packets alternately from base-view extents stored in the RB1 4221 and dependent-view extents stored in the RB2 4222. Next, the system target decoder 4225 separates, from each source packet, elementary streams indicated by the PIDs received from the playback control unit 4235 and decodes the elementary streams. The system target decoder 4225 then writes the decoded elementary streams in internal plane memory according to the type thereof. The base-view video stream is written in the left-video plane memory, and the dependent-view video stream is written in the right-video plane memory. On the other hand, the secondary video stream is written in the secondary video plane memory, the IG stream in the IG plane memory, and the PG stream in the PG plane memory. When the secondary video stream is composed of a pair of a base-view and a dependent-view video stream, separate secondary video plane memories are prepared for both the left-view and right-view pieces of plane data. The system target decoder 4225 additionally renders graphics data from the program execution unit 4234, such as JPEG, PNG, etc. raster data, and writes this data in the image plane memory.

The system target decoder 4225 associates the output mode of plane data from the left-video and right-video plane memories with B-D presentation mode and B-B presentation mode as follows. When the playback control unit 4235 indicates B-D presentation mode, the system target decoder 4225 alternately outputs plane data from the left-video and right-video plane memories. On the other hand, when the playback control unit 4235 indicates B-B presentation mode, the system target decoder 4225 outputs plane data from only the left-video or right-video plane memory twice per frame while maintaining the operation mode in 3D playback mode.

When the playback control unit 4235 indicates 1 plane+offset mode, then each time the system target decoder 4225 reads the VAU at the top of each video sequence from the dependent-view video stream, the system target decoder 4225 reads the offset metadata 1110 from the VAU. In the playback section of the video sequence, the system target decoder 4225 first specifies the PTS stored in the same PES packet along with each VAU and specifies the number of the frame represented by the compressed picture data of the VAU. The system target decoder 4225 then reads the offset information associated with the frame number from the offset metadata and transmits the offset information to the plane adder 4226 at the time indicated by the specified PTS.

The plane adder 4226 receives each type of plane data from the system target decoder 4225 and superimposes these pieces of plane data on one another to create one combined frame or field. In particular, in L/R mode, left-video plane data represents a left-view video plane, and right-view plane data represents a right-view video plane. Accordingly, the plane adder 4226 superimposes other plane data representing the left view on the left-video plane data and superimposes other plane data representing the right view on the right-video plane data. On the other hand, in depth mode, the right-video plane data represents a depth map for the video plane representing the left-video plane data. Accordingly, the plane adder 4226 first generates a pair of left-view and right-view pieces of video plane data from the corresponding pieces of video plane data. Subsequently, the plane adder 4226 performs the same combination processing as in L/R mode.

When receiving an indication of 1 plane+offset mode or 1 plane+zero offset mode from the playback control unit 4235 as the presentation mode for the secondary video plane, PG plane, IG plane, or image plane, the plane adder 4226 performs offset control on the plane data received from the system target decoder 4225. A pair of left-view plane data and right-view plane data is thus generated.

In particular, when 1 plane+offset mode is indicated, the plane adder 4226 first reads one of the reference offset IDs 4310-4313 that corresponds to each graphics plane from the SPRM(27) in the player variable storage unit 4236. Next, the plane adder 4226 refers to the offset information received from the system target decoder 4225 to retrieve offset information, namely an offset direction 1122 and offset value 1123, belonging to the offset sequence 1113 indicated by each reference offset ID 4310-4313. Subsequently, the plane adder 4226 reads one of the offset adjustment values 4320-4323 that corresponds to each graphics plane from the SPRM(28) in the player variable storage unit 4236 and adds each offset adjustment value to the corresponding offset value. The plane adder 4226 then uses each offset value to perform offset control on the corresponding graphics plane.

On the other hand, when 1 plane+zero offset mode is indicated, the plane adder 4226 does not refer to either SPRM(27) or SPRM(28), but rather performs offset control on each graphics plane with an offset value of "0". Accordingly, the same plane data is used for both the left-view and right-view graphics planes and combined with other pieces of plane data.

The HDMI communication unit 4227, connected with the display device 103 via an HDMI cable 122, exchanges CEC messages with the display device 103 via the HDMI cable 122. This causes the HDMI communication unit 4227 to perform an HDMI authentication of the display device 103 and ask the display device 103 whether or not playback of 3D video images is supported.

<<3D Playlist Playback Processing>>

Figure 44:
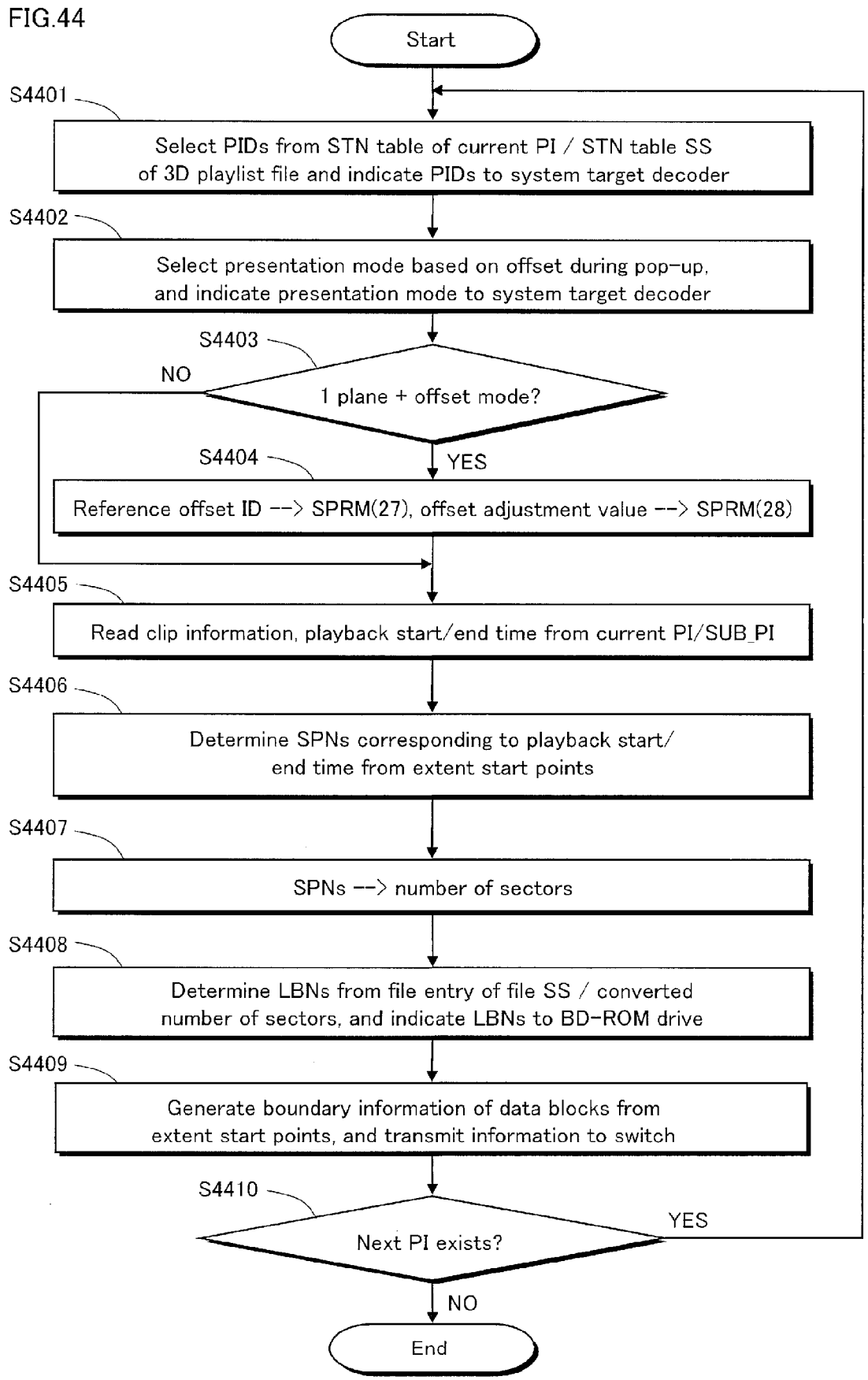
FIG. 44 is a flowchart of 3D playlist playback processing by a playback control unit 4235 shown in FIG. 42.

FIG. 44 is a flowchart of 3D playlist playback processing by a playback control unit 4235. 3D playlist playback processing is started by the playback control unit 4235 reading a 3D playlist file from the static scenario memory 4232.

In step S4401, the playback control unit 4235 first reads a single PI from a main path in the 3D playlist file and then sets the PI as the current PI. Next, from the STN table of the current PI, the playback control unit 4235 selects PIDs of elementary streams to be played back and specifies attribute information necessary for decoding the elementary streams. The playback control unit 4235 further selects, from among the elementary streams corresponding to the current PI in the STN table SS in the 3D playlist file, a PID of elementary streams that are to be added to the elementary streams to be played back, and playback control unit 4235 specifies attribute information necessary for decoding these elementary streams. The selected PIDs and attribute information are indicated to the system target decoder 4225. The playback control unit 4235 additionally specifies, from among sub-paths in the 3D playlist file, a SUB_PI to be referenced at the same time as the current PI, specifying this SUB_PI as the current SUB_PI. Thereafter, processing proceeds to step S4402.

In step S4402, the playback control unit 4235 selects the display mode for each piece of plane data based on the offset during pop-up indicated by the STN table SS and indicates the display mode to the system target decoder 4225 and the plane adder 4226. In particular, when the value of the offset during pop-up is "0", B-D presentation mode is selected as the video plane presentation mode, and 1 plane+offset mode is selected as the presentation mode for the graphics plane. On the other hand, when the value of the offset during pop-up is "1", B-B presentation mode is selected as the video plane presentation mode, and 1 plane+zero offset mode is selected as the presentation mode for the graphics plane. Thereafter, processing proceeds to step S4403.

In step S4403, the playback control unit 4235 checks whether 1 plane+offset mode or 1 plane+zero offset mode has been selected as the presentation mode of the graphics plane. If 1 plane+offset mode has been selected, processing proceeds to step S4404. If 1 plane+zero offset mode has been selected, processing proceeds to step S4405.

In step S4404, the playback control unit 4235 refers to the STN table of the current PI and retrieves the PG stream, IG stream, or text subtitle stream from among the elementary streams indicated by the selected PIDs. Furthermore, the playback control unit 4235 specifies the reference offset ID and offset adjustment value allocated to the pieces of stream data, setting the reference offset ID and offset adjustment value to the SPRM(27) and SPRM(28) in the player variable storage unit 4236. Thereafter, processing proceeds to step S4405.

In step S4405, the playback control unit 4235 reads reference clip information, a PTS #1 indicating a playback start time IN1, and a PTS #2 indicating a playback end time OUT1 from the current PI and the SUB_PI. From this reference clip information, a clip information file corresponding to each of the file 2D and the file DEP to be played back is specified. Thereafter, processing proceeds to step S4406.

In step S4406, with reference to the entry map in each of the clip information files specified in step S4405, the playback control unit 4235 retrieves the SPN #1 and SPN #2 in the file 2D, and the SPN #11 and SPN #12 in the file DEP, corresponding to the PTS #1 and the PTS #2. As described with reference to FIG. 24, referring to extent start points of each clip information file, the playback control unit 4235 further calculates, from the SPN #1 and the SPN #11, the number of source packets SPN #21 from the top of the file SS to the playback start position. The playback control unit 4235 also calculates, from the SPN #2 and the SPN #12, the number of source packets SPN #22 from the top of the file SS to the playback end position. Specifically, the playback control unit 4235 first retrieves, from among SPNs shown by extent start points of the 2D clip information files, a value "Am" that is the largest value less than or equal to SPN #1, and retrieves, from among the SPNs shown by extent start points of dependent-view clip information files, a value "Bm" that is the largest value less than or equal to the SPN #11. Next, the playback control unit 4235 obtains the sum of the retrieved SPNs Am+Bm and sets the sum as SPN #21. Next, the playback control unit 4235 retrieves, from among SPNs shown by the extent start points of the 2D clip information files, a value "An" that is the smallest value that is larger than the SPN #2. The playback control unit 4235 also retrieves, from the SPNs of the extent start points of the dependent-view clip information files, a value "Bn" that is the smallest value that is larger than the SPN #12. Next, the playback control unit 4235 obtains the sum of the retrieved SPNs An+Bn and sets the sum as SPN #22. Thereafter, processing proceeds to step S4407.

In step S4407, the playback control unit 4235 converts the SPN #21 and the SPN #22, determined in step S4406, into a pair of numbers of sectors N1 and N2. Specifically, the playback control unit 4235 first obtains the product of SPN #21 and the data amount per source packet, i.e. 192 bytes. Next, the playback control unit 4235 divides this product the data amount per sector, i.e. 2048 bytes: SPN #21×192/2048. The resulting quotient is the same as the number of sectors N1 from the top of the file SS to immediately before the playback start position. Similarly, from the SPN #22, the playback control unit 4235 calculates SPN #22×192/2048. The resulting quotient is the same as the number of sectors N2 from the top of the file SS to immediately before the playback end position. Thereafter, processing proceeds to step S4408.

In step S4408, the playback control unit 4235 specifies, from the numbers of sectors N1 and N2 obtained in step S4407, LBNs of the top and end of the extent SS group to be played back. Specifically, with reference to the file entry of the file SS to be played back, the playback control unit 4235 counts from the top of sector group in which the extent SS group is recorded so that the LBN of the $(N1+1)^{th}$ sector=LBN #1, and the LBN of the $(N2+1)^{th}$ sector=LBN #2. The playback control unit 4235 further specifies a range from the LBN#1 to the LBN#2 to the BD-ROM drive 4201. As a result, from the sector group in the specified range, a source packet group belonging to an extent SS group is read in aligned units. Thereafter, processing proceeds to step S4409.

In step S4409, referring to the extent start points of the clip information file used in step S4406, the playback control unit 4235 generates information (hereinafter referred to as "data block boundary information") indicating a boundary between dependent-view blocks and base-view data blocks included in the extent SS group, transmitting the data block boundary information to the switch 4220. As a specific example, assume that the SPN #21 indicating the playback start position is the same as the sum of SPNs indicating the extent start points, An+Bn, and that the SPN #22 indicating the playback end position is the same as the sum of SPNs indicating the extent start points, Am+Bm. In this case, the playback control unit 4235 obtains a sequence of differences between SPNs from the respective extent start points, A(n+1)−An, B(n+1)−Bn, A(n+2)−A(n+1), B(n+2)−B(n+1), . . . , Am−A(m−1), and Bm−B(m−1), and transmits the sequence to the switch 4220 as the data block boundary information. As shown in FIG. 24E, this sequence indicates the number of source packets of data blocks included in the extent SS. The switch 4220 counts, from zero, the number of source packets of the extents SS received from the BD-ROM drive 4201. Each time the count is the same as the difference between SPNs indicated by the data block boundary information, the switch 4220 switches the destination of output of the source packets between the RB1 4221 and the RB2 4222 and resets the count to zero. As a result, {B(n+1)−Bn} source packets from the top of the extent SS are output to the RB2 4222 as the first dependent-view extent, and the following {A(n+1)−An} source packets are transmitted to the RB1 4221 as the first base-view extent. Thereafter, dependent-view extents and base-view extents are extracted from the extent SS alternately in the same way, alternating each time the number of source packets received by the switch 4220 is the same as the difference between SPNs indicated by the data block boundary information.

In step S4410, the playback control unit 4235 checks whether an unprocessed PI remains in the main path. When an unprocessed PI remains, processing is repeated from step S4401. When no unprocessed PI remains, processing ends.

<<System Target Decoder>>

The following two means are conceivable as specific means used by the system target decoder 4225 to implement the function to extract offset metadata from the dependent-view video stream. The first means incorporates a TS priority filter and an offset metadata processing unit into the system target decoder 4225 as modules separate from the primary video decoder. The TS priority filter selects TS packets containing offset metadata and TS packets containing dependent-view pictures, depending on the values of TS priority flags. The offset metadata processing unit extracts offset information from the TS packets containing offset metadata. The second means causes TS packets containing a dependent-view video stream to be sent to the primary video decoder in the system target decoder 4225, regardless of the values of TS priority flags. The primary video decoder extracts offset information from the dependent-view video stream in parallel with the process of decoding the dependent-view video stream.

(First Means)

Figure 45:
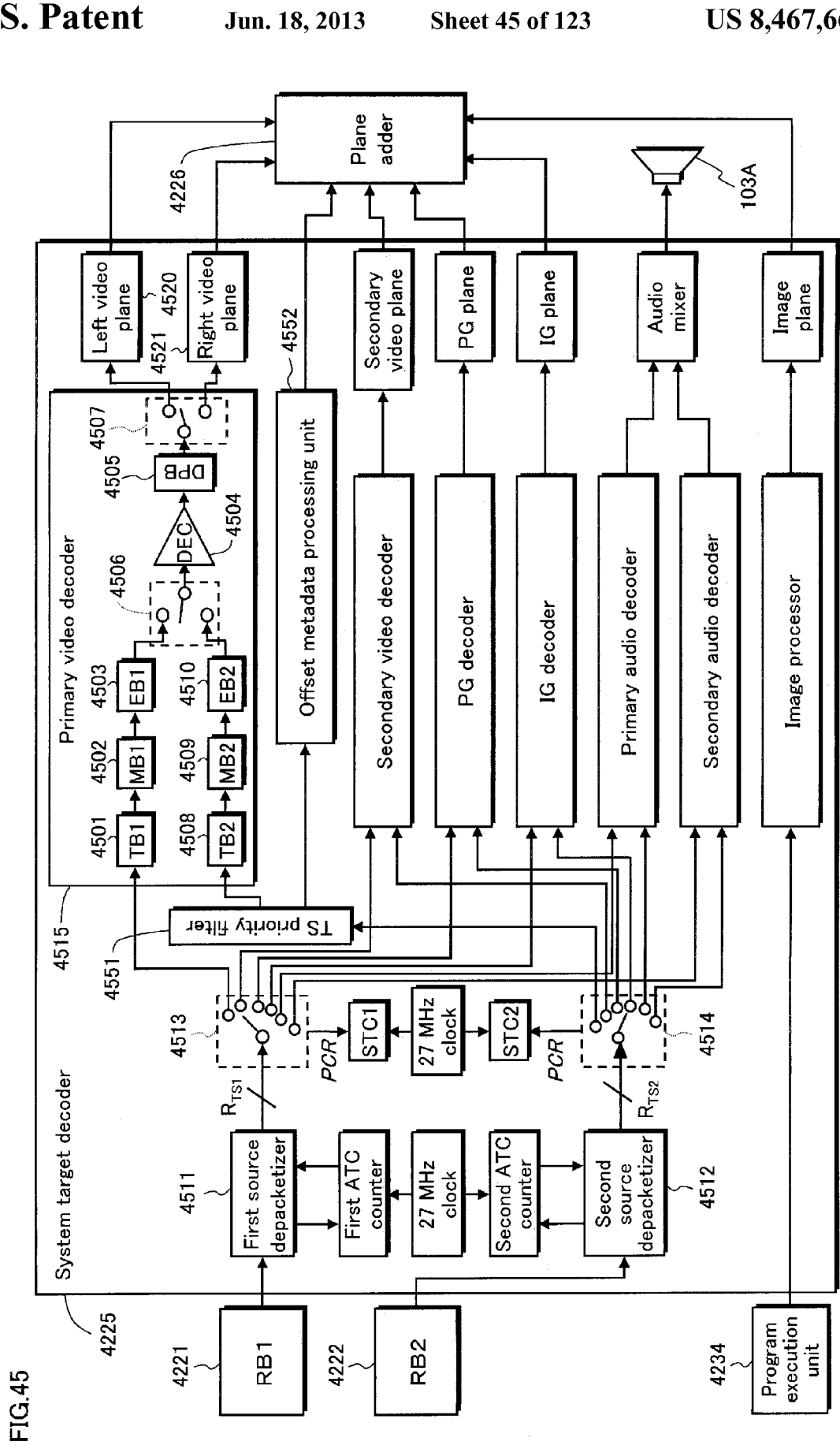
FIG. 45 is a functional block diagram of the system target decoder 4225 shown in FIG. 42 that implements the function to extract offset metadata by using a first means.

FIG. 45 is a functional block diagram of the system target decoder 4225 by using the first means. The components shown in FIG. 45 differ from the components of the system target decoder 3724 in the 2D playback device shown in FIG. 40 as follows: (A) the input system from the read buffers to the decoders has a duplex configuration; and (B) the TS priority filter and the offset metadata processing unit are provided. The primary audio decoder, secondary audio decoder, audio mixer, image processor, and plane memories have similar structures to those in the 2D playback device shown in FIG. 40. Accordingly, among the components shown in FIG. 45, ones different from the components shown in FIG. 40 are described below. On the other hand, details of similar components can be found in the description on FIG. 40. Furthermore, since the video decoders each have a similar structure, the structure of the primary video decoder 4515 is described below. This description is also valid for the structures of other video decoders.

The first source depacketizer 4511 reads source packets from the first read buffer 4221. The first source depacketizer 4511 further retrieves TS packets included in the source packets and transmits the TS packets to the first PID filter 4513. The second source depacketizer 4512 reads source packets from the second read buffer 4222, furthermore retrieving TS packets included in the source packets and transmitting the TS packets to the second PID filter 4514. Each of the source depacketizers 4511 and 4512 further synchronizes the time of transferring the TS packets with the time shown by the ATS of each source packet. This synchronization method is the same method as the source depacketizer 4010 shown in FIG. 40. Accordingly, details thereof can be found in the description provided for FIG. 40. With this sort of adjustment of transfer time, the mean transfer rate of TS packets from the first source depacketizer 4511 to the first PID filter 4513 does not exceed the system rate $R_{TS1}$ indicated by the 2D clip information file. Similarly, the mean transfer rate of TS packets from the second source depacketizer 4512 to the second PID filter 4514 does not exceed the system rate $R_{TS2}$ indicated by the dependent-view clip information file.

The first PID filter 4513 compares the PID of each TS packet received from the first source depacketizer 4511 with the selected PID. The playback control unit 4235 designates the selected PID beforehand in accordance with the STN table in the 3D playlist file. When the two PIDs match, the first PID filter 4513 transfers the TS packets to the decoder assigned to the PID. For example, if a PID is 0x1011, the TS packets are transferred to TB1 4501 in the primary video decoder 4515. On the other hand, TS packets with PIDs ranging from 0x1B00-0x1B1F, 0x1100-0x111F, 0x1A00-0x1A1F, 0x1200-0x121F, and 0x1400-0x141F are transferred to the secondary video decoder, primary audio decoder, secondary audio decoder, PG decoder, and IG decoder, respectively.

The second PID filter 4514 compares the PID of each TS packet received from the second source depacketizer 4512 with the selected PID. The playback control unit 4235 designates the selected PID beforehand in accordance with the STN table SS in the 3D playlist file. When the two PIDs match, the second PID filter 4514 transfers the TS packets to the decoder assigned to the PID or the TS priority filter 4551. For example, if a PID is 0x1012 or 0x1013, the TS packets are transferred to the TS priority filter 4551. On the other hand, TS packets with PIDs ranging from 0x1B20-0x1B3F, 0x1220-0x127F, and 0x1420-0x147F are transferred to the secondary video decoder, PG decoder, and IG decoder, respectively.

The TS priority filter 4551 receives TS packets from the second PID filter 4514 and reads TS priority 511 from the TS header 501H in each of the TS packets. Here, TS packets with PID=0x1012 or 0x1013 are transferred from the second PID filter 4514 to the TS priority filter 4551. These TS packets contain a dependent-view video stream.

Among the TS packets in the sequence 1520 shown in FIG. 15, the first group 1521 and the third group 1523 have the TS priority of "0," and the second group 1522 has the TS priority of "1". The TS priority filter 4551 transfers TS packets with TS priority=0 from the sequence 1520 to the TB2 4508 in the primary video decoder 4515, and TS packets with TS priority=1 to the offset metadata processing unit 4552. As shown in FIG. 15, the TS packets with TS priority=1 belong to the second group 1522. Accordingly, the TS payloads thereof include only the supplementary data 1504 consisting only of the offset metadata 1509. As a result, among the VAU #1 in the dependent-view video stream, supplementary data consisting only of the offset metadata 1509 is transferred to the offset metadata processing unit 4552, and the remaining data, which include other supplementary data, are transferred to the primary video decoder 4515.

Among the TS packets in the sequence 1620 shown in FIG. 16, the first group 1621 and the second group 1622 have the TS priority of "1," and the third group 1623 has the TS priority of "0". The TS priority filter 4551 transfers TS packets with TS priority=0 from the sequence 1620 to the TB2 4508 in the primary video decoder 4515, and TS packets with TS priority=1 to both the TB2 4508 and the offset metadata processing unit 4552. Accordingly, VAU #1 in the dependent-view video stream is transferred to the primary video decoder 4515, while the elements from the sub-AU identification code to the supplementary data are transferred to the offset metadata processing unit 4552 as well.

The primary video decoder 4515 includes a TB1 4501, MB1 4502, EB1 4503, TB2 4508, MB2 4509, EB2 4510, buffer switch 4506, DEC 4504, DPB 4505, and picture switch 4507. The TB1 4501, MB1 4502, EB1 4503, TB2 4508, MB2 4509, EB2 4510 and DPB 4505 are all buffer memories. Each of these buffer memories uses an area of a memory element included in the primary video decoder 4515. Alternatively, some or all of these buffer memories may be separated on different memory elements.

The TB1 4501 receives TS packets that include a base-view video stream from the first PID filter 4513 and stores the TS packets as they are. The MB1 4502 stores PES packets reconstructed from the TS packets stored in the TB1 4501. The TS headers of the TS packets are removed at this point. The EB1 4503 extracts and stores encoded VAUs from the PES packets stored in the MB1 4502. The PES headers of the PES packets are removed at this point.

The TB2 4508 receives TS packets that include the dependent-view video stream from the TS priority filter 4551 and stores the TS packets as they are. The MB2 4509 stores PES packets reconstructed from the TS packets stored in the TB2 4508. The TS headers of the TS packets are removed at this point. The EB2 4510 extracts and stores encoded VAUs from the PES packets stored in the MB2 4509. The PES headers of the PES packets are removed at this point.

The buffer switch 4506 transfers the headers of the VAUs stored in the EB1 4503 and the EB2 4510 in response to a request from the DEC 4504. Furthermore, the buffer switch 4506 transfers the compressed picture data for the VAUs to the DEC 4504 at the times indicated by the DTSs included in the original PES packets. In this case, the DTSs are equal between a pair of pictures belonging to the same 3D VAU between the base-view video stream and dependent-view video stream. Accordingly, for a pair of VAUs that have the same DTS, the buffer switch 4506 first transmits the VAU stored in the EB1 4503 to the DEC 4504. Additionally, the buffer switch 4506 may cause the DEC 4504 to return the decoding switch information 1750 in the VAU. In such a case, the buffer switch 4506 can determine if it should transfer the next VAU from the EB1 4503 or the EB2 4510 by referring to the decoding switch information 1750.

Like the DEC 4004 shown in FIG. 40, the DEC 4504 is a hardware decoder specifically for decoding of compressed pictures and is composed of an LSI that includes, in particular, a function to accelerate the decoding. The DEC 4504 decodes the compressed picture data transferred from the buffer switch 4506 in order. During decoding, the DEC 4504 first analyzes each VAU header to specify the compressed picture, compression encoding method, and stream attribute stored in the VAU, selecting a decoding method in accordance with this information. Compression encoding methods include, for example, MPEG-2, MPEG-4 AVC, MVC, and VC1. Furthermore, the DEC 4504 transmits the decoded, uncompressed picture to the DPB 4505.

The DPB 4505 temporarily stores the uncompressed pictures decoded by the DEC 4504. When the DEC 4504 decodes a P picture or a B picture, the DPB 4505 retrieves reference pictures from among the stored, uncompressed pictures in response to a request from the DEC 4504 and supplies the retrieved reference pictures to the DEC 4504.

The picture switch 4507 writes the uncompressed pictures from the DPB 4505 to either the left-video plane memory 4520 or the right-video plane memory 4521 at the time indicated by the PTS included in the original PES packet. In this case, the PTSs are equal between a base-view picture and a dependent-view picture belonging to the same 3D VAU. Accordingly, for a pair of pictures that have the same PTS and that are stored by the DPB 4505, the picture switch 4507 first writes the base-view picture in the left-video plane memory 4520 and then writes the dependent-view picture in the right-video plane memory 4521.

The offset metadata processing unit 4552 is implemented on the same chip as the primary video decoder 4515, but configured as a module separate from the primary video decoder 4515. Alternatively, the offset metadata processing unit 4552 may be implemented on a chip separate from the chip on which the primary video decoder 4515 is implemented. Furthermore, the offset metadata processing unit 4552 may be configured as dedicated hardware or realized as general-purpose hardware controlled by software. The offset metadata processing unit 4552 analyzes TS packets transferred from the TS priority filter 4551, and then reads offset metadata from supplementary data stored in the TS payloads of the TS packets.

The sequence of TS packets 1520 shown in FIG. 15 contains the PES header belonging to the same PES packet as VAU #1 in the group of TS packets to be transferred to the primary video decoder 4515. Accordingly, the offset metadata processing unit 4552 reads the PTS of the frame represented by the VAU #1 from the offset metadata. On the other hand, the sequence of TS packets 1620 shown in FIG. 16 contains the PES header in the group of TS packets to be transferred to the offset metadata processing unit 4552, as well as the group of TS packets to be transferred to the primary video decoder 4515. Accordingly, the offset metadata processing unit 4552 may read the PTS of the frame represented by the VAU #1 from either of the PES header and the offset metadata.

The offset metadata processing unit 4552 increments the frame number by 1 at frame intervals, starting from 0 at the time indicated by the PTS. In synchronization with the incrementing action, the offset metadata processing unit 4552 further retrieves offset information associated with each frame number from the offset metadata, and then transmits the offset information to the plane adder 4226. Here, the TS priority filter 4551 prevents compressed picture data from being transferred from either of the sequences of TS packets 1520 and 1620 shown in FIGS. 15 and 16 to the offset metadata processing unit 4552. Accordingly, the offset metadata processing unit 4552 can reliably manage the offset information without interference from the compressed picture data.

(Second Means)

Figure 46:
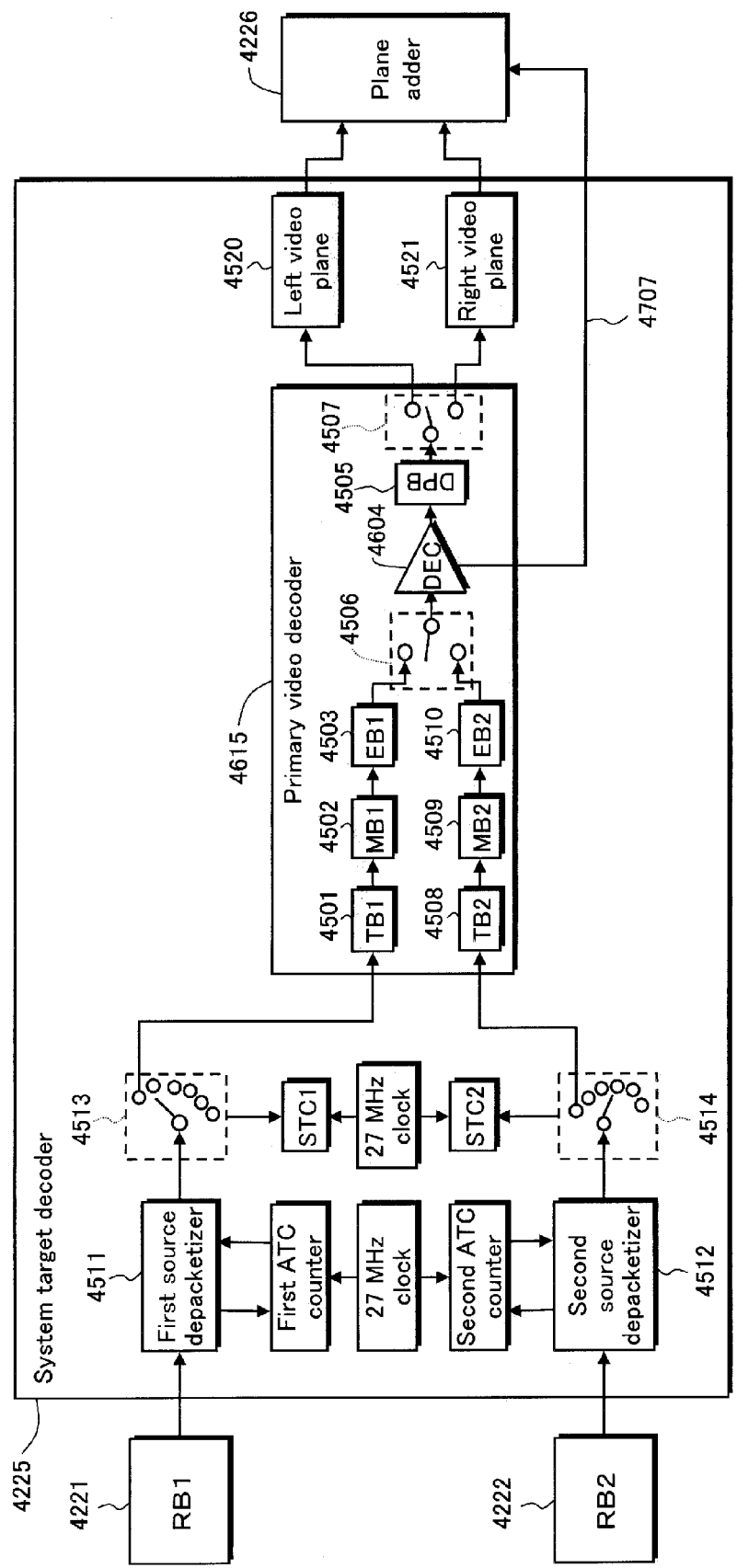
FIG. 46 is a functional block diagram of a system of processing video streams in the system target decoder 4225 shown in FIG. 42 that implements the function to extract offset metadata by using a second means.

FIG. 46 is a functional block diagram showing a system for processing video streams, the system included in the system target decoder 4225 that uses the second means. The system target decoder 4225 shown in FIG. 46 differs from that shown in FIG. 45 in the function of the DEC 4604 in the primary video decoder 4614. Other components are similar to corresponding ones. In FIG. 46, components similar to ones shown in FIG. 45 are marked with the same reference numbers. Furthermore, details of the similar components can be found in the description on FIG. 45.

Like the DEC 4504 shown in FIG. 45, the DEC 4604 is a hardware decoder specifically for decoding of compressed pictures, and is composed of an LSI that includes, in particular, a function to accelerate the decoding. The DEC 4604 decodes the compressed picture data transferred from the buffer switch 4506 in order, and transfers the decoded uncompressed pictures to the DPB 4505. Furthermore, each time it reads a VAU located at the top of each video sequence from the dependent-view video stream, the DEC 4604 reads offset metadata from the VAU. In the playback section of the video sequence, the DEC 4604 first identifies the PTS which is stored in the same PES packet as the VAU, and the frame number represented by the compressed picture data of the VAU. Next, the DEC 4604 reads offset information associated with the frame number from the offset metadata, and sends the offset information to the plane adder 4226 at the time indicated by the identified PTS.

<<Plane Adders>>

Figure 47:
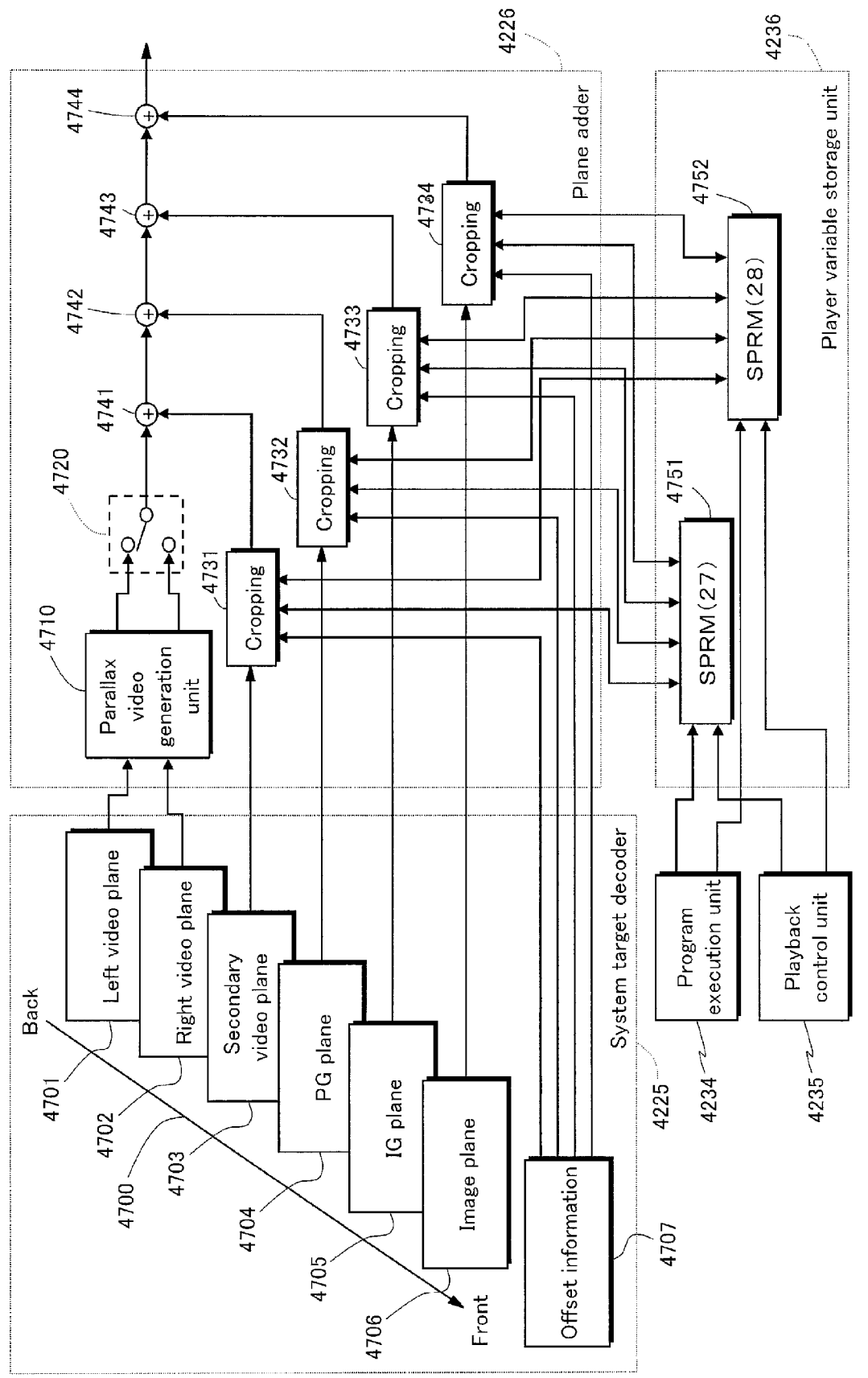
FIG. 47 is a functional block diagram of a plane adder 4226 shown in FIG. 42.

FIG. 47 is a functional block diagram of a plane adder 4226. As shown in FIG. 47, the plane adder 4226 includes a parallax video generation unit 4710, switch 4720, four cropping units 4731-4734, and four adders 4741-4744.

The parallax video generation unit 4710 receives left-video plane data 4701 and right-video plane data 4702 from the system target decoder 4225. In the playback device 102 in L/R mode, the left-video plane data 4701 represents the left-view video plane, and the right-video plane data 4702 represents the right-view video plane. At this point, the parallax video generation unit 4710 transmits the left-video plane data 4701 and the right-video plane data 4702 as they are to the switch 4720. On the other hand, in the playback device 102 in depth mode, the left-video plane data 4701 represents the video plane for 2D video images, and the right-video plane data 4702 represents a depth map for the 2D video images. In this case, the parallax video generation unit 4710 first calculates the binocular parallax for each element in the 2D video images using the depth map. Next, the parallax video generation unit 4710 processes the left-video plane data 4701 to shift the presentation position of each element in the video plane for 2D video images to the left or right according to the calculated binocular parallax. This generates a pair of video planes representing the left view and right view. Furthermore, the parallax video generation unit 4710 transmits the pair of video planes to the switch 4720 as a pair of pieces of left-video and right-video plane data.

When the playback control unit 4235 indicates B-D presentation mode, the switch 4720 transmits left-video plane data 4701 and right-video plane data 4702 with the same PTS to the first adder 4741 in that order. When the playback control unit 4235 indicates B-B presentation mode, the switch 4720 transmits one of the left-video plane data 4701 and right-video plane data 4702 with the same PTS twice per frame to the first adder 4741, discarding the other piece of plane data.

The first cropping unit 4731 includes the same structure as a pair of the parallax video generation unit 4710 and switch 4720. These structures are used when the secondary video plane data is a pair of a left view and a right view. In particular, in the playback device 102 in depth mode, the parallax video generation unit in the first cropping unit 4731 converts the secondary video plane data into a pair of left-view and right-view pieces of plane data. When the playback control unit 4235 indicates B-D presentation mode, the left-view and right-view pieces of plane data are alternately transmitted to the first adder 4741. On the other hand, when the playback control unit 4235 indicates B-B presentation mode, one of the left-view and right-view pieces of plane data is transmitted twice per frame to the first adder 4741, and the other piece of plane data is discarded.

When the playback control unit 4235 indicates 1 plane+offset mode, the first cropping unit 4731 performs the following offset control on the secondary video plane data 4703. The first cropping unit 4731 first receives offset information 4707 from the system target decoder 4225. At this point, the first cropping unit 4731 reads the reference offset ID (SV_ref_offset_id) 4212 corresponding to the secondary video plane from the SPRM(27) 4751 in the player variable storage unit 4236. Next, the first cropping unit 4731 retrieves the offset information belonging to the offset sequence indicated by the reference offset ID from the offset information 4707 received from the system target decoder 4225. Subsequently, the first cropping unit 4731 reads the offset adjustment value (SV_offset_adjustment) 4222 corresponding to the secondary video plane from the SPRM(28) 4752 in the player variable storage unit 4236 and adds the offset adjustment value to the retrieved offset value. After that, the first cropping unit 4731 refers to the offset value to perform offset control on the secondary video plane data 4703. As a result, the secondary video plane data 4703 is converted into a pair of pieces of secondary video plane data representing a left view and a right view, and this pair is alternately output.

The playback control unit 4235 generally updates the values of the SPRM(27) 4751 and SPRM(28) 4752 each time the current PI changes. Additionally, the program execution unit 4234 may set the values of the SPRM(27) 4751 and the SPRM(28) 4752 in accordance with a movie object or BD-J object.

On the other hand, when the playback control unit 4235 indicates 1 plane+zero offset mode, the first cropping unit 4731 does not perform offset control, instead outputting the secondary video plane data 4703 twice as is.

Similarly, the second cropping unit 4732 refers to the reference offset ID (PG_ref_offset_id) 4310 for the PG plane and to the offset adjustment value (PG_offset_adjustment) 4320 to perform offset control on the PG plane data 4704. The third cropping unit 4733 refers to the reference offset ID (IG_ref_offset_id) 4311 for the IG plane and to the offset adjustment value (IG_offset_adjustment) 4321 to perform offset control on the IG plane data 4705. The first cropping unit 4734 refers to the reference offset ID (IM_ref_offset_id) 4213 for the image plane and to the offset adjustment value (IM_offset_adjustment) 4323 to perform offset control on the image plane data 4706.

[Flowchart of Offset Control]

Figure 48:
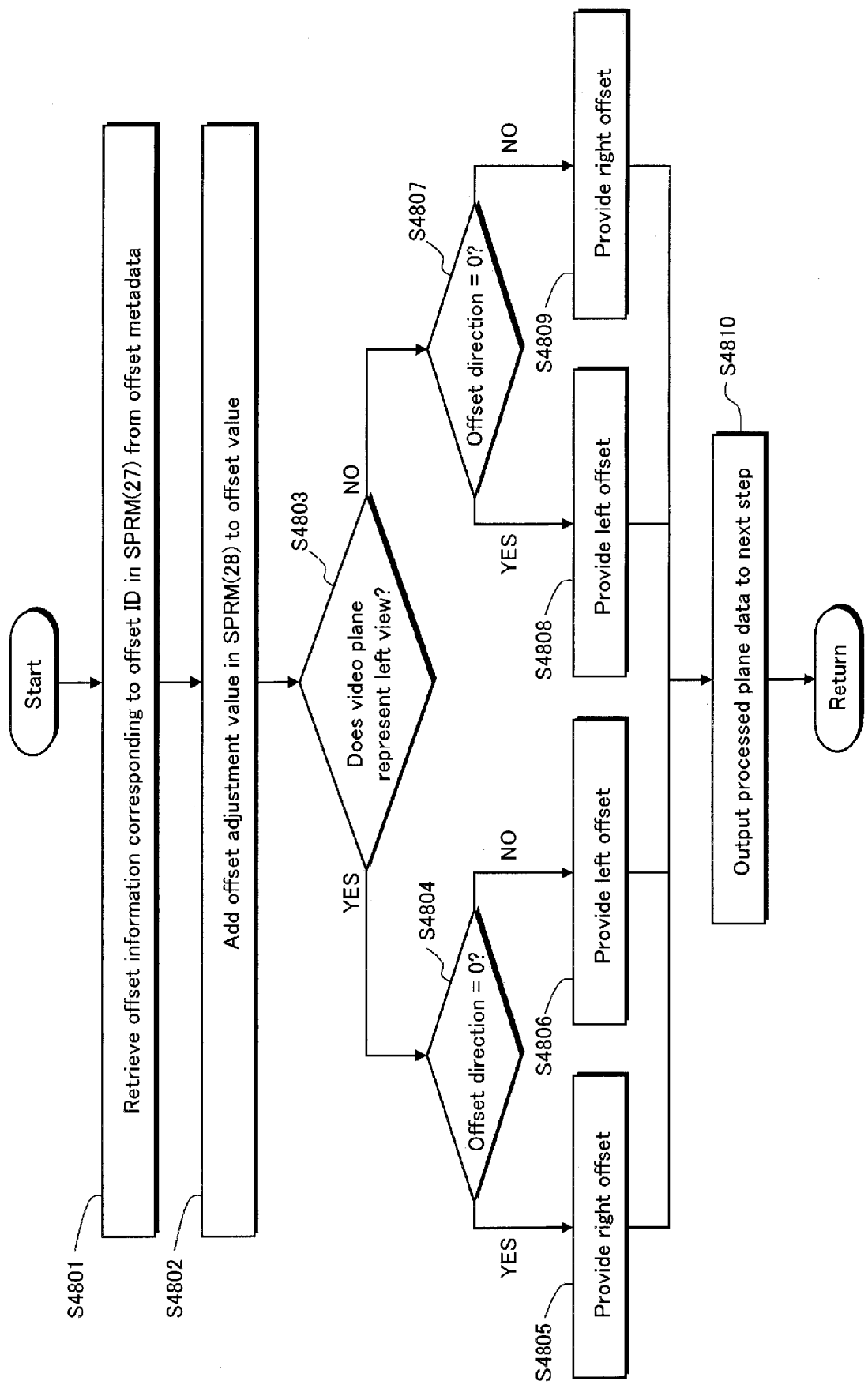
FIG. 48 is a flowchart of offset control by the cropping units 4731-4734 shown in FIG. 47.

FIG. 48 is a flowchart of offset control by the cropping units 4731-4734. Each of the cropping units 4731-4734 begins offset control upon receiving offset information 4707 from the system target decoder 4225. In the following example, the second cropping unit 4732 performs offset control on the PG plane data 4704. The other cropping units 4731, 4733, and 4734 perform similar processing respectively on the secondary video plane data 4703, IG plane data 4705, and image plane data 4706.

In step S4801, the second cropping unit 4732 first receives PG plane data 4704 from the system target decoder 4225. At this point, the second cropping unit 4732 reads the reference offset ID (PG_ref_offset_id) 4310 for the PG plane from the SPRM(27) 4751. Next, the second cropping unit 4731 retrieves the offset information belonging to the offset sequence indicated by the reference offset ID 4310 from the offset information 4707 received from the system target decoder 4225. Thereafter, processing proceeds to step S4802.

In step S4802, the second cropping unit 4732 reads the offset adjustment value (PG_offset_adjustment) 4320 for the PG plane from the SPRM(28) 4752 and adds this offset adjustment value to the offset value retrieved in step S4801. Thereafter, processing proceeds to step S4803.

In step S4803, the second cropping unit 4732 checks which of a left view and a right view is represented by the video plane data selected by the switch 4720. If the video plane data represents a left view, processing proceeds to step S4804. If the video plane data represents a right view, processing proceeds to step S4807.

In step S4804, the second cropping unit 4732 checks the value of the retrieved offset direction. Hereinafter, the following is assumed: if the offset direction value is "0", the 3D graphics image is closer to the viewer than the screen, and if the offset direction value is "1", the image is further back than the screen. In this context, when the offset direction value is "0", processing proceeds to step S4805. If the offset direction value is "1", processing proceeds to step S4806.

In step S4805, the second cropping unit 4732 provides a right offset to the PG plane data 4704. In other words, the position of each piece of pixel data included in the PG plane data 4704 is shifted to the right by the offset value. Thereafter, processing proceeds to step S4810.

In step S4806, the second cropping unit 4732 provides a left offset to the PG plane data 4704. In other words, the position of each piece of pixel data included in the PG plane data 4704 is shifted to the left by the offset value. Thereafter, processing proceeds to step S4810.

In step S4807, the second cropping unit 4732 checks the value of the retrieved offset direction. If the offset direction value is "0", processing proceeds to step S4808. If the offset direction value is "1", processing proceeds to step S4809.

In step S4808, the second cropping unit 4732 provides a left offset to the PG plane data 4704, contrary to step S4805. In other words, the position of each piece of pixel data included in the PG plane data 4704 is shifted to the left by the offset value. Thereafter, processing proceeds to step S4810.

In step S4809, the second cropping unit 4732 provides a right offset to the PG plane data 4704, contrary to step S4806. In other words, the position of each piece of pixel data included in the PG plane data 4704 is shifted to the right by the offset value. Thereafter, processing proceeds to step S4810.

In step S4810, the second cropping unit 4732 outputs the processed PG plane data 4704 to the third cropping unit 4734. Processing then terminates.

[Changes in Plane Data Via Offset Control]

FIG. 49B is a schematic diagram showing PG plane data GP to which the second cropping unit 4732 is to provide offset control. As shown in FIG. 49B, the PG plane data GP includes pixel data representing the subtitle "I love you", i.e. subtitle data STL. This subtitle data STL is located at a distance D0 from the left edge of the PG plane data GP.

FIG. 49A is a schematic diagram showing PG plane data RPG to which a right offset has been provided. As shown in FIG. 49A, when providing a right offset to the PG plane data GP, the second cropping unit 4732 changes the position of each piece of pixel data in the PG plane data GP from its original position to the right by a number of pixels OFS equal to the offset value. Specifically, the second cropping unit 4732 performs cropping to remove, from the right edge of the PG plane data GP, pixel data included in a strip AR1 of a width OFS equal to the offset value. Next, the second cropping unit 4732 forms a strip AL1 of width OFS by adding pixel data to the left edge of the PG plane data GP. The pixel data included in this strip AL1 is set as transparent. This process yields PG plane data RGP to which a right offset has been provided. Subtitle data STL is actually located at a distance DR from the left edge of this PG plane data RGP. This distance DR equals the original distance D0 plus the offset value OFS: DR=D0+OFS.

FIG. 49C is a schematic diagram showing PG plane data LPG to which a left offset has been provided. As shown in FIG. 49C, when providing a left offset to the PG plane data GP, the second cropping unit 4732 changes the position of each piece of pixel data in the PG plane data GP from its original position to the left by a number of pixels OFS equal to the offset value. Specifically, the second cropping unit 4732 performs cropping to remove, from the left edge of the PG plane data GP, pixel data included in a strip AL2 of a width OFS equal to the offset value. Next, the second cropping unit 4732 forms a strip AR2 of width OFS by adding pixel data to the right edge of the PG plane data GP. The pixel data included in this strip AR2 is set as transparent. This process yields PG plane data LGP to which a left offset has been provided. Subtitle data STL is actually located at a distance DL from the left edge of this PG plane data RGP. This distance DL equals the original distance D0 minus the offset value OFS: DL=D0−OFS.

Referring again to FIG. 47, the first adder 4741 receives video plane data from the switch 4720 and receives secondary video plane data from the first cropping unit 4731. At this point, the first adder 4741 superimposes each pair of the plane data and secondary video plane data and transmits the result to the second adder 4742. The second adder 4742 receives PG plane data from the second cropping unit 4732, superimposes this PG plane data on the plane data from the first adder 4741, and transmits the result to the third adder 4743. The third adder 4743 receives IG plane data from the third cropping unit 4733, superimposes this IG plane data on the plane data from the second adder 4742, and transmits the result to the fourth adder 4744. The fourth adder 4744 receives image plane data from the fourth cropping unit 4734, superimposes this image plane data on the plane data from the third adder 4743, and outputs the result to the display device 103. The adders 4741-4744 each make use of alpha blending when superimposing plane data. In this way, the secondary video plane data 4703, PG plane data 4704, IG plane data 4705, and image plane data 4706 are superimposed in the order shown by the arrow 4700 in FIG. 47 on the left-video plane data 4701 or right-video plane data 4702. As a result, the video images indicated by each piece of plane data are displayed on the screen of the display device 103 so that the left-video plane or right-video plane appears to overlap with the secondary video plane, IG plane, PG plane, and image plane in that order.

In addition to the above-stated processing, the plane adder 4724 converts the output format of the plane data combined by the four adders 4741-4744 into a format that complies with the display method of 3D video images adopted in a device such as the display device 103 to which the data is output. If an alternate-frame sequencing method is adopted in the device, for example, the plane adder 4724 outputs the combined plane data pieces as one frame or one field. On the other hand, if a method that uses a lenticular lens is adopted in the device, the plane adder 4724 combines a pair of left-view and right-view pieces of plane data as one frame or one field of video data with use of internal buffer memory. Specifically, the plane adder 4724 temporarily stores and holds in the buffer memory the left-view plane data that has been combined first. Subsequently, the plane adder 4724 combines the right-view plane data, and further combines the resultant data with the left-view plane data held in the buffer memory. During combination, the left-view and right-view pieces of plane data are each divided, in a vertical direction, into small rectangular areas that are long and thin, and the small rectangular areas are arranged alternately in the horizontal direction in one frame or one field so as to re-constitute the frame or the field. In this way, the pair of left-view and right-view pieces of plane data is combined into one video frame or field. The plane adder 4724 then outputs the combined video frame or field to the corresponding device.

Effects of Embodiment 1

In the BD-ROM disc 101 according to Embodiment 1 of the present invention, as shown in FIGS. 15 and 16, TS priorities are assigned to a sequence of TS packets which stores a VAU at the top of each video sequence constituting the dependent-view video stream. In particular, different TS priorities are assigned to a TS packet group storing offset metadata and a TS packet group storing compressed picture data. In that case, the function to extract offset metadata may be realized in the system target decoder 4225 by the first means shown in FIG. 45 or the second means shown in FIG. 46. The system target decoder 4225 by the first means can easily sort out TS packets storing offset metadata from the other by using the TS priorities. Accordingly, the primary video decoder 4515 and the offset metadata processing unit 4552 can be implemented in different forms. Especially even if the primary video decoder 4515 is composed of hardware, irrespectively thereof the offset metadata processing unit 4552 may be composed of dedicated hardware or realized by software with use of general-purpose hardware. On the other hand, in the system target decoder 4225 by the second means, the primary video decoder 4615 can execute in parallel both the function to decode the dependent-view video stream and the function to extract offset metadata. Thus regardless of the TS priorities all TS packets storing the dependent-view video stream can be passed to the primary video decoder 4615. In this way, the data structure of the dependent-view video stream and the offset metadata recorded on the BD-ROM disc 101 according to Embodiment 1 of the present invention can be used in common by the system target decoder 4225 realized by the first means and the system target decoder 4225 realized by the second means.

<Modifications>

(1-A) Video Stream

In L/R mode according to Embodiment 1 of the present invention, the base-view video stream represents the left view, and the dependent-view video stream represents the right view. Conversely, however, the base-view video stream may represent the right view and the dependent-view video stream the left view.

On the BD-ROM disc 101 according to Embodiment 1 of the present invention, the base-view video stream and the dependent-view video stream are multiplexed in different TSs. Alternatively, the base-view video stream and the dependent-view video stream may be multiplexed into a single TS.

(1-B) Offset Metadata (1-B-1) The offset metadata may be stored in the base-view video stream instead of in the dependent-view video stream. In this case as well, the offset metadata is preferably stored in the supplementary data in the VAU located at the top of each video sequence. Furthermore, the 3D playlist file may be provided with a flag indicating whether the base-view video stream or the dependent-view video stream includes the offset metadata. This allows for an increase in the degree of freedom when creating each piece of stream data. Also, it may be prescribed that this flag is "prohibited from being changed during between PIs in which video images are seamlessly connected via CC=5, 6".

(1-B-2) Offset metadata may be stored in each VAU (i.e., each frame or field) instead of only being stored in the top VAU in each video sequence (i.e., each GOP). Alternatively, offset metadata may be set at arbitrary intervals, such as three frames or greater, for each content. In this case, it is preferable that offset metadata always be stored in the top VAU in each video sequence and that the interval between the offset metadata and the immediately prior offset metadata be restricted to equal to or greater than three frames. Accordingly, the playback device can reliably perform processing to change offset information in parallel with interrupt playback.

(1-B-3) Instead of being stored in the video stream, offset metadata may be multiplexed in a main TS or a sub-TS as independent stream data. In this case, a unique PID is allocated to the offset metadata. The system target decoder refers to this PID to separate the offset metadata from other stream data. Alternatively, the offset metadata may first be preloaded into a dedicated buffer and later undergo playback processing, like the text subtitle stream. In this case, the offset metadata is stored at constant frame intervals. Accordingly, a PTS is not necessary for the offset metadata, thus reducing the data amount of the PES header. This reduces the capacity of the buffer for preloading.

(1-B-4) Instead of being stored in the supplementary data of a VAU, offset metadata may be embedded in the video stream with use of a video watermark. Furthermore, the offset metadata may be embedded in the audio stream with use of an audio watermark.

(1-B-5) In the sub-TS according to Embodiment 1 of the present invention, as shown in FIG. 15, the TS packets 1530 and 1550 located at the ends of the first group 1521 and the second group 1522, respectively, include AD fields 1532 and 1552 in general. With this structure, the three groups 1521-1523 are separated from each other. Alternatively, in the VAU #1 1500 in the dependent-view video stream, the size of the padding data 1506 may be adjusted so that the three groups 1521-1523 are separated from each other.

Figure 50:
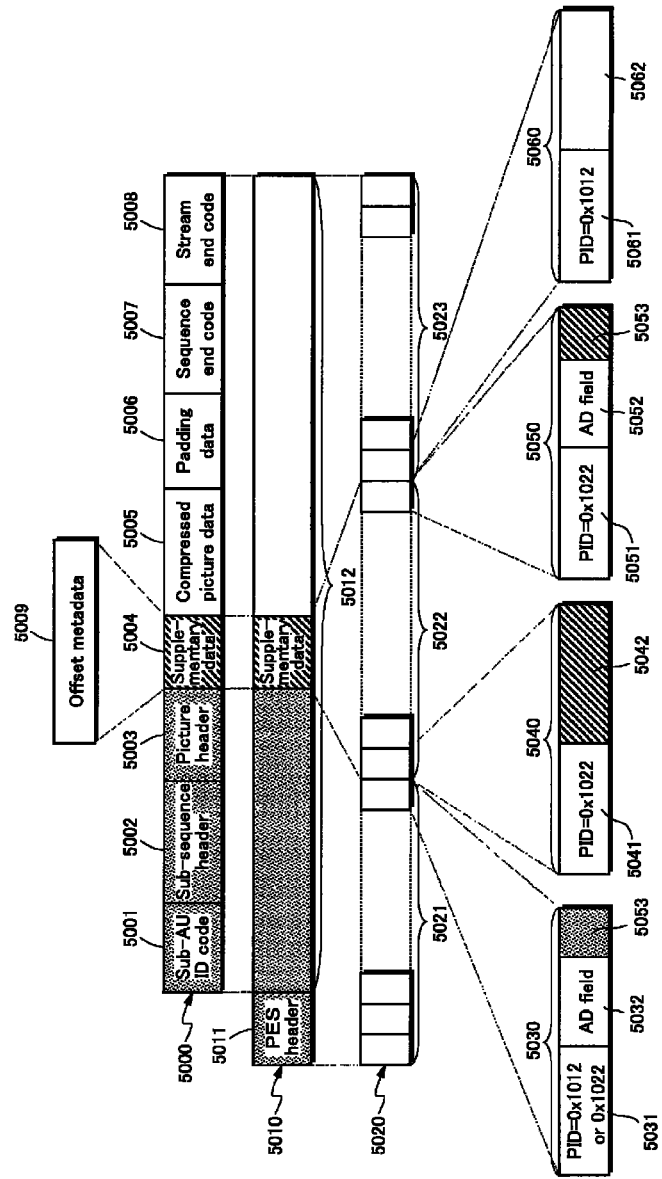
FIG. 50 is a schematic diagram showing a PES packet 5010 storing VAU #1 5000 in the dependent-view video stream and a sequence of TS packets 5020 generated from the PES packet 5010.

(1-B-6) TS packets containing offset metadata may be selected in a system target decoder depending on PIDs, instead of TS priority. FIG. 50 is a schematic diagram showing a PES packet 5010 containing VAU #1 5000 in the dependent-view video stream and a sequence of TS packets 5020 generated from the PES packet 5010. The VAU #1 5000 is located at the top of the video sequence, and accordingly includes supplementary data 5004 consisting only of offset metadata 5009. The PES payload 5012 of the PES packet 5010 contains the VAU #1 5000, and the PES header 5011 thereof includes DTS and PTS assigned to compressed picture data 5005 in the VAU #1 5000. The PES packet 5010 is stored in the TS packet sequence 5020 in order from the top. With this arrangement, the TS packet sequence 5020 is divided into three groups 5021, 5022, and 5023 in order from the top. The first group 5021 includes the PES header 5011, sub-AU identification code 5001, sub-sequence header 5002, and picture header 5003. The second group 5022 includes the supplementary data 5004 consisting only of the offset metadata 5009. The third group 5013 includes the compressed picture data 5005, padding data 5006, sequence end code 5007, and stream end code 5008. Hatched areas in FIG. 50 show the supplementary data 5004 consisting only of the offset metadata 5009, and dotted areas show data 5011, 5001-5003 arranged before the supplementary data in the PES packet 5010. Like the TS packets in the sequence 1520 shown in FIG. 15, the TS packets 5030 and 5050 located at the ends of the first group 5021 and the second group 5022, respectively, include AD fields 5032 and 5052 in general. With this structure, the three groups 5021-5023 are separated from each other. The TS headers 5031 and 5061 of the TS packets 5030 and 5060 belonging to the first group 5021 and the third group 5023 each indicate PID=0x1012. Here, the TS headers 5031 of the TS packets 5030 belonging to the first group 5021 may indicate PID=0x1022. On the other hand, the TS headers 5041 and 5051 of the TS packets 5040 and 5050 belonging to the second group 5022 each indicate PID=0x1022. The hexadecimal value "0x1022" may be replaced to any other value except the hexadecimal values assigned to the other elementary streams. In this way, TS packets belonging to the second group 5022 have a different PID from TS packets belonging to the third group 5023. Accordingly, the system target decoder can easily select TS packets belonging to the second group by using PIDs.

Figure 51:
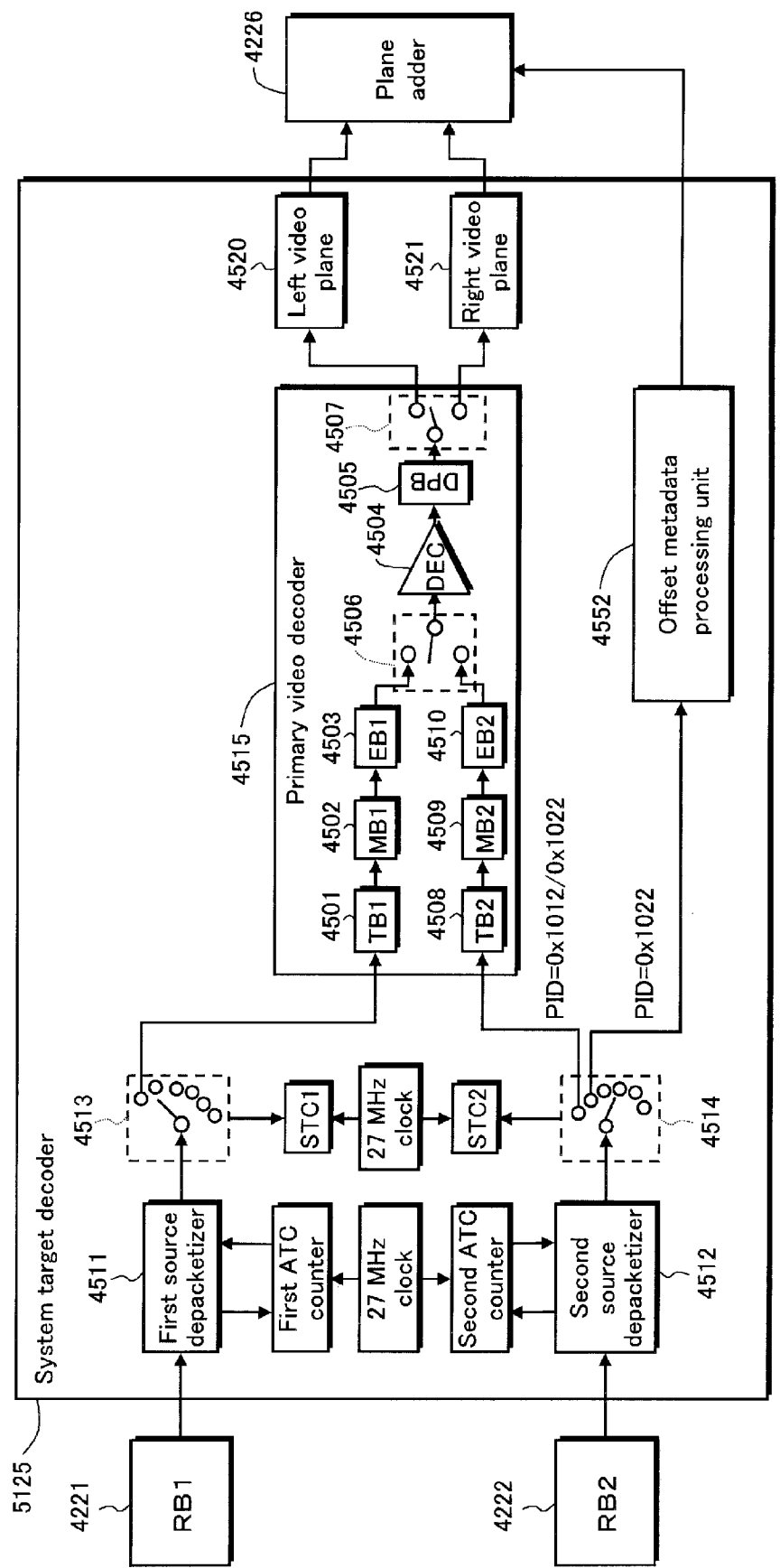
FIG. 51 is a functional block diagram showing a system of processing video streams in the system target decoder 5125 that extracts offset metadata from the TS packet sequence 5020 shown in FIG. 50.

The system target decoder extracts offset metadata from the TS packet sequence 5020 shown in FIG. 50 as follows. FIG. 51 is a functional block diagram showing a system of processing video streams in the system target decoder 5125. The system target decoder 5125 shown in FIG. 51, in contrast to that 4225 shown in FIG. 45, does not include the TS priority filter 4551. Other components thereof are similar to corresponding ones. In FIG. 51, components similar to ones shown in FIG. 45 are marked with the same reference numbers. Furthermore, details of the similar components can be found in the description on FIG. 45.

The second PID filter 4514 transfers TS packets with PID=0x1012 to TB2 4508 in the primary video decoder 4515, and transfers TS packets with PID=0x1022 to the offset metadata processing unit 4552. Here, TS packets with PID=0x1022 may be transferred to TB2 4508 in parallel. In this way, TS packets containing offset metadata are transferred to the offset metadata processing unit 4552.

Note that data different from either of TS priority and PID may be used to select TS packets containing offset metadata from a sub-TS. If the data, like TS priority and PID, allows a different value to be set for each TS packet, the data can be used to select the above-described TS packets. This would be obvious for a person skilled in the art from the above-described embodiment.

(1-B-7) The offset metadata 1110 according to Embodiment 1 of the present invention, as shown in FIG. 11, provides each frame with offset information. Alternatively, when the video stream represents a frame in the interlace method (e.g. 601), the display unit is not a frame, but a field. In that case, the offset metadata may provide each field with the offset information or provide the pair of fields constituting each frame with the offset information.

(1-B-8) In the offset metadata according to Embodiment 1 of the present invention, each offset sequence defines an offset value for each frame. Alternatively, each offset sequence may define a function that represents a change over time in the offset value for each presentation time, i.e. a completion function. In this case, the 3D playback device uses the completion function at each presentation time to calculate the offset value for each frame included in that presentation time.

Figure 52A:
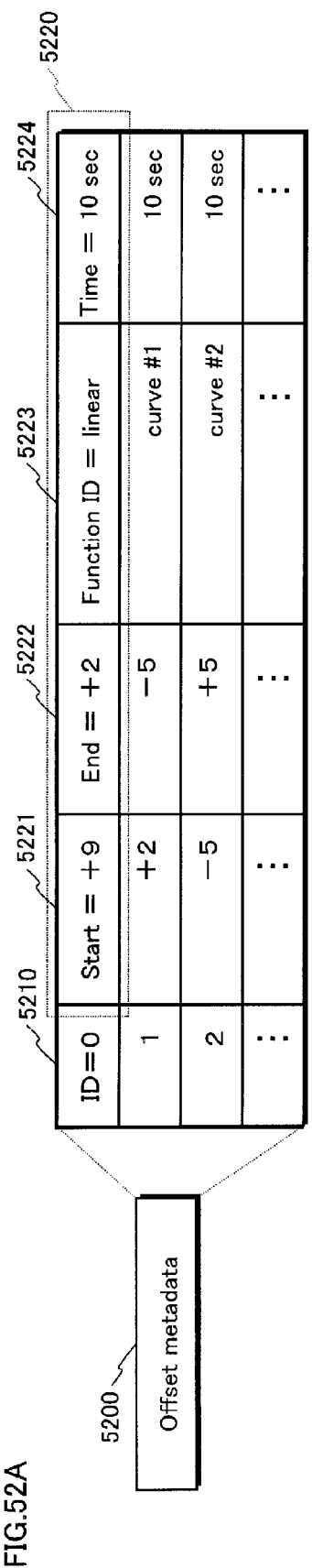
FIG. 52A is a schematic diagram showing a data structure of offset metadata 5200 that uses a completion function.

FIG. 52A is a schematic diagram showing a data structure of offset metadata 5200 that uses a completion function. As shown in FIG. 52A, the offset metadata 5200 includes a correspondence table between offset sequence IDs 5210 and offset sequences 5220. An offset sequence 5220 includes a starting offset value (offset_start) 5221, an ending offset value (offset_end) 5222, offset function ID (offset_func_id) 5223, and offset duration (offset_duration) 5224. When the offset metadata 5200 is stored in a video sequence in the dependent-view video stream, the starting offset value 5221 indicates the offset value for the first frame represented by the video sequence. The ending offset value 5222 indicates the offset value for the first frame represented by the next video sequence. The offset function ID 5223 defines the type of completion function. The type of completion function represents the shape of the changes in the offset value during the presentation time of the video sequence. The offset duration 5224 indicates the length of the presentation time of the video sequence.

Figure 52C:
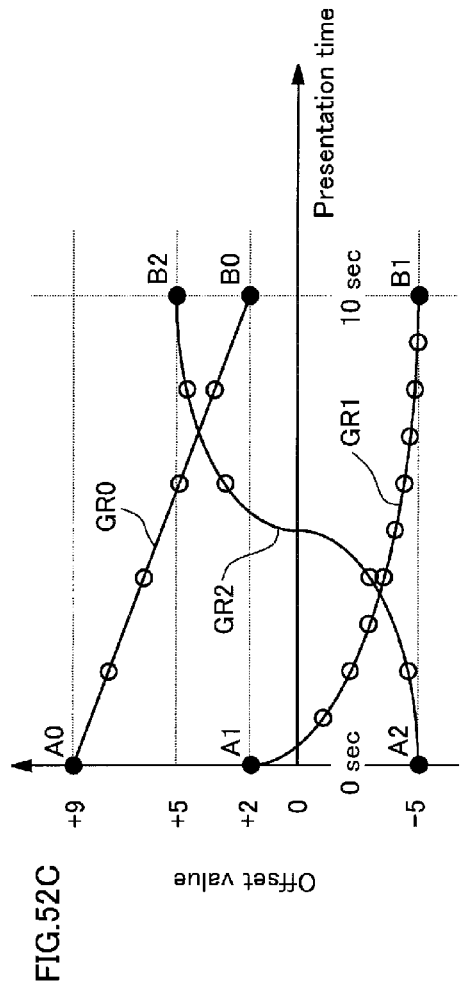
FIG. 52C is a graph showing offset values calculated by a 3D playback device from offset sequence IDs=0, 1, 2 shown in FIG. 52A.
Figure 52B:
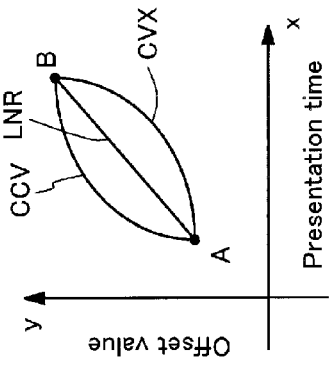
FIG. 52B is a graph showing the types of elements in the completion function.

FIG. 52B is a graph showing the types of elements in the completion function. As shown in FIG. 52B, the x-axis represents the presentation time, and the y-axis represents the offset value. In this context, the sign of the offset value is determined by the depth of the graphics image, i.e. by whether the 3D graphics image is further back or closer than the screen. Three types of elements in a completion function are provided: a linear shape LNR, a convex shape CVX, and a concave shape CCV. The linear shape LNR is defined by a linear function $y=ax+b$, whereas the convex shape CVX and concave shape CCV are defined by a second degree curve $y=ax^2+bx+c$, a third degree curve $y=ax^3+bx^2+cx+d$, or a gamma curve $y=a(x+b)^{1/r}+c$. In this context, the constants a, b, c, and d are parameters determined by the xy coordinates of each edge A, B of each element, i.e. by a pair of presentation time and the offset value at that point. On the other hand, the constant r is separately defined and is stored in each offset sequence. The types of completion functions are defined by one of these elements LNR, CVX, and CCV or by a combination thereof FIG. 52C is a graph showing offset values calculated by a 3D playback device from offset sequence IDs=0, 1, 2 shown in FIG. 52A. As shown in FIG. 52C, the horizontal axis of the graph represents the time elapsed since the first frame in each video sequence was displayed; in the video sequence, an offset sequence is stored. The black circles A0, B0, A1, B1, A2, and B2 indicate coordinates defined by either the starting offset value 5221 or ending offset value 5222 and the offset duration 5224. The lines GR0, GR1, and GR2 that respectively connect the pairs of black circles A0+B0, A1+B1, and A2+B2 represent completion functions that are each determined by the type of completion function specified in the offset function ID 5223 and by the coordinate values of the black circles A0+B0, A1+B1, and A2+B2 at the edges of the lines. In the offset sequence with offset sequence ID=0, the offset function ID 5223 indicates "linear", and thus the black circles A0 and B0 at either edge are connected by a line #0 GR0 with a linear shape LNR. In the offset sequence with offset sequence ID=1, the offset function ID 5223 indicates "curve #1", and thus the black circles A1 and B1 at either edge are connected by a line #1 GR1 with a convex shape CVX. In the offset sequence with offset sequence ID=2, the offset function ID 5223 indicates "curve #2", and thus the black circles A2 and B2 at either edge are connected by a line #2 GR2 that is formed by a combination of a convex shape CVX and a concave shape CCV. The white circles represent pairs of a presentation time for a frame and an offset value for the frame as calculated by the 3D playback device using the completion function indicated by each of the lines GR0, GR1, and GR2. As is clear from these lines GR0, GR1, and GR2, the mere combination of the starting offset value 5221, ending offset value 5222, offset function ID 5223, and offset duration 5224 can represent a variety of changes in offset value, i.e. in the depth of 3D graphics images. Accordingly, the size of the overall offset metadata can be reduced without a loss in the ability to express 3D graphics images.

(1-C) In the AV stream file for 3D video images, data regarding the playback format of 3D video images may be added to the PMT 1810 shown in FIG. 18. In this case, the PMT 1810 includes 3D descriptors in addition to the PMT header 1801, descriptors 1802, and pieces of stream information 1803. The 3D descriptors are information on the playback format of 3D video images, are shared by the entire AV stream file, and particularly include 3D format information. The 3D format information indicates the playback format, such as L/R mode or depth mode, of the 3D video images in the AV stream file. Each piece of stream information 1803 includes 3D stream descriptors in addition to a stream type 1831, a PID 1832, and stream descriptors 1833. The 3D stream descriptors indicate information on the playback format of 3D video images for each elementary stream included in the AV stream file. In particular, the 3D stream descriptors of the video stream include a 3D display type. The 3D display type indicates whether the video images indicated by the video stream are a left view or a right view when the video images are displayed in L/R mode. The 3D display type also indicates whether the video images indicated by the video stream are 2D video images or depth maps when the video images are displayed in depth mode. When a PMT thus includes information regarding the playback format of 3D video images, the playback system of these video images can acquire such information simply from the AV stream file. This sort of data structure is therefore useful when distributing 3D video content via a broadcast.

(1-D) Clip Information File

The dependent-view clip information file may include, among stream attribute information 2220 such as in FIG. 22, a predetermined flag in the video stream attribute information allocated to PID=0x1012, 0x1013 of the dependent-view video stream. When turned on, this flag indicates that the dependent-view video stream refers to the base-view video stream. Furthermore, the video stream attribute information may include information regarding the base-view video stream to which the dependent-view video stream refers. This information can be used to confirm the correspondence between video streams when verifying, via a predetermined tool, whether the 3D video content has been created in accordance with a prescribed format.

According to Embodiment 1 of the present invention, the size of base-view extents and dependent-view extents can be calculated from the extent start points 2242 and 2420 included in the clip information file. Alternatively, a list of the size of each extent may be stored in, for example, the clip information file as part of the meta data.

(1-E) Playlist File (1-E-1) The 3D playlist file 222 shown in FIG. 31 includes one sub-path. Alternatively, the 3D playlist file may include a plurality of sub-paths. For example, if the sub-path type of one sub-path is "3D L/R", then the sub-path type of the other sub-path may be "3D depth". By switching between these two types of sub-paths when playing back 3D video images in accordance with the 3D playlist file, the playback device 102 can easily switch between L/R mode and depth mode. In particular, such switching can be performed more rapidly than switching the 3D playlist file itself.

A plurality of dependent-view video streams may represent the same 3D video images in combination with a shared base-view video stream. However, the parallax between the left view and right view for the same scene differs between the dependent-view video streams. These dependent-view video streams may be multiplexed into one sub-TS, or separated into different sub-TSs. In this case, the 3D playlist file includes a plurality of sub-paths. Each sub-path refers to a different dependent-view video stream. By switching between sub-paths when playing back 3D video images in accordance with the 3D playlist file, the playback device 102 can easily change the sense of depth of the 3D video images. In particular, such processing can be performed more rapidly than switching the 3D playlist file itself.

Figure 53:
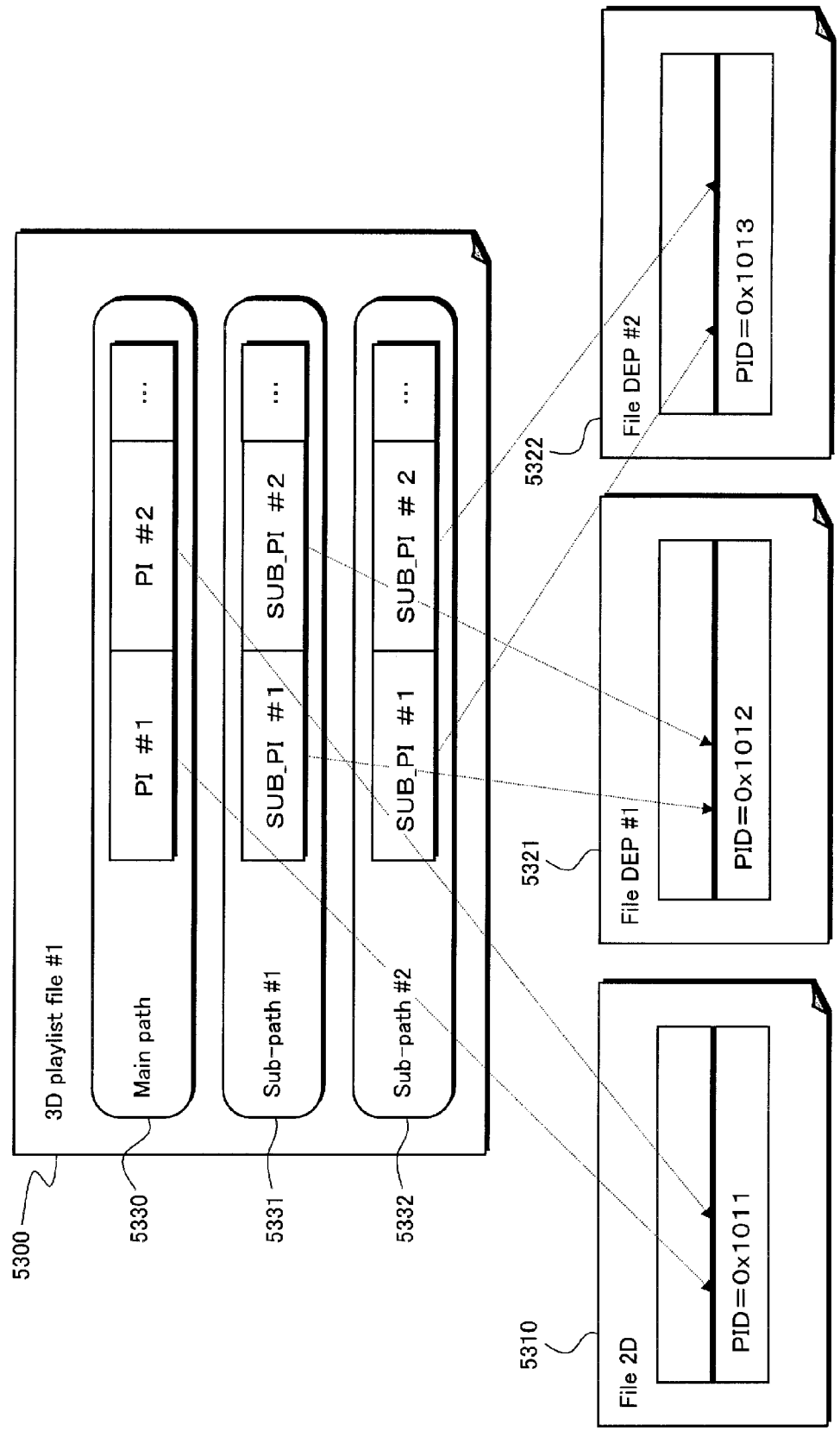
FIG. 53 is a schematic diagram showing (i) a data structure of a 3D playlist file 5300 that includes a plurality of sub-paths and (ii) a data structure of a file 2D 5310 and two files DEP 5321 and 5322 that are referred to by the 3D playlist file 5300.

FIG. 53 is a schematic diagram showing (i) a data structure of a 3D playlist file 5300 that includes a plurality of sub-paths and (ii) a data structure of a file 2D 5310 and two files DEP 5321 and 5322 that are referred to by the 3D playlist file 5300. The file 2D 5310 includes a base-view video stream with a PID=0x1011. The file DEP #1 5321 includes a dependent-view video stream #1 with a PID=0x1012. The file DEP #2 5322 includes a dependent-view video stream #2 with a PID=0x1013. In combination with the base-view video stream in the file 2D 5310, the dependent-view video streams #1 and #2 separately represent the same 3D video images. However, the parallax between the left view and right view for the same scene differs between the dependent-view video streams #1 and #2. Furthermore, offset sequences with the same offset sequence ID define different offset values for the same frame number.

The 3D playlist file 5300 includes a main path 5330 and two sub-paths 5331 and 5332. The PI #1 of the main path 5330 refers to file 2D 5310, in particular to the base-view video stream. The SUB_PI #1 of each of the sub-paths 5331 and 5332 shares the same playback time as the PI #1 in the main path 5330. The SUB_PI #1 of the sub-path #1 5331 refers to the file DEP #1 5321, in particular to the dependent-view video stream #1. The SUB_PI #1 of the sub-path #2 5332 refers to the file DEP #2 5322, in particular to the dependent-view video stream #2. This is also true in the PI #2 of the main path 5330 and the SUB_PI #2 of each of the sub-paths 5331 and 5332.

During 3D playlist playback processing of the 3D playlist file 5300, the playback device 102 first has a user or an application program select the sub-path for playback. Alternatively, the playback device 102 may select the sub-path for playback according to the screen size of the display device 103, or may select the sub-path by referring to the interpupillary distance of the viewer. By selecting the sub-path in this way, the parallax between the left-view and right-view video planes can easily be changed. Furthermore, since offset information changes caused by switching of the dependent-view video stream, the offsets of the graphics planes played back from the PG stream or IG stream included in the file 2D 5310 change. This makes it easy to change the sense of depth of the 3D video images.

(1-E-2) In the 3D playlist file shown in FIG. 31, the base-view video stream is registered in the STN table 3205 in the main path 3101, and the dependent-view video stream is registered in the STN table SS 3130 in the extension data 3103. Alternatively, the dependent-view video stream may be registered in the STN table. In that case, the STN table may include a flag indicating which of the base view and the dependent view is represented by the registered video stream.

(1-E-3) According to Embodiment 1 of the present invention, 2D playlist files and 3D playlist files are stored separately in the BD-ROM disc 101. Alternatively, in a similar manner to the extension data 3103, the sub-path 3102 shown in FIG. 31 may be recorded in an area that is referenced only by the playback device 102 in the 3D playback mode. In that case, the 3D playlist files as they are can be used as the 2D playlist files since there is no risk that the sub-path 3102 causes the playback device 102 in the 2D playback mode to malfunction. As a result, the authoring of the BD-ROM disc is simplified.

(1-E-4) The reference offset IDs and offset adjustment values for the PG stream, IG stream, and text subtitle stream may be stored in the STN table SS 3130 instead of in the STN table 3205. Alternatively, this information may be stored in the stream attribute information 2220 in the clip information file. Furthermore, the reference offset ID may be stored in the subtitle entry for each PG stream and text subtitle stream or may be stored in each page of the IG stream.

(1-E-5) When reference offset IDs are set in the 3D playlist file, the following constraint conditions may be prescribed for seamless connection between PIs. For example, when CC=5 is set in the PI #2 of the main path 5330 shown in FIG. 53, video images in the playback sections defined by PI #1 and PI #2 need to be connected seamlessly. In this case, in PI #1 and PI #2, changes are prohibited to both the values of the reference offset IDs and the number of offset sequences included in the dependent-view video stream, i.e. the number of entries. Furthermore, changes to both the offset adjustment values and the number of entries thereof may be prohibited. With these constraint conditions, the playback device 102 can skip updating of the SPRM(27) when changing the current PI from PI #1 to PI #2. Since the processing load for seamless connection is thus reduced, the reliability of this processing can be further improved. As a result, the quality of 3D video images can be improved.

Figure 54:
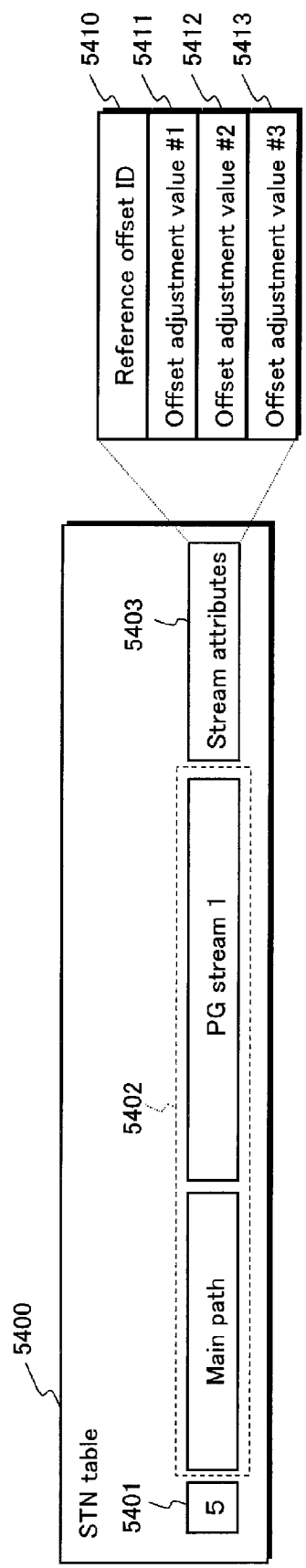
FIG. 54 is a schematic diagram showing an STN table 5400 in which two or more offset adjustment values are set for one piece of stream data.

(1-E-6) In the STN table, two or more offset adjustment values may be set for one piece of stream data. FIG. 54 is a schematic diagram showing such an STN table 5400. As shown in FIG. 54, the STN table 5400 associates an STN 5401 with a stream entry 5410 of PG stream 1 and a piece of stream attribute information 5403. The stream attribute information 5403 includes three types of offset adjustment values #1-#3 5411-5413 along with a reference offset ID 5410. These offset adjustment values are used to change an offset depending on the screen size of a display device; the offset is to be provided to a graphics plane generated from PG stream 1.

Assume that the correspondence between the types of offset adjustment values and screen sizes is specified in advance. Specifically, offset adjustment value #1 5411, offset adjustment value #2 5412, and offset adjustment value #3 5413 are respectively used when the screen size falls within the range of 0-33 inches, 34-66 inches, and 67 inches or greater. The offset adjustment values 5411-5413 are set to satisfy the following condition: parallaxes between left-view and right-view graphics images produced by providing an offset to a graphics plane have the maximum value equal to or less than an interpupillary distance of a general viewer (in the case of a child, 5 cm or less). As long as this condition is satisfied, the parallax will not exceed the viewer's interpupillary distance. This can reduce the viewer's risk of suffering visually-induced motion sickness and eye strain.

Each time the change of current PI causes the change of the total number of offset adjustment values allocated to a piece of stream data, the playback control unit 4235 of the playback device 102 selects offset adjustment values to be used actually depending on the screen size of the display device 103. Specifically, the playback control unit 4235 first acquires the screen size of the display device 103, if necessary, by performing the HDMI authentication. The playback control unit 4235 next selects one of offset adjustment value #1-#3, 4801-4803, depending on which range the screen size of the display device 103 falls within; 0-33 inches, 34-66 inches, 67 inches or greater. The playback control unit 4235 stores information representing the type of the selected value as a player variable into the player variable storage unit 4236. Thus, until the selection of offset adjustment values are performed again, the playback control unit 4235 selects offset adjustment values of the type indicated by the player variable from each STN table, and then updates the value of the SPRM(28) to the selected value.

(1-F) The index file 211 shown in FIG. 35 includes the 3D existence flag 3520 and 2D/3D preference flag 3530 shared by all the titles. Alternatively, the index file may specify a different 3D existence flag or 2D/3D preference flag for each title.

(1-G) SPRM(27), SPRM(28)

(1-G-1) The program execution unit 4234 may set the values of the SPRM(27) 4751 and the SPRM(28) 4752 in accordance with a movie object or BD-J object. In other words, the playback device 102 may cause an application program to set the reference offset ID and offset adjustment value. Furthermore, such an application program may be limited to an object associated with the item "first play" 3501 in the index table 3510.

(1-G-2) The playback control unit 4235 may have the viewer adjust the offset to be provided to the graphics plane. Specifically, when the viewer operates the remote control 105 or the front panel of the playback device 102 and requests to set the offset adjustment value, first the user event processing unit 4233 receives the request and notifies the playback control unit 4235 of the request. Next, in response to the request, the playback control unit 4235 displays an operation screen for adjusting the offset on the display device 103. Here, an OSD of the playback device 102 is used for displaying this operation screen. The playback control unit 4235 further has the viewer select a graphics plane for adjustment and increase/decrease of the offset value, through operation of the remote control 105 or the like. The playback control unit 4235 then updates SPRM(28) to add or subtract a predetermined value to/from the offset adjustment value corresponding to the selected graphics plane. Preferably, during the adjustment processing, the playback control unit 4235 causes the playback unit 4202 to continue playback processing of the graphics plane. Here, the playback unit 4202 makes the operation screen or the graphics image—whichever is displayed closer to the viewer—semi-transparent, or displays the operation screen closer than the graphics image. This makes the graphics image visible even when the operation screen is being displayed, and thus the viewer can immediately confirm the effect of increasing or decreasing the offset value in the same way as when adjusting the brightness or color of the screen.

(1-G-3) For offset control, each of the cropping units 4731-4734 shown in FIG. 47 uses the offset sequence specified by the reference offset IDs indicated by the SPRM(27). Conversely, for offset control, each cropping unit 4731-4734 may be made not to use the offset sequence specified by each offset sequence ID indicated by a predetermined SPRM. In other words, the SPRM may indicate the offset sequence IDs (PG_ref_offset_id_mask, IG_ref_offset_id_mask, SV_ref_offset_id_mask, IM_ref_offset_id_mask) that are to be masked during offset control. In this case, each of the cropping units 4731-4734 may select the ID of the offset sequence that includes the largest offset value from among the offset sequences that are received from the system target decoder 4225 and are allocated to the offset sequence IDs not masked in the offset information 4707. In this way, the depth of the graphics images represented by the secondary video plane, PG plane, IG plane, and image plane can easily be aligned. This allows for an increase in the degree of freedom when creating each piece of stream data.

(1-H) When displaying a menu unique to the playback device 102 as an OSD, the playback device 102 may perform offset control on the graphics plane representing the 2D video images in the menu, i.e. on the OSD plane. In this case, the playback device 102 may select, within the offset information transmitted by the system target decoder 4225 at the presentation time of the menu, the offset information that has an offset direction that is closer to the viewer than the screen and that has the largest offset value. The menu can thus be displayed closer than any 3D graphics image, such as subtitles or the like, played back from the 3D video content.

Alternatively, the playback device 102 may pre-store offset information for the OSD plane. A specific offset sequence ID, such as offset_id=0, is allocated to this offset information. Furthermore, the following two conditions may be placed on the offset information with an offset sequence ID=0: (1) The offset direction is closer to the viewer than the screen, and (2) The offset value is the same as the largest offset value among those included in the pieces of offset information that (i) are allocated to offset sequence IDs other than zero, (ii) correspond to the same frame number, and (iii) have offset directions closer to the screen than the viewer. With this prescription, the playback device 102 does not have to select offset information from among the offset information transmitted by the system target decoder 4225, thus simplifying offset control of the OSD plane. Also, each of the cropping units 4731-4734 may use offset information for offset sequence ID=0 as a substitute when unable to detect reference offset IDs indicated by SPRM(27) among the offset information 4707 received from the system target decoder 4225.

(1-I) In the 3D playback device, in addition to the setting of parental level in SPRM(13), 3D parental level may be set in SPRM(30). The 3D parental level indicates a predetermined restricted age and is used for parental control of viewing of 3D video titles recorded on the BD-ROM disc 101. Like the value in SPRM(13), a user of the 3D playback device sets the value of the SPRM(30) via, for example, an OSD of the 3D playback device. The following is an example of how the 3D playback device performs parental control onto each 3D video title. The 3D playback device first reads, from the BD-ROM disc 101, the age for which viewing of a title in the 2D playback mode is permitted and compares this age with the value of the SPRM(13). If this age is equal to or less than the value of the SPRM(13), the 3D playback device stops playback of the title. If this age is greater than the value of the SPRM(13), the 3D playback device reads, from the BD-ROM disc 101, the age for which viewing of a title in the 3D playback mode is permitted and compares this age with the value of the SPRM(30). If this age is equal to or greater than the value of the SPRM(30), the 3D playback device plays back the title in the 3D playback mode. If this age is less than the value of the SPRM(30) and equal to or greater than the value of the SPRM(13), the 3D playback device plays back the title in the 2D playback mode. In this way, the difference in viewer's interpupillary distance by the age taken into account, it is possible to realize a parental control so that, for example, "children whose ages are less than a predetermined value can view 3D video images only as 2D video images". Preferably the parental control is performed when it is judged that "the display device supports playback of 3D video images" in the processing of selecting a playlist file for playback shown in FIG. 36, namely when it is judged YES in step S3605. Note that a value indicating permission/prohibition of 3D playback mode may be set in SPRM(30) instead of parental level, and the 3D playback device may judge whether the 3D playback mode is valid or invalid in accordance with the value.

(1-J) In the 3D playback device, a value indicating "which of 2D playback mode and 3D playback mode is to be prioritized" may be set in SPRM(31). A user of the 3D playback device sets the value of the SPRM(31) via, for example, an OSD of the 3D playback device. In step S3603 in the processing of selecting a playlist file for playback shown in FIG. 36, the 3D playback device refers to the SPRM(31) as well as the 2D/3D preference flag. When both the SPRM(31) and 2D/3D preference flag indicate the 2D playback mode, the 3D playback device selects the 2D playback mode. When both the SPRM(31) and 2D/3D preference flag indicate the 3D playback mode, the 3D playback device proceeds to step S3605 and performs the HDMI authentication, without displaying the playback mode selection screen. As a result, when the display device is supporting the 3D video images, the 3D playback device selects the 3D playback mode. When the SPRM(31) and 2D/3D preference flag indicate different playback modes, the 3D playback device executes step S3604, i.e. displays the playback mode selection screen to have the user select a playback mode. Alternatively, the 3D playback device may have the application program select a playback mode. In this way, even if the 2D/3D preference flag is set in the 3D video content, it is possible to have the user select a playback mode only when the playback mode indicated by the 2D/3D preference flag does not match the playback mode indicated by the SPRM(31) which is the playback mode having been set by the user in advance.

An application program such as a BD-J object may select a playback mode by referring to the SPRM(31). Furthermore, the application program may determine the initial state of the menu to be displayed on the selection screen depending on the value of the SPRM(31), when causing a user to select a playback mode at step S3604 shown in FIG. 36. For example, when the value of the SPRM(31) indicates that the 2D playback mode has a high priority, the menu is displayed in the state in which a cursor is positioned on a button for selecting the 2D playback mode; when the value of the SPRM(31) indicates that the 3D playback mode has a high priority, the menu is displayed in the state in which the cursor is positioned on a button for selecting the 3D playback mode. Alternatively, when the 3D playback device has a function to manage the accounts of a plurality of users such as a father, a mother, and a child, the 3D playback device may set a value to the SPRM(31) depending on the account of a user who is logged in at the current time.

The value of the SPRM(31) may indicate "which of 2D playback mode and 3D playback mode is to be always set", in addition to "which of 2D playback mode and 3D playback mode is to be prioritized". When the value of the SPRM(31) indicates "2D playback mode is to be always set", the 3D playback device always selects the 2D playback mode irrespectively of the value of the 2D/3D preference flag. In that case, the value of the SPRM(25) is set to indicate the 2D playback mode. When the value of the SPRM(31) indicates "3D playback mode is to be always set", the 3D playback device performs the HDMI authentication without displaying the playback mode selection screen irrespectively of the value of the 2D/3D preference flag. In that case, the value of the SPRM(25) is set to indicate the 3D playback mode (L/R mode or depth mode). In this way, even if the 2D/3D preference flag is set in the 3D video content, it is possible to allow the playback mode having been set by the user in advance to be always prioritized.

(1-K) The playback device 102 may have the user register an interpupillary distance as a reserved SPRM, for example SPRM(32). In this case, the playback device 102 can adjust the offset adjustment value so that the maximum value of the parallax between the left-view and right-view graphics images does not exceed the value registered in the SPRM(32). Specifically, it suffices for the playback device 102 to perform the following calculations for each offset value output by the system target decoder. The playback device 102 first seeks the ratio of the value of the SPRM(32) to the width (horizontal length) of the screen of the display device 103 and further seeks the product of this ratio and the number of horizontal pixels of the display device 103. This product represents two times the upper limit of the offset that can be provided to the graphics plane via offset control. Next, the playback device 102 compares this product with the double of each offset value. If the double of any offset value is equal to or greater than this product, the playback device 102 identifies the ID of the offset sequence that includes the offset value and reduces the offset adjustment value for the graphics plane indicated by that ID. The amount of the reduction is set to at least half the difference between the double of the offset value and the above product. The maximum value of the parallax between a left-view and a right-view graphics image thus does not exceed the viewer's interpupillary distance. This can reduce the viewer's risk of suffering visually-induced motion sickness and eye strain.

(1-L) Output Offset Adjustment (1-L-1) Since the alternate-frame sequencing method represents a parallax between left and the right views by the number of pixels in the horizontal direction, the actual size of the parallax depends on the screen size of a display device, namely, the size of a pixel. On the other hand, the sense of depth of 3D video images depends on the actual size of the parallax. Accordingly, in order to avoid the sense of depth of the 3D video images on a screen of any size from impairing powerful impression of the 3D video images and fatiguing viewer's eyes excessively, the parallax between the left and right views needs to be adjusted to be appropriate to the screen size. As one method of the adjustment, the 3D playback device further provides an offset to the final frame data combined by the plane adders. The offset is provided in a manner similar to that in which an offset is provided to a graphics plane in the 1 plane+offset mode. The offset control that is further applied to the final frame data is referred to as "output offset adjustment".

Figure 55:
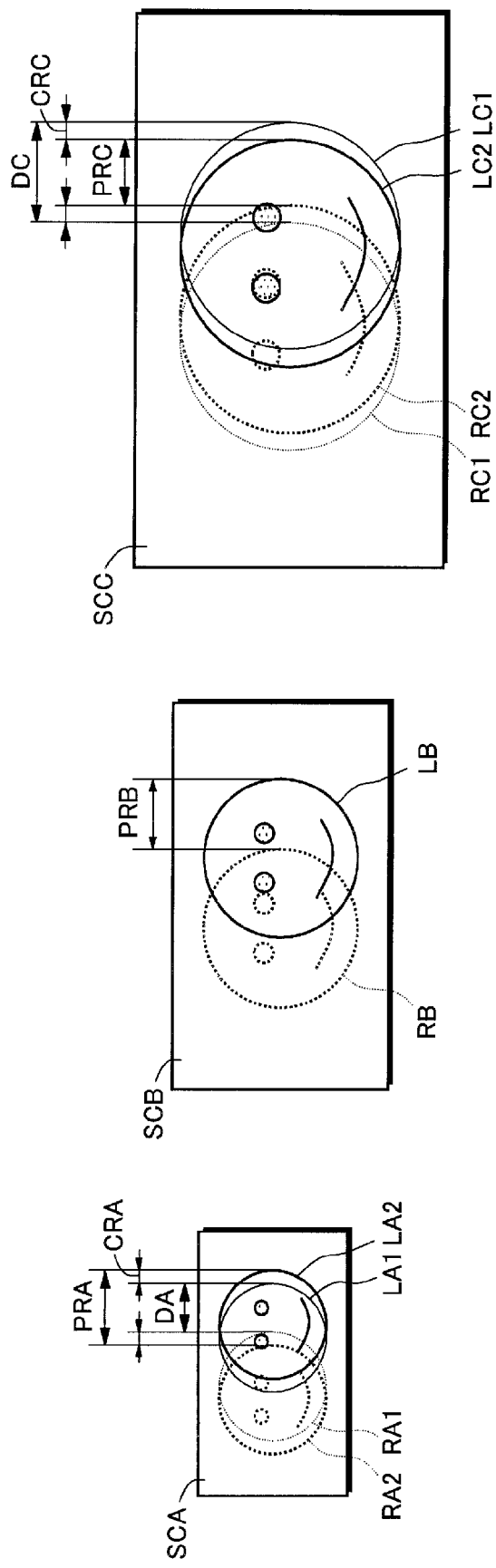
FIGS. 55A-55C are schematic diagrams showing parallaxes PRA, PRB, and PRC between left and right views displayed on a 32-inch screen SCA, 50-inch screen SCB, and 100-inch screen SCC, respectively.

FIGS. 55A-55C are schematic diagrams showing parallaxes PRA, PRB, and PRC between left and right views displayed on a 32-inch screen SCA, 50-inch screen SCB, and 100-inch screen SCC, respectively. The images LA1, LA2, LB, LC1, and LC2 drawn on the figures by solid lines represent left views, and the images RA1, RA2, RB, RC1, and RC2 drawn by dashed lines represent right views. Here, assume that video content specifies parallaxes between left and right views to produce an optimal sense of depth when 3D video images are displayed on a 50-inch screen. As shown in FIG. 55B, the parallax between the left view LB and the right view RB is equal to an optimal value PRB when a 3D video image represented by the video content is displayed on a 50-inch screen SCB.

The parallax DA between the left view LA1 and the right view RA1 drawn by thin lines in FIG. 55A is equal in number of horizontal pixels to the parallax DB between the left view LB and the right view RB drawn in FIG. 55B. On the other hand, a pixel on the 32-inch screen SCA is smaller than a pixel on the 50-inch screen SCB. Accordingly, 3D video images generated by the parallax DA between the left view LA1 and the right view RA1 drawn by the thin lines produce a sense of depth weaker than the optimal one, in general. In that case, the output offset adjustment increases the parallax between the left view and the right view by twice a predetermined adjustment value CRA. The parallax PRA between the left view LA2 and the right view RA2 drawn by thick lines in FIG. 55A indicates a parallax after the output offset adjustment. In this way, when a parallax between left and right views is increased, a sense of depth of 3D video images is enhanced. This prevents the 3D video images from losing powerful impression.

The parallax DC between the left view LC1 and the right view RC1 drawn by thin lines in FIG. 55C is equal in number of horizontal pixels to the parallax PRB between the left view LB and the right view RB drawn in FIG. 55B. On the other hand, a pixel of the 100-inch screen SCC is larger than a pixel of the 50-inch screen SCB. Accordingly, 3D video images generated by the parallax DC between the left view LC1 and the right view RC1 drawn by the thin lines produce a sense of depth stronger than the optimal one, in general. In that case, the output offset adjustment decreases the parallax between the left view and the right view by twice a predetermined adjustment value CRC. The parallax PRC between the left view LC2 and the right view RC2 drawn by thick lines in FIG. 55C indicates the parallax after the output offset adjustment. In this way, when a parallax between left and right views is decreased, a sense of depth of 3D video images is suppressed. This prevents a viewer from suffering eye fatigue.

Figure 56:
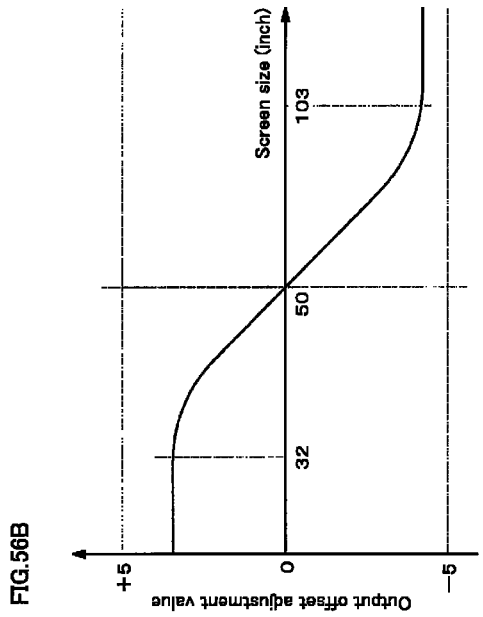
FIG. 56A is a schematic diagram showing a correspondence table between screen sizes and output offset adjustment values.
FIG. 56B is a graph representing a function between screen sizes and output offset adjustment values.

The adjustment values CRA and CRC shown in FIGS. 55A and 55C are referred to as "output offset adjustment values". Video content includes a correspondence table between screen sizes and output offset adjustment values stored in an index file, playlist file, or clip information file. FIG. 56A is a schematic diagram showing the correspondence table. As shown in FIG. 56A, an output offset adjustment value is set for each range of screen size with a width of 10 inches. The magnitude of each output offset adjustment value indicates the number of horizontal pixels, and the sign thereof indicates increase/decrease of the parallax between left and right views. Note that the range of screen size may has a width other than 10 inches. The correspondence table is set according to standards or by a user. Furthermore, two or more types of correspondence tables may be recorded in a 3D playback device in advance, and video content may specify the identifier of a type of the correspondence tables; the type is to be used during playback of the video content.

(1-L-2) A 3D playback device may use a predetermined function to select an output offset adjustment value, instead of the above-described correspondence table. FIG. 56B is a graph representing the function. The horizontal axis of this graph indicates the screen size in inch, and the vertical axis thereof indicates the output offset adjustment value represented by the number of pixels with a sign. The 3D playback device uses the function represented by the graph to calculate an output offset adjustment value from the screen size of a display device. As the graph shows, the output offset adjustment value is a greater positive value when the screen size is smaller than 50 inches, and a greater negative value when the screen size is greater than 50 inches. Note that the output offset adjustment value is maintained at a substantially constant positive value when the screen size is 32 inches or less, and the output offset adjustment value is maintained at a substantially constant negative value when the screen size is 103 inches or more.

(1-L-3) Video content may include an optimal value of screen size that is assumed at the time of authoring (assumed_TV_size_when_authoring), and a 3D playback device may determine an output offset adjustment value based on the optimal value. For example, when the screen size of a display device exceeds the optimal value, the 3D playback device first reduces the frame size of 3D video images to the optimal value. The 3D playback device next superimposes a black border on the edges of each frame, and causes the entirety of the frame and black border to be equal in size the screen of the display device. The 3D playback device further adjusts the output offset adjustment value so that the parallax between the left and right views displayed inside the black border is equal in magnitude to a parallax between the left and right views if they are displayed on the entirety of a screen with a size equal to the optimal value. This enables a sense of depth of the 3D video images to be maintained equal to that assumed at the time of authoring.

Figure 57:
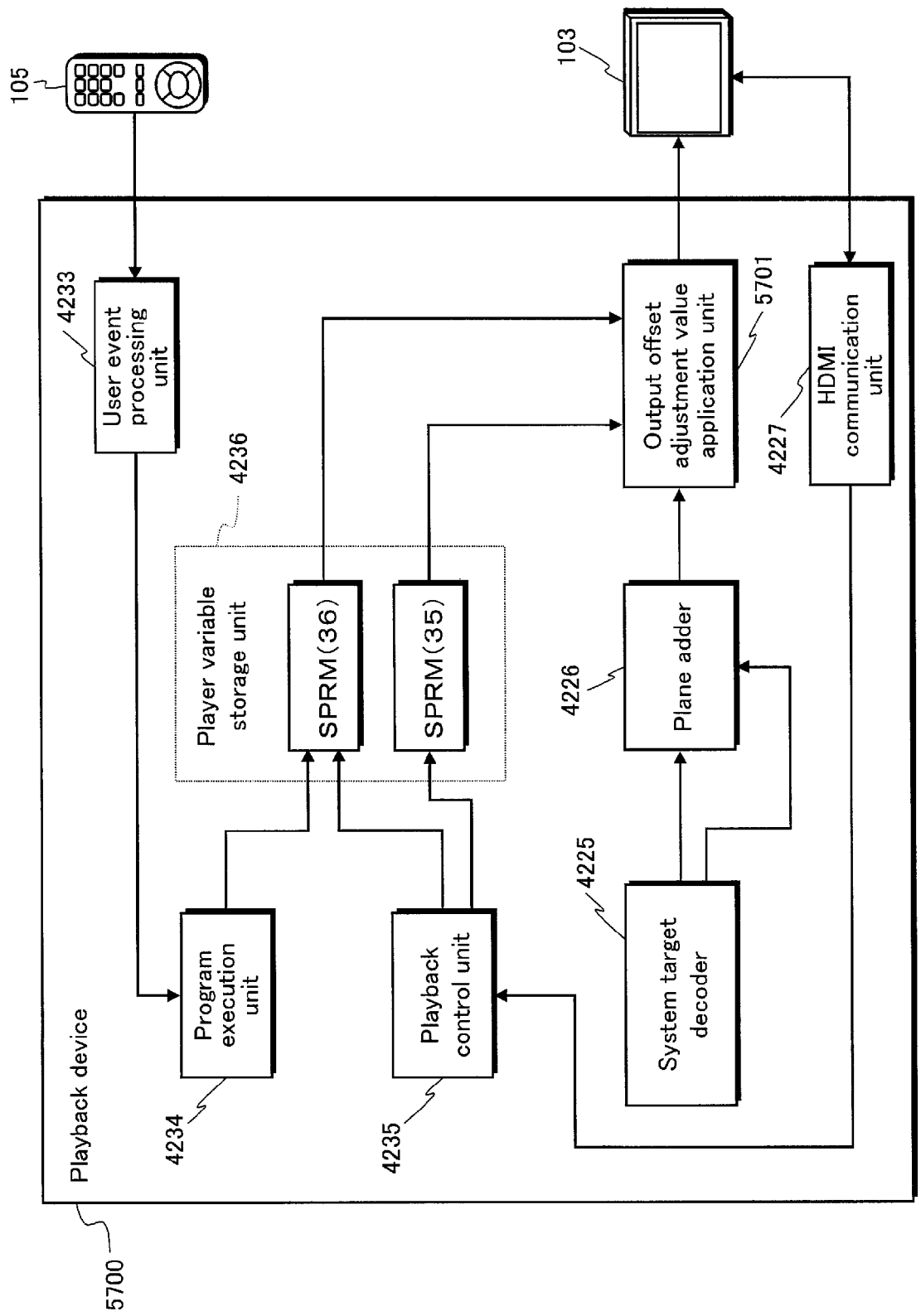
FIG. 57 is a block diagram showing the components of a 3D playback device required for output offset adjustment.

(1-L-4) FIG. 57 is a block diagram showing the components of a 3D playback device required for the output offset adjustment. The 3D playback device 5700 shown in FIG. 57, in contrast to that 4200 shown in FIG. 42, includes an output offset adjustment value application unit 5701. Other components thereof are similar to corresponding ones. In FIG. 57, the components similar to ones shown in FIG. 42 are marked with the same reference numbers. Furthermore, details of the similar components can be found in the description on FIG. 42.

The player variable storage unit 4236 stores output offset adjustment values in the SPRM(36). The output offset adjustment values are based on a screen size obtained by the HDMI communication unit 4237 from the display device 103 through HDMI authentication, and determined by the playback control unit 4235 using the correspondence table or the function shown in FIG. 56A or 56B. Alternatively, an application program such as a BD-J object may automatically set the value of the SPRM(35) or cause a user to set the value by using a GUI.

The output offset adjustment value application unit 5701 uses an output offset adjustment value indicated by the SPRM(35) to provide an offset to each of left-view and right-view frame data combined by the plane adders 4226. The output offset adjustment of the frame data by the output offset adjustment value application unit 5701 is similar to the offset control over the PG plane data GP by the second cropping unit 4732 shown in FIG. 49.

(1-L-5) The screen size of the display device 103 may be stored in the SPRM(35) instead of output offset adjustment values. In that case, the output offset adjustment value application unit 5701 retrieves an output offset adjustment value associated with the screen size indicated by the SPRM(35) from the correspondence table shown in FIG. 56A.

(1-L-6) The player variable storage unit 4236 may further store an output offset adjustment value alpha into the SPRM (36). The output offset adjustment value alpha represents a positive numeric value. The output offset adjustment value application unit 5701 uses the product of an output offset adjustment value indicated by the SPRM(35) and an output offset adjustment value alpha indicated by the SPRM(36) as an actual output offset adjustment value. This enables depths of 3D video images adjusted by the output offset adjustment to depend on not only screen sizes but also the ages of viewers. For example, when the viewers include a child with a smaller interpupillary distance than an adult, the output offset adjustment for small screen size sets the output offset adjustment value alpha to a value smaller than "1," and the output offset adjustment for large screen size sets it to a value greater than "1." This weakens a sense of depth of 3D video images regardless of the screen size.

The program execution unit 4234 or the playback control unit 4235 may use a GUI or an OSD to cause a user to set an output offset adjustment value alpha. In that case, acceptable levels of the output offset adjustment value alpha may be represented by, for example, the following three levels: "the sense of depth of 3D video images is strong", "normal", and "weak". Alternatively, an output offset adjustment value alpha may be stored in supplementary data in a video stream, a descriptor in a PMT, or a PI in a playlist file included in video content. With this structure, the output offset adjustment value alpha can vary with scenes represented by the video stream. In particular, the output offset adjustment value alpha can be set to be reduced in a scene producing a strong sense of depth.

(1-L-7) Output offset adjustment values may be changed depending on a distance between a viewer and a screen, instead of the screen size. Furthermore, output offset adjustment values alpha may depend on the distance. In that case, for example, a distance sensor is mounted on the shutter glasses 104 shown in FIG. 1 and used to measure a distance between the display device 103 and the screen 131. The distance is transmitted from the shutter glasses 104 to the display device 103 at any time, and further transmitted from the display device 103 to the playback device 102 via the HDMI cable 122. The playback device 102 uses the distance to select an output offset adjustment value or an output offset adjustment value alpha.

(1-L-8) When the display device 103 is a projector, images are enlarged by lenses and projected onto a screen. Accordingly, the size of a display area on the screen changes depending on the distance between the projector and the screen. In that case, the projector determines the size of the display area by, for example, either of the following two methods. The first method first measures the distance between the projector and the screen, and then calculates the size of the display area based on the relationship between the distance and the characteristics of the optical system of the projector, especially the spread angle of projection light. Here, a distance sensor mounted on the projector is used to measure the distance. For example, the distance sensor first emits infrared laser light and the like to the screen, and then detects reflection light from the screen. At the same time, the distance sensor also measures the length of the time elapsing from the emission of the laser light until the detection of the reflection light. The distance sensor then calculates the distance between the projector and the screen from the elapsed time. The second method causes the projector to operate as follows: the projector first projects a reference graphic object such as a line segment onto the screen, and next uses an OSD or the like to urge a viewer to measure and enter the size of the reference graphic object on the screen. The projector then calculates the size of the display area from the size of the reference graphic object entered by the viewer.

(1-M) In some video content, such as content for displaying song lyrics during karaoke, graphics image of subtitles or the like are repeatedly displayed as still images, and only the graphics images are frequently updated. When such content is formed into 3D video content, the VAU in which the offset metadata is placed further includes a sequence end code. When the playback device 102 decodes this VAU, it stores the offset information obtained from the offset metadata and does not change the offset information until a VAU that includes new offset metadata is decoded.

Figure 58A:
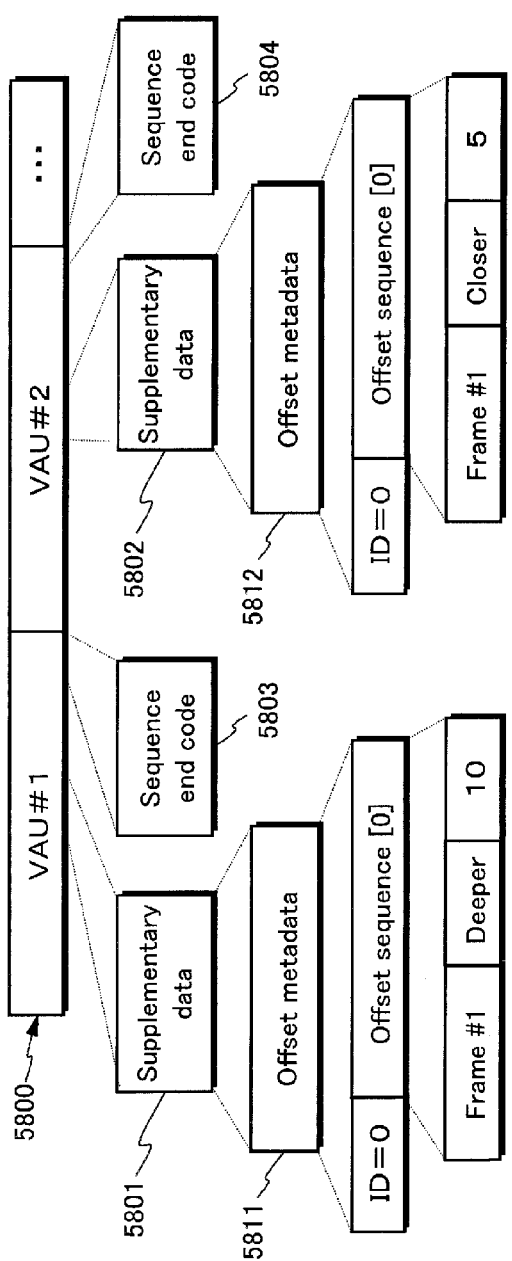
FIG. 58A is a schematic diagram showing a data structure of a dependent-view video stream 5800 representing only still images.

FIG. 58A is a schematic diagram showing a data structure of a dependent-view video stream 5800 representing only still images. Each VAU in the dependent-view video stream 5800 represents one still image. In this case, a sequence end code 5803, 5804 is placed at the end of each VAU. Meanwhile, offset metadata 5811, 5812 is placed in the supplementary data 5801, 5802 of each VAU. The offset metadata 5811 in VAU #1 includes an offset sequence [0] with an offset sequence ID=0. This offset sequence [0] includes only offset information on frame #1. Similarly, in the offset metadata 5812 of VAU #2, the offset sequence [0] includes only offset information on frame #1.

Figure 58B:
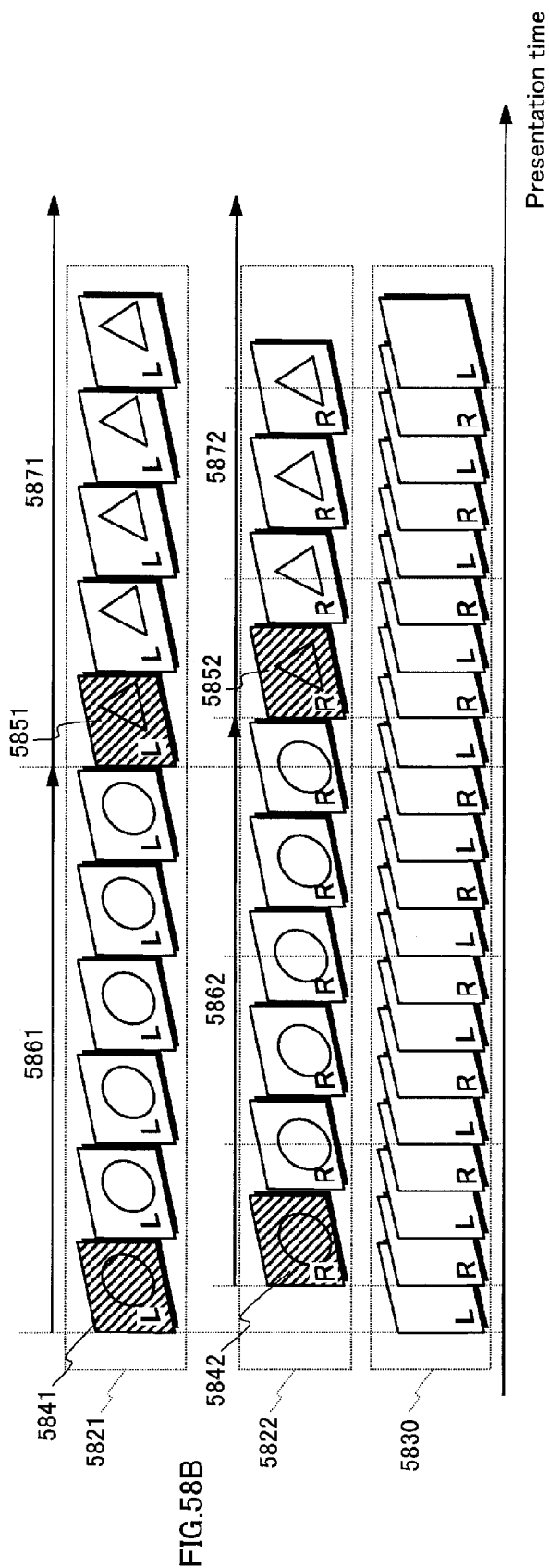
FIG. 58B is a schematic diagram showing a left-view video plane sequence 5821, a right-view video plane sequence 5822, and a graphics plane sequence 5830 that are played back in accordance with such a 3D playlist.

It is assumed here that the 3D playlist file specifies the following two items: (1) The still images represented by the VAUs in the dependent-view video stream 5800 switch at 10 second intervals, and (2) Graphics images represented by the graphics stream are overlapped on each still image. FIG. 58B is a schematic diagram showing a left-view video plane sequence 5821, a right-view video plane sequence 5822, and a graphics plane sequence 5830 that are played back in accordance with such a 3D playlist file. In FIG. 58B, the video planes at the time when the still image is switched are shown with hatching. In the left-view video plane sequence 5821, the still image indicated by the first video plane 5841 is repeatedly played back for the first 10 second interval 5861, and the still image indicated by the next video plane 5851 is repeatedly played back for the next 10 second interval 5871. In the right-view video plane sequence 5822, the still image indicated by the first video plane 5842 is repeatedly played back for the first 10 second interval 5862, and the still image indicated by the next video plane 5852 is repeatedly played back for the next 10 second interval 5872.

When the playback device 102 decodes VAU #1 in the dependent-view video stream 5800, it reads offset information for frame #1 from the offset metadata 5811. Furthermore, the playback device 102 detects the sequence end code 5803. At this point, the playback device 102 stores the offset information for frame #1. In this way, during the first 10 second interval 5861, the offset provided to the graphics plane sequence 5830 is maintained constant in accordance with the stored offset information. In other words, the depth of the graphics images is maintained constant.

Once 10 seconds have passed after decoding of VAU #1, the playback device 102 decodes VAU #2, and reads new offset information for frame #1 from the offset metadata

5812. Furthermore, the playback device 102 detects the sequence end code 5804. At this point, the playback device 102 stores the offset information for frame #1. In this way, during the next 10 second interval 5871, the offset provided to the graphics plane sequence 5830 is changed and maintained constant in accordance with the newly stored offset information. In other words, the graphics images are maintained constant at a new depth.

When a VAU includes a sequence end code, the playback device 102 is thus caused to store existing offset information as is. Accordingly, even when a video stream is composed only of still images, the playback device 102 can reliably maintain offset control for the graphics plane.

(1-N) Compensation of misalignment between left view and right view

There are cases in which a "misalignment" occurs between a left view and a right view. The playback device 102 or the display device 103 according to Embodiment 1 of the present invention compensates the misalignment by using the means described below. This prevents the risk that the misalignment may cause viewers to feel uncomfortable.

Figure 59:
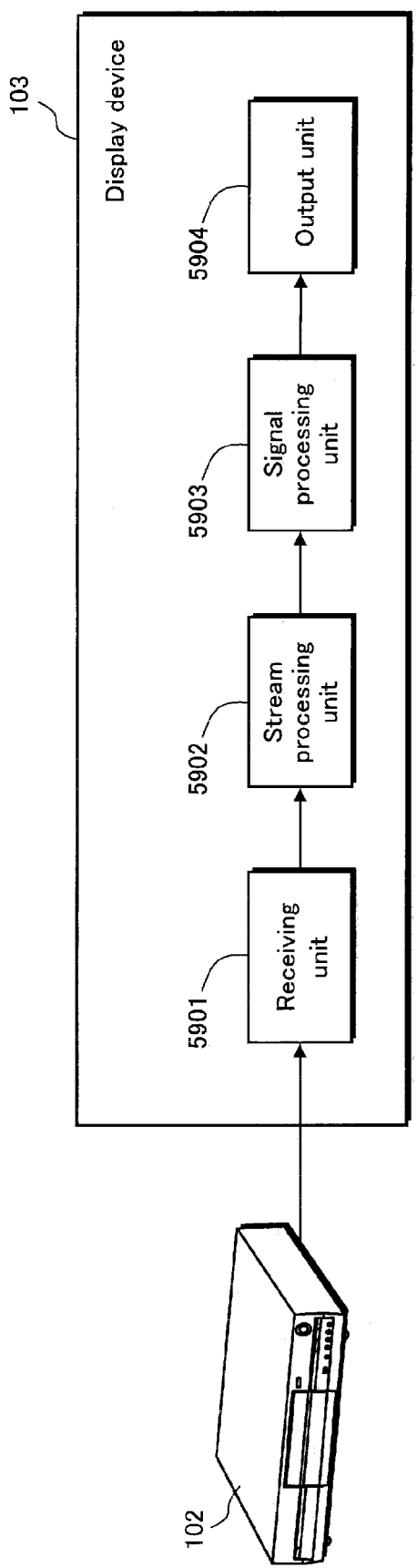
FIG. 59 is a block diagram of the display device 103 that performs the processing for compensating a misalignment between left and right views.

The playback device 102 uses the function units shown in FIG. 42 to compensate the aforementioned misalignment. Alternatively, the display device 103 may perform the compensation processing. FIG. 59 is a block diagram of the display device 103 that performs the compensation processing. As shown in FIG. 59, the display device 103 includes a receiving unit 5901, a stream processing unit 5902, a signal processing unit 5903, and an output unit 5904. The receiving unit 5901 receives multiplexed stream data from various mediums such as a BD-ROM disc, semiconductor memory device, external network, and broadcast wave, as well as from the playback device 102, and passes the received multiplexed stream data to the stream processing unit 5902. The stream processing unit 5902 separates various types of data such as video, audio, and graphics from the multiplexed stream data, and passes the various types of data to the signal processing unit 5903. The signal processing unit 5903 decodes each of the various types of data, and passes the results thereof to the output unit 5904. The output unit 5904 converts each of the decoded data into a predetermined format, and outputs the results thereof. The output of the output unit 5904 is video/audio itself. Alternatively, the output may be a video/audio signal in the HDMI format. Except for mechanical parts such as the disc drive, display panel, and speaker, the elements 5901, 5902, 5903, and 5904 shown in FIG. 59 are implemented on one or more integrated circuits.

(1-N-1) Horizontal Misalignment Between Left View and Right View

Figure 60C:
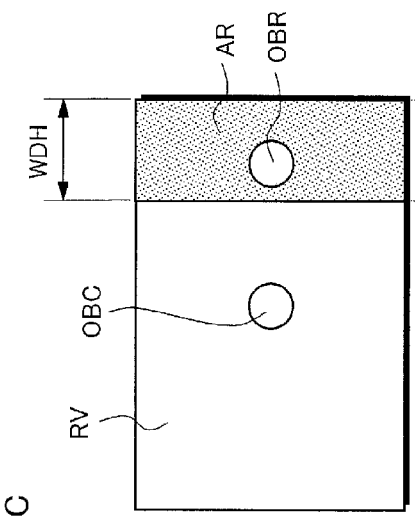
FIGS. 60B and 60C are schematic diagrams showing a left view LV filmed by the left-video camera CML and a right view RV captured by the right-video camera CMR, respectively.
Figure 60E:
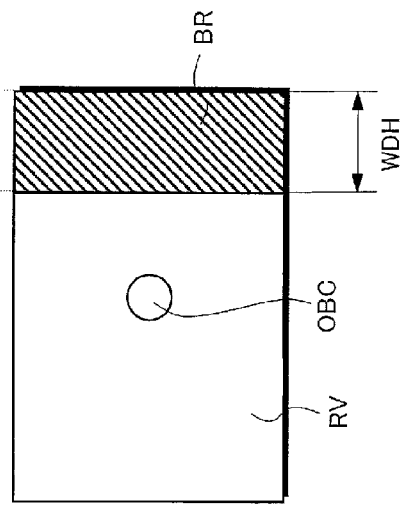
FIGS. 60D and 60E are schematic diagrams respectively showing a left view LV represented by the processed left-video plane and a right view RV represented by the processed right-video plane.
Figure 60B:
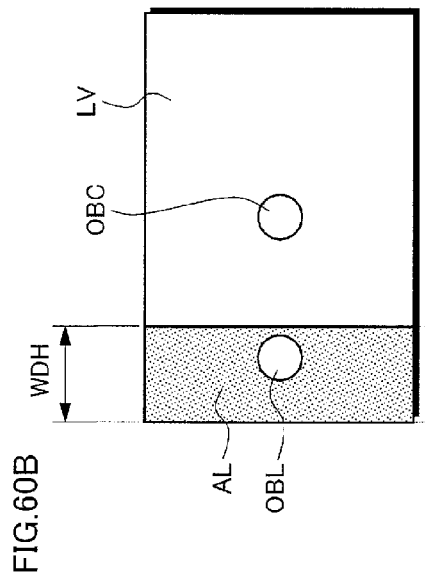
Figure 60D:
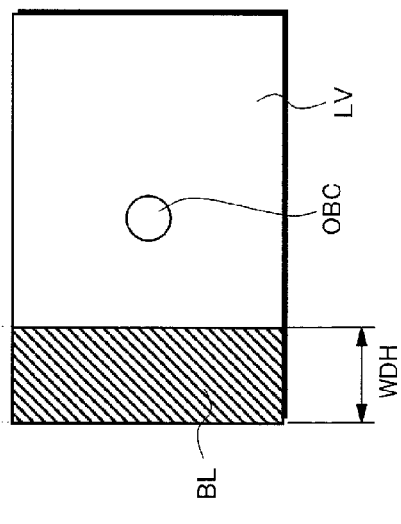
Figure 60A:
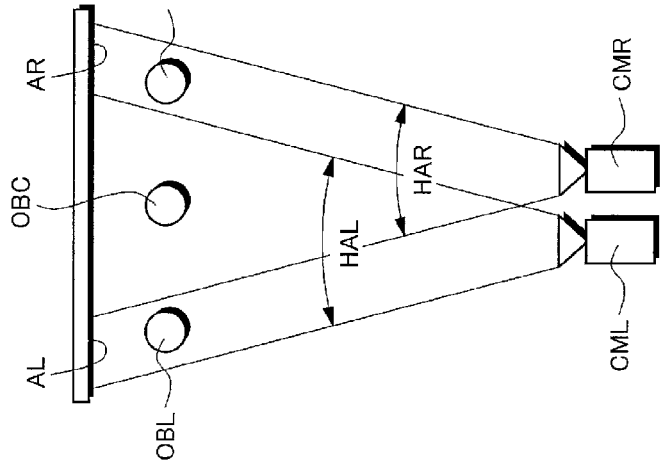
FIG. 60A is a plan view schematically showing horizontal angles of view HAL and HAR for a pair of video cameras CML and CMR filming 3D video images.

FIG. 60A is a plan view schematically showing horizontal angles of view HAL and HAR for a pair of video cameras CML and CMR filming 3D video images. As shown in FIG. 60A, the pair of video cameras CML and CMR are placed side by side in the horizontal direction. The left-video camera CML films the left view, and the right-video camera CMR films the right view. The horizontal angles of view HAL and HAR of the video cameras CML and CMR are the same size but differ in location. This yields a strip AL that is only included in the horizontal angle of view HAL of the left-video camera CML and a strip AR that is only included in the horizontal angle of view HAR of the right-video camera CMR. The object OBC located in the section common to both horizontal angles of view HAL and HAR is captured by both video cameras CML and CMR. However, the object OBL located in strip AL, which is included only in the horizontal angle of view HAL of the left-video camera CML, is only captured by the left-video camera CML, and the object OBR located in strip AR, which is included only in the horizontal angle of view HAR of the right-video camera CMR, is only captured by the right-video camera CMR.

FIG. 60B is a schematic diagram showing a left view LV filmed by the left-video camera CML, and FIG. 60C is a schematic diagram showing a right view RV captured by the right-video camera CMR. As shown in FIGS. 60B and 60C, the strip AL, which is included only in the horizontal angle of view HAL of the left-video camera CML, appears as a strip along the left edge of the left view LV. However, this strip AL is not included in the right view RV. On the other hand, the strip AR, which is included only in the horizontal angle of view HAR of the right-video camera CMR, appears as a strip along the right edge of the right view RV. However, this strip AR is not included in the left view LV. Accordingly, among the three objects OBL, OBC, and OBR shown in FIG. 60A, the object on the right OBR is not included in the left view LV, and the object on the left OBL is not included in the right view RV. As a result, the object on the left OBL is only visible to the viewer's left eye, and the object on the right OBR is only visible to the right eye. The left view LV and right view RV thus run the risk of causing the viewer to feel uncomfortable.

On the BD-ROM disc 101, information indicating the width WDH of the above strips AL and AR included in each frame of the left view LV and right view RV is stored in the dependent-view video stream. This information is stored in the supplementary data of the VAU at the top of each video sequence. Note however that this supplementary data is different from the supplementary data including the offset metadata 1110 shown in FIG. 11. On the other hand, in the playback device 102, the system target decoder 4225 reads information showing the width WDH of the above strips AL and AR from the dependent-view video stream. Furthermore, the system target decoder 4225 transmits this information to the parallax video generation unit 4710 in the plane adder 4226 or the output unit 5904 in the display device 103. When the receiving unit 5901 in the display device 103 directly reads a 3D video content from an information medium such as a BD-ROM disc, the above-mentioned information is read from the dependent-view video stream and transmitted to the output unit 5904 by the signal processing unit 5903 in the display device 103. The parallax video generation unit 4710 or the output unit 5904 (hereinafter, referred to as "parallax video generation unit 4710 etc.") refers to this information to process the left-video plane and the right-video plane, uniformly painting the strips AL and AR a background color or black. In other words, the pixel data included in the strips AL and AR is uniformly overwritten with data that represents a background color or black.

FIGS. 60D and 60E are schematic diagrams respectively showing a left view LV represented by the processed left-video plane and a right view RV represented by the processed right-video plane. As shown in FIG. 60D, the strip AL, which is included only in the horizontal angle of view HAL of the left-video camera CML, is hidden by a black strip BL of width WDH. On the other hand, as shown in FIG. 60E, the strip AR, which is included only in the horizontal angle of view HAR of the right-video camera CMR, is hidden by a black strip BR of width WDH. As a result, both of the viewer's eyes see only the area shared by the left view LV and the right view RV, which avoids the risk of causing the viewer to feel uncomfortable.

Furthermore, the parallax video generation unit 4710 etc. may perform cropping similar to that shown in FIG. 47 to remove pixel data included in the outer half of the strips AL and AR respectively located in the left-video plane and right-video plane. In this case, the parallax video generation unit 4710 etc. uniformly paints the remaining half of the strips AL and AR a background color or black and, in addition, adds a background-color or black strip of half the width of the strips AL and AR to the opposite side. In this way, both of the viewer's eyes see the area shared by the left view LV and the right view RV in the center of the screen, with background color or black strips at both edges of the screen. This avoids the risk of causing the viewer to feel uncomfortable.

Alternatively, the parallax video generation unit 4710 etc. may process the left-video plane and right-video plane as follows. First, via cropping similar to that shown in FIG. 49, the parallax video generation unit 4710 etc. removes the pixel data in the strips AL and AR from each of the video planes. Next, the parallax video generation unit 4710 etc. resizes each video plane from the pixel data in the remaining area via scaling. The video image shown by the remaining area is thus expanded to fill the entire frame. As a result, both of the viewer's eyes see only the area shared by the left view LV and the right view RV, which avoids the risk of causing the viewer to feel uncomfortable.

(1-N-2) Vertical Misalignment Between Left View and Right View

Figure 61B:
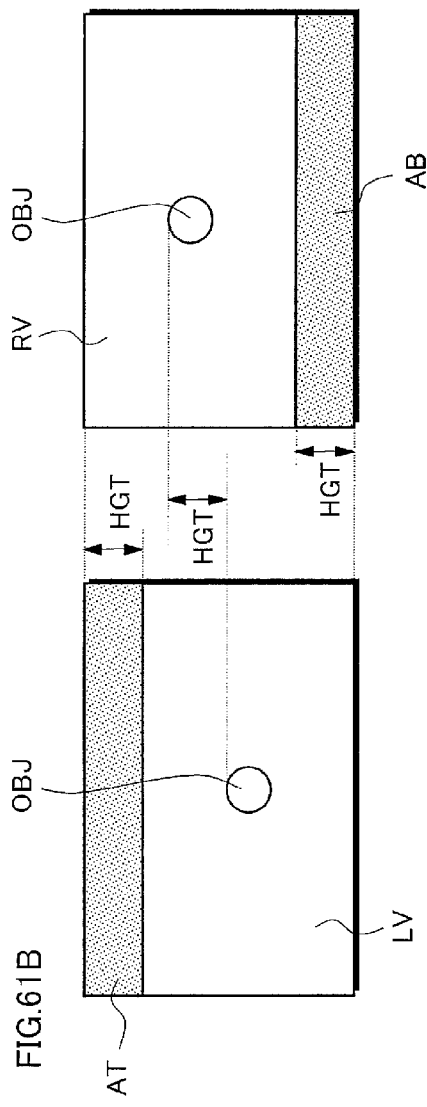
FIG. 61B is a schematic diagram showing a left view LV filmed by the left-video camera CML and a right view RV captured by the right-video camera CMR.
Figure 61C:
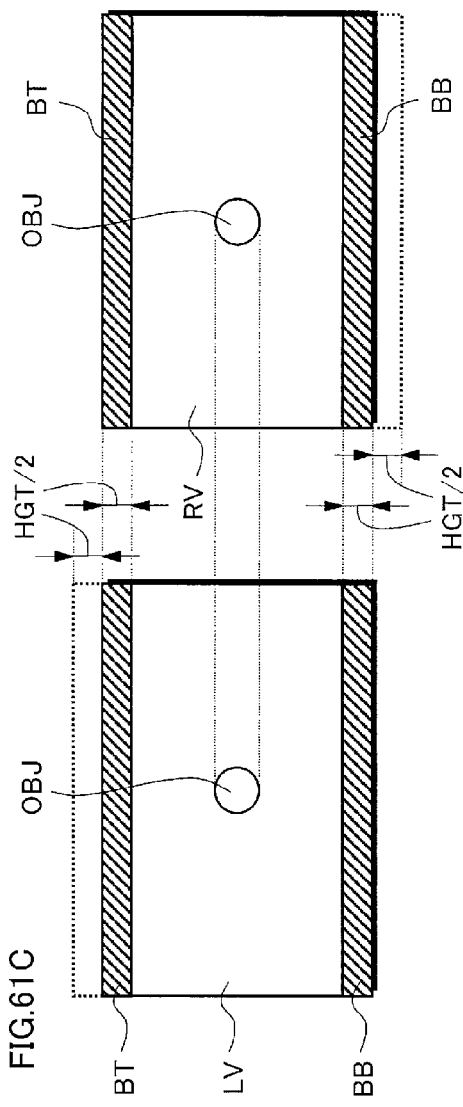
FIG. 61C is a schematic diagram showing a left view LV represented by the processed left-video plane and a right view RV represented by the processed right-video plane.
Figure 61A:
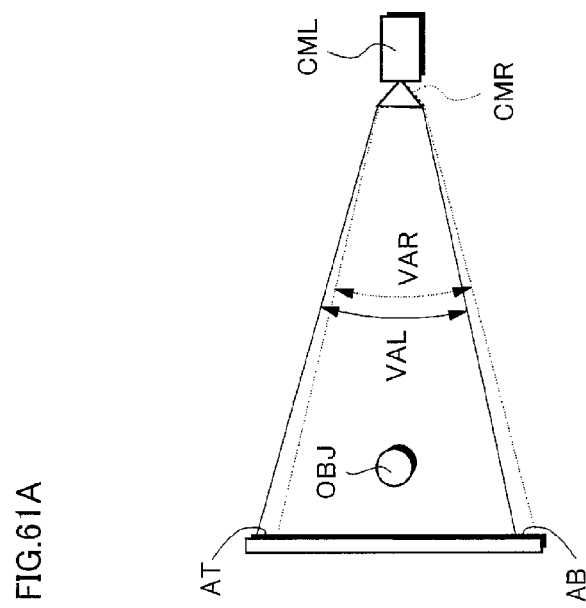
FIG. 61A is a plan view schematically showing vertical angles of view VAL and VAR for a pair of video cameras CML and CMR filming 3D video images.

FIG. 61A is a plan view schematically showing vertical angles of view VAL and VAR for a pair of video cameras CML and CMR filming 3D video images. As shown in FIG. 61A, the vertical angles of view VAL and VAR for the video cameras CML and CMR are the same size but differ in location. This yields a strip AT that is only included in the vertical angle of view VAL of the left-video camera CML and a strip AB that is only included in the vertical angle of view VAR of the right-video camera CMR. The object OBJ located in the section common to both vertical angles of view VAL and VAR is captured by both video cameras CML and CMR. However, objects located in strip AT, which is included only in the vertical angle of view VAL of the left-video camera CML, are only captured by the left-video camera CML, and objects located in strip AB, which is included only in the vertical angle of view VAR of the right-video camera CMR, are only captured by the right-video camera CMR.

FIG. 61B is a schematic diagram showing a left view LV filmed by the left-video camera CML and a right view RV filmed by the right-video camera CMR. As shown in FIG. 61B, the strip AT, which is included only in the vertical angle of view VAL of the left-video camera CML, appears as a strip along the top of the left view LV. However, this strip AT is not included in the right view RV. On the other hand, the strip AB, which is included only in the vertical angle of view VAR of the right-video camera CMR, appears as a strip along the bottom edge of the right view RV. However, this strip AB is not included in the left view LV. Note that the positions of the strips AT and AB may be reversed between the left view LV and right view RV. In this way, when the left view LV and right view RV differ with regards to inclusion of the strips AT and AB, the vertical position of the object OBJ shown in FIG. 61A differs between the left view LV and the right view RV by the height HGT of the strips AT and AB. As a result, the vertical position of the object OBJ differs as seen by the viewer's left eye and right eye, which has the risk of causing the viewer to feel uncomfortable.

On the BD-ROM disc 101, information indicating the height HGT of the above strips AT and AB included in each frame of the left view LV and right view RV is stored in the dependent-view video stream. This information is stored in the supplementary data of the VAU at the top of each video sequence. Note however that this supplementary data is different from the supplementary data including the offset metadata 1110 shown in FIG. 11. On the other hand, in the playback device 102, the system target decoder 4225 reads the information indicating the height HGT of the above strips AT and AB from the dependent-view video stream. Furthermore, the system target decoder 4225 transmits this information to the parallax video generation unit 4710 in the plane adder 4226 or the output unit 5904 in the display device 103. When the receiving unit 5901 in the display device 103 directly reads a 3D video content from an information medium such as a BD-ROM disc, the above-mentioned information is read from the dependent-view video stream and transmitted to the output unit 5904 by the signal processing unit 5903 in the display device 103.

The parallax video generation unit 4710 or the output unit 5904 (hereinafter, referred to as "parallax video generation unit 4710 etc.") refers to the height HGT of the strips AT and AB to process the left-video plane and the right-video plane as follows. First, the parallax video generation unit 4710 etc. shifts the position of the pixel data in the left-video plane up by half the height HGT, i.e. HGT/2, and shifts the position of the pixel data in the right-video plane down by HGT/2. The vertical center of the video image shown in the area of the video planes other than the strips AT and AB thus matches the vertical center of the screen. In the left-video plane, half of the strip AT is removed from the top, yielding an empty strip with a height of HDT/2 at the bottom. In the right-video plane, half of the strip AB is removed from the bottom, yielding an empty strip with a height of HDT/2 at the top. Next, the parallax video generation unit 4710 etc uniformly paints the strips a background color or black. In other words, the pixel data included in the strips is uniformly overwritten with data that represents a background color or black.

FIG. 61C is a schematic diagram showing a left view LV represented by the processed left-video plane and a right view RV represented by the processed right-video plane. As shown in FIG. 61C, the vertical centers of the left view LV and the right view RV match. Accordingly, the vertical position of the object OBJ shown in FIG. 61A is the same in the left view LV and the right view RV. At the top of the left view LV, the strip AT, which is included only in the vertical angle of view VAL of the left-video camera CML, is hidden by a black strip BT of height HGT/2, and at the bottom of the right view RV, the strip AB, which is included only in the vertical angle of view VAR of the right-video camera CMR, is hidden by a black strip BB of height HGT/2. Furthermore, a black strip BB of height HGT/2 is added to the bottom of the left view LV, and a black strip BT of height HGT/2 is added to the top of the right view RV. As a result, both of the viewer's eyes see only the area shared by the left view LV and the right view RV, and the vertical positions match between the object seen by each eye. This avoids the risk of causing the viewer to feel uncomfortable.

Alternatively, the parallax video generation unit 4710 etc. may process the left-video plane and right-video plane as follows. First, via cropping similar to that shown in FIG. 49, the plane adder 4126 removes the pixel data in the strips AT and AB from each of the video planes. Next, the parallax video generation unit 4710 etc. resizes each video plane from the pixel data in the remaining area via scaling. The video image shown by the remaining area is thus expanded to fill the entire frame, and as a result, both of the viewer's eyes see only the area shared by the left view LV and the right view RV. Furthermore, the vertical positions match between the object seen by each eye. This avoids the risk of causing the viewer to feel uncomfortable.

(1-N-3) Misalignment of Graphics Images Between Left View and Right View

When a playback device in 1 plane+offset mode provides a large offset to a graphics plane to generate a pair of graphics planes, a region in the right or left edge of one graphics plane may not be included in the right or left edge of the other graphics plane.

FIG. 62A is a schematic diagram showing an example of graphics images represented by a graphics plane GPL. As shown in FIG. 62A, the graphics plane GPL represents three types of graphic elements OB1, OB2, and OB3. In particular, the left edge of the left graphic element OB1 is located at a distance D1 from the left edge of the graphics plane GPL, and the right edge of the right graphic element OB3 is located at a distance D3 from the right edge of the graphics plane GPL. FIGS. 62B and 62C are schematic diagrams respectively showing processes of providing a right and left offset to the graphics plane GPL. As shown in FIG. 62B, a strip AR1 of width OFS equal to the offset value is removed from the right edge of the graphics plane GPL, and a transparent strip AL1 of width OFS is added to the left edge, in a way similar to the cropping process shown in FIG. 49. The horizontal positions of the graphic elements OB1-OB3 are thus shifted to the right from their original positions by a distance OFS equal to the offset value. On the other hand, as shown in FIG. 62B, a strip AL2 of width OFS equal to the offset value is removed from the left edge of the graphics plane GPL, and a transparent strip AR2 of width OFS is added to the right edge. The horizontal positions of the graphic elements OB1-OB3 are thus shifted to the left from their original positions by the distance OFS.

As shown in FIGS. 62B and 62C, the distance OFS, which is equal to the offset value, is larger than the distance D1 between the left edge of the left graphic element OB1 and the left edge of the graphics plane GPL. The distance OFS is also larger than the distance D3 between the right edge of the right graphic element OB3 and the right edge of the graphics plane GPL. Accordingly, a portion MP3 of the right edge of the right graphic element OB3 is missing in the graphics plane GP1 to which a right offset has been provided. Also, a portion MP1 of the left edge of the left graphic element OB1 is missing in the graphics plane GP2 to which a left offset has been provided. However, the missing portion MP1 of the left graphic element OB1 is included in the graphics plane GP1 with the right offset, and the missing portion MP3 of the right graphic element OB3 is included in the graphics plane GP2 with the left offset. As a result, these missing portions MP1 and MP3 are only seen by one of the viewer's eyes, which may make the viewer feel uncomfortable.

In the playback device 102, each of the cropping units 4731-4734 in plane adder 4226 refers to the offset information 4707 to perform offset control on the graphics plane GPL. At this point, each of the cropping units 4731-4734 furthermore removes a strip that has a width equal to the offset value and extends along the left or right edge of the graphics plane GPL. In other words, the pixel data in the strip is overwritten with data representing a transparent color. Alternatively, the output unit 5904 in the display device 103 may receive offset information from the system target decoder 4225 or the signal processing unit 5903 in the display device 103 and refer to the offset information to remove a strip from the left or right edge of the graphics plane GPL FIGS. 62B and 62C show the strips AS1 and AS2 to be removed. In the graphics plane GP1 with the right offset, the strip AS1 to be removed includes the missing portion MP1 of the left graphic element OB1. In the graphics plane GP2 with the left offset, the strip AS2 to be removed includes the missing portion MP3 of the right graphic element OB3.

FIGS. 62D and 62E are schematic diagrams showing graphics images represented by the graphics planes GP1 and GP2 with the right and left offsets, respectively. As shown in FIGS. 62D and 62E, in the graphics planes GP1 and GP2, the shapes of the three types of graphic elements OB1-OB3 match. As a result, only the shared part of the graphics images are visible to each of the viewer's eyes. This avoids the risk of causing the viewer to feel uncomfortable.

Alternatively, the following condition may be prescribed regarding the arrangement of graphic elements for graphics planes played back from a PG stream or an IG stream on a BD-ROM disc and for a graphics plane generated by a playback device 102. FIG. 63 is a schematic diagram showing such a condition. As shown in FIG. 63, xy orthogonal coordinates are established on the graphics plane GPL, with an origin (0, 0) at the upper-left corner. The x and y coordinates are respectively the horizontal and vertical coordinates of the graphics plane GPL. The coordinates of the lower-right corner of the graphics plane GPL are set to (TWD, THG). Using these xy coordinates, the condition is set as follows: in each frame, the graphic elements OB1, OB2, and OB3 must be positioned within the rectangular area having four points (OFS, 0), (TWD-OFS, 0), (TWD-OFS, THG), and (OFS, THG) as vertices. In other words, graphic elements are prohibited from being placed within the strips AL and AR of width OFS which respectively extend along the left edge and right edge of the graphics plane GPL. As is clear from FIGS. 62B and 62C, these strips AL and AR are removed by offset control. Accordingly, if graphic elements are prohibited from being placed within the strips AL and AR, the shapes of the graphic elements do not change even when an offset is provided to the graphics plane GPL. As a result, both of the viewer's eyes see the same graphics images, which avoids the risk of causing the viewer to feel uncomfortable.

(1-O) Letterbox Display

The screen size assumed at the time of authoring of a video content depends on the format of the content: Full-HD format adopted in digital TV broadcasting; or Cinemascope™ format adopted in movies. The aspect ratio of Full-HD is 16:9 ($\approx$1.78:1), while the aspect ratio of cinemascope is 2.35:1. Accordingly, in home movie contents recorded on BD-ROM discs, horizontal black strips are provided above and below each video frame. The black strips are provided so that the whole aspect ratio of the video frame and the black strips is adjusted to 16:9. This display method is referred to as "letterbox display".

FIGS. 64A1 and 64A2 are schematic diagrams showing the same screen in the letterbox display. As shown in FIGS. 64A1 and 64A2, the resolution of the whole screen is 1920×1080 pixels, and the aspect ratio is 16:9. On the other hand, the resolution of a display area DRG for displaying the video images is 1920×818 pixels, and the aspect ratio is 2.35:9. Black strips BT and BB, each 131-pixel high, extend horizontally above and below the display area DRG.

When such a letterbox display is adopted in the display of 3D video images, it is preferable that the subtitle is displayed on either of the black strips BT and BB, not on the display area DRG. This enables the 3D video images and the subtitle to be separated from each other and both to be presented to the viewer in a reliable manner. However, 131 pixels of height of the black strips BT and BB is not necessarily sufficient to display the subtitle. In that case, the plane adders 4226 of the playback device 102 provide the primary video plane with an offset in the vertical direction. This offset control is referred to as "video shift". There are three types of video shifts: "Keep", "Up", and "Down". In the Keep mode, the primary video plane is not provided with the offset in the vertical direction.

Thus as in the video frame shown in FIGS. 64A1 and 64A2, the height of each of black strips BT and BB is kept to be 131 pixels. In the Up mode, the primary video plane is provided with an upward offset. FIG. 64B is a schematic diagram showing the screen in which the primary video plane has been provided with an upward offset of 131 pixels. As shown in FIG. 64B, the black strip BT has been removed from the upper portion and the height of the black strip BB in the lower portion has been doubled. In the Down mode, the primary video plane is provided with a downward offset. FIG. 64C is a schematic diagram showing the screen in which the primary video plane has been provided with a downward offset of 131 pixels. As shown in FIG. 64C, the black strip BB has been removed from the lower portion and the height of the black strip BT in the upper portion has been doubled. In this way, the plane adders 4226 increases either of the black strips BT and BB to a height sufficient to display the subtitle by executing the video shift in the Up or Down mode.

The size of the vertical offset may be other than 131 pixels. FIG. 64D is a schematic diagram showing the screen in which the primary video plane has been provided with an upward offset of 51 pixels. As shown in FIG. 64D, the height of the black strip BT in the upper portion has been decreased to 131−51=80 pixels, and the height of the black strip BB in the lower portion has been increased to 131+51=182 pixels. In the following, it is assumed that the size of the offset is 131 pixels.

FIG. 65 is a functional block diagram showing the structure of the playback device 102 required for the video shift. The structure shown in FIG. 65, in contrast to that shown in FIG. 47, includes a video shift unit 6501, SPRM(32) 6502, and SPRM(33) 6503. The other components are similar. In FIG. 65, the components similar to ones shown in FIG. 47, are marked with the same reference numbers. Furthermore, details of the similar components can be found in the description on FIG. 47.

The values indicated by the SPRM(32) and SPRM(33) are set by the program execution unit 4234 in accordance with an application program such as a BD-J object or a user's instruction via a GUI. The value indicated by the SPRM(33) is further updated in accordance with the playlist file.

FIG. 66A is a table showing the data structures of the SPRM(32) and SPRM(33). As shown in FIG. 66A, the SPRM (32) stores a parameter that indicates the video shift mode (video_shift_mode). The parameter can take any of three values "0", "1", and "2" which correspond to three types of video shift modes. The SPRM(33) stores four pairs of a video upward move shift value and a video downward move shift value. The shift values are composed of: a pair for the PG plane (PG_shift_value_for_Up, PG_shift_value_for_Down); a pair for the IG plane (IG_shift_value_for_Up, IG_shift_value_for_Down); a pair for the secondary video plane (SV_shift_value_for_Up, SV_shift_value_for_Down); and a pair for the image plane (IM_shift_value_for_Up, IM_shift_value_for_Down). Each of the video upward move shift value and the video downward move shift value represents the size of an offset in the vertical direction that is provided to the PG plane or the like when an upward or downward offset is provided to the primary video plane.

FIG. 66B is a schematic diagram showing the STN table in the playlist file for the video content of the letterbox display. As shown in FIG. 66B, in the STN table 6600, an STN 6601 is associated with a stream entry 6602 of the PG stream 1 and stream attribute information 6603. The stream attribute information 6603 includes a video upward move shift value (PG_y_shift_value_for_Up) 6610 and a video downward move shift value (PG_y_shift_value_for_Down) 6611. With this structure, these shift values can be set for each PI. With regard to the other stream data such as the IG stream, each shift value can be set. The playback control unit 4235 reads a shift value from the STN table in each PI, and updates a value indicated by the SPRM(33) with the read shift value.

The video shift unit 6501 receives the left-view plane data 4701 and the right-view plane data 4702 alternately from the switch 4720. Upon each reception thereof, the video shift unit 6501 refers to the SPRM(32) in the player variable storage unit 4236 and provides the primary video plane with a vertical offset in a video shift mode indicated by the value in the SPRM(32). The video shift unit 6501 then transmits the primary video plane to the second adder 4742.

FIGS. 67A-67C are schematic diagrams showing primary video planes VPA, VPB, and VPC processed by the video shift unit 6501 in the Up mode, Keep mode, and Down mode, respectively. When the SPRM(32) indicates the Keep mode, the video shift unit 6501 does not provide the primary video plane with a vertical offset. Thus as shown in FIG. 67B, the height of each of black strips BT and BB in the primary video plane VPB is kept to be 131 pixels. When the SPRM(32) indicates the Up mode, the video shift unit 6501, in a similar manner to the cropping process shown in FIG. 49, first cuts the black strip BT that is 131 pixels high out of the upper portion of the original primary video plane VPB. The video shift unit 6501 then, as shown in FIG. 67A, adds a black strip AB that is 131 pixels high to the lower portion of the primary video plane VPA. This moves the location of the pixel data other than the pixel data included in the cut-out black strip BT upward by 131 pixels. On the other hand, the height of black strips BB+AB is increased to 131×2=262 pixels. When the SPRM(32) indicates the Down mode, the video shift unit 6501 cuts the black strip BB that is 131 pixels high out of the lower portion of the original primary video plane VPB, and as shown in FIG. 67C, adds a black strip AT that is 131 pixels high to the upper portion of the primary video plane VPC. This moves the location of the pixel data other than the pixel data included in the cut-out black strip downward by 131 pixels. On the other hand, the height of black strips BT+AT is increased to 131×2=262 pixels.

Referring again to FIG. 65, each time it receives the PG plane data 4704 from the system target decoder 4225, the second cropping unit 4732 refers to the SPRM(32) 6502 and the SPRM(33) 6503 and provides the PG plane 4704 with a vertical offset in accordance with values stored in the SPRMs. Furthermore, in the 1 plane+offset mode, the second cropping unit 4732 provides the PG plane 4704 with a horizontal offset. The second cropping unit 4732 then transmits the PG plane 4704 to the second adder 4742.

Figure 49:
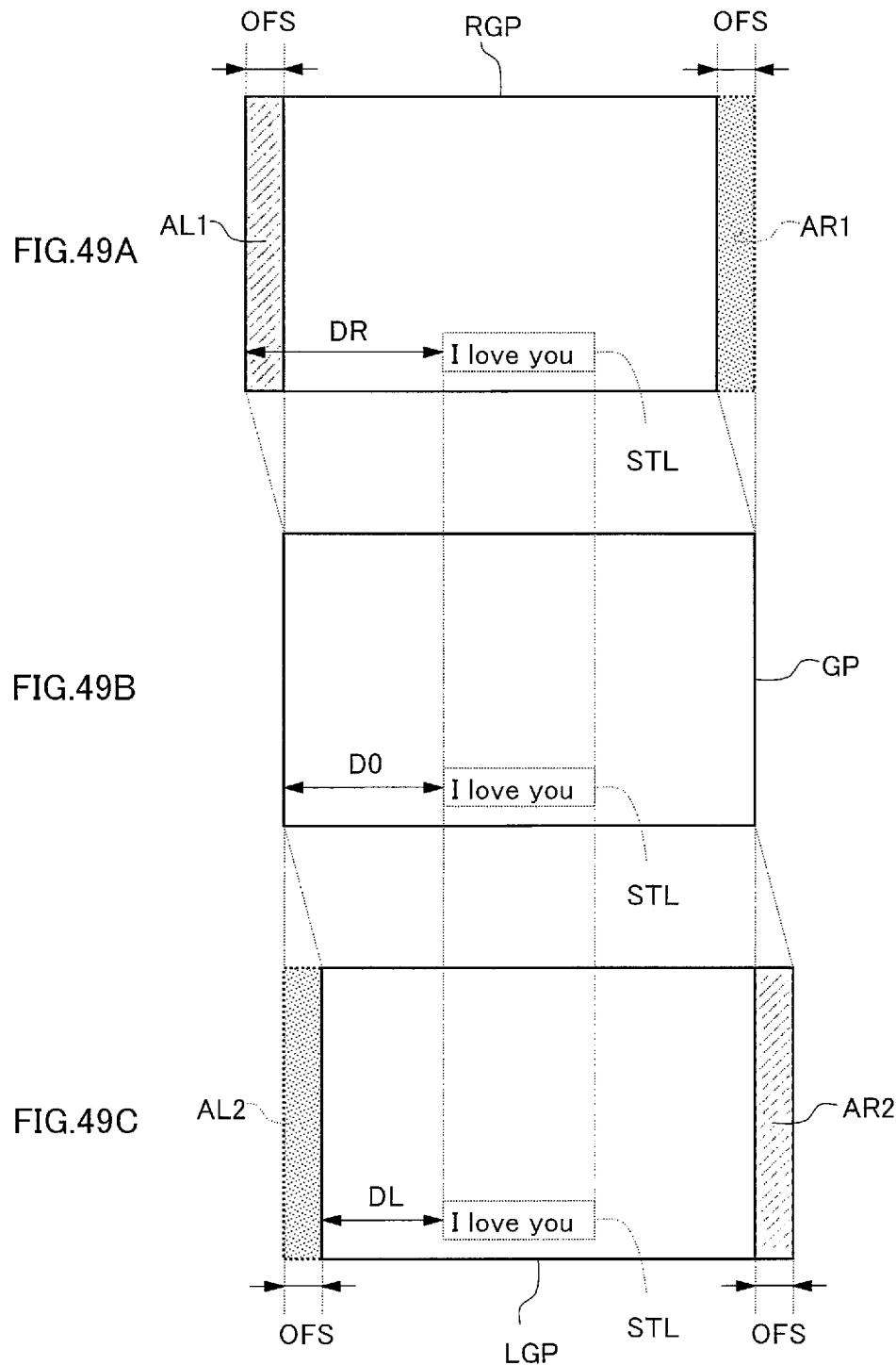
FIG. 49B is a schematic diagram showing PG plane data GP to which the second cropping unit 4732 is to provide offset control.
FIGS. 49A and 49C are a schematic diagrams showing PG plane data RPG to which a right offset has been provided and PG plane data LPG to which a left offset has been provided.

FIGS. 67D-67F are schematic diagrams showing PG planes PGD, PGE, and PGF processed by the second cropping unit 4732 in the Up mode, Keep mode, and Down mode, respectively. When the SPRM(32) indicates the Keep mode, the second cropping unit 4732 does not provide the PG plane PGE with a vertical offset. Thus as shown in FIG. 67E, the subtitle SUB in the PG plane PGE is kept to be at the original position. When the SPRM(32) indicates the Up mode, the second cropping unit 4732 first reads a video upward move shift value (PG_shift_value_for_Up) "a" for the PG plane from the SPRM(33) 6503. The second cropping unit 4732 then, in a similar manner to the cropping process shown in FIG. 49, provides the PG plane PGE with a downward offset which has the same size as the video upward move shift value "a". More specifically, the second cropping unit 4732 first cuts the strip SBE that is "a" pixels high out of the lower portion of the original PG plane PGE. The second cropping unit 4732 then, as shown in FIG. 67D, adds a strip STD that is "a" pixels high to the upper portion of the PG plane PGD. This moves the location of the subtitle SUB downward by "a" pixels. When the SPRM(32) indicates the Down mode, the second cropping unit 4732 first reads a video downward move shift value (PG_shift_value_for_Down) "b" for the PG plane from the SPRM(33) 6503. The second cropping unit 4732 then, in a similar manner to the cropping process shown in FIG. 49, provides the PG plane PGE with an upward offset which has the same size as the video downward move shift value "b". More specifically, the second cropping unit 4732 first cuts the strip STE that is "b" pixels high out of the upper portion of the original PG plane PGE. The second cropping unit 4732 then, as shown in FIG. 67F, adds a strip SBF that is "b" pixels high to the lower portion of the PG plane PGF. This moves the location of the subtitle SUB upward by "b" pixels.

The second adder 4742 receives the PG plane data from the second cropping unit 4732, superimposes the PG plane data on the primary video plane data from the video shift unit 6501 and transmits the result to the third adder 4743. FIGS. 67G-67I are schematic diagrams showing plane data PLG, PLH, and PLI combined by the second adder 4742 in the Up mode, Keep mode, and Down mode, respectively. In the Keep mode, as shown in FIG. 67H, the subtitle SUB is displayed on top of the primary video images MVW. In the Up mode, as shown in FIG. 67G, the subtitle SUB is displayed in the black strip BBG that is located below the primary video images MVW. This can be realized by adjusting the video upward move shift value "a". In the Down mode, as shown in FIG. 67I, the subtitle SUB is displayed in the black strip BTI that is located above the primary video images MVW. This can be realized by adjusting the video downward move shift value "b".

In the letterbox display, a dialog screen represented by the IG plane, video images represented by the secondary video plane, or a pop-up menu represented by the image plane may be displayed in the black strip, as well as the subtitle represented by the PG plane. In those cases, the height of the black strip can be adjusted appropriately by a method similar to the above-described method.

(1-O-1) In the structure shown in FIG. 65, the second cropping unit 4732 reads the video upward/downward move shift value from the SPRM(33) 6503. Alternatively, the second cropping unit 4732 may read the video upward/downward move shift value directly from the playlist file.

(1-O-2) The height of the black strips BT and BB may be other than 131 pixels, and may further be variable. The value thereof may be set in an SPRM in the player variable storage unit 4236 in accordance with an application program or the user.

(1-O-3) In FIGS. 67D and 67F, the second cropping unit 4732 moves the location of almost all pixel data included in the PG plane PGE upward and downward. Alternatively, the PG decoder may change the object display position indicated by the PCS by referring to the SPRM(33) 6503. For example, when the PCS indicates the object display position=(x, y) and the SPRM(33) 6503 indicates the video upward move shift value "a", the PG decoder changes the object display position to coordinates (x, y+a). With this operation, like the subtitle SUB shown in FIG. 67D, the graphics object represented by the PG stream is displayed below the object display position indicated by the PCS. This also applies to the case where the display position of the graphics object is moved upward. Note that the PCS may store the video upward/downward move shift value.

(1-O-4) In the Up mode and Down mode, as shown in FIGS. 67D and 67F, the upper and lower portions of the PG plane are cut out. At this point, in order to prevent the upper and lower portions of the graphics object from being cut out, the area in which the graphics object can be arranged may be limited to a predetermined range. As a specific example, it is assumed that the height×width of the PG plane is HGT×WDH, the video upward move shift value is "a", and the video downward move shift value is "b". In that case, as shown in FIG. 67E, the arrangement of the graphics object is limited to within the following horizontal strip: the x-y coordinates of the upper-left corner PUL=(0, b); and the x-y coordinates of the lower-left corner PDR=(WDH, HGT−a). More accurately, the PG stream satisfies the following conditions: (A) the object display position indicated by the PCS is within the above-described strip; (B) even if the graphics object is displayed at the object display position, the display area does not exceed the range of the above-described strip; (C) the window position indicated by the WDS is within the above-described strip; and (D) even if the window is set at the window position, the range thereof does not exceed the range of the above-described strip. In this way, it is possible to prevent the upper and lower portions of the graphics object from being cut out.

Figures 68A, 68B:
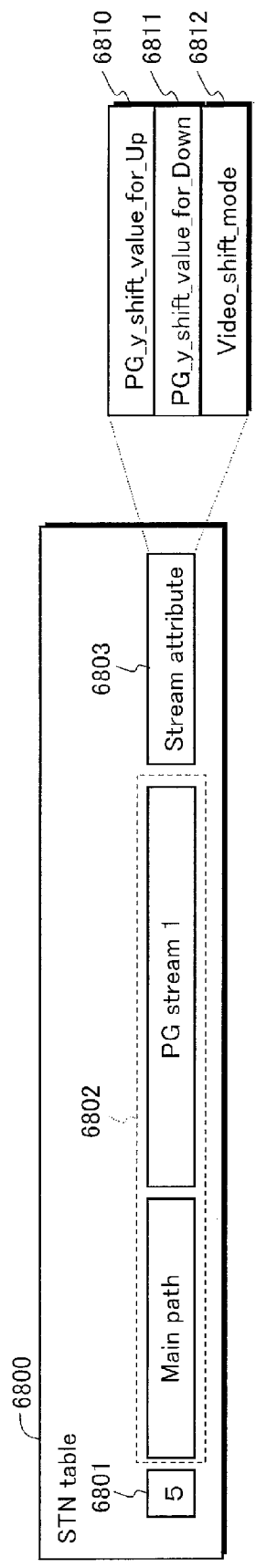
FIG. 68A is a schematic diagram showing another example of the STN table in the playlist file for the video content of the letterbox display.
FIG. 68B is a schematic diagram showing the order of registration of a plurality of pieces of stream attribute information 6803, each including the video shift mode 6812, in the STN table shown in FIG. 68A.

(1-O-5) FIG. 68A is a schematic diagram showing another example of the STN table in the playlist file for the video content of the letterbox display. As shown in FIG. 68A, in the STN table 6800, an STN 6801 is associated with a stream entry 6802 of the PG stream 1 and stream attribute information 6803. The stream attribute information 6803 includes a video shift mode 6812 as well as a video upward/downward move shift value 6810, 6811. In that case, the playback device 102 may use the following structure for the video shift.

Figure 69:
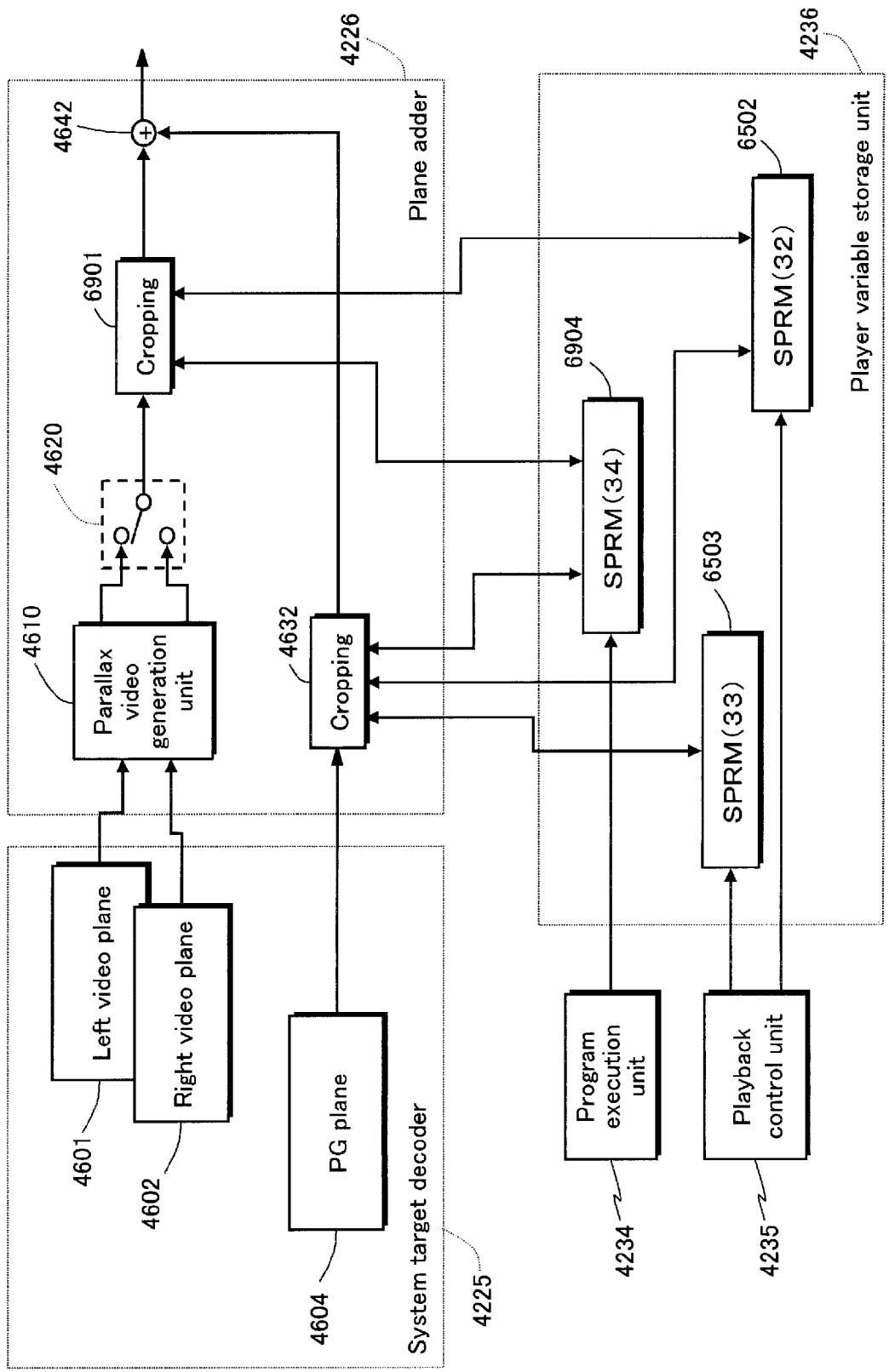
FIG. 69 is a functional block diagram showing another example of the structure of the playback device required for the video shift.

FIG. 69 is a functional block diagram showing another example of the structure of the playback device 102 required for the video shift. The structure shown in FIG. 69 differs from the structure shown in FIG. 65 in the video shift unit 6901 and SPRM(34) 6904. The other components are similar. In FIG. 69, the components similar to ones shown in FIG. 65 are marked with the same reference numbers. Furthermore, details of the similar components can be found in the description on FIG. 65.

As shown in FIG. 66A, the SPRM(32) represents the video shift mode, and the SPRM(33) represents the video upward move shift value and the video downward move shift value. The parameters representing those are updated in accordance with the STN table in the playlist file as shown in FIG. 68A. In the player variable storage unit 4236, the SPRM(34) further stores a flag whose ON/OFF indicates whether the video shift is to be performed. The value of the flag is set by the program execution unit 4234 in accordance with an application program or the user. Each time it receives either the left-video plane data 4701 or the right-video plane data 4702 from the switch 4720, the video shift unit 6901 first refers to the flag in the SPRM(34) to determine whether to perform the video shift. For example, when the value of the flag is "1", the video shift unit 6901 refers to the SPRM(32) and provides the primary video plane with a vertical offset in a video shift mode indicated by the value in the SPRM(32). On the other hand, when the value of the flag is "0", the video shift unit 6901 transmits the primary video plane to the second adder 4742 without performing the video shift. Similarly, each time it receives the PG plane data 4704 from the system target decoder 4225, the second cropping unit 4732 first refers to the SPRM(34) to determine whether to provide the PG plane 4704 with a vertical offset. For example, when the value of the flag is "1", the second cropping unit 4732 refers to the SPRM(32) and SPRM(33) and provides the PG plane 4704 with a vertical offset in accordance with the values therein. On the other hand, when the value of the flag is "0", the second cropping unit 4732 does not provide the PG plane 4704 with a vertical offset.

(1-O-6) When a plurality of pieces of stream attribute information 6803, each including the video shift mode 6812 shown in FIG. 68A, are registered in the STN table, the order of registration is set so that pieces of stream attribute information having the same video shift mode become continuous. FIG. 68B is a schematic diagram showing the order of registration. As shown in FIG. 68B, PIDs of nine PG streams 1-9 are registered in the STN table, in correspondence with stream numbers (STNs) 5-13. The video shift mode of PG streams 1-3 is set to the Keep mode, the video shift mode of PG streams 4 and 5 is set to the Up mode, and the video shift mode of PG streams 6-9 is set to the Down mode. In that case, continuous three STNs=1-3 are assigned to the PG streams 1-3, continuous two STNs=4, 5 are assigned to the PG streams 4, 5, and continuous four STNs=6-9 are assigned to the PG streams 6-9. Each time it receives notification of depression of a subtitle switch button from the remote control 105, the playback device 102 selects a PG stream to be used in the display of subtitle from among PG stream 1-9 in accordance with the registration order indicated in FIG. 68B. Here, since the screen display of both the video images and the subtitle is continued during the selection operation, generally the display positions of the video images and the subtitle change when the subtitle switch button is pressed. However, as shown in FIG. 68B, PG streams of the same video shift mode are continuously registered in the STN table. Thus generally the display positions of the video images and the subtitle change only after the subtitle switch button is pressed a plurality of times. In this way, the frequency of change is suppressed, thereby preventing the selection operation of the PG stream from disrupting the display of the video images and the subtitle.

(1-O-7) When switching between the video shift modes, the playback device 102 may change the display position of the video images and subtitle smoothly by using the visual effects such as the fade-in/out. More preferably, the change of display position of the subtitle is delayed than the change of display position of the video images. This prevents the risk that the change of display position of the video images and subtitle due to a switch between video shift modes may cause viewers to feel uncomfortable.

(1-O-8) In the PDS in the PG stream, "colorless transparent" is assigned to color ID=255, and in the WDS, color ID=255 is assigned to the background color in the window. Accordingly, when the PG stream represents the subtitle, the background color of the subtitle is set to the colorless transparent. FIG. 70B is a schematic diagram showing the video image IMG and subtitle SUB displayed on the screen SCR in that case. As shown in FIG. 70B, in the window WIN1 indicating the display range of the subtitle SUB, the background color is colorless transparent. Accordingly, in the window WIN1, the video image IMG and subtitle SUB are displayed on top of each other.

On the other hand, the playback device 102 may assign an opaque color such as black to color ID=255. FIG. 70A is a schematic diagram showing the data structure of the SPRM (37) in the player variable storage unit 4236. As shown in FIG. 70A, a color coordinate value of the background color of the subtitle is stored in the SPRM(37). The value is preset by the program execution unit 4234 in accordance with an application program or the user. When a color coordinate value is set in the SPRM(37), the PG decoder in the system target decoder 4225 assigns the color coordinate value to color ID=255 irrespectively of the setting indicated by the PDS. FIG. 70C is a schematic diagram showing the video image IMG and subtitle SUB displayed on the screen SCR in that case. Here, the color coordinate value indicated by the SPRM(37) is an opaque color such as black. As shown in FIG. 70C, in the window WIN2 indicating the display range of the subtitle SUB, the background color is the opaque color. Accordingly, in the window WIN2, the video image IMG is hidden by the background color, and only the subtitle SUB is displayed. In this way, it is possible to present the video images and the subtitle to the viewer in a reliable manner.

Figure 71A:
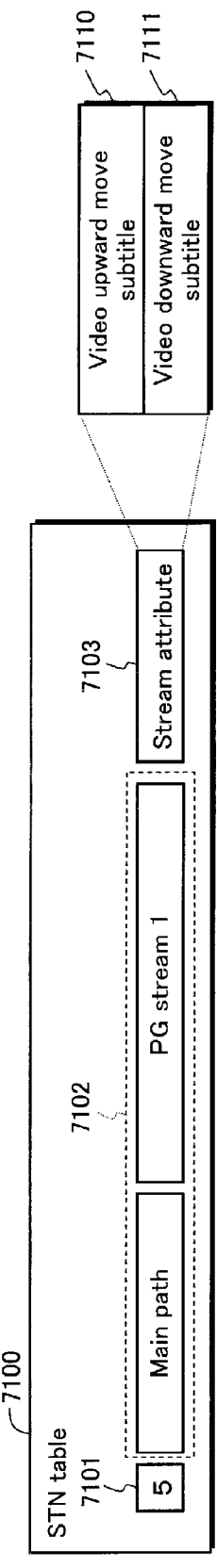
FIG. 71A is a schematic diagram showing a further another example of the STN table in the playlist file for the video content of the letterbox display.

(1-O-9) With a switch between video shift modes, not only the display position of the graphics image represented by the PG stream but the PG stream itself may be changed. FIG. 71A is a schematic diagram showing a further another example of the STN table in the playlist file for the video content of the letterbox display. As shown in FIG. 71A, in the STN table 7100, an STN 7101 is associated with a stream entry 7102 of the PG stream 1 and stream attribute information 7103. The stream attribute information 7103 includes a video upward/downward move shift value 7110, 7111. The video upward move shift value 7110 and the video downward move shift value 7111 indicates PIDs of the PG streams that are to be selected when the Up mode and the Down mode are selected as the video shift mode, respectively. In the PG streams indicated by the video upward move shift value 7110 and the video downward move shift value 7111, initially the display position of the subtitle is set in each black strip of the lower and upper portions of the primary video plane. In that case, the playback device 102 may use the following structure for the video shift.

Figure 71B:
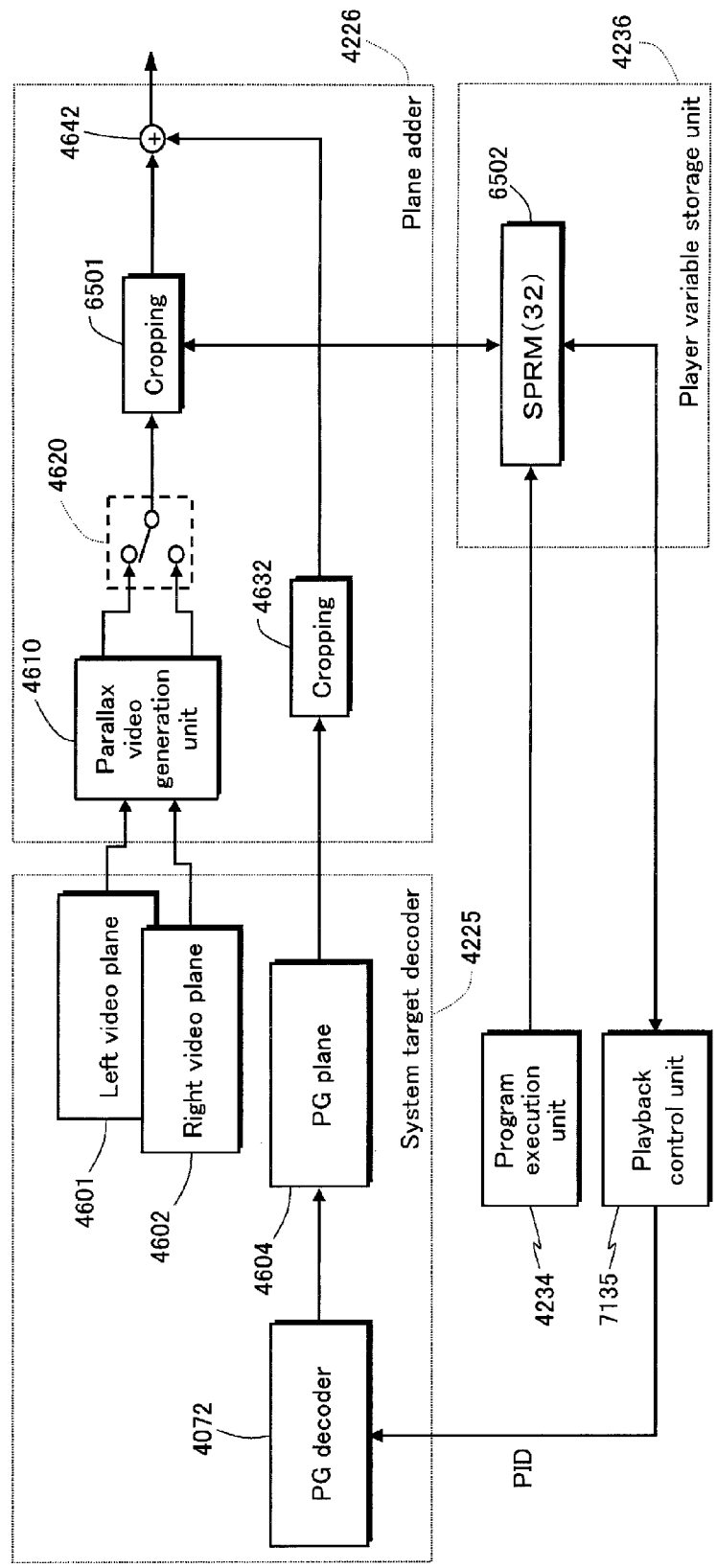
FIG. 71B is a functional block diagram showing a further another example of the structure of the playback device required for the video shift.

FIG. 71B is a functional block diagram showing a further another example of the structure of the playback device 102 required for the video shift. The structure shown in FIG. 71B differs from the structure shown in FIG. 65 in the following points: (A) each time the video shift mode is switched, the playback control unit 7135 specifies the PID of the PG stream to be selected newly to the PG decoder 4072; (B) the second cropping unit 4732 does not provide the PG plane 4704 with a vertical offset; (C) the SPRM(33) and SPRM(34) may not be set in the player variable storage unit 4236. The other components are the same. Thus in FIG. 71B, the components that are also shown in FIG. 65 are assigned the same reference numbers. Furthermore, details on these components can be found in the description of FIG. 65.

The video shift mode indicated by the SPRM(32) 6502 is changed by the program execution unit 4234 in accordance with an application program or the user. Each time it detects a change in the value stored in the SPRM(32) 6502, the playback control unit 7135 refers to the STN table shown in FIG. 71A. By doing so, the playback control unit 7135 retrieves the PID of the PG stream corresponding to the video shift mode after the change, and passes the PID to the PG decoder 4072. More specifically, when the SPRM(32) 6502 indicates the Up mode, the playback control unit 7135 retrieves the PID indicated by the video upward move subtitle 7110; when the SPRM(32) 6502 indicates the Down mode, the playback control unit 7135 retrieves the PID indicated by the video downward move subtitle 7111; and when the SPRM (32) 6502 indicates the Keep mode, the playback control unit 7135 retrieves the PID indicated by the stream entry 7102. As a result, the PG plane 4704 decoded by the PG decoder 4072 represents a subtitle that corresponds to the video shift mode.

FIG. 72A is a schematic diagram showing the subtitles SB1 and SB2 that correspond to the Keep mode. FIG. 72B is a schematic diagram showing the subtitles SB1 and SB2 that correspond to the Down mode. As shown in FIG. 72A, in the Keep mode, a horizontal subtitle SB1 is displayed on top of the lower portion of the video image display area VP1, and a vertical subtitle SB2 is displayed on top of the right-end portion of the video image display area VP1. Furthermore, the black strips BT and BB that are 131 pixels high are displayed in the portions above and below the video image display area VP1, respectively. As shown in FIG. 72B, in the Down mode, the black strip BT2 that is 262 pixels high is displayed in the portion above the video image display area VP2. If the display position of the horizontal subtitle SB1 were moved into the black strip BT2 of the upper portion by providing the PG plane with a vertical offset, the display position of the vertical subtitle SB2 would be moved upward outside the screen to the display position SB20. On the other hand, the PG stream indicated by the video downward move subtitle 7111 represents the horizontal subtitle SBD, and the display position thereof has been set in the black strip BT2 in upper portion in advance. Accordingly, the playback control unit 7135 changes the PG stream that represents the horizontal subtitle SB1 in the Keep mode to the PG stream indicated by the video downward move subtitle 7111 in the Down mode. On the other hand, the playback control unit 7135 uses the PG stream, which represents the vertical subtitle SB2 in the Keep mode, as it is in the Down mode. With this structure, in the Down mode, as shown in FIG. 72B, the horizontal subtitle SBD is displayed in the black strip BT2 in the upper portion, and the vertical subtitle SB2 is displayed, as in the Keep mode, on top of the right-end portion of the video image display area VP1. This also applies to the Up mode.

When the video upward move subtitle 7110, the video downward move subtitle 7111, or the stream entry 7102 is not registered in the STN table, no new PID is specified by the playback control unit 7135, thus the PG decoder 4072 maintains the PID held at this point as it is. In that case, the second cropping unit 4732 may provide the PG plane 4704 with a vertical offset. This offset is the same as the offset provided by the video shift unit 6501 to the primary video planes 4701, 4702. FIG. 72C is a schematic diagram showing the subtitle SB1 displayed in the Keep mode. FIG. 72D is a schematic diagram showing the subtitle SB3 displayed in the Up mode when the video upward subtitle 7110 is not registered in the STN table. As shown in FIG. 72C, in the Keep mode, the subtitle SB1 is displayed on top of the lower portion of the video image display area VP1. Furthermore, the black strips BT and BB that are 131 pixels high are displayed in the portions above and below the video image display area VP1, respectively. As shown in FIG. 72D, in the Up mode, the black strip BB2 that is 262 pixels high is displayed in the portion below the video image display area VP2. If the display position of the horizontal subtitle SB1 were maintained to the position in the Keep mode, the lower portion of the subtitle SB1 would be displayed on top of the black strip BB2. In contrast, when the second cropping unit 4732 provides the PG plane 4704 with a vertical offset, as shown in FIG. 72D, in the Up mode, the subtitle SB3 is displayed in the lower portion of the video image display area VP2 at a position separate from the black strip BB2 in a similar manner to the subtitle SB1 in the Keep mode.

Embodiment 2

The BD-ROM disc according to Embodiment 2 of the present invention also includes a pair of a base view and a dependent view for the PG stream and the IG stream. On the other hand, the playback device according to Embodiment 2 of the present invention is provided with 2 plane mode. "2 plane mode" is one of the display modes for the graphics plane. When a sub-TS includes both a base-view and dependent-view graphics stream, the playback device in 2 plane mode decodes and alternately outputs left-view and right-view graphics plane data from the graphics streams. 3D graphics images can thus be played back from the graphics streams. Apart from these points, the BD-ROM disc and playback device according to Embodiment 2 have the same structure and functions as according to Embodiment 1. Accordingly, the following is a description of the BD-ROM disc and playback device according to Embodiment 2 insofar as these have been changed or expanded as compared to Embodiment 1. Details on the parts of the BD-ROM disc and playback device that are the same as according to Embodiment 1 can be found in the description of Embodiment 1.

<Data Structure of Sub-TS>

FIG. 73A is a list of elementary streams multiplexed in a first sub-TS on a BD-ROM disc 101. The first sub-TS is multiplexed stream data in MPEG-2 TS format and is included in a file DEP for the L/R mode. As shown in FIG. 73A, the first sub-TS includes a primary video stream 7311, left-view PG streams 7312A and 7312B, right-view PG streams 7313A and 7313B, left-view IG stream 7314, right-view IG stream 7315, and secondary video stream 7316. When the primary video stream 301 in the main TS shown in FIG. 3A represents the left view of 3D video images, the primary video stream 7311, which is a right-view video stream, represents the right view of the 3D video images. The pairs of left-view and right-view PG streams 7312A+7313A and 7312B+7313B represent the left view and right view of graphics images, such as subtitles, when these graphics images are displayed as 3D video images. The pair of left-view and right-view IG streams 7314 and 7315 represent the left view and right view of graphics images for an interactive screen when these graphics images are displayed as 3D video images. When the secondary video stream 306 in the main TS represents the left view of 3D video images, the secondary video stream 7316, which is a right-view video stream, represents the right view of the 3D video images.

PIDs are assigned to the elementary streams 7311-7316 as follows, for example. A PID of 0x1012 is assigned to the primary video stream 7311. When up to 32 other elementary streams can be multiplexed by type in one sub-TS, the left-view PG streams 7312A and 7312B are assigned any value from 0x1220 to 0x123F, and the right-view PG streams 7313A and 7313B are assigned any value from 0x1240 to 0x125F. The left-view IG stream 7314 is assigned any value from 0x1420 to 0x143F, and the right-view IG stream 7315 is assigned any value from 0x1440 to 0x145F. The secondary video stream 7316 is assigned any value from 0x1B20 to 0x1B3F.

FIG. 73B is a list of elementary streams multiplexed in a second sub-TS on a BD-ROM disc 101. The second sub-TS is multiplexed stream data in MPEG-2 TS format and is included in a file DEP for the depth mode. Alternatively, the second sub-TS may be multiplexed in the same file DEP as the first sub-TS. As shown in FIG. 73B, the second sub-TS includes a primary video stream 7321, depth map PG streams 7323A and 7323B, depth map IG stream 7324, and secondary video stream 7326. The primary video stream 7321 is a depth map stream and represents 3D video images in combination with the primary video stream 301 in the main TS. When the 2D video images represented by the PG streams 323A and 323B in the main TS are used to project 3D video images on a virtual 2D screen, the depth map PG streams 7323A and 7323B are used as the PG streams representing a depth map for the 3D video images. When the 2D video images represented by the IG stream 304 in the main TS are used to project 3D video images on a virtual 2D screen, the depth map IG stream 7324 is used as the IG stream representing a depth map for the 3D video images. The secondary video stream 7326 is a depth map stream and represents 3D video images in combination with the secondary video stream 306 in the main TS.

PIDs are assigned to the elementary streams 7321-7326 as follows, for example. A PID of 0x1013 is assigned to the primary video stream 7321. When up to 32 other elementary streams can be multiplexed by type in one sub-TS, the depth map PG streams 7323A and 7323B are assigned any value from 0x1260 to 0x127F. The depth map IG stream 7324 is assigned any value from 0x1460 to 0x147F. The secondary video stream 7326 is assigned any value from 0x1B40 to 0x1B5F.

<Data Structure of STN Table SS>

Figure 74:
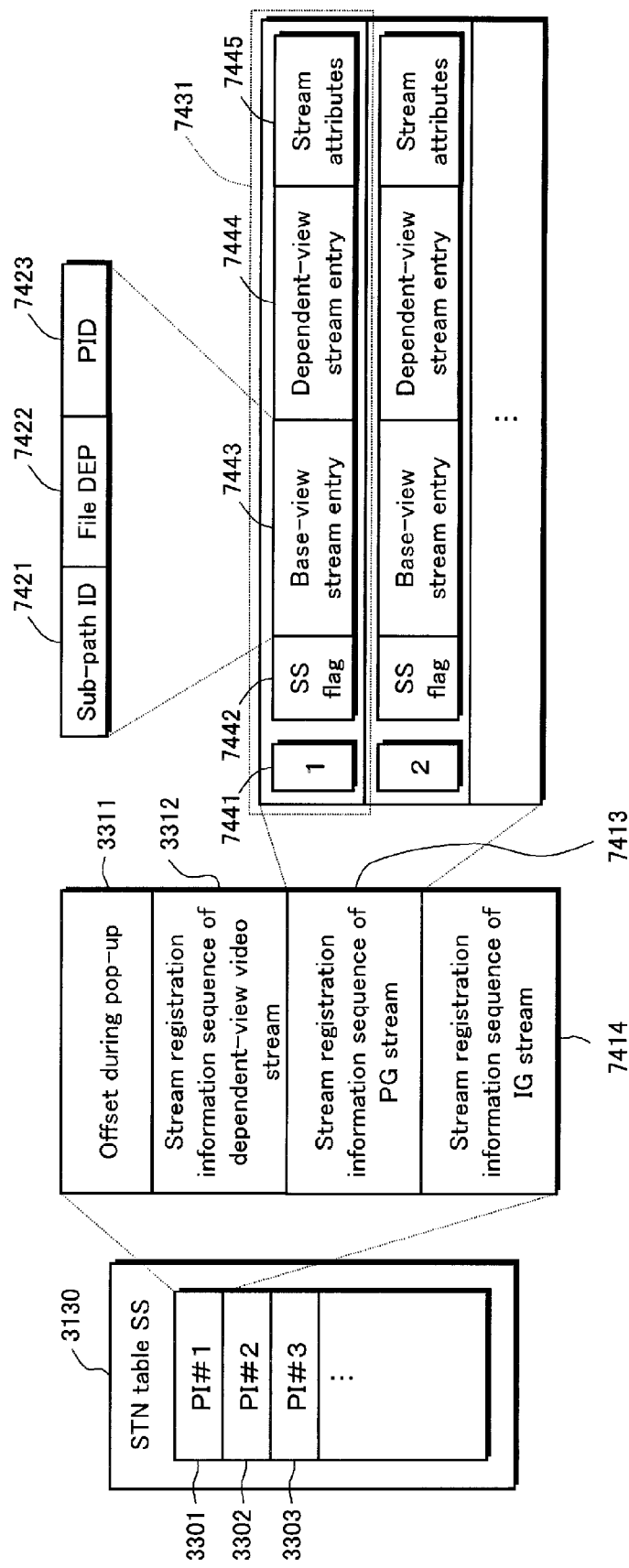
FIG. 74 is a schematic diagram showing a data structure of the STN table SS 3130 according to Embodiment 2 of the present invention.

FIG. 74 is a schematic diagram showing a data structure of the STN table SS 3130 according to Embodiment 2 of the present invention. As shown in FIG. 74, the stream registration information sequences 3301, 3302, 3303, . . . in the STN table SS 3130 include a stream registration information sequence 7413 of a PG stream and a stream registration information sequence 7414 of an IG stream in addition to an offset during pop-up 3311 and a stream registration information sequence 3312 of a dependent-view video stream that are shown in FIG. 33.

The stream registration information sequence 7413 of a PG stream includes stream registration information indicating the PG streams that can be selected for playback from the sub-TS. The stream registration information sequence 7414 of an IG stream includes stream registration information indicating the IG streams that can be selected for playback from the sub-TS. These stream registration information sequences 7413 and 7414 are used in combination with the stream registration information sequences, included in the STN table of the corresponding PI, that indicate PG streams and IG streams. When reading a piece of stream registration information from an STN table, the playback device 102 in 3D playback mode automatically also reads the stream registration information sequence, located in the STN table SS, that has been combined with the piece of stream registration information. When simply switching from 2D playback mode to 3D playback mode, the playback device 102 can thus maintain already recognized STNs and stream attributes such as language.

As further shown in FIG. 74, the stream registration information sequence 7413 of the PG stream generally includes a plurality of pieces of stream registration information 7431. These are the same in number as the pieces of stream registration information in the corresponding PI that indicates the PG streams. The stream registration information sequence 7414 of the IG stream includes the same sort of pieces of stream registration information. These are the same in number as the pieces of stream registration information in the corresponding PI that indicates the IG streams.

Each piece of stream registration information 7431 includes an STN 7441, stereoscopic flag (is_SS_PG) 7442, base-view stream entry (stream_entry_for_base_view) 7443, dependent-view stream entry (stream_entry_for_dependent_view) 7444, and stream attribute information 7445. The STN 7441 is a serial number assigned individually to pieces of stream registration information 7431 and is the same as the STN assigned to the piece of stream registration information, located in the corresponding PI, with which the piece of stream registration information 7431 is combined. The stereoscopic flag 7442 indicates whether a BD-ROM disc 101 includes both base-view and dependent-view PG streams. If the stereoscopic flag 7442 is on, the sub-TS includes both PG streams. Accordingly, the playback device reads all of the fields in the base-view stream entry 7443, the dependent-view stream entry 7444, and the stream attribute information 7445.

If the stereoscopic flag 7442 is off, the playback device ignores all of these fields 7443-7445. Both the base-view stream entry 7443 and the dependent-view stream entry 7444 include sub-path ID reference information 7421, stream file reference information 7422, and PIDs 7423. The sub-path ID reference information 7421 indicates a sub-path ID of a sub-path that specifies the playback paths of the base-view and dependent-view PG streams. The stream file reference information 7422 is information to identify the file DEP storing the PG streams. The PIDs 7423 are the PIDs for the PG streams. The stream attribute information 7445 includes attributes for the PG streams, such as language type.

Note that the stream registration information 7431 of the PG stream may be stored in the STN table instead of the STN table SS. In that case, the stream registration information 7431 is stored in PG streams in the main TS, in particular in the stream attribute information therein.

<System Target Decoder>

Figure 75:
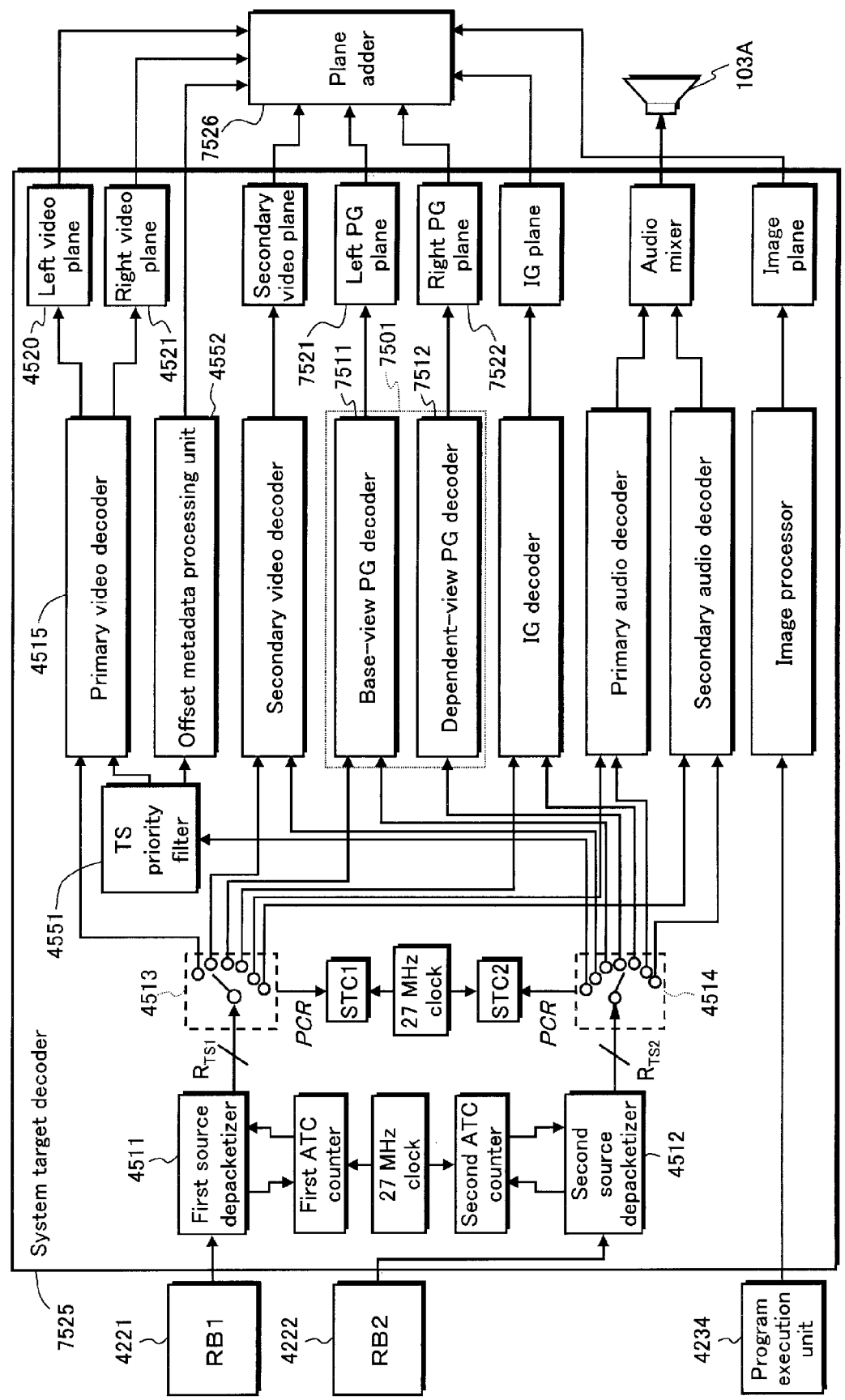
FIG. 75 is a functional block diagram of a system target decoder 7525 according to Embodiment 2 of the present invention.

FIG. 75 is a functional block diagram of a system target decoder 7525 according to Embodiment 2 of the present invention. As shown in FIG. 75, the PG decoder 7501 supports 2 plane mode, unlike the PG decoder shown in FIG. 45. Specifically, the PG decoder 7501 includes a base-view PG decoder 7511 and a dependent-view PG decoder 7512. In addition to decoding the PG streams 303A and 303B in the main TS shown in FIG. 3A, the base-view PG decoder 7511 decodes the left-view PG streams 7312A and 7312B in the first sub-TS shown in FIG. 73A into plane data. The dependent-view PG decoder 7512 decodes the right-view PG streams 7313A and 7313B in the first sub-TS shown in FIG. 73A and the depth map PG streams 7323A and 7323B in the second sub-TS shown in FIG. 73B into plane data. The secondary video decoder and the IG decoder both include a similar pair of decoders. The system target decoder 7525 further includes a pair of PG plane memories 7521 and 7522. The base-view PG decoder 7511 writes the plane data into the left PG plane memory 7521, and the dependent-view PG decoder 7512 writes the plane data into the right PG plane memory 7522. The IG plane memory and the image plane memory both have similar structures. The system target decoder 7525 further associates the output of plane data from the graphics plane memory with 2 plane mode, 1 plane+offset mode, and 1 plane+zero offset mode. In particular, when the playback control unit 4235 indicates 2 plane mode, the system target decoder 7525 alternately outputs plane data from a pair of PG plane memories 7521 and 7522 to the plane adder 7526.

<Plane Adders>

Figure 76:
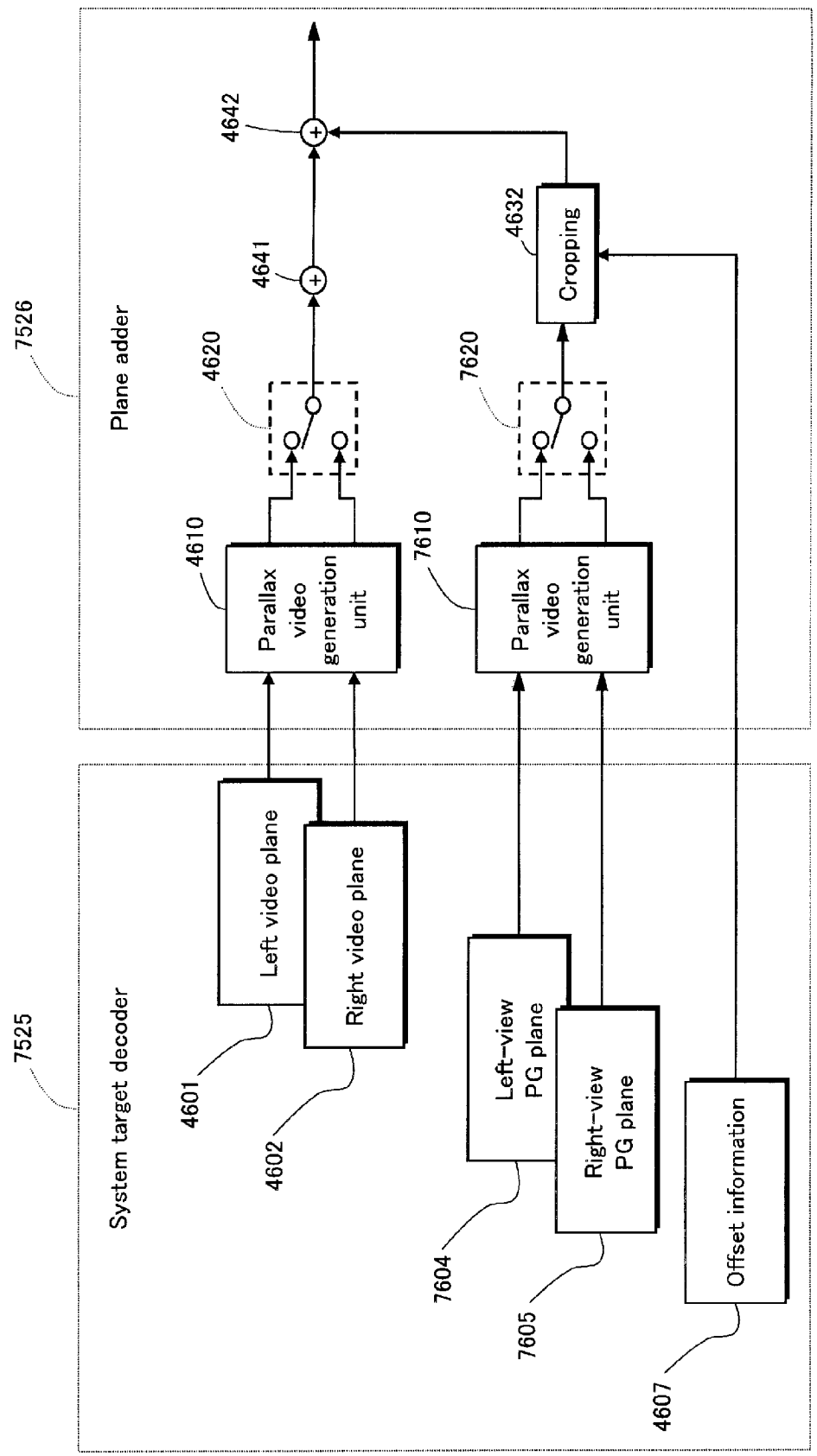
FIG. 76 is a partial functional block diagram of the plane adder 7526 in 2 plane mode.

FIG. 76 is a partial functional block diagram of the plane adder 7526 in 2 plane mode. As shown in FIG. 76, the plane adder 6226 includes a parallax video generation unit 4710, switch 4720, first adder 4741, and second adder 4742, like the plane adder 4226 shown in FIG. 47. The plane adder 7526 further includes a second parallax video generation unit 7610 and a second switch 7620 as units for input of PG plane data 7604 and 7605. A similar structure is included in the units for input of secondary video plane data, IG plane data, and image plane data.

The second parallax video generation unit 7610 receives left PG plane data 7604 and right PG plane data 7605 from the system target decoder 7525. In the playback device 102 in L/R mode, the left PG plane data 7604 represents the left-view PG plane, and the right PG plane data 7605 represents the right-view PG plane. At this point, the second parallax video generation unit 7610 transmits the pieces of plane data 7604 and 7605 as they are to the switch 7620. On the other hand, in the playback device 102 in depth mode, the left PG plane data 7604 represents the PG plane of 2D graphics images, and the right PG plane data 7605 represents a depth map corresponding to the 2D graphics images. In this case, the second parallax video generation unit 7610 first calculates the binocular parallax for each element in the 2D graphics images using the depth map. Next, the second parallax video generation unit 7610 processes the left PG plane data 7604 to shift the presentation position of each element in the 2D graphics image in the PG plane to the left or right in accordance with the calculated binocular parallax. This generates a pair of PG planes representing a left view and right view. Furthermore, the second parallax video generation unit 7610 outputs this pair of PG planes to the second switch 7620.

The second switch 7620 outputs the left PG plane data 7604 and the right PG plane data 7605, which have the same PTS, to the second adder 4742 in this order. The second cropping unit 4732 in the 2 plane mode outputs each of the PG plane data 7604 and 7605 to the second adder 4742 as it is. The second adder 4742 superimposes each of the PG plane data 7604 and 7605 on the plane data from the first adder 4741 and transmits the result to the third adder 4743. As a result, the left-view PG plane is superimposed on the left-video plane data 7601, and the right-view PG plane is superimposed on the right-video plane data 7602.

The second cropping unit 4732 in the 2 plane mode, in a similar manner to the second cropping unit 4732 in the 1 plane+offset mode shown in FIG. 47, may provide each of PG plane data 7604 and 7605 with a horizontal offset by using the offset adjustment value. This enables the depth of the 3D graphics video images to be adjusted in conjunction with the screen size of the display device 103. Alternatively, the second cropping unit 4732, in a similar manner to the second cropping unit 4732 in the 1 plane+offset mode shown in FIGS. 65 and 69, may provide each of PG plane data 7604 and 7605 with a vertical offset by using the video upward/downward move shift value. When a 3D video image is presented in a letterbox display, this enables a 3D graphics image (e.g. subtitle) to be presented in a black strip which is located above or below the 3D video image.

<Use of Offset Information in 2 Plane Mode>

The second cropping unit 4732 in the 2 plane mode may perform an offset control onto the left-view or right-view graphics plane by using the offset information 4704. The offset control provides the following advantages.

In the L/R mode, instead of the left-view PG stream in the first sub-TS shown in FIG. 73A, the PG stream for 2D image in the main TS (hereinafter, the PG stream for 2D image is abbreviated as "2D PG stream") may be used as the left-view PG plane data. That is to say, in the base-view stream entry 7443 shown in FIG. 74, the sub-path ID reference information 7421 indicates the main path, the stream file reference information 7422 indicates the file 2D which stores the 2D PG stream, and the PID 7423 indicates the PID of the 2D PG stream. In that case, it is possible to reduce the data amount of the 3D video content because the first sub-TS does not need to include the left-view PG stream. On the other hand, the following errors may occur to the 3D graphics image.

Figure 77A:
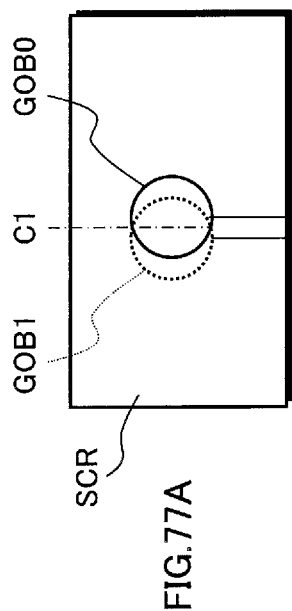
FIGS. 77A, 77B, and 77C are schematic diagrams showing a left-view graphics image GOB0 represented by the 2D PG stream and a right-view graphics images GOB1-GOB3 represented by the right-view PG stream.
Figure 77B:
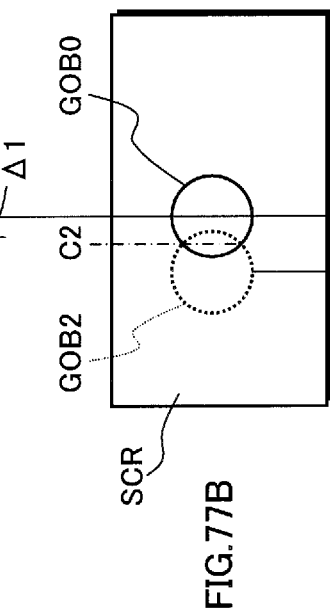
Figure 77C:
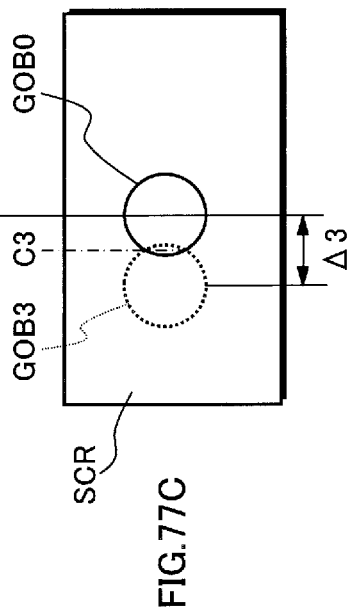

FIGS. 77A, 77B, and 77C are schematic diagrams showing a left-view graphics image GOB0 represented by the 2D PG stream and a right-view graphics images GOB1-GOB3 represented by the right-view PG stream. In FIGS. 77A, 77B, and 77C, the solid line in the screen SCR indicates the left-view graphics image GOB0 and the dashed line indicates the right-view graphics images GOB1-GOB3. As the distances Δ1, Δ2, and Δ3 between the graphics images shown in FIGS. 77A, 77B, and 77C change from small to large in this order (Δ1<Δ2<Δ3), the difference in depth between the 3D graphics image and the screen SCR changes accordingly. Thus when the pair of 3D graphics images is displayed as shown in FIG. 77A to FIG. 77C in this order, the 3D graphics image appears to jump from the screen SCR toward the viewer. When the left-view graphics image GOB0 represents a subtitle, the image GOB0 is used as a 2D image as well, thus the display position is constant through FIGS. 77A, 77B, and 77C. On the other hand, the display positions of the right-view graphics images GOB1-GOB3 move leftward in the order of FIGS. 77A, 77B, and 77C. Accordingly, the center positions C1, C2, and C3 between the graphics images move leftward in the order of FIGS. 77A, 77B, and 77C. That is to say, the 3D graphics image of the subtitle appears to move leftward. Such a move of the subtitle may make the viewer feel uncomfortable.

Figure 77D:
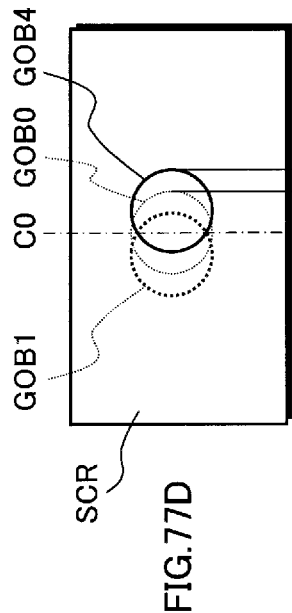
FIGS. 77D, 77E, and 77F are schematic diagrams showing the offset control performed onto the left-view graphics image shown in FIGS. 77A, 77B, and 77C.
Figure 77E:
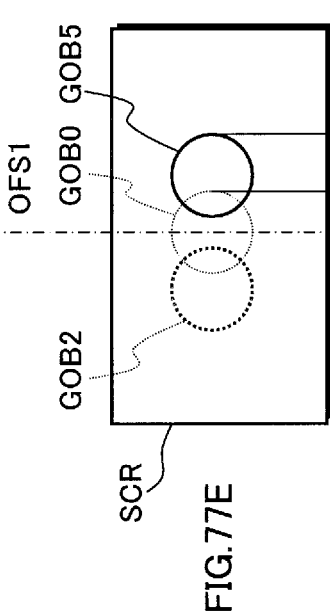
Figure 77F:
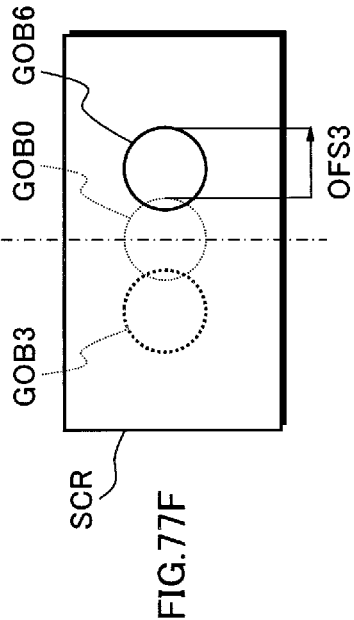

The second cropping unit 4732 in the 2 plane mode prevents the 3D graphics image from moving horizontally by using the offset control according to the offset information as follows. FIGS. 77D, 77E, and 77F are schematic diagrams showing the offset control performed onto the left-view graphics image shown in FIGS. 77A, 77B, and 77C. In FIGS. 77D, 77E, and 77F, the solid line in the screen SCR indicates the left-view graphics images GOB4-GOB6 after the offset control, the thin dashed line indicates the left-view graphics image GOB0 before the offset control, and the thick dashed line indicates the right-view graphics images GOB1-GOB3. The second cropping unit 4732 provides the left-view PG plane with offsets OFS1, OFS2, and OFS3 indicated by arrows in FIGS. 77D, 77E, and 77F in this order. With this provision, the left-view graphics images GOB4-GOB6 after the offset control move rightward compared to the left-view graphics image GOB0 before the offset control. As a result, since the center position C0 between the graphics images is kept constant through FIGS. 77D-77F, the 3D graphics image appears not to move horizontally. In this way, by using the 2D PG stream as the left-view PG stream, it is possible to prevent the viewer from feeling uncomfortable.

Embodiment 3

The following describes, as Embodiment 3 of the present invention, a device and method for recording data on the recording media of Embodiments 1 and 2 of the present invention. The recording device described here is called an authoring device. The authoring device is generally located at a creation studio and used by authoring staff to create movie content to be distributed. First, in response to operations by the authoring staff, the recording device converts movie content into AV stream files using a predetermined compression encoding method. Next, the recording device generates a scenario. A "scenario" is information defining how each title included in the movie content is to be played back. Specifically, a scenario includes dynamic scenario information and static scenario information. Then, the recording device generates a volume image for a BD-ROM disc from the AV stream files and scenario. Lastly, the recording device records the volume image on the recording medium.

Figure 78:
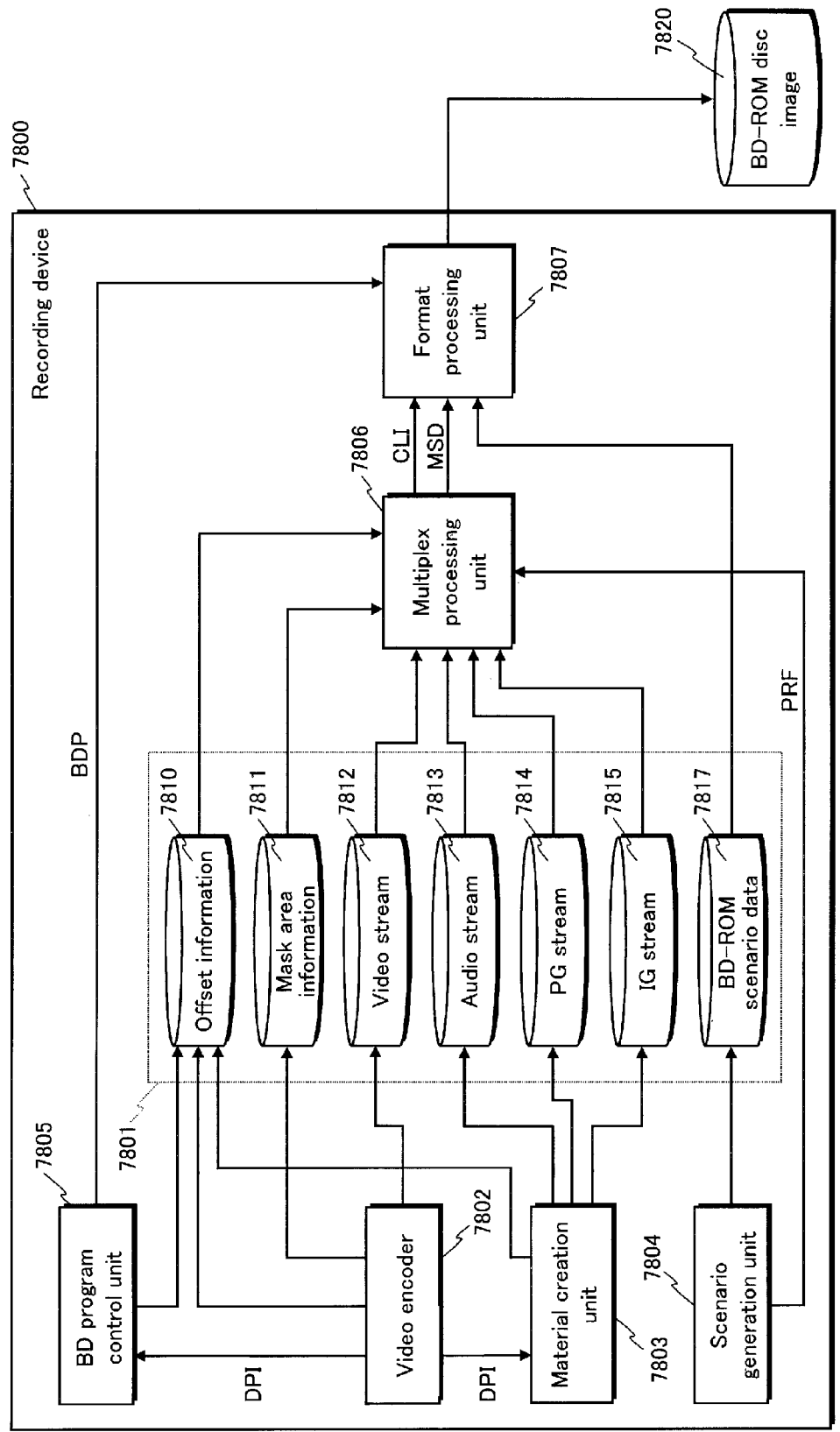
FIG. 78 is a functional block diagram of a recording device 7800 according to Embodiment 3 of the present invention.

FIG. 78 is a functional block diagram of a recording device 7800. As shown in FIG. 78, the recording device 7800 includes a database unit 7801, video encoder 7802, material creation unit 7803, scenario generation unit 7804, BD program creation unit 7805, multiplex processing unit 7806, and format processing unit 7807.

The database unit 7801 is a nonvolatile storage device embedded in the recording device and is in particular a hard disk drive (HDD). Alternatively, the database unit 7801 may be an external HDD connected to the recording device, or a nonvolatile semiconductor memory device internal or external to the recording device.

The video encoder 7802 receives video data, such as uncompressed bit map data, from the authoring staff and compresses the received video data in accordance with a compression encoding method such as MPEG-4 AVC or MPEG-2. This process converts primary video data into a primary video stream and secondary video data into a secondary video stream. In particular, 3D video image data is converted into a pair of a base-view video stream and a dependent-view video stream, as shown in FIG. 7, using a multiview coding method such as MVC. In other words, the video frame sequence representing the left view is converted into a base-view video stream via inter-picture predictive encoding on the pictures in these video frames. On the other hand, the video frame sequence representing the right view is converted into a dependent-view video stream via predictive encoding on not only the pictures in these video frames, but also the base-view pictures. Note that the video frames representing the right view may be converted into a base-view video stream, and the video frames representing the left view may be converted into a dependent-view video stream. The converted video streams 7812 are stored in the database unit 7801.

During the process of inter-picture predictive encoding, the video encoder 7802 detects motion vectors between individual images in the left view and right view and calculates depth information of each 3D video image based on the detected motion vectors. FIGS. 79A and 79B are schematic diagrams respectively showing a picture in a left view and a right view used to display one scene of 3D video images, and FIG. 79C is a schematic diagram showing depth information calculated from these pictures by the video encoder 7802.

The video encoder 7802 compresses left-view and right-view pictures using the redundancy between the pictures. In other words, the video encoder 7802 compares both uncompressed pictures on a per-macroblock basis, i.e. per matrices of 8×8 or 16×16 pixels, so as to detect a motion vector for each image in the two pictures. Specifically, as shown in FIGS. 79A and 79B, a left-view picture 7901 and a right-view picture 7902 are first each divided into macroblocks 7903. Next, the areas occupied by the image data in picture 7901 and picture 7902 are compared for each macroblock 7903, and a motion vector for each image is detected based on the result of the comparison. For example, the area occupied by image 7904 showing a "house" in picture 7901 is substantially the same as that in picture 7902. Accordingly, a motion vector is not detected from these areas. On the other hand, the area occupied by image 7905 showing a "circle" in picture 7901 is substantially different from the area in picture 7902. Accordingly, a motion vector of the image 7905 is detected from these areas.

The video encoder 7802 uses the detected motion vector to compress the pictures 7901 and 7902. On the other hand, the frame depth information generation unit 7905 uses the motion vector VCT to calculate the binocular parallax of the each image, such as the "house" image 7904 and "circle" image 7905. The video encoder 7802 further calculates the depth of each image from the image's binocular parallax. The information indicating the depth of each image may be organized into a matrix 7906 the same size as the matrix of the macroblocks in pictures 7901 and 7902, as shown in FIG. 79C. In this matrix 7906, blocks 7907 are in one-to-one correspondence with the macroblocks 7903 in pictures 7901 and 7902. Each block 7907 indicates the depth of the image shown by the corresponding macroblocks 7903 by using, for example, a depth of 8 bits. In the example shown in FIG. 79, the depth of the image 7905 of the "circle" is stored in each of the blocks in an area 7908 in the matrix 7906. This area 7908 corresponds to the entire areas in the pictures 7901 and 7902 that represent the image 7905.

The video encoder 7802 may use the depth information to generate a depth map for the left view or right view. In this case, the video encoder 7802 respectively encodes either the left-view or right-view stream data and the corresponding depth map stream as the base-view video stream and the depth map stream by using the predictive encoding between pictures included in the video encoder 7802 itself. Each video stream 7812 after the conversion is stored in the database unit 7801.

The video encoder 7802 may further use the depth information to calculate width WDH of the strip AL or AR in the vertical direction that is included in either of the left view LV and the right view RV shown in FIGS. 60B and 60C and height HGT of the strip AT or AB in the horizontal direction that is included in either of the left view LV and the right view RV shown in FIGS. 61B and 61C. Actually, when an image of an object is included in a vertical or horizontal strip, the motion vector of this image is detected as indicating "frame out" from the left view to the right view or vice-versa. Accordingly, the video encoder 7802 can calculate the width or height of each strip from this motion vector. Information 7811 indicating the calculated width and height (hereinafter referred to as "mask area information") is stored in the database unit 7801.

When encoding a secondary video stream from 2D video image data, the video encoder 7802 may also create offset information 7810 for a secondary video plane in accordance with operations of the authoring staff. The generated offset information 7810 is stored in the database unit 7801.

The material creation unit 7803 creates elementary streams other than video streams, such as an audio stream 7813, PG stream 7814, and IG stream 7815 and stores the created streams into the database unit 7801. For example, the material creation unit 7803 receives uncompressed LPCM audio data from the authoring staff, encodes the uncompressed LPCM audio data in accordance with a compression encoding method such as AC-3, and converts the encoded LPCM audio data into the audio stream 7813. The material creation unit 7803 additionally receives a subtitle information file from the authoring staff and creates the PG stream 7814 in accordance with the subtitle information file. The subtitle information file defines image data or text data for showing subtitles, display timings of the subtitles, and visual effects to be added to the subtitles, such as fade-in and fade-out. Furthermore, the material creation unit 7803 receives bit map data and a menu file from the authoring staff and creates the IG stream 7815 in accordance with the bit map data and the menu file. The bit map data shows images that are to be displayed on a menu. The menu file defines how each button on the menu is to be transitioned from one status to another and defines visual effects to be added to each button.

In response to operations by the authoring staff, the material creation unit 7803 furthermore creates offset information 7810 corresponding to the PG stream 7814 and IG stream 7815. In this case, the material creation unit 7803 may use the depth information DPI generated by the video encoder 7802 to adjust the depth of the 3D graphics video images with the depth of the 3D video images. In this case, when the depth of the 3D video images changes greatly per each frame, the material creation unit 7803 may further process a series of offset values created with use of the depth information DPI in the low-path filter to decrease the change per each frame. The offset information 7810 created in this way is stored in the database unit 7801.

The scenario generation unit 7804 creates BD-ROM scenario data 7817 in response to an instruction received from the authoring staff via GUI and then stores the created BD-ROM scenario data 7817 in the database unit 7801. The BD-ROM scenario data 7817 defines methods of playing back the elementary streams 7812-7816 stored in the database unit 7801. Of the file group shown in FIG. 2, the BD-ROM scenario data 7817 includes the index file 211, the movie object file 212, and the playlist files 221-223. The scenario generation unit 7804 further creates a parameter file PRF and transfers the created parameter file PRF to the multiplex processing unit 7806. The parameter file PRF defines, from among the elementary streams 7812-7816 stored in the database unit 7801, stream data to be multiplexed into the main TS and sub-TS.

The BD program creation unit 7805 provides the authoring staff with a programming environment for programming BD-J objects and Java application programs. The BD program creation unit 7805 receives a request from a user via GUI and creates each program's source code according to the request. The BD program creation unit 7805 further creates a BD-J object file 251 from the BD-J objects and compresses the Java application programs in the JAR file 261. The program files BDP are transferred to the format processing unit 7807.

In this context, it is assumed that a BD-J object is programmed in the following way: the BD-J object causes the program execution unit 4234 shown in FIG. 42 to transfer graphics data for GUI to the system target decoder 4225. Furthermore, the BD-J object causes the system target decoder 4225 to process graphics data as image plane data and to output image plane data to the plane adder 4226 in 1 plane+offset mode. In this case, the BD program creation unit 7805 may create offset information 7810 corresponding to the image plane and store the offset information 7810 in the database unit 7801. Here, the BD program creation unit 7305 may use the depth information DPI generated by the video encoder 7802 when creating the offset information 7810.

In accordance with the parameter file PRF, the multiplex processing unit 7806 multiplexes each of the elementary streams 7812-7816 stored in the database unit 7801 to form a stream file in MPEG-2 TS format. More specifically, as shown in FIG. 4, first each of the elementary streams 7812-7815 is converted into a source packet sequence, and the source packets included in each sequence are assembled to construct a single piece of multiplexed stream data. In this way, the main TS and sub-TS are created. These pieces of multiplexed stream data MSD are output to the format processing unit 7807.

Furthermore, the multiplex processing unit 7806 creates the offset metadata based on the offset information 7810 stored in the database unit 7801. As shown in FIG. 11, the created offset metadata 1110 is stored in the dependent-view video stream. At this point, the mask area information 7811 stored in the database unit 7801 is stored in the dependent-view video stream together with the offset metadata. Note that the multiplex processing unit 7806 may process each piece of graphics data to adjust the arrangement of the graphics elements in the left and right video image frames so that the 3D graphics images represented by each graphics plane are not displayed as overlapping in the same visual direction as 3D graphics images represented by the other graphics planes. Alternatively, the multiplex processing unit 7806 may adjust the offset value for each graphics plane so that the depths of 3D graphics images do not overlap.

Additionally, the multiplex processing unit 7806 creates a 2D clip information file and a dependent-view clip information file via the following four steps. (I) Create entry maps 2230 shown in FIG. 23 for the file 2D and file DEP. (II) Create the extent start points 2242 and 2420 shown in FIGS. 24A and 24B using each file's entry map. At this point, it aligns extent ATC times between consecutive data blocks (see below). Furthermore, it designs the arrangement of extents so that the sizes of 2D extents, base-view extents, dependent-view extents, and extents SS satisfy predetermined conditions (see the <<Supplementary Explanation>> regarding these conditions). (III) Extract the stream attribute information 2220 shown in FIG. 22 from each elementary stream to be multiplexed into the main TS and sub-TS. (IV) Associate, as shown in FIG. 22, a combination of an entry map 2230, 3D meta data 2240, and stream attribute information 2220 with a piece of clip information 2210. Each clip information file CLI is thus created and transmitted to the format processing unit 7307.

The format processing unit 7807 creates a BD-ROM disc image 7820 of the directory structure shown in FIG. 2 from (i) the BD-ROM scenario data 7817 stored in the database unit 7801, (ii) a group of program files BDP such as BD-J object files created by the BD program creation unit 7805, and (iii) multiplexed stream data MSD and clip information files CLI generated by the multiplex processing unit 7806. In this directory structure, UDF is used as the file system.

When creating file entries for each of the files 2D, files DEP, and files SS, the format processing unit 7807 refers to the entry maps and 3D metadata included in the 2D clip information files and dependent-view clip information files. The SPN for each entry point and extent start point is thereby used in creating each allocation descriptor. In particular, the value of the LBN and the extent size to be represented by each allocation descriptor are determined so as to express an interleaved arrangement like the one shown in FIG. 19. As a result, each base-view data block is shared by a file SS and file 2D, and each dependent-view data block is shared by a file SS and file DEP.

<Recording Method of BD-ROM Disc Image>

Figure 80:
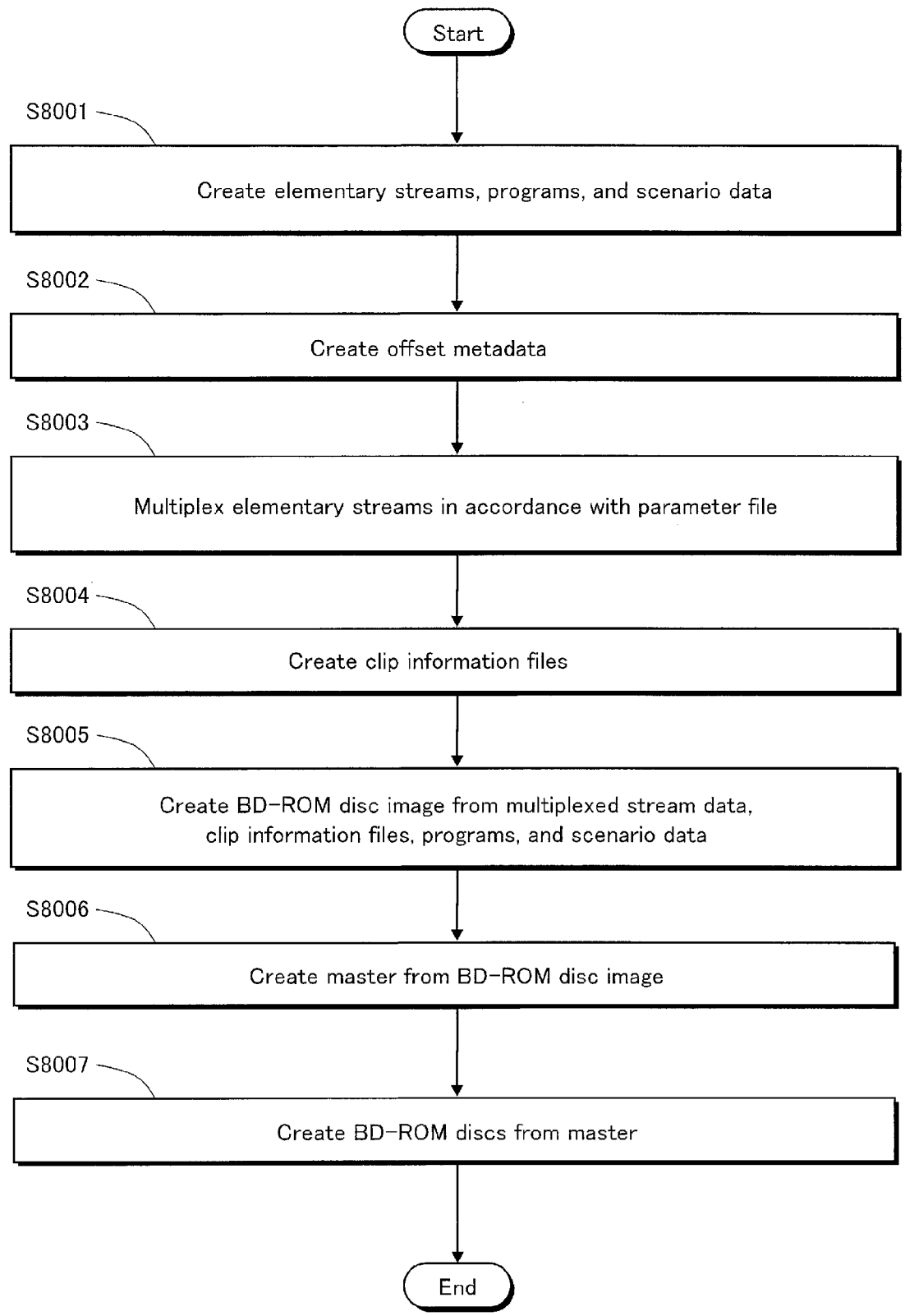
FIG. 80 is a flowchart of a method for recording movie content on a BD-ROM disc using the recording device 7800 shown in FIG. 78.

FIG. 80 is a flowchart of a method for recording movie content on a BD-ROM disc using the recording device 7800 shown in FIG. 78. This method begins, for example, when power to the recording device 7800 is turned on.

In step S8001, the elementary streams, programs, and scenario data to be recorded on a BD-ROM disc are created. In other words, the video encoder 7802 creates a video stream 7812. The material creation unit 7803 creates an audio stream 7813, PG stream 7814, and IG stream 7815. The scenario generation unit 7804 creates BD-ROM scenario data 7817. These created pieces of data 7812-7817 are stored in the database unit 7801. On the other hand, the video encoder 7802 creates offset information 7810 and mask area information 7811 and stores these pieces of information in the database unit 7801. The material creation unit 7803 creates offset information 7810 and stores this information in the database unit 7801. The scenario generation unit 7804 creates a parameter file PRF and transfers this file to the multiplex processing unit 7806. The BD program creation unit 7805 creates a group of program files BDP, which include a BD-J object file and a JAR file, and transfers this group BDP to the format processing unit 7807. The BD program creation unit 7805 also creates offset information 7810 and stores this information in the database unit 7801. Thereafter, processing proceeds to step S8002.

In step S8002, the multiplex processing unit 7806 creates offset metadata based on the offset information 7810 stored in the database unit 7801. The created offset metadata is stored in the dependent-view video stream along with the mask area information 7811. Thereafter, processing proceeds to step S8003.

In step S8003, the multiplex processing unit 7806 reads the elementary streams 7812-7816 from the database unit 7801 in accordance with the parameter file PRF and multiplexes these streams into a stream file in MPEG2-TS format. Thereafter, processing proceeds to step S8004.

In step S8004, the multiplex processing unit 7806 creates a 2D clip information file and a dependent-view clip information file. In particular, during creation of the entry map and extent start points, the extent ATC time is aligned between contiguous data blocks. Furthermore, the sizes of 2D extents, base-view extents, dependent-view extents, and extents SS are set to satisfy predetermined conditions. Thereafter, processing proceeds to step S8005.

In step S8005, the format processing unit 7807 creates a BD-ROM disc image 7820 from the BD-ROM scenario data 7817, group of program files BDP, multiplexed stream data MDS, and clip information file CLI. Thereafter, processing proceeds to step S8006.

In step S8006, the BD-ROM disc image 7820 is converted into data for BD-ROM pressing. Furthermore, this data is recorded on a master BD-ROM disc. Thereafter, processing proceeds to step S8007.

In step S8007, BD-ROM discs 101 are mass produced by pressing the master obtained in step S8006. Processing thus concludes.

<Method to Align Extent ATC Times>

Figure 81:
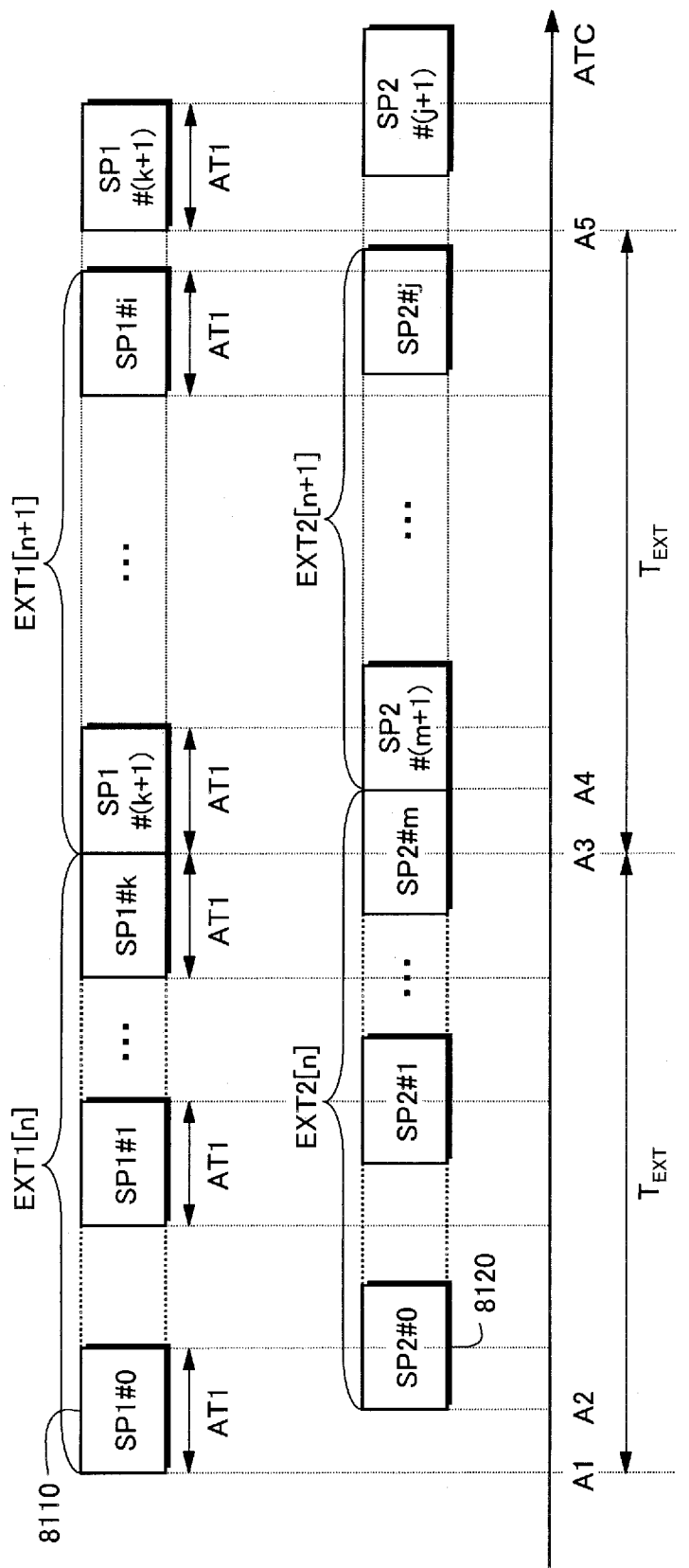
FIG. 81 is a schematic diagram showing a method to align extent ATC times between consecutive data blocks.

FIG. 81 is a schematic diagram showing a method to align extent ATC times between consecutive data blocks. First, ATSs along the same ATC time axis are assigned to source packets stored in a base-view data block (hereinafter, SP1) and source packets stored in a dependent-view data block (hereinafter, SP2). As shown in FIG. 81, the rectangles 8110 and 8120 respectively represent SP1 #p (p=0, 1, 2, 3, ..., k, k+1, ..., i, i+1) and SP2 #q (q=0, 1, 2, 3, ..., m, m+1, ..., j). These rectangles 8110 and 8120 are arranged in order along the time axis by the ATS of each source packet. The position of the top of each rectangle 8110 and 8120 represents the value of the ATS of the source packet. The length AT1 of each rectangle 8110 and 8120 represents the amount of time needed for the 3D playback device to transfer one source packet from the read buffer to the system target decoder.

From the ATS A1 of SP1 #0 until an extent ATC time $T_{EXT}$ has passed, SP1, i.e. SP1 #0, 1, 2, ..., k, is transferred from the read buffer to the system target decoder and stored as the $(n+1)^{th}$ base-view extent EXT1[$n$] in one base-view data block. Similarly, from the ATS A3 of SP1 #(k+1) until an extent ATC time $T_{EXT}$ has passed, SP1, i.e. SP1 #(k+1), ..., i, is transferred from the read buffer to the system target decoder and stored as the $(n+2)^{th}$ base-view extent EXT1[$n$+1] in the next base-view data block.

On the other hand, SP2, which is to be stored in as the $(n+1)^{th}$ dependent-view extent EXT2[$n$] in one dependent-view data block, is selected as follows. First, the sum of the ATS A1 of SP1 #0 and the extent ATC time $T_{EXT}$, A1+$T_{EXT}$, is sought as ATS A3 of SP1 #(k+1) located at the top of the $(n+2)^{th}$ base-view extent EXT1[$n$+1]. Next, SP2, i.e. SP2 #0, 1, 2, ..., m, is selected. Transfer of SP2 from the read buffer to the system target decoder begins during the period from ATS A1 of SP1 #0 until ATS A3 of SP1 #(k+1). Accordingly, the top SP2, i.e. ATS A2 of SP2 #0, is always equal to or greater than the top SP1, i.e. ATS A1 of SP1 #0: A2≧A1. Furthermore, all of the ATS of SP2 #0-$m$ are less than ATS A3 of SP1 #(k+1). In this context, completion of transfer of the last SP2, i.e. SP #$m$, may be at or after ATS A3 of SP1 #(k+1).

Similarly, SP2, which is to be stored as the $(n+2)^{th}$ dependent-view extent EXT2[$n$+1] in one dependent-view data block, is selected as follows. First, ATS A5 of SP1 #(i+1) located at the top of the $(n+3)^{th}$ base-view extent is sought as ATS A5=A3+$T_{EXT}$. Next, SP2, i.e. SP2 #(m+1)-j, is selected. Transfer of SP2 from the read buffer to the system target decoder begins during the period from ATS A3 of SP1 #(k+1) until ATS A5 of SP1 #(i+1). Accordingly, the top SP2, i.e. ATS A4 of SP2 #(m+1), is always equal to or greater than the top SP1, i.e. ATS A3 of SP1 #(k+1): A4≧A3. Furthermore, all of the ATS of SP2 #(m+1)-j are less than ATS A5 of SP1 #(k+1).

Embodiment 4

FIG. 110 is a functional block diagram of a playback device realized by using the integrated circuit 3 according to Embodiment 4 of the present invention. This playback device reproduces data having the structure described in previous embodiments.

A medium IF unit 1 receives or reads data from a medium and transmits the data to the integrated circuit 3. Note that the data includes data with the structure described in previous embodiments. The medium IF unit 1 is, for example, a disk drive if the medium is an optical disc or hard disk; a card IF if the medium is a semiconductor memory such as an SD card, USB memory, etc.; a CAN tuner or Si tuner if the medium is a broadcast wave such as CATV or the like; and a network IF if the medium is a network such as the Ethernet™, wireless LAN, wireless public line, etc.

A memory 2 temporarily stores both the data received or read from the medium and data being processed by the integrated circuit 3. A Synchronous Dynamic Random Access Memory (SDRAM), Double-Data-Rate×Synchronous Dynamic Random Access Memory (DDR×SDRAM; x=1, 2, 3, ...), etc., is used as the memory 2. Any number of memories 2 may be provided; as necessary, the memory 2 may be a single element or a plurality of elements.

An integrated circuit 3 is a system LSI that treats data transmitted from the medium IF unit 1 with video and audio processing. The integrated circuit 3 includes a main control unit 6, stream processing unit 5, signal processing unit 7, memory control unit 9, and AV output unit 8.

The main control unit 6 includes a program memory and a processor core. The program memory pre-stores basic software such as the OS. The processor core has a timer function and an interrupt function, and controls the entirety of the integrated circuit 3 in accordance with programs stored, for example, in the program memory.

Under the control of the main control unit 6, the stream processing unit 5 receives data transmitted from the medium via the medium IF unit 1, and then stores the data into the memory 2 via a data bus in the integrated circuit 3, or separates the data into visual data and audio data. As previously described, a 2D/left-view AV stream file includes a left-view video stream and a right-view AV stream file includes a right-view video stream. Furthermore, the data on the medium consists of the 2D/left-view AV stream file and the right-view AV stream file divided into a plurality of extents and alternately arranged extent by extent. Note that, of the data on the medium, the portions including the left-view video stream are left-view data, and the portions including the right-view video stream are right-view data. When the integrated circuit 3 receives left-view and right-view data, respectively, the main control unit 6 controls the stream processing unit 5 to store the data into a first area and a second area in the memory 2. Note that the first and second areas in the memory 2 may be logically separated areas in a single memory element, or physically different memory elements. The following explanation on Embodiment 4 assumes that the left-view data and the right-view data are main-view data and sub-view data, respectively. A similar explanation may be true if the right-view data and the left-view data are the main-view data and the sub-view data, respectively.

Under the control of the main control unit 6, the signal processing unit 7 uses an appropriate method to decode visual data and audio data separated by the stream processing unit 5. The visual data is compressed with an encoding method such as MPEG-2, MPEG-4 AVC, MPEG-4 MVC, SMPTE VC-1, etc. Audio data is compressed with an encoding method such as Dolby AC-3, Dolby Digital Plus, MLP, DTS, DTS-HD, linear PCM, etc. The signal processing unit 7 decodes the data with the corresponding method. Note that the model of the signal processing unit 7 may be equivalent to either the combination of the TS priority filter and the various decoders shown in FIG. 45, or the various decoders shown in FIG. 46. Furthermore, the signal processing unit 7 extracts the metadata from the right-view video stream, and then notifies the AV output unit 8 of the metadata. Note that, as described above, the metadata is located at each of GOPs constituting the right-view video stream, and includes combinations of offset information and offset identifiers.

When the model of the signal processing unit 7 is equivalent to the combination of the TS priority filter and the various decoders shown in FIG. 45, the signal processing unit 7 first monitors the TS priority flags of TS packets included in the right-view data, and then uses the values of the TS priority flags to select TS packets containing the metadata. The signal processing unit 7 next performs the following two processes in parallel by using separate modules: a process of decoding the TS packets containing picture data into uncompressed picture data, and a process of extracting the metadata from the TS packets containing the metadata. When the model of the signal processing unit 7 is equivalent to the various decoders shown in FIG. 46, the signal processing unit 7 allows TS packets containing the right-view data to be sent to the same decoder, regardless of the values of TS priority flags. The decoder performs both the two processes of decoding the TS packets into uncompressed picture data and extracting the metadata from the TS packets. In this way, as far as data has the structure described in previous embodiments, the signal processing unit 7 of either model can successfully execute both the processes of decoding the data into uncompressed picture data and extracting metadata from the data.

The memory control unit 9 arbitrates accesses to the memory 2 by the function blocks in the integrated circuit 3.

Under the control of the main control unit 6, the AV output unit 8 superimposes pieces of visual data decoded by the signal processing unit 7, processes the pieces of visual data with format conversion or the like, and then outputs them to the integrated circuit 3.

FIG. 111 is a functional block diagram showing a representative structure of the stream processing unit 5. The stream processing unit 5 is provided with a device stream IF unit 51, a demultiplexer 52, and a switching unit 53.

The device stream IF unit 51 is an interface for data transfer between the medium IF unit 1 and the integrated circuit 3. For example, the device stream IF unit 51 corresponds to a Serial Advanced Technology Attachment (SATA), Advanced Technology Attachment Packet Interface (ATAPI), or Parallel Advanced Technology Attachment (PATA) if the medium is an optical disc or a hard disk; a card IF if the medium is a semiconductor memory such as an SD card, USB memory, etc.; a tuner IF if the medium is a broadcast wave such as CATV or the like; and a network IF if the medium is a network such as the Ethernet™, a wireless LAN, or a wireless public line. Note that, depending on the type of medium, the device stream IF unit 51 may achieve part of the functions of the medium IF unit 1, or the medium IF unit 1 may be embedded in the integrated circuit 3 and used as the device stream IF unit 51.

The demultiplexer 52 separates visual data and audio data from playback data including video images and sounds; the playback data is included in data transmitted from the medium. Each of the above-described extents consists of source packets containing various data such as video images, sounds, PG (subtitles), and IG (menus). In some cases, however, sub-view data may not include an audio stream. Each extent is separated into visual and audio TS packets depending on the PIDs (identifiers) included in the source packets, and then transmitted to the signal processing unit 7. Processed data is transmitted to the signal processing unit 7 directly or after temporary storage in the memory 2. Note that the model of the demultiplexer 52 corresponds to the source depacketizers and the PID filters shown in FIG. 45, for example.

The switching unit 53 changes destinations for the output or storage of data that the device stream IF unit 51 receives. Specifically, when the device stream IF unit 51 receives left-view data, the switching unit 53 switches the destination of the data to the first area of the memory 2, whereas when the device stream IF unit 51 receives right-view data, the switching unit 53 switches the destination of the data to the second area of the memory 2. The switching unit 53 is, for example, a Direct Memory Access Controller (DMAC). FIG. 112 is a functional block diagram of the switching unit 53 and surrounding units when the switching unit 53 is a DMAC. Under the control of the main control unit 6, the DMAC 53 transmits received data and a destination address to the memory control unit 9; the received data is data that the device stream IF unit 51 has received, and the destination address is an address where the received data is to be stored. Specifically, let's assume that addresses 1 and 2 are the addresses of the first area and the second area in the memory 2, respectively. When the received data is left-view data, the DMAC 53 transmits address 1 to the memory control unit 9, whereas when the received data is right-view data, the DMAC 53 transmits address 2. The memory control unit 9 stores the received data into the memory 2 in accordance with the destination addresses transmitted from the switching unit 53. The destination for the output or storage of the received data is changed, depending on the type of the received data. Note that a circuit dedicated to the control over the switching unit 53 may be provided, instead of the main control unit 6.

The device stream IF unit 51, demultiplexer 52, and switching unit 53 were described as a representative structure of the stream processing unit 5. However, the stream processing unit 5 may be further provided with an encryption engine, a security control unit, a controller for direct memory access, or the like. The encryption engine receives and decrypts encrypted data, key data, or the like. The security control unit stores a private key and controls execution of a device authentication protocol or the like between the medium and the playback device. In the example described above, when data received from the medium is stored into the memory 2, the switching unit 53 changes the destination for the storage of the data, depending on whether the data is left-view data or right-view data. Alternatively, after data received from the medium is temporarily stored in the memory 2, the data may be separated into left-view data and right-view data while being transferred to the demultiplexer 52.

FIG. 113 is a functional block diagram showing a representative structure of the AV output unit 8. The AV output unit 8 is provided with an image superimposition unit 81, video output format conversion unit 82, and audio/video output IF unit 83.

The image superimposition unit 81 superimposes decoded visual data. Specifically, the image superimposition unit 81 superimposes PG (subtitles) data and IG (menus) data on the left-view video data and right-view video data picture by picture. The model of the image superimposition unit 81 is shown, for example, in FIG. 47.

FIG. 114 is a schematic diagram showing one example of the method of using the memory 2 during the process of superimposing images. The memory 2 includes a storage area of plane data corresponding to left view, a storage area of plane data corresponding to right view, a storage area of plane data corresponding to graphics, and a storage area of data of superimposed images. Each plane data storage area is an area where decoded data is temporarily stored before rendered in the corresponding plane. The storage area of data of superimposed images is an area where data resulted from superimposing a graphics plane on a left-view plane or a right-view plane is stored. Note that each plane may be an area in the memory 2 or a virtual space.

FIGS. 115 and 116 are schematic diagrams showing the processes of superimposing images by using the memory 2 shown in FIG. 114. The image superimposition unit 81 first provides an offset to a graphics plane based on the offset information included in the metadata extracted by the signal processing unit 7. The image superimposition unit 81 then superimposes the graphics plane with the offset on a video plane. Specifically, FIG. 115 shows that the image superimposition unit 81 provides an offset of +X to a graphics plane, and then superimposes the graphics plane on a left-view plane. On the other hand, FIG. 116 shows that the image superimposition unit 81 provides an offset of −X to the original graphics plane, and then superimposes the graphics plane on a right-view plane. The value X is the offset value represented by a number of pixels. These superimposition processes as shown in the figures allow data pieces of pixels located at the same horizontal coordinates to be combined with each other. The data after superimposed is stored in the storage area of data of superimposed images in the memory 2.

FIG. 117 is a schematic diagram showing another example of the method of using the memory 2 during the process of superimposing images. The memory 2 further includes "storage areas of plane data corresponding to graphics with offset (for superimposed left and right views)". The graphics planes with offsets are to be temporarily stored into these plane data storage areas before superimposed on left-view and right-view planes. For example, the image superimposition unit 81 provides an offset of +X to the graphics plane, and temporarily stores the graphics plane into the "the storage area of plane data corresponding to graphics with offset (for superimposed left view)". The image superimposition unit 81 then reads the graphics plane from the plane data storage area, superimposes the graphics plane on the left-view plane, and stores the result of superimposition into the storage area of data of superimposed images. On the other hand, the image superimposition unit 81 provides an offset −X to the graphics plane, and temporarily stores the plane data into the "the storage area of plane data corresponding to graphics with offset (for superimposed right view)". The image superimposition unit 81 then reads the graphics plane from the plane data storage area, superimposes the graphics plane on the right-view plane, and stores the result of superimposition into the storage area of data of superimposed images.

The video output format conversion unit 82 processes visual data after decoded or superimposed, as necessary, with resizing, IP conversion, noise reduction, frame rate conversion, or the like. Resizing is a process to enlarge or reduce the sizes of images. IP conversion is a process to convert between progressive scanning and interlaced scanning Noise reduction is a process to remove noise from images. Frame rate conversion is a process to change frame rates. The video output format conversion unit 82 sends the data after processed to the image superimposition unit 81 or the audio/video output IF unit 83.

The audio/video output IF unit 83 converts the visual data processed by the video output format conversion unit 82 and the decoded audio data into predetermined data transmission formats by an encoding process or the like. Note that part of the audio/video output IF unit 83 may be provided externally to the integrated circuit 3, as described below.

FIG. 118 is a detailed functional block diagram of the AV output unit 8 and the data output unit in the playback device. The AV output unit 8 and the data output unit in the playback device support a plurality of data transmission formats. Specifically, as shown in FIG. 118, the audio/video output IF unit 83 includes an analog video output IF unit 83*a*, analog audio output IF unit 83*c*, and digital video/audio output IF unit 83*b*.

The analog video output IF unit 83*a* converts the visual data processed by the video output format conversion unit 82 into an analog video signal format, and then outputs the visual data. The analog video output IF unit 83*a* includes, for example, a composite video encoder supporting one of the NTSC, PAL, and SECAM formats, encoder for S-video signal (Y/C separation), encoder for component video signal, and D/A converter (DAC).

The digital audio/video output IF unit 83*b* merges the decoded audio data and the visual data processed by the video output format conversion unit 82, and further encrypts the merged data. After that, the digital audio/video output IF unit 83*b* encodes and outputs the encrypted data in accordance with data transmission standards. For example, the HDMI communication unit shown in FIG. 42 corresponds to the digital video/audio output IF unit 83*b*.

The analog audio output IF unit 83*c* processes the decoded audio data with D/A conversion, and then outputs analog audio data. An audio DAC or the like corresponds to the analog audio output IF unit 83*c*.

The AV output unit 8 and the data output unit in the playback device can change the transmission formats of the visual data and audio data, depending on the data reception devices or data input terminals that the display device and speaker 4 supports. The AV output unit 8 and the data output unit in the playback device can also allow an user to select the transmission formats thereof. Furthermore, they can transmit data converted from the same content in not only a single transmission format, but also two or more transmission formats in parallel.

The image superimposition unit 81, video output format conversion unit 82, and audio/video output IF unit 83 were described as a representative structure of the AV output unit 8. However, the AV output unit 8 may be further provided with a graphics engine and the like. The graphics engine treats data decoded by the signal processing unit 7 with graphics processing such as filtering, combining screens, drawing curves, and 3D display.

This concludes the description on the structure of the playback device according to Embodiment 4. Note that all of the above-described function blocks need not be built in the integrated circuit 3. Conversely, the memory 2 may be built in the integrated circuit 3. The above description on Embodiment 4 explains the main control unit 6 and signal processing unit 7 as separate function blocks. However, the main control unit 6 may perform part of the processing that the signal processing unit 7 should perform.

The topology of a control bus and a data bus connecting between the function blocks in the integrated circuit 3 may be selected to suit the procedure and details of processing by the function blocks. FIGS. 119A and 119B are schematic diagrams showing examples of the topology of the control bus and data bus in the integrated circuit 3. As shown in FIG. 119A, both the control bus 21 and the data bus 22 are arranged so that each of the function blocks 5-9 is directly connected with all the other function blocks. Alternatively, as shown in FIG. 119B, the data bus 23 is arranged so that each of the function blocks 5-8 is directly connected only with the memory control unit 9. In this case, each of the function blocks 5-8 transfers data to the other function blocks via the memory control unit 9 and further the memory 2.

The integrated circuit 3 may be a multi-chip module, instead of an LSI implemented on a single chip. In that case, a plurality of chips constituting the integrated circuit 3 are sealed in a single package, and thus the integrated circuit 3 looks like a single LSI. Alternatively, the integrated circuit 3 may be configured by using a Field Programmable Gate Array (FPGA) or a reconfigurable processor. The FPGA is an LSI programmable after manufactured. The reconfigurable processor is an LSI that allows connections between internal circuit cells and settings for each circuit cell to be reconfigured.

<Incorporation of Integrated Circuit 3 into Display Device>

An integrated circuit similar to the above-described integrated circuit 3 may be incorporated in a display device to cause the display device to perform the above-described processing by the playback device according to Embodiment 4. FIG. 120 is a functional block diagram showing the structure of the integrated circuit incorporated in the display device and the surrounding units thereof. As shown in FIG. 120, the integrated circuit 3 uses a medium IF unit 1 and a memory 2 to treat the data received by the medium IF unit 1 with processing similar to the above-described signal processing. The visual data processed by the integrated circuit 3 is sent to the display driving unit 10. The display driving unit 10 controls the display panel 11 in accordance with the visual data. As a result, the visual data is outputted as images on the screen of the display panel 11. On the other hand, the audio data processed by the integrated circuit 3 is outputted as sounds via the speaker 12.

FIG. 121 is a detailed functional block diagram of the AV output unit 8 shown in FIG. 120. The AV output unit 8 includes a video output IF unit 84 and an audio output IF unit 85, in contrast to that shown in FIG. 118. The video output IF unit 84 and the audio output IF unit 85 may be provided inside or outside the integrated circuit 3. The video output IF unit 84 transfers visual data from the video output format conversion unit 82 to the display driving unit 10. The audio output IF unit 85 transfers audio data from the signal processing unit 7 to the speaker 12. Note that two or more of units each similar to the video output IF unit 84 or the audio output IF unit 85 may be provided. In addition, the video output IF unit 84 and the audio output IF unit 85 may be integrated in one unit.

<Playback Processing by Playback Device Using Integrated Circuit 3>

FIG. 122 is a flowchart of playback processing by the playback device using the integrated circuit 3. The playback processing starts when the medium IF unit 1 is connected with a medium to be able to receive data therefrom, for example, when an optical disc is inserted into the disc drive. During the playback processing, the playback device receives and decodes data from the medium. The playback device then outputs the decoded data as a video signal and an audio signal.

In step S1, the medium IF unit 1 receives or reads data from the medium and transfers the data to the stream processing unit 5. Processing then proceeds to step S2.

In step S2, the stream processing unit 5 separates visual data and audio data from the data received or read in step S1. Processing then proceeds to step S3.

In step S3, the signal processing unit 7 decodes each type of data separated in step S2 by a method appropriate for the method of encoding the data. In parallel with the decoding, the signal processing unit 7 further extracts metadata from right-view data, and notifies the AV output unit 8 of the metadata. Note that the signal processing unit 7 may monitor the TS priority flags of the TS packets included in the right-view data to select TS packets containing the metadata. Alternatively, the signal processing unit 7 may cause the same decoder to both decode the TS packets into uncompressed picture data and extract the metadata from the TS packets. Processing then proceeds to step S4.

In step S4, the AV output unit 8 superimposes the visual data decoded in step S3. As necessary, the AV output unit 8 retrieves and uses offset information from the metadata extracted in step S3. Processing then proceeds to step S5.

In step S5, the AV output unit 8 outputs the visual data and audio data processed in steps S2-S4. Processing then proceeds to step S6.

In step S6, the main control unit 6 determines whether or not to continue the playback processing. Processing again proceeds from step S1, for example, when data to be received or read by the medium IF unit 1 remains in the medium. On the other hand, processing ends when the medium IF unit 1 finishes receiving or reading data from the medium because, for example, the optical disc has been removed from the disc drive or the user has instructed to stop playback.

FIG. 123 is a flowchart showing details of the steps S1-S6 shown in FIG. 122. Steps S101-S110 shown in FIG. 123 are performed under control of the main control unit 6. Steps S101-S103 mainly correspond to details of step S1, steps S104 to details of step S2, step S105 to details of step S3, steps S106-S108 to details of step S4, and steps S109 and S110 to details of step S5.

In step S101, before receiving or reading data to be played back from the medium via the medium IF unit 1, the device stream IF unit 51 receives or reads data required for the playback processing such as a playlist file, clip information file, and the like, from the medium via the medium IF unit 1. The device stream IF unit 51 further stores the data required into the memory 2 via the memory control unit 9. Processing then proceeds to step S102.

In step S102, the main control unit 6 identifies the encoding formats of video data and audio data stored in the medium, based on the stream attribute information included in the clip information file. The main control unit 6 further initializes the signal processing unit 7 to be able to perform decoding in a manner corresponding to the identified encoding format. Processing then proceeds to step S103.

In step S103, the device stream IF unit 51 receives or reads video and audio data to be played back from the medium via the medium IF unit 1. In particular, the data is received or read extent by extent. The device stream IF unit 51 further stores the data into the memory 2 via the switching unit 53 and memory control unit 9. In particular, when left-view data is received or read, the main control unit 6 controls the switching unit 53 to switch the destination for storage of the left-view data to the first area in the memory 2. On the other hand, when right-view data is received or read, the main control unit 6 controls the switching unit 53 to switch the destination for storage of the right-view data to the second area in the memory 2. Processing then proceeds to step S104.

In step S104, the data stored in the memory 2 is transferred to the demultiplexer 52 in the stream processing unit 5. The demultiplexer 52 first reads PIDs from source packets constituting the data. The demultiplexer 52 then uses the PIDs to distinguish whether the TS packets included in the source packets are visual data or audio data. The demultiplexer 52 further transmits each TS packet to a corresponding decoder in the signal processing unit 7 depending on the result of distinguishing. Note that the signal processing unit 7 may monitor the TS priority flags of the TS packets included in the right-view data to send the TS packets containing the metadata to a dedicated module separate from the primary video decoder, i.e., the offset metadata processing unit. Processing then proceeds to step S105.

In step S105, each decoder in the signal processing unit 7 decodes the transmitted TS packets with an appropriate method. In parallel with the decoding, the signal processing unit 7 further extracts the metadata from the right-view data and notifies the AV output unit 8 of the metadata. Note that the extracting may be performed by the offset metadata processing unit separate from the primary video decoder, or may be performed by the primary video decoder simultaneously with the decoding. Processing then proceeds to step S106.

In step S106, pictures of the left-view video stream and right-view video stream decoded by the signal processing unit 7 are sent to the video output format conversion unit 82. The video output format conversion unit 82 resizes the pictures to match the resolution of the display device 4. Processing then proceeds to step S107.

In step S107, the image superimposition unit 81 receives video plane data composed of the pictures resized in step S106 from the video output format conversion unit 82. The image superimposition unit 81 also receives decoded PG and IG plane data from the signal processing unit 7. The image superimposition unit 81 further superimposes the decoded PG and IG plane data. Processing then proceeds to step S108.

In step S108, the video output format conversion unit 82 receives plane data superimposed in step S107 from the image superimposition unit 81. The video output format conversion unit 82 further processes the plane data with IP conversion. Processing then proceeds to step S109.

In step S109, the audio/video output IF unit 83 receives the visual data processed with the IP conversion in step S108 from the video output format conversion unit 82, and receives decoded audio data from the signal processing unit 7. The audio/video output IF unit 83 further processes the visual and audio data with encoding, D/A conversion, and the like, in accordance with the method of outputting data by the display device and speaker 4 and the method of transmitting data to the display device and speaker 4. With these processes, the visual data and audio data are each converted into an analog output format or a digital output format. Visual data in the analog output format includes a composite video signal, S-video signal, component video signal, and the like. Also, HDMI or the like is supported as the digital output format. Processing then proceeds to step S110.

In step S110, the audio/video output IF unit 83 transmits the visual data and audio data processed in step S109 to the display device and speaker 4. Processing then proceeds to step S6. Details of step S6 can be found in the above description.

In each of the above-described steps, each time data is processed, the data may be temporarily stored into the memory 2. Resizing and IP conversion by the video output format conversion unit 82 in steps S106 and S108 may be skipped, if not necessary. Instead of or in addition to these processes, other processes such as noise reduction and frame rate conversion may be further performed. In addition, the order of the processes may be changed insofar as possible.

When the display device shown in FIG. 120 is used in playback processing, the flowchart of the playback processing is basically similar to the flowchart shown in FIGS. 122 and 123. The function blocks shown in FIGS. 120 and 121 operate in a similar manner to those shown in FIGS. 110 and 113.

Supplementary Explanation

<Principle of 3D Video Image Playback>

Playback methods of 3D video images are roughly classified into two categories: methods using a holographic technique, and methods using parallax video.

A method using a holographic technique is characterized by allowing the viewer to perceive objects in video as stereoscopic by giving the viewer's visual perception substantially the same information as optical information provided to visual perception by human beings of actual objects. A technical theory for utilizing these methods for moving video display has been established. However, it is extremely difficult to construct, with present technology, a computer that is capable of real-time processing of the enormous amount of calculation required for moving video display and a display device having super-high resolution of several thousand lines per 1 mm. Accordingly, at the present time, the realization of these methods for commercial use is hardly in sight.

"Parallax video" refers to a pair of 2D video images shown to each of the viewer's eyes for the same scene, i.e. the pair of a left view and a right view. A method using parallax video is characterized by playing back the left-view and right-view of a single scene so that the viewer sees each view in only one eye, thereby allowing the user to perceive the scene as stereoscopic.

Figure 82B:
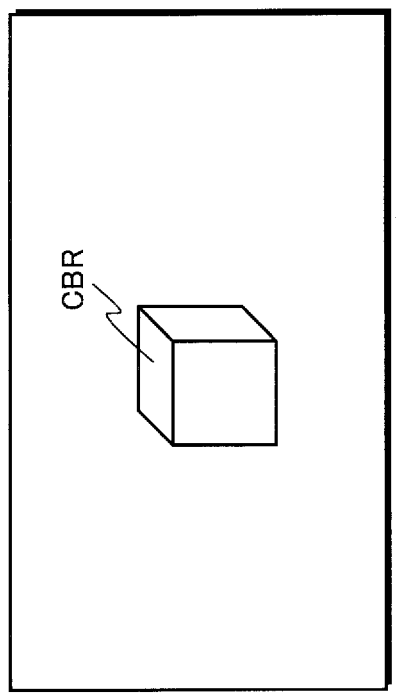
FIGS. 82A-82C are schematic diagrams illustrating the principle behind playback of 3D video images (stereoscopic video images) in a method using parallax video images.
Figure 82C:
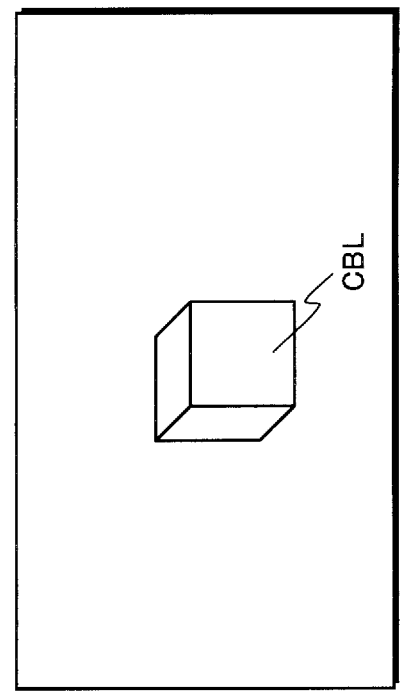
Figure 82A:
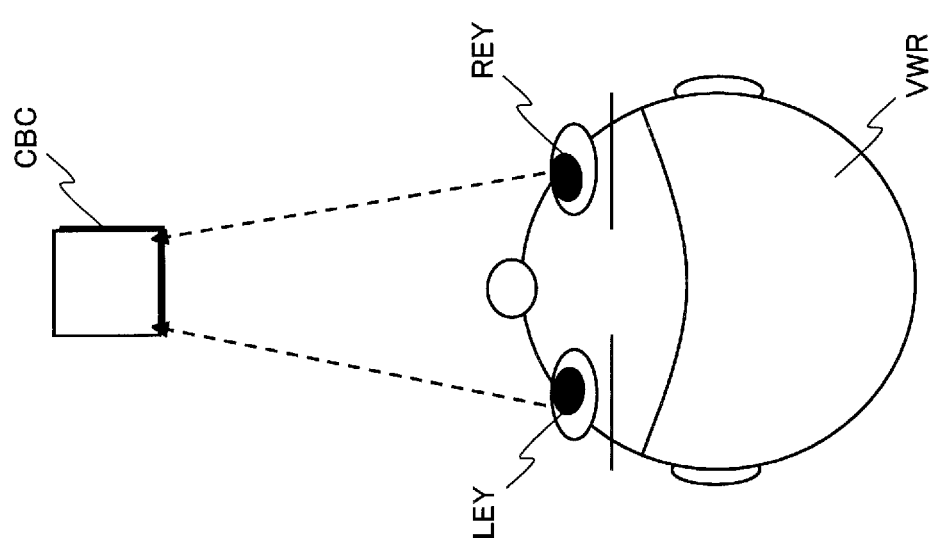

FIGS. 82A, 82B, and 82C are schematic diagrams illustrating the principle behind playback of 3D video images (stereoscopic video images) in a method using parallax video images. FIG. 82A is a top view of the viewer VWR looking at a cube CBC placed directly in front of the viewer's face. FIGS. 82B and 82C are schematic diagrams showing the outer appearance of the cube CBC as a 2D video image as perceived respectively by the left eye LEY and the right eye REY of the viewer VWR. As is clear from comparing FIG. 82B and FIG. 82C, the outer appearances of the cube CBC as perceived by the eyes are slightly different. The difference in the outer appearances, i.e., the binocular parallax allows the viewer VWR to recognize the cube CBC as three-dimensional. Thus, according to a method using parallax video, left and right 2D video images with different viewpoints are first prepared for a single scene. For example, for the cube CBC shown in FIG. 82A, the left view of the cube CBC shown in FIG. 96B and the right view shown in FIG. 82C are prepared. In this context, the position of each viewpoint is determined by the binocular parallax of the viewer VWR. Next, each 2D video image is played back so as to be perceived only by the corresponding eye of the viewer VWR. Consequently, the viewer VWR recognizes the scene played back on the screen, i.e., the video image of the cube CBC, as stereoscopic. Unlike methods using a holography technique, methods using parallax video thus have the advantage of requiring preparation of 2D video images from merely two viewpoints.

Several concrete methods for how to use parallax video have been proposed. From the standpoint of how these methods show left and right 2D video images to the viewer's eyes, the methods are divided into alternate frame sequencing methods, methods that use a lenticular lens, two-color separation methods, etc.

In the alternate frame sequencing method, left and right 2D video images are alternately displayed on a screen for a predetermined time, while the viewer watches the screen using shutter glasses. Each lens in the shutter glasses is formed by a liquid crystal panel, for example. The lenses pass or block light in a uniform and alternate manner in synchronization with switching of the 2D video images on the screen. That is, each lens functions as a shutter that periodically blocks an eye of the viewer. More specifically, while a left-video image is displayed on the screen, the shutter glasses make the left-side lens transmit light and the right-hand side lens block light. Conversely, while a right-video image is displayed on the screen, the shutter glasses make the right-side lens transmit light and the left-side lens block light. As a result, the viewer sees afterimages of the right and left-video images overlaid on each other and thus perceives a single 3D video image.

According to the alternate-frame sequencing method, as described above, right and left-video images are alternately displayed in a predetermined cycle. For example, when 24 video frames are displayed per second for playing back normal 2D video images, 48 video frames in total for both right and left eyes need to be displayed for 3D video images. Accordingly, a display device capable of quickly executing rewriting of the screen is preferred for this method.

In a method using a lenticular lens, a right-video frame and a left-video frame are respectively divided into vertically long and narrow rectangular shaped small areas. The small areas of the right-video frame and the small areas of the left-video frame are alternately arranged in a horizontal direction on the screen and displayed at the same time. The surface of the screen is covered by a lenticular lens. The lenticular lens is a sheet-shaped lens constituted from multiple long and thin hog-backed lenses arranged in parallel. Each hog-backed lens lies in the longitudinal direction on the surface of the screen. When the viewer sees the left and right-video frames through the lenticular lens, only the viewer's left eye perceives light from the display areas of the left-video frame, and only the viewer's right eye perceives light from the display areas of the right-video frame. The viewer thus sees a 3D video image from the binocular parallax between the video images respectively perceived by the left and right eyes. Note that according to this method, another optical component having similar functions, such as a liquid crystal device, may be used instead of the lenticular lens. Alternatively, for example, a longitudinal polarization filter may be provided in the display areas of the left image frame, and a lateral polarization filter may be provided in the display areas of the right image frame. In this case, the viewer sees the screen through polarization glasses. In the polarization glasses, a longitudinal polarization filter is provided for the left lens, and a lateral polarization filter is provided for the right lens. Consequently, the right and left-video images are each perceived only by the corresponding eye, thereby allowing the viewer to perceive 3D video images.

In a method using parallax video, in addition to being constructed from the start by a combination of left and right-video images, the 3D video content can also be constructed from a combination of 2D video images and a depth map. The 2D video images represent 3D video images projected on a hypothetical 2D screen, and the depth map represents the depth of each pixel in each portion of the 3D video images as compared to the 2D screen. When the 3D content is constructed from a combination of 2D video images with a depth map, the 3D playback device or display device first constructs left and right-video images from the combination of 2D video images with a depth map and then creates 3D video images from these left and right-video images using one of the above-described methods.

Figure 83:
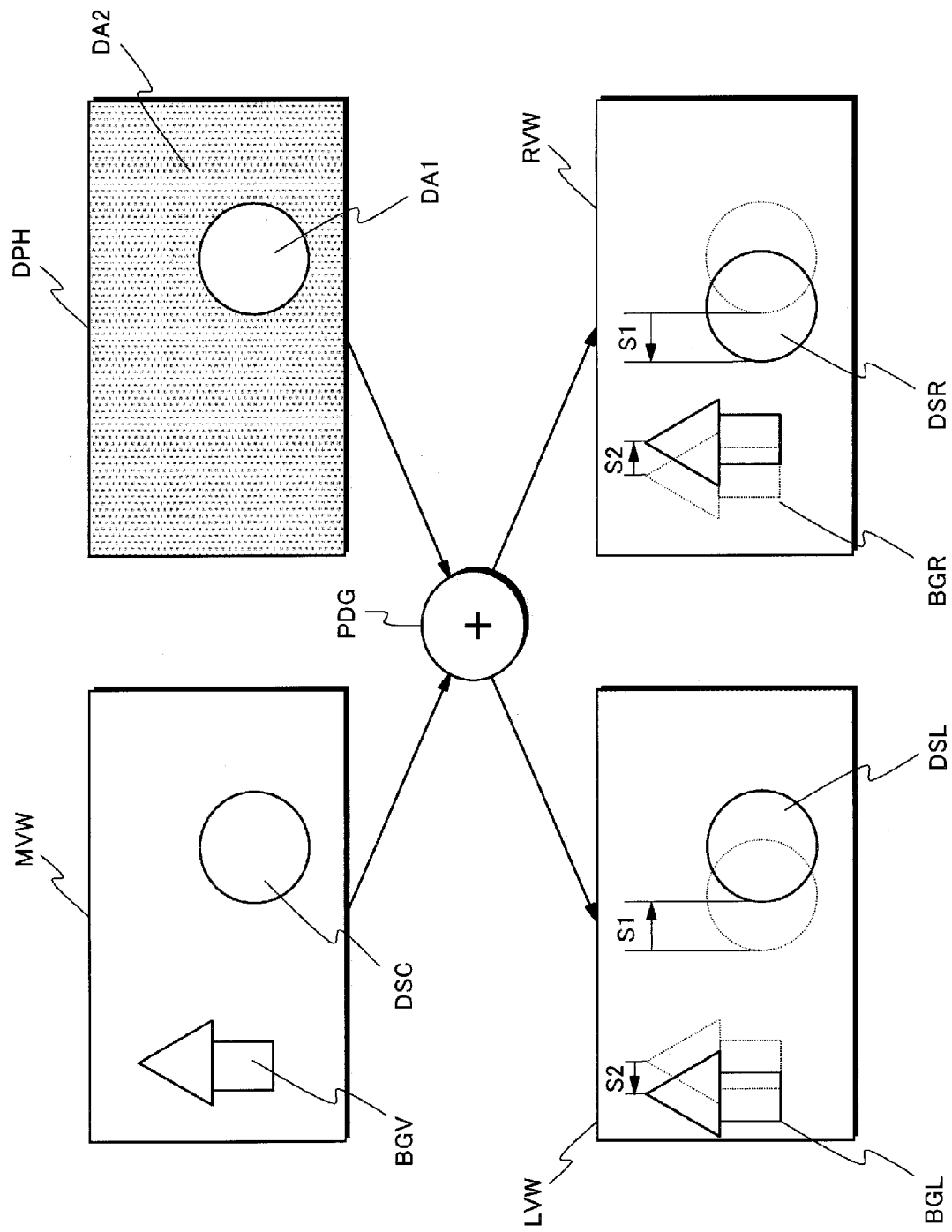
FIG. 83 is a schematic diagram showing an example of constructing a left-view LVW and a right-view RVW from the combination of a 2D video image MVW and a depth map DPH.

FIG. 83 is a schematic diagram showing an example of constructing a left-view LVW and a right-view RVW from the combination of a 2D video image MVW and a depth map DPH. As shown in FIG. 83, a circular plate DSC is shown in the background BGV of the 2D video image MVW. The depth map DPH indicates the depth for each pixel in each portion of the 2D video image MVW. According to the depth map DPH, in the 2D video image MVW, the display area DA1 of the circular plate DSC is closer to the viewer than the screen, and the display area DA2 of the background BGV is deeper than the screen. The parallax video generation unit PDG in the playback device first calculates the binocular parallax for each portion of the 2D video image MVW using the depth of each portion indicated by the depth map DPH. Next, the parallax video generation unit PDG shifts the presentation position of each portion in the 2D video image MVW to the left or right in accordance with the calculated binocular parallax to construct the left-view LVW and the right-view RVW. In the example shown in FIG. 83, the parallax video generation unit PDG shifts the presentation position of the circular plate DSC in the 2D video image MVW as follows: the presentation position of the circular plate DSL in the left-view LVW is shifted to the right by half of its binocular parallax, S1, and the presentation position of the circular plate DSR in the right-view RVW is shifted to the left by half of its binocular parallax, S1. In this way, the viewer perceives the circular plate DSC as being closer than the screen. Conversely, the parallax video generation unit PDG shifts the presentation position of the background BGV in the 2D video image MVW as follows: the presentation position of the background BGL in the left-view LVW is shifted to the left by half of its binocular parallax, S2, and the presentation position of the background BGR in the right-view RVW is shifted to the right by half of its binocular parallax, S2. In this way, the viewer perceives the background BGV as being deeper than the screen.

A playback system for 3D video images with use of parallax video is in general use, having already been established for use in movie theaters, attractions in amusement parks, and the like. Accordingly, this method is also useful for implementing home theater systems that can play back 3D video images. In the embodiments of the present invention, among methods using parallax video, an alternate-frame sequencing method or a method using polarization glasses is assumed to be used. However, apart from these methods, the present invention can also be applied to other, different methods, as long as they use parallax video. This will be obvious to those skilled in the art from the above explanation of the embodiments.

<File System on the BD-ROM Disc>

When UDF is used as the file system for the BD-ROM disc 101, the volume area 202B shown in FIG. 2 generally includes areas in which a plurality of directories, a file set descriptor, and a terminating descriptor are respectively recorded. Each "directory" is a data group composing the directory. A "file set descriptor" indicates the LBN of the sector in which a file entry for the root directory is stored. The "terminating descriptor" indicates the end of the recording area for the file set descriptor.

Each directory shares a common data structure. In particular, each directory includes a file entry, directory file, and a subordinate file group.

The "file entry" includes a descriptor tag, Information Control Block (ICB) tag, and allocation descriptor. The "descriptor tag" indicates that the type of the data that includes the descriptor tag is a file entry. For example, when the value of the descriptor tag is "261", the type of that data is a file entry. The "ICB tag" indicates attribute information for the file entry itself. The "allocation descriptor" indicates the LBN of the sector on which the directory file belonging to the same directory is recorded.

The "directory file" typically includes a plurality of each of a file identifier descriptor for a subordinate directory and a file identifier descriptor for a subordinate file. The "file identifier descriptor for a subordinate directory" is information for accessing the subordinate directory located directly below that directory. This file identifier descriptor includes identification information for the subordinate directory, directory name length, file entry address, and actual directory name. In particular, the file entry address indicates the LBN of the sector on which the file entry of the subordinate directory is recorded. The "file identifier descriptor for a subordinate file" is information for accessing the subordinate file located directly below that directory. This file identifier descriptor includes identification information for the subordinate file, file name length, file entry address, and actual file name. In particular, the file entry address indicates the LBN of the sector on which the file entry of the subordinate file is recorded. The "file entry of the subordinate file", as described below, includes address information for the data constituting the actual subordinate file.

By tracing the file set descriptors and the file identifier descriptors of subordinate directories/files in order, the file entry of an arbitrary directory/file recorded on the volume area 202B can be accessed. Specifically, the file entry of the root directory is first specified from the file set descriptor, and the directory file for the root directory is specified from the allocation descriptor in this file entry. Next, the file identifier descriptor for the directory immediately below the root directory is detected from the directory file, and the file entry for that directory is specified from the file entry address therein. Furthermore, the directory file for that directory is specified from the allocation descriptor in the file entry. Subsequently, from within the directory file, the file entry for the subordinate directory or subordinate file is specified from the file entry address in the file identifier descriptor for that subordinate directory or subordinate file.

"Subordinate files" include extents and file entries. The "extents" are a generally multiple in number and are data sequences whose logical addresses, i.e. LBNs, are consecutive on the disc. The entirety of the extents comprises the actual subordinate file. The "file entry" includes a descriptor tag, ICB tag, and allocation descriptors. The "descriptor tag" indicates that the type of the data that includes the descriptor tag is a file entry. The "ICB tag" indicates attribute information for the file entry itself. The "allocation descriptors" are provided in a one-to-one correspondence with each extent and indicate the arrangement of each extent on the volume area 202B, specifically the size of each extent and the LBN for the top of the extent. Accordingly, by referring to each allocation descriptor, each extent can be accessed. Also, the two most significant bits of each allocation descriptor indicate whether an extent is actually recorded on the sector for the LBN indicated by the allocation descriptor. Specifically, when the two most significant bits are "0", an extent has been assigned to the sector and has been actually recorded thereat. When the two most significant bits are "1", an extent has been assigned to the sector but has not been yet recorded thereat.

Like the above-described file system employing a UDF, when each file recorded on the volume area 202B is divided into a plurality of extents, the file system for the volume area 202B also generally stores the information showing the locations of the extents, as with the above-mentioned allocation descriptors, in the volume area 202B. By referring to the information, the location of each extent, particularly the logical address thereof, can be found.

<Size of Data Blocks and Extent Blocks>

As shown in FIG. 19, the multiplexed stream data on the BD-ROM disc 101 is arranged by being divided into dependent-view data blocks D[n] and base-view data blocks B[n] (n=0, 1, 2, 3, . . . ). Furthermore, these data block groups D[n] and B[n] are recorded consecutively on a track in an interleaved arrangement to form a plurality of extent blocks 1901-1903. To ensure seamless playback of both 2D video images and 3D video images from these extent blocks 1901-1903, the size of each data block and each extent block 1901-1903 should meet the following conditions based on the capability of the playback device 102.

<<Conditions Based on Capability in 2D Playback Mode>>

Figure 84:
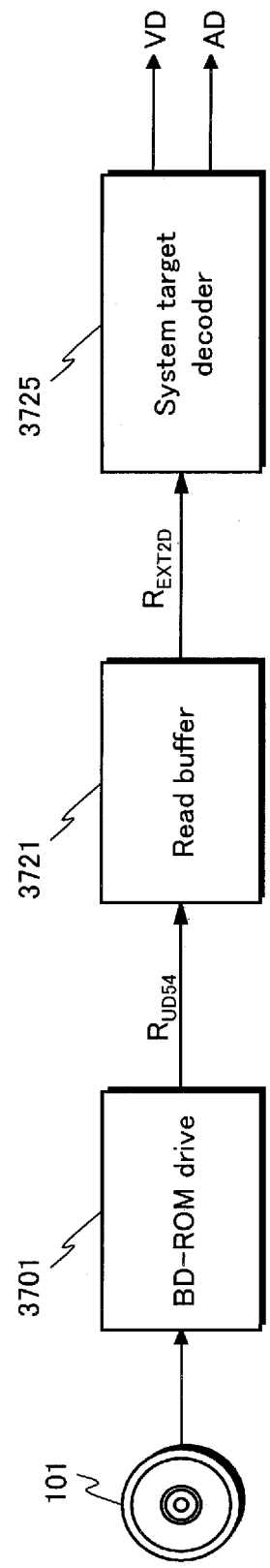
FIG. 84 is a block diagram showing playback processing in the playback device in 2D playback mode.

FIG. 84 is a block diagram showing playback processing in the playback device 102 in 2D playback mode. As shown in FIG. 84, this playback processing system includes the BD-ROM drive 3701, read buffer 3721, and system target decoder 4225 shown in FIG. 37. The BD-ROM drive 3701 reads 2D extents from the BD-ROM disc 101 and transfers the 2D extents to the read buffer 3721 at a read rate $R_{UD54}$. The system target decoder 4225 reads source packets from each 2D extent stored in the read buffer 3721 at a mean transfer rate $R_{EXT2D}$ and decodes the source packets into video data VD and audio data AD.

The mean transfer rate $R_{EXT2D}$ equals 192/188 times the mean rate of processing by the system target decoder 4225 to extract TS packets from each source packet. In general, this mean transfer rate $R_{EXT2D}$ changes for each 2D extent. The maximum value $R_{MAX2D}$ of the mean transfer rate $R_{EXT2D}$ equals 192/188 times the system rate $R_{TS}$ for the file 2D. In this case, the coefficient 192/188 is the ratio of bytes in a source packet to bytes in a TS packet. The mean transfer rate $R_{EXT2D}$ is conventionally represented in bits/second and specifically equals the value of the size of a 2D extent expressed in bits divided by the extent ATC time. The "size of an extent expressed in bits" is eight times the product of the number of source packets in the extent and the number of bytes per source packet (=192 bytes×8 bits/byte).

The read rate $R_{UD54}$ is conventionally expressed in bits/second and is set at a higher value, e.g. 54 Mbps, than the maximum value $R_{MAX2D}$ of the mean transfer rate $R_{EXT2D}$: $R_{UD54} > R_{MAX2D}$. This prevents underflow in the read buffer 3721 due to decoding processing by the system target decoder 4225 while the BD-ROM drive 3701 is reading a 2D extent from the BD-ROM disc 101.

FIG. 85A is a graph showing the change in the data amount DA stored in the read buffer 3721 during operation in 2D playback mode. FIG. 85B is a schematic diagram showing the correspondence between an extent block 8510 for playback and a playback path 8520 in 2D playback mode. As shown in FIG. 85B, in accordance with the playback path 8520, the base-view data blocks B[n] (n=0, 1, 2, . . . ) in the extent block 8510 are each read as one 2D extent EXT2D[n] from the BD-ROM disc 101 into the read buffer 3721. As shown in FIG. 85A, during the read period $PR_{2D}[n]$ for each 2D extent EXT2D[n], the stored data amount DA increases at a rate equal to $R_{UD54}-R_{EXT2D}[n]$, the difference between the read rate $R_{UD54}$ and the mean transfer rate $R_{EXT2D}[n]$. A jump $J_{2D}[n]$, however, occurs between two contiguous 2D extents EXT2D[n−1] and EXT2D[n]. Since the reading of two contiguous dependent-view data blocks Dn is skipped during the corresponding jump period $PJ_{2D}[n]$, reading of data from the BD-ROM disc 101 is interrupted. Accordingly, the stored data amount DA decreases at a mean transfer rate $R_{EXT2D}[n]$ during each jump period $PJ_{2D}[n]$.

Reading and transfer operations by the BD-ROM drive 3701 are not actually performed continuously, as suggested by the graph in FIG. 85A, but rather intermittently. During the read period $PR_{2D}[n]$ for each 2D extent, this prevents the stored data amount DA from exceeding the capacity of the read buffer 3721, i.e. overflow in the read buffer 3721. Accordingly, the graph in FIG. 85A represents what is actually a step-wise increase as an approximated straight increase.

In order to play back 2D video images seamlessly from the extent block 8510 shown in FIG. 85B, the following conditions [1] and [2] should be met.

[1] While data is continuously provided from the read buffer 3721 to the system target decoder 4225 during each jump period $PJ_{2D}[n]$, continual output from the system target decoder 4225 needs to be ensured. To do so, the following condition should be met: the size $S_{EXT2D}[n]$ of each 2D extent EXT2D[n] is the same as the data amount transferred from the read buffer 3721 to the system target decoder 4225 from the read period $PR_{2D}[n]$ through the next jump period $PJ_{2D}[n+1]$. If this is the case, then as shown in FIG. 85A, the stored data amount DA at the end of the jump period $PJ_{2D}[n+1]$ does not fall below the value at the start of the read period $PR_{2D}[n]$. In other words, during each jump period $PJ_{2D}[n]$, data is continuously provided from the read buffer 3721 to the system target decoder 4225. In particular, underflow does not occur in the read buffer 3721. In this case, the length of the read period $PR_{2D}[n]$ equals $S_{EXT2D}[n]/R_{UD54}$, the value obtained by dividing the size $S_{EXT2D}[n]$ of a 2D extent EXT2D[n] by the read rate $R_{UD54}$. Accordingly, the size $S_{EXT2D}[n]$ of each 2D extent EXT2D[n] should be equal to or greater than the minimum extent size expressed in the right-hand side of expression 1.

$$S_{EXT2D}[n] \geq \left( \frac{S_{EXT2D}[n]}{R_{UD54}} + T_{JUMP-2D}[n] \right) \times R_{EXT2D}[n] \quad (1)$$

$$\therefore S_{EXT2D}[n] \geq \mathrm{CEIL}\left( \frac{R_{EXT2D}[n]}{8} \times \frac{R_{UD54}}{R_{UD54} - R_{EXT2D}[n]} \times T_{JUMP-2D}[n] \right)$$

In expression 1, the jump time $T_{JUMP-2D}[n]$ represents the length of the jump period $PJ_{2D}[n]$ in seconds. The read rate $R_{UD54}$ and the mean transfer rate $R_{EXT2D}$ are both expressed in bits per second. Accordingly, in expression 1, the mean transfer rate $R_{EXT2D}$ is divided by 8 to convert the size $S_{EXT2D}[n]$ of the 2D extent from bits to bytes. That is, the size $S_{EXT2D}[n]$ of the 2D extent is expressed in bytes. The function CEIL( ) is an operation to round up fractional numbers after the decimal point of the value in parentheses.

[2] Since the capacity of the read buffer 3721 is limited, the maximum value of the jump period $T_{JUMP-2D}[n]$ is limited. In other words, even if the stored data amount DA immediately before a jump period $PJ_{2D}[n]$ is the maximum capacity of the read buffer 3721, if the jump time $T_{JUMP-2D}[n]$ is too long, the stored data amount DA will reach zero during the jump period $PJ_{2D}[n]$, and there is a danger of underflow occurring in the read buffer 3721. Hereinafter, the time for the stored data amount DA to decrease from the maximum capacity of the read buffer 3721 to zero while data supply from the BD-ROM disc 101 to the read buffer 3721 has stopped, that is, the maximum value of the jump time $T_{JUMP-2D}$ that guarantees seamless playback, is referred to as the "maximum jump time $T_{JUMP\_MAX}$".

In standards of optical discs, the correspondence between jump distances and maximum jump times is determined from the access speed of the optical disc drive and other factors. FIG. 86 is an example of a correspondence table between jump distances $S_{JUMP}$ and maximum jump times $T_{JUMP\_MAX}$ for a BD-ROM disc. As shown in FIG. 86, jump distances $S_{JUMP}$ are represented in units of sectors, and maximum jump times $T_{JUMP\_MAX}$ are represented in milliseconds. One sector equals 2048 bytes. When a jump distance $S_{JUMP}$ is zero sectors or is within a range of 1-10000 sectors, 10001-20000 sectors, 20001-40000 sectors, 40001 sectors-1/10 of a stroke, and 1/10 of a stroke or greater, the corresponding maximum jump time $T_{JUMP\_MAX}$ is 0 msec, 250 msec, 300 msec, 350 msec, 700 msec, and 1400 msec, respectively. When the jump distance $S_{JUMP}$ equals zero sectors, the maximum jump time $T_{JUMP\_MAX}$ equals a zero sector transition time $T_{JUMP0}$. In the example in FIG. 86, the zero sector transition time $T_{JUMP0}$ is considered to be 0 msec.

Based on the above considerations, the jump time $T_{JUMP-2D}[n]$ to be substituted into expression 1 is the maximum jump time $T_{JUMP\_MAX}$ specified for each jump distance by BD-ROM disc standards. Specifically, the jump distance $S_{JUMP}$ between the 2D extents EXT2D[n−1] and EXT2D[n] is substituted into expression 1 as the jump time $T_{JUMP-2D}[n]$. This jump distance $S_{JUMP}$ equals the maximum jump time $T_{JUMP\_MAX}$ that corresponds to the number of sectors from the end of the $(n+1)^{th}$ 2D extent EXT2D[n] to the top of the $(n+2)^{th}$ 2D extent EXT2D[n+1] as found in the table in FIG. 86.

Since the jump time $T_{JUMP-2D}[n]$ for the jump between two 2D extents EXT2D[n] and EXT2D[n+1] is limited to the maximum jump time $T_{JUMP\_MAX}$, the jump distance $S_{JUMP}$, i.e. the distance between the two 2D extents EXT2D[n] and EXT2D[n+1], is also limited. When the jump time $T_{JUMP}$ equals a maximum jump time $T_{JUMP\_MAX}$, the jump distance $S_{JUMP}$ reaches a maximum value, referred to as the "maximum jump distance $S_{JUMP\_MAX}$". For seamless playback of 2D video images, in addition to the size of 2D extents satisfying expression 1, the distance between 2D extents needs to be equal to or less than the maximum jump distance $S_{JUMP\_MAX}$.

Within each extent block, the distance between 2D extents equals the size of a dependent-view data block. Accordingly, this size is limited to being equal to or less than the maximum jump distance $S_{JUMP\_MAX}$. Specifically, when the maximum jump time $T_{JUMP\_MAX}$ between 2D extents is limited to the minimum value 250 msec specified in FIG. 86, then the distance between 2D extents, i.e. the size of dependent-view data blocks, is limited to the corresponding maximum jump distance $S_{JUMP\_MAX}$=10000 sectors or less.

When seamlessly playing back two extent blocks arranged on different recording layers, a long jump occurs between the $(n+1)^{th}$ 2D extent EXT2D[n] located at the end of the earlier extent block and the $(n+2)^{th}$ 2D extent EXT2D[n+1] located at the top of the later extent block. This long jump is caused by an operation, such as a focus jump, to switch the recording layer. Accordingly, in addition to the maximum jump time $T_{JUMP\_MAX}$ specified in the table in FIG. 86, the time required for this long jump further includes a "layer switching time", which is the time necessary for an operation to switch the recording layer. This "layer switching time" is, for example, 350 msec. As a result, in expression 1, which the size of the $(n+1)^{th}$ 2D extent EXT2D[n] should satisfy, the jump time $T_{JUMP-2D}[n]$ is determined by the sum of two parameters TJ[n] and TL[n]: $T_{JUMP-2D}[n]$=TJ[n]+TL[n]. The first parameter TJ[n] represents the maximum jump time $T_{JUMP\_MAX}$ specified for the jump distance $S_{JUMP}$ of the long jump according to BD-ROM disc standards. This maximum jump time $T_{JUMP\_MAX}$ equals the value, in the table in FIG. 86, corresponding to the number of sectors from the end of the $(n+1)^{th}$ 2D extent EXT2D[n] to the top of the $(n+2)^{th}$ 2D extent EXT2D[n+1]. The second parameter TL[n] represents the layer switching time, for example 350 msec. Accordingly, the distance between two 2D extents EXT2D[n] and EXT2D [n+1] is limited to being equal to or less than the maximum jump distance $S_{JUMP\_MAX}$ corresponding, in the table in FIG. 86, to the maximum jump time $T_{JUMP\_MAX}$ of the long jump minus the layer switching time.

<<Conditions Based on Capability in 3D Playback Mode>>

Figure 87:
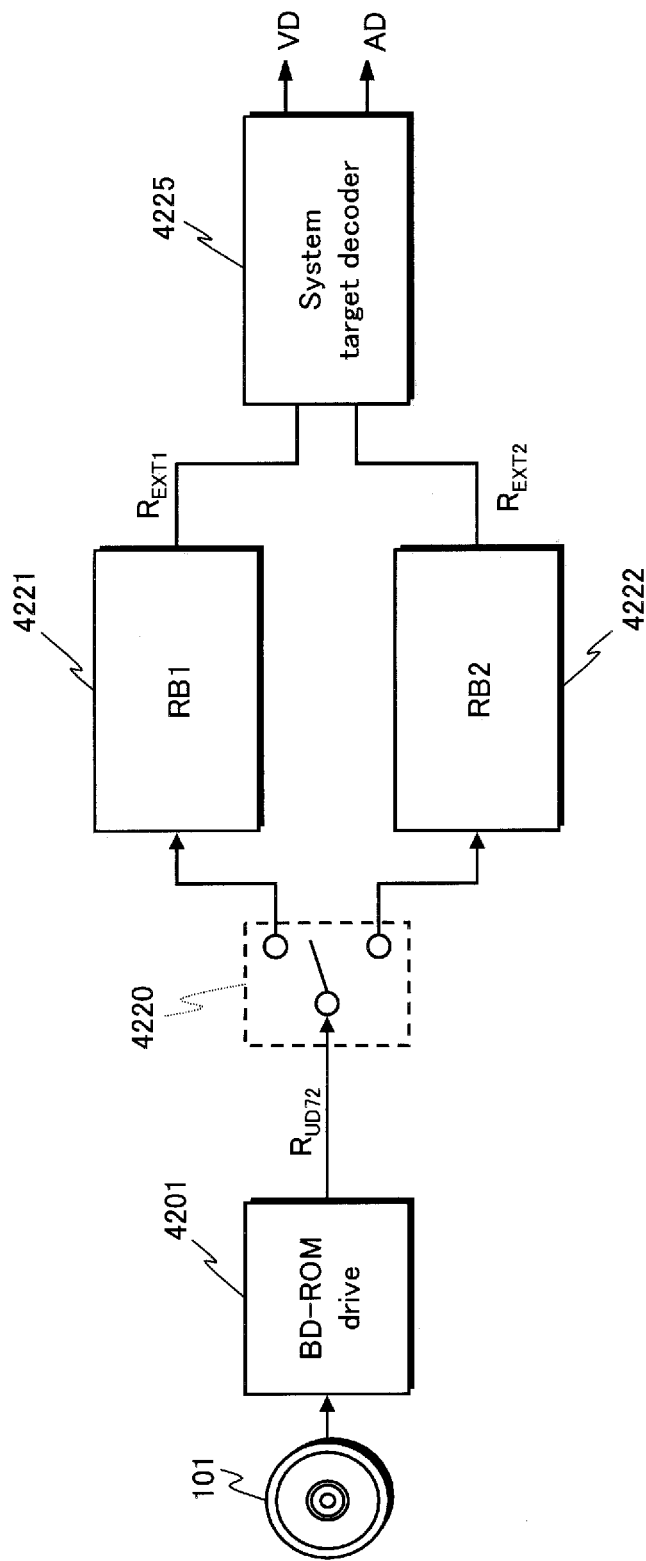
FIG. 87 is a block diagram showing playback processing in the playback device in 3D playback mode.

FIG. 87 is a block diagram showing playback processing in the playback device 102 in 3D playback mode. As shown in FIG. 87, from among the elements shown in FIG. 42, this playback processing system includes the BD-ROM drive 4201, switch 4220, pair of RB1 4221 and RB2 4222, and system target decoder 4225. The BD-ROM drive 4201 reads extents SS from the BD-ROM disc 101 and transfers the extents SS to the switch 4220 at a read rate $R_{UD72}$. The switch 4220 separates extents SS into base-view data blocks and dependent-view data blocks. The base-view data blocks are stored in the RB1 4221, and the dependent-view data blocks are stored in the RB2 4222. The system target decoder 4225 reads source packets from the base-view data blocks stored in the RB1 4221 at a base-view transfer rate $R_{EXT1}$ and reads source packets from the dependent-view data blocks stored in the RB2 4222 at a dependent-view transfer rate $R_{EXT2}$. The system target decoder 4225 also decodes pairs of read base-view data blocks and dependent-view data blocks into video data VD and audio data AD.

The base-view transfer rate $R_{EXT1}$ and the dependent-view transfer rate $R_{EXT2}$ equal 192/188 times the mean rate of processing by the system target decoder 4225 to extract TS packets respectively from each source packet in the base-view data blocks and the dependent-view data blocks. The maximum value $R_{MAX1}$ of the base-view transfer rate $R_{EXT1}$ equals 192/188 times the system rate $R_{TS1}$ for the file 2D. The maximum value $R_{MAX2}$ of the dependent-view transfer rate $R_{EXT2}$ equals 192/188 times the system rate $R_{TS2}$ for the file DEP. The transfer rates $R_{EXT1}$ and $R_{EXT2}$ are conventionally represented in bits/second and specifically equal the value of the size of each data block expressed in bits divided by the extent ATC time. The extent ATC time equals the time required to transfer all of the source packets in the data block from the read buffers 4221, 4222 to the system target decoder 4225.

The read rate $R_{UD72}$ is conventionally expressed in bits/second and is set at a higher value, e.g. 72 Mbps, than the maximum values $R_{MAX1}$, $R_{MAX2}$ of the transfer rates $R_{EXT1}$, $R_{EXT2}$: $R_{UD72}$>$R_{MAX1}$, $R_{UD72}$>$R_{MAX2}$. This prevents underflow in the RB1 4221 and RB2 4222 due to decoding processing by the system target decoder 4225 while the BD-ROM drive 4201 is reading an extent SS from the BD-ROM disc 101.

[Seamless Connection within an Extent Block]

FIGS. 88A and 88B are graphs showing changes in data amounts DA1 and DA2 stored in RB1 4221 and RB2 4222 when 3D video images are played back seamlessly from a single extent block. FIG. 88C is a schematic diagram showing a correspondence between the extent block 8810 and a playback path 8820 in 3D playback mode. As shown in FIG. 88C, in accordance with the playback path 8820, the entire extent block 8810 is read all at once as one extent SS. Subsequently, the switch 4220 separates the extent SS into dependent-view data blocks D[k] and base-view data blocks B[k] (k= . . . , n, n+1, n+2, . . . ).

Reading and transfer operations by the BD-ROM drive 4201 are not actually performed continuously, as suggested by the graphs in FIGS. 88A and 88B, but rather intermittently. During the read periods $PR_D[k]$ and $PR_B[k]$ for the data blocks D[k], B[k], this prevents overflow in the RB1 4221 and RB2 4222. Accordingly, the graphs in FIGS. 88A and 88B represent what is actually a step-wise increase as an approximated straight increase.

As shown in FIGS. 88A and 88B, during the read period $PR_D[n]$ of the $n^{th}$ dependent-view data block D[n], the stored data amount DA2 in the RB2 4222 increases at a rate equal to $R_{UD72}$−$R_{EXT2}[n]$, the difference between the read rate $R_{UD72}$ and a dependent-view transfer rate $R_{EXT2}[n]$, whereas the stored data amount DA1 in the RB1 4221 decreases at a base-view transfer rate $R_{EXT1}[n-1]$. As shown in FIG. 88C, a zero sector transition $J_0$[2n] occurs from the $(n+1)^{th}$ dependent-view data block D[n] to the $(n+1)^{th}$ base-view data block B[n]. As shown in FIGS. 88A and 88B, during the zero sector transition period $PJ_0[n]$, the stored data amount DA1 in the RB1 4221 continues to decrease at the base-view transfer rate $R_{EXT1}[n-1]$, whereas the stored data amount DA2 in the RB2 4222 decreases at the dependent-view transfer rate $R_{EXT2}[n]$.

As further shown in FIGS. 88A and 88B, during the read period $PR_B[n]$ of the $n^{th}$ base-view data block B[n], the stored data amount DA1 in the RB1 4221 increases at a rate equal to $R_{UD72}$−$R_{EXT1}[n]$, the difference between the read rate $R_{UD72}$ and a base-view transfer rate $R_{EXT1}[n]$. On the other hand, the stored data amount DA2 in the RB2 4222 continues to decrease at the dependent-view transfer rate $R_{EXT2}[n]$. As further shown in FIG. 88C, a zero sector transition $J_0[2n+1]$ occurs from the base-view data block B[n] to the next dependent-view data block D(n+1). As shown in FIGS. 88A and 88B, during the zero sector transition period $PJ_0[2n+1]$, the stored data amount DA1 in the RB1 4221 decreases at the base-view transfer rate $R_{EXT1}[n]$, and the stored data amount DA2 in the RB2 4222 continues to decrease at the dependent-view transfer rate $R_{EXT2}[n]$.

In order to play back 3D video images seamlessly from one extent block 8810, the following conditions [3] and [4] should be met.

[3] The size $S_{EXT1}[n]$ of the $(n+1)^{th}$ base-view data block B[n] is at least equal to the data amount transferred from the RB1 4221 to the system target decoder 4225 from the corresponding read period $PR_B[n]$ until immediately before the read period $PR_B[n+1]$ of the next base-view data block B[n+1]. In this case, as shown in FIG. 88A, immediately before the read period $PR_B[n+1]$ of the next base-view data block B[n+1], the stored data amount DA1 in the RB1 4221 does not fall below the amount immediately before the read period $PR_B[n]$ of the $n^{th}$ base-view data block B[n]. The length of the read period $PR_B[n]$ of the $(n+1)^{th}$ base-view data block B[n] equals $S_{EXT1}[n]/R_{UD72}$, the value obtained by dividing the size $S_{EXT1}[n]$ of this base-view data block B[n] by the read rate $R_{UD72}$. On the other hand, the length of the read period $PR_R[n+1]$ of the $(n+2)^{th}$ dependent-view data block D[n+1] equals $S_{EXT2}[n+1]/R_{UD72}$, the value obtained by dividing the size $S_{EXT2}[n+1]$ of this dependent-view data block D[n+1] by the read rate $R_{UD72}$. Accordingly, the size $S_{EXT1}[n]$ of this base-view data block B[n] should be equal to or greater than the minimum extent size expressed in the right-hand side of expression 2.

$$S_{EXT1}[n] \geq \left( \frac{S_{EXT1}[n]}{R_{UD72}} + T_{JUMP0}[2n+1] + \frac{S_{EXT2}[n+1]}{R_{UD72}} + T_{JUMP0}[2n+2] \right) \times R_{EXT1}[n] \quad (2)$$

$$\therefore S_{EXT1}[n] \text{CEIL} \left\{ \frac{R_{EXT1}[n]}{8} \times \frac{R_{UD72}}{R_{UD72} - R_{EXT1}[n]} \times \left( T_{JUMP0}[2n+1] + \frac{S_{EXT2}[n+1]}{R_{UD72}} + T_{JUMP0}[2n+2] \right) \right\}$$

[4] The size $S_{EXT2}[n]$ of the $(n+1)^{th}$ dependent-view data block D[n] is at least equal to the data amount transferred from the RB2 4222 to the system target decoder 4225 from the corresponding read period $PR_R[n]$ until immediately before the read period $PR_D[n+1]$ of the next dependent-view data block D[n+1]. In this case, as shown in FIG. 88B, immediately before the read period $PR_D[n+1]$ of the next dependent-view data block D[n+1], the stored data amount DA2 in the RB2 4222 does not fall below the amount immediately before the read period $PR_D[n]$ of the $n^{th}$ dependent-view data block D[n]. The length of the read period $PR_D[n]$ of the $(n+1)^{th}$ dependent-view data block D[n] equals $S_{EXT2}[n]/R_{UD72}$, the value obtained by dividing the size $S_{EXT2}[n]$ of this dependent-view data block D[n] by the read rate $R_{UD72}$. Accordingly, the size $S_{EXT2}[n]$ of this dependent-view data block D[n] should be equal to or greater than the minimum extent size expressed in the right-hand side of expression 3.

$$S_{EXT2}[n] \geq \left( \frac{S_{EXT2}[n]}{R_{UD72}} + T_{JUMP0}[2n] + \frac{S_{EXT1}[n]}{R_{UD72}} + T_{JUMP0}[2n+1] \right) \times R_{EXT2}[n] \quad (3)$$

$$\therefore S_{EXT2}[n] \geq \text{CEIL} \left\{ \frac{R_{EXT2}[n]}{8} \times \frac{R_{UD72}}{R_{UD72} - R_{EXT2}[n]} \times \left( T_{JUMP0}[2n] + \frac{S_{EXT1}[n+1]}{R_{UD72}} + T_{JUMP0}[2n+1] \right) \right\}$$

[Seamless Connection Between Extent Blocks]

FIG. 89B is a schematic diagram showing an $(M+1)^{th}$ (the letter M represents an integer greater than or equal to 1) extent block 8901 and $(M+2)^{th}$ extent block 8902 and the correspondence between these extent blocks 8901 and 8902 and a playback path 8920 in 3D playback mode. As shown in FIG. 89B, the two extent blocks 8901 and 8902 are separated by a layer boundary LB or a recording area for other data. In accordance with the playback path 8920, the entire $M^{th}$ extent block 8901 is first read all at once as the $(M+1)^{th}$ extent SS EXTSS[M]. A jump J[M] occurs immediately thereafter. Subsequently, the $(M+2)^{th}$ extent block 8902 is read all at once as the $(M+1)^{th}$ extent SS EXTSS[M+1].

FIG. 89A is a graph group showing changes in data amounts DA1 and DA2 stored in RB1 4221 and RB2 4222, as well as the changes in the sum DA1+DA2, when 3D video images are continually played back seamlessly from two extent blocks 8901 and 8902. In FIG. 89A, the alternating long and short dashed line indicates changes in the data amount DA1 stored in the RB1 4221, the dashed line indicates changes in the data amount DA2 stored in the RB2 4222, and the solid line indicates changes in the sum DA1+DA2 of the two data amounts. In this graph, the solid line is an approximation that averages small changes each time a data block is read. Furthermore, the zero sector transition time $T_{JUMP0}$ is considered to be "zero seconds".

As shown in FIG. 89A, during the period $PR_{BLK}[M]$ during which the entire $(M+1)^{th}$ extent block 8901 is read from the BD-ROM disc 101 into the RB1 4221 and RB2 4222, the data amounts DA1 and DA2 respectively stored in the RB1 4221 and RB2 4222 both increase. Specifically, during the period $PR_{BLK}[M]$ during which the entire $(M+1)^{th}$ extent block 8901 is read, the sum DA1+DA2 of the stored data amounts increases at a rate equal to the difference $R_{UD72}-R_{EXTSS}[M]$ between the read rate $R_{UD72}$ and a mean transfer rate $R_{EXTSS}[M]$. This mean transfer rate $R_{EXTSS}[M]$ is assessed as the value obtained by dividing the size of the entire $(M+1)^{th}$ extent block 8701, i.e. the size $S_{EXTSS}[M]$ of the $(M+1)^{th}$ extent SS EXTSS[M], by the extent ATC time $T_{EXTSS}$.

At the point the last base-view data block in the $(M+1)^{th}$ extent block 8901 is read into the RB1 4221, the sum DA1+DA2 of the stored data amount reaches its maximum value. During the period PJ[M] of the immediately subsequent jump J[M], the sum DA1+DA2 of the stored data amount decreases at the mean transfer rate $R_{EXTSS}[M]$. Accordingly, by adjusting the maximum value of the sum DA1+DA2 of the stored data amount to be sufficiently large, underflow in the RB1 4221 and RB2 4222 during the jump J[M] can be prevented. As a result, the two extent blocks 8901 and 8902 can be seamlessly connected.

The maximum value of the sum DA1+DA2 of the stored data amount is determined by the size of the $(M+1)^{th}$ extent block 8701. Accordingly, in order to seamlessly connect the $(M+1)^{th}$ extent block 8901 to the $(M+2)^{th}$ extent block 8902, the size of the $(M+1)^{th}$ extent block 8901, i.e. the size $S_{EXTSS}[M]$ of the $(M+1)^{th}$ extent SS EXTSS[M], should satisfy condition 5.

[5] During the read period $PR_D[m]$ of the dependent-view data block D located at the top of the $(M+1)^{th}$ extent block 8901, preloading is performed (the letter m represents an integer greater than or equal to 1). During this preload period $PR_D[m]$, the base-view data block B corresponding to the dependent-view data block D has not been stored in the RB1 4221, and thus the dependent-view data block D cannot be transferred from the RB2 4222 to the system target decoder 4225. Accordingly, data in the $M^{th}$ extent block is transferred from the RB2 4222 to the system target decoder 4225 during the preload period $PR_D[m]$. This maintains the data provision to the system target decoder 4225. Similarly, during the read period $PR_D[n]$ of the dependent-view data block D located at the top of the $(M+2)^{th}$ extent block 8902, preloading is performed (the letter n represents an integer greater than or equal to m+1). Accordingly, during the preload period $PR_D[n]$, continued from the immediately prior jump J[M] period, data in the $(M+1)^{th}$ extent block 8901 is transferred from the RB2 4222 to the system target decoder 4225. This maintains the data provision to the system target decoder 4225. Therefore, in order to prevent underflow in both RB1 4221 and RB2 4222 during the jump J[M], the extent ATC time $T_{EXTSS}$ of the $(M+1)^{th}$ extent SS EXTSS[M] should be at least equal to the length of the period from the end time T0 of the preload period $PR_D[m]$ in the $(M+1)^{th}$ extent block 8901 until the end time T1 of the preload period $PR_D[n]$ in the $(M+2)^{th}$ extent block 8902. In other words, the size $S_{EXTSS}[M]$ of the $(M+1)^{th}$ extent SS EXTSS[M] should at least be equal to the sum of the data amounts transferred from the RB1 4221 and RB2 4222 to the system target decoder 4225 during the period T0-T1.

As is clear from FIG. 89A, the length of the period T0-T1 equals the sum of the length of the read period $PR_{BLK}[M]$ of the $(M+1)^{th}$ extent block 8901, the jump time $T_{JUMP}[M]$ of the jump J[M], and the difference $T_{DIFF}[M]$ in the lengths of the preload periods $PR_D[n]$ and $PR_D[m]$ in the extent blocks 8901 and 8002. Furthermore, the length of the read period $PR_{BLK}[M]$ of the (M+1)$^{th}$ extent block 8901 equals $S_{EXTSS}[M]/R_{UD72}$, the value obtained by dividing the size $S_{EXTSS}[M]$ of the (M+1)$^{th}$ extent SS EXTSS[M] by the read rate $R_{UD72}$. Accordingly, the size $S_{EXTSS}[M]$ of the (M+1)$^{th}$ extent SS EXTSS[M] should be equal to or greater than the minimum extent size expressed in the right-hand side of expression 4.

$$S_{EXTSS}[M] \geq \left( \frac{S_{EXTSS}[M]}{R_{UD72}} + T_{JUMP}[M] + T_{DIFF}[M] \right) \times R_{EXTSS}[M] \quad (4)$$

$$\therefore S_{EXTSS}[M] \geq \frac{R_{UD72} \times R_{EXTSS}[M]}{R_{UD72} - R_{EXTSS}[M]} \times (T_{JUMP}[M] + T_{DIFF}[M])$$

The lengths of the preload periods $PR_D[m]$ and $PR_D[n]$ respectively equal $S_{EXT2}[m]/R_{UD72}$ and $S_{EXT2}[n]/R_{UD72}$, the values obtained by dividing the sizes $S_{EXT2}[m]$ and $S_{EXT2}[n]$ of the dependent-view data block D located at the top of the extent blocks 8901 and 8902 by the read rate $R_{UD72}$. Accordingly, the difference $T_{DIFF}$ in the lengths of the preload periods $PR_D[m]$ and $PR_D[n]$ equals the difference in these values: $T_{DIFF} = S_{EXT2}[n]/R_{UD72} - S_{EXT2}[M]/R_{UD72}$. Note that, like the right-hand side of expressions 1-3, the right-hand side of expression 4 may be expressed as an integer value in units of bytes.

Also, when decoding of multiplexed stream data is improved upon as follows, the difference $T_{DIFF}$ in the right-hand side of expression 4 may be considered to be zero. First, the maximum value of the difference $T_{DIFF}$ throughout the multiplexed stream data, i.e. the worst value of $T_{DIFF}$, is sought. Next, when the multiplexed stream data is played back, the start of decoding is delayed after the start of reading by a time equal to the worst value of $T_{DIFF}$.

<<Conditions for Reducing the Capacities of the Read Buffers>>

Figures 90A, 90B:
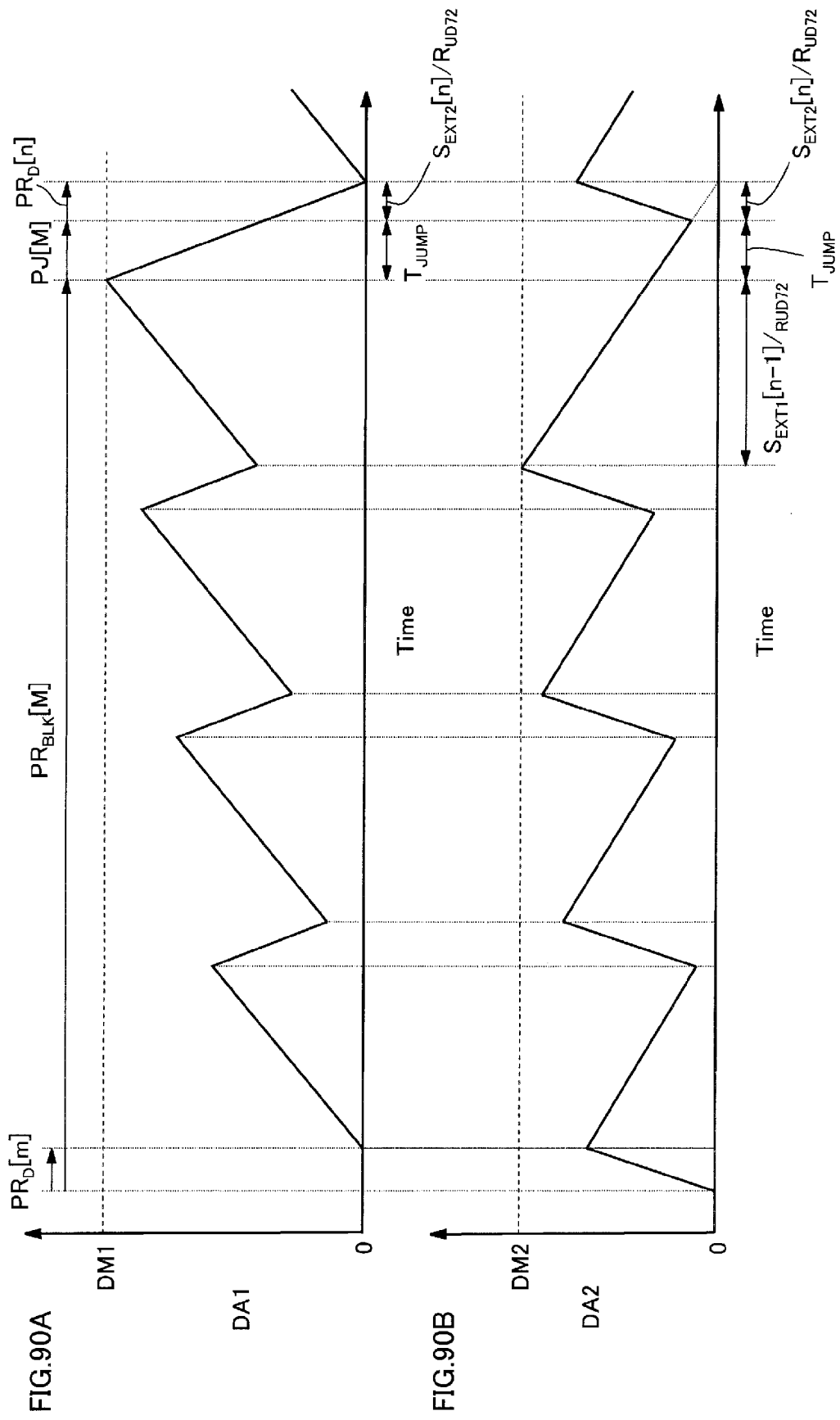
FIGS. 90A and 90B are graphs showing changes in data amounts DA1 and DA2 stored in RB1 4221 and RB2 4222 when 3D video images are played back seamlessly from the two consecutive extent blocks 8901 and 8902 shown in FIG. 89B.

FIGS. 90A and 90B are graphs showing changes in data amounts DA1 and DA2 stored in RB1 4221 and RB2 4222 when 3D video images are played back seamlessly from the two consecutive extent blocks 8901 and 8902 shown in FIG. 89B. As shown in FIG. 90A, the stored data amount DA1 in the RB1 4221 reaches a maximum value DM1 at the point when the base-view data block B[n−1] at the end of the (M+1)$^{th}$ extent block 8901 is read into the RB1 4221. Furthermore, the stored data amount DA1 decreases at the base-view transfer rate $R_{EXT1}[n-1]$ from the period PJ[M] of the immediately subsequent jump J[M] through the preload period $PR_D[n]$ in the (M+2)$^{th}$ extent block 8902. Accordingly, to prevent the stored data amount DA1 from reaching zero before completion of the preload period $PR_D[n]$, the maximum value DM1 of the stored data amount DA1 should be equal to or greater than the data amount transferred from the RB1 4221 to the system target decoder 4225 during the jump period PJ[M] and the preload period $PR_D[n]$. In other words, the maximum value DM1 of the stored data amount DA1 should be greater than or equal to the sum of the length $T_{JUMP}[M]$ of the jump period PJ[M] and the length of the preload period $PR_D[n]$, $S_{EXT2}[n]/R_{UD72}$, multiplied by the base-view transfer rate $R_{EXT1}[n-1]$: DM1$\geq$($T_{JUMP}[M]$+$S_{EXT2}[n]/R_{UD72}$)×$R_{EXT1}[n-1]$. When the length $T_{JUMP}[M]$ of the jump period PJ[M] equals the maximum jump time $T_{JUMP\_MAX}$ of the jump J[M], and the base-view transfer rate $R_{EXT1}[n-1]$ equals its maximum value $R_{MAX1}$, the maximum value DM1 of the stored data amount DA1 is at its largest value. Accordingly, the RB1 4221 is required to have a capacity RB1 equal to or greater than the maximum value DM1 in this case: RB1$\geq$($T_{JUMP\_MAX}$+$S_{EXT2}[n]/R_{UD72}$)×$R_{MAX1}$.

On the other hand, as shown in FIG. 90B, at the point when reading of the end base-view data block B[n−1] in the (M+1)$^{th}$ extent block 8901 starts, the stored data amount DA2 in the RB2 4222 reaches its maximum value DM2. Furthermore, the stored data amount DA2 decreases at a dependent-view transfer rate $R_{EXT2}[n-1]$ from the read period of the base-view data block B[n−1] through the preload period $PR_D[n]$ in the (M+2)$^{th}$ extent block 8902. Accordingly, in order to maintain provision of data to the system target decoder 4225 through the end of the preload period $PR_D[n]$, the maximum value DM2 of the stored data amount DA2 should be equal to or greater than the data amount transferred from the RB2 4222 to the system target decoder 4225 during the read period of the base-view data block B[n−1], the jump period PJ[M], and the preload period $PR_D[n]$. In other words, the maximum value DM2 of the stored data amount DA2 should be greater than or equal to the sum of the length of the read period of the base-view data block B[n−1] $S_{EXT1}[n-1]/R_{UD72}$, the length $T_{JUMP}[M]$ of the jump period PJ[M], and the length of the preload period $PR_D[n]$, $S_{EXT2}[n]/R_{UD72}$, multiplied by the dependent-view transfer rate $R_{EXT2}[n-1]$: DM2$\geq$($S_{EXT2}[n-1]/R_{UD72}$+$T_{JUMP}[M]$+$S_{EXT2}[n]/R_{UD72}$)×$R_{EXT1}[n-1]$. When the length $T_{JUMP}[M]$ of the jump period PJ[M] equals the maximum jump time $T_{JUMP\_MAX}$ of the jump J[M], and the dependent-view transfer rate $R_{EXT2}[n-1]$ equals its maximum value $R_{MAX2}$, the maximum value DM2 of the stored data amount DA2 is at its largest value. Accordingly, the RB2 4222 is required to have a capacity RB2 equal to or greater than the maximum value DM2 in this case: RB2$\geq$($S_{EXT1}[n-1]/R_{UD72}$+$T_{JUMP\_MAX}$+$S_{EXT2}[n]/R_{UD72}$)×$R_{MAX2}$. Furthermore, since any dependent-view data block may be the first data block read during interrupt playback, the capacity RB2 of the RB2 4222 should not be less than the size of any of the dependent-view data blocks: RB2$\geq$$S_{EXT2}[k]$ (the letter k represents an arbitrary integer).

As per the above description, the lower limits of the capacities RB1 and RB2 of the RB1 4221 and RB2 4222 are determined by the sizes $S_{EXT1}[k]$ and $S_{EXT2}[k]$ of the data blocks. Accordingly, in order to economize the capacities RB1 and RB2, the upper limit of the sizes $S_{EXT1}[k]$ and $S_{EXT2}[k]$ of the data blocks, i.e. the maximum extent size, is limited via the following condition [6].

[6] As shown in FIG. 19, the base-view data blocks B[k] in each extent block 1901-1903 are shared by a file 2D and a file SS. Accordingly, the size $S_{EXT1}[k]$ of the base-view data blocks B[k] should satisfy expression 1. On the other hand, in order to reduce the capacity RB1 of the RB1 4221 as much as possible, the size $S_{EXT1}[k]$ of the base-view data blocks B[k] should be equal to or less than the lower limit of the minimum extent size of 2D extents. In other words, the size $S_{EXT1}[k]$ should be equal to or less than the maximum extent size expressed in the right-hand side of expression 5.

$$S_{EXT1}[k] \leq \text{CEIL}\left( \frac{R_{EXT1}[k]}{8} \times \frac{R_{UD54}}{R_{UD54} - R_{MAX1}} \times T_{JUMP-2D\_MIN} \right) \quad (5)$$

Note that the lower limit of the minimum extent size of 2D extents is assessed by the expression 1 in which the mean transfer rate $R_{EXT2D}$ included in the denominator of the right-hand side of expression 1 has been replaced with the maximum value $R_{MAX}$. In this expression, the jump time $T_{JUMP-2D\_MIN}$ is the minimum value of the jump time necessary in each extent block 1901-1903, i.e. the minimum value of the maximum jump time $T_{JUMP\_MAX}$ between 2D extents. Specifically, the jump time $T_{JUMP\_2D\_MIN}$ is set to the minimum value 250 msec specified in the table in FIG. 86. Meanwhile, the distance between 2D extents equals the size $S_{EXT2}[k]$ of a dependent-view data block D[k]. Accordingly, when the jump time $T_{JUMP\_2D\_MIN}$ is set to 250 msec, the size $S_{EXT2}[k]$ of the dependent-view data block D[k] is limited to the maximum jump distance $S_{JUMP\_MAX}$=10000 sectors or less corresponding to the maximum jump time $T_{JUMP\_MAX}$=250 msec in the table in FIG. 86. In other words, the maximum extent size of dependent-view data blocks is 10000 sectors.

<<Conclusion>>

To seamlessly play back both 2D video images and 3D video images from a plurality of extent blocks, all of the above conditions [1]-[6] should be satisfied. In particular, the sizes of the data blocks and extent blocks should satisfy the following conditions 1-5.

Condition 1: The size $S_{EXT2D}$ of a 2D extent should satisfy expression 1.

Condition 2: The size $S_{EXT1}$ of a base-view data block should satisfy expression 2.

Condition 3: The size $S_{EXT2}$ a dependent-view data block should satisfy expression 3.

Condition 4: The size $S_{EXTSS}$ of an extent block should satisfy expression 4.

Condition 5: The size $S_{EXT1}$ of a base-view data block should satisfy expression 5.

<<Modifications to Condition 1>>

As is clear from the playback path 2101 in 2D playback mode shown in FIG. 21, jumps occur frequently in 2D playback mode. Accordingly, to further ensure seamless playback, it is preferable to further add a margin (allowance) to the minimum extent size of the 2D extents represented by the right-hand side of expression 1. However, the addition of this margin should not change expression 5. This is because it may cause the capacity of read buffer to increase. The following are three methods for adding such a margin without changing expression 5.

The first method adds a margin to the minimum extent size of a 2D extent by replacing the mean transfer rate $R_{EXT2D}$ included in the denominator of the right-hand side of expression 1 with the maximum value $R_{MAX}$. In other words, condition 1 is changed so that the size $S_{EXT2D}$ of a 2D extent satisfies expression 6 instead of expression 1.

$$S_{EXT2D}[n] \geq \mathrm{CEIL}\left(\frac{R_{EXT2D}[n]}{8} \times \frac{R_{UD54}}{R_{UD54} - R_{MAX}} \times T_{JUMP\text{-}2D}[n]\right) \quad (6)$$

Note that, in the expression 5, an expression which is obtained by replacing the mean transfer rate $R_{EXT2D}$ included in the denominator of the right-hand side of expression 1 with the maximum value $R_{MAX2D}$ is used. Accordingly, even if the expression 1 is changed to the expression 6, the expression 5 is not changed.

The second method adds a margin to the minimum extent size of a 2D extent by extending the extent ATC time of the 2D extent by ΔT seconds. In other words, condition 1 is changed so that the size $S_{EXT2D}$ of a 2D extent satisfies expression 7A or 7B instead of expression 1.

$$S_{EXT2D}[n] \geq \quad (7A)$$
$$\mathrm{CEIL}\left\{\frac{R_{EXT2D}[n]}{8} \times \left(\frac{R_{UD54}}{R_{UD54} - R_{EXT2D}[n]} \times T_{JUMP\text{-}2D}[n] + \Delta T\right)\right\}$$

$$S_{EXT2D}[n] \geq \quad (7B)$$
$$\mathrm{CEIL}\left\{\frac{R_{EXT2D}[n]}{8} \times \left(\frac{R_{UD54}}{R_{UD54} - R_{MAX}} \times T_{JUMP\text{-}2D}[n] + \Delta T\right)\right\}$$

The extension time ΔT may be determined by the length of a GOP, or by the upper limit of the number of extents that can be played back during a predetermined time. For example, if the length of a GOP is one second, ΔT is set to 1.0 seconds. On the other hand, if the upper limit of the number of extents that can be played back during a predetermined time in seconds is n, then ΔT is set to the predetermined time/n.

The third method adds a margin to the minimum extent size of the 2D extent by replacing the mean transfer rate $R_{EXT2D}$ included throughout the right-hand side of expression 1 with the maximum value $R_{MAX2D}$. In other words, condition 1 is changed so that the size $S_{EXT2D}$ of a 2D extent satisfies expression 8 instead of expression 1.

$$S_{EXT2D}[n] \geq \mathrm{CEIL}\left(\frac{R_{MAX}}{8} \times \frac{R_{UD54}}{R_{UD54} - R_{MAX}} \times T_{JUMP\text{-}2D}[n]\right) \quad (8)$$

In this method, an even larger margin can be added to the minimum extent size. Conversely, however, even when the bit rate of the 2D extent is low, the size needs to be maintained sufficiently large. Accordingly, it is necessary to compare the size of the margin with the efficiency of recording data on the BD-ROM disc.

Note that, when the second method is adopted and if more certainty of the seamless playback of 2D video images may be prioritized over the reduction of the capacity of the read buffer, expression 5 may be changed to expression 9.

$$S_{EXT1}[n] \leq \quad (9)$$
$$\mathrm{CEIL}\left\{\frac{R_{EXT2D}[n]}{8} \times \left(\frac{R_{UD54}}{R_{UD54} - R_{MAX2D}} \times T_{JUMP\text{-}2D\_MIN} + \Delta T\right)\right\}$$

<Transfer Speed of Stream Data>

Figure 91:
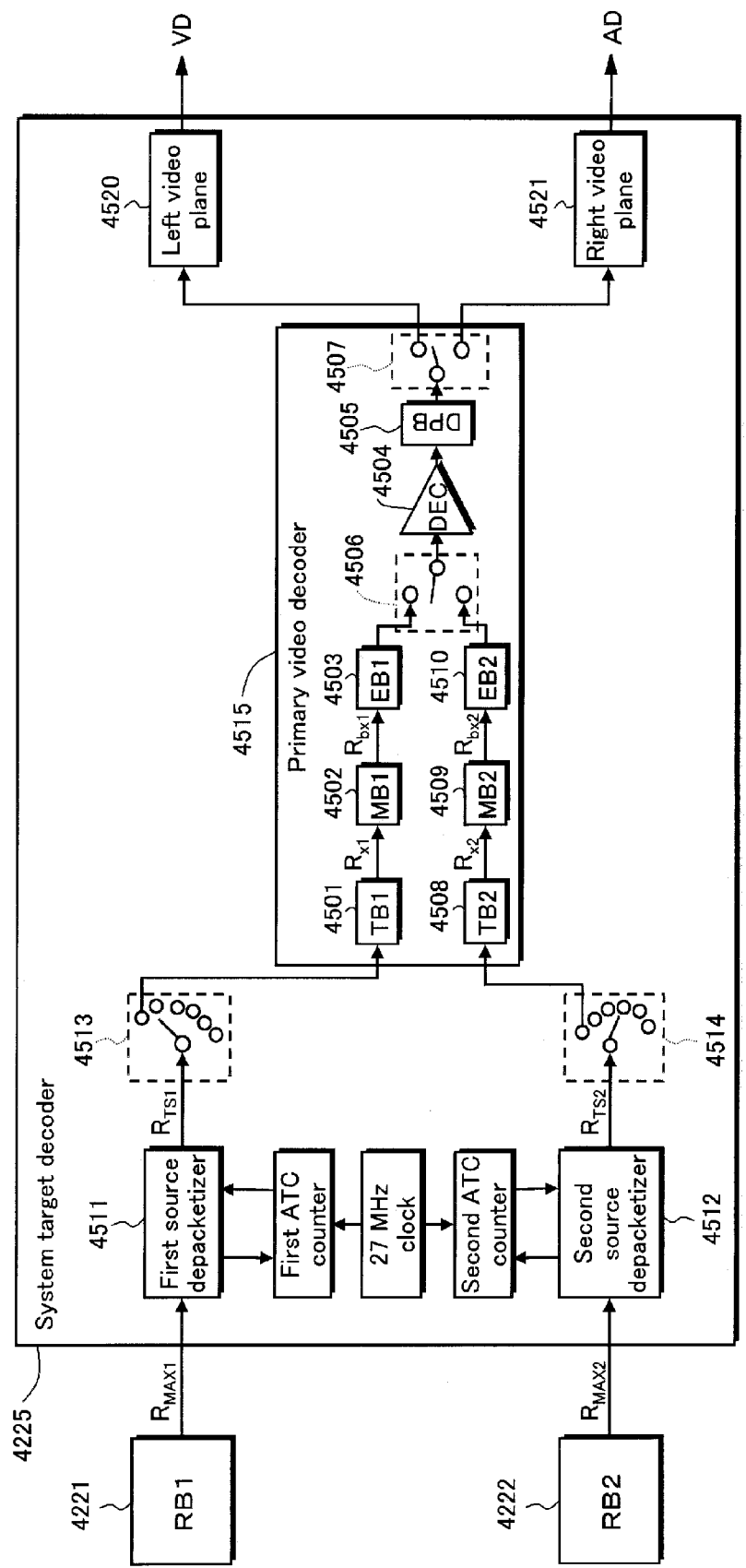
FIG. 91 is a block diagram showing the video stream processing system provided in the system target decoder 4225 in the 3D playback mode.

FIG. 91 is a block diagram showing the video stream processing system provided in the system target decoder 4225 in the 3D playback mode. As shown in FIG. 91, the processing system includes the pair of source depacketizers 4511 and 4512, the pair of PID filters 4513 and 4514, and the primary video decoder 4515 which are shown in FIG. 45.

The first source depacketizer 4511 reads source packets from each base-view data block in the RB1 4221 at the base-view transfer rate $R_{EXT1}$. The first source depacketizer 4511 further extracts TS packets from the source packets and transfers the TS packets to the first PID filter 4513. The mean transfer speed reaches the system rate $R_{TS1}$ for the file 2D at the maximum. Thus the maximum value $R_{MAX1}$ of the base-view transfer rate $R_{EXT1}$ equals 192/188 times the system rate $R_{TS1}$. The first PID filter 4513 transmits TS packets including the base-view video stream to the TB1 4501 in the primary video decoder 4515. The TB1 4501 restores PES packets from the TS packets and transfers the PES packets to the MB1 4502 at the mean speed $R_{X1}$. The MB1 4502 extracts VAUs of the base-view video stream from the PES packets, and transfers the VAUs to the EB1 4503 at the mean speed $R_{bx1}$.

The second source depacketizer 4512 reads source packets from each dependent-view data block in the RB2 4222 at the dependent-view transfer rate $R_{EXT2}$. The second source depacketizer 4512 further extracts TS packets from the source packets and transfers the TS packets to the second PID filter 4514. The mean transfer speed reaches the system rate $R_{TS2}$ for the file DEP at the maximum. Thus the maximum value $R_{MAX2}$ of the dependent-view transfer rate $R_{EXT2}$ equals 192/188 times the system rate $R_{TS2}$. The second PID filter 4514 transmits TS packets including the dependent-view video stream to the TB2 4508 in the primary video decoder 4515. The TB2 4508 restores PES packets from the TS packets and transfers the PES packets to the MB2 4509 at the mean speed $R_{X2}$. The MB2 4509 extracts VAUs of the dependent-view video stream from the PES packets, and transfers the VAUs to the EB2 4510 at the mean speed $R_{bx2}$.

The VAUs stored in each of the EB1 4503 and the EB2 4510 are alternately transferred to the DEC 4504 by the buffer switch 4506, and decoded to uncompressed picture data by the DEC 4504. Here, as shown in FIG. 7, the dependent-view pictures are compressed with reference to the base-view pictures. Accordingly, the mean bit rate of the dependent-view pictures is lower than that of the base-view pictures. Thus the system rate $R_{TS2}$ for the file DEP can be set to be lower than the system rate $R_{TS1}$ for the file 2D. For example, when the system rate $R_{TS1}$ for the file 2D is set to be equal to or lower than 45 Mbps, the system rate $R_{TS2}$ for the file DEP can be set to be equal to or lower than 30 Mbps: $R_{TS1} \leq 45$ Mbps, $R_{TS2} \leq 30$ Mbps.

Here, it is assumed that the sum of the system rates $R_{TS1}$ and $R_{TS2}$ is restricted to equal to or smaller than a predetermined threshold value. The predetermined threshold value is set to be equal to or smaller than the width of a transfer band assigned to the system target decoder 4225, for example, equal to 60 Mbps: $R_{TS1}+R_{TS2} \leq 60$ Mbps. In that case, when the system rate $R_{TS1}$ for the file 2D is set to 45 Mbps, the system rate RTS2 for the file DEP is restricted to equal to or smaller than 15 Mbps: $R_{TS1}=45$ Mbps, $R_{TS2} \leq 15$ Mbps. As far as the bit rate of each video stream is kept to mean value, the restriction on the sum of the system rates $R_{TS1}$ and $R_{TS2}$ is advantageous for using the transfer band efficiently. In the actuality, however, there are cases where the bit rate of the dependent-view video stream temporarily exceeds the bit rate of the base-view video stream. For example, in 3D video images representing natural scenes, such as an inversion of bit rates may occur when the base view (i.e. left view) becomes defocused suddenly and only the dependent view (i.e. right view) is focused. In that case, although the base-view transfer rate $R_{EXT1}$ is far lower than the system rate $R_{TS1}=45$ Mbps, the dependent-view transfer rate $R_{EXT2}$ cannot exceed the system rate $R_{TS2} \leq 15$ Mbps (accurately, 192/188≈1.02 times thereof. Hereinafter, the coefficient is regarded as "1" unless otherwise noted.). As understood from this, when the sum of the system rates $R_{TS1}$ and $R_{TS2}$ is restricted, the dependent-view transfer rate $R_{EXT2}$ cannot respond to a temporary increase in the bit rate of the dependent-view video stream.

Figure 92:
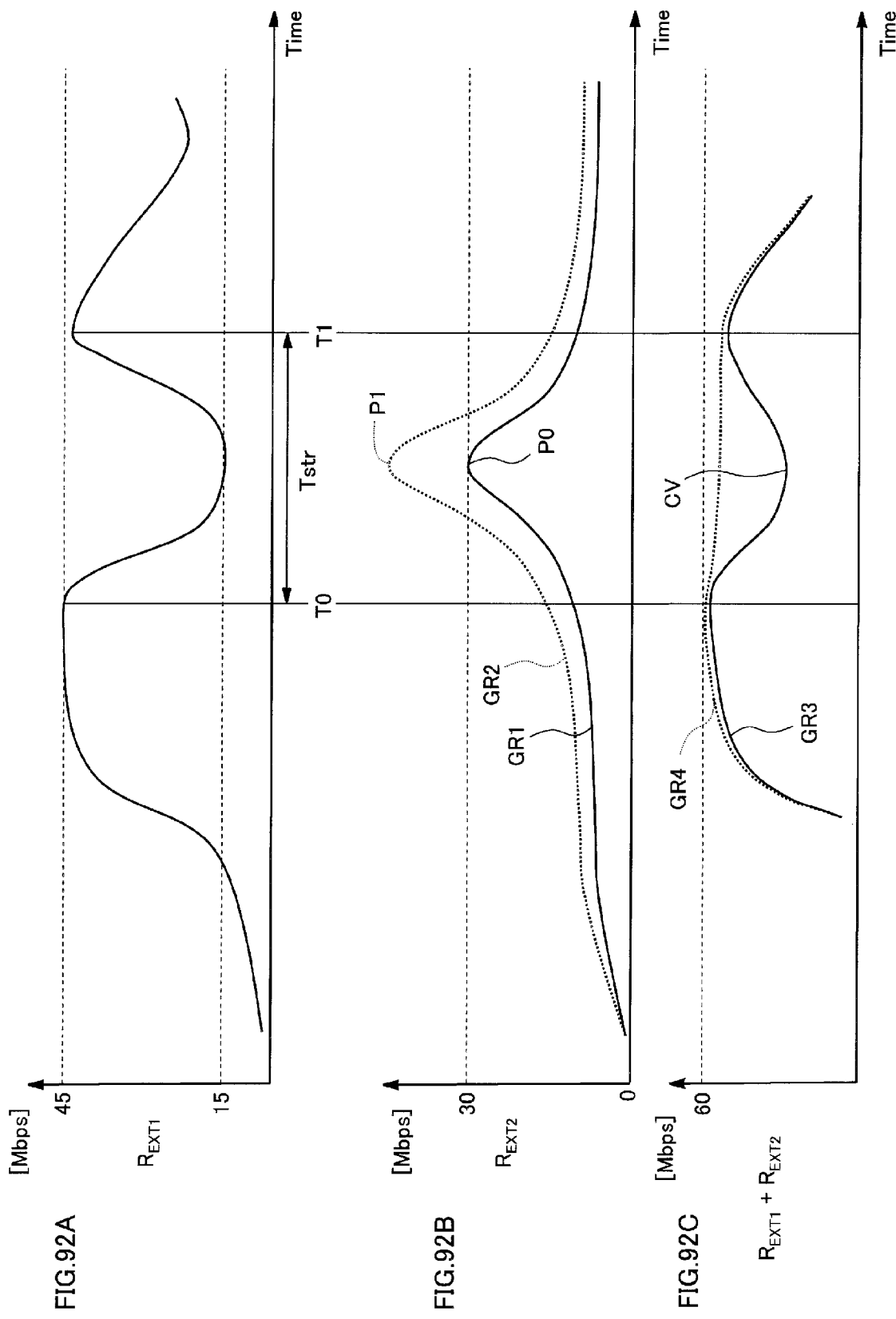
FIGS. 92A and 92B are graphs showing temporal changes in the base-view transfer rate $R_{EXT1}$ and the dependent-view transfer rate $R_{EXT2}$ in that case, respectively.
FIG. 92C is a graph showing the temporal change in the sum of the base-view transfer rate $R_{EXT1}$ and the dependent-view transfer rate $R_{EXT2}$ shown in FIGS. 92A and 92B.

Such a response to the temporary increase can be realized by restricting, instead of the sum of the system rates $R_{TS1}$ and $R_{TS2}$, the sum of the base-view transfer rate $R_{EXT1}$ and the dependent-view transfer rate $R_{EXT2}$ in units of extents: $R_{EXT1}[n]+R_{EXT2}[n] \leq 60$ Mbps. The base-view transfer rate $R_{EXT1}[n]$ is a mean value of transfer speeds at which source packets including the $(n+1)^{th}$ extent EXT1[$n$] in the file base are transferred, and the dependent-view transfer rate $R_{EXT2}[n]$ is a mean value of transfer speeds at which source packets including the $(n+1)^{th}$ extent EXT2[$n$] in the file base are transferred. FIGS. 92A and 92B are graphs showing temporal changes in the base-view transfer rate $R_{EXT1}$ and the dependent-view transfer rate $R_{EXT2}$ in that case, respectively. As shown in FIG. 92A, the base-view transfer rate $R_{EXT1}$ drops from the maximum value $R_{MAX1}$≈45 Mbps at the first time T0, and remains at a low level=15 Mbps during a period $T_{STR}$ from the first time T0 to the second time T1. As indicated by the solid-line graph GR1 in FIG. 92B, the dependent-view transfer rate $R_{EXT2}$ can change in response to the change of the base-view transfer rate $R_{EXT1}$ in a manner similar to mutual completion. In particular, in the above-mentioned period $T_{STR}$, peak P1 can reach the maximum value $R_{MAX2}$≈30 Mbps. In this way, when the sum of the base-view transfer rate $R_{EXT1}$ and the dependent-view transfer rate $R_{EXT2}$ is restricted in units of extents, the dependent-view transfer rate $R_{EXT2}$ can respond to a temporary increase in the bit rate of the dependent-view video stream.

In order to use the transfer band assigned to the system target decoder 4225 more efficiently in the transfer of the stream data, it is preferable to set the system rate $R_{TS2}$ for the file DEP to a further higher value. FIG. 92C is a graph showing the temporal change in the sum of the base-view transfer rate $R_{EXT1}$ and the dependent-view transfer rate $R_{EXT2}$ shown in FIGS. 92A and 92B. As indicated by the concave CV in the solid-line graph GR3 shown in FIG. 92C, the sum of the base-view transfer rate $R_{EXT1}$ and the dependent-view transfer rate $R_{EXT2}$ is below a threshold value 60 Mbps during the period $T_{STR}$ from the first time T0 to the second time T1. This is because the dependent-view transfer rate $R_{EXT2}$ is restricted to equal to or smaller than the system rate $R_{TS2}$ (=30 Mbps) for the file DEP, as indicated by the solid-line graph GR1 in FIG. 92B. As shown in FIG. 92A, because the base-view transfer rate $R_{EXT1}$ has dropped to 15 Mbps in the period $T_{STR}$, the transfer band has at least allowance equal to the difference between the value and the threshold value 60−15=45 Mbps. Thus, the system rate $R_{TS2}$ for the file DEP is set to be in a range higher than 30 Mbps, preferably in the same range as the system rate $R_{TS1}$ for the file 2D, for example, equal to or lower than 45 Mbps: $R_{TS1} \leq 45$ Mbps, $R_{TS2} \leq 45$ Mbps. The dashed-line graphs GR2 and GR4 in FIGS. 92B and 92C show the dependent-view transfer rate $R_{EXT2}$ and the sum of the base-view transfer rate $R_{EXT1}$ and the dependent-view transfer rate $R_{EXT2}$ in that case, respectively. As indicated by the dashed-line graph GR2 in FIG. 92B, the peak P2 of the dependent-view transfer rate $R_{EXT2}$ can exceed 30 Mbps. As a result, as indicated by the dashed-line graph GR4 in FIG. 92C, the sum of the base-view transfer rate $R_{EXT1}$ and the dependent-view transfer rate $R_{EXT2}$ is maintained in the proximity of the threshold value 60 Mbps during the period $T_{STR}$. In this way, the use efficiency of the transfer band can further be improved.

It should be noted here that when the system rate $R_{TS2}$ for the file DEP is set to a value which is as high as the system rate $R_{TS1}$ for the file 2D, the sum of them $R_{TS1}+R_{TS2}$ is generally higher than the transfer band width of the system target decoder 4225. On the other hand, since the base-view transfer rate $R_{EXT1}[n]$ and the dependent-view transfer rate $R_{EXT2}[n]$ are each a mean value, even if a threshold value of the sum of these mean values is provided, the sum of instantaneous values of transfer speeds can exceed the threshold value without restriction. Here, it is assumed as a specific example that each of the system rates $R_{TS1}$ and $R_{TS2}$ is set to 45 Mbps, the extent ATC time of each extent is three seconds, and the sum of transfer speeds is maintained to 30 Mbps in the first part (1.5 seconds) of the extent ATC time. In that case, even if each transfer speed increases up to 45 Mbps in the second part (1.5 seconds) of the extent ATC time, the sum of mean values of the transfer speeds in the whole extent is kept at 60 Mbps.

Accordingly, even if the sum of the base-view transfer rate $R_{EXT1}[n]$ and the dependent-view transfer rate $R_{EXT2}[n]$ is restricted to equal to or smaller than 60 Mbps, the increase of the sum of instantaneous values of transfer speeds to 90 Mbps cannot be avoided. In this way, by merely restricting the sum of the base-view transfer rate $R_{EXT1}[n]$ and the dependent-view transfer rate $R_{EXT2}[n]$, the risk that the transfer band of the system target decoder 4225 is saturated cannot be removed completely.

Figure 93:
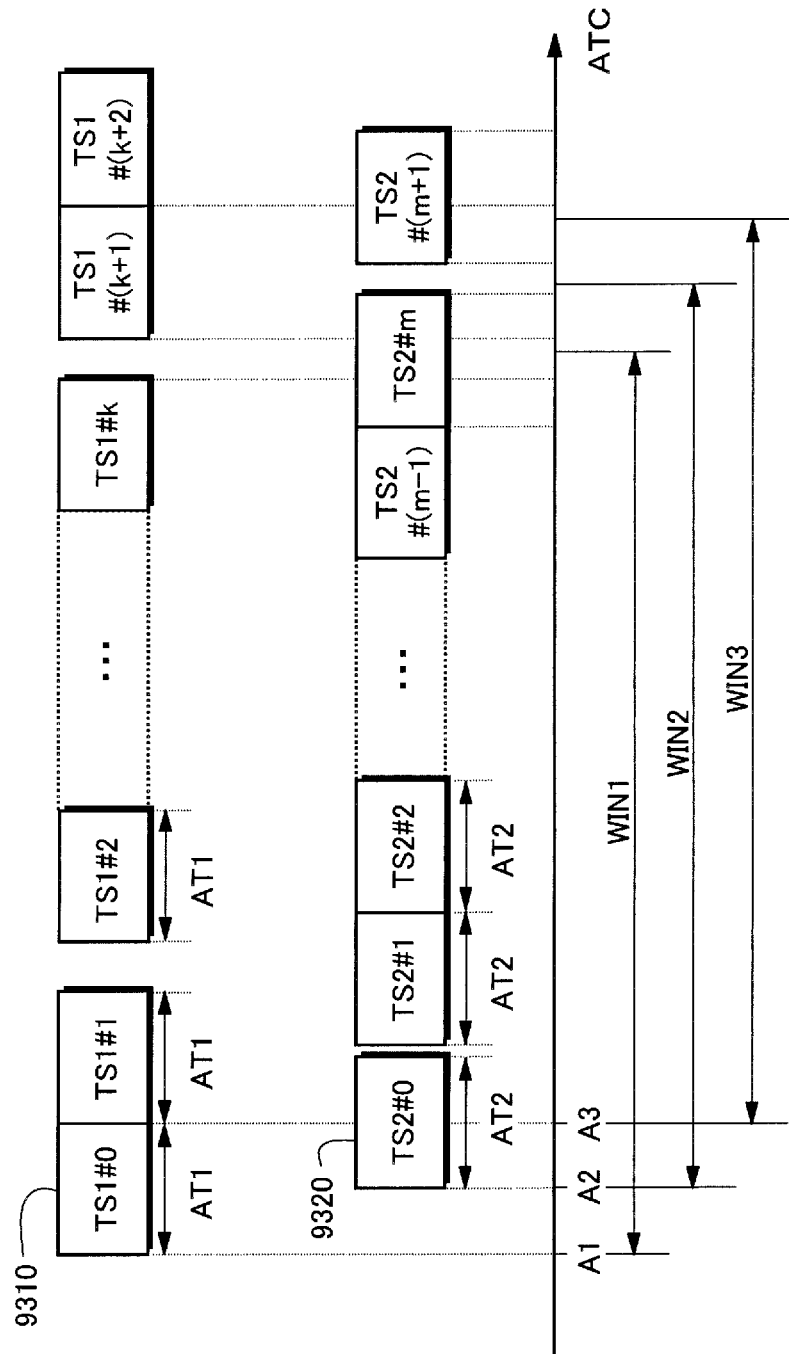
FIG. 93 is a schematic diagram showing the relationships between the TS packets that are transferred in the system target decoder from the source depacketizer to the PID filter and the ATC times.

In order to further reduce the risk that the transfer band of the system target decoder 4225 is saturated, the restriction on the sum of the transfer speeds may be modified as follows. FIG. 93 is a schematic diagram showing the relationships between the TS packets that are transferred in the system target decoder from the source depacketizer to the PID filter and the ATC times. As shown in FIG. 93, the rectangles 9310 in the upper row represent the transfer periods of TS packets TS1 #p (p=0, 1, 2, 3, . . . , k, k+1, k+2) constituting the base-view extent, and the rectangles 9320 in the lower row represent the transfer periods of TS packets TS2 #q (q=0, 1, 2, 3, . . . , m−1, m, m+1) constituting the dependent-view extent. These rectangles 9310, 9320 are arranged in order of transfer of TS packets along the time axis of the ATC. The position of the top of each rectangle 9310 and 9320 represents the transfer start time of the TS packet. The lengths AT1 and AT2 of each rectangle 9310 and 9320 represents the amount of time needed for one TS packet to be transferred from the read buffer to the system target decoder. Each time it starts transferring one TS packet from the source depacketizer, the 3D playback device sets one window (WIN1, WIN2, and WIN3 in FIG. 93) having a predetermined time length (e.g. one second) starting from the transfer start time. The 3D playback device further averages each transfer speed of TS1 and TS2 in each of the windows WIN1, WIN2, and WIN3, and restricts the sum of the average values to a predetermined threshold value or lower. In the example shown in FIG. 93, first the first window WIN1, whose start point is the transfer start time A1 of TS1 #0, is set, and with regard to TS1 #0-k and TS2 #0-m which are transferred in the window, the sum of the transfer speeds is restricted to equal to or smaller than the threshold value. Similarly, with regard to TS1 #0-(k+1) and TS2 #0-m which are transferred in the second window WIN2 whose start point is the transfer start time A2 of TS2 #0, the sum of the transfer speeds is restricted to equal to or smaller than the threshold value, and with regard to TS1 #1-(k+1) and TS2 #0-(m+1) which are transferred in the third window WIN3 whose start point is the transfer start time A3 of TS1 #1, the sum of the transfer speeds is restricted to equal to or smaller than the threshold value. In this way, the sum of the average transfer speeds in each window is restricted to equal to or smaller than a predetermined threshold value by shifting from one window to another, each having a predetermined length, by the transfer time per TS packet. With this structure, as the window becomes shorter, the risk that the transfer band of the system target decoder 4225 is saturated becomes lower.

When the system rate $R_{TS2}$ for the file DEP is set to be as high as the system rate $R_{TS1}$ for the file base, the dependent-view transfer rate $R_{EXT2}$ may increase to a similar level. When the dependent-view transfer rate $R_{EXT2}[n]$ for the (n+1)$^{th}$ dependent-view extent increases in such a way, the base-view transfer rate $R_{EXT1}[n]$ for the (n+1)$^{th}$ base-view extent drops to a value that is far lower than the maximum value $R_{MAX1}$. On the other hand, in expression 5 which defines the maximum extent size, the mean transfer rate $R_{EXT2D}$ included in the denominator is assessed as the maximum value $R_{MAX2D}$ thereof. Furthermore, the upper limit of the extent ATC time of the (n+1)$^{th}$ base-view extent is a value that is represented as a ratio of its maximum extent size to the base-view transfer rate $R_{EXT1}[n]$. Accordingly, the upper limit value is far longer than the actual extent ATC time. Since the (n+1)$^{th}$ base-view extent and the (n+1)$^{th}$ dependent-view extent have the extent ATC time in common, the size of the dependent-view extent at the maximum is equal to a product of the dependent-view transfer rate $R_{EXT2}[n]$ and the upper limit value of the extent ATC time. Since the size is far larger than a value that is actually needed for the seamless playback, the capacity of RB2 cannot be further reduced. Accordingly, when the system rate $R_{TS2}$ for the file DEP is set to be as high as the system rate $R_{TS1}$ for the file base, preferably condition 5 for the maximum extent size, namely expression 5 is replaced with expression 10.

$$S_{EXT1}[n] \le \text{CEIL}\left(\frac{R_{EXT1}[n]}{8} \times \frac{R_{UD54}}{R_{UD54} - \min(R_{MAX2D}, R_{MAX1} + R_{MAX2} - R_{EXT2}[n])} \times T_{JUMP-2D\_MIN}\right) \quad (10)$$

In the right-hand side of expression 10, the maximum value $R_{MAX2D}$ of the mean transfer rate for the 2D extent, or the difference between the sum of the transfer rate maximum values $R_{MAX1}+R_{MAX2}$ and the dependent-view transfer rate $R_{EXT2}$, whichever is lower is adopted as the transfer speed to be included in the denominator. Here, the sum of the transfer rate maximum values $R_{MAX1}+R_{MAX2}$ equals 192/188 times the sum of the system rates $R_{TS1}+R_{TS2}$. Accordingly, when the dependent-view transfer rate $R_{EXT2}$ increases to a similar level to the system rate, the maximum extent size is assessed as the above-described difference. With this structure, the upper limit of the extent ATC time of the base-view extent is restricted to a value that is closer to the actual extent ATC time. For this reason, the size of the dependent-view extent is restricted to a value that is actually needed for the seamless playback. In this way, it is possible to maintain the capacity of RB2 to be sufficiently small.

<Arrangement of Data Blocks when System Rate for File DEP is High>

FIG. 94A is a table showing, with regard to one extent pair, the maximum extent sizes $\max S_{EXT1}[n]$ and $\max S_{EXT2}[n]$ for each combination of the base-view transfer rate $R_{EXT1}[n]$ and the dependent-view transfer rate $R_{EXT2}[n]$. Here, "extent pair" refers to a pair of the (n+1)$^{th}$ base-view extent included in the file base and the (n+1)$^{th}$ dependent-view extent included in the file DEP (n=0, 1, 2, . . . ). The maximum extent sizes $\max S_{EXT1}[n]$ and $\max S_{EXT2}[n]$ are values that are calculated by using expression 5. As apparent from the fact that expression 5 includes the read rate $R_{UD54}$ of the BD-ROM drive in the 2D playback mode, the maximum extent sizes $\max S_{EXT1}[n]$ and $\max S_{EXT2}[n]$ depend on the performance of the BD-ROM drive. Accordingly, the values shown in FIG. 94A are only one example.

As shown in FIG. 94A, when the base-view transfer rate $R_{EXT1}[n]$ is 45 Mbps and the dependent-view transfer rate $R_{EXT2}[n]$ is 15 Mbps, the maximum extent size $\max S_{EXT2}[n]$ for the dependent-view extent is 6 MB. Conversely, when the base-view transfer rate $R_{EXT1}[n]$ is 15 Mbps and the dependent-view transfer rate $R_{EXT2}[n]$ is 45 Mbps, the maximum extent size $\max S_{EXT2}[n]$ for the dependent-view extent is 8 MB. As explained with reference to FIG. 90, the larger the size of the dependent-view data block located at the top of each extent block is, the larger the capacity required for the read buffer is. Thus it is not preferable for the dependent-view transfer rate $R_{EXT2}[n]$ to increase during the preload period of the extent block because it causes the maximum extent size max$S_{EXT2}[n]$ for the dependent-view extent to increase, preventing a further reduction of the capacity of the read buffer.

Thus, in the extent pair EXT1[*n*], EXT2[*n*] located at the top of the extent block, when the dependent-view transfer rate $R_{EXT2}[n]$ exceeds the base-view transfer rate $R_{EXT1}[n]$, the base-view data block B[n] is arranged before the dependent-view data block D[n]. That is to say, in the extent pair, a small-sized data block is arranged before a large-sized data block. This enables the capacity of the read buffer to be kept small as shown in the following.

FIG. 94B is a schematic diagram showing the case where the above-described arrangement is adopted for two extent blocks 9401 and 9402 which are arranged with a layer boundary LB in between. As shown in FIG. 94B, among the extent pairs between the file base 9411 and the file DEP 9412, the $(n+1)^{th}$ extent pair EXT1[*n*], EXT2[*n*] is arranged before the $M^{th}$ extent block 9402. In the extent pair, the dependent-view transfer rate $R_{EXT2}[n]$ is higher than the base-view transfer rate $R_{EXT1}[n]$, and thus the dependent-view data block D[n] is larger in size than the base-view data block B[n]. Accordingly, in the extent pair, the base-view data block B[n] is arranged before the dependent-view data block D[n]. On the other hand, in the $(n-1)^{th}$, $n^{th}$, and $(n+2)^{th}$ extent pairs EXT1[*k*], EXT2[*k*] (k=n-2, n-1, n+1), the dependent-view transfer rate $R_{EXT2}[k]$ is lower than the base-view transfer rate $R_{EXT1}[k]$, and thus the dependent-view data block D[k] is smaller in size than the base-view data block B[k]. Accordingly, in these extent pairs, the dependent-view data block D[k] is arranged before the base-view data block B[k].

FIGS. 95A and 95B are graphs showing changes in amounts DA1, DA2 of data stored in RB1 and RB2, respectively, when 3D video images are played back seamlessly from the two extent blocks 9401 and 9402 shown in FIG. 94B. The graphs G1P, G2P drawn by the solid line show changes in stored data amounts DA1, DA2 when the base-view data block B[n] is arranged before the dependent-view data block D[n] in the $(n+1)^{th}$ extent pair EXT1[*n*], EXT2[*n*] located at the top of the $M^{th}$ extent block 9402. The graphs G1Q, G2Q drawn by the dashed line show changes in stored data amounts DA1, DA2 when the dependent-view data block D[n] is arranged before the base-view data block B[n] in the extent pair EXT1[*n*], EXT2[*n*].

As shown in FIG. 95A, the stored data amount DA1 in RB1 reaches a maximum value DM10, DM11 at the point when the base-view data block B[n-1] at the end of the $M^{th}$ extent block 9401 is read into RB1. Furthermore, the stored data amount DA1 decreases at the base-view transfer rate $R_{EXT1}[n-1]$ from the immediately subsequent jump period PJ[M] through the preload period $PR_B[n]$, $PR_D[n]$ in the $M^{th}$ extent block 9402. Here, in the $(n+1)^{th}$ extent pair EXT1[*n*], EXT2[*n*], the base-view data block B[n] is smaller in size than the dependent-view data block D[n]. Accordingly, the length $S_{EXT1}[n]/R_{UD72}$ of the preload period $PR_B[n]$ when the base-view data block B[n] is arranged before the dependent-view data block D[n] is shorter than the length $S_{EXT2}[n]/R_{UD72}$ of the preload period $PR_D[n]$ of the reversed arrangement. As a result, the maximum value DM11 of the stored data amount DA1 when the base-view data block B[n] is arranged before the dependent-view data block D[n] is lower than the maximum value DM10 of the reversed arrangement.

As shown in FIG. 95B, the stored data amount DA2 in RB2 reaches a maximum value DM20, DM21 at the point when the base-view data block B[n-1] at the end of the $(M-1)^{th}$ extent block 9401 is read into RB2. Furthermore, the stored data amount DA2 decreases at a dependent-view transfer rate $R_{EXT2}[n-1]$ from the read period of the base-view data block B[n-1] through the preload period $PR_B[n]$, $PR_D[n]$ in the $M^{th}$ extent block 9402. Here, the length $S_{EXT1}[n]/R_{UD72}$ of the preload period $PR_B[n]$ when the base-view data block B[n] is arranged before the dependent-view data block D[n] is shorter than the length $S_{EXT2}[n]/R_{UD72}$ of the preload period $PR_D[n]$ of the reversed arrangement. As a result, the maximum value DM21 of the stored data amount DA2 when the dependent-view data block D[n] is arranged before the base-view data block B[n] is lower than the maximum value DM20 of the reversed arrangement.

As described above, in the extent pair arranged at the top of the extent block, it is possible to keep the capacity of the read buffer small by arranging a small-sized data block before a large-sized data block.

Similarly, in the extent pair arranged at a position where an interrupt playback can be started, a small-sized data block is arranged before a large-sized data block. This enables the capacity of the read buffer to be kept small. In that case, the order of data blocks may be reversed even in the extent pair located in the middle of the extent block, as well as in the extent pair located at the top thereof. FIG. 96A is a schematic diagram showing the syntax of the extent start point for such an arrangement. This extent start point (Extent_Start_Point), like the extent start points shown in FIGS. 24A and 24B, is set for each of the file 2D and the file DEP. As shown in FIG. 96A, in the extent start point, an extent start flag (is_located_first_in_extent_pair) is assigned to each pair of an extent ID (extent_id) and an SPN (SPN_extent_start).

FIG. 96B is a schematic diagram showing the relationships between the base-view extent EXT1[*k*] (k=0, 1, 2, ...) belonging to the file base and the extent start flag indicated by the extent start point. FIG. 96C is a schematic diagram showing the relationships between the dependent-view extent EXT2[*k*] belonging to the file DEP and the extent start flag. FIG. 96D is a schematic diagram showing the relationships between the extent SS EXTSS[0] belonging to the file SS and the extent blocks on the BD-ROM disc. As shown in FIGS. 96B and 96C, in the extent pair EXT1[*k*], EXT2[*k*] having the same extent ID, the value of the extent start flag is reversely set. In particular, extents whose extent start flag is set to "1" have a smaller number of source packets than extents whose extent start flag is set to "0". As shown in FIG. 96D, an extent whose extent start flag is set to "1" is arranged before an extent whose extent start flag is set to "0". In this way, the extent start flag indicates which of EXT1[*n*] and EXT2[*n*] in the extent pair is arranged before the other. Thus it is possible to recognize the arrangement of data blocks in the extent pair EXT1[*n*], EXT2[*n*] from the value of the extent start flag. Accordingly, the playback control unit 4235 can notify the switch 4220 of the number of source packets from the start of each extent SS to each boundary between data blocks by using the extent start point even if the order of data blocks differs between extent pairs. As a result, the switch 4220 can separate the base-view extents and dependent-view extents from the extents SS.

When the order of data blocks in each extent pair is constant, the minimum values of the capacities of RB1 and RB2 are calculated by using FIG. 90 as follows: $RB1 \geq (T_{JUMP\_MAX}+S_{EXT2}[n]/R_{UD72}) \times R_{MAX1}$, $RB2 \geq \max\{(S_{EXT1}[n-1]/R_{UD72}+T_{JUMP\_MAX}+S_{EXT2}[n]/R_{UD72}) \times R_{MAX2}, S_{EXT2}[n]\}$. On the other hand, when the order of data blocks may be reversed in the extent pair located in the middle of the extent block, the minimum values of the capacities of RB1 and RB2 are changed as follows.

Figure 97A:
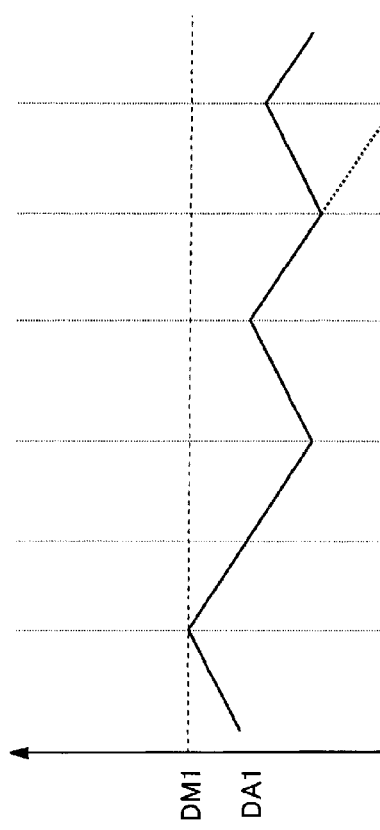
FIGS. 97A and 97B are graphs showing changes in amounts DA1, DA2 of data stored in RB1 4221 and RB2 4222, respectively, when 3D video images are played back seamlessly from the two extent blocks 9701 and 9702 shown in FIG. 97C.
Figure 97D:
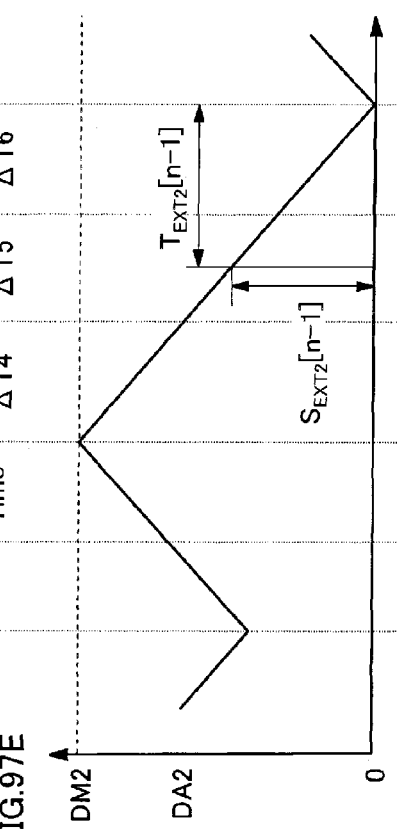
FIGS. 97D and 97E are graphs showing changes in amounts DA1, DA2 of data stored in RB1 4221 and RB2 4222, respectively, when 3D video images are played back seamlessly from the two extent blocks 9703 and 9704 shown in FIG. 97F.
Figure 97B:
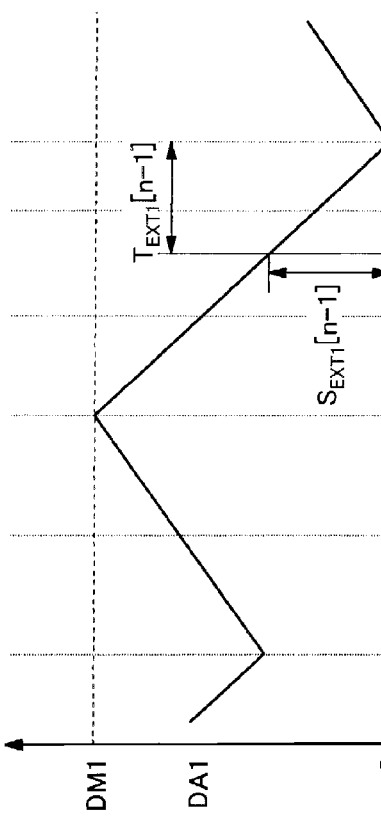
Figure 97E:
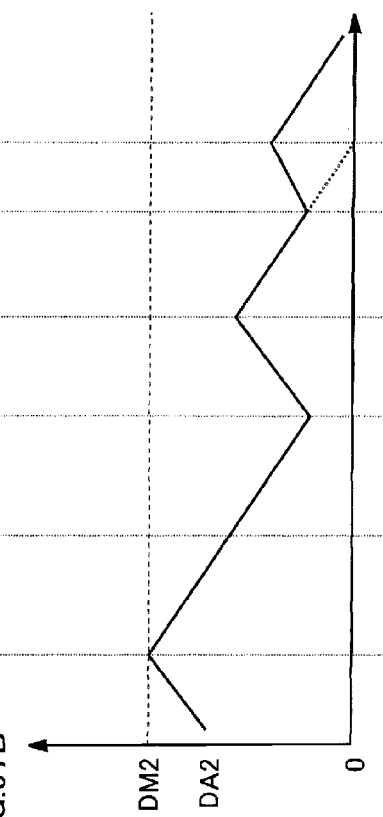
Figure 97C:
FIG. 97C is a schematic diagram showing an arrangement of a data block which requires the largest capacity of RB1 4221.

FIG. 97C is a schematic diagram showing an arrangement of a data block which requires the largest capacity of RB1 4221. As shown in FIG. 97C, the $(M-1)^{th}$ extent block 9701 and the $M^{th}$ extent block 9702 are arranged with a layer boundary LB in between (the letter M represents an integer greater than or equal to 2). The $(n+1)^{th}$ extent pair D[n], B[n] is arranged at the top of the $M^{th}$ extent block 9702. In particular, the dependent-view data block D[n] is positioned before the base-view data block B[n] (the letter n represents an integer greater than 0). On the other hand, the $n^{th}$ extent pair D[n−1], B[n−1] is arranged at the end of the $(M-1)^{th}$ extent block 9701. In particular, the base-view data block B[n−1] is positioned before the dependent-view data block D[n−1].

FIGS. 97A and 97B are graphs showing changes in amounts DA1, DA2 of data stored in RB1 4221 and RB2 4222, respectively, when 3D video images are played back seamlessly from the two extent blocks 9701 and 9702 shown in FIG. 97C. As shown in FIG. 97A, the stored data amount DA1 in RB1 4221 reaches a maximum value DM1 at the point when the $n^{th}$ base-view data block B [n−1] is read into RB1 4221. No data block is read into RB1 4221 from the immediately subsequent period ΔT1 of reading the dependent-view data block D[n−1] through the period ΔT2 in which a long jump across the layer boundary LB occurs and the preload period ΔT3 in the $M^{th}$ extent block 9702. Thus during these periods, the stored data amount DA1 decreases. In these periods ΔT1-ΔT3, base-view data blocks B[k] (k=..., n−3, n−2) up to the $(n-1)^{th}$ base-view data block are transferred at a mean transfer rate $R_{EXT1}[$ ..., n−3, n−2$]$, and then the $n^{th}$ base-view data block is transferred at a mean transfer rate $R_{EXT1}[n-1]$. In order to prevent the stored data amount DA1 from reaching "0" before the end time point of the preload period ΔT3, the stored data amount DA1 should at least be equal to the size $S_{EXT1}[n-1]$ of the base-view data block B[n−1] at the time point which is before the end time point by the extent ATC time $T_{EXT1}[n-1]$ of the $n^{th}$ base-view data block B[n−1]. Accordingly, the maximum value DM1 of the stored data amount DA1 should be greater than the size $S_{EXT1}[n-1]$ by the data amount $R_{EXT1}[$ ..., n−3, n−2$] \times (\Delta T1+\Delta T2+\Delta T3-T_{EXT1}[n-1])$ or more of the data that is transferred from RB1 4221 to the system target decoder 4225 in the remaining periods $\Delta T1+\Delta T2+\Delta T3-T_{EXT1}[n-1]$. That is to say, RB1 4221 is required to have capacity RB1 that is larger than the maximum value DM1 thereof: $RB1 \geq S_{EXT1}[n-1]+R_{EXT1}[..., n-3, n-2] \times (\Delta T1+\Delta T2+\Delta T3-T_{EXT1}[n-1])$. Here, the time ΔT2 of a long jump is assessed as the maximum jump time $T_{JUMP\_MAX}$ of the long jump.

Figure 97F:
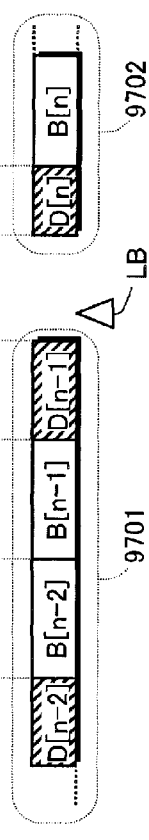
FIG. 97F is a schematic diagram showing an arrangement of a data block which requires the largest capacity of RB2 4222.

FIG. 97F is a schematic diagram showing an arrangement of a data block which requires the largest capacity of RB2 4222. As shown in FIG. 97F, the $(N-1)^{th}$ extent block 9703 and the $N^{th}$ extent block 9704 are arranged with a layer boundary LB in between (the letter N represents an integer greater than or equal to 2). The $(n+1)^{th}$ extent pair D[n], B[n] is arranged at the top of the $N^{th}$ extent block 9704. In particular, the dependent-view data block D[n] is positioned after the base-view data block B[n]. On the other hand, the $n^{th}$ extent pair D[n−1], B[n−1] is arranged at the end of the $(N-1)^{th}$ extent block 9703. In particular, the base-view data block B[n−1] is positioned after the dependent-view data block D[n−1].

FIGS. 97D and 97E are graphs showing changes in amounts DA1, DA2 of data stored in RB1 4221 and RB2 4222, respectively, when 3D video images are played back seamlessly from the two extent blocks 9703 and 9704 shown in FIG. 97F. As shown in FIG. 97E, the stored data amount DA2 in RB2 4222 reaches a maximum value DM2 at the point when the $n^{th}$ dependent-view data block D[n−1] is read into RB2 4222. No data block is read into RB2 4222 from the immediately subsequent period ΔT4 of reading the base-view data block B[n−1] through the period ΔT5 in which a long jump across the layer boundary LB occurs and the preload period ΔT6 in the $N^{th}$ extent block 9704. Thus during these periods, the stored data amount DA2 decreases. In these periods ΔT4-ΔT6, dependent-view data blocks D[k] (k=..., n−3, n−2) up to the $(n-1)^{th}$ dependent-view data block are transferred at a mean transfer rate $R_{EXT2}[..., n-3, n-2]$, and then the $n^{th}$ dependent-view data block is transferred at a mean transfer rate $R_{EXT2}[n-1]$. In order to prevent the stored data amount DA2 from reaching "0" before the end time point of the preload period ΔT6, the stored data amount DA2 should at least be equal to the size $S_{EXT2}[n-1]$ of the dependent-view data block D[n−1] at the time point which is before the end time point by the extent ATC time $T_{EXT2}[n-1]$ of the $n^{th}$ dependent-view data block D[n−1]. Accordingly, the maximum value DM2 of the stored data amount DA2 should be greater than the size $S_{EXT2}[n-1]$ by the data amount $R_{EXT2}[..., n-3, n-2] \times (\Delta T4+\Delta T5+\Delta T6-T_{EXT2}[n-1])$ or more of the data that is transferred from RB2 4222 to the system target decoder 4225 in the remaining periods $\Delta T4+\Delta T5+\Delta T6-T_{EXT2}[n-1]$. That is to say, RB2 4222 is required to have capacity RB2 that is larger than the maximum value DM2 thereof: $RB2 \geq S_{EXT2}[n-1]+R_{EXT2}[..., n-3, n-2] \times (\Delta T4+\Delta T5+\Delta T6-T_{EXT2}[n-1])$. Here, the time ΔT5 of a long jump is assessed as the maximum jump time $T_{JUMP\_MAX}$ of the long jump.

When the order of data blocks may be reversed in the extent pair located in the middle of the extent block, the conditions 2, 3 for the extent pair, namely expressions 2, 3 are further modified as follows.

FIG. 98C is a schematic diagram showing an extent block 9810 which includes in the middle thereof an extent pair in which the order of data blocks is reversed. As shown in FIG. 98C, in the $(n+2)^{th}$ extent pair D[n+1], B[n+1], the dependent-view data block D[n+1] is after the base-view data block B[n]. In the extent pairs D[n], B[n] and D[n+1], B[n+1] which are before and after thereof, the base-view data block B[n], B[n+1] is arranged after the dependent-view data block D[n], D[n+1], respectively.

FIGS. 98A and 98B are graphs showing changes in amounts DA1, DA2 of data stored in RB1 4221 and RB2 4222, respectively, when 3D video images are played back seamlessly from the extent block 9801 shown in FIG. 98C. Here, the zero sector transition time period is neglected because it is sufficiently shorter than the other periods. As shown in FIGS. 98A and 98B, during the read period $PR_D[n]$ of the $(n+1)^{th}$ dependent-view data block D[n], the stored data amount DA2 in the RB2 4222 increases at a rate equal to $R_{UD72}-R_{EXT2}[n]$, the difference between the read rate $R_{UD72}$ and a dependent-view transfer rate $R_{EXT2}[n]$, whereas the stored data amount DA1 in the RB1 4221 decreases at a base-view transfer rate $R_{EXT1}[n-1]$. During the read period $PR_B[n]$ of the $(n+1)^{th}$ base-view data block B[n], the stored data amount DA1 in the RB1 4221 increases at a rate equal to $R_{UD72}-R_{EXT1}[n]$, the difference between the read rate $R_{UD72}$ and a base-view transfer rate $R_{EXT1}[n]$, whereas the stored data amount DA2 in the RB2 4222 decreases at a dependent-view transfer rate $R_{EXT2}[n]$. During the read period $PR_B[n+1]$ of the $(n+2)^{th}$ base-view data block B[n+1], the stored data amount DA1 in the RB1 4221 increases at a rate equal to $R_{UD72}-R_{EXT1}[n+1]$, the difference between the read rate $R_{UD72}$ and a base-view transfer rate $R_{EXT1}[n+1]$, whereas the stored data amount DA2 in the RB2 4222 further decreases at a dependent-view transfer rate $R_{EXT2}[n+1]$. Furthermore, during the read period $PR_D[n+1]$ of the $(n+2)^{th}$ dependent-view data block D[n+1], the stored data amount DA2 in the RB2 4222 increases at a rate equal to $R_{UD72}-R_{EXT2}$[n+1], the difference between the read rate $R_{UD72}$ and a dependent-view transfer rate $R_{EXT2}$[n+1], whereas the stored data amount DA1 in the RB1 4221 decreases at a base-view transfer rate $R_{EXT1}$[n]. Following this, during the read period $PR_D$[n+2] of the $(n+3)^{th}$ dependent-view data block D[n+2], the stored data amount DA2 in the RB2 4222 increases at a rate equal to $R_{UD72}-R_{EXT2}$[11+2], the difference between the read rate $R_{UD72}$ and a dependent-view transfer rate $R_{EXT2}$[n+2], whereas the stored data amount DA1 in the RB1 4221 decreases at a base-view transfer rate $R_{EXT1}$[n+1].

In this case, in order to play back 3D video images seamlessly from the extent block 9810, first, the extent ATC time of the $(n+1)^{th}$ dependent-view data block D[n] should be equal to or greater than the time period from the start time point of the read period $PR_D$[n] thereof to the start time point of the read period $PR_D$[n+1] of the next dependent-view data block D[n+1]. Next, the extent ATC time of the $(n+1)^{th}$, $(n+2)^{th}$ base-view data block B[n], B[n+1] should be equal to or greater than the time period from the start time point of the read period $PR_B$[n], $PR_B$[n+1] thereof to the start time point of the read period $PR_B$[n+2] of the next dependent-view data block B[n+2]. These conditions are represented by expressions 2A and 3A instead of expressions 2 and 3 when extent B (EXTB) is assumed to be positioned before extent A (EXTA) in the $n^{th}$ extent pair.

$$S_{EXTA}[n] \geq \text{CEIL}\left\{\frac{R_{EXTA}[n]}{8} \times \frac{R_{UD72}}{R_{UD72} - R_{EXTA}[n]} \times \frac{S_{EXTB}[n+1]}{R_{UD72}}\right\} \quad (2A)$$

$$S_{EXTB}[n] \geq \text{CEIL}\left\{\frac{R_{EXTB}[n]}{8} \times \frac{R_{UD72}}{R_{UD72} - R_{EXTB}[n]} \times \frac{S_{EXTA}[n]}{R_{UD72}}\right\} \quad (3A)$$

Here, expression 2A is obtained by replacing the size $S_{EXT1}$[n] of the base-view data block B[n], the size $S_{EXT2}$[n+1] of the dependent-view data block D[n+1], and the base-view transfer rate $R_{EXT1}$[n] included in expression 2 with the size $S_{EXTA}$[n] of extent A, the size $S_{EXTB}$[n+1] of extent B, and the mean transfer rate $R_{EXTA}$[n] for extent A, respectively. Expression 3A is obtained by replacing the size $S_{EXT1}$[n] of the base-view data block B[n], the size $S_{EXT2}$[n] of the dependent-view data block D[n], and the dependent-view transfer rate $R_{EXT2}$[n] included in expression 3 with the size $S_{EXTA}$[n] of extent A, the size $S_{EXTB}$[n] of extent B, and the mean transfer rate $R_{EXTB}$[n] for extent B, respectively. Note that in each of expressions 2A and 3A, the zero sector transition time $T_{JUMP0}$ is regarded as "0".

FIG. 99 is a schematic diagram showing the relationships between an extent block 9900 which includes in the middle thereof an extent pair in which the order of data blocks is reversed and AV stream files 9910-9920. As shown in FIG. 99, in the third extent pair D[2], B[2], the dependent-view data block D[2] is positioned after the base-view data block B[2]. In the other extent pairs D[k], B[k] (k=0, 1, 3), the base-view data block B[k] is positioned after the dependent-view data block D[k]. Each of the base-view data blocks B[n] (n=0, 1, 2, 3, . . . ) belongs to the file base 9911 as one base-view extent EXT1[n]. Each of the dependent-view data blocks D[n] belongs to the file DEP 9911 as one dependent-view extent EXT2[n]. The whole extent block 9900 belongs to the file SS 9920 as one extent SS EXTSS[0]. The base-view data blocks B[n] (n=0, 1, 2, 3, . . . ) further belongs to the file 2D 9910 as the 2D extent EXT2D[n]. Here, two consecutive base-view data blocks B[1] and B[2] are referred to as one 2D extent EXT2D [1]. With this structure, the size $S_{EXT2D}$[1] of the 2D extent EXT2D [1] satisfies expression 1 even if the entire size $S_{EXT2}$[2]+$S_{EXT2}$[3] of the two dependent-view data blocks D[2], D[3] arranged immediately after thereof is great.

<Separation of a Playback Path Before and after a Layer Boundary>

In FIG. 21, the playback path 2101 in 2D playback mode and the playback path 2102 in 3D playback mode both traverse the same base-view data block B[3] immediately before a long jump $J_{LY}$ that skips over a layer boundary LB. In other words, this base-view data block B[3] is read as the second 2D extent EXT2D[1] by the playback device 102 in 2D playback mode and as the last data block in the extent SS EXTSS[1] by the playback device 102 in 3D playback mode. The data amount to be processed by the system target decoder during the long jump $J_{LY}$ is guaranteed by the size of the base-view data block B[3] via condition 1 in 2D playback mode. On the other hand, in 3D playback mode, the data amount is guaranteed by the size of the entire second extent block 1902 via condition 4. Accordingly, the minimum extent size of the base-view data block B[3] as required by condition 1 is generally larger than the minimum extent size as per condition 2. Therefore, the capacity of the RB1 4221 has to be larger than the minimum value necessary for seamless playback in 3D playback mode. Furthermore, the extent ATC times are the same for the base-view data block B[3] and the immediately prior dependent-view data block D[3]. Accordingly, the size of the dependent-view data block D[3] is generally larger than the minimum extent size required for the data block D[3] as per condition 2. Therefore, the capacity of the RB2 4222 is generally larger than the minimum value necessary for seamless playback in 3D playback mode. In the arrangement shown in FIG. 21, two extent blocks 1902 and 1903 can thus be seamlessly connected, but the capacities of the RB1 4221 and RB2 4222 need to be maintained sufficiently large.

To reduce the capacity of the RB1 4221 and RB2 4222 while still permitting seamless playback of video images during a long jump $J_{LY}$, changes may be made in the interleaved arrangement of data blocks before and after a position where a long jump $J_{LY}$ is necessary, such as a layer boundary LB, in order to create separate playback paths in 2D playback mode and 3D playback mode. These changes are represented, for example, by the following two types of arrangements 1 and 2. With either of the arrangements 1 and 2, the playback path immediately before a long jump $J_{LY}$ traverses different base-view data blocks in each operation mode. As described below, this enables the playback device 102 to easily perform seamless playback of video images during a long jump $J_{LY}$ while keeping the necessary capacity of the RB1 4221 and RB2 4222 to a minimum.

<<Arrangement 1>>

FIG. 100 is a schematic diagram showing arrangement 1 of a data block group recorded before and after a layer boundary LB on a BD-ROM disc 101. As shown in FIG. 100, a first extent block A001 is recorded before the layer boundary LB, and a second extent block A002 is recorded after the layer boundary LB. In the extent blocks A001 and A002, dependent-view data blocks D[n] and base-view data blocks B[n] form an interleaved arrangement (n= . . . , 0, 1, 2, 3, . . . ). In particular, the extent ATC times are the same between the $n^{th}$ pair of extents D[n] and B[n]. In arrangement 1, one base-view data block B[2]$_{2D}$ is further placed between the end B[1] of the first extent block A001 and the layer boundary LB. This base-view data block B[2]$_{2D}$ matches bit-for-bit with a base-view data block B[2]$_{SS}$ at the top of the second extent block A002. Hereinafter, $B[2]_{2D}$ is referred to as a "block exclusively for 2D playback", and $B[2]_{SS}$ is referred to as a "block exclusively for SS playback".

The base-view data blocks shown in FIG. 100 can be accessed as extents in a file 2D A010, i.e. as 2D extents EXT2D[•], with the exception of the block exclusively for SS playback $B[2]_{SS}$. For example, the base-view data block B[0] second from the end of the first extent block A001, the pair $B[1]+B[2]_{2D}$ of the last base-view data block B[1] and the block exclusively for 2D playback $B[2]_{2D}$, and the second base-view data block B[3] in the second extent block A002 can respectively be accessed as individual 2D extents EXT2D [0], EXT2D[1], and EXT2D[2]. On the other hand, the dependent-view data blocks D[n] (n= . . . , 0, 1, 2, 3, . . . ) shown in FIG. 100 can each be accessed as a single extent in the file DEP A012, i.e. as dependent-view extents EXT2[n].

For the data block groups shown in FIG. 100, cross-linking of AV stream files is performed as follows. The entire extent blocks A001 and A002 can respectively be accessed as one extent EXTSS[0] and EXTSS[1] in the file SS A020. Accordingly, the base-view data blocks B[0], B[1], and B[3] in the extent blocks A001 and A002 are shared by the file 2D A010 and file SS A020. On the other hand, the block exclusively for 2D playback $B[2]_{2D}$ can only be accessed as part of the 2D extent EXT2D[1] located immediately before the layer boundary LB. On the other hand, the block exclusively for SS playback $B[2]_{SS}$ can only be accessed as part of the extent SS EXTSS[1] located immediately after the layer boundary LB. Therefore, the base-view data blocks other than the block exclusively for 2D playback $B[2]_{2D}$, i.e. B[0], B[1], $B[2]_{SS}$, and B[3], can be extracted from extents SS EXTSS[0], EXTSS[1] as extents in the file base A011, i.e. base-view extents EXT1[n] (n=0, 1, 2, 3).

FIG. 101 is a schematic diagram showing a playback path A110 in 2D playback mode and a playback path A120 in 3D playback mode for the data block group in arrangement 1 shown in FIG. 100. The playback device 102 in 2D playback mode plays back the file 2D A010. Accordingly, as shown by the playback path A110 in 2D playback mode, the base-view data block B[0] second from the end of the first extent block A001 is read as the first 2D extent EXT2D[0], and then reading of the immediately subsequent dependent-view data block D[1] is skipped by a jump $J_{2D}1$. Next, a pair B[1]+B $[2]_{2D}$ of the last base-view data block B[1] in the first extent block A001 and the immediately subsequent block exclusively for 2D playback $B[2]_{2D}$ is read continuously as the second 2D extent EXT2D[1]. A long jump $J_{LY}$ occurs at the immediately subsequent layer boundary LB, and reading of the three data blocks D[2], $B[2]_{SS}$, and D[3] located at the top of the second extent block A002 is skipped. Subsequently, the second base-view data block B[3] in the second extent block A002 is read as the third 2D extent EXT2D[2]. On the other hand, the playback device 102 in 3D playback mode plays back the file SS A020. Accordingly, as shown by the playback path A120 in 3D playback mode, the entire first extent block A001 is continuously read as the first extent SS EXTSS[0]. Immediately thereafter, a long jump $J_{LY}$ occurs, and reading of the block exclusively for 2D playback $B[2]_{2D}$ is skipped. Subsequently, the entire second extent block A002 is read continuously as the second extent SS EXTSS[1].

As shown in FIG. 100, in 2D playback mode, the block exclusively for 2D playback $B[2]_{2D}$ is read, whereas reading of the block exclusively for SS playback $B[2]_{SS}$ is skipped. Conversely, in 3D playback mode, reading of the block exclusively for 2D playback $B[2]_{2D}$ is skipped, whereas the block exclusively for SS playback $B[2]_{SS}$ is read. However, since the data blocks $B[2]_{2D}$ and $B[2]_{SS}$ match bit-for-bit, the base-view video frames that are played back are the same in both playback modes. In arrangement 1, the playback path A110 in 2D playback mode and the playback path A120 in 3D playback mode are divided before and after the long jump $J_{LY}$ in this way. Accordingly, unlike the arrangement shown in FIG. 21, the size $S_{EXT2D}[1]$ of the 2D extent EXT2D[1] located immediately before the layer boundary LB and the size $S_{EXT2}$ [1] of the immediately preceding dependent-view data block D[1] can be determined separately as follows.

The size $S_{EXT2D}[1]$ of the 2D extent EXT2D[1] equals $S_{EXT1}[1]+S_{2D}$, the sum of the size $S_{EXT1}[1]$ of the base-view data block B[1] and the size $S_{2D}$ of the block exclusively for 2D playback $B[2]_{2D}$. Accordingly, for seamless playback of 2D video images, this sum $S_{EXT1}[1]+S_{2D}$ should satisfy expression 1. The maximum jump time $T_{JUMP\_MAX}$ of the long jump $J_{LY}$ is substituted into the right-hand side of expression 1 as the jump time $T_{JUMP\text{-}2D}$. Next, the number of sectors from the end of the block exclusively for 2D playback $B[2]_{2D}$ to the first 2D extent EXT2D[2]=B[3] in the second extent block A002 should be equal to or less than the maximum jump distance $S_{JUMP\_MAX}$ for the long jump $J_{LY}$ specified in accordance with the capabilities of the 2D playback device.

On the other hand, for seamless playback of 3D video images, the sizes $S_{EXT2}[1]$ and $S_{EXT1}[1]$ of the dependent-view data block D[1] and base-view data block B[1] located at the end of the first extent SS EXTSS[0] should satisfy expressions 3 and 2. Regardless of the occurrence of a long jump $J_{LY}$, a typical value for a zero sector transition time should be substituted into the right-hand side of expressions 3 and 2 as the zero sector transition times $T_{JUMP0}[2n+1]$ and $T_{JUMP0}[2n+2]$. Next, the size of the first extent SS EXTSS[0] should satisfy condition 4. Furthermore, the number of sectors from the end of this extent SS EXTSS[0] to the top of the extent SS EXTSS[1] should be equal to or less than the maximum jump distance $S_{JUMP\_MAX}$ for a long jump $J_{LY}$ specified in accordance with the capabilities of the 3D playback device.

Within the 2D extent EXT2D[1] located immediately before a layer boundary LB, only the base-view data block B[1] located at the front of the 2D extent EXT2D[1] is shared with the first extent SS EXTSS[0]. Accordingly, by appropriately enlarging the size $S_{2D}$ of the block exclusively for 2D playback $B[2]_{2D}$, the size $S_{EXT1}[1]$ of the base-view data block B[1] can be further limited while keeping the size $S_{EXT2D}[1]=S_{EXT1}[1]+S_{2D}$ of the 2D extent EXT2D[1] constant. In this case, the extent ATC time of the base-view data block B[1] is shortened. As a result, the size $S_{EXT2}[1]$ of the dependent-view data block D[1] located immediately before can also be further limited.

Since the block exclusively for SS playback $B[2]_{SS}$ and the block exclusively for 2D playback $B[2]_{2D}$ match bit for bit, enlarging the size $S_{2D}$ of the block exclusively for 2D playback $B[2]_{2D}$ enlarges the size of the dependent-view data block D[2] located immediately before the block exclusively for SS playback $B[2]_{SS}$. However, this size can be made sufficiently smaller than the size of the dependent-view data block D[3] located immediately before the layer boundary LB shown in FIG. 21. The capacity of the RB1 4221 and RB2 4222 can thus be brought even closer to the minimum amount necessary for seamless playback of 3D video images. It is thus possible to set each data block in arrangement 1 to be a size at which seamless playback of both 2D and 3D video images during a long jump is possible while keeping the read buffer capacity that is to be guaranteed in the playback device 102 to the minimum necessary.

In arrangement 1, duplicate data of the block exclusively for 2D playback $B[2]_{2D}$ is arranged in the first extent block A001 as a single block exclusively for SS playback B[2]$_{SS}$. Alternatively, this duplicate data may be divided into two or more blocks exclusively for SS playback.

<<Arrangement 2>>

FIG. 102 is a schematic diagram showing arrangement 2 of a data block group recorded before and after a layer boundary LB on a BD-ROM disc 101. As shown by comparing FIG. 102 with FIG. 100, arrangement 2 differs from arrangement 1 in that an extent block A202, which includes blocks exclusively for SS playback B[2]$_{SS}$ and B[3]$_{SS}$, is located immediately before a layer boundary LB.

As shown in FIG. 102, a first extent block A201, block exclusively for 2D playback (B[2]+B[3])$_{2D}$, and second extent block A202 are located before a layer boundary LB in this order, and a third extent block A203 is located after the layer boundary LB. In the extent blocks A201-A203, dependent-view data blocks D[n] and base-view data blocks B[n] form an interleaved arrangement (n= . . . , 0, 1, 2, 3, 4, . . . ). In particular, the extent ATC times are the same between the n$^{th}$ pair of extents D[n] and B[n]. In the second extent block A202, stream data is continuous with the data blocks D[1] and B[1] located at the end of the first extent block A201 and the data blocks D[4] and B[4] located at the top of the third extent block A203. The base-view data blocks included in the second extent block A202 are both blocks exclusively for SS playback, B[2]$_{SS}$ and B[3]$_{SS}$, and the combination of these blocks B[2]$_{SS}$+B[3]$_{SS}$ matches bit-for-bit with the block exclusively for 2D playback (B[2]+B[3])$_{2D}$ located before the second extent block A202.

Within the base-view data block shown in FIG. 102, data blocks other than the blocks exclusively for SS playback B[2]$_{SS}$ and B[3]$_{SS}$ can be accessed as extents EXT2D[0], EXT2D[1], and EXT2D[2] in a file 2D A210. In particular, the pair of the last base-view data block B[1] and the block exclusively for 2D playback (B[2]+B[3])$_{2D}$ in the first extent block A201 can be accessed as a single 2D extent EXT2D[1]. Furthermore, the base-view data blocks not located in the second extent block A202, i.e. the data blocks B[0], B[1], and B[4] in the extent blocks A201 and A203, can also be extracted as extents EXT1[0], EXT1[1], and EXT1[4] in the file base A211 from the extents EXTSS[0] and EXTSS[1] in the file SS A220. Conversely, the block exclusively for 2D playback (B[2]+B[3])$_{2D}$ can only be accessed as part of the 2D extent EXT2D[1]. On the other hand, the blocks exclusively for SS playback B[2]$_{SS}$ and B[3]$_{SS}$ can be extracted from the extent SS EXTSS[1] as base-view extents EXT1[2] and EXT1[3].

FIG. 103 is a schematic diagram showing a playback path A310 in 2D playback mode and a playback path A320 in 3D playback mode for the data block group in arrangement 2 shown in FIG. 102. The playback device 102 in 2D playback mode plays back the file 2D A210. Accordingly, as shown by the playback path A310 in 2D playback mode, the base-view data block B[0] second from the end of the first extent block A201 is read as the first 2D extent EXT2D[0], and then reading of the immediately subsequent dependent-view data block D[1] is skipped by a jump J$_{2D}$1. Next, the pair of the last base-view data block B[1] in the first extent block A201 and the immediately subsequent block exclusively for 2D playback (B[2]+B[3])$_{2D}$ are continuously read as the second 2D extent EXT2D[1]. A long jump J$_{LY}$ occurs immediately thereafter, and reading of the second extent block A202 and the dependent-view data block D[4] located at the top of the third extent block A203 is skipped. Subsequently, the first base-view data block B[4] in the third extent block A203 is read as the third 2D extent EXT2D[2]. The playback device 102 in 3D playback mode plays back the file SS A220. Accordingly, as shown by the playback path A320 in 3D playback mode, the entire first extent block A201 is continuously read as the first extent SS EXTSS[0]. A jump J$_{EX}$ occurs immediately thereafter, and reading of the block exclusively for 2D playback (B[2]+B[3])$_{2D}$ is skipped. Next, the entire second extent block A202 is read continuously as the second extent SS EXTSS[1]. Immediately thereafter, a long jump J$_{LY}$ to skip over a layer boundary LB occurs. Subsequently, the entire third extent block A203 is read continuously as the third extent SS EXTSS[2].

As shown in FIG. 103, in 2D playback mode, the block exclusively for 2D playback (B[2]+B[3])$_{2D}$ is read, whereas reading of the blocks exclusively for SS playback B[2]$_{SS}$ and B[3]$_{SS}$ is skipped. Conversely, in 3D playback mode, reading of the block exclusively for 2D playback (B[2]+B[3])$_{2D}$ is skipped, whereas the blocks exclusively for SS playback B[2]$_{SS}$ and B[3]$_{SS}$ are read. However, since the block exclusively for 2D playback (B[2]+B[3])$_{2D}$ matches the entirety of the blocks exclusively for SS playback B[2]$_{SS}$+B[3]$_{SS}$ bit-for-bit, the base-view video frames that are played back are the same in both playback modes. In arrangement 2, the playback path A310 in 2D playback mode and the playback path A320 in 3D playback mode are divided before and after the long jump J$_{LY}$ in this way. Accordingly, the size S$_{EXT2D}$[1] of the 2D extent EXT2D[1] located immediately before the layer boundary LB and the size S$_{EXT2}$[1] of the immediately preceding dependent-view data block D[1] can be determined separately as follows.

The size S$_{EXT2D}$[1] of the 2D extent EXT$_{2D}$[1] equals S$_{EXT1}$[1]+S$_{2D}$, the sum of the size S$_{EXT1}$[1] of the base-view data block B[1] and the size S$_{2D}$ of the block exclusively for 2D playback (B[2]+B[3])$_{2D}$. Accordingly, for seamless playback of 2D video images, this sum S$_{EXT1}$[1]+S$_{2D}$ should satisfy expression 1. The maximum jump time T$_{JUMP\_MAX}$ of the long jump J$_{LY}$ is substituted into the right-hand side of expression 1 as the jump time T$_{JUMP-2D}$. Next, the number of sectors from the end of the block exclusively for 2D playback (B[2]+B[3])$_{2D}$ to the first 2D extent EXT2D[2]=B[4] in the third extent block A203 should be equal to or less than the maximum jump distance S$_{JUMP\_MAX}$ for the long jump J$_{LY}$ specified in accordance with the capabilities of the 2D playback device.

On the other hand, for seamless playback of 3D video images, the sizes S$_{EXT2}$[1] and S$_{EXT1}$[1] of the dependent-view data block D[1] and base-view data block B[1] located at the end of the first extent SS EXTSS[0] should satisfy expressions 3 and 2. Regardless of the occurrence of a jump J$_{EX}$, a typical value for a zero sector transition time should be substituted into the right-hand side of expressions 3 and 2 as the zero sector transition times T$_{JUMP0}$[2n+1] and T$_{JUMP0}$[2n+2]. Next, the sizes S$_{EXT2}$[3] and S$_{EXT1}$[3] of the dependent-view data block D[3] and block exclusively for SS playback B[3]$_{SS}$ located at the end of the second extent SS EXTSS[1] should satisfy expressions 3 and 2. Regardless of the occurrence of a long jump J$_{LY}$, a typical value for a zero sector transition time should be substituted into the right-hand side of expressions 3 and 2 as the zero sector transition times T$_{JUMP0}$[2n+1] and T$_{JUMP0}$[2n+2].

Only the base-view data block B[1] located at the front of the 2D extent EXT2D[1] is shared with the extent SS EXTSS[1]. Accordingly, by appropriately enlarging the size S$_{2D}$ of the block exclusively for 2D playback (B[2]+B[3])$_{2D}$, the size S$_{EXT1}$[1] of the base-view data block B[1] can be further limited while keeping the size S$_{EXT2D}$[1]=S$_{EXT1}$[1]+S$_{2D}$ of the 2D extent EXT2D[1] constant. As a result, the size S$_{EXT2}$[1] of the dependent-view data block D[1] located immediately before can also be further limited.

The blocks exclusively for SS playback $B[2]_{SS}+B[3]_{SS}$ entirely match the block exclusively for 2D playback $(B[2]+B[3])_{2D}$ bit for bit. Accordingly, enlarging the size $S_{2D}$ of the block exclusively for 2D playback $(B[2]+B[3])_{2D}$ enlarges the sizes of the dependent-view data blocks D[2] and D[3] respectively located immediately before the blocks exclusively for SS playback $B[2]_{SS}$ and $B[3]_{SS}$. However, there are two blocks exclusively for SS playback $B[2]_{SS}$ and $B[3]_{SS}$ as compared to one block exclusively for 2D playback $(B[2]+B[3])_{2D}$. As a result, the sizes of each of the blocks exclusively for SS playback $B[2]_{SS}$ and $B[3]_{SS}$ can be made sufficiently small. The capacity of the RB1 4221 and RB2 4222 can thus be further reduced to a minimum amount necessary for seamless playback of 3D video images. It is thus possible to set each data block in arrangement 2 to be a size at which seamless playback of both 2D and 3D video images is possible while keeping the read buffer capacity that is to be guaranteed in the playback device 102 to the minimum necessary.

As explained with reference to FIG. 90, the smaller in size the data block arranged at the end of an extent block positioned immediately before a long jump is, the smaller the lower limit of the capacity of RB2 4222 is. Accordingly, arrangement 2 is preferably set so as to satisfy the following two conditions. In that case, in the second extent block A202, which includes blocks exclusively for 3D playback $B[2]_{SS}$ and $B[3]_{SS}$, each data block is sufficiently small in size. As a result, the lower limit of the capacity of RB2 4222 can further be reduced.

The first condition is that an upper limit is specified for the size of the block exclusively for 2D playback $(B[2]+B[3])_{2D}$ arranged immediately before the second extent block A202. For example, as shown in FIG. 103, the size $S_{2D}$ of the block exclusively for 2D playback $(B[2]+B[3])_{2D}$ a is restricted to equal to or smaller than 20000 sectors. The upper limit depends on the jump performance of the 2D playback device. The second condition is that an upper limit $T_{EXT\_3D\_MAX}$ is specified for the extent ATC time of the blocks exclusively for 3D playback $B[2]_{SS}$ and $B[3]_{SS}$. That is to say, the size of the blocks exclusively for 3D playback $B[2]_{SS}$ and $B[3]_{SS}$ satisfies, instead of expression 1, the following expression: $S_{EXT1}[n] \leq R_{EXT1}[n] \times T_{EXT\_3D\_MAX}$. The upper limit $T_{EXT\_3D\_MAX}$ is set to, for example, 0.5 seconds.

FIG. 104 is a schematic diagram showing the relationships between the read time $S_{EXT1}[3]/R_{UD72}$ of the block exclusively for 3D playback $B[3]_{SS}$ located at the end of the second extent block A202 and the lower limit of the capacity of RB2 4222. As shown in FIG. 104, the stored data amount DA2 in the RB2 4222 reaches a maximum value DM2 at the point at the start of reading the block exclusively for 3D playback $B[3]_{SS}$. The maximum value DM2 is equal to or greater than a value that is obtained by multiplying the dependent-view transfer rate $R_{EXT2}[3]$ by the sum of the length $S_{EXT1}[3]/R_{UD72}$ of the read period of the block exclusively for 3D playback $B[3]_{SS}$, the time required for long jump $T_{LY}$, and the length $S_{EXT2}[4]/R_{UD72}$ of the preload period: $DM2 \geq (S_{EXT1}[3]/R_{UD72}+T_{LY}+S_{EXT2}[4]/R_{UD72}) \times R_{EXT2}[3]$. Accordingly, if the size of the block exclusively for 3D playback $B[3]_{SS}$ is a value $S_L[3]$ which is larger than that, the length $S_L[3]/R_{UD72}$ of the read period increases. Thus, as shown by the dashed line in FIG. 104, the maximum value DM20 of the stored data amount DA2 in the RB2 4222 increases. For this reason, the above-described two conditions are used to restrict the size of each of the blocks exclusively for 3D playback $B[2]_{SS}$, $B[3]_{SS}$ to a small value. This enables the lower limit of the capacity of RB2 4222 to reduced further.

Note that, in order for condition 4 to be satisfied, the size of the data block positioned at the top of each extent block, namely the length of the preload period, needs to be maintained sufficiently large. Thus with regard to the block exclusively for 3D playback positioned at the top of the extent block, the extent ATC time thereof may exceed the upper limit $T_{EXT\_3D\_MAX}$.

Arrangement 2 may be provided at a position where an interrupt playback can be started, as well as before the layer boundary LB. In FIG. 102, the vertices of the triangles A230, A231, and A232 indicate positions where an interrupt playback can be started, namely positions on the BD-ROM disc where entry points are recorded. The entry point indicated by the white triangle A230 represents a position where an interrupt playback can be started in the 2D playback mode. The entry points indicated by the black triangles A231 and A232 represent positions where an interrupt playback can be started in the 3D playback mode. Each of the blocks exclusively for 3D playback $B[2]_{SS}$, $B[3]_{SS}$ is smaller sufficiently in size than the block exclusively for 2D playback $(B[2]+B[3])_{2D}$, and thus the size of the corresponding dependent-view data block D[2], D[3] is sufficiently small. As a result, when an interrupt playback is performed in the 3D playback mode, the time required from the start of access to the entry point A231, A232 to the start of decoding of the data block D[2], $B[2]_{SS}$ is short. That is to say, an interrupt playback in the 3D playback mode is started up fast.

In arrangement 2, duplicate data of the block exclusively for 2D playback $(B[2]+B[3])_{2D}$ is divided into two blocks exclusively for SS playback $B[2]_{SS}$ and $B[3]_{SS}$. Alternatively, the duplicate data may be one block exclusively for SS playback or may be divided into three or more blocks exclusively for SS playback.

<Extent Pair Flag>

FIG. 105 is a schematic diagram showing entry points A510 and A520 set for extents EXT1[k] and EXT2[k] (the letter k represents an integer greater than or equal to j) in a file base A501 and a file DEP A502. The entry point A510 in the file base A501 is defined by the entry map in the 2D clip information file, and the entry point A520 in the file DEP A502 is defined by the entry map in the dependent-view clip information file. Each entry point A510 and A520 particularly includes an extent pair flag. When an entry point in the file base A501 and an entry point in the file DEP A502 indicate the same PTS, an "extent pair flag" indicates whether or not the extents in which these entry points are set EXT1[i] and EXT2[j] are in the same order from the top of the files A501 and A502 (i=j or i≠j). As shown in FIG. 105, the PTS of the first entry point A530 set in the $(n+1)^{th}$ (the letter n represents an integer greater than or equal to 1) base-view extent EXT1[n] equals the PTS of the last entry point A540 set in the $(n-1)^{th}$ dependent-view extent EXT2[n-1]. Accordingly, the value of the extent pair flag for the entry points A530 and A540 is set to "0". Similarly, the PTS of the last entry point A531 set in the $(n+1)^{th}$ base-view extent EXT1[n] equals the PTS of the first entry point A541 set in the $(n+1)^{th}$ dependent-view extent EXT2[n+1]. Accordingly, the value of the extent pair flag for the entry points A531 and A541 is set to "0". For other entry points A510 and A520, when the PTSs are equal, the order of the extents EXT1[•] and EXT2[•] in which these points are set is also equal, and thus the value of the extent pair flag is set to "1".

When the playback device 102 in 3D playback mode begins interrupt playback, it refers to the extent pair flag in the entry point of the playback start position. When the value of the flag is "1", playback actually starts from that entry point. When the value is "0", the playback device 102 searches, before or after that entry point, for another entry point that has an extent pair flag with a value of "1". Playback starts from that other entry point. This ensures that the n$^{th}$ dependent-view extent EXT2[n] is read before the n$^{th}$ n base-view extent EXT1[n]. As a result, interrupt playback can be simplified.

The presentation time corresponding to the distance between entry points having an extent pair flag=0 may be limited to be no greater than a constant number of seconds. For example, the time may be limited to be less than or equal to twice the maximum value of the presentation time for one GOP. At the start of interrupt playback, this can shorten the wait time until playback begins, which is caused by searching for an entry point having an extent pair flag=1. Alternatively, the value of the extent pair flag for the entry point following an entry point with an extent pair flag=0 may be limited to a value of "1". An angle switching flag may also be used as a substitute for an extent pair flag. An "angle switching flag" is a flag prepared within the entry map for content that supports multi-angle. The angle switching flag indicates the angle switching position within multiplexed stream data (see below for a description of multi-angle).

<Matching Playback Periods Between Data Blocks>

For pairs of data blocks with equal extent ATC times, the playback period may also match, and the playback time of the video stream may be equal. In other words, the number of VAUs may be equal between these data blocks. The significance of such equality is explained below.

FIG. 106A is a schematic diagram showing a playback path when extent ATC times and playback times of the video stream differ between contiguous base-view data blocks and dependent-view data blocks. As shown in FIG. 106A, the playback time of the top base-view data block B[0] is four seconds, and the playback time of the top dependent-view data block D[0] is one second. In this case, the section of the base-view video stream that is necessary for decoding of the dependent-view data block D[0] has the same playback time as the dependent-view data block D[0]. Accordingly, to save read buffer capacity in the playback device, it is preferable, as shown by the arrow ARW1 in FIG. 106A, to have the playback device alternately read the base-view data block B[0] and the dependent-view data block D[0] by the same amount of playback time, for example one second at a time. In that case, however, as shown by the dashed lines in FIG. 106A, jumps occur during read processing. As a result, it is difficult to cause read processing to keep up with decoding processing, and thus it is difficult to stably maintain seamless playback.

FIG. 106B is a schematic diagram showing a playback path when the playback times of the video stream are equal for contiguous base-view and dependent-view data blocks. As shown in FIG. 106B, the playback time of the video stream between a pair of adjacent data blocks may be the same. For example, for the pair of the top data blocks B[0] and D[0], the playback times of the video stream both equal one second, and the playback times of the video stream for the second pair of data blocks B[1] and D[1] both equal 0.7 seconds. In this case, during 3D playback mode, the playback device reads data blocks B[0], D[0], B[1], D[1], . . . in order from the top, as shown by arrow ARW2 in FIG. 106B. By simply reading these data blocks in order, the playback device can smoothly read the main TS and sub-TS alternately in the same increments of playback time. In particular, since no jump occurs during read processing, seamless playback of 3D video images can be stably maintained.

If the extent ATC time is actually the same between contiguous base-view and dependent-view data blocks, jumps do not occur during reading, and synchronous decoding can be maintained. Accordingly, even if the playback period or the playback time of the video stream are not equal, the playback device can reliably maintain seamless playback of 3D video images by simply reading data block groups in order from the top, as in the case shown in FIG. 106B.

The number of any of the headers in a VAU, and the number of PES headers, may be equal for contiguous base-view and dependent-view data blocks. These headers are used to synchronize decoding between data blocks. Accordingly, if the number of headers is equal between data blocks, it is relatively easy to maintain synchronous decoding, even if the number of VAUs is not equal. Furthermore, unlike when the number of VAUs is equal, all of the data in the VAUs need not be multiplexed in the same data block. Therefore, there is a high degree of freedom for multiplexing stream data during the authoring process of the BD-ROM disc 101.

The number of entry points may be equal for contiguous base-view and dependent-view data blocks. Referring again to FIG. 105, in the file base A501 and the file DEP A502, the extents EXT1[n] and EXT2[n], located in the same order from the top, have the same number of entry points A510 and A520, after excluding the entry points A530, A540, A531, A541 with an extent pair flag=0. Whether jumps are present differs between 2D playback mode and 3D playback mode. When the number of entry points is equal between data blocks, however, the playback time is substantially equal. Accordingly, it is easy to maintain synchronous decoding regardless of jumps. Furthermore, unlike when the number of VAUs is equal, all of the data in the VAUs need not be multiplexed in the same data block. Therefore, there is a high degree of freedom for multiplexing stream data during the authoring process of the BD-ROM disc 101.

<Multi-Angle>

FIG. 107A is a schematic diagram showing a playback path for multiplexed stream data supporting multi-angle. As shown in FIG. 107A, three types of pieces of stream data L, R, and D respectively for a base view, right view, and depth map are multiplexed in the multiplexed stream data. For example, in L/R mode the base-view and right-view pieces of stream data L and R are played back in parallel. Furthermore, pieces of stream data Ak, Bk, and Ck (k=0, 1, 2, . . . , n) for different angles (viewing angles) are multiplexed in the section played back during a multi-angle playback period $P_{ANG}$. The stream data Ak, Bk, and Ck for different angles is divided into sections for which the playback time equals the angle change interval. Furthermore, stream data for the base view, right view and depth map is multiplexed in each of the pieces of data Ak, Bk, and Ck. During the multi-angle playback period $P_{ANG}$, playback can be switched between the pieces of stream data Ak, Bk, and Ck for different angles in response to user operation or instruction by an application program.

FIG. 107B is a schematic diagram showing a data block group A701 recorded on a BD-ROM disc and a corresponding playback path A702 in L/R mode. This data block group A701 includes the pieces of stream data L, R, D, Ak, Bk, and Ck shown in FIG. 107A. As shown in FIG. 107B, in the data block group A701, in addition to the regular pieces of stream data L, R, and D, the pieces of stream data Ak, Bk, and Ck for different angles are recorded in an interleaved arrangement. In L/R mode, as shown in the playback path A702, the right-view and base-view data blocks R and L are read, and reading of the depth map data blocks D is skipped by jumps. Furthermore, from among the pieces of stream data Ak, Bk, and Ck for different angles, the data blocks for the selected angles A0, B1, . . . , Cn are read, and reading of other data blocks is skipped by jumps.

FIG. 107C is a schematic diagram showing an extent block formed by stream data Ak, Bk, and Ck for different angles. As shown in FIG. 107C, the pieces of stream data Ak, Bk, and Ck for each angle are composed of three types of data blocks L, R, and D recorded in an interleaved arrangement. In L/R mode, as shown by the playback path A702, from among the pieces of stream data Ak, Bk, and Ck for different angles, right-view and base-view data blocks R and L are read for selected angles A0, B1, ..., Cn. Conversely, reading of the other data blocks is skipped by jumps.

Note that in the pieces of stream data Ak, Bk, and Ck for each angle, the stream data for the base view, right view, and depth map may be stored as a single piece of multiplexed stream data. However, the recording rate has to be limited to the range of the system rate for which playback is possible in the 2D playback device. Also, the number of pieces of stream data (TS) to be transferred to the system target decoder differs between such pieces of multiplexed stream data and multiplexed stream data for other 3D video images. Accordingly, each PI in the 3D playlist file may include a flag indicating the number of TS to be played back. By referring to this flag, the 3D playback device can switch between these pieces of multiplexed stream data within one 3D playlist file. In the PI that specifies two TS for playback in 3D playback mode, this flag indicates 2TS. On the other hand, in the PI that specifies a single TS for playback, such as the above pieces of multiplexed stream data, the flag indicates 1TS. The 3D playback device can switch the setting of the system target decoder in accordance with the value of the flag. Furthermore, this flag may be expressed by the value of the connection condition (CC). For example, a CC of "7" indicates a transition from 2TS to 1TS, whereas a CC of "8" indicates a transition from 1TS to 2TS.

FIG. 108 is a schematic diagram showing (i) a data block group A801 constituting a multi-angle period and (ii) a playback path A810 in 2D playback mode and playback path A820 in L/R mode that correspond to the data block group A801. As shown in FIG. 108, this data block group A801 is formed by three types of angle change sections ANG1 #k, ANG2 #k, and ANG3 #k (k=1, 2, ..., 6, 7) in an interleaved arrangement. An "angle change section" is a group of consecutive data blocks in which stream data for video images seen from a single angle is stored. The angle of video images differs between different types of angle change sections. The $k^{th}$ sections of each type of angle change section ANG1 #k, ANG2 #k, and ANG3 #k are contiguous. Each angle change section ANGm #k (m=1, 2, 3) is formed by one extent block, i.e. is referred to as one extent SS EXTSS[k] (k=10, 11, ..., 23). The capacity of the read buffer can thus be reduced as compared to when a plurality of angle change sections form one extent SS EXTSS[k]. Furthermore, each extent block includes one dependent-view data block R and one base-view data block L. This pair of data blocks R and L is referred to as a pair of the $n^{th}$ dependent-view extent EXT2[n] and the $n^{th}$ base-view extent EXT1[n] (the letter n represents an integer greater than or equal to 0).

The size of each extent block satisfies conditions 1-4. In particular, the jump that should be taken into consideration in condition 1 is the jump $J_{ANG-2D}$ to skip reading of other angle change sections, as shown by the playback path A810 in 2D playback mode. On the other hand, the jump that should be taken into consideration in condition 4 is the jump $J_{ANG-LR}$ to skip reading of other angle change sections, as shown by the playback path A820 in L/R mode. As shown by the playback paths A810 and A820, both of these jumps $J_{ANG-2D}$ and $J_{ANG-LR}$ generally include an angle switch, i.e. a switch between the types of angle change section to be read.

Further referring to FIG. 108, each angle change section includes one base-view data block L. Accordingly, the extent ATC time of the base-view extent EXT1[•] is limited to being no greater than the maximum value $T_{ANG}$ of the length of the angle change section. For example, in order to make it possible to switch angles at a rate of once every two seconds of presentation time, the maximum value $T_{ANG}$ of the length of the angle change section has to be limited to two seconds. As a result, the extent ATC time of the base-view extent EXT1[•] is limited to two seconds or less. Therefore, condition 5 is changed so that the size $S_{EXT1}$ of the base-view extent satisfies expression 11 instead of expression 5.

$$S_{EXT1}[k] \leq \max\left(R_{EXT1}[k] \times \frac{R_{UD54}}{R_{UD54} - R_{MAX1}} \times T_{JUMP\_2D\_MIN}, R_{EXT1}[k] \times T_{ANG}\right) \quad (11)$$

Note that the right-hand side of expression 9 may be compared instead of the right-hand side of expression 5. Also, in a similar manner to the extension time ΔT of the extent ATC time of the 2D extent shown in expression 7A or 7B, the maximum value $T_{ANG}$ of the length of the angle change section may be determined by the length of a GOP, or by the upper limit of the number of extents that can be played back during a predetermined time. Furthermore, the extension time ΔT may be set to "0" in the multi-angle.

<Data Distribution Via Broadcasting or Communication Circuit>

The recording medium according to the embodiments of the present invention may be, in addition to an optical disc, a general removable medium available as a package medium, such as a portable semiconductor memory device, including an SD memory card. Also, the above embodiments describe an example of an optical disc in which data has been recorded beforehand, namely, a conventionally available read-only optical disc such as a BD-ROM or a DVD-ROM. However, the embodiments of the present invention are not limited in this way. For example, when a terminal device writes 3D video content that has been distributed via broadcasting or a network onto a conventionally available writable optical disc such as a BD-RE or a DVD-RAM, arrangement of the extents according to Embodiment 1 may be used. The terminal device may be incorporated in a playback device or may be a device different from the playback device.

<Playback of Semiconductor Memory Card>

The following describes a data reading unit of a playback device in the case where a semiconductor memory card is used as the recording medium according to the embodiments of the present invention instead of an optical disc.

The part of the playback device that reads data from an optical disc is composed of, for example, an optical disc drive. Conversely, the part of the playback device that reads data from a semiconductor memory card is composed of an exclusive interface (I/F). Specifically, a card slot is provided with the playback device, and the I/F is mounted in the card slot. When the semiconductor memory card is inserted into the card slot, the semiconductor memory card is electrically connected with the playback device via the I/F. Furthermore, the data is read from the semiconductor memory card to the playback device via the I/F.

<Copyright Protection Technique for Data Stored in BD-ROM Disc>

The mechanism for protecting copyright of data recorded on a BD-ROM disc is now described as an assumption for the following supplementary explanation.

From a standpoint, for example, of improving copyright protection or confidentiality of data, there are cases in which a part of the data recorded on the BD-ROM is encrypted. The encrypted data is, for example, a video stream, an audio stream, or other stream. In such a case, the encrypted data is decoded in the following manner.

The playback device has recorded thereon beforehand a part of data necessary for generating a "key" to be used for decoding the encrypted data recorded on the BD-ROM disc, namely, a device key. On the other hand, the BD-ROM disc has recorded thereon another part of the data necessary for generating the "key", namely, a media key block (MKB), and encrypted data of the "key", namely, an encrypted title key. The device key, the MKB, and the encrypted title key are associated with one another, and each are further associated with a particular ID written into a BCA 201 recorded on the BD-ROM disc 101 shown in FIG. 2, namely, a volume ID. When the combination of the device key, the MKB, the encrypted title key, and the volume ID is not correct, the encrypted data cannot be decoded. In other words, only when the combination is correct, the above-mentioned "key", namely the title key, can be generated. Specifically, the encrypted title key is first decrypted using the device key, the MKB, and the volume ID. Only when the title key can be obtained as a result of the decryption, the encrypted data can be decoded using the title key as the above-mentioned "key".

When a playback device tries to play back the encrypted data recorded on the BD-ROM disc, the playback device cannot play back the encrypted data unless the playback device has stored thereon a device key that has been associated beforehand with the encrypted title key, the MKB, the device, and the volume ID recorded on the BD-ROM disc. This is because a key necessary for decoding the encrypted data, namely a title key, can be obtained only by decrypting the encrypted title key based on the correct combination of the MKB, the device key, and the volume ID.

In order to protect the copyright of at least one of a video stream and an audio stream that are to be recorded on a BD-ROM disc, a stream to be protected is encrypted using the title key, and the encrypted stream is recorded on the BD-ROM disc. Next, a key is generated based on the combination of the MKB, the device key, and the volume ID, and the title key is encrypted using the key so as to be converted to an encrypted title key. Furthermore, the MKB, the volume ID, and the encrypted title key are recorded on the BD-ROM disc. Only a playback device storing thereon the device key to be used for generating the above-mentioned key can decode the encrypted video stream and/or the encrypted audio stream recorded on the BD-ROM disc using a decoder. In this manner, it is possible to protect the copyright of the data recorded on the BD-ROM disc.

The above-described mechanism for protecting the copyright of the data recorded on the BD-ROM disc is applicable to a recording medium other than the BD-ROM disc. For example, the mechanism is applicable to a readable and writable semiconductor memory device and in particular to a portable semiconductor memory card such as an SD card.

<Recording Data on a Recording Medium Through Electronic Distribution>

The following describes processing to transmit data, such as an AV stream file for 3D video images (hereinafter, "distribution data"), to the playback device according to the embodiments of the present invention via electronic distribution and to cause the playback device to record the distribution data on a semiconductor memory card. Note that the following operations may be performed by a specialized terminal device for performing the processing instead of the above-mentioned playback device. Also, the following description is based on the assumption that the semiconductor memory card that is a recording destination is an SD memory card.

The playback device includes the above-described card slot. An SD memory card is inserted into the card slot. The playback device in this state first transmits a transmission request of distribution data to a distribution server on a network. At this point, the playback device reads identification information of the SD memory card from the SD memory card and transmits the read identification information to the distribution server together with the transmission request. The identification information of the SD memory card is, for example, an identification number specific to the SD memory card and, more specifically, is a serial number of the SD memory card. The identification information is used as the above-described volume ID.

The distribution server has stored thereon pieces of distribution data. Distribution data that needs to be protected by encryption such as a video stream and/or an audio stream has been encrypted using a predetermined title key. The encrypted distribution data can be decrypted using the same title key.

The distribution server stores thereon a device key as a private key common with the playback device. The distribution server further stores thereon an MKB in common with the SD memory card. Upon receiving the transmission request of distribution data and the identification information of the SD memory card from the playback device, the distribution server first generates a key from the device key, the MKB, and the identification information and encrypts the title key using the generated key to generate an encrypted title key.

Next, the distribution server generates public key information. The public key information includes, for example, the MKB, the encrypted title key, signature information, the identification number of the SD memory card, and a device list. The signature information includes for example a hash value of the public key information. The device list is a list of devices that need to be invalidated, that is, devices that have a risk of performing unauthorized playback of encrypted data included in the distribution data. The device list specifies the device key and the identification number for the playback device, as well as an identification number or function (program) for each element in the playback device such as the decoder.

The distribution server transmits the distribution data and the public key information to the playback device. The playback device receives the distribution data and the public key information and records them in the SD memory card via the exclusive I/F of the card slot.

Encrypted distribution data recorded on the SD memory card is decrypted using the public key information in the following manner, for example. First, three types of checks are performed as authentication of the public key information. These checks may be performed in any order.

(1) Does the identification information of the SD memory card included in the public key information match the identification number stored in the SD memory card inserted into the card slot?

(2) Does a hash value calculated based on the public key information match the hash value included in the signature information?

(3) Is the playback device excluded from the device list indicated by the public key information? Specifically, is the device key of the playback device excluded from the device list?

If at least any one of the results of the checks (1) to (3) is negative, the playback device stops decryption processing of the encrypted data. Conversely, if all of the results of the checks (1) to (3) are affirmative, the playback device authorizes the public key information and decrypts the encrypted title key included in the public key information using the device key, the MKB, and the identification information of the SD memory card, thereby obtaining a title key. The playback device further decrypts the encrypted data using the title key, thereby obtaining, for example, a video stream and/or an audio stream.

The above mechanism has the following advantage. If a playback device, compositional elements, and a function (program) that have the risk of being used in an unauthorized manner are already known when data is transmitted via the electronic distribution, the corresponding pieces of identification information are listed in the device list and are distributed as part of the public key information. On the other hand, the playback device that has requested the distribution data inevitably needs to compare the pieces of identification information included in the device list with the pieces of identification information of the playback device, its compositional elements, and the like. As a result, if the playback device, its compositional elements, and the like are identified in the device list, the playback device cannot use the public key information for decrypting the encrypted data included in the distribution data even if the combination of the identification number of the SD memory card, the MKB, the encrypted title key, and the device key is correct. In this manner, it is possible to effectively prevent distribution data from being used in an unauthorized manner.

The identification information of the semiconductor memory card is desirably recorded in a recording area having high confidentiality included in a recording area of the semiconductor memory card. This is because if the identification information such as the serial number of the SD memory card has been tampered with in an unauthorized manner, it is possible to realize an illegal copy of the SD memory card easily. In other words, if the tampering allows generation of a plurality of semiconductor memory cards having the same identification information, it is impossible to distinguish between authorized products and unauthorized copy products by performing the above check (1). Therefore, it is necessary to record the identification information of the semiconductor memory card on a recording area with high confidentiality in order to protect the identification information from being tampered with in an unauthorized manner.

The recording area with high confidentiality is structured within the semiconductor memory card in the following manner, for example. First, as a recording area electrically disconnected from a recording area for recording normal data (hereinafter, "first recording area"), another recording area (hereinafter, "second recording area") is provided. Next, a control circuit exclusively for accessing the second recording area is provided within the semiconductor memory card. As a result, access to the second recording area can be performed only via the control circuit. For example, assume that only encrypted data is recorded on the second recording area and a circuit for decrypting the encrypted data is incorporated only within the control circuit. As a result, access to the data recorded on the second recording area can be performed only by causing the control circuit to store therein an address of each piece of data recorded in the second recording area. Also, an address of each piece of data recorded on the second recording area may be stored only in the control circuit. In this case, only the control circuit can identify an address of each piece of data recorded on the second recording area.

In the case where the identification information of the semiconductor memory card is recorded on the second recording area, then when an application program operating on the playback device acquires data from the distribution server via electronic distribution and records the acquired data in the semiconductor memory card, the following processing is performed. First, the application program issues an access request to the control circuit via the memory card I/F for accessing the identification information of the semiconductor memory card recorded on the second recording area. In response to the access request, the control circuit first reads the identification information from the second recording area. Then, the control circuit transmits the identification information to the application program via the memory card I/F. The application program transmits a transmission request of the distribution data together with the identification information. The application program further records, in the first recording area of the semiconductor memory card via the memory card I/F, the public key information and the distribution data received from the distribution server in response to the transmission request.

Note that it is preferable that the above-described application program check whether the application program itself has been tampered with before issuing the access request to the control circuit of the semiconductor memory card. The check may be performed using a digital certificate compliant with the X.509 standard. Furthermore, it is only necessary to record the distribution data in the first recording area of the semiconductor memory card, as described above. Access to the distribution data need not be controlled by the control circuit of the semiconductor memory card.

<Application to Real-Time Recording>

The embodiment of the present invention is based on the assumption that an AV stream file and a playlist file are recorded on a BD-ROM disc using the prerecording technique of the authoring system, and the recorded AV stream file and playlist file are provided to users. Alternatively, it may be possible to record, by performing real-time recording, the AV stream file and the playlist file on a writable recording medium such as a BD-RE disc, a BD-R disc, a hard disk, or a semiconductor memory card (hereinafter, "BD-RE disc or the like") and provide the user with the recorded AV stream file and playlist file. In such a case, the AV stream file may be a transport stream that has been obtained as a result of real-time decoding of an analog input signal performed by a recording device. Alternatively, the AV stream file may be a transport stream obtained as a result of partializing a transport stream in digital form input by the recording device.

The recording device performing real-time recording includes a video encoder, an audio encoder, a multiplexer, and a source packetizer. The video encoder encodes a video signal to convert it into a video stream. The audio encoder encodes an audio signal to convert it into an audio stream. The multiplexer multiplexes the video stream and audio stream to convert them into a digital stream in the MPEG-2 TS format. The source packetizer converts TS packets in the digital stream in MPEG-2 TS format into source packets. The recording device stores each source packet in the AV stream file and writes the AV stream file on the BD-RE disc or the like.

In parallel with the processing of writing the AV stream file, the control unit of the recording device generates a clip information file and a playlist file in the memory and writes the files on the BD-RE disc or the like. Specifically, when a user requests performance of recording processing, the control unit first generates a clip information file in accordance with an AV stream file and writes the file on the BD-RE disc or the like. In such a case, each time a head of a GOP of a video stream is detected from a transport stream received from outside, or each time a GOP of a video stream is generated by the video encoder, the control unit acquires a PTS of an I picture positioned at the head of the GOP and an SPN of the source packet in which the head of the GOP is stored. The control unit further stores a pair of the PTS and the SPN as one entry point in an entry map of the clip information file. At this time, an "is_angle_change" flag is added to the entry point. The is_angle_change flag is set to "on" when the head of the GOP is an IDR picture, and "off" when the head of the GOP is not an IDR picture. In the clip information file, stream attribute information is further set in accordance with an attribute of a stream to be recorded. In this manner, after writing the AV stream file and the clip information file into the BD-RE disc or the like, the control unit generates a playlist file using the entry map in the clip information file, and writes the file on the BD-RE disc or the like.

<Managed Copy>

The playback device according to the embodiments of the present invention may write a digital stream recorded on the BD-ROM disc 101 on another recording medium via a managed copy. "Managed copy" refers to a technique for permitting copy of a digital stream, a playlist file, a clip information file, and an application program from a read-only recording medium such as a BD-ROM disc to a writable recording medium only in the case where authentication via communication with the server succeeds. This writable recording medium may be a writable optical disc, such as a BD-R, BD-RE, DVD-R, DVD-RW, or DVD-RAM, a hard disk, or a portable semiconductor memory element such as an SD memory card, Memory Stick™, Compact Flash™, Smart Media™ or Multimedia Card™. A managed copy allows for limitation of the number of backups of data recorded on a read-only recording medium and for charging a fee for backups.

When a managed copy is performed from a BD-ROM disc to a BD-R disc or a BD-RE disc and the two discs have an equivalent recording capacity, the bit streams recorded on the original disc may be copied in order as they are.

If a managed copy is performed between different types of recording media, a trans code needs to be performed. This "trans code" refers to processing for adjusting a digital stream recorded on the original disc to the application format of a recording medium that is the copy destination. For example, the trans code includes the process of converting an MPEG-2 TS format into an MPEG-2 program stream format and the process of reducing a bit rate of each of a video stream and an audio stream and re-encoding the video stream and the audio stream. During the trans code, an AV stream file, a clip information file, and a playlist file need to be generated in the above-mentioned real-time recording.

<Method for Describing Data Structure>

Among the data structures in the embodiments of the present invention, a repeated structure "there is a plurality of pieces of information having a predetermined type" is defined by describing an initial value of a control variable and a cyclic condition in a "for" sentence. Also, a data structure "if a predetermined condition is satisfied, predetermined information is defined" is defined by describing, in an "if" sentence, the condition and a variable to be set at the time when the condition is satisfied. In this manner, the data structure described in the embodiments is described using a high level programming language. Accordingly, the data structure is converted by a computer into a computer readable code via the translation process performed by a compiler, which includes "syntax analysis", "optimization", "resource allocation", and "code generation", and the data structure is then recorded on the recording medium. By being described in a high level programming language, the data structure is treated as a part other than the method of the class structure in an object-oriented language, specifically, as an array type member variable of the class structure, and constitutes a part of the program. In other words, the data structure is substantially equivalent to a program. Therefore, the data structure needs to be protected as a computer related invention.

<Management of Playlist File and Clip Information File by Playback Program>

When a playlist file and an AV stream file are recorded on a recording medium, a playback program is recorded on the recording medium in an executable format. The playback program makes the computer play back the AV stream file in accordance with the playlist file. The playback program is loaded from a recording medium to a memory element of a computer and is then executed by the computer. The loading process includes compile processing or link processing. By these processes, the playback program is divided into a plurality of sections in the memory element. The sections include a text section, a data section, a bss section, and a stack section. The text section includes a code array of the playback program, an initial value, and non-rewritable data. The data section includes variables with initial values and rewritable data. In particular, the data section includes a file that is recorded on the recording medium and can be accessed at any time. The bss section includes variables having no initial value. The data included in the bss section is referenced in response to commands indicated by the code in the text section. During the compile processing or link processing, an area for the bss section is set aside in the computer's internal RAM. The stack section is a memory area temporarily set aside as necessary. During each of the processes by the playback program, local variables are temporarily used. The stack section includes these local variables. When the program is executed, the variables in the bss section are initially set at zero, and the necessary memory area is set aside in the stack section.

As described above, the playlist file and the clip information file are already converted on the recording medium into computer readable code. Accordingly, at the time of execution of the playback program, these files are each managed as "non-rewritable data" in the text section or as a "file accessed at any time" in the data section. In other words, the playlist file and the clip information file are each included as a compositional element of the playback program at the time of execution thereof. Therefore, the playlist file and the clip information file fulfill a greater role in the playback program than mere presentation of data.

INDUSTRIAL APPLICABILITY

The present invention relates to a technology for stereoscopic video playback and as described above, enables TS packets to be identified with use of TS priority flag. It is therefore apparent that the present invention is industrially applicable.

| [Reference Signs List] | |
|---|---|
| 1500 | VAU #1 in the dependent-view video stream |
| 1510 | PES packet |
| 1512 | PES payload |
| 1520 | TS packet sequence |
| 1521 | first group of the TS packet sequence 1520 |
| 1522 | second group of the TS packet sequence 1520 |
| 1523 | third group of the TS packet sequence 1520 |
| 1530 | TS packet located at the end of the first group 1521 |
| 1531 | TS header of the TS packet 1530 |
| 1532 | AD field of the TS packet 1530 |
| 1533 | TS payload of the TS packet 1530 |
| 1540 | TS packet belonging to the second group 1522 |
| 1541 | TS header of the TS packet 1540 |

-continued

[Reference Signs List]

| | |
|---|---|
| 1542 | TS payload of the TS packet 1540 |
| 1550 | TS packet located at the end of the second group 1522 |
| 1551 | TS header of the TS packet 1550 |
| 1552 | AD field of the TS packet 1550 |
| 1553 | TS payload of the TS packet 1550 |
| 1560 | TS packet belonging to the third group 1523 |
| 1561 | TS header of the TS packet 1560 |
| 1562 | TS payload of the TS packet 1560 |

The invention claimed is:

1. A semiconductor integrator circuit for receiving a series of data including a main-view video stream, a sub-view video stream, and a graphics stream, and then performing video signal processing on the received data, wherein the main-view video stream used to provide a plurality of main-views of a plurality of stereoscopic video images, a decoded main-view video stream being presented on a main-view video plane;

the sub-view video stream used to provide a plurality of sub-views of the plurality of stereoscopic video images, a decoded sub-view video stream being presented on a sub-view video plane; and the graphics stream used to provide a plurality of graphics images, a decoded graphics stream being presented on a graphics plane, wherein the sub-view video stream is multiplexed in a transport stream, a plurality of transport packets being formed from the transport stream, wherein each of the plurality of transport packets has information indicating whether the transport packet contains offset information, wherein the sub-view video stream includes the offset information, wherein a first shifted graphics plane and a second shifted graphics plane are formed based on the graphics plane on which the decoded graphics stream is presented and the offset information, wherein data formed from the main-view video plane on which the decoded main-view video stream is presented and data formed from the first shifted graphics plane are overlaid, and wherein data formed from the sub-view video plane on which the decoded sub-view video stream is presented and data formed from the second shifted graphics plane are overlaid, the semiconductor integrated circuit comprising:

a main control unit operable to control the semiconductor integrated circuit;

a stream processing unit operable to receive the series of data, temporarily store the series of data into a memory internal or external to the semiconductor integrated circuit, and then demultiplex the series of data into the picture data and the graphics data;

a signal processing unit operable to decode the picture data and the graphics data; and an AV output unit operable to output the picture data decoded by the signal processing unit, wherein the stream processing unit comprises a switching unit operable to receive the series of data and switch storage location thereof between a first area and a second area in the memory, the main control unit controls the switching unit to store picture data belonging to the main-view data groups and the sub-view data groups in the first area and the second area, respectively, among the picture data decoded, data belonging to the main-view data groups is stored into a third area in the memory, the third area corresponding to a main-view video plane, among the picture data decoded, data belonging to the sub-view data groups is stored into a fourth area in the memory, the fourth area corresponding to a sub-view video plane, the graphics data decoded is stored into a fifth area in the memory, the fifth area corresponding to a graphics plane, the AV output unit comprises an image superimposing unit operable to superimpose one of the graphics data decoded and the picture data decoded on the other, the signal processing unit monitors TS priority flags of TS packets included in the series of data, and extracts the metadata, the image superimposing unit provides a positive offset and a negative offset for horizontal coordinates in the graphics plane to generate a pair of graphics planes according to offset information included in the metadata extracted by the signal processing unit, and then superimposes the pair of graphics planes separately on the main-view video plane and the sub-view video plane, and the AV output unit outputs the picture data decoded after the graphics data decoded is superimposed thereon.

* * * * *

UNITED STATES PATENT AND TRADEMARK OFFICE
CERTIFICATE OF CORRECTION

PATENT NO. : 8,467,664 B2  
APPLICATION NO. : 13/399196  
DATED : June 18, 2013  
INVENTOR(S) : Taiji Sasaki et al.

Page 1 of 1

It is certified that error appears in the above-identified patent and that said Letters Patent is hereby corrected as shown below:

TITLE PAGE

Item (30), Foreign Application Priority Data, "Oct. 7, 2009 (JP) .................. 2009-164289"  
should read -- July 10, 2009 (JP) ..................... 2009-164289 --.

Signed and Sealed this  
Seventeenth Day of September, 2013

Teresa Stanek Rea  
*Deputy Director of the United States Patent and Trademark Office*